US011117253B2

(12) United States Patent
Oleynik

(10) Patent No.: US 11,117,253 B2
(45) Date of Patent: Sep. 14, 2021

(54) METHODS AND SYSTEMS FOR FOOD PREPARATION IN A ROBOTIC COOKING KITCHEN

(71) Applicant: MBL LIMITED, Jersey (JE)

(72) Inventor: Mark Oleynik, Monaco (MC)

(73) Assignee: MBL Limited, St. Helier (JE)

( * ) Notice: Subject to any disclaimer, the term of this patent is extended or adjusted under 35 U.S.C. 154(b) by 626 days.

(21) Appl. No.: 15/782,230

(22) Filed: Oct. 12, 2017

(65) Prior Publication Data

US 2018/0257219 A1 Sep. 13, 2018

Related U.S. Application Data

(62) Division of application No. 14/627,900, filed on Feb. 20, 2015, now Pat. No. 9,815,191.

(Continued)

(51) Int. Cl.

| | |
|---|---|
| ***A47J 27/00*** | (2006.01) |
| ***B25J 9/00*** | (2006.01) |
| ***G05B 19/42*** | (2006.01) |

(52) U.S. Cl.

CPC ............ *B25J 9/0081* (2013.01); *G05B 19/42* (2013.01); *G05B 2219/36184* (2013.01); *G05B 2219/40391* (2013.01); *G05B 2219/40395* (2013.01)

(58) Field of Classification Search

CPC .......... G05B 19/42; G05B 2219/36184; G05B 2219/40395; G05B 2219/40391;

(Continued)

(56) References Cited

U.S. PATENT DOCUMENTS

| | | | |
|---|---|---|---|
| 7,107,123 B2 | 9/2006 | Watanabe et al. | |
| 7,174,830 B1 * | 2/2007 | Dong ..................... | B25J 9/0084 901/1 |

(Continued)

FOREIGN PATENT DOCUMENTS

| | | |
|---|---|---|
| WO | 2003074238 A1 | 9/2003 |
| WO | 2003080297 A1 | 10/2003 |

(Continued)

OTHER PUBLICATIONS

Bates, Claire, "How do you like your pancakes? Robot cooks breakfast at exhibit," DailyMail.com, Nov. 27, 2008, Daily Mail Online, Retrieved on Sep. 29, 2015; 18 pages.

(Continued)

*Primary Examiner* — Brian W Jennison

(74) *Attorney, Agent, or Firm* — Peter Su; Radlo & Su

(57) ABSTRACT

The present disclosure is directed to methods, computer program products, and computer systems for instructing a robot to prepare a food dish by replacing the human chef's movements and actions. Monitoring a human chef is carried out in an instrumented application-specific setting, a standardized robotic kitchen in this instance, and involves using sensors and computers to watch, monitor, record and interpret the motions and actions of the human chef, in order to develop a robot-executable set of commands robust to variations and changes in the environment, capable of allowing a robotic or automated system in a robotic kitchen to prepare the same dish to the standards and quality as the dish prepared by the human chef.

32 Claims, 191 Drawing Sheets

Related U.S. Application Data

(60) Provisional application No. 62/116,563, filed on Feb. 16, 2015.

(58) Field of Classification Search
CPC ........... G05B 2219/39466; G05B 2219/39529; G05B 2219/39535; G05B 2219/39572; B25J 9/0081; B25J 9/0084–0087; B25J 9/1612; B25J 9/1669; B25J 9/1679–1682; B25J 9/1694; B25J 11/0045; B25J 13/08–081; B25J 13/084–085; B25J 13/087–088; B25J 15/0009; B25J 15/08; B25J 19/02; Y10S 901/03; Y10S 901/47; Y10S 901/50; A47J 44/00
USPC ................. 700/257, 250, 258; 901/3, 47, 50
See application file for complete search history.

(56) References Cited

U.S. PATENT DOCUMENTS

| | | | |
|---|---|---|---|
| 7,673,916 B2 | 3/2010 | Greenhill et al. | |
| 8,483,880 B2 | 7/2013 | de la Rosa Tames et al. | |
| 8,660,695 B2 | 2/2014 | De La Rosa Tames et al. | |
| 8,882,783 B2 | 11/2014 | Oostman | |
| 9,131,807 B2 | 9/2015 | Roy et al. | |
| 2004/0172380 A1* | 9/2004 | Zhang | B25J 9/1682 |
| 2005/0193901 A1* | 9/2005 | Buehler | A47J 44/00 99/468 |
| 2010/0010703 A1 | 1/2010 | Coats et al. | |
| 2010/0076708 A1 | 3/2010 | Hukkeri et al. | |
| 2010/0076709 A1 | 3/2010 | Hukkeri et al. | |
| 2010/0076710 A1 | 3/2010 | Hukkeri et al. | |
| 2011/0040408 A1 | 2/2011 | De La Rosa Tames et al. | |
| 2011/0158804 A1 | 6/2011 | Smith | |
| 2011/0311102 A1 | 12/2011 | Mcdaniel et al. | |
| 2012/0017718 A1 | 1/2012 | Greenhill | |
| 2012/0053831 A1 | 3/2012 | Bibhrajit | |
| 2012/0130588 A1 | 5/2012 | Hukkeri | |
| 2012/0130598 A1 | 5/2012 | Hukkeri et al. | |
| 2012/0299695 A1 | 11/2012 | McDaniel | |
| 2013/0006482 A1 | 1/2013 | Hukkeri et al. | |
| 2013/0145911 A1 | 6/2013 | Rother | |
| 2013/0173201 A1 | 7/2013 | Hukkeri et al. | |
| 2013/0313844 A1 | 11/2013 | De La Rosa Tames et al. | |
| 2013/0345873 A1 | 12/2013 | Blumberg et al. | |
| 2014/0154384 A1 | 6/2014 | Vardakostas et al. | |
| 2014/0170275 A1* | 6/2014 | Bordin | A23L 5/10 426/233 |
| 2014/0324607 A1 | 10/2014 | Frehn et al. | |
| 2015/0053097 A1 | 2/2015 | Vardakostas et al. | |
| 2015/0075391 A1 | 3/2015 | Vardakostas et al. | |
| 2015/0114236 A1* | 4/2015 | Roy | A47J 44/00 426/231 |
| 2015/0164131 A1 | 6/2015 | Vardakostas et al. | |
| 2015/0183535 A1 | 7/2015 | Vardakostas et al. | |

FOREIGN PATENT DOCUMENTS

| | | |
|---|---|---|
| WO | 2006037951 A1 | 4/2006 |
| WO | 2009030922 A2 | 3/2009 |
| WO | 2009030922 A3 | 6/2009 |
| WO | 2010092321 A2 | 8/2010 |
| WO | 2010092321 A3 | 11/2010 |

OTHER PUBLICATIONS

Bates, Claire, "Don't fancy the washing up? This robot could do the dishes for you," DailyMail.com, Dec. 19, 2008, Daily Mail Online, Retrieved on Sep. 29, 2015; 19 pages.
Daily Mail Reporter, "Flipping brilliant! Now Japan has invented a robot that can cook you pancakes for breakfast," DailyMail.com, Jun. 9, 2009, Daily Mail Online, Retrieved on Sep. 29, 2015; 21 pages.
Abry, Vincent, "Putting robotics at your service," Cooking and Domestic Robot—Robotshop Blog,Feb. 14, 2010, Retrieved on Sep. 29, 2015; 12 pages.
Waibel, Markus, "Robots Make Bavarian Breakfast Together," IEEE Spectrum, Jun. 11, 2011, Retrieved on Sep. 29, 2015; 3 pages.
Kerns, Josh, "Why robots could soon replace fast food workers demanding higher minimum wage," Mynorthwest.com Online Blog, Jul. 11, 2013, Retrieved on Sep. 29, 2015; 3 pages.
McNicoll, Arion, "Meet the robot chef who 'prints' cookies," CNN.com, Sep. 2, 2013, Retrieved on Sep. 29, 2015; 4 pages.
Aving Global Network, "Siemens to present its liftMatic wall-mounted oven AVING USA," AVINGGlobalNews.network. Retrieved on Mar. 3, 2015, http://us.aving.net/news/view.php?articleId=135357; 6 pages.
Cha, Elizabeth et al., "Robots in the Home: Qualitative and Quantitative Insights into Kitchen Organization," HRI' 15, Mar. 2-5, 2015, Portland, Oregon, USA; 8 pages.
The Shadow Robot Company, "Shadow Dexterous Hand Technical Specification," Shadow Dexterous Hand E1 Series (E1M3R, E1M3L, E1P1R, E1P1L), Released on Jan. 1, 2013; 14 pages.
Treehugger, "It Slices! It Dices! It Cleans UP After Itself! Introducing Panasonic's Robot Kitchen," Retrieved on Mar. 3, 2015, http://www.treehugger.com/kitchen-design/it-slices-it-dices-it-cleans-up-after-itself-introducing-panasonics-robot-kitchen.html; 4 pages.
Yang, Yezhou et al. "Robot Learning Manipulation Action Plans by "Watching" Unconstrained Videos from the World Wide Web," Association for the Advancement of Artificial Intelligence (www.aaai.org), 2005; 7 pages.
Mark Oleynik, International Search Report and Written Opinion of the International Searching Authority corresponding to PCT/EP2015/001704, The European Patent Office, P.B. 5818 Patentlaan 2, dated Feb. 19, 2016; 13 pages.
Mark Oleynik, International Search Report corresponding to PCT/IB2015/000379, The European Patent Office, P.B. 5818 Patentlaan 2, dated Apr. 13, 2016; 6 pages.
MBL Limited, International Search Report on Patentability (Chapter I of the Patent Cooperation Treaty) and Written Opinion of the International Searching Authority corresponding to PCT/EP2015/001704, The International Bureau of WIPO, 34, chemin des Colombettes, 1211 Geneva 20, Switzerland, dated Mar. 16, 2017; 10 pages.
Mark Oleynik, English Translation of the International Preliminary Report on Patentability and Written Opinion of the International Searching Authority corresponding to PCT/IB2015/000379, The International Bureau of WIPO, dated Sep. 1, 2016; 18 pages.

* cited by examiner

Calculating Probability of Desired result for multi-step cooking operations

Probability of Success = Product of the Probabillities of success at all stages

Probability of success at each stage = Probability that any alternative works for that stage $$P(S)=\prod_{s_i \in S} P(s_i \mid A(s_i))$$

$$P(s_i \mid A(s_i))=1-\prod_{a_j \in A(s_i)} (1-P(s_i \mid a_j))$$

| Non-Standard | Standard |
|---|---|
| 0.9 | 0.99 |
| 0.81 | 0.9801 |
| 0.729 | 0.970299 |
| 0.6561 | 0.96059601 |
| 0.59049 | 0.95099005 |
| 0.531441 | 0.941480149 |
| 0.4782969 | 0.932065348 |
| 0.43046721 | 0.922744694 |
| 0.387420489 | 0.913517247 |
| 0.34867844 | 0.904382075 |
| 0.313810596 | 0.895338254 |
| 0.282429536 | 0.886384872 |
| 0.254186583 | 0.877521023 |
| 0.228767925 | 0.868745813 |
| 0.205891132 | 0.860058355 |

Probability curves showing the differences for a robotic apparatus operating between a standardized kitchen and a non-standardized kitchen

580

580

72

810
Chef Studio Cooking Capture Process

Database structure of mini-manipulation (MM) library

| Name of MM | Code of MM | Code(s) of standardized equipment and tools associated with the performance of MM | Initial position and orientation of the manipulated (standard or non-standard) objects (ingredients and tools) in a robotic hand | Parameters/Variable defined by user(or taking from recorded recipe during execution): | | | | Sequence of robotic hand movements (control signals for all servos)and connecting feedback parameters (from any sensors or video recognizing system) of MM on the timeline. The variables is a initial data information for the sequence) |
|---|---|---|---|---|---|---|---|---|
| | | | | MM Starting coordinate XYZ in the volume of the standardized kitchen module | MM speed | MM object size (may be non-standard) | MM object shape (may non-standard) | |
| | | | | | | | | |
| | | | | | | | | |
| | | | | | | | | |
| | | | | | | | | |

Parameters/Variables defined by a user or taking from the recorded recipe during execution (the variables could be different for a different mini-manipulation).

| Name of Objects | Image of Object | Code of Object | Virtual 3D model with full dimensions of object in matrix of (XYZ coordinates matrix) (resolution preferably be defined) | Virtual vector model of the object (if available) | Define and marking of the working elements of the object (the elements, which may be in contact with hands and other objects for manipulation) | Initial standard orientation of object for each specific manipulations |
|---|---|---|---|---|---|---|
| | | | | | | |
| | | | | | | |
| | | | | | | |
| | | | | | | |

FIG. 30

Online Analysis for Good Freshness and Quality

Pre-filled containers with program dispenser control

1120

* Selected personalized recipe – excluding recipe with allergic ingredients (identify allergic ingredients from a personal user profile, as defined by the user)

1120

Create a recipe

Main Page

Equipment

Types of Cuisines

Types of Food

Chef Listing

Types of Equipment

Ingredients

Recipe Description

Search Result

1150

By selecting category and criteria/range, the result page lists all recipes results, user can sort results by criteria such as rating (e.g. from high to low), or time of cooking (e.g. from shorter to longer), the result display contains photo/media, title, description, ratings and price information of the recipe, the "read more" button brings up complete recipe page to browsing further information of the recipe.

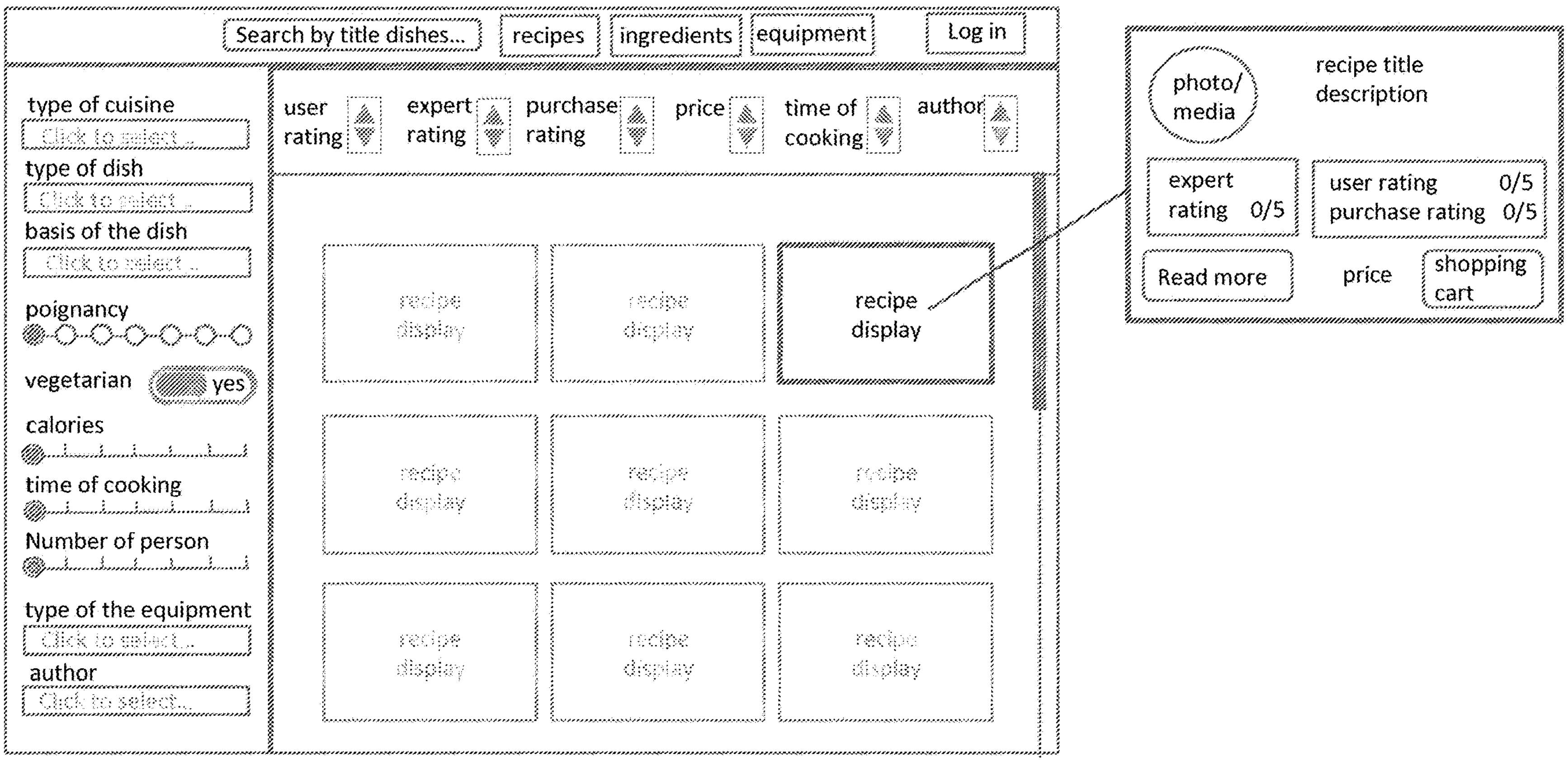

FIG. 38

50 robotic kitchen prototype

1200

50

50

50

50

50

50

1356

1358

1362

1364

Dimension - side view

86
Storage Station Containers Elevation View

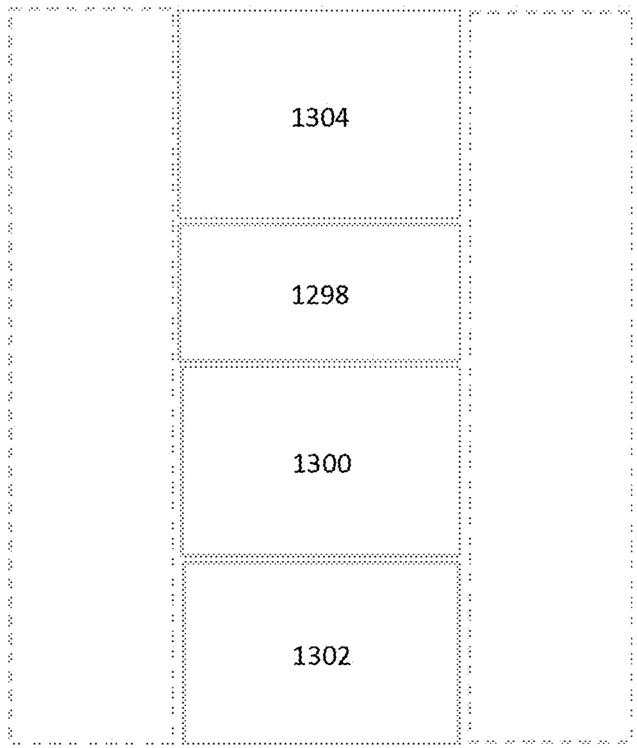

Storage (where temperature, humidity, oxygen and other room conditions can be monitored and control.

Different setting levels:

1304 pantry/ dry storage

1298 Ripening level((12~14°C) for tropical fruits and tubers vegetables such as potatoes and Wine cell level (7~18°C)

1300 Chill level(2~-4°C): for fresh produce, fruit, meat to confer optimal shelf life 1302 Frozen level(-16~-20°C): for frozen meat, bakery... and Deep Freeze level (-28~-30°C): ex. For seafood and ice cream

FIG. 48

1380
Ingredient Access Containers

1382 Ingredient Quality Monitoring Dashboard

1384 Scanning, detector, camera, scale..

1386 countertop with auto-shelf and rack for check-In
Drop off and check-out

1388 Recycling
Access

1390

Ingredient Quality Monitoring Dashboard

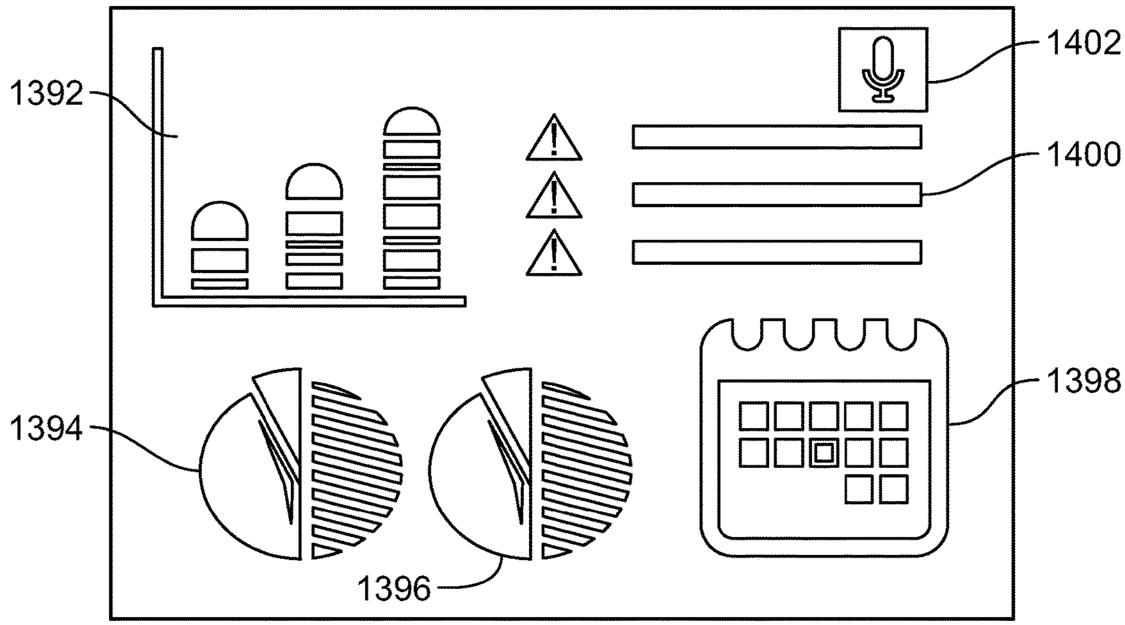

1392 Ingredients Inventory Overview (e.g. (Dairy, Eggs, Fruits, Legume-Meat, Seasonings, Sweeteners, Vegetables & Mushrooms...)

1394 Ingredient Nutrition Distribution

1396 Storage Utilization and Allocation

1398 Expiration, Fulfillment Schedule

1400 Alerts: Decays, Abnormal Temperature, Capacity Overloading

1402 Voice Command for Query or Ingredient Check-in/check-out

FIG. 50

1402
Meal Group Profile

- Age
- Gender
- Weight
- Allergy
- Medication
- Life style

1404
Types of Cuisine

- Cuisine (region, culture, religion)
- Cooking equipment's (pan, grill or oven)
- Cooking/preparation time

1406
Media Library

- •(Chef Studio) cooking video
- Photos
- Music

1410

1408
Recipe Data

- Recipe name
- Recipe code
- Recipe version
- Preparation Time
- Cooking Time
- Price
- Cooking tools and appliances associated for parameter control cooking Review/rating content
- Structured data (Ingredient, measurement, Instruction
- Unstructured (descriptive data) data
- Media

1410
Robotic Kitchen equipment/tools

- Name
- Code
- Revision
- Categories
  - Station and appliance
  - Storage (freezer, fridge, pantry..)
  - Containers/bin
  - Oven
  - pan
  - Microwave
  - Stove/griller
  - .......

1412
Ingredient grouping

- dairy/milk alternatives(milk, butter, yogurt, cheese...)
- Fruits (apples, oranges, bananas, berries, lemons..)
- Grains(wheat, rice, oats, barley, bread, pasta...)
- Meat/protein(chicken, fish, seafood, turkey, pork, beef, legumes, meat analogues...
- Sweets/sugary food(candy, soft drinks, cake, pie, ice cream...)
- Vegetables (spinach, carrots, onions, peppers, broccoli...)
- Water (tea, fruit juice, vegetable juice, soup...)
- Alcohol
- Artificial ingredient(artificial flavor, food coloring, preservative, sweetener...)

1414
Ingredient data

- Ingredient name
- Ingredient code
- Description
- Nutrition facts,
- brands
- Form and storage requirements (in liquid, cream, powder, container/dispenser, freezer, special humidity control storage system....)
- Price
- Source
- Season
- Media
- Substitution.....

1416
Cooking Techniques

Mechanical
- Basting –
- Cutting
- Chopping
- Dicing –
- Grating –
- Julienning –
- Mincing –
- .....

Chemical
- Ceviche –
- Drying –
- Fermentation –
- Marinating –
- Pickling –
- Salting –
- Seasoning –

FIG. 51

Storage Check-In and Identification Process

Storage Check-out / Cooking Preparation Process

Recipe Design and Scripting Process

User selects a recipe

Predefined Recipe Search Criteria
1672

Main Ingredient

Chicken
Beef
Pasta
Seafood
Rice
Fish
Lamb
Pork
Duck
Wild Game
Vegetable
Chocolate
Bread
Cheese
Eggs
Fruit
Turkey
Others
...

Cooking Duration

Less than 3 hours
Less than 2 hours
Less than 1 hours
Less than 45 minutes
Less than 30 minutes
Less than 15 minutes

Ingredient costs

Cuisine by geographic regions and types

Asian style
Indian food style
Arabic food style
Tartar
Cajun
Molecular
Fusion
American
Asian
British
French
Greek
Indian
Italian
Mexican
Moroccan
Spanish
.....

Chef name search

Chef's name
Chef's specialty
Chef's location

Signature Dish from well-known
restaurant or chef

FIG. 64A

1672
Predefined Recipe Search Fields

Types of Meals

Breakfast
Brunch
Starters
Mains
Deserts
Drinks
Sauces
Sides
Snacks

Special Diet

Low-Calories
Low-Carbohydrate
Low-Fat
Low-Protein
Low-Sodium
Hi-Fiber
Diabetic-Friendly
Vegetarian
Vegan
Dairy-Free
Wheat/Gluten-Free
...

Exclusion ingredient

(User to select recipe without certain non-main ingredients for preferences, health/ allergy/nutrition concern, availability reasons.)
...

Dish Types and Cooking Methods

Antipastas
Brewing
Cakes & tea treats
Canning Curries
Deep fried
Drinks
Grilling
No-Cook
Pasta & Risottos
Pies & Pastries
Pizzas
Pressure
Deserts
Roasts
Salads
Sandwiches/Wraps
Sauces /Condiments
Slow cooking
Soups
Steam
Stews
Stir-Fry
Vegetable Sides
Water Bath
...

Occasions & Seasons

Purim
Ramadan
Rosh Hashanah
Hanukkah
Passover
Easter
Thanksgiving
Christmas
Parties and Gatherings
Spring
Summer
Fall
Winter
...

Reviews and Suggestions

Pairing recipes which are usually purchased / ordered together with, similar recipes, same ingredient recipies....

Ranking

(Best selling, most positive reviews....)

FIG. 64B

| Type of product | Product | Container # | Length x Width x Height mm. / Volume mL |
|---|---|---|---|
| Large, bulky products (used by the piece) | White cabbage, red cabbage, savoy cabbage, turnips, cauliflower, beet, rutabaga, kohlrabi, pak choi, Chinese cabbage, cabbage Romanesco, pumpkin, watermelon, melon, pineapple, coconut, mango | No_1 | 280x200x150 |
| Small fraction solids (small amount of use) | Cocoa, coffee powder, baking soda, citric acid (crystals), poppy dried, powdered sugar, baking powder dough, anise, star anise, vanilla, cardamom black cardamom, black cumin, coriander, cumin whole, dry dill, coriander seed, slices of dried onions, fennel seeds, dry yeast, sumac, cumin whole, dry thyme, garlic, dry mustard powder, minced cherries, rosehip powder, glucose, baking dough, egg powder, caramel syrup, dried parsley, gelatin food, basil dry, saffron, galangal, oregano. □pepper (allspice, black, white, red, sweet, red hot chili, cayenne), cloves, cinnamon, coriander, salt□(carbon ammonium, sea), minced cloves, ginger dry powder, cardamom, coriander, cumin powder, curry, turmeric, powdered cinnamon, nutmeg powder, parsley. | No_2 | 100x50x30 / 150 ml |
| Small fraction solids (large amount of use) | □Flour (wheat, pancake, corn, rye, barley, oat, rice, pea, buckwheat, soybean), starch (corn, potato), semolina, millet, rice, oats, barley, corn, breadcrumbs, sugar | No_3 | 70x100x150 / 1000 ml |
| Large fraction solids (large amount of use) | Rice □ (wild, basmati rice, long□grain, polished, brushed crushed), lentils, buckwheat, unground, unground quickly preparing, slipped quickly preparing, cereal□(pea quickly preparing, corn ground, large corn for flakes, corn fine, wheat Poltava, Artek wheat, wheat quickly preparing, buckwheat, oats not crushed, oat rolled, crushed barley, crushed barley quickly preparing), oatmeal, oat flakes, millet polished, millet polished quickly preparing, pea□(shelled, shelled split), beans (white, red), dried onion slices, dried parsley, food gelatins | No_3 | 70x100x150 / 1000 ml |
| Large fraction solids by piece (large amount of use) | Pasta (linguine, spaghetti, lasagna, foam, feathers, scrap macaroni, vermicelli (round, square, elliptical), noodles (smooth, serrated, with straight, helical or sawtooth edges), pasta, pretzels, and noodles may be in the form of nests and coils, curly, stamped, pressed), gelatin leaf, sugar□dough (mastic). | No_4 | 250x180x100 |
| Salad and spinach vegetables | Salad, nettles, chard, spinach, quinoa, sorrel, etc., spicy vegetables □ fennel, coriander, cumin, parsley, savory, calendula, basil, tarragon, lavender, lemon balm, thyme, rosemary, lovage, marjoram, etc., dessert vegetables □ rhubarb, asparagus, artichoke, leek, onion, shallot, shallots; leek, rhubarb, sorrel | No_4 | 250x180x100 |
| Small size food products | Tomatoes, onions, garlic, brussels sprouts, root and tuber vegetables (carrot, radish, black radish, horseradish, European radish, parsnip, daikon, celery, beets, potatoes, Jerusalem artichokes, sweet potatoes, yams); Pumpkin vegetables (cucumbers, marrow squash, zucchini, squash); Herbaceous | No_4 | 250x180x100 |

FIG. 65

| | | | |
|---|---|---|---|
| | plants □ (corn on the cob, eggplant, capers, loofah, peppers (bell), fennel); Fillets treated □ bird (turkey, chicken, duck, partridge, quail, hazel grouse); □seafood (shrimp (tiger), crab, squid, langouste, langoustines, lobster, mussels, scallops, octopus, oyster, cuttlefish); meat (pork, beef, rabbit, mutton, lamb, veal, goat meat, horse meat, hare, venison, wild boar meat); fish (ide, pike, hake, trout, tuna, Silver carp, cod, perch, sterlet, jack mackerel, catfish, mackerel, whitefish, salmon, herring, sardines, baltic herring, Common carp, roach, haddock, halibut, sturgeon, perch, hake, redfish, capelin, pollock, bluefish, bream, smelt, mullet, chum salmon, carp, crucian, flounder, catfish, dorado, pink salmon, chub, red mullet, anchovy, shark, sea bass); mushrooms (cep, oyster, table mushroom, partabello, milk mushroom, chanterelle, suillus, xercomus, Armillaria, birch bolete, red□capped scaber stalk, truffle, shiitake); chicken egg; fruits □ apple, pear, pomegranate, peach, plum, cherry, orange, lemon, grapes, apricots, kiwi, strawberry, banana, feyhua, grapefruit, lychee, rambutan, mangosteen, carambola, guava, passion fruit, avocado, papaya, pomelo, figs, pawpaw, quince, barberry, cranberries, | | |
| Large fraction solids by piece (small amount of use) | Dried apricots, raisins, (dark, light), prunes, almond shavings, seeds (sunflower, pumpkin, white), dates, figs, dried cherry, dried, dried plums, dried rosehip, dried apricots pitted, dried papaya, dried apricots, kiwi dried, candied pineapple, quail eggs, blueberries, strawberries, blackberries, currants (red / white / black), cranberry viburnum, buckthorn, gooseberry. Butter | No_5 | 150x100x50 |
| Large fraction solids by piece (small amount of use) | nuts (nutmeg, pecans, pine nuts, macadamia, cola, chilim, chestnut, Brazil, peanuts, walnuts, almonds, cashews, pistachios, pine, hazelnuts), coffee grain, sugar (cane, white refined) grains for milling | No_6 | 70x100x50 / 350 ml |
| Spaghetti | Spaghetti | No_7 | tube 100x100x350 |
| Liquids (large amount of use) | milk, cream (pastry, vegetable), liquid dairy products (fermented baked milk, yogurt, kefir, tan), olive oil, vegetable oil, frying, duck fat, stewed fruit, fruit□drink, juice, beer, wine | No_8 | 1200 ml |
| Liquids (small amount of use) | balsamic cream, vinegar (balsamic, (light, dark), wine-(white, red), apple, table), soy sauce, citric acid, Tabasco, Red Devil, Worcestershire sauce, oil (pumpkin, flax, sesame) | No_9 | 100 ml |
| Pasty (pastelike) products and semi-finished products (small amount of use) | Sour cream, mayonnaise, softened butter, whipped cream, cheese (mascarpone, ricotta), tomato paste, mustard, horseradish paste | No_10 | 300 ml |

FIG. 65 (Cont. )

Sensory cookware with teal-Time Temperature Sensor

1730
Temperature and humidity curves recorded from a sensory cookware with multiple data points 1700
Real-Time Temperature Control with a (smart) pan (Smart) Oven and Computing Operating System (smart) charcoal grill Temperature and Power Control (Smart) Faucet with Speed, Temperature and Power Control 2000
Robotic Kitchen Top Plan View (one example)

2060
Robotic Kitchen Cooking System Top (one example)
Plan View emotion profile application

2220

| time line 1 | | | line 2 |
|---|---|---|---|
| sets of emotion parameters | | Score | Score |
| 1 | sets of hormone | 10 | |
| 2 | sets of pheromones | 9.5 | 4.5 |
| 3 | microexpression | 7 | 4.2 |
| 4 | heart rate | 8 | 2.5 |
| 5 | sweat | 8 | 1.9 |
| 6 | pupil dialator | 4.3 | 3.1 |
| 7 | reflex movement | 3.6 | 2 |
| 8 | body temperature | 2.5 | 4.3 |
| 9 | pressure | 6.2 | 3.6 |
| 9 | pressure | | 9.5 |

2221, 2223, 2225

| time line 40 | | |
|---|---|---|
| sets of emotion parameters | | Score |
| 1 | sets of hormone | 3.6 |
| 2 | sets of pheromones | 2.5 |
| 3 | microexpression | 1.9 |
| 4 | heart rate | 3.8 |
| 5 | sweat | 3.5 |
| 6 | pupil dialator | 2 |
| 7 | reflex movement | 7 |
| 8 | body temperature | 5.5 |
| 9 | pressure | 3.8 |

2222, 2224, 2226, 2227, 2228, 2229

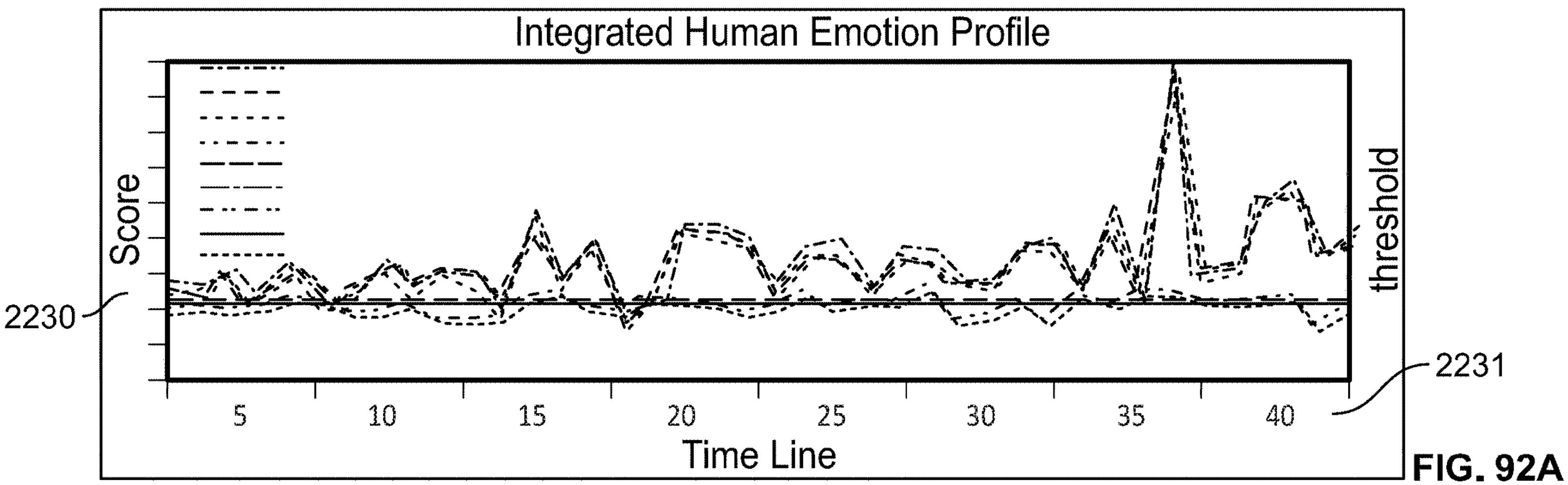

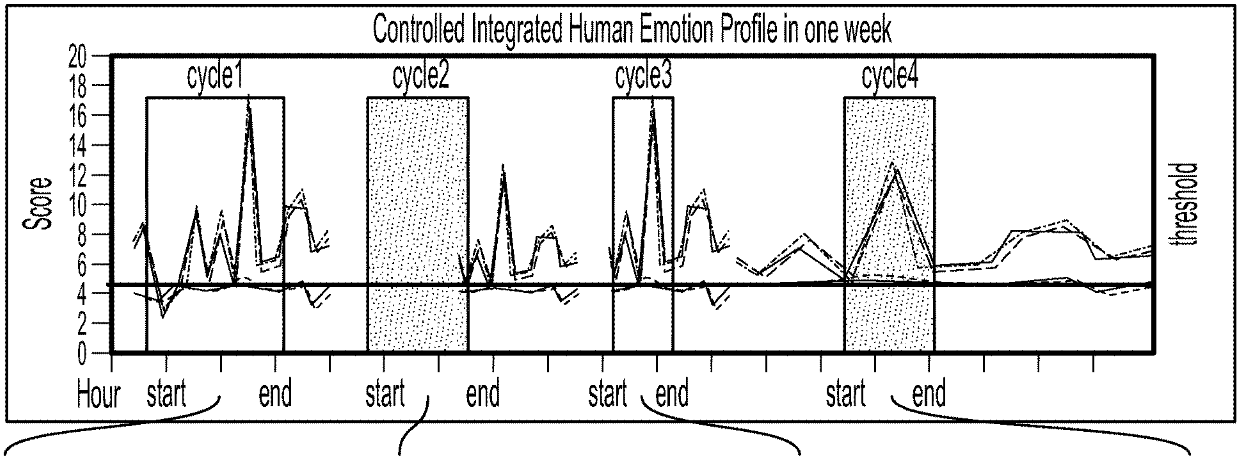

cycle1 start-end recording for 2.8 hours

| start 11:35 end 13:16 | | |
|---|---|---|
| sets of emotion parameters | | Score |
| 1 | hormone | 10 |
| 2 | pheromones | 9.5 |
| 3 | microexpression | 7 |
| 4 | heart rate | 8 |
| 5 | sweat | 8 |
| 6 | pupile dialator | 4.3 |
| 7 | reflex | 3.6 |
| 8 | body temperature | 2.5 |
| 9 | pressure | 6.2 |
| 9 | pressure | 6.2 |
| 9 | pressure | 6.2 |

cycle2 start-end recording for 2 hours

| start 11:35 end 13:16 | | |
|---|---|---|
| sets of emotion parameters | | Score |
| 1 | hormone | 10 |
| 2 | pheromones | 9.5 |
| 3 | microexpression | 7 |
| 4 | heart rate | 8 |
| 5 | sweat | 8 |
| 6 | pupile dialator | 4.3 |
| 7 | reflex | 3.6 |
| 8 | body temperature | 3.6 |
| 9 | pressure | 9.5 |
| 9 | pressure | 9.5 |
| 9 | pressure | 9.5 |

cycle3 start-end recording for 0.8 hours

| start 11:35 end 13:16 | | |
|---|---|---|
| sets of emotion parameters | | Score |
| 1 | hormone | 10 |
| 2 | pheromones | 9.5 |
| 3 | microexpression | 7 |
| 4 | heart rate | 8 |
| 5 | sweat | 8 |
| 6 | pupile dialator | 4.3 |
| 7 | reflex | 3.6 |
| 8 | body temperature | 2.5 |
| 9 | pressure | 6.2 |
| 9 | pressure | 6.2 |
| 9 | pressure | 6.2 |

cycle4 start-end recording for 1.6 hours

| start 11:35 end 13:16 | | |
|---|---|---|
| sets of emotion parameters | | Score |
| 1 | hormone | 10 |
| 2 | pheromones | 9.5 |
| 3 | microexpression | 7 |
| 4 | heart rate | 8 |
| 5 | sweat | 8 |
| 6 | pupile dialator | 4.3 |
| 7 | reflex | 3.6 |
| 8 | body temperature | 3.6 |
| 9 | pressure | 9.5 |
| 9 | pressure | 9.5 |
| 9 | pressure | 9.5 |

FIG. 93

2550
Robotic Human Nursing Care System Process

METHODS AND SYSTEMS FOR FOOD PREPARATION IN A ROBOTIC COOKING KITCHEN

CROSS REFERENCE TO RELATED APPLICATIONS

This application is a divisional of U.S. patent application Ser. No. 14/627,900, filed on 20 Feb. 2015, now issued as U.S. Pat. No. 9,815,191, which claims priority to U.S. Provisional Application Ser. No. 62/116,563 entitled "Method and System for Food Preparation in a Robotic Cooking Kitchen," filed on 16 Feb. 2015, U.S. Provisional Application Ser. No. 62/113,516 entitled "Method and System for Food Preparation in a Robotic Cooking Kitchen," filed on 8 Feb. 2015, U.S. Provisional Application Ser. No. 62/109,051 entitled "Method and System for Food Preparation in a Robotic Cooking Kitchen," filed on 28 Jan. 2015, U.S. Provisional Application Ser. No. 62/104,680 entitled "Method and System for Robotic Cooking Kitchen," filed on 16 Jan. 2015, U.S. Provisional Application Ser. No. 62/090,310 entitled "Method and System for Robotic Cooking Kitchen," filed on 10 Dec. 2014, U.S. Provisional Application Ser. No. 62/083,195 entitled "Method and System for Robotic Cooking Kitchen," filed on 22 Nov. 2014, U.S. Provisional Application Ser. No. 62/073,846 entitled "Method and System for Robotic Cooking Kitchen," filed on 31 Oct. 2014, U.S. Provisional Application Ser. 62/055,799 entitled "Method and System for Robotic Cooking Kitchen," filed on 26 Sep. 2014, U.S. Provisional Application Ser. No. 62/044,677, entitled "Method and System for Robotic Cooking Kitchen," filed on 2 Sep. 2014, U.S. Provisional Application Ser. No. 62/024,948 entitled "Method and System for Robotic Cooking Kitchen," filed on 15 Jul. 2014, U.S. Provisional Application Ser. No. 62/013,691 entitled "Method and System for Robotic Cooking Kitchen," filed on 18 Jun. 2014, U.S. Provisional Application Ser. No. 62/013,502 entitled "Method and System for Robotic Cooking Kitchen," filed on 17 Jun. 2014, U.S. Provisional Application Ser. No. 62/013,190 entitled "Method and System for Robotic Cooking Kitchen," filed on 17 Jun. 2014, U.S. Provisional Application Ser. No. 61/990,431 entitled "Method and System for Robotic Cooking Kitchen," filed on 8 May 2014, U.S. Provisional Application Ser. No. 61/987,406 entitled "Method and System for Robotic Cooking Kitchen," filed on 1 May 2014, U.S. Provisional Application Ser. No. 61/953,930 entitled "Method and System for Robotic Cooking Kitchen," filed on 16 Mar. 2014, and U.S. Provisional Application Ser. No. 61/942,559 entitled "Method and System for Robotic Cooking Kitchen," filed on 20 Feb. 2014, the disclosures of which are incorporated herein by reference in their entireties.

BACKGROUND

Technical Field

The present invention relates generally to the interdisciplinary fields of robotics and artificial intelligence, more particularly to computerized robotic food preparation systems for food preparation by digitizing the food preparation process of professional and non-professional chef dishes and subsequently replicating a chef's cooking movements, processes and techniques with real-time electronic adjustments.

Background Art

Research and development in robotics have been undertaken for decades but the progress has been mostly in the heavy industrial applications like automobile manufacturing automation or military applications. Simple robotics systems have been designed for the consumer markets but have largely not seen a wide application in the home-consumer robotics space thus far. With advances in technology, combined with a population with higher incomes, the market may be ripe to create opportunities for technological advances to improve people's lives. Robotics has continued to improve automation technology with enhanced artificial intelligence and emulation of human skills and tasks in many forms.

The notion of robots replacing humans in certain areas and executing tasks humans would typically perform is an ideology in continuous evolution since robots first were developed in the 1970s. Manufacturing sectors have long used robots in teach-playback mode, where the robot is taught, via pendant or offline fixed-trajectory generation and download, which motions to copy continuously and without alteration or deviation. Companies have taken the pre-programmed trajectory-execution of computer-taught trajectories and robot motion-playback into such application domains as mixing drinks, welding or painting cars, and others. However, all of these conventional applications use a 1:1 computer-to-robot or tech-playback principle that is intended to have only the robot faithfully execute the motion-commands, which is almost always following a taught/pre-computed trajectory without deviation.

Gastronomy is an art of eating well, where a gourmet recipe blends subtly high quality ingredients and flavor appealing to all our senses. Gourmet cooking follows rules based on techniques that can be very elaborate, requiring expertise and technique, and lengthy training in some cases. In the past few years, demand for gourmet food has grown tremendously because of fast rising incomes and a generational shift in culinary awareness. However, diners still need to visit a certain restaurant or venue for gourmet dishes made by a favored chef. It would be rather advantageous to see a chef preparing your favorite dish live in action or experience a dish preparation reminiscent of a childhood dish made by your grandmother.

Accordingly, it would be desirable to have a system and method to have a chef's gourmet dish made and served conveniently to consumers in their own home(s), without the necessity to travel to each restaurant around the world to enjoy specific gourmet dishes.

SUMMARY OF THE INVENTION

Embodiments of the present disclosure are directed to methods, computer program products, and computer systems of a robotic apparatus with robotic instructions replicating a food dish with substantially the same result as if the chef had prepared the food dish. In a first embodiment, the robotic apparatus in a standardized robotic kitchen comprises two robotic arms and hands, which replicate the precise movements of a chef in the same sequence (or substantially the same sequence) and the same timing (or substantially the same timing) to prepare a food dish based on a previously recorded software file (a recipe-script) of the chef's precise movements in preparing the same food dish. In a second embodiment, a computer-controlled cooking apparatus prepares a food dish based on a sensory-curve, such as temperature over time, which was previously recorded in a software file where the chef prepared the same food dish with the cooking apparatus with sensors for which a computer recorded the sensor values over time when the chef previously prepared the food dish on the cooking apparatus fitted with sensors. In a third embodiment, the kitchen apparatus comprises the robotic arms in the first embodiment and the cooking apparatus with sensors in the second embodiment to prepare a dish that combines both the robotic arms and one or more sensory curves, where the robotic arms are capable of quality-checking a food dish during the cooking process, for such characteristics as taste, smell, and appearance, allowing for any cooking adjustments to the preparation steps of the food dish. In a fourth embodiment, the kitchen apparatus comprises a food storage system with computer-controlled containers and container identifiers for storing and supplying ingredients for a user to prepare a food dish by following a chef's cooking instructions. In a fifth embodiment, a robotic cooking kitchen comprises a robot with arms and a kitchen apparatus in which the robot moves around the kitchen apparatus to prepare a food dish by emulating a chef's precise cooking movements, including possible real-time modifications/adaptations to the preparation process defined in the recipe-script.

A robotic cooking engine comprises detection, recording, and chef emulation cooking movements, controlling significant parameters, such as temperature and time, and processing the execution with designated appliances, equipment, and tools, thereby reproducing a gourmet dish that tastes identical to the same dish prepared by a chef and served at a specific and convenient time. In one embodiment, a robotic cooking engine provides robotic arms for replicating a chef's identical movements with the same ingredients and techniques to produce an identical tasting dish.

The underlying motivation of the present disclosure centers around humans being monitored with sensors during their natural execution of an activity and then being able to use monitoring-sensors, capturing-sensors, computers and software to generate information and commands to replicate the human activity using one or more robotic and/or automated systems. While one can conceive of multiple such activities (e.g. cooking, painting, playing an instrument, etc.), one aspect of the present disclosure is directed to the cooking of a meal; in essence a robotic meal preparation application. Monitoring the human is carried out in an instrumented application-specific setting (a standardized kitchen in this case), and involves using sensors and computers to watch, monitor, record and interpret the motions and actions of a human chef, in order to develop a robot-executable set of commands robust to variations and changes in the environment, capable of allowing a robotic or automated system in a robotic kitchen to prepare the same dish to the standards and quality as the dish prepared by the human chef.

The use of multimodal sensing systems is the means by which the necessary raw data is collected. Sensors capable of collecting and providing such data include environment and geometrical sensors, such as two- (cameras, etc.) and three-dimensional (lasers, sonar, etc.) sensors, as well as human motion-capture systems (human-worn camera-targets, instrumented suits/exoskeletons, instrumented gloves, etc.), as well as instrumented (sensors) and powered (actuators) equipment used during recipe creation and execution (instrumented appliances, cooking-equipment, tools, ingredient dispensers, etc.). All this data is collected by one or more distributed/central computers and processed by a variety of software processes. The algorithms will process and abstract the data to the point that a human and a computer-controlled robotic kitchen can understand the activities, tasks, actions, equipment, ingredients and methods and processes used by the human, including replication of key skills of a particular chef. The raw data is processed by one or more software abstraction engines to create a recipe-script that is both human-readable and, through further processing, machine-understandable and machine-executable, spelling out all actions and motions for all steps of a particular recipe that a robotic kitchen would have to execute. These commands range in complexity from controlling individual joints, to a particular joint-motion profile over time, to abstracted levels of commands, with lower-level motion-execution commands embedded therein, associated with specific steps in a recipe. Abstracted motion-commands (e.g. "crack an egg into the pan", "sear to a golden color on both sides", etc.) can be generated from the raw data, and refined and optimized through a multitude of iterative learning processes, carried out live and/or off-line, allowing the robotic kitchen systems to successfully deal with measurement-uncertainties, ingredient variations, etc., enabling complex (adaptive) mini-manipulation motions using fingered-hands mounted to robot-arms and wrists, based on fairly abstracted/high-level commands (e.g. "grab the pot by the handle", "pour out the contents", "grab the spoon off the countertop and stir the soup", etc.).

The ability to create machine-executable command sequences, now contained within digital files capable of being shared/transmitted, allowing any robotic kitchen to execute them, opens up the option to execute the dish-preparation steps anywhere at any time. Hence it allows for the option to buy/sell recipes online, allowing users to access and distribute recipes on a per-use or subscription basis.

The replication of a dish prepared by a human is performed by a robotic kitchen, which is in essence a standardized replica of the instrumented kitchen used by the human chef during the creation of the dish, except that the human's actions are now carried out by a set of robotic arms and handtheed by computer-monitored and computer-controllable appliances, equipment, tools, dispensers, etc. The degree of dish-replication fidelity will thus be tightly tied to the degree to which the robotic kitchen is a replica of the kitchen (and all its elements and ingredients) in which the human chef was observed while preparing the dish.

Broadly stated, there may be provided a computer-implemented method operating on a robotic apparatus, comprising an electronic description of one or more food dishes, including the recipes for making each food dish from ingredients by a chef; for each food dish, sensing a sequence of observations of a chef's movements by a plurality of robotic sensors as the chef prepares the food dish using ingredients and kitchen equipment; detecting in the sequence of observations mini-manipulations corresponding to a sequence of movements carried out in each stage of preparing a particular food dish; transforming the sensed sequence of observations into computer readable instructions for controlling a robotic apparatus capable of performing the sequences of mini-manipulations; storing at least the sequence of instructions for mini-manipulations on electronic media for each food dish, wherein the sequence of mini-manipulations for each food dish is stored as a respective electronic record; transmitting the respective electronic record for a food dish to a robotic apparatus capable of replicating the sequence of stored mini-manipulations, corresponding to the original actions of the chef; and executing the sequence of instructions for mini-manipulations for a particular food dish by the robotic apparatus, thereby obtaining substantially the same result as the original food dish prepared by the chef, wherein executing the instructions includes sensing properties of the ingredients used in preparing the food dish.

Advantageously, the robotic apparatus in a standardized robotic kitchen has the capabilities to prepare a wide array of cuisines from around the world through a global network and database access, as compared to a chef who may specialize in one type of cuisine. The standardized robotic kitchen also is able to capture and record one of your favorite food dishes for replication by the robotic apparatus whenever you like to enjoy the food dish without the repetitive process of laboring to prepare the same dish over and over again.

The structures and methods of the present invention are disclosed in the detailed description below. This summary does not purport to define the invention. The invention is defined by the claims. These and other embodiments, features, aspects, and advantages of the invention will become better understood with regard to the following description, appended claims, and accompanying drawings.

BRIEF DESCRIPTION OF THE DRAWINGS

The invention will be described with respect to specific embodiments thereof, and reference will be made to the drawings, in which:

FIG. 18F is a block diagram illustrating the robotic hand uses the standardized kitchen handle that is attachable to a cookware head and the robotic arm attachable to kitchen ware in accordance with the present invention.

FIG. 29 is a table illustrating a database library structure of mini-manipulations objects for use in the standardized robotic kitchen in accordance with the present invention.

FIG. 30 is a table illustrating a database library structure of standardized objects for use in the standardized robotic kitchen in accordance with the present invention.

FIG. 38 is a block diagram illustrating a recipe search menu by selecting fields for use in the standardized robotic kitchen in accordance with the present invention.

FIG. 48 is a block diagram illustrating an elevation view of the program storage system for use with the standardized robotic kitchen in accordance with the present invention.

FIG. 50 is a block diagram illustrating an ingredient quality monitoring dashboard associated with ingredient access containers for use with the standardized robotic kitchen in accordance with the present invention.

FIG. 51 is a table illustrating a database library of recipe parameters in accordance with the present invention.

FIGS. 64A-B are block diagrams illustrating an example of a predefined recipe search criterion in accordance with the present invention.

FIG. 65 is a block diagram illustrating some pre-defined containers in the robotic kitchen in accordance with the present invention.

FIG. 92A is a block diagram illustrating the emotional detection and analysis of a person's emotional state by monitoring a set of hormones, a set of pheromones, and other key parameters in accordance with the present invention.

DETAILED DESCRIPTION

Figure 1:
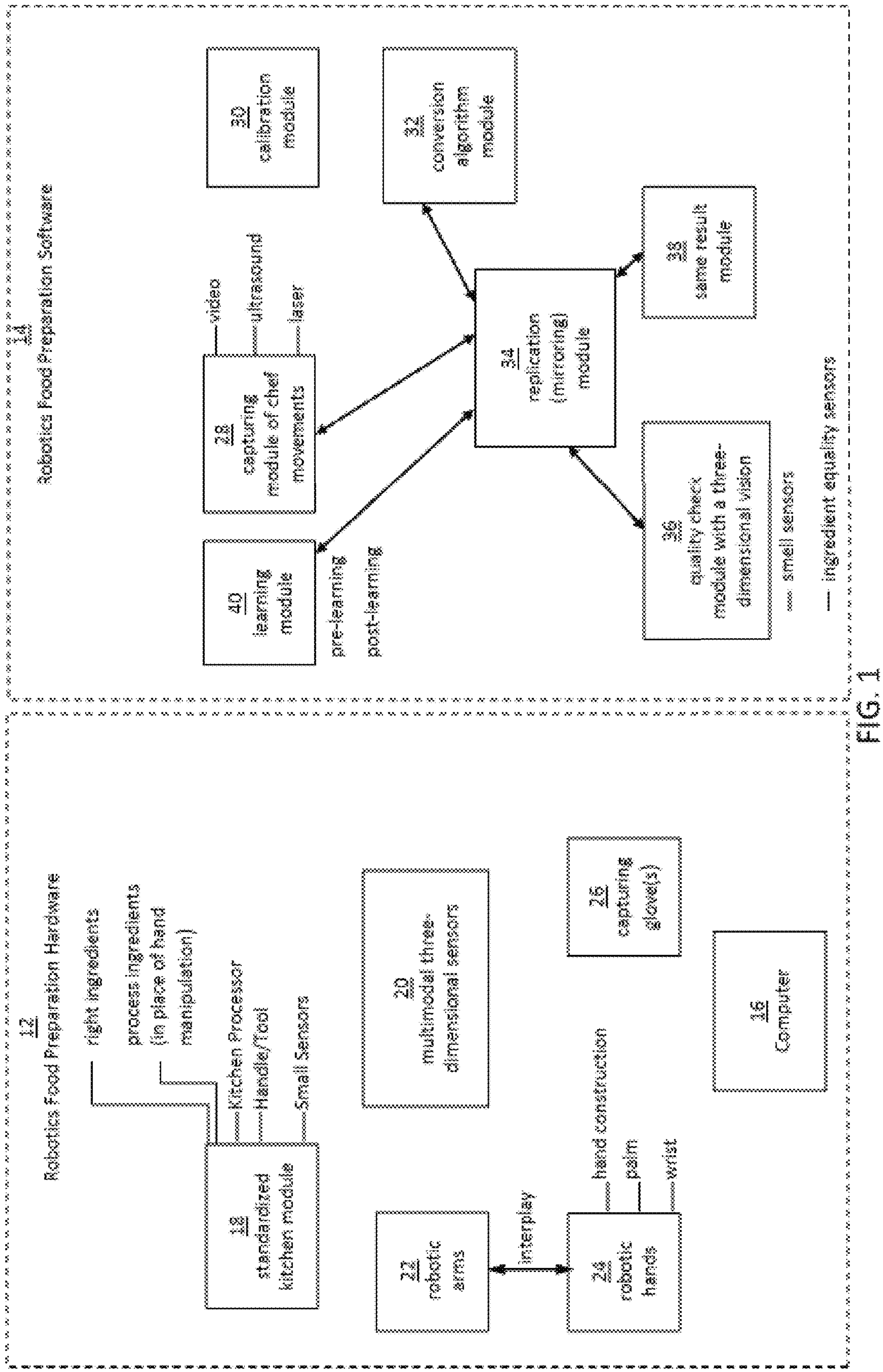
FIG. 1 is a system diagram illustrating an overall robotic food preparation kitchen with hardware and software in accordance with the present invention.
Figure 100:
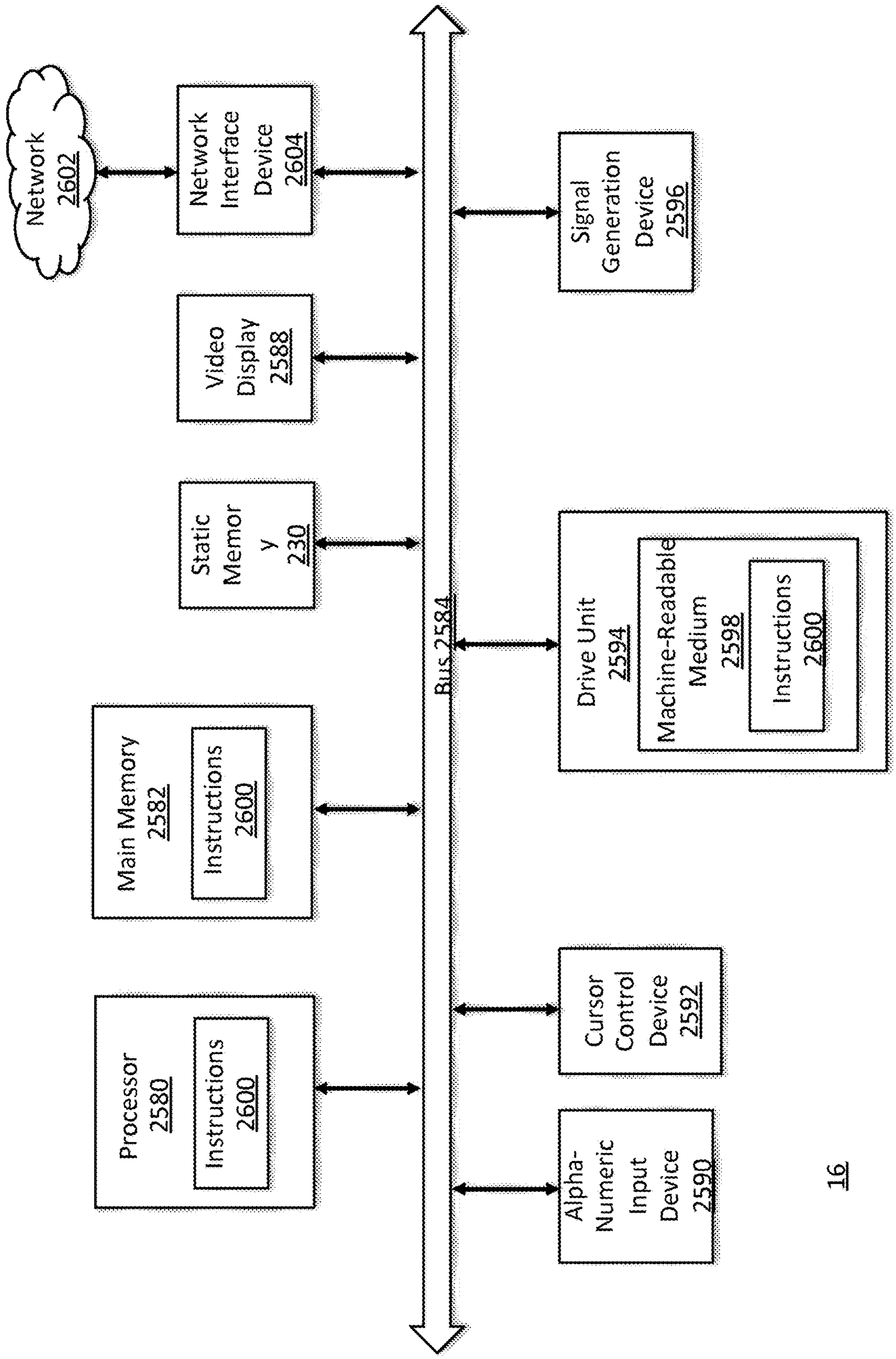
FIG. 100 is a block diagram illustrating an example of a computer device on which computer-executable instructions to perform the robotic methodologies discussed herein may be installed and executed.

A description of structural embodiments and methods of the present invention is provided with reference to FIGS. 1-100. It is to be understood that there is no intention to limit the invention to the specifically disclosed embodiments but that the invention may be practiced using other features, elements, methods, and embodiments. Like elements in various embodiments are commonly referred to with like reference numerals.

The following definitions apply to the elements and steps described herein. These terms may likewise be expanded upon.

Abstracted Data—refers to the abstracted recipe of utility for machine-execution which has many other data-elements that a machine needs to know for proper execution and replication. This so-called meta-data, or additional data corresponding to a particular step in the cooking process, whether it be direct sensor-data (clock-time, water-temperature, camera-image, utensil or ingredient used, etc.) or data generated through interpretation or abstraction of larger data-sets (such as a 3-dimensional range cloud from a laser used to extract the location and types of objects in the image, overlaid with texture and color maps from a camera-picture, etc.), is time-stamped and used by the robotic kitchen to set, control and monitor all processes and associated methods and equipment needed at every point in time as it steps through the sequence of steps in the recipe.

Abstracted Recipe—refers to a representation of a chef's recipe, which a human knows as represented by the use of certain ingredients, in certain sequences, prepared and combined through a sequence of processes and methods as well as skills of the human chef. An abstracted recipe used by a machine for execution in an automated way requires different types of classifications and sequences. While the overall steps carried out are identical to those of the human chef, the abstracted recipe of utility to the robotic kitchen requires that additional meta-data be a part of every step in the recipe. Such meta-data includes the cooking time, variables such as temperature (and its variations over time), oven-setting, tool/equipment used, etc. Basically a machine-executable recipe-script needs to have all possible measured variables of import to the cooking process (all measured and stored while the human chef was preparing the recipe in the chef studio) correlated to time, both overall and that within each process-step of the cooking-sequence. Hence the abstracted recipe is a representation of the cooking steps mapped into a machine-readable representation or domain, which takes the required process from the human-domain to that of the machine-understandable and machine-executable domain through a set of logical abstraction steps.

Acceleration—refers to the maximum rate of speed-change at which a robotic arm can accelerate around an axis or along a space-trajectory over a short distance.

Accuracy—refers to how closely a robot can reach a commanded position. Accuracy is determined by the difference between the absolute position of the robot compared to the commanded position. Accuracy can be improved, adjusted, or calibrated with external sensing such as sensors on a robotic hand or a real-time three-dimensional model using multiple (multi-mode) sensors.

Action Primitive—In one embodiment, the term refers to an indivisible robotic action, such as moving the robotic apparatus from location X1 to location X2, or sensing the distance from an object for food preparation without necessarily obtaining a functional outcome. In another embodiment, the term refers to an indivisible robotic action in a sequence of one or more such units for accomplishing a mini-manipulation. These are two aspects of the same definition.

Automated Dosage System—refers to dosage containers in a standardized kitchen module where a particular size of food chemical compounds (such as salt, sugar, pepper, spice, any kind of liquids, such as water, oil, essences, ketchup, etc.) that is released upon application.

Automated Storage and Delivery System—refers to storage containers in a standardized kitchen module that maintain a specific temperature and humidity for storing food; each storage container is assigned a code (e.g., a bar code) for the robotic kitchen to identify and retrieval where a particular storage container delivers the food contents stored therein.

Data Cloud—refers to a collection of sensor or data-based numerical measurement values from a particular space (three-dimensional laser/acoustic range measurement, RGB-values from a camera image, etc.) collected at certain intervals and aggregated based on a multitude of relationships, such as time, location, etc.

Degree of Freedom ("DOF")—refers to a defined mode and/or direction in which a mechanical device or system can move. The number of degrees of freedom is equal to the total number of independent displacements or aspects of motion. The total number of degrees of freedom is doubled for two robotic arms.

Edge Detection—refers to a software-based computer program(s) capable of identifying the edges of multiple objects that may be overlapping in a two-dimensional-image of a camera yet successfully identifying their boundaries to aid in object identification and planning for grasping and handling.

Equilibrium Value—refers to the target position of a robotic appendage, such as a robotic arm where the forces acting upon it are in equilibrium, i.e. there is no net force and thus no net movement.

Execution Sequence Planner—refers to a software-based computer program(s) capable of creating a sequence of execution scripts or commands for one or more elements or systems capable of being computer controlled, such as arm(s), dispensers, appliances, etc.

Food Execution Fidelity—refers to a robotic kitchen which is intended to replicate the recipe-script generated in the chef studio by watching and measuring and understanding the steps and variables and methods and processes of the human chef, thereby trying to emulate his/her techniques and skills. The fidelity of how close the execution of the dish-preparation comes to that of the human-chef is measured by how close the robotically-prepared dish resembles the human-prepared dish as measured by a variety of subjective elements, such as consistency, color, taste, etc. The notion is that, the more closely the dish prepared by the robotic kitchen is to that prepared by the human chef, the higher the fidelity of the replication process.

Food Preparation Stage (also referred to as "Cooking stage")—refers to a combination, either sequential or in parallel, of one or more mini-manipulations including action primitives, and computer instructions for controlling the various kitchen equipment and appliances in the standardized kitchen module; one or more food preparation stages collectively represent the entire food preparation process for a particular recipe.

Geometric Reasoning—refers to a software-based computer program(s) capable of using two-dimensional (2D)/three-dimensional (3D) surface- and/or volumetric data to reason as to the actual shape and size of a particular volume; the ability to determine or utilize boundary information also allows for inferences as to the start end of a particular geometric element and the number present (in an image or model).

Grasp Reasoning—refers to a software-based computer program(s) capable of relying on geometric and physical reasoning to plan a multi-contact (point/area/volume) contact-interaction between a robotic end-effector (gripper, link, etc.), or even tools/utensils held by the end-effector, so as to successfully and stably contact, grasp and hold the object in order to manipulate it in three-dimensional space.

Hardware Automation Device—Fixed process device capable of executing pre-programmed steps in succession without the ability to modify any of them; such devices are used for repetitive motions that are not in need of any modulation.

Ingredient management and manipulation—refers to defining each ingredient in detail (including size, shape, weight, dimensions, characteristics and properties), one or more real-time adjustments in the variables associated with the particular ingredient that may differ from the previous stored ingredient details (such as the size of a fish fillet, the dimensions of an egg, etc.), and the process in executing the different stages for the manipulation movements to an ingredient.

Kitchen Module (or Kitchen Volume)—a standardized full kitchen module with standardized sets of kitchen equipment, standardized sets of kitchen tools, standardized sets of kitchen handles, and standardized sets of kitchen containers, with predefined space and dimensions for storing, accessing, and operating each kitchen element in the standardized full kitchen module. One objective of a kitchen module is to predefine as much of the kitchen equipment, tools, handles, containers, etc. as possible so as to provide a relatively fixed kitchen platform for the movements of robotic arms and hands. Both a chef in the chef kitchen studio and a person at home with a robotic kitchen (or a person at a restaurant) uses the standardized kitchen module so as to maximize the predictability of the kitchen hardware, while minimizing the risks of differentiations, variations and deviations between the chef kitchen studio and a home robotic kitchen. Different embodiments of the kitchen module are possible, including a standalone kitchen module and an integrated kitchen module. The integrated kitchen module is fitted into a conventional kitchen area of a typical house. The kitchen module operates in at least two modes, a robotic mode and a normal (manual) mode.

Machine Learning—refers to the technology wherein a software component or program improves its performance based on experience and feedback. One kind of machine learning is reinforcement learning, often used in robotics, where desirable actions are rewarded and undesirable ones are penalized. Another kind is case-based learning, where previous solutions, e.g. sequences of actions by a human teacher or by the robot itself are remembered, together with any constraints or reasons for the solutions, and then are applied or reused in new settings. There are also additional kinds of machine learning, such as inductive and transductive methods.

Mini-Manipulation—refers to a combination (or a sequence) of one or more steps that accomplish a basic functional outcome with a threshold value of the highest level of probability (examples of threshold value as within 0.1, 0.001, or 0.001 of the optimal value). Each step can be an action primitive or another (smaller) mini-manipulation, similar to a computer program comprised of basic coding steps and other computer programs that may stand alone or serve as sub-routines. For instance, a mini-manipulation can be grasping an egg, comprised of the motor actions required for reaching out a robotic arm moving the robotic fingers into the right configuration, and applying the correct delicate amount of force for grasping—all primitive actions. Another mini-manipulation can be breaking-an-egg-with-a-knife, including the grasping mini-manipulation, followed with one robotic hand, followed by grasping-a-knife mini-manipulation with the other hand, followed by the primitive action of striking the egg with the knife using a predetermined force.

Model Elements and Classification—refers to one or more software-based computer program(s) capable of understanding elements in a scene as being items that are used or needed in different parts of a task; such as a bowl for mixing and the need for a spoon to stir, etc. Multiple elements in a scene or a world-model may be classified into groupings allowing for faster planning and task-execution.

Motion Primitives—refers to motion actions that define different levels/domains of detailed action steps, e.g. a high level motion primitive would be to grab a cup, and a low level motion primitive would be to rotate a wrist by five degrees.

Multimodal Sensing Unit—refers to a sensing unit comprised of multiple sensors capable of sensing and detection in multiple modes or electromagnetic bands or spectra, particularly capable of capturing three-dimensional position and/or motion information; the electromagnetic spectrum can range from low to high frequencies and need not be limited to that perceivable by a human being. Additional modes might include, but are not limited to, other physical senses such as touch, smell, etc.

Number of Axes—three axes are required to reach any point in space. To fully control the orientation of the end of the arm (i.e. the wrist), three additional rotational axes (yaw, pitch, and roll) are required.

Parameters—refers to variables that can take numerical values or ranges of numerical values. Three kinds of parameters are particularly relevant: parameters in the instructions to a robotic device (e.g. the force or distance in an arm movement), user settable parameters (e.g. prefers meat well done vs. medium), and chef-defined parameters (e.g. set oven temperature to 350 F).

Parameter adjustment—refers to the process of changing the values of parameters based on inputs. For instance changes in the parameters of instructions to the robotic device can be based on the properties (e.g. size, shape, orientation) of, but not limited to, the ingredients, position/orientation of kitchen tools, equipment, appliances, speed, and time duration of a mini-manipulation.

Payload or carrying capacity—refers to how much weight a robotic arm can carry and hold (or even accelerate) against the force of gravity, as a function of its endpoint location.

Physical Reasoning—refers to a software-based computer program(s) capable of relying on geometrically-reasoned data and using physical information (density, texture, typical geometry and shape) to assist an inference-engine (program) to better model the object and also predict its behavior in the real world, particularly when grasped and/or manipulated/handled.

Raw Data—refers to all measured and inferred sensory-data and representation information that is collected as part of the chef-studio recipe-generation process while watching/monitoring a human chef preparing a dish. Raw data can range from a simple data-point such as clock-time, to oven temperature (over time), camera-imagery, three-dimensional laser-generated scene representation data, to appliances/equipment used, tools employed, ingredients (type and amount) dispensed and when, etc. All the information the studio-kitchen collects from its built-in sensors and stores in raw, time-stamped form is considered raw data. Raw data is then used by other software processes to generate an even higher level of understanding and recipe-process understanding, turning raw data into additional time-stamped processed/interpreted data.

Robotic Apparatus—refers the set of robotic sensors and effectors. The effectors comprise one or more robotic arms, and one or more robotic hands for operation in the standardized robotic kitchen. The sensors comprise cameras, range sensors, force sensors (haptic sensors) that transmit their information to the processor or set of processors that control the effectors.

Recipe Cooking Process—refers to a robotic script containing abstract and detailed levels of instructions to a collection of programmable and hard automation devices, so as to allow computer-controllable devices to execute a sequenced operation within its environment (e.g. a kitchen replete with ingredients, tools, utensils and appliances).

Recipe Script—refers to a recipe script as a sequence in time containing a structure and a list of commands and execution primitives (simple to complex command software) that, when executed by the robotic kitchen elements (robot-arm, automated equipment, appliances, tools, etc.) in a given sequence, should result in the proper replication and creation of the same dish as prepared by the human chef in the studio-kitchen. Such a script is sequential in time and equivalent to the sequence employed by the human chef to create the dish, albeit in a representation that is suitable and understandable by the computer-controlled elements in the robotic kitchen.

Recipe Speed Execution—refers to managing a timeline in the execution of recipe steps in preparing a food dish by replicating a chef's movements, where the recipe steps include standardized food preparation operations (e.g., standardized cookware, standardized equipment, kitchen processors, etc.), mini-manipulations, and cooking of non-standardized objects.

Repeatability—refers to an acceptable preset margin in how accurately the robotic arms/hands can repeatedly return to a programmed position. If the technical specification in a control memory requires the robotic hand to move to a certain X-Y-Z position and within +/−0.1 mm of that position, then the repeatability is measured for the robotic hands to return to within +/−0.1 mm of the taught and desired/commanded position.

Robotic Recipe Script—refers to a computer-generated sequence of machine-understandable instructions related to the proper sequence of robotically/hard-automation execution of steps to mirror the required cooking steps in a recipe to arrive at the same end-product as if cooked by a chef.

Robotic Costume—External instrumented device(s) or clothing, such as gloves, clothing with camera-trackable markers, jointed exoskeleton, etc., used in the chef studio to monitor and track the movements and activities of the chef during all aspects of the recipe cooking process(es).

Scene Modeling—refers to a software-based computer program(s) capable of viewing a scene in one or more cameras' fields of view, and being capable of detecting and identifying objects of importance to a particular task. These objects may be pre-taught and/or be part of a computer library with known physical attributes and usage-intent.

Smart Kitchen Cookware/Equipment—refers to an item of kitchen cookware (e.g., a pot or a pan) or an item of kitchen equipment (e.g., an oven, a grill, or a faucet) with one or more sensors that prepares a food dish based on one or more graphical curves (e.g., a temperature curve, a humidity curve, etc.).

Software Abstraction Food Engine—refers to a software engine that is defined as a collection of software loops or programs, acting in concert to process input data and create a certain desirable set of output data to be used by other software engines or an end-user through some form of textual or graphical output interface. An abstraction software engine is a software program(s) focused on taking a large and vast amount of input data from a known source in a particular domain (such as three-dimensional range measurements that form a data-cloud of three-dimensional measurements as seen by one or more sensors), and then processing the data to arrive at interpretations of the data in a different domain (such as detecting and recognizing a table-surface in a data-cloud based on data having the same vertical data value, etc.), in order to identify, detect and classify data-readings as pertaining to an object in three-dimensional space (such as a table-top, cooking pot, etc.). The process of abstraction is basically defined as taking a large data set from one domain and inferring structure (such as geometry) in a higher level of space (abstracting data points), and then abstracting the inferences even further and identifying objects (pots, etc.) out of the abstracted data-sets to identify real-world elements in an image, which can then be used by other software engines to make additional decisions (handling/manipulation decisions for key objects, etc.). A synonym for "software abstraction engine" in this application could be also "software interpretation engine" or even "computer-software processing and interpretation algorithm".

Task Reasoning—refers to a software-based computer program(s) capable of analyzing a task-description and breaking it down into a sequence of multiple machine-executable (robot or hard-automation systems) steps so as to achieve a particular end result defined in the task description.

Three-dimensional World Object Modeling and Understanding—refers to a software-based computer program(s) capable of using sensory data to create a time-varying three-dimensional model of all surfaces and volumes so as to enable it to detect, identify and classify objects within the same and understand their usage and intent.

Torque vector—refers to the torsion force upon a robotic appendage including its direction and magnitude.

Volumetric Object Inference (Engine)—refers to a software-based computer program(s) capable of using geometric data and edge-information as well as other sensory data (color, shape, texture, etc.) to allow for identification of three-dimensionality of one or more objects to aid in the object identification and classification process.

FIG. 1 is a system diagram illustrating an overall robotic food preparation kitchen 10 with robotics hardware 12 and robotics software 14. The overall robotics food preparation kitchen 10 comprises robotics food preparation hardware 12 and robotics food preparation software 14 that operate together to perform the robotics functions for food preparation. The robotic food preparation hardware 12 includes a computer 16 that controls the various operations and movements of a standardized kitchen module 18 (which generally operate in an instrumented environment with one or more sensors) multimodal three-dimensional sensors 20, robotic arms 22, robotic hands 24 and capturing gloves 26. The robotic food preparation software 14 operates with the robotics food preparation hardware 12 to capture a chef's movements in preparing a food dish and replicating the chef's movements via robotics arms and hands to obtain the same result or substantially the same result (e.g., taste the same, smell the same, etc.) of the food dish that would taste the same or substantially the same as if the food dish was prepared by a human chef.

The robotic food preparation software 14 includes the multimodal three-dimensional sensors 20, a capturing module 28, a calibration module 30, a conversion algorithm module 32, a replication module 34, a quality check module 36 with a three-dimensional vision system, a same result module 38, and a learning module 40. The capturing module 28 captures the movements of the chef as the chef prepares a food dish. The calibration module 30 calibrates the robotic arms 22 and robotic hands 24 before, during and after the cooking process. The conversion algorithm module 32 is configured to convert the recorded data from a chef's movements collected in the chef studio into recipe modified data (or transformed data) for use in a robotic kitchen where robotic hands replicate the food preparation of the chef's dish. The replication module 34 is configured to replicate the chef's movements in a robotic kitchen. The quality check module 36 is configured to perform quality check functions of a food dish prepared by the robotic kitchen during, prior to, or after the food preparation process. The same result module 38 is configured to determine whether the food dish prepared by a pair of robotic arms and hands in the robotic kitchen would taste the same or substantially the same as if prepared by the chef. The learning module 40 is configured to provide learning capabilities to the computer 16 that operates the robotic arms and hands.

Figure 2:
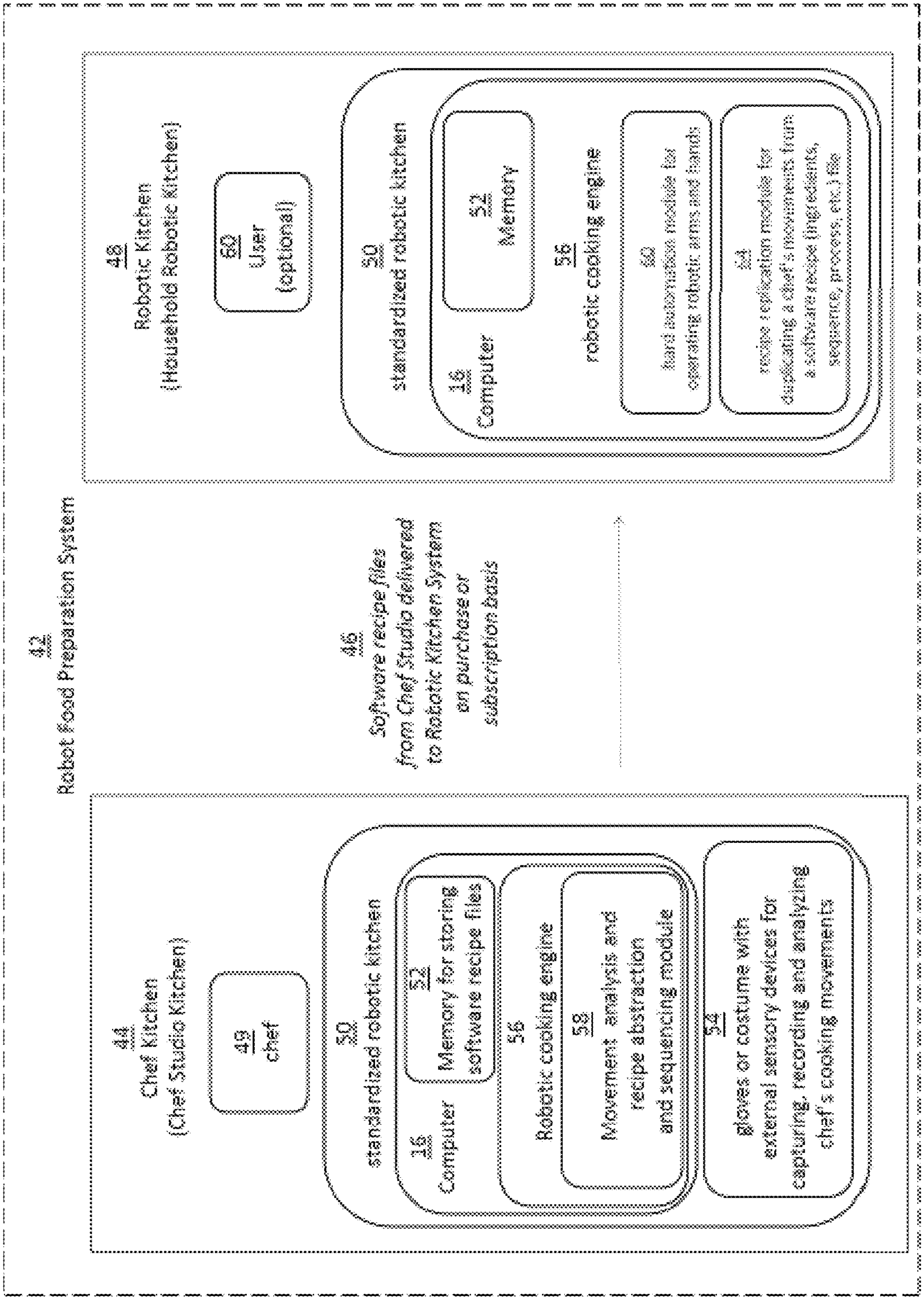
FIG. 2 is a system diagram illustrating a first embodiment of a food robot cooking system that includes a chef studio system and a household robotic kitchen system in accordance with the present invention.

FIG. 2 is a system diagram illustrating a first embodiment of a food robot cooking system that includes a chef studio system and a household robotic kitchen system for preparing a dish by replicating a chef's recipe process and movements. The robotic kitchen cooking system 42 comprises a chef kitchen 44 (also referred to as "chef studio-kitchen") which transfers one or more software recorded recipe files 46 to a robotic kitchen 48 (also referred to as "household robotic kitchen"). In one embodiment, both the chef kitchen 44 and the robotic kitchen 48 use the same standardized robotic kitchen module 50 (also referred as "robotic kitchen module", "robotic kitchen volume", or "kitchen module", or "kitchen volume") to maximize the precise replication of preparing a food dish, which reduces the variables that may contribute to deviations between the food dish prepared at the chef kitchen 44 and the one prepared by the robotic kitchen 46. A chef 52 wears robotic gloves or a costume with external sensory devices for capturing and recording the chef's cooking movements. The standardized robotic kitchen 50 comprises a computer 16 for controlling various computing functions, where the computer 16 includes a memory 52 for storing one or more software recipe files from the sensors of the gloves or costumes 54 for capturing a chef's movements, and a robotic cooking engine (software) 56. The robotic cooking engine 56 includes a movement analysis and recipe abstraction and sequencing module 58. The robotic kitchen 48 typically operates with a pair of robotic arms and hands, with an optional user 60 to turn on or program the robotic kitchen 46. The computer 16 in the robotic kitchen 48 includes a hard automation module 62 for operating robotic arms and hands, and a recipe replication module 64 for replicating a chef's movements from a software recipe (ingredients, sequence, process, etc.) file.

The standardized robotic kitchen 50 is designed for detecting, recording and emulating a chef's cooking movements, controlling significant parameters such as temperature over time, and process execution at robotic kitchen stations with designated appliances, equipment and tools. The chef kitchen 44 provides a computing kitchen environment 16 with gloves with sensors or a costume with sensors for recording and capturing a chef's 50 movements in the food preparation for a specific recipe. Upon recording the movements and recipe process of the chef 49 for a particular dish into a software recipe file in memory 52, the software recipe file is transferred from the chef kitchen 44 to the robotic kitchen 48 via a communication network 46, including a wireless network and/or a wired network connected to the Internet, so that the user (optional) 60 can purchase one or more software recipe files or the user can be subscribed to the chef kitchen 44 as a member that receives new software recipe files or periodic updates of existing software recipe files. The household robotic kitchen system 48 serves as a robotic computing kitchen environment at residential homes, restaurants, and other places in which the kitchen is built for the user 60 to prepare food. The household robotic kitchen system 48 includes the robotic cooking engine 56 with one or more robotic arms and hard-automation devices for replicating the chef's cooking actions, processes and movements based on a received software recipe file from the chef studio system 44.

The chef studio 44 and the robotic kitchen 48 represent an intricately linked teach-playback system, which has multiple levels of fidelity of execution. While the chef studio 44 generates a high-fidelity process model of how to prepare a professionally cooked dish, the robotic kitchen 48 is the execution/replication engine/process for the recipe-script created through the chef working in the chef studio. Standardization of a robotic kitchen module is a means to increase performance fidelity and success/guarantee.

The varying levels of fidelity for recipe-execution depend on the correlation of sensors and equipment (besides of course the ingredients) between those in the chef studio 44 and that in the robotic kitchen 48. Fidelity can be defined as a dish tasting identical to that prepared by a human chef (indistinguishably so) at one of the (perfect replication/execution) ends of the spectrum, while at the opposite end the dish could have one or more substantial or fatal flaws with implications to quality (overcooked meat or pasta), taste (burnt elements), edibility (incorrect consistency) or even health-implications (undercooked meat such as chicken/pork with salmonella exposure, etc.).

A robotic kitchen that has identical hardware and sensors and actuation systems that can replicate the movements and processes akin to those by the chef that were recorded during the chef-studio cooking process is more likely to result in a higher fidelity outcome. The implication here is that the setups need to be identical, which has a cost and volume implication. The robotic kitchen 48 can however still be implemented using more standardized non-computer-controlled or computer-monitored elements (pots with sensors, networked appliances such as ovens, etc.), requiring more sensor-based understanding to allow for more complex execution monitoring. Since uncertainty has now increased as to key elements (correct amount of ingredients, cooking temperatures, etc.) and processes (use of stirrer/masher in case a blender is not available in a robotic home kitchen), the guarantees of having an identical outcome to that from the chef will undoubtedly be lower.

An emphasis in the present disclosure is that the notion of a chef studio 44 coupled with a robotic kitchen is a generic concept. The level of the robotic kitchen 48 is variable all the way from a home-kitchen outfitted with a set of arms and environmental sensors, all the way to an identical replica of the studio-kitchen, where a set of arms and articulated motions, tools and appliances and ingredient-supply can replicate the chef's recipe in an almost identical fashion. The only variable to contend with will be the quality-degree of the end-result or dish in terms of quality, looks, taste, edibility and health.

A potential method to mathematically describe this correlation between the recipe-outcome and the input variables in the robotic kitchen can best be described by the function below:

$$F_{recipe\text{-}outcome}=F_{studio}(I,E,P,M,V)+F_{RobKit}(E_f,I,R_e,P_{mf})$$

where $F_{studio}$=Recipe Script Fidelity of Chef-Studio $F_{RobKit}$=Recipe Script Execution by Robotic Kitchen I=Ingredients E=Equipment P=Processes M=Methods V=Variables (Temperature, Time, Pressure, etc.)

$E_f$=Equipment Fidelity $R_e$=Replication Fidelity $P_{mf}$=Process Monitoring Fidelity The above equation relates the degree to which the outcome of a robotically-prepared recipe matches that a human chef would prepare and serve ($F_{recipe\text{-}outcome}$) to the level that the recipe was properly captured and represented by the chef studio 44 ($F_{studio}$) based on the ingredients (I) used, the equipment (E) available to execute the chef's processes (P) and methods (M) by properly capturing all the key variables (V) during the cooking process; and how the robotic kitchen is able to represent the replication/execution process of the robotic recipe script by a function ($F_{RobKit}$) that is primarily driven by the use of the proper ingredients (I), the level of equipment fidelity ($E_f$) in the robotic kitchen compared to that in the chef studio, the level to which the recipe-script can be replicated ($R_e$) in the robotic kitchen, and to what extent there is an ability and need to monitor and execute corrective actions to achieve the highest process monitoring fidelity ($P_{mf}$) possible.

The functions ($F_{studio}$) and ($F_{RobKit}$) can be any combination of linear or non-linear functional formulas with constants, variables and any form of algorithmic relationships. An example for such algebraic representations for both functions could be.

$$F_{studio}=I(fct.\ \sin(Temp))+E(fct.\ Cooptop1*5)+P(fct.\ Circle(spoon)+V(fct.\ 0.5*time)$$

Delineating that the fidelity of the preparation process is related to the temperature of the ingredient which varies over time in the refrigerator as a sinusoidal function, the speed with which an ingredient can be heated on the cooktop on specific station at a particular multiplicative rate, and related to how well a spoon can be moved in a circular path of a certain amplitude and period, and that the process needs to be carried out at no less than ½ the speed of the human chef for the fidelity of the preparation process to be maintained.

$$F_{RobKit}=E_f(Cooktop2,Size)+I(1.25*Size+Linear(Temp))+R_e(Motion\text{-}Profile)+P_{mf}(Sensor\text{-}Suite\ Correspondence)$$

Delineating that the fidelity of the replication process in the robotic kitchen is related to the appliance type and layout for a particular cooking-area and the size of the heating-element, the size and temperature profile of the ingredient being seared and cooked (thicker steak requiring more cooking time), while also preserving the motion-profile of any stirring and bathing motions of a particular step like searing or mousse-beating, and whether the correspondence between sensors in the robotic kitchen and the chef-studio is sufficiently high to trust the monitored sensor data to be accurate and detailed enough to provide a proper monitoring fidelity of the cooking process in the robotic kitchen during all steps in a recipe.

The outcome of a recipe is not only a function of what fidelity the human chef's cooking steps/methods/process/skills were captured with by the chef studio, but also with what fidelity these can be executed by the robotic kitchen, where each of them has key elements that impact their respective subsystem performance.

Figure 3:
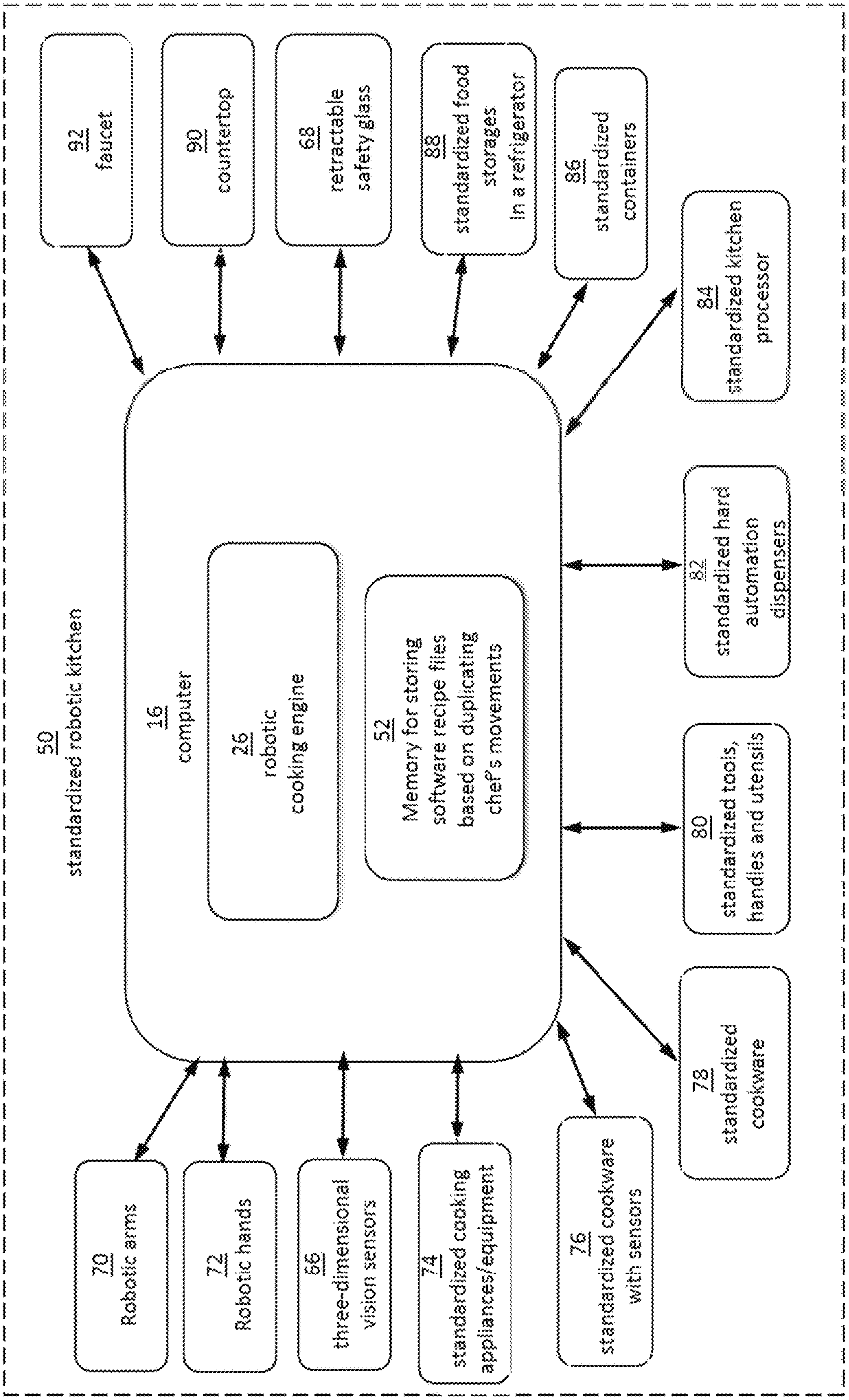
FIG. 3 is system diagram illustrating one embodiment of the standardized robotic kitchen for preparing a dish by replicating a chef's recipe process, techniques and movements in accordance with the present invention.

FIG. 3 is a system diagram illustrating one embodiment of the standardized robotic kitchen 50 for food preparation by recording a chef's movement in preparing a food dish and replicating the food dish by robotic arms and hands. In this context, the term "standardized" (or "standard") means that the specifications of the components or features are presets, as will be explained below. The computer 16 is communicatively coupled to multiple kitchen elements in the standardized robotic kitchen 50, including a three-dimensional vision sensor 66, a retractable safety screen (e.g., glass, plastic, or other types of protective material) 68, robotic arms 70, robotic hands 72, standardized cooking appliances/equipment 74, standardized cookware with sensors 76, standardized cookware 78, standardized handles and utensils 80, standardized hard automation dispenser(s) 82 (also referred to as "robotic hard automation module(s)"), a standardized kitchen processor 84, standardized containers 86, and a standardized food storage in a refrigerator 88.

The standardized hard automation dispenser(s) 82 is a device or a series of devices that is/are programmable and/or controllable via the cooking computer 16 to feed or provide pre-packaged (known) amounts or dedicated feeds of key materials for the cooking process, such as spices (salt, pepper, etc.), liquids (water, oil, etc.) or other dry materials (flour, sugar, etc.). The standardized hard automation dispensers 82 may be located at a specific station or be able to be robotically accessed and triggered to dispense according to the recipe sequence. In other embodiments, a robotic hard automation module may be combined or sequenced in series or parallel with other such modules or robotic arms or cooking utensils. In this embodiment, the standardized robotic kitchen 50 includes robotic arms 70 and robotic hands 72 and robotic hands as controlled by the robotic food preparation engine 56 in accordance with a software recipe file stored in the memory 52 for replicating a chef's precise movements in preparing a dish to produce the same tasting dish as if the chef had prepared it himself or herself. The three-dimensional vision sensors 66 provide capability to enable three-dimensional modeling of objects, providing a visual three-dimensional model of the kitchen activities, and scanning the kitchen volume to assess the dimensions and objects within the standardized robotic kitchen 50. The retractable safety glass 68 comprises a transparent material on the robotic kitchen 50, which when in an ON state extends the safety glass around the robotic kitchen to protect surrounding human beings from the movements of robotic arms 70 and hands 72, hot water and other liquids, steam, fire and other dangers influents. The robotic food preparation engine 56 is communicatively coupled to an electronic memory 52 for retrieving a software recipe file previously sent from the chef studio system 44 for which the robotic food preparation engine 56 is configured to execute processes in preparing and replicating the cooking method and processes of a chef as indicated in the software recipe file. The combination of robotic arms 70 and robotic hands 72 serves to replicate the precise movements of the chef in preparing a dish so that the resulting food dish will taste identical (or substantially identical) to the same food dish prepared by the chef. The standardized cooking equipment 74 includes an assortment of cooking appliances 46 that are incorporated as part of the robotic kitchen 50, including, but not limited to, a stove/induction/cooktop (electric cooktop, gas cooktop, induction cooktop), an oven, a grill, a cooking steamer, and a microwave oven. The standardized cookware and sensors 76 are used as embodiments for the recording of food preparation steps based on the sensors on the cookware and cooking a food dish based on the cookware with sensors, which include a pot with sensors, a pan with sensors, an oven with sensors, and a charcoal grill with sensors. The standardized cookware 78 includes frying pans, sauté pans, grill pans, multi-pots, roasters, woks, and braisers. The robotic arms 70 and the robotic hands 72 operate the standardized handles and utensils 80 in the cooking process. In one embodiment, one of the robotic hands 72 is fitted with a standardized handle, which is attached to a fork head, a knife head, and a spoon head for selection as required. The standardized hard automation dispensers 82 are incorporated into the robotic kitchen 50 to provide for expedient (via both robot arms 70 and human use) key and common/repetitive ingredients that are easily measured/dosed out or pre-packaged. The standardized containers 86 are storage locations that store food at room temperature. The standardized refrigerator containers 88 refer to, but are not limited to, a refrigerator with identified containers for storing fish, meat, vegetables, fruit, milk, and other perishable items. The containers in the standardized containers 86 or standardized storages 88 can be coded with container identifiers from which the robotic food preparation engine 56 is able to ascertain the type of food in a container based on the container identifier. The standardized containers 86 provide storage space for non-perishable food items such as salt, pepper, sugar, oil, and other spices. Standardized cookware with sensors 76 and the cookware 78 may be stored on a shelf or a cabinet for use by the robotic arms 70 for selecting a cooking tool to prepare a dish. Typically, the raw fish, the raw meat, and vegetables are pre-cut and stored in the identified standardized storages 88. The kitchen countertop 90 provides a platform for the robotic arms 70 to handle the meat or vegetables as needed, which may or may not include cutting or chopping actions. The kitchen faucet 92 provides a kitchen sink space for washing or cleaning food in preparation for a dish. When the robotic arms 70 have completed the recipe process to prepare a dish and the dish is ready for serving, the dish is placed on a serving counter 90, which further allows for the dining environment to be enhanced by adjusting the ambient setting with the robotic arms 70, such as placement of utensils, wine glasses, and a chosen wine compatible with the meal. One embodiment of the equipment in the standardized robotic kitchen module 50 is a professional series as to increase the universal appeal to prepare various types of dishes.

The standardized robotic kitchen module 50 has as one objective the standardization of the kitchen module 50 and various components with the kitchen module itself, to ensure consistency in both the chef kitchen 44 and the robotic kitchen 48 to maximize the preciseness of recipe replication while minimizing the risks of deviations from precise replication of a recipe dish between the chef kitchen 44 and the robotic kitchen 48. One main purpose of having the standardization of the kitchen module 50 is to obtain the same result of the cooking process (or the same dish) between a first food dish prepared by the chef and a subsequent replication of the same recipe process via the robotic kitchen. Conceiving a standardized platform in the standardized robotic kitchen module 50 between the chef kitchen 44 and the robotic kitchen 48 has several key considerations: same timeline, same program or mode, and quality check. The same timeline in the standardized robotic kitchen 50 where the chef prepares a food dish at the chef kitchen 44 and the replication process by the robotic hands in the robotic kitchen 48 refers to the same sequence of manipulations, the same initial and ending time of each manipulation, and the same speed of moving an object between handling operations. The same program or mode in the standardized robotic kitchen 50 refers to the use and operation of standardized equipment during each manipulation recording and execution step. The quality check refers to three-dimensional vision sensors in the standardized robotic kitchen 50 which monitor and adjust in real time each manipulation action during the food preparation process to correct any deviation and avoid a flawed result. The adoption of the standardized robotic kitchen module 50 reduces and minimizes the risks of not obtaining the same result between the chef's prepared food dish and the food dish prepared by the robotic kitchen using robotic arms and hands. Without the standardization of a robotic kitchen module and the components within the robotic kitchen module, the increased variations between the chef kitchen 44 and the robotic kitchen 48 increase the risks of not being able to obtain the same result between the chef's prepared food dish and the food dish prepared by the robotic kitchen because more elaborate and complex adjustment algorithms will be required with different kitchen modules, different kitchen equipment, different kitchenware, different kitchen tools, and different ingredients between the chef kitchen 44 and the robotic kitchen 48.

The standardized robotic kitchen module 50 includes standardization of many aspects. First, the standardized robotic kitchen module 50 includes standardized positions and orientations (in the XYZ coordinate plane) of any type of kitchenware, kitchen containers, kitchen tools and kitchen equipment (with standardized fixed holes in the kitchen module and device positions). Secondly, the standardized robotic kitchen module 50 includes a standardized cooking volume dimension and architecture. Thirdly, the standardized robotic kitchen module 50 includes standardized equipment sets, such as an oven, a stove, a dish washer, a faucet, etc. Fourth, the standardized robotic kitchen module 50 includes standardized kitchenware, standardized cooking tools, standardized cooking devices, standardized containers, and standardized food storage in a refrigerator, in terms of shape, dimension, structure, material, capabilities, etc. Fifth, in one embodiment, the standardized robotic kitchen module 50 includes a standardized universal handle for handling any kitchenware, tools, instruments, containers, and equipment, which enable a robotic hand to hold the standardized universal handle in only one correct position, while avoiding any improper grasps or incorrect orientations. Sixth, the standardized robotic kitchen module 50 includes standardized robotic arms and hands with a library of manipulations. Seventh, the standardized robotic kitchen module 50 includes a standardized kitchen processor for standardized ingredient manipulations. Eighth, the standardized robotic kitchen module 50 includes standardized three-dimensional vision devices for creating dynamic three-dimensional vision data, as well as other possible standard sensors, for recipe recording, execution tracking, and quality check functions. Ninth, the standardized robotic kitchen module 50 includes standardized types, standardized volumes, standardized sizes, and standardized weights for each ingredient during a particular recipe execution.

Figure 4:
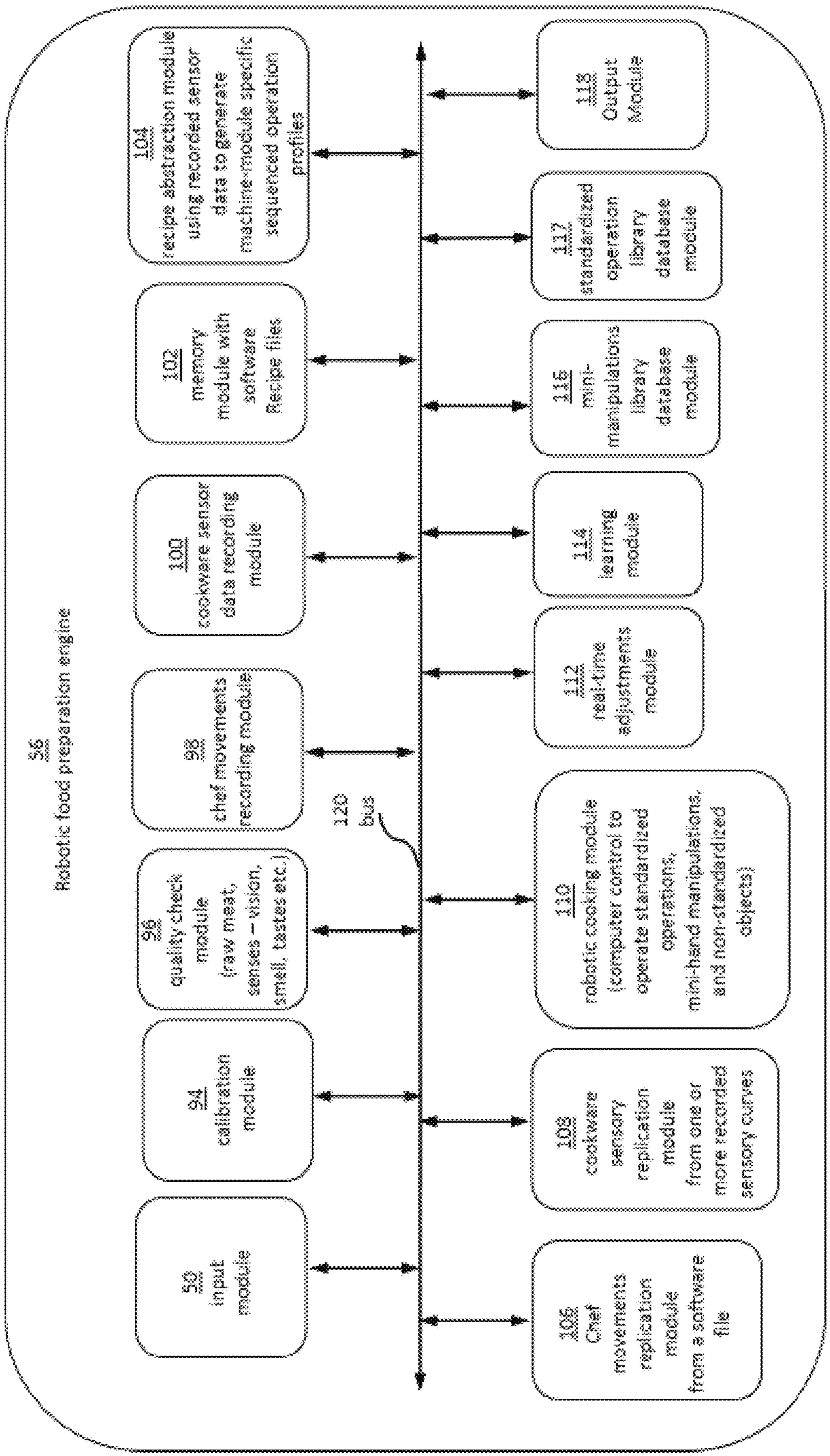
FIG. 4 is a system diagram illustrating one embodiment of a robotic food preparation engine for use with the computer in the chef studio system and the household robotic kitchen system in accordance with the present invention.

FIG. 4 is a system diagram illustrating one embodiment of the robotic cooking engine 56 (also referred to as "robotic food preparation engine") for use with the computer 16 in the chef studio system 44 and the household robotic kitchen system 48. Other embodiments may have modifications, additions, or variations of the modules in the robotic cooking engine 16 in the chef kitchen 44 and robotic kitchen 48. The robotic cooking engine 56 includes an input module 50, a calibration module 94, a quality check module 96, a chef movement recording module 98, a cookware sensor data recording module 100, a memory module 102 for storing software recipe files, a recipe abstraction module 104 using recorded sensor data to generate machine-module specific sequenced operation profiles, a chef movements replication software module 106, a cookware sensory replication module 108 using one or more sensory curves, a robotic cooking module 110 (computer control to operate standardized operations, mini-manipulations, and non-standardized objects), a real-time adjustment module 112, a learning module 114, a mini-manipulation library database module 116, a standardized kitchen operation library database module 117, and an output module 118, to which these modules are communicatively coupled via a bus 120.

The input module 50 is configured to receive any type of input information such as software recipe files sent from another computing device. The calibration module 94 is configured to calibrate itself with the robotic arms 70, the robotic hands 72, and other kitchenware and equipment components within the standardized robotic kitchen module 50. The quality check module 96 is configured to determine the quality and freshness of raw meat, raw vegetables, milk-associated ingredients and other raw foods at the time that the raw food is retrieved for cooking, as well as checking the quality of raw foods when receiving the food into the standardized food storage 88. The quality check module 96 can also be configured to conduct quality testing of an object based on senses, such as the smell of the food, the color of the food, the taste of the food, and the image or appearance of the food. The chef movements recording module 98 is configured to record the sequence and the precise movements of the chef when the chef prepares a food dish. The cookware sensor data recording module 100 is configured to record sensory data from cookware equipped with sensors (such as a pan with sensors, a grill with sensors, or an oven with sensors) placed in different zones within the cookware, thereby producing one or more sensory curves. The result is the generation of a sensory curve, such as temperature curve (and/or humidity), that reflects the temperature fluctuation of cooking appliances over time for a particular dish. The memory module 102 is configured as a storage location for storing software recipe files, for either replication of chef recipe movements or other types of software recipe files including sensory data curves. The recipe abstraction module 104 is configured to use recorded sensor data to generate machine-module specific sequenced operation profiles. The chef movements replication module 106 is configured to replicate the chef's precise movements in preparing a dish based on the stored software recipe file in the memory 52. The cookware sensory replication module 108 is configured to replicate the preparation of a food dish by following the characteristics of one or more previously recorded sensory curves which was generated when the chef 49 prepared a dish by using the standardized cookware with sensors 76. The robotic cooking module 110 is configured to control and operate standardized kitchen operations, mini-manipulations, non-standardized objects, and the various kitchen tools and equipment in the standardized robotic kitchen 50. The real time adjustment module 112 is configured to provide real-time adjustments to the variables associated with a particular kitchen operation or a mini operation so as to produce a resulting process that is a precise replication of the chef movement or a precise replication of the sensory curve. The learning module 114 is configured to provide learning capabilities to the robotic cooking engine 56 to optimize the precise replication in preparing a food dish by robotic arms 70 and the robotic hands 72, as if the food dish was prepared by a chef, using a method such as case-based (robotic) learning. The mini-manipulation library database module 116 is configured to store a first database library of mini-manipulations. The standardized kitchen operation library database module 117 is configured to store a second database library of standardized kitchenware and how to operate this standardized kitchenware. The output module 118 is configured to send output computer files or control signals external to the robotic cooking engine.

Figure 5A:
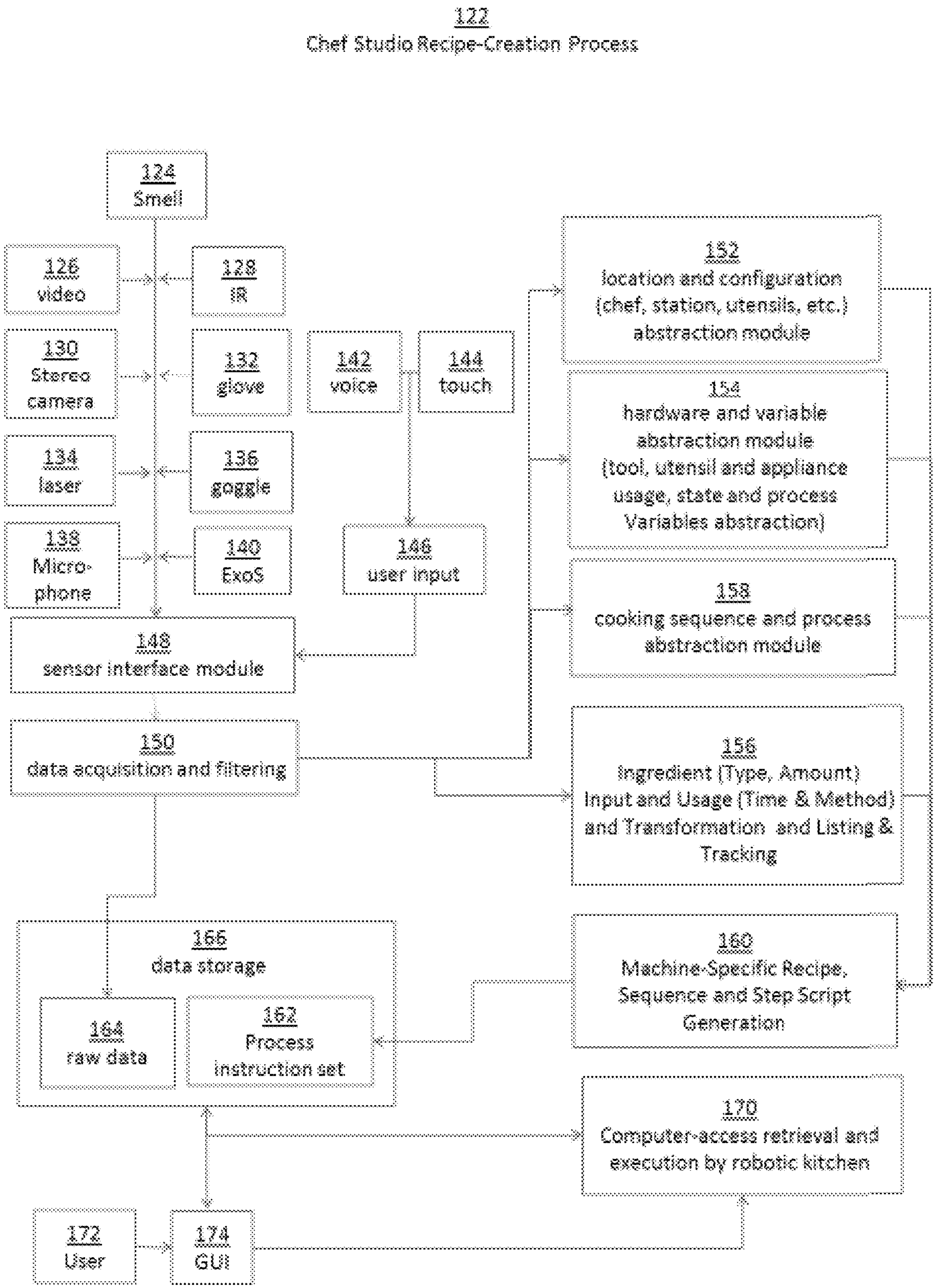
FIG. 5A is a block diagram illustrating a chef studio recipe-creation process in accordance with the present invention.

FIG. 5A is a block diagram illustrating a chef studio recipe-creation process, showcasing several main functional blocks supporting the use of expanded multimodal sensing to create a recipe instruction-script for a robotic kitchen. Sensor-data from a multitude of sensors, such as (but not limited to) smell 124, video cameras 126, infrared scanners and rangefinders 128, stereo (or even trinocular) cameras 130, haptic gloves 132, articulated laser-scanners 134, virtual-world goggles 136, microphones 138 or an exoskeletal motion suit 140, human voice 142, touch-sensors 144 and even other forms of user input 146, are used to collect data through a sensor interface module 148. The data is acquired and filtered 150, including possible human user input (e.g., chef; touch-screen and voice input) 146, after which a multitude of (parallel) software processes utilize the temporal and spatial data to generate the data that is used to populate the machine-specific recipe-creation process. Sensors may not be limited to capturing human position and/or motion but may also capture position, orientation and/or motion of other objects in the standardized robotic kitchen 50.

These individual software modules generate such information (but are not thereby limited to only these modules) as (i) chef-location and cooking-station ID via a location and configuration module 152, (ii) configuration of arms (via torso), (iii) tools handled and when and how, (iv) utensils used and locations on the station through the hardware and variable abstraction module 154, (v) processes executed with them and (vi) variables (temperature, lid y/n, stirring, etc.) in need of monitoring through the process module B156, (vii) temporal (start/finish, type) distribution and (viii) types of processes (stir, fold, etc.) being applied, and (ix) ingredients added (type, amount, state of prep, etc.), through the cooking sequence and process abstraction module 158.

All this information is then used to create a machine-specific (not just for the robotic-arms, but also ingredient dispensers, tools and utensils, etc.) set of recipe instructions through the stand-alone module 160, which are organized as a script of sequential/parallel overlapping tasks to be executed and monitored. This recipe-script is stored (162) alongside the entire raw data set (164) in the data storage module 166 and is made accessible to either a remote robotic cooking station through the robotic kitchen interface module 168 or a human user 170 via a graphical user interface (GUI) 172.

Figure 5B:
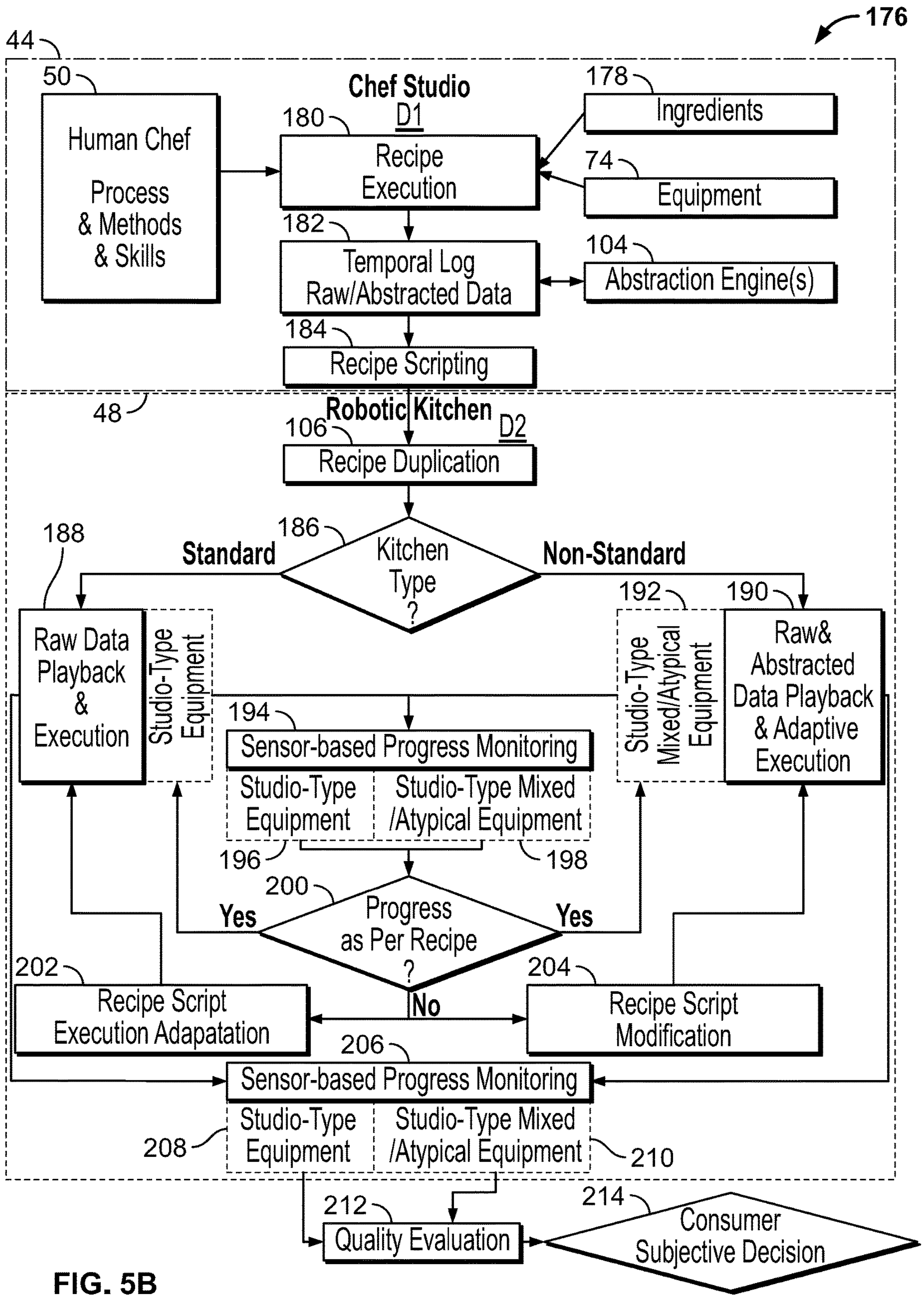
FIG. 5B is block diagram illustrating one embodiment of a standardized teach/playback robotic kitchen in accordance with the present invention.

FIG. 5B is a block diagram illustrating one embodiment of the standardized chef studio 44 and robotic kitchen 50 with teach/playback process 176. The teach/playback process 176 describes the steps of capturing a chef's recipe-implementation processes/methods/skills 49 in the chef studio 44 where he/she carries out the recipe execution 180, using a set of chef-studio standardized equipment 74 and recipe-required ingredients 178 to create a dish while being logged and monitored 182. The raw sensor data is logged (for playback) in 182 and also processed to generate information at different abstraction levels (tools/equipment used, techniques employed, times/temperatures started/ended, etc.), and then used to create a recipe-script 184 for execution by the robotic kitchen 48.

The robotic kitchen 48 engages in a recipe replication process 106, whose profile depends on whether the kitchen is of a standardized or non-standardized type, which is checked by a process 186.

The robotic kitchen execution is dependent on the type of kitchen available to the user. If the robotic kitchen uses the same/identical (at least functionally) equipment as used in the in the chef studio, the recipe replication process is primarily one of using the raw data and playing it back as part of the recipe-script execution process. Should the kitchen however differ from the (ideal) standardized kitchen, the execution engine(s) will have to rely on the abstracted data to generate kitchen-specific execution sequences to try to achieve a similar step-by-step result.

Since the cooking process is continually monitored by all sensor units in the robotic kitchen via a monitoring process 194, regardless of whether the known studio equipment 196 or the mixed/atypical non-chef studio equipment 198 is being used, the system is able to make modifications as needed depending on a recipe progress check 200. In one embodiment of the standardized kitchen, raw data is typically played back through an execution module 188 using chef-studio type equipment, and the only adjustments that are expected are adaptations 202 in the execution of the script (repeat a certain step, go back to a certain step, slow down the execution, etc.) as there is a one-to-one correspondence between taught and played-back data-sets. However, in the case of the non-standardized kitchen, the chances are very high that the system will have to modify and adapt the actual recipe itself and its execution via a recipe script modification module 204, to suit the available tools/appliances 192 which differ from those in the chef studio 44 or the measured deviations from the recipe script (meat cooking too slowly, hot-spots in pot burning the roux, etc.). Overall recipe-script progress is monitored using a similar process 206, which differs depending on whether chef-studio equipment 208 or mixed/atypical kitchen equipment 210 is being used.

A non-standardized kitchen is less likely to result in a close-to-human chef cooked dish, as compared to using a standardized robotic kitchen that has equipment and capabilities reflective of those used in the studio-kitchen. The ultimate subjective decision is of course that of the human (or chef) tasting, which is a quality evaluation 212, yielding to a (subjective) quality decision 214.

Figure 5C:
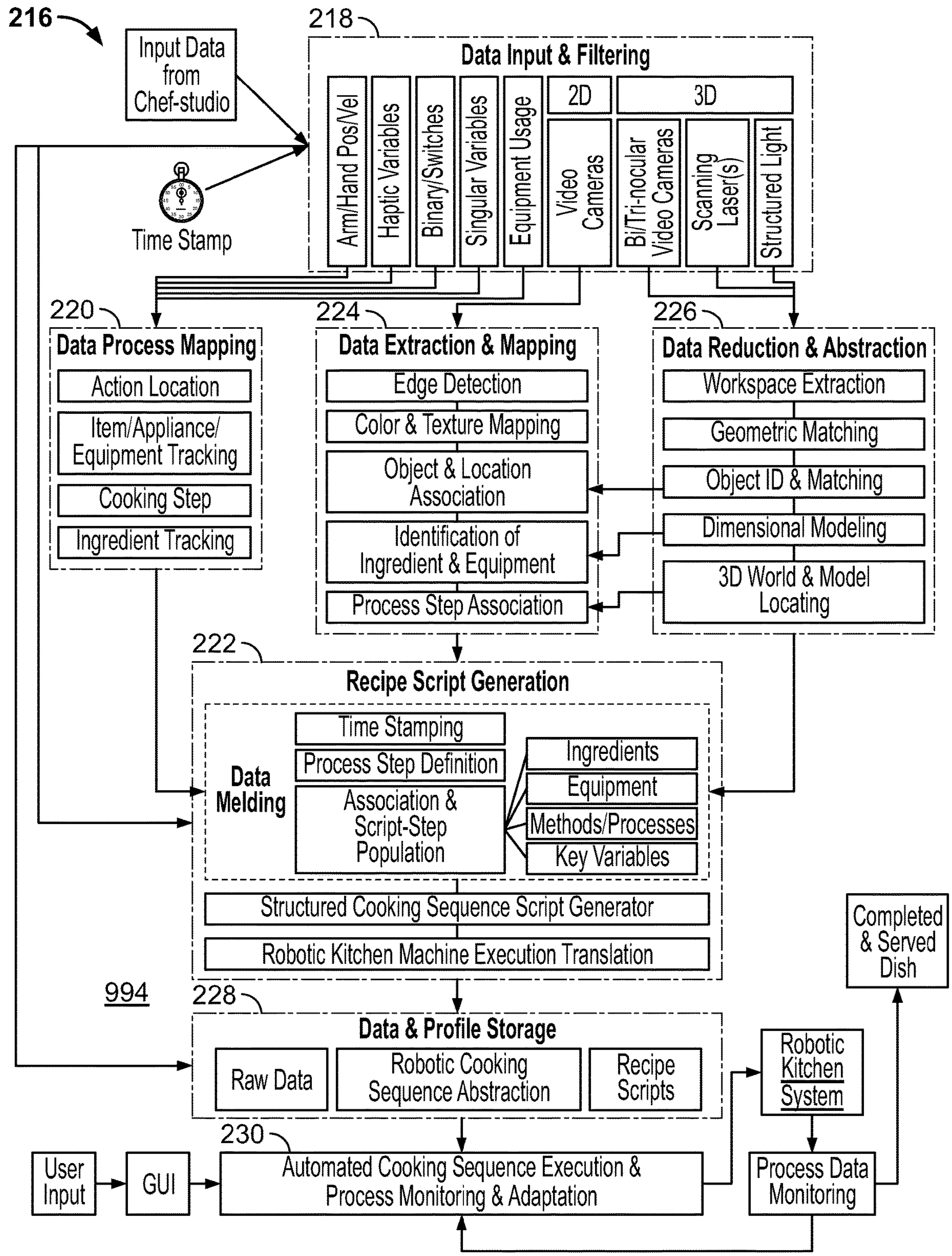
FIG. 5C is a block diagram illustrating one embodiment of a recipe script generation and abstraction engine in accordance with the present invention.

FIG. 5C is a block diagram illustrating one embodiment 216 of a recipe script generation and abstraction engine that pertains to the structure and flow of the recipe-script generation process as part of the chef-studio recipe walk-through by a human chef. The first step is for all available data measurable in the chef studio 44, whether it be ergonomic data from the chef (arms/hands positions and velocities, haptic finger data, etc.), status of the kitchen appliances (ovens, fridges, dispensers, etc.), specific variables (cooktop temperature, ingredient temperature, etc.), appliance or tools being used (pots/pans, spatulas, etc.), or two-dimensional and three-dimensional data collected by multi-spectrum sensory equipment (including cameras, lasers, structured light systems, etc.), to be input and filtered by the central computer system and also time-stamped by a main process 218.

A data process-mapping algorithm 220 uses the simpler (typically single-unit) variables to determine where the process action is taking place (cooktop and/or oven, fridge, etc.) and assigns a usage tag to any item/appliance/equipment being used whether intermittently or continuously. It associates a cooking step (baking, grilling, ingredient-addition, etc.) to a specific time-period and tracks when, where and which and how much of what ingredient was added. This (time-stamped) information dataset is then made available for the data-melding process during the recipe-script generation process 222.

The data extraction and mapping process 224 is primarily focused on taking two-dimensional information (such as from monocular/single-lensed cameras) and extracting key information from the same. In order to extract the important and more abstracted descriptive information from each successive image, several algorithmic processes have to be applied to this dataset. Such processing steps can include (but are not limited to) edge-detection, color and texture-mapping, and then using the domain-knowledge in the image, coupled with object-matching information (type and size) extracted from the data reduction and abstraction process 226, to allow for the identification and location of the object (whether an item of equipment or ingredient, etc.), again extracted from the data reduction and abstraction process 226, allowing one to associate the state (and all associated variables describing the same) and items in an image with a particular process-step (frying, boiling, cutting, etc.). Once this data has been extracted and associated with a particular image at a particular point in time, it can be passed to the recipe-script generation process 222 to formulate the sequence and steps within a recipe.

The data-reduction and abstraction engine (set of software routines) 226 is intended to reduce the larger three-dimensional data sets and extract from them key geometric and associative information. A first step is to extract from the large three-dimensional data point-cloud only the specific workspace area of importance to the recipe at that particular point in time. Once the data-set has been trimmed, key geometric features will be identified by a process known as template matching; this allows for the identification of such items as horizontal table-tops, cylindrical pots and pans, arm and hand locations, etc. Once typical known (template) geometric entities are determined in a data-set a process of object identification and matching proceeds to differentiate all items (pot vs. pan, etc.) and associates the proper dimensionality (size of pot or pan, etc.) and orientation of the same, and places them within the three-dimensional world model being assembled by the computer. All this abstracted/extracted information is then also shared with the data-extraction and mapping engine 224, prior to all being fed to the recipe-script generation engine 222.

The recipe-script generation engine process 222 is responsible for melding (blending/combining) all the available data and sets into a structured and sequential cooking script with clear process-identifiers (prepping, blanching, frying, washing, plating, etc.) and process-specific steps within each, which can then be translated into robotic-kitchen machine-executable command-scripts that are synchronized based on process-completion and overall cooking time and cooking progress. Data melding will at least involve, but will not solely be limited to, the ability to take each (cooking) process step and populating the sequence of steps to be executed with the properly associated elements (ingredients, equipment, etc.), methods and processes to be used during the process steps, and the associated key control—(set oven/cooktop temperatures/settings) and monitoring-variables (water or meat temperature, etc.) to be maintained and checked to verify proper progress and execution. The melded data is then combined into a structured sequential cooking script that will resemble a set of minimally descriptive steps (akin to a recipe in a magazine) but with a much larger set of variables associated with each element (equipment, ingredient, process, method, variable, etc.) of the cooking process at any one point in the procedure. The final step is to take this sequential cooking script and transform it into an identically structured sequential script that is translatable by a set of machines/robot/equipment within a robotic kitchen 48. It is this script the robotic kitchen 48 uses to execute the automated recipe execution and monitoring steps.

All raw (unprocessed) and processed data as well as the associated scripts (both structure sequential cooking-sequence script and the machine-executable cooking-sequence script) are stored in the data and profile storage unit/process 228 and time-stamped. It is from this database that the user, by way of a GUI, can select and cause the robotic kitchen to execute a desired recipe through the automated execution and monitoring engine 230, which is continually monitored by its own internal automated cooking process, with necessary adaptations and modifications to the script generated by the same and implemented by the robotic-kitchen elements, in order to arrive at a completely plated and served dish.

Figure 5D:
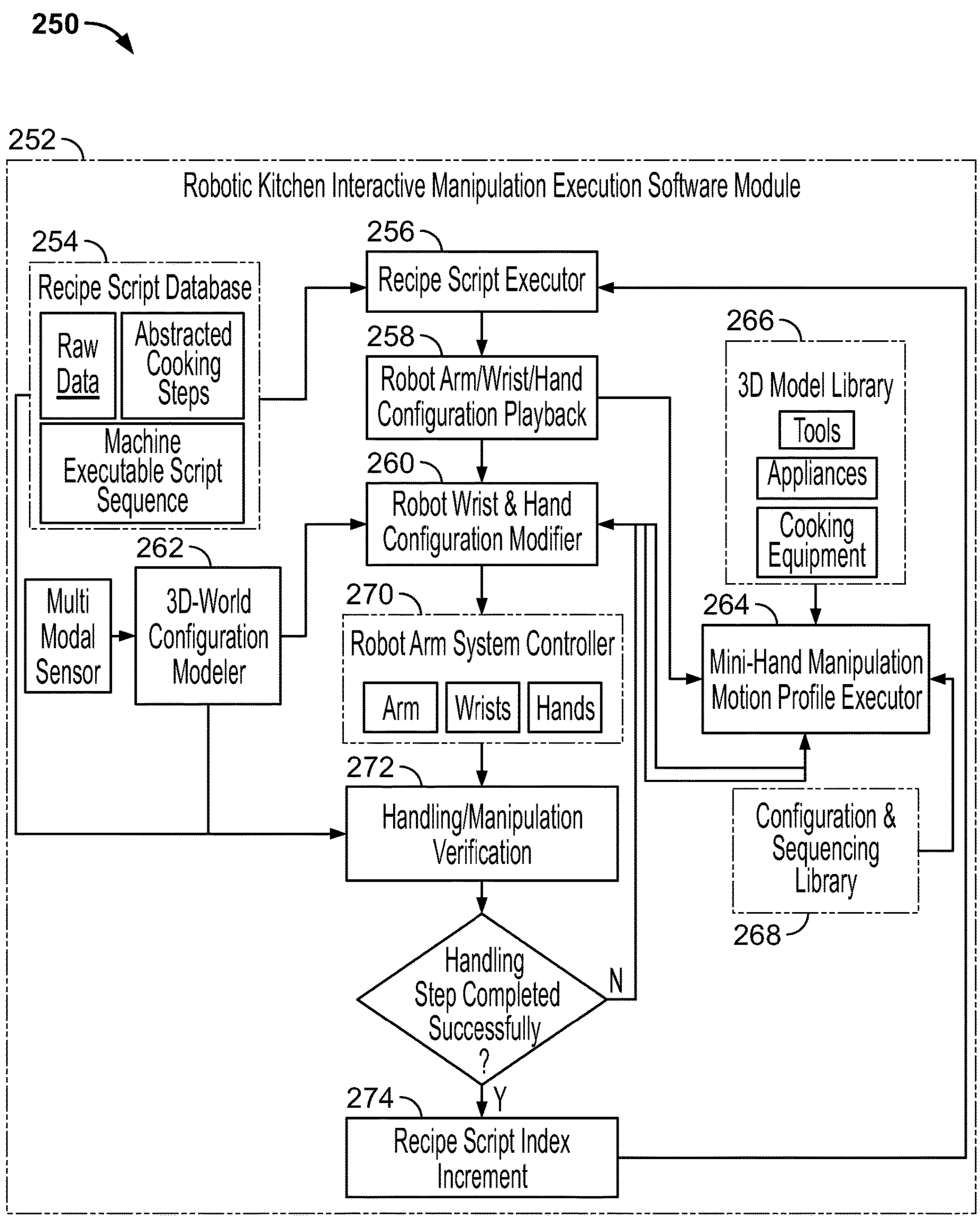
FIG. 5D is a block diagram illustrating software elements for object-manipulation in the standardized robotic kitchen in accordance with the present invention.

FIG. 5D is a block diagram illustrating software elements for object-manipulation in the standardized robotic kitchen, which shows the structure and flow 250 of the object-manipulation portion of the robotic kitchen execution of a robotic script, using the notion of motion-replication coupled-with/aided-by mini-manipulation steps. In order for automated robotic-arm/-hand-based cooking to be viable, it is insufficient to simply monitor every single joint in the arm and hands/fingers. In many cases just the position and orientation of the hand/wrist are known (and able to be replicated), but then manipulating an object (identifying location, orientation, pose, grab-location, grabbing-strategy and task-execution) requires that local-sensing and learned behaviors and strategies for the hand and fingers be used to complete the grabbing/manipulating task successfully. These motion-profiles (sensor-based/-driven) behaviors and sequences are stored within the mini hand-manipulation library software repository in the robotic-kitchen system. The human chef could be wearing complete arm-exoskeleton or an instrumented/target-fitted motion-vest allowing the computer via built-in sensors or though camera-tracking to determine the exact 3D position of the hands and wrists at all times. Even if the ten fingers on both hands had all their joints instrumented (more than 30 DoFs [Degrees of Freedom] for both hands and very awkward to wear and use, and thus unlikely to be used), a simple motion-based playback of all joint positions would not guarantee successful (interactive) object manipulation.

The mini-manipulation library is a command-software repository, where motion behaviors and processes are stored based on an off-line learning process, where the arm/wrist/finger motions and sequences to successfully complete a particular abstract task (grab the knife and then slice; grab the spoon and then stir; grab the pot with one hand and then use other hand to grab spatula and get under meat and flip it inside the pan; etc.). This repository has been built up to contain the learned sequences of successful sensor-driven motion-profiles and sequenced behaviors for the hand/wrist (and sometimes also arm-position corrections), to ensure successful completions of object (appliance, equipment, tools) and ingredient manipulation tasks that are described in a more abstract language, such as "grab the knife and slice the vegetable", "crack the egg into the bowl", "flip the meat over in the pan", etc. The learning process is iterative and is based on multiple trials of a chef-taught motion-profile from the chef studio, which is then executed and iteratively modified by the offline learning algorithm module, until an acceptable execution-sequence can be shown to have been achieved. The mini-manipulation library (command software repository) is intended to have been populated (a-priori and offline) with all the necessary elements to allow the robotic-kitchen system to successfully interact with all equipment (appliances, tools, etc.) and main ingredients that require processing (steps beyond just dispensing) during the cooking process. While the human chef wore gloves with embedded haptic sensors (proximity, touch, contact-location/-force) for the fingers and palm, the robotic hands are outfitted with similar sensor-types in locations to allow their data to be used to create, modify and adapt motion-profiles to successfully execute desired motion-profiles and handling-commands.

The object-manipulation portion of the robotic-kitchen cooking process (robotic recipe-script execution software module for the interactive manipulation and handling of objects in the kitchen environment) 252 is further elaborated below. Using the robotic recipe-script database 254 (which contains data in raw, abstracted cooking-sequence and machine-executable script forms), the recipe script executor module 256 steps through a specific recipe execution-step. The configuration playback module 258 selects and passes configuration commands through to the robot arm system (torso, arm, wrist and hands) controller 270, which then controls the physical system to emulate the required configuration (joint-positions/-velocities/-torques, etc.) values.

The notion of being able to faithfully carry out proper environment interaction manipulation and handling tasks is made possible through a real-time process-verification by way of (i) 3D world modeling as well as (ii) mini-manipulation. Both the verification and manipulation steps are carried out through the addition of the robot wrist and hand configuration modifier 260. This software module uses data from the 3D world configuration modeler 262, which creates a new 3D world model at every sampling step from sensory data supplied by the multimodal sensor(s) unit(s), in order to ascertain that the configuration of the robotic kitchen systems and process matches that required by the recipe script (database); if not, it enacts modifications to the commanded system-configuration values to ensure the task is completed successfully. Furthermore, the robot wrist and hand configuration modifier 260 also uses configuration-modifying input commands from the mini-manipulation motion profile executor 264. The hand/wrist (and potentially also arm) configuration modification data fed to the configuration modifier 260 are based on the mini-manipulation motion profile executor 264 knowing what the desired configuration playback should be from 258, but then modifying it based on its 3D object model library 266 and the a-priori learned (and stored) data from the configuration and sequencing library 268 (which was built based on multiple iterative learning steps for all main object handling and processing steps).

While the configuration modifier 260 continually feeds modified commanded configuration data to the robot arm system controller 270, it relies on the handling/manipulation verification software module 272 to verify not only that the operation is proceeding properly but also whether continued manipulation/handling is necessary. In the case of the latter (answer 'N' to the decision), the configuration modifier 260 re-requests configuration-modification (for the wrist, hands/fingers and potentially the arm and possibly even torso) updates from both the world modeler 262 and the mini-manipulation profile executor 264. The goal is simply to verify that a successful manipulation/handling step or sequence has been successfully completed. The handling/manipulation verification software module 272 carries out this check by using the knowledge of the recipe script database F2 and the 3D world configuration modeler 262 to verify the appropriate progress in the cooking step currently being commanded by the recipe script executor 256. Once progress has been deemed successful, the recipe script index increment process 274 notifies the recipe script executor 256 to proceed to the next step in the recipe-script execution.

Figure 6:
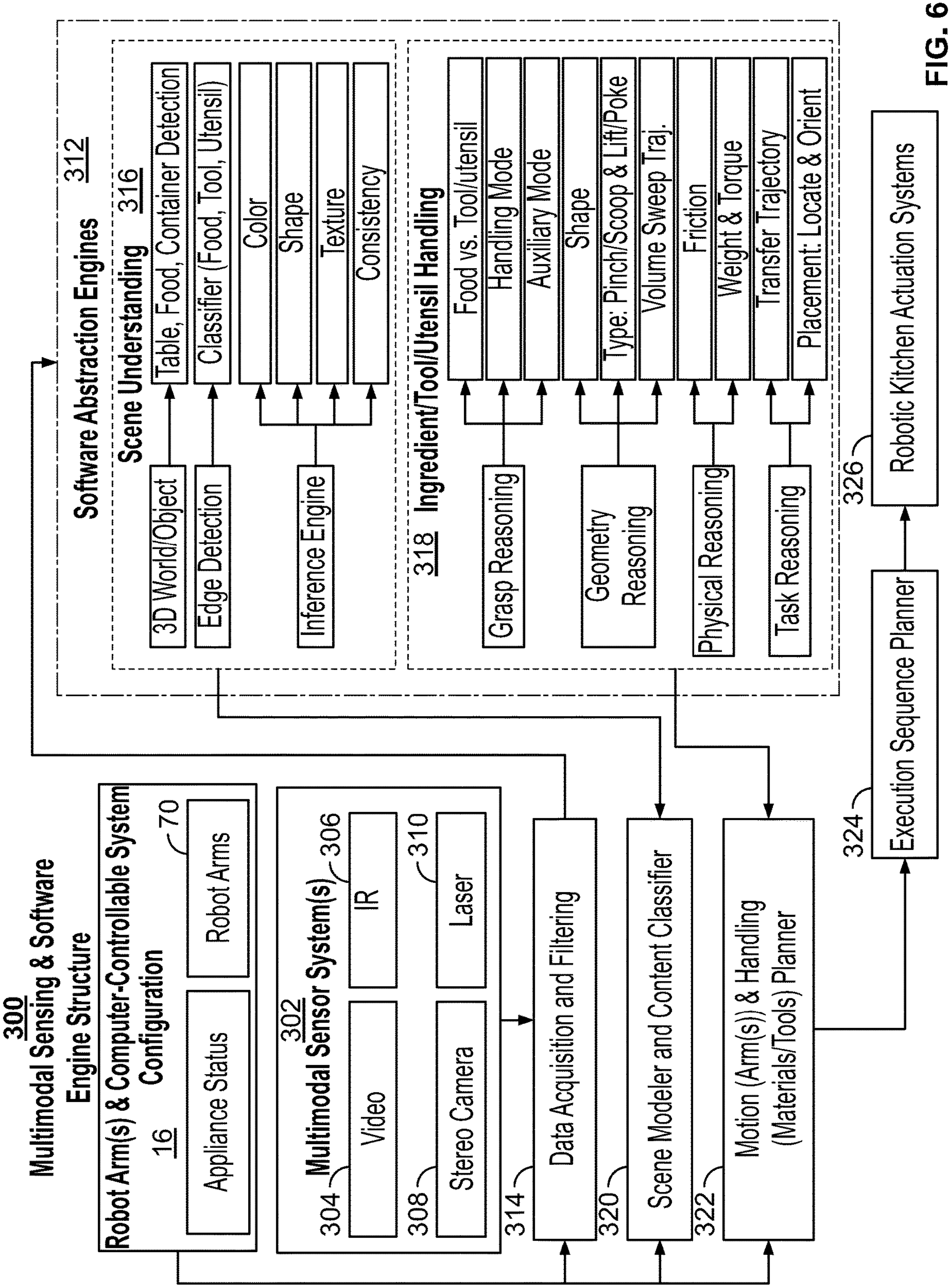
FIG. 6 is a block diagram illustrating a multimodal sensing and software engine architecture in accordance with the present invention.

FIG. 6 is a block diagram illustrating a multimodal sensing and software engine architecture 300 in accordance with the present invention. One of the main autonomous cooking features allowing for planning, execution and monitoring of a robotic cooking script requires the use of multimodal sensory input 302 that is used by multiple software modules to generate data needed to (i) understand the world, (ii) model the scene and materials, (iii) plan the next steps in the robotic cooking sequence, (iv) execute the generated plan and (v) monitor the execution to verify proper operations—all of these steps occurring in a continuous/repetitive closed loop fashion.

The multimodal sensor-unit(s) 302, comprising, but not limited to, video cameras 304, IR cameras and rangefinders 306, stereo (or even trinocular) camera(s) 308 and multi-dimensional scanning lasers 310, provide multi-spectral sensory data to the main software abstraction engines 312 (after being acquired & filtered in the data acquisition and filtering module 314). The data is used in a scene understanding module 316 to carry out multiple steps such as (but not limited to) building high- and lower-resolution (laser: high-resolution; stereo-camera: lower-resolution) three-dimensional surface volumes of the scene, with superimposed visual and IR-spectrum color and texture video information, allowing edge-detection and volumetric object-detection algorithms to infer what elements are in a scene, allowing the use of shape-/color-/texture- and consistency-mapping algorithms to run on the processed data to feed processed information to the Kitchen Cooking Process Equipment Handling Module 318. In the module 318, software-based engines are used for the purpose of identifying and three-dimensionally locating the position and orientation of kitchen tools and utensils and identifying and tagging recognizable food elements (meat, carrots, sauce, liquids, etc.) so as to generate data to let the computer build and understand the complete scene at a particular point in time so as to be used for next-step planning and process monitoring. Engines required to achieve such data and information abstraction include, but are not limited to, grasp reasoning engines, geometry reasoning engines, physical reasoning engines and task reasoning engines. Output data from both engines 316 and 318 are then used to feed the scene modeler and content classifier 320, where the 3D world model is created with all the key content required for executing the robotic cooking script executor. Once the fully-populated model of the world is understood, it can be used to feed the motion and handling planner 322 (if robotic-arm grasping and handling are necessary, the same data can be used to differentiate and plan for grasping and manipulating food and kitchen items depending on the required grip and placement) to allow for planning motions and trajectories for the arm(s) and attached end-effector(s) (grippers, multi-fingered hands). A follow-on Execution Sequence planner 324 creates the proper sequencing of task-based commands for all individual robotic/automated kitchen elements, which are then used by the robotic kitchen actuation systems 326. The entire sequence above is repeated in a continuous closed loop during the robotic recipe-script execution and monitoring phase.

Figure 7A:
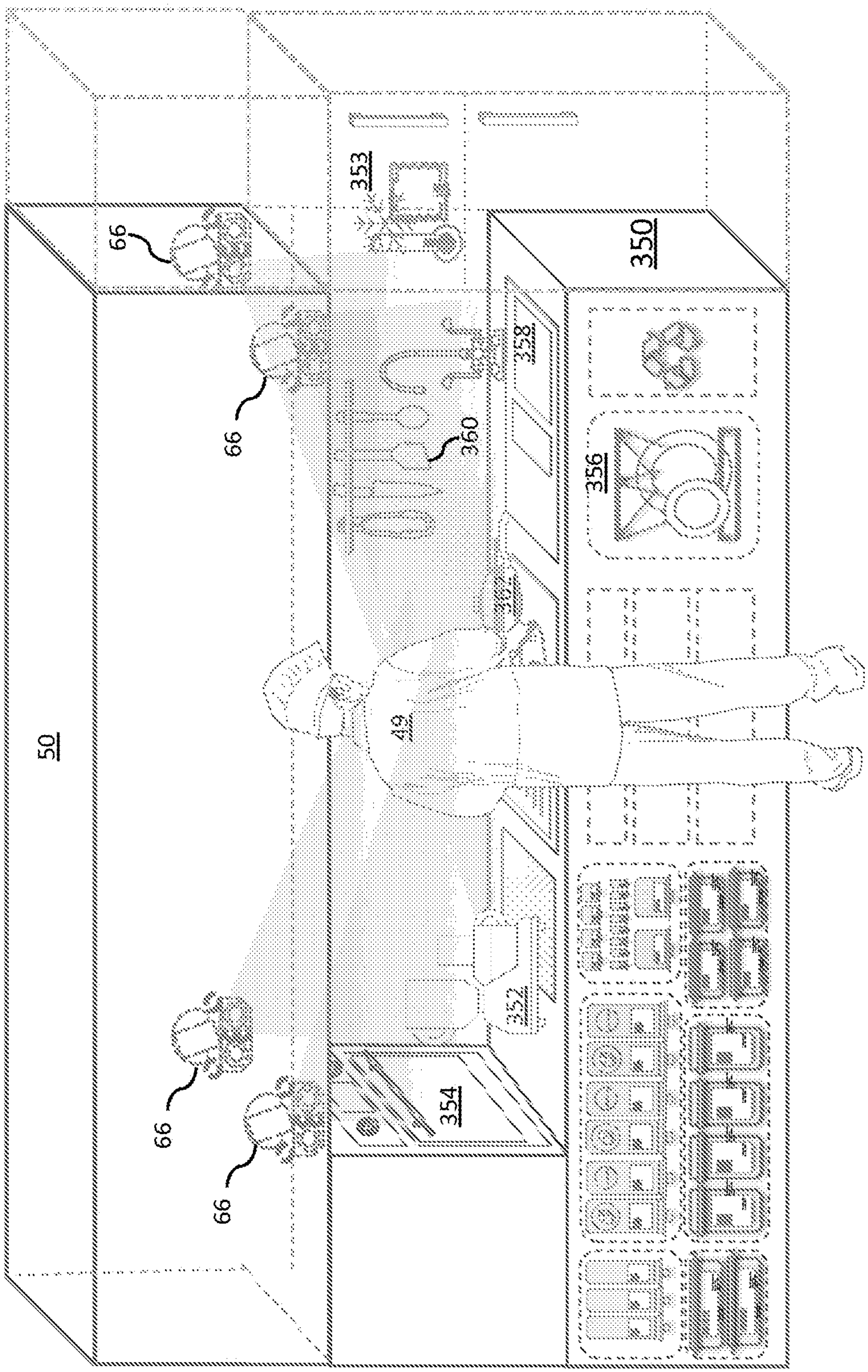
FIG. 7A is a block diagram illustrating a standardized robotic kitchen module used by a chef in accordance with the present invention.

FIG. 7A depicts the standardized kitchen 50 which in this case plays the role of the chef-studio, in which the human chef 49 carries out the recipe creation and execution while being monitored by the multi-modal sensor systems 66, so as to allow the creation of a recipe-script. Within the standardized kitchen, are contained multiple elements necessary for the execution of a recipe, including the main cooking module 350, which includes such as equipment as utensils 360, a cooktop 362, a kitchen sink 358, a dishwasher 356, a table-top mixer and blender (also referred to as a "kitchen blender") 352, an oven 354 and a refrigerator/freezer combination unit 353.

Figure 7B:
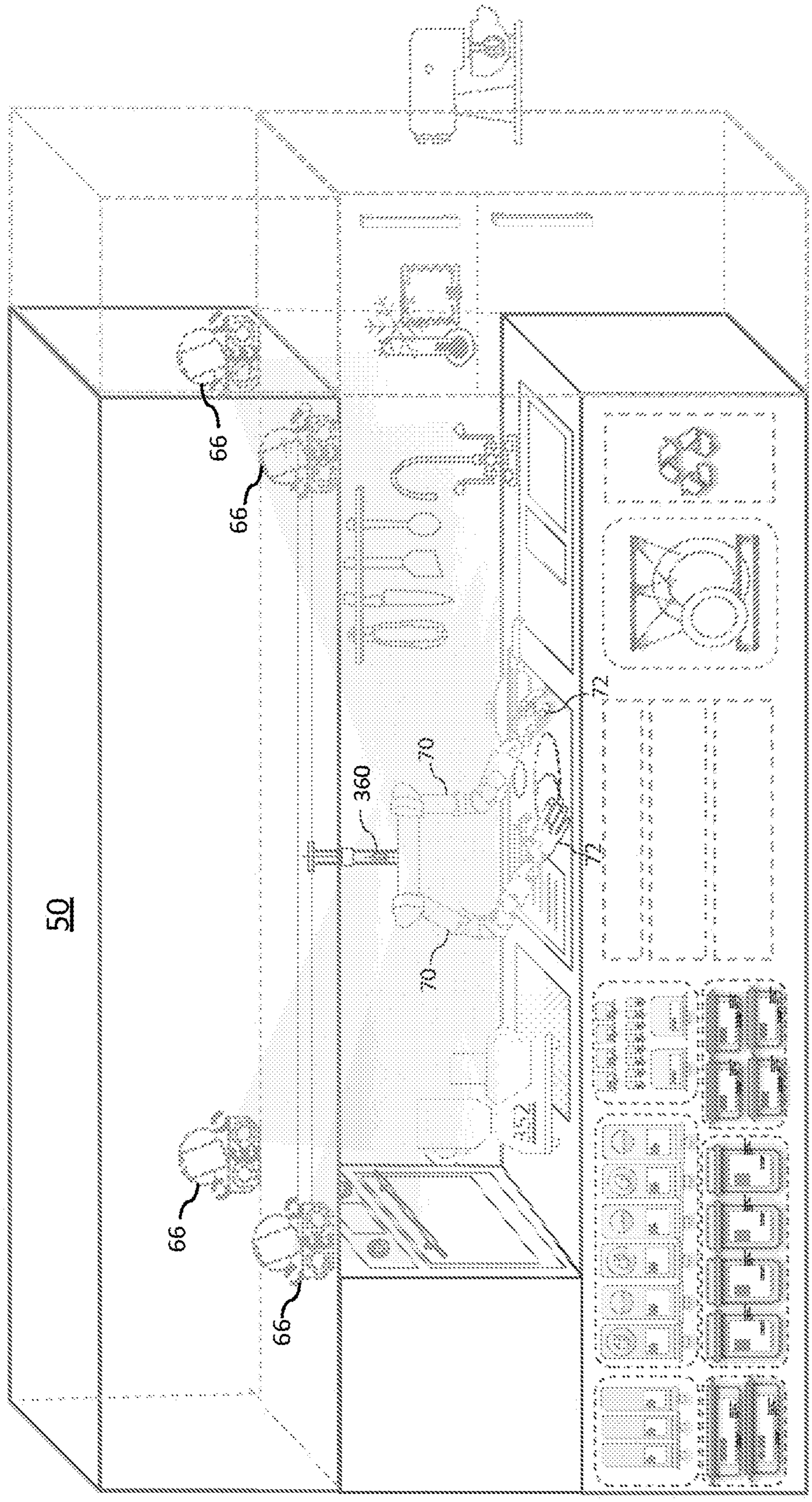
FIG. 7B is a block diagram illustrating the standardized robotic kitchen module with a pair of robotic arms and hands in accordance with the present invention.

FIG. 7B depicts the standardized kitchen 50 which in this case is configured as the standardized robotic kitchen, in which a dual-arm robotics system with vertical telescoping and rotating torso joint 360, outfitted with two arms 70 and two wristed and fingered hands 72, carries out the recipe replication processes defined in the recipe-script. The multi-modal sensor systems 66 continually monitor the robotically executed cooking steps in the multiple stages of the recipe replication process.

Figure 7C:
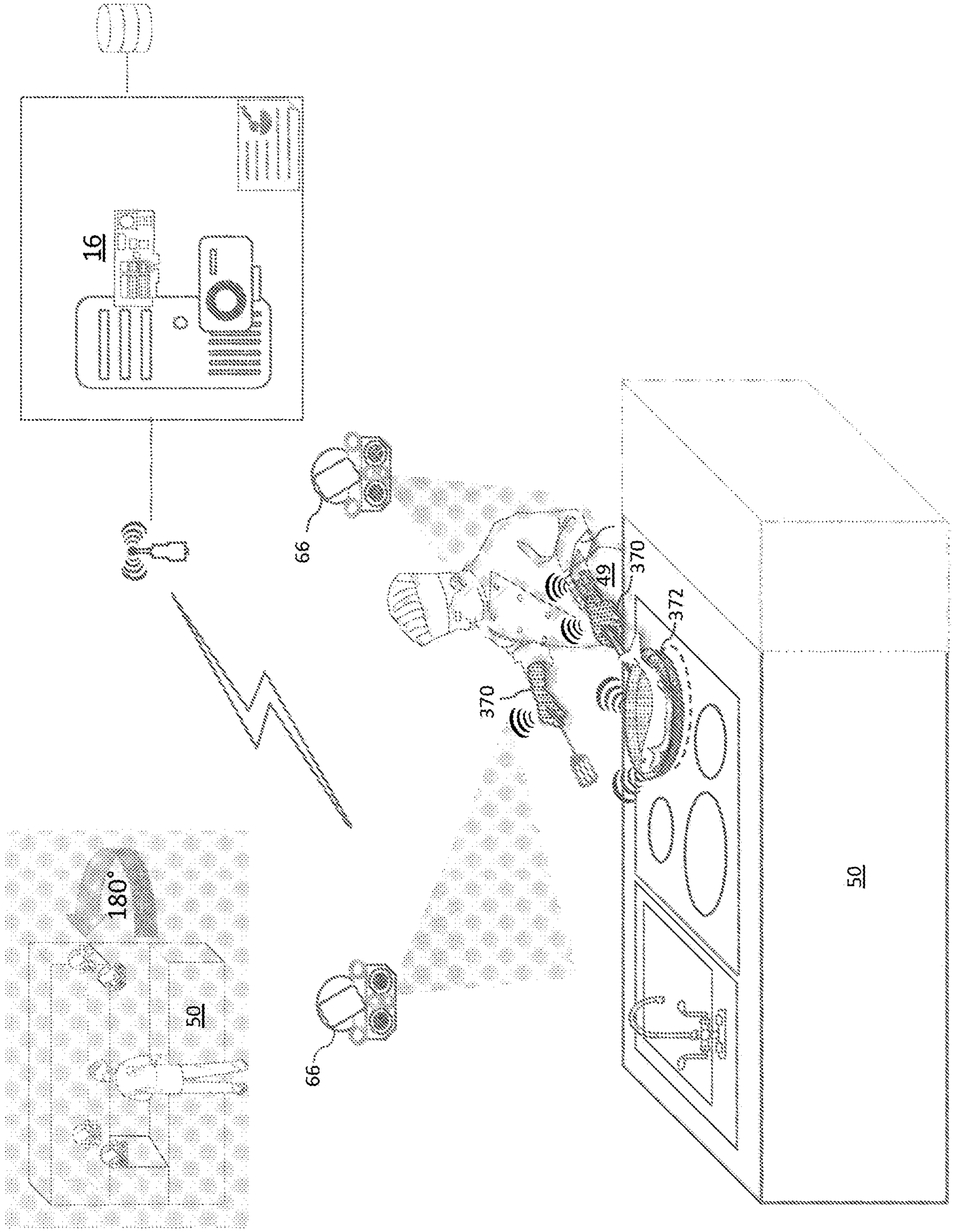
FIG. 7C is a block diagram illustrating one embodiment of a physical layout of the standardized robotic kitchen module used by a chef in accordance with the present invention.

FIG. 7C depicts the systems involved in the creation of a recipe-script by monitoring a human chef 49 during the entire recipe execution process. The same standardized kitchen 50 is used in a chef studio mode, with the chef able to operate the kitchen from either side of the work-module. Multi-modal sensors 66 monitor and collect data, as well as through the haptic gloves 370 worn by the chef and instrumented cookware 372 and equipment, relaying all collected raw data wirelessly to a processing computer 16 for processing and storage.

Figure 7D:
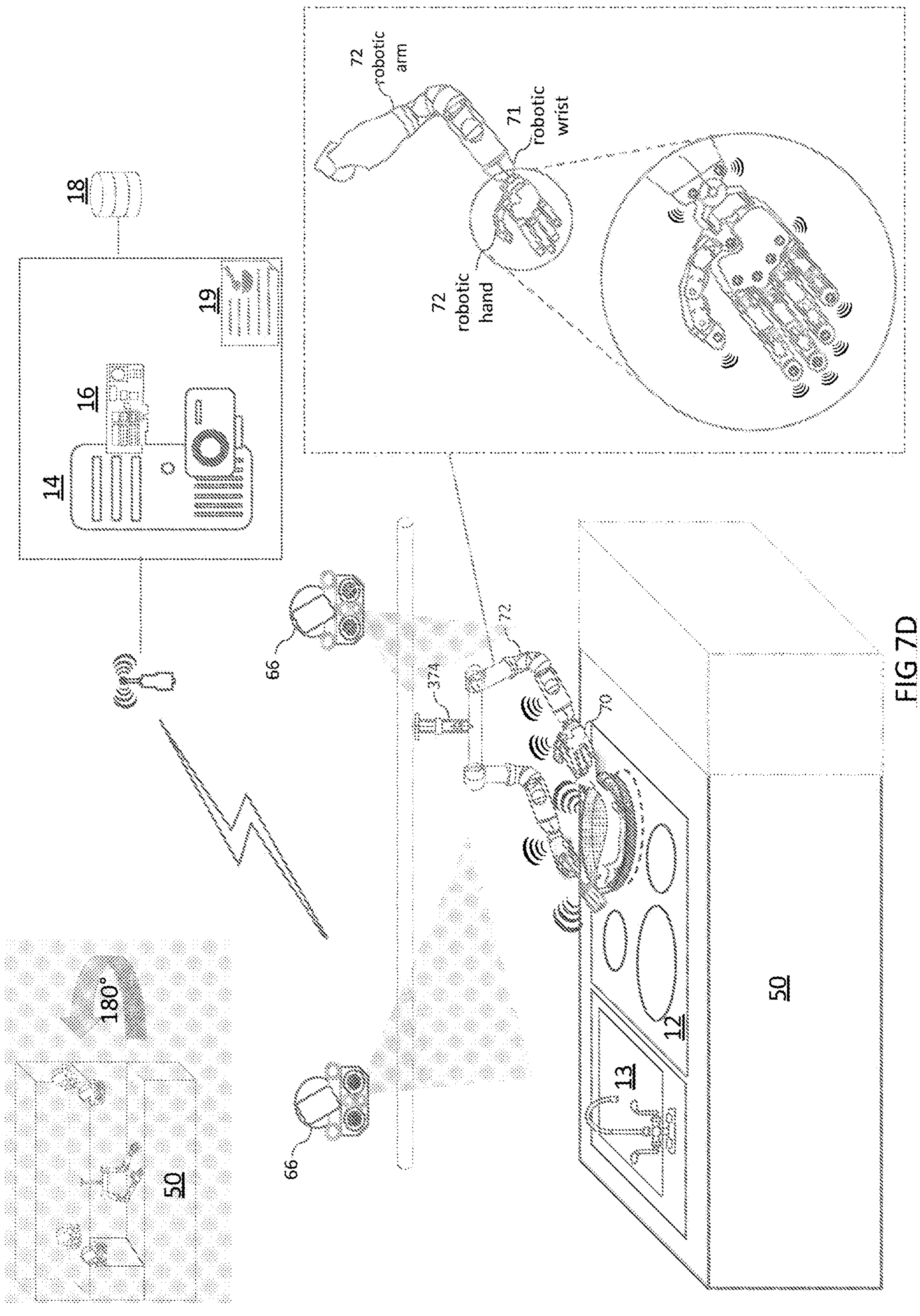
FIG. 7D is a block diagram illustrating one embodiment of a physical layout of the standardized robotic kitchen module used by a pair of robotic arms and hands in accordance with the present invention.

FIG. 7D depicts the systems involved in a standardized kitchen 50 for the replication of a recipe script 19 through the use of a dual-arm system with telescoping and rotating torso 374, comprised of two arms 72, two robotic wrists 71 and two multi-fingered hands 72 with embedded sensory skin and point-sensors. The robotic dual-arm system uses the instrumented arms and hands with a cooking utensil and an instrumented appliance and cookware (pan in this image) on a cooktop 12, while executing a particular step in the recipe replication process, while being continuously monitored by the multi-modal sensor units 66 to ensure the replication process is carried out as faithfully as possible to that created by the human chef. All data from the multi-modal sensors 66, dual-arm robotics system comprised of torso 74, arms 72, wrists 71 and multi-fingered hands 72, utensils, cookware and appliances, is wirelessly transmitted to a computer 16, where it is processed by an onboard processing unit 16 in order to compare and track the replication process of the recipe to as faithfully as possible follow the criteria and steps as defined in the previously created recipe script 19 and stored in media 18.

Figure 7E:
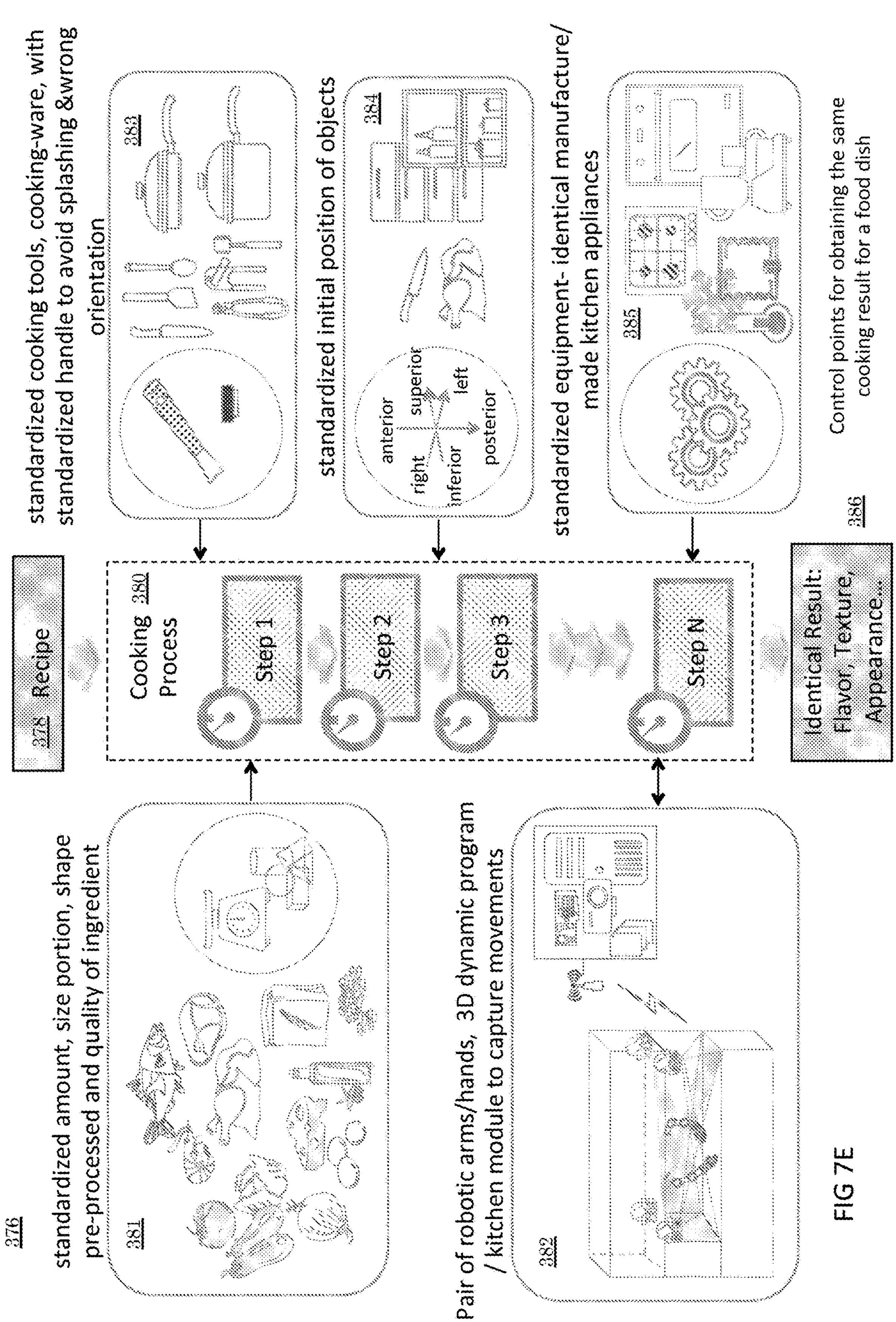
FIG. 7E is a block diagram depicting the stepwise flow and methods to ensure that there are control or verification points during the recipe replication process based on the recipe-script when executed by the standardized robotic kitchen in accordance with the present invention.

FIG. 7E is a block diagram depicting the stepwise flow and methods 376 to ensure that there are control or verification points during the recipe replication process based on the recipe-script when executed by the standardized robotic kitchen 50, that ensures as nearly identical as possible a cooking result for a particular dish as executed by the standardized robotic kitchen 50, when compared to the dish prepared by the human chef 49. Using a recipe 378, as described by the recipe-script and executed in sequential steps in the cooking process 380, the fidelity of execution of the recipe by the robotic kitchen 50 will depend largely on considering the following main control items. Key control items include the process of selecting and utilizing a standardized portion amount and shape of a high-quality and pre-processed ingredient 381, the use of standardized tools and utensils, cook-ware with standardized handles to ensure proper and secure grasping with a known orientation 383, standardized equipment 385 (oven, blender, fridge, fridge, etc.) in the standardized kitchen that is as identical as possible when comparing the chef studio kitchen where the human chef 49 prepares the dish and the standardized robotic kitchen 50, location and placement 384 for ingredients to be used in the recipe, and ultimately a pair of robotic arms, wrists and multi-fingered hands in a kitchen module 382 continually monitored by sensors with computer-controlled actions to ensure successful execution of each step in every stage of the replication process of the recipe-script for a particular dish. In the end the task of ensuring an identical result 386 is the ultimate goal for the standardized robotic kitchen 50.

Figure 8A:
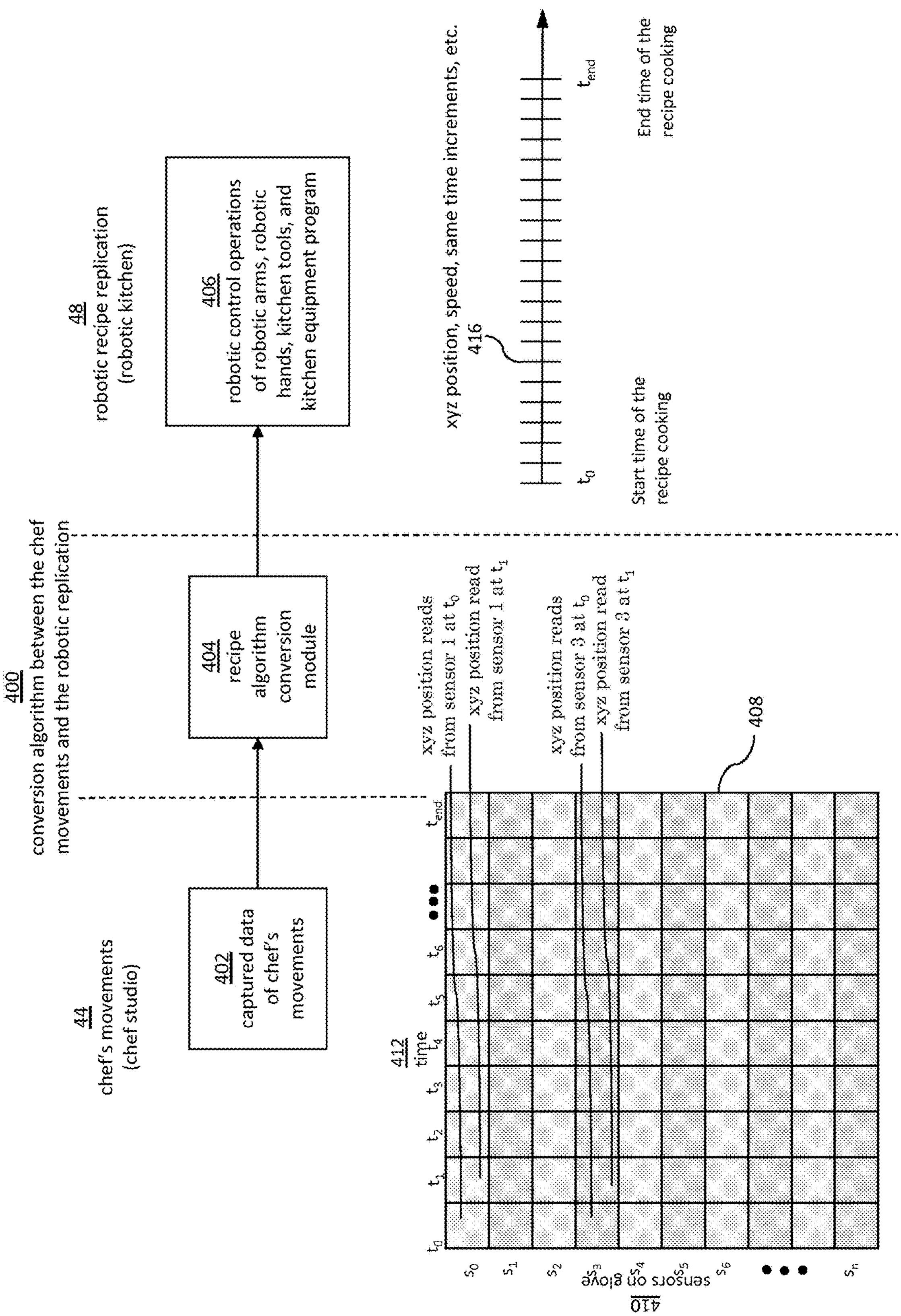
FIG. 8A is a block diagram illustrating one embodiment of a conversion algorithm module between the chef movements and the robotic mirror movements in accordance with the present invention.

FIG. 8A is a block diagram illustrating one embodiment of a recipe conversion algorithm module 400 between the chef's movements and the robotic replication movements. A recipe algorithm conversion module 404 converts the captured data from the chef's movements in the chef studio 44 into a machine-readable and machine-executable language 406 for instructing the robotic arms 70 and the robotic hands 72 to replicate a food dish prepared by the chef's movement in the robotic kitchen 48. In the chef studio 44, the computer 16 captures and records the chef's movements based on the sensors on a glove 26 that the chef wears, represented by a plurality of sensors $S_0, S_1, S_2, S_3, S_4, S_5, S_6 \ldots S_n$ in the vertical columns, and the time increments $t_0, t_1, t_2, t_3, t_4, t_5, t_6 \ldots t_{end}$ in the horizontal rows, in a table 408. At time $t_0$, the computer 16 records the xyz coordinate positions from the sensor data received from the plurality of sensors $S_0, S_1, S_2, S_3, S_4, S_5, S_6 \ldots S_n$. At time $t_1$, the computer 16 records the xyz coordinate positions from the sensor data received from the plurality of sensors $S_0, S_1, S_2, S_3, S_4, S_5, S_6 \ldots S_n$. At time $t_2$, the computer 16 records the xyz coordinate positions from the sensor data received from the plurality of sensors $S_0, S_1, S_2, S_3, S_4, S_5, S_6 \ldots S_n$. This process continues until the entire food preparation is completed at time $t_{end}$. The duration for each time units $t_0, t_1, t_2, t_3, t_4, t_5, t_6 \ldots t_{end}$ is the same. As a result of the captured and recorded sensor data, the table 408 shows any movements from the sensors $S_0, S_1, S_2, S_3, S_4, S_5, S_6 \ldots S_n$ in the glove 26 in xyz coordinates, which would indicate the differentials between the xyz coordinate positions for one specific time relative to the xyz coordinate positions for the next specific time. Effectively, the table 408 records how the chef's movements change over the entire food preparation process from the start time, $t_0$, to the end time, $t_{end}$. The illustration in this embodiment can be extended to two gloves 26 with sensors which the chef 49 wears to capture the movements while preparing a food dish. In the robotic kitchen 48, the robotic arms 70 and the robotic hands 72 replicate the recorded recipe from the chef studio 44, which is then converted to robotic instructions, where the robotic arms 70 and the robotic hands 72 replicate the food preparation of the chef 49 according to the timeline 416. The robotic arms 70 and hands 72 carry out the food preparation with the same xyz coordinate positions, at the same speed, with the same time increments from the start time, $t_0$, to the end time, $t_{end}$, as shown in the timeline 416.

In some embodiments a chef performs the same food preparation operation multiple times, yielding values of the sensor reading, and parameters in the corresponding robotic instructions that vary somewhat from one time to the next. The set of sensor readings for each sensor across multiple repetitions of the preparation of the same food dish provides a distribution with a mean, standard deviation and minimum and maximum values. The corresponding variations on the robotic instructions (also called the effector parameters) across multiple executions of the same food dish by the chef also define distributions with mean, standard deviation, minimum and maximum values. These distributions may be used to determine the fidelity (or accuracy) of subsequent robotic food preparations.

In one embodiment the estimated average accuracy of a robotic food preparation operation is given by:

$$A(C, R) = 1 - \frac{1}{n} \sum_{n=1,\ldots n} \frac{|c_i - p_i|}{\max(|c_{i,t} - p_{i,t}|}$$

Where C represents the set of Chef parameters ($1^{st}$ through $n^{th}$) and R represents the set of Robotic Apparatus parameters (correspondingly ($1^{st}$ through $n^{th}$). The numerator in the sum represents the difference between robotic and chef parameters (i.e. the error) and the denominator normalizes for the maximal difference). The sum gives the total normalized cumulative error $$\left(\text{i.e. } \sum_{n=1,\ldots n} \frac{|c_i - p_i|}{\max(|c_{i,t} - p_{i,t}|}\right)$$

and multiplying by 1/n gives the average error. The complement of the average error corresponds to the average accuracy.

Another version of the accuracy calculation weighs the parameters for importance, where each coefficient (each $\alpha_i$) represents the importance of the $i^{th}$ parameter, the normalized cumulative error is $$\sum_{n=1,\ldots n} \frac{a_i|c_i - p_i|}{\max(|c_{i,t} - p_{i,t}|}$$

and the estimated average accuracy is given by:

$$A(C, R) = 1 - \left(\sum_{n=1,\ldots n} \frac{a_i|c_i - p_i|}{\max(|c_{i,t} - p_{i,t}|}\right) \Big/ \sum_{i=1,\ldots n} \alpha_i$$

Figure 8B:
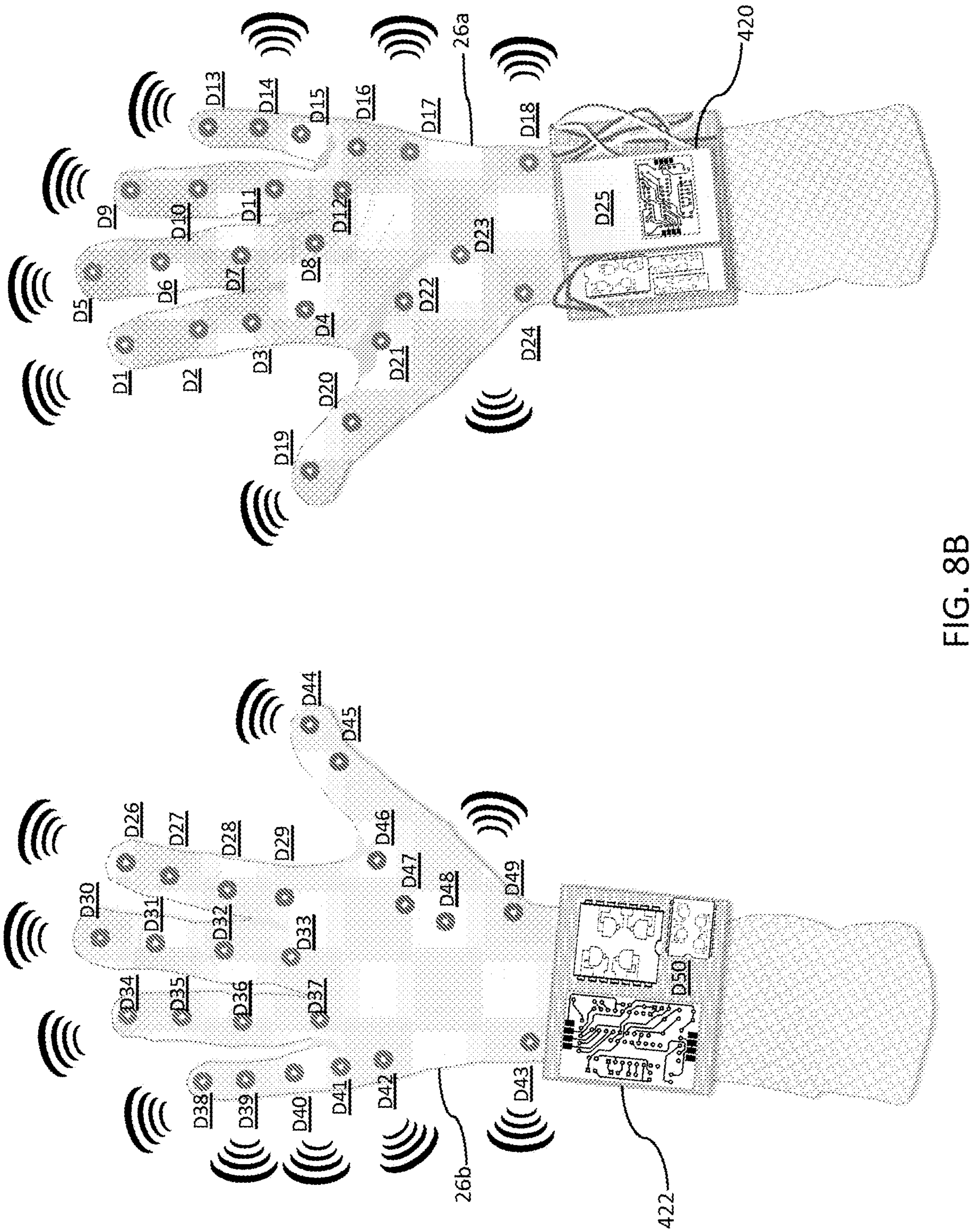
FIG. 8B is a block diagram illustrating a pair of gloves with sensors worn by the chef 49 for capturing and transmitting the chef's movements.

FIG. 8B is a block diagram illustrating the pair of gloves 26*a* and 26*b* with sensors worn by the chef 49 for capturing and transmitting the chef's movements. In this illustrative example, which is intended to show one example without limiting effects, a right hand glove 26*a* Includes 25 sensors to capture the various sensor data points D1, D2, D3, D4, D5, D6, D7, D8, D9, D10, D11, D12, D13, D14, D15, D16, D17, D18, D19, D20, D21, D22, D23, D24, and D25, on the glove 26*a*, which may have optional electronic and mechanical circuits 420. A left hand glove 26*b* Includes 25 sensors to capture the various sensor data points D26, D27, D28, D29, D30, D31, D32, D33, D34, D35, D36, D37, D38, D39, D40, D41, D42, D43, D44, D45, D46, D47, D48, D49, D50, on the glove 26*b*, which may have optional electronic and mechanical circuits 422.

Figure 8C:
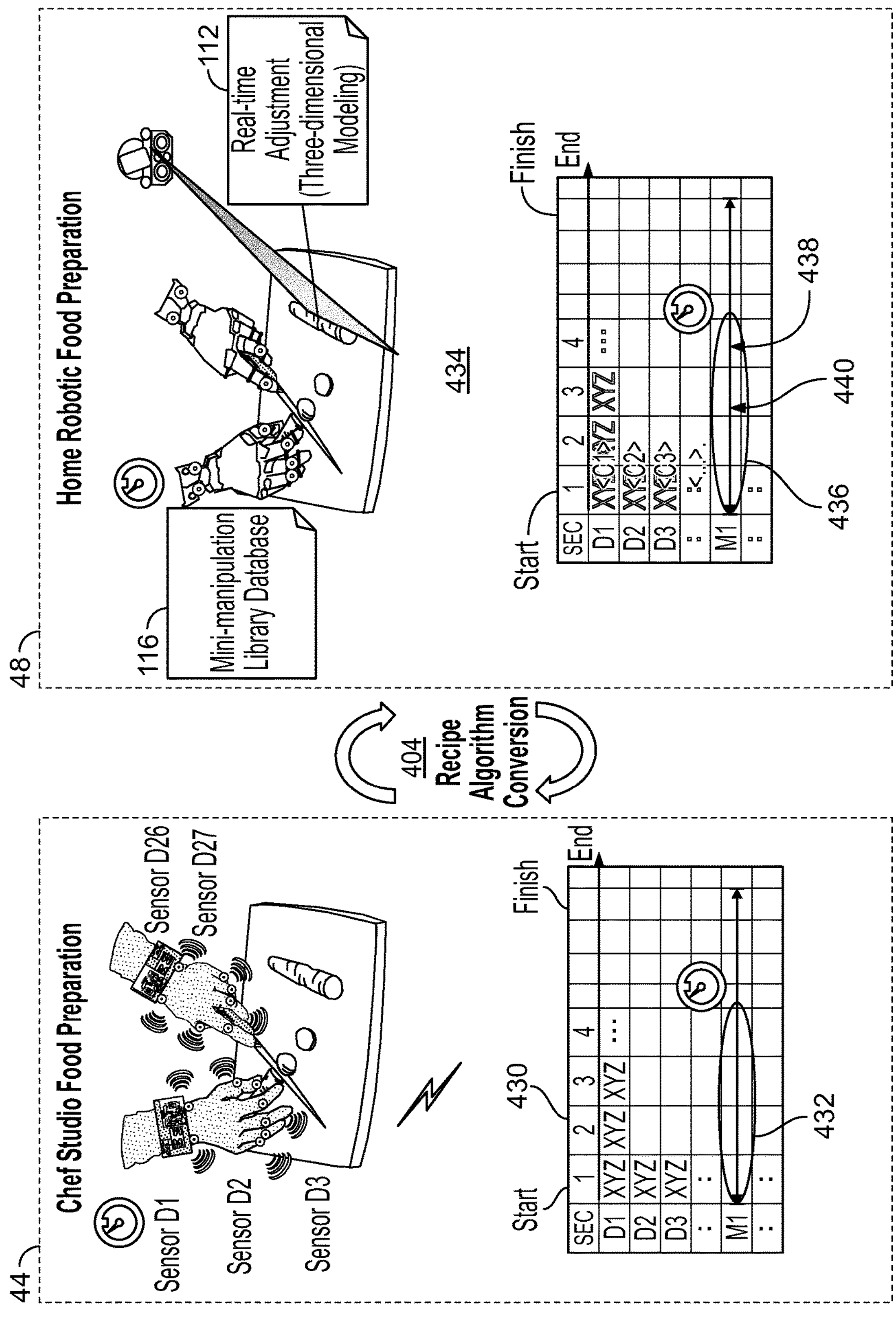
FIG. 8C is a block diagram illustrating robotic cooking execution based on the captured sensory data from the chef's gloves in accordance with the present invention.

FIG. 8C is a block diagram illustrating robotic cooking execution steps based on the captured sensory data from the chef's gloves 26*a* and 26*b*. In the chef studio 44, the chef 49 wears gloves 26*a* and 26*b* with sensors for capturing the food preparation process, where the sensor data are recorded in a table 430. In this example, the chef 49 is cutting a carrot with a knife in which each slice of the carrot is about 1 centimeter in thickness. These action primitives by the chef 49, as recorded by the gloves 26*a*, 26*b*, may constitute a mini-manipulation 432 that take place over time slots 1, 2, 3 and 4. The recipe algorithm conversion module 404 is configured to convert the recorded recipe file from the chef studio 44 to robotic instructions for operating the robotic arms 70 and the robotic hands 72 in the robotic kitchen 28 according to a software table 434. The robotic arms 70 and the robotic hands 72 prepare the food dish with control signals 436 for the mini-manipulation, as pre-defined in the mini-manipulation library 116, of cutting the carrot with knife in which each slice of the carrot is about 1 centimeter in thickness. The robotic arms 70 and the robotic hands 72 operate with the same xyz coordinates 438 and with possible real-time adjustment on the size and shape of a particular carrot by creating a temporary three-dimensional model 440 of the carrot from the real-time adjustment devices 112

Figure 8D:
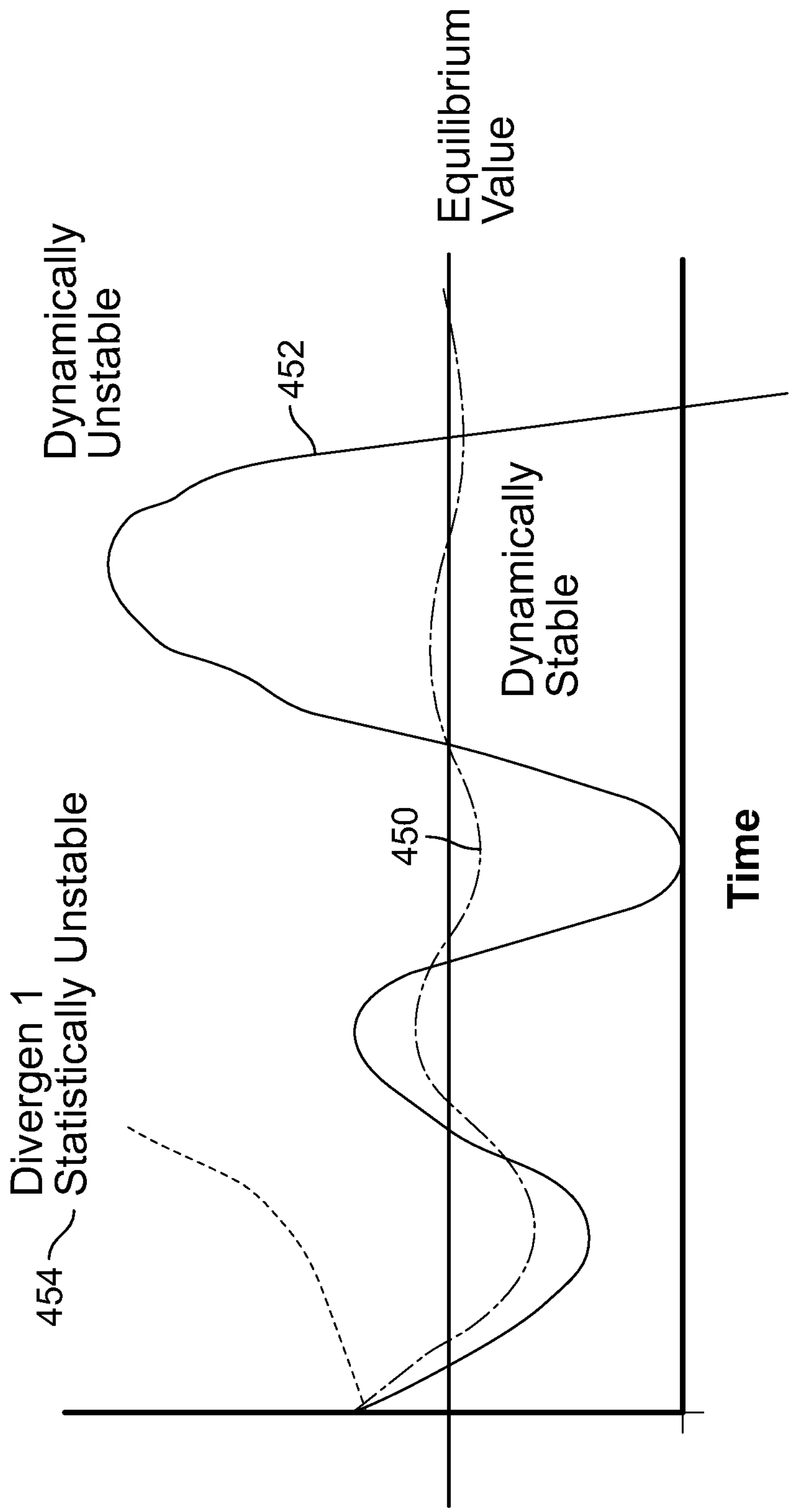
FIG. 8D is a graphical diagram illustrating dynamically stable and dynamically unstable curves relative to equilibrium.

In order to operate a mechanical robotic mechanism such as the ones described in the embodiments of this invention, a skilled artisan realizes that many mechanical and control problems need to be addressed, and the literature in robotics describes methods to do just that. The establishment of static and/or dynamic stability in a robotics system is an important consideration. Especially for robotic manipulation, dynamic stability is a strongly desired property, in order to prevent accidental breakage or movements beyond those desired or programmed. Dynamic stability is illustrated in FIG. 8D relative to equilibrium. Here the "equilibrium value" is the desired state of the arm (i.e. the arm moves to exactly where it was programmed to move to, with deviations caused by any number of factors such as inertia, centripetal or centrifugal forces, harmonic oscillations, etc. A dynamically-stable system is one where variations are small and dampen out over time, as represented by a curved line 450. A dynamically unstable system is one where variations fail to dampen and can increase over time, as depicted by a curved line 452. And the worst situation is when the arm is statically unstable (e.g. it cannot hold the weight of whatever it is grasping), and falls, or it fails to recover from any deviation from the programmed position and/or path, as illustrated by a curved line 454. For additional information on planning (forming sequences of mini-manipulations, or recovering when something goes wrong), Garagnani, M. (1999) "Improving the Efficiency of Processed Domain-axioms Planning", Proceedings of PLANSIG-99, Manchester, England, pp. 190-192, which this references is incorporated by reference herein in its entirety.

The cited literature addresses conditions for dynamic stability that are imported by reference into the present invention to enable proper functioning of the robotic arms. These conditions include the fundamental principle for calculating torque to the joints of a robotic arm:

$$\vec{T} = M(\vec{q})\frac{d^2\vec{q}}{dt^2} + C\left(\vec{q}, \frac{d\vec{q}}{dt}\right)d\vec{q}, + G(\vec{q})$$

where T is the torque vector (T has n components, each corresponding to a degree of freedom of the robotic arm), M is the inertial matrix of the system (M is a positive semi-definite n-by-n matrix), C is a combination of centripetal and centrifugal forces, also an n-by-n matrix, G(q) is the gravity vector, and q is the position vector. And they include finding stable points and minima, e.g. via the LaGrange equation if the robotic positions (x's) can be described by twice-differentiable functions (y's).

In order for the system comprised of the robotic arms and hands/grippers to be stable, it is important that the system be properly designed and built and have an appropriate sensing and control system which operates within the boundary of acceptable performance. The reason that this is important is that one wants to achieve the best (highest speed with highest position/velocity and force/torque tracking and all under stable conditions) performance possible given the physical system and what its controller is asking it to do.

When one speaks of proper design, the notion is one of achieving proper observability and controllability of the system. Observability implies that the key variables of the system (joint/finger positions and velocities, forces and torques) are measurable by the system, which implies one needs to have the ability to sense these variables, which in turn implies the presence and use of the proper sensing devices (internal or external). Controllability implies that one (computer in this case) have the ability to shape or control the key axes of the system based on observed parameters from internal/external sensors; this usually implies an actuator or direct/indirect control over a certain parameter by way of a motor or other computer-controlled actuation system. The ability to make the system as linear in its response as possible, thereby negating the detrimental effects of nonlinearities (stiction, backlash, hysteresis, etc.), allows for control schemes like PID gain-scheduling and nonlinear controllers like sliding-mode control to guarantee system stability and performance even in the light of system-modeling uncertainties (errors in mass/inertia estimates, dimensional geometry discretization, sensor/torque discretization anomalies, etc.) which are always present in any higher-performance control system.

Furthermore, the use of a proper computing and sampling system is significant, as the system's ability to follow rapid motions with a certain maximum frequency content is clearly related to what control bandwidth (closed-loop sampling rate of the computer control system) the entire system is able to achieve and thus the frequency-response (ability to track motions of certain speeds and motion-frequency content) the system is able to exhibit.

All the above characteristics are significant when it comes to ensuring that a highly redundant system can actually carry out the complex and dexterous tasks a human chef requires for a successful recipe-script execution, in both a dynamic and a stable fashion.

Machine learning in the context of robotic manipulation of relevance to the invention can involve well known methods for parameter adjustment, such as reinforcement learning. An alternate and preferred embodiment for this invention is a different and more appropriate learning technique for repetitive complex actions such as preparing and cooking a meal with multiple steps over time, namely case-based learning. Case-based reasoning, also known as analogical reasoning, has been developed over time.

As a general overview, case-based reasoning comprises the following steps:

A. Constructing and remembering cases. A case is a sequence of actions with parameters that are successfully carried out to achieve an objective. The parameters include distances, forces, directions, positions, and other physical or electronic measures whose values are required to successfully carry out the task (e.g. a cooking operation). First, 1. storing aspects of the problem that was just solved together with:
2. the method(s) and optionally intermediate steps to solve the problem and its parameter values, and
3. (typically) storing the final outcome.

B. Applying cases (at a later point of time)

4. Retrieving one or more stored cases whose problems bear strong similarity to the new problem,
5. Optionally adjusting the parameters from the retrieved case(s) to apply to the current case (e.g. an item may weigh somewhat more, and hence a somewhat stronger force is needed to lift it),
6. Using the same methods and steps from the case(s) with the adjusted parameters (if needed) at least in part to solve the new problem.

Hence, case-based reasoning consists of remembering solutions to past problems and applying them with possible parametric modification to new very similar problems. However, in order to apply case-based reasoning to the robotic manipulation challenge, something more is needed. Variation in one parameter of the solution plan will cause variation in one or more coupled parameters. This requires transformation of the problem solution, not just application. We call the new process case-based robotic learning since it generalizes the solution to a family of close solutions (those corresponding to small variations in the input parameters—such as exact weight, shape and location of the input ingredients). Case-based robotic learning operates as follows:

C. Constructing, remembering and transforming robotic manipulation cases

1. Storing aspects of the problem that was just solved together with:
2. The value of the parameters (e.g. the inertial matrix, forces, etc. from equation 1),
3. Perform perturbation analysis by varying the parameter(s) pertinent to the domain (e.g. in cooking, vary the weight of the materials or their exact starting position), to see how much parameter values can vary and still obtain the desired results,
4. Via perturbation analysis on the model, record which other parameter values will change (e.g. forces) and by how much they should change, and
5. If the changes are within operating specification of the robotic apparatus, store the transformed solution plan (with the dependencies among parameters and projected change calculations for their values).

D. Applying cases (at a later point of time)

6. Retrieve one or more stored cases with the transformed exact values (now ranges, or calculations for new values depending on values of the input parameters), but still whose initial problems bear strong similarity to the new problem, including parameter values and value ranges, and
7. Use the transformed methods and steps from the case(s) at least in part to solve the new problem.

As the chef teaches the robot (the two arms and the sensing devices, such as haptic feedback from fingers, force-feedback from joints, and one or more observation cameras), the robot learns not only the specific sequence of movements, and time correlations, but also the family of small variations around the chef's movements to be able to prepare the same dish regardless of minor variations in the observable input parameters—and thus it learns a generalized transformed plan, giving it far greater utility than rote memorization. For additional information on case-based reasoning and learning, see materials by Leake, 1996 Book, Case-Based Reasoning: Experiences, Lessons and Future Directions, http://journals.cambridge.org/action/displayAbstract?fromPage=online&aid=4068324&fileld=S0269888900006585dl.acm.org/citation.cfm?id=524680; Carbonell, 1983, Learning by Analogy: Formulating and Generalizing Plans from Past Experience, http://link.springer.com/chapter/10.1007/978-3-662-12405-5_5, which these references are incorporated by reference herein in their entireties.

Figure 8E:
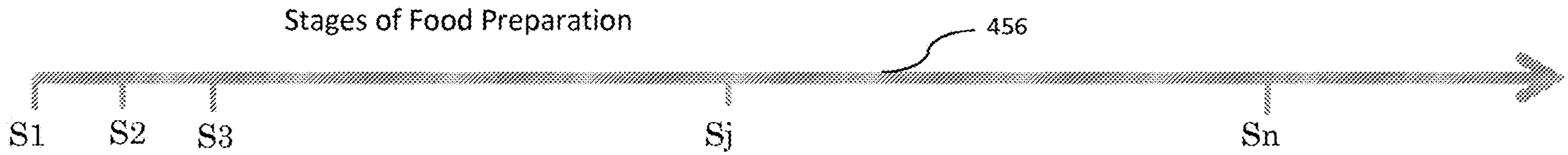
FIG. 8E is a sequence diagram illustrating the process of food preparation that requires a sequence of steps that are referred to as stages in accordance with the present invention.

As depicted in FIG. 8E, the process of cooking requires a sequence of steps that are referred to as a plurality of stages $S_1, S_2, S_3 \ldots S_j \ldots S_n$ of food preparation, as shown in a timeline 456. These may require strict linear/sequential ordering or some may be performed in parallel; either way we have a set of stages $\{S_1, S_2, \ldots, S_i, \ldots, S_n\}$, all of which must be completed successfully to achieve overall success. If the probability of success for each stage is $P(s_i)$ and there are n stages, then the probability of overall success is estimated by the product of the probability of success at each stage:

$$P(S) = \prod_{S_i \in S} P(s_i)$$

A person of skill in the art will appreciate that the probability of overall success can be low even if the probability of success of individual stages is relatively high. For instance, given 10 stages and a probability of success of each stage being 90%, the probability of overall success is $(0.9)^{10}=0.28$ or 28%.

A stage in preparing a food dish comprises one or more mini-manipulations, where each mini-manipulation comprises one or more robotic actions leading to a well-defined intermediate result. For instance, slicing a vegetable can be a mini-manipulation consisting of grasping the vegetable with one hand, grasping a knife with the other, and applying repeated knife movements until the vegetable is sliced. A stage in preparing a dish can comprise one or multiple slicing mini-manipulations.

The probability of success formula applies equally well at the level of stages and at the level of mini-manipulations, so long as each mini-manipulation is relatively independent of other mini-manipulations.

In one embodiment, in order to mitigate the problem of reduced certainty of success due to potential compounding errors, standardized methods for most or all of the mini-manipulations in all of the stages are recommended. Standardized operations are ones that can be pre-programmed, pre-tested, and if necessary pre-adjusted to select the sequence of operations with the highest probability of success. Hence, if the probability of standardized methods via the mini-manipulations within stages is very high, so will be the overall probability of success of preparing the food dish, due to the prior work, until all of the steps have been perfected and tested. For instance, to return to the above example, if each stage utilizes reliable standardized methods, and its success probability is 99% (instead of 90% as in the earlier example), then the overall probability of success will be $(0.99)^{10}=90.4\%$, assuming there are 10 stages as before. This is clearly better than 28% probability of an overall correct outcome.

In another embodiment, more than one alternative method is provided for each stage, wherein, if one alternative fails, another alternative is tried. This requires dynamic monitoring to determine the success or failure of each stage, and the ability to have an alternate plan. The probability of success for that stage is the complement of the probability of failure for all of the alternatives, which mathematically is written as:

$$P(s_i \mid A(s_i)) = 1 - \prod_{a_j \in A(s_i)} (1 - P(s_i \mid a_j))$$

In the above expression $s_i$ is the stage and $A(s_i)$ is the set of alternatives for accomplishing $S_i$. The probability of failure for a given alternative is the complement of the probability of success for that alternative, namely $1-P(s_i|a_j)$, and the probability of all the alternatives failing is the product in the above formula. Hence, the probability that not all will fail is the complement of the product. Using the method of alternatives, the overall probability of success can be estimated as the product of each stage with alternatives, namely:

$$P(S) = \prod_{S_i \in S} P(s_i \mid A(s_i))$$

With this method of alternatives, if each of the 10 stages had 4 alternatives, and the expected success of each alternative for each stage was 90%, then the overall probability of success would be $(1-(1-(0.9))^4)^{10}=0.99$ or 99% versus just 28% without the alternatives. The method of alternatives transforms the original problem from a chain of stages with multiple single points of failure (if any stage fails) to one without single points of failure, since all the alternatives would need to fail in order for any given stage to fail, providing more robust outcomes.

In another embodiment, both standardized stages comprising standardized mini-manipulations, and alternate means of the food dish preparation stages are combined, yielding even more robust behavior. In such a case, the corresponding probability of success can be very high, even if alternatives are only present for some of the stages or mini-manipulations.

In another embodiment only the stages with lower probability of success are provided alternatives, in case of failure, for instance stages for which there is no very reliable standardized method, or for which there is potential variability, e.g. depending on odd-shaped materials. This embodiment reduces the burden of providing alternatives to all stages.

Figure 8F:
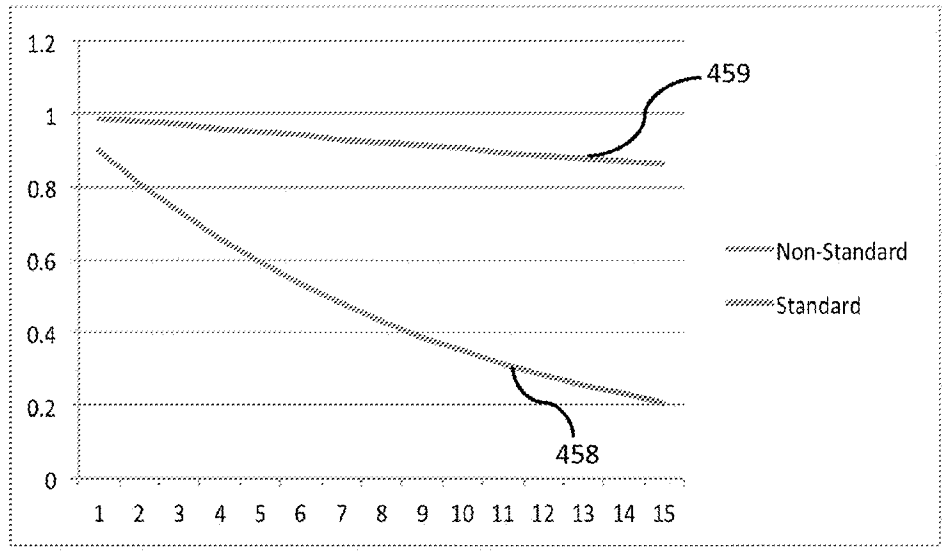
FIG. 8F is a graphical diagram illustrating the probability of overall success as a function of the number of stages to prepare a food dish in accordance with the present invention.

FIG. 8F is a graphical diagram showing the probability of overall success (y-axis) as a function of the number of stages needed to cook a food dish (x-axis) for a first curve 458 illustrating a non-standardized kitchen 458 and a second curve 459 illustrating the standardized kitchen 50. In this example, the assumption made is that the individual probability of success per food preparation stage was 90% for a non-standardized operation and 99% for a standardized pre-programmed stage. The compounded error is much worse in the former case, as shown in the curve 458 compared to the curve 459.

Figure 8G:
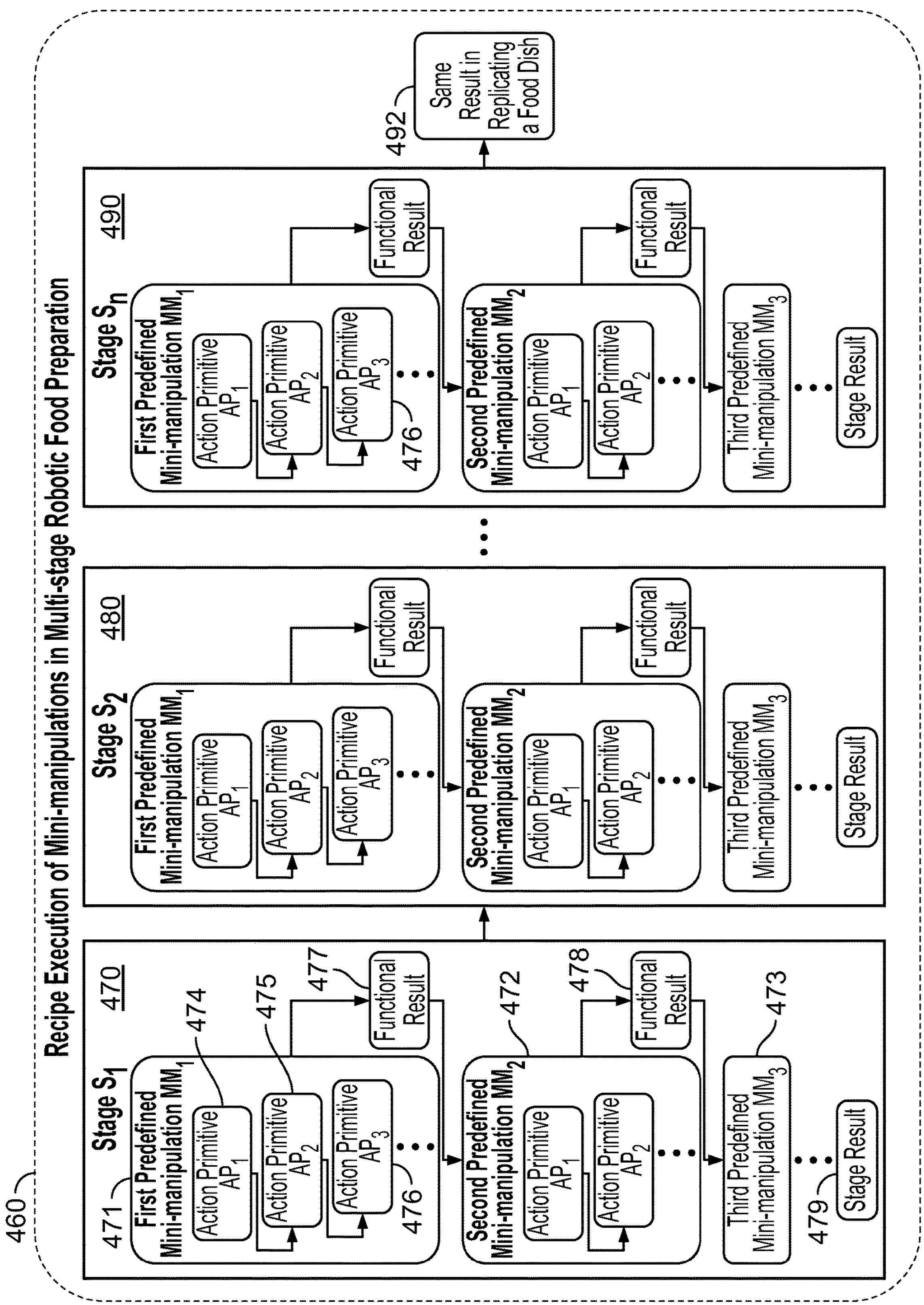
FIG. 8G is a block diagram illustrating the execution of a recipe with multi-stage robotic food preparation with mini-manipulations and action primitives.

FIG. 8G is a block diagram illustrating the execution of a recipe 460 with multi-stage robotic food preparation with mini-manipulations and action primitives. Each food recipe 460 can be divided into a plurality of food preparation stages: a first food preparation stage $S_1$ 470, a second food preparation stage $S_2$ . . . an n-stage food preparation stage $S_n$ 490, as executed by the robotic arms 70 and the robotic hands 72. The first food preparation stage $S_1$ 470 comprises one or more mini-manipulations $MM_1$ 471, $MM_2$ 472, and $MM_3$ 473. Each mini-manipulation includes one or more action primitives which obtains a functional result. For example, the first mini-manipulation $MM_1$ 471 includes a first action primitive $AP_1$ 474, a second action primitive $AP_2$ 475, and a third action primitive $AP_3$ 475, which then achieves a functional result 477. The one or more mini-manipulations $MM_1$ 471, $MM_2$ 472, $MM_3$ 473 in the first stage $S_1$ 470 then accomplish a stage result 479. The combination of one or more food preparation stage $S_1$ 470, the second food preparation stage $S_2$ and the n-stage food preparation stage $S_n$ 490 produces substantially the same or the same result by replicating the food preparation process of the chef 49 as recorded in the chef studio 44.

A predefined mini-manipulation is available to achieve each functional result (e.g., the egg is cracked). Each mini-manipulation comprises of a collection of action primitives which act together to accomplish the functional result. For example, the robot may begin by moving its hand towards the egg, touching the egg to localize its position and verify its size, and executing the movements and sensing actions necessary to grasp and lift the egg into the known and predetermined configuration.

Multiple mini-manipulations may be collected into stages such as making a sauce for convenience in understanding and organizing the recipe. The end result of executing all of the mini-manipulations to complete all of the stages is that a food dish has been replicated with a consistent result each time.

Figure 9A:
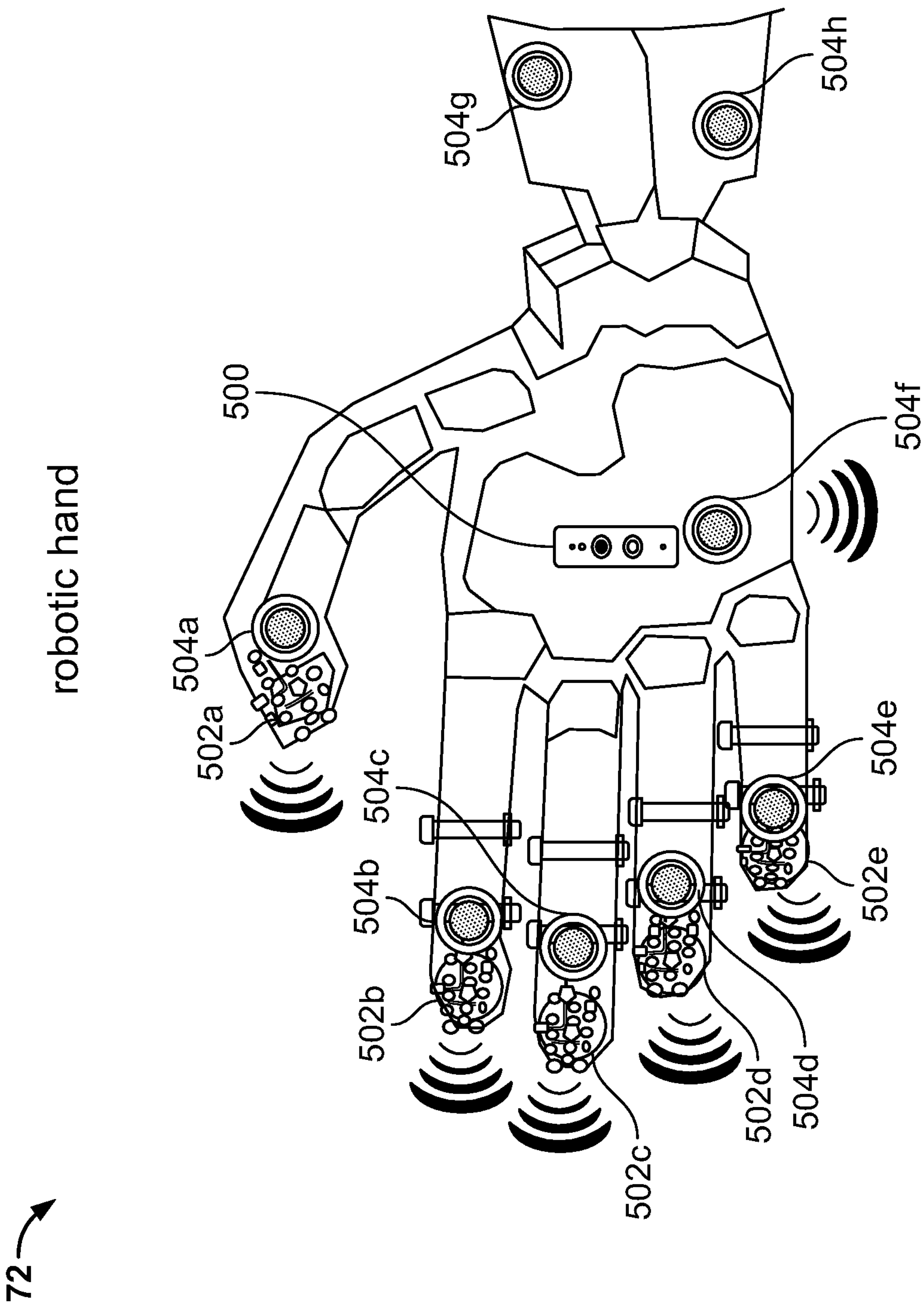
FIG. 9A is a block diagram illustrating an example of robotic hand and wrist with haptic vibration, sonar, and camera sensors for detecting and moving a kitchen tool, an object, or a piece of kitchen equipment in accordance with the present invention.

FIG. 9A is a block diagram illustrating an example of the robotic hand 72 with five fingers and a wrist with RGB-D sensor, camera sensors and sonar sensor capabilities for detecting and moving a kitchen tool, an object, or an item of kitchen equipment. The palm of the robotic hand 72 includes an RGB-D sensor 500, a camera sensor or a sonar sensor 504*f*. Alternatively, the palm of the robotic hand 450 includes both the camera sensor and the sonar sensor. The RGB-D sensor 500 or the sonar sensor 504*f* is capable of detecting the location, dimensions and shape of the object to create a three-dimensional model of the object. For example, the RGB-D sensor 500 uses structured light to capture the shape of the object, three-dimensional mapping and localization, path planning, navigation, object recognition and people tracking. The sonar sensor 504*f* uses acoustic waves to capture the shape of the object. In conjunction with the camera sensor 452 and/or the sonar sensor 454, the video camera 66 placed somewhere in the robotic kitchen, such as on a railing, or on a robot, provides a way to capture, follow, or direct the movement of the kitchen tool as used by the chef 49, as illustrated in FIG. 7A. The video camera 66 is positioned at an angle and some distance away from the robotic hand 72, and therefore provides a higher-level view of the robotic hand's 72 gripping of the object, and whether the robotic hand has gripped or relinquished/released the object. A suitable example of RGB-D (a red light beam, a green light beam, a blue light beam, and depth) sensor is the Kinect system by Microsoft, which features an RGB camera, depth sensor and multi-array microphone running on software, which provide full-body 3D motion capture, facial recognition and voice recognition capabilities.

The robotic hand 72 has the RGB-D sensor 500 placed in or near the middle of the palm for detecting the distance and shape of an object, as well as the distance of the object, and for handling a kitchen tool. The RGB-D sensor 500 provides guidance to the robotic hand 72 in moving the robotic hand 72 toward the direction of the object and to make necessary adjustments to grab an object. Second, a sonar sensor 502*f* and/or a tactile pressure sensor are placed near the palm of the robotic hand 72, for detecting the distance and shape, and subsequent contact, of the object. The sonar sensor 502*f* can also guide the robotic hand 72 to move toward the object. Additional types of sensors in the hand may include ultrasonic sensors, lasers, radio frequency identification (RFID) sensors, and other suitable sensors. In addition, the tactile pressure sensor serves as a feedback mechanism so as to determine whether the robotic hand 72 continues to exert additional pressure to grab the object at such point where there is sufficient pressure to safely lift the object. In addition, the sonar sensor 502*f* in the palm of the robotic hand 72 provides a tactile sensing function to grab and handle a kitchen tool. For example, when the robotic hand 72 grabs a knife to cut beef, the amount of pressure that the robotic hand exerts on the knife and applies to the beef can be detected by the tactile sensor when the knife finishes slicing the beef, i.e. when the knife has no resistance, or when holding an object. The pressure distributed is not only to secure the object, but also not to break it (e.g. an egg).

Furthermore, each finger on the robotic hand 72 has haptic vibration sensors 502*a-e* and sonar sensors 504*a-e* on the respective fingertips, as shown by a first haptic vibration sensor 502*a* and a first sonar sensor 504*a* on the fingertip of the thumb, a second haptic vibration sensor 502*b* and a second sonar sensor 504*b* on the fingertip of the index finger, a third haptic vibration sensor 502c and a third sonar sensor 504c on the fingertip of the middle finger, a fourth haptic vibration sensor 502d and a fourth sonar sensor 504d on the fingertip of the ring finger, and a fifth haptic vibration sensor 502e and a fifth sonar sensor 504e on the fingertip of the pinky. Each of the haptic vibration sensors 502a, 502b, 502c, 502d and 502e can simulate different surfaces and effects by varying the shape, frequency, amplitude, duration and direction of a vibration. Each of the sonar sensors 504a, 504b, 504c, 504d and 504e provides sensing capability on the distance and shape of the object, sensing capability for the temperature or moisture, as well as feedback capability. Additional sonar sensors 504g and 504h are placed on the wrist of the robotic hand 72.

Figure 9B:
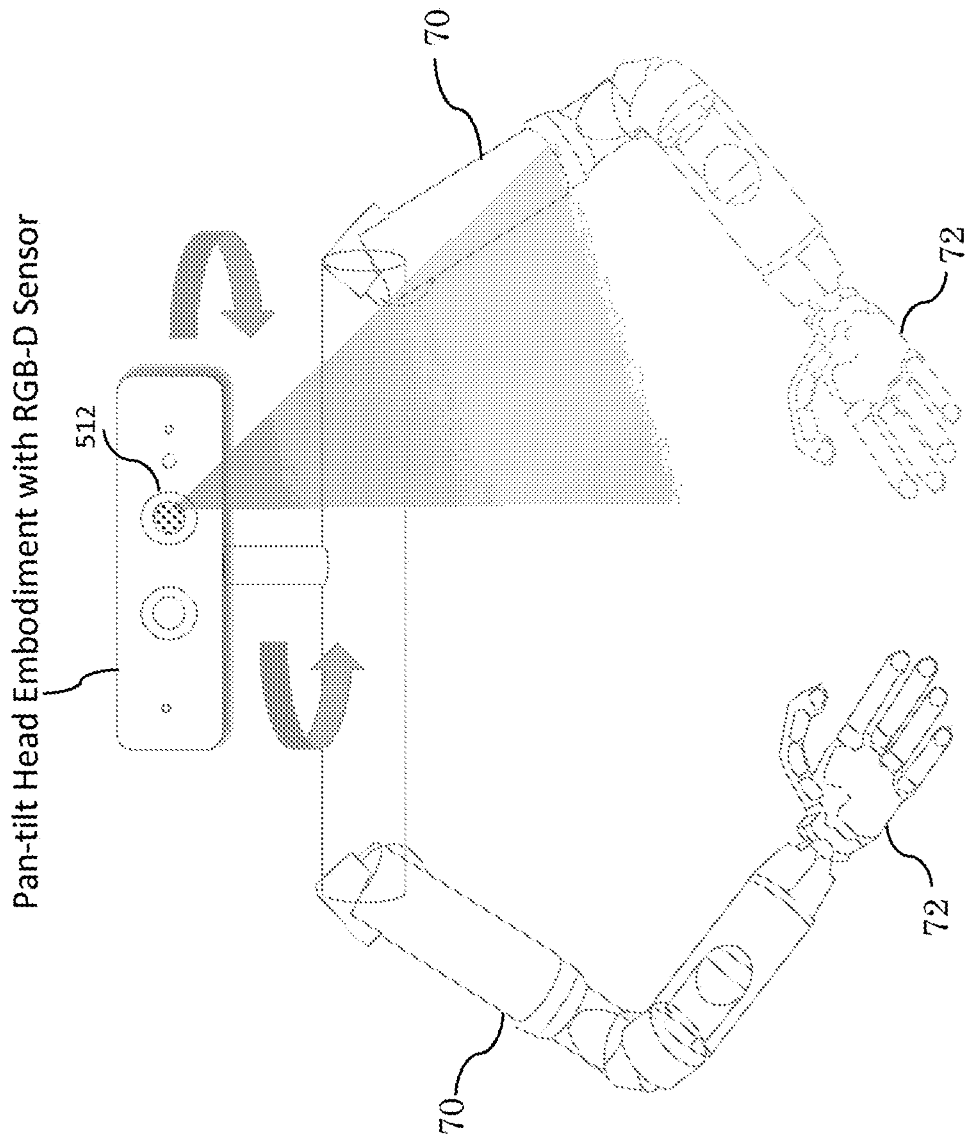
FIG. 9B is a block diagram illustrating a pan-tilt head with sensor camera coupled to a pair of robotic arms and hands for operation in the standardized robotic kitchen in accordance with the present invention.

FIG. 9B is a block diagram illustrating one embodiment of a pan-tilt head 510 with a sensor camera 512 coupled to a pair of robotic arms and hands for operation in the standardized robotic kitchen. The pan-tilt head 510 has an RGB-D sensor 512 for monitoring, capturing or processing information and three-dimensional images within the standardized robotic kitchen 50. The pan-tilt head 510 provides good situational awareness which is independent of arm and sensor motions. The pan-tilt head 510 is coupled to the pair of robotic arms 70 and hands 72 for executing food preparation processes, but the pair of robotic arms 70 and hands 72 may cause occlusions.

Figure 9C:
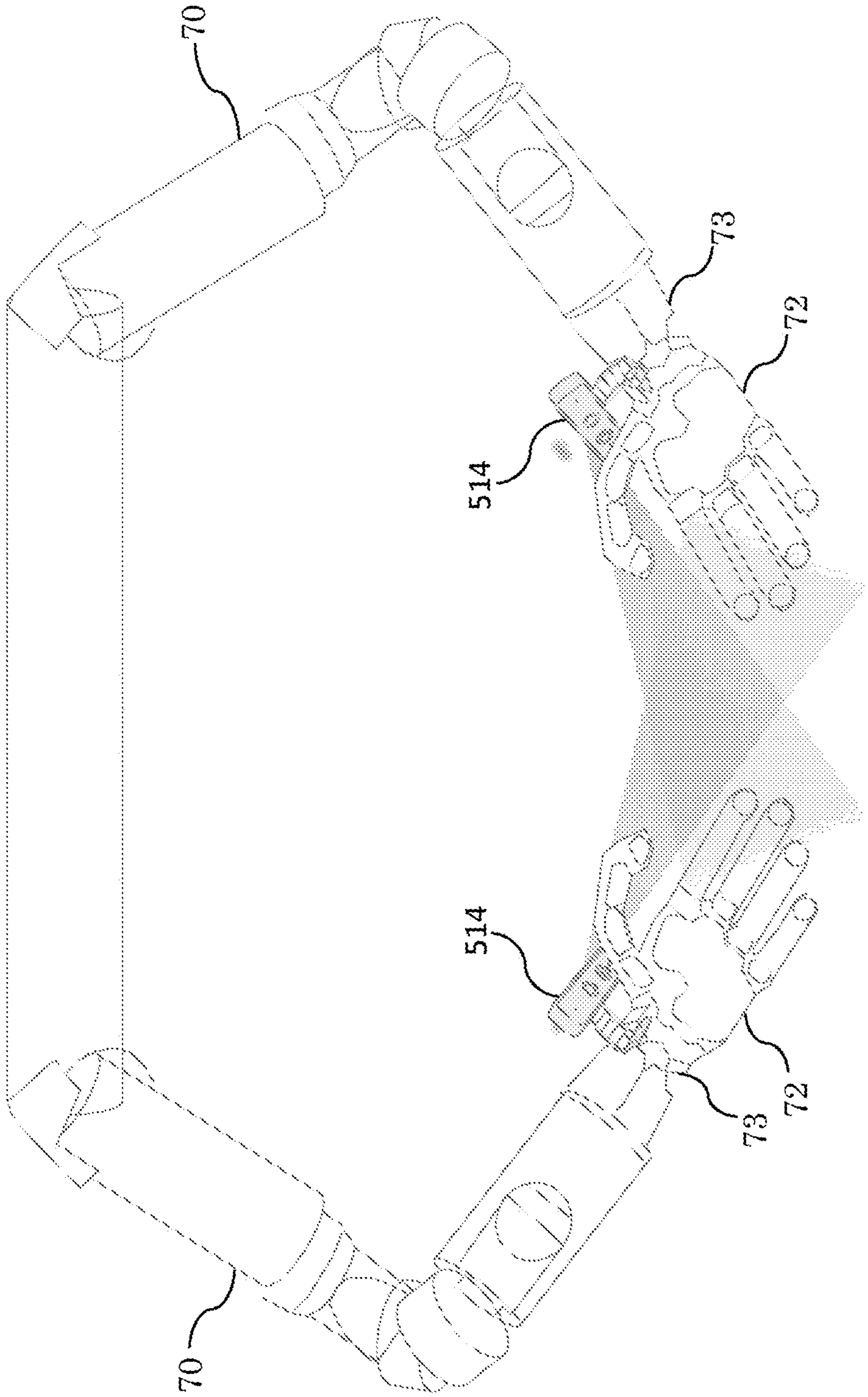
FIG. 9C is a block diagram illustrating sensor cameras on the robotic wrists for operation in the standardized robotic kitchen in accordance with the present invention.

FIG. 9C is a block diagram illustrating sensor cameras 514 on the robotic wrists 73 for operation in the standardized robotic kitchen 50. One embodiment of the sensor cameras 514 is an RGB-D sensor that provides color image and depth perception mounted to the wrists 73 of the respective hand 72. Each of the camera sensors 514 on the respective wrist 73 provides limited occlusions by an arm, while generally not occluded when the robotic hand 72 grasps an object. However, the RGB-D sensors 514 may be occluded by the respective robotic hand 72.

Figure 9D:
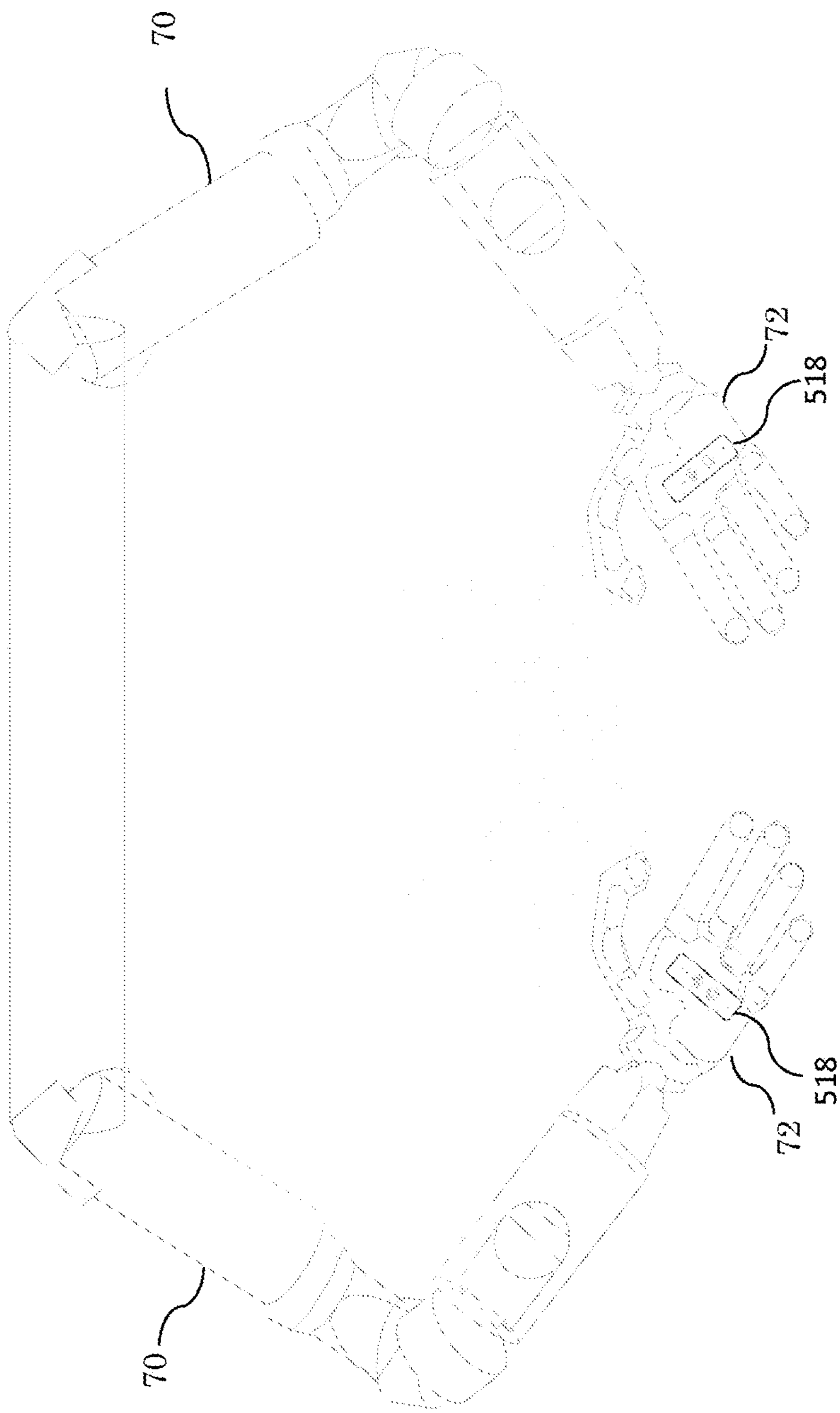
FIG. 9D is a block diagram illustrating an eye-in-hand on the robotic hands for operation in the standardized robotic kitchen in accordance with the present invention.

FIG. 9D is a block diagram illustrating an eye-in-hand 518 on the robotic hands 72 for operation in the standardized robotic kitchen 50. Each hand 72 has a sensor, such as an RGD-D sensor for providing an eye-in-hand function by the robotic hand 72 in the standardized robotic kitchen 50. The eye-in-hand 518 with RGB-D sensor in each hand provides high image details with limited occlusions by the respective robotic arm 70 and the respective robotic hand 72. However, the robotic hand 72 with the eye-in-hand 518 may encounter occlusions when grasping an object.

Figure 9E:
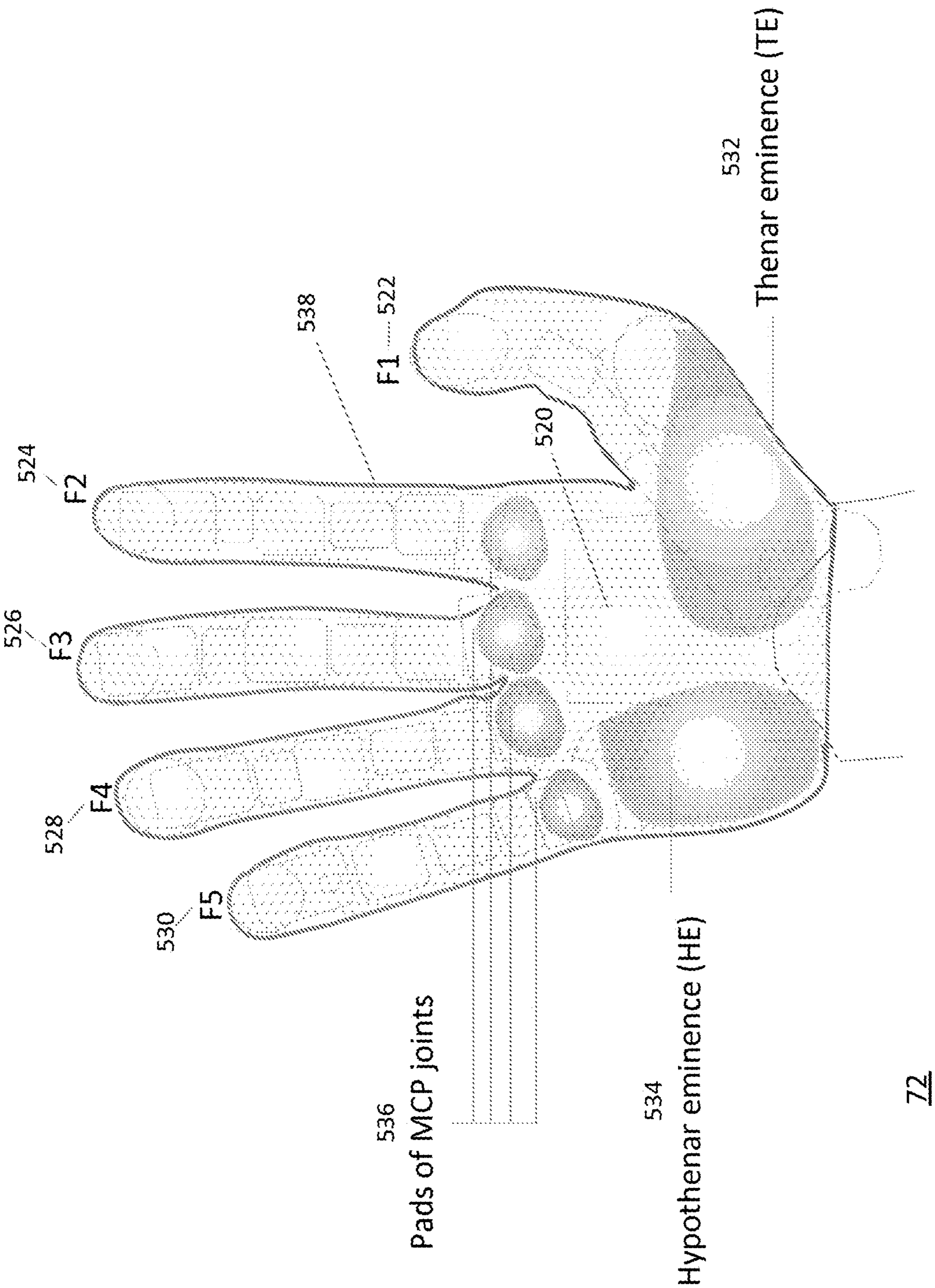
FIGS. 9E-I are pictorial diagrams illustrating aspects of deformable palm in a robotic hand in accordance with the present invention.
Figure 9F:
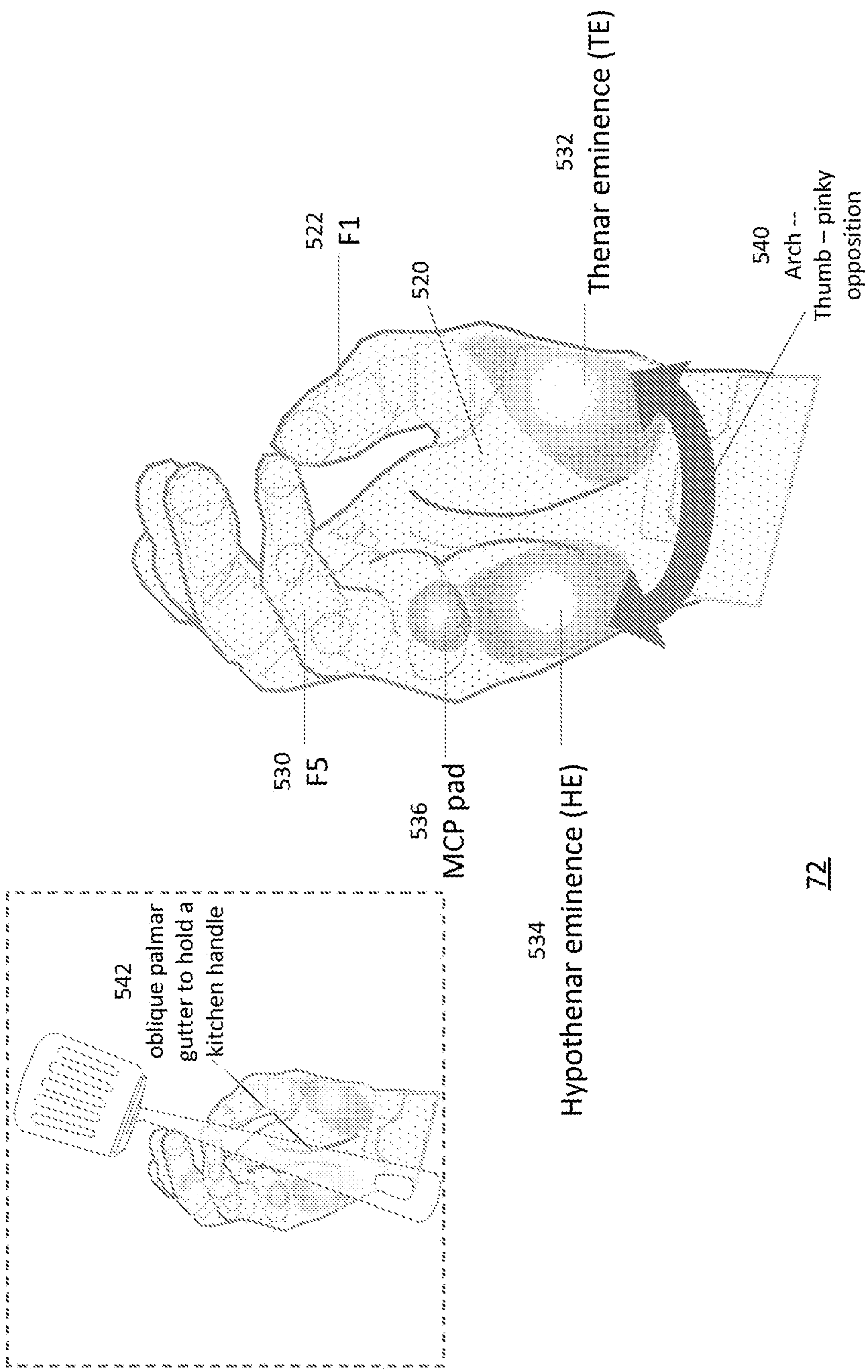
Figure 9G:
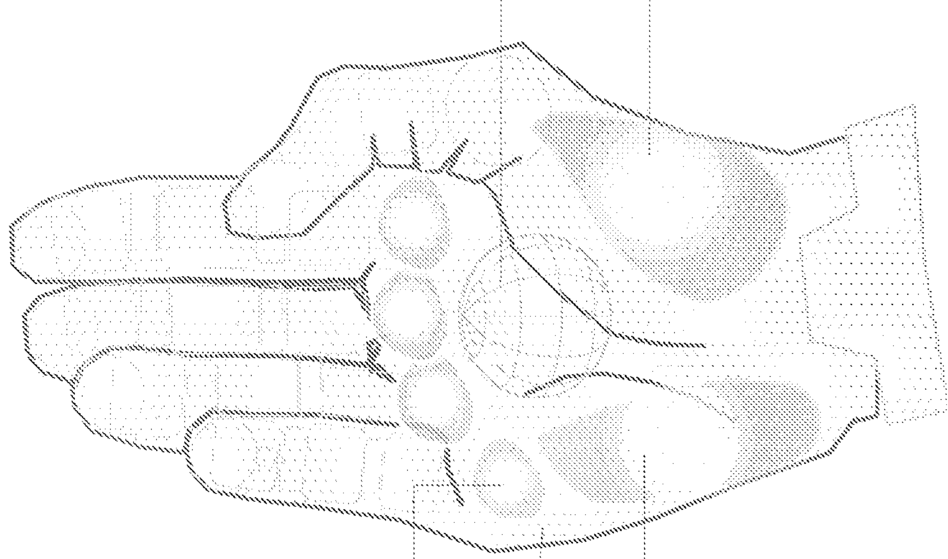

FIGS. 9E-G are pictorial diagrams illustrating aspects of a deformable palm 520 in the robotic hand 72. The fingers of a five-fingered hand are labeled with the thumb as a first finger F1 522, the index finger as a second finger F2 524, the middle finger as a third finger F3 526, the ring finger as a fourth finger F4 528, and the little finger as a fifth finger F5 530. The thenar eminence 532 is a convex volume of deformable material on the radial (the first finger F1 522) side of the hand. The hypothenar eminence 534 is a convex volume of deformable material on the ulnar (the fifth finger F5 530) side of the hand. The metacarpophalangeal pads (MCP pads) 536 are convex deformable volumes on the ventral (palmar) side of the metacarpophalangeal (knuckle) joints of second, third, fourth and fifth fingers F2 524, F3 526, F4 528, F5 530. The robotic hand 72 with the deformable palm 520 wears a glove on the outside with a soft human-like skin.

Together the thenar eminence 532 and hypothenar eminence 534 support application of large forces from the robot arm to an object in the working space such that application of these forces puts minimal stress on the robot hand joints (e.g., picture of the rolling pin). Extra joints within the palm 520 themselves are available to deform the palm. The palm 520 should deform in such a way as to enable the formation of an oblique palmar gutter for tool grasping in a way similar to a chef (typical handle grasp). The palm 520 should deform in such a way as to enable cupping, for conformable grasping of convex objects such as dishes and food materials in a manner similar to the chef, as shown by a cupping posture 542 in FIG. 9G.

Joints within the palm 520 that may support these motions include the thumb carpometacarpal joint (CMC), located on the radial side of the palm near the wrist, which may have two distinct directions of motion (flexion/extension and abduction/adduction). Additional joints required to support these motions may include joints on the ulnar side of the palm near the wrist (the fourth finger F4 528 and the fifth finger F5 530 CMC joints), which allow flexion at an oblique angle to support cupping motion at the hypothenar eminence 534 and formation of the palmar gutter.

The robotic palm 520 may include additional/different joints as needed to replicate the palm shape observed in human cooking motions, e.g., a series of coupled flexure joints to support formation of an arch 540 between the thenar and hypothenar eminences 532 and 534 to deform the palm 520, such as when the thumb F1 522 touches the pinky finger F5 530, as illustrated in FIG. 9F.

When the palm is cupped, the thenar eminence 532, the hypothenar eminence 534, and the MCP pads 536 form ridges around a palmar valley that enable the palm to close around a small spherical object (e.g., 2 cm).

Figure 9H:
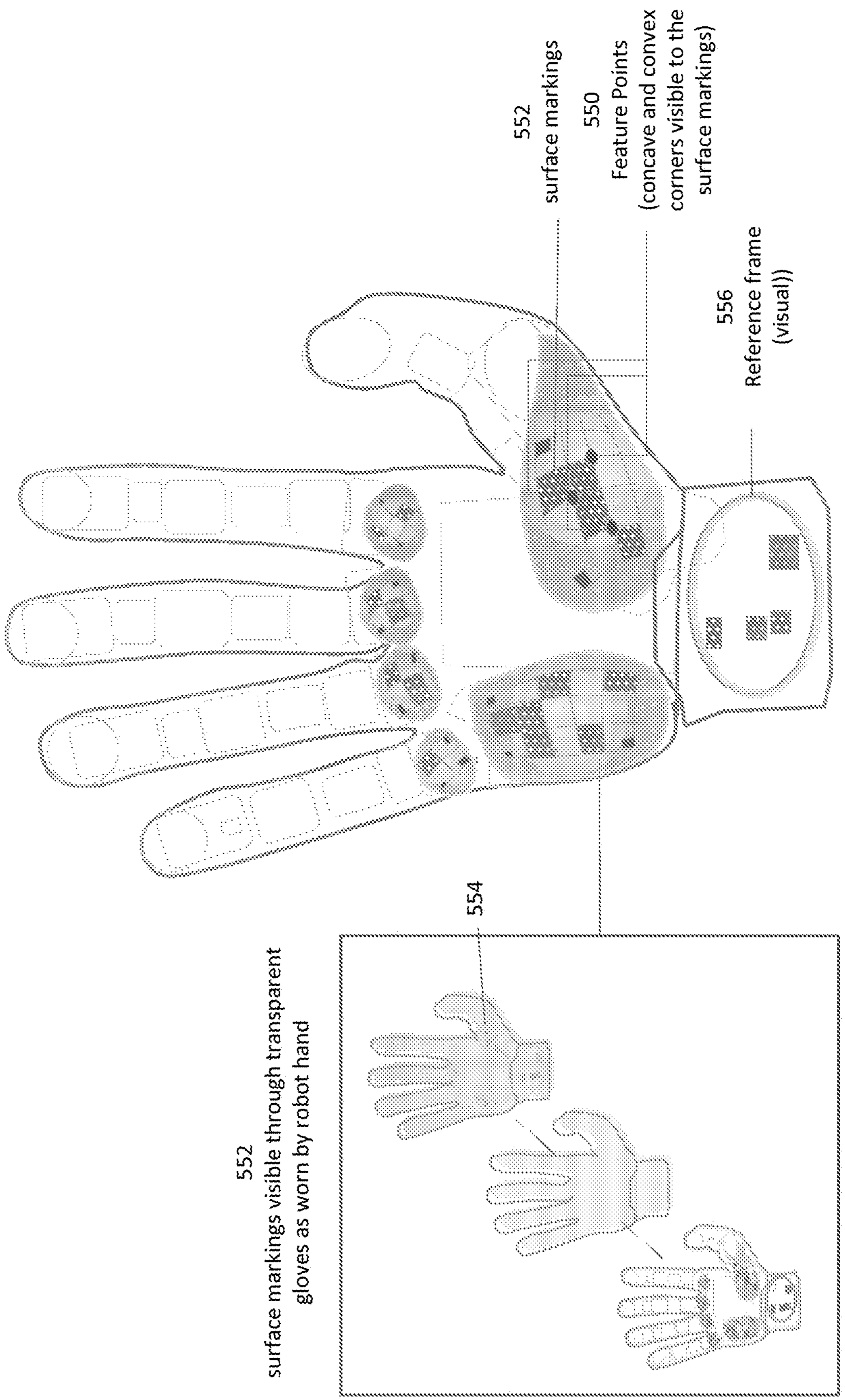
Figure 9I:
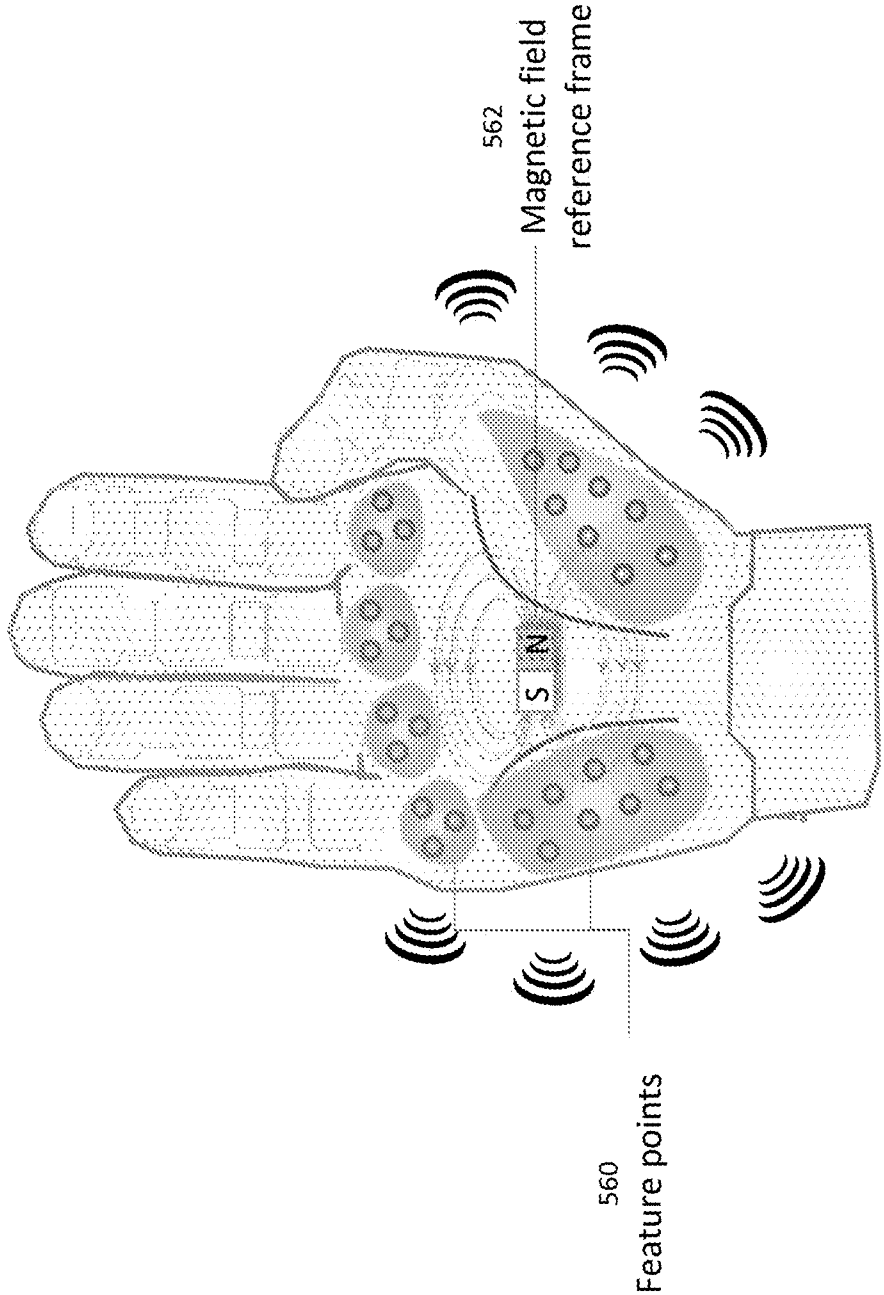

The shape of the deformable palm will be described using locations of feature points relative to a fixed reference frame, as shown in FIGS. 9H and 9I. Each feature point is represented as a vector of x, y, and z coordinate positions over time. Feature point locations are marked on the sensing glove worn by the chef and on the sensing glove worn by the robot. A reference frame is also marked on the glove, as illustrated in FIGS. 9H and 9I. Feature points are defined on a glove relative to the position of the reference frame.

Feature points are measured by calibrated cameras mounted in the workspace as the chef performs cooking tasks. Trajectories of feature points in time are used to match the chef motion with the robot motion, including matching the shape of the deformable palm. Trajectories of feature points from the chef's motion may also be used to inform robot deformable palm design, including shape of the deformable palm surface and placement and range of motion of the joints of the robot hand.

In the embodiment as depicted in FIG. 9H, the feature points are in the hypothenar eminence 534, the thenar eminence 532, and the MCP pad 536 are checkered patterns with markings that show the feature points in each region of the palm. The reference frame in the wrist area has four rectangles that are identifiable as a reference frame. The feature points (or markers) are identified in their respective locations relative to the reference frame. The feature points and reference frame in this embodiment can be implemented underneath a glove for food safety but transparent through the glove for detection.

FIG. 9H shows the robot hand with a visual pattern which may be used to determine the locations of three-dimensional shape feature points 550. The locations of these shape feature points provide information about the shape of the palm surface as the palm joints move and as the palm surface deforms in response to applied forces.

The visual pattern consists of surface markings 552 on the robot hand or on a glove worn by the chef. These surface markings may be covered by a food safe transparent glove 554, but the surface markings 552 remain visible through the glove.

When the surface markings 552 are visible in a camera image, two-dimensional feature points may be identified within that camera image by locating convex or concave corners within the visual pattern. Each such corner in a single camera image is a two-dimensional feature point.

When the same feature point is identified in multiple camera images, the three-dimensional location of this point can be determined in a coordinate frame which is fixed with respect to the standardized robotic kitchen 50. This calculation is performed based on the two-dimensional location of the point in each image and the known camera parameters (position, orientation, field of view, etc. . . . ).

A reference frame 556 fixed to the robotic hand 72 can be obtained using a reference frame visual pattern. In one embodiment, the reference frame 556 fixed to the robotic hand 72 comprises of an origin and three orthogonal coordinate axes. It is identified by locating features of the reference frame's visual pattern in multiple cameras, and using known parameters of the reference frame visual pattern and known parameters of the cameras to extract the origin and coordinate axes.

Three-dimensional shape feature points expressed in the coordinate frame of the food preparation station can be converted into the reference frame of the robot hand once the reference frame of the robot hand is observed.

The shape of the deformable palm is comprised of a vector of three-dimensional shape feature points, all of which are expressed in the reference coordinate frame fixed to the hand of the robot or the chef.

As illustrated in FIG. 9I, the feature points 560 in the embodiments are represented by the sensors, such as Hall effect sensors, in the different regions (the hypothenar eminence 534, the thenar eminence 532, and the MCP pad 536 of the palm. The feature points are identifiable in their respective locations relative to the reference frame, which in this implementation is a magnet. The magnet produces magnetic fields that are readable by the sensors. The sensors in this embodiment are embedded underneath the glove.

FIG. 9I shows the robot hand 72 with embedded sensors and one or more magnets 562 which may be used as an alternative mechanism to determine the locations of three-dimensional shape feature points. One shape feature point is associated with each embedded sensor. The locations of these shape feature points 560 provide information about the shape of the palm surface as the palm joints move and as the palm surface deforms in response to applied forces.

Shape feature point locations are determined based on sensor signals. The sensors provide an output which allows calculation of distance in a reference frame which is attached to the magnet, which furthermore is attached to the hand of the robot or the chef.

The three-dimensional location of each shape feature point is calculated based on the sensor measurements and known parameters obtained from sensor calibration. The shape of the deformable palm is comprised of a vector of three-dimensional shape feature points, all of which are expressed in the reference coordinate frame, which is fixed to the hand of the robot or the chef. For additional information on common contact regions on the human hand and function in grasping, see the material from Kamakura, Noriko, Michiko Matsuo, Harumi Ishii, Fumiko Mitsuboshi, and Yoriko Miura. "Patterns of static prehension in normal hands." American Journal of Occupational Therapy 34, no. 7 (1980): 437-445, which this reference is incorporated by reference herein in its entirety.

Figure 10A:
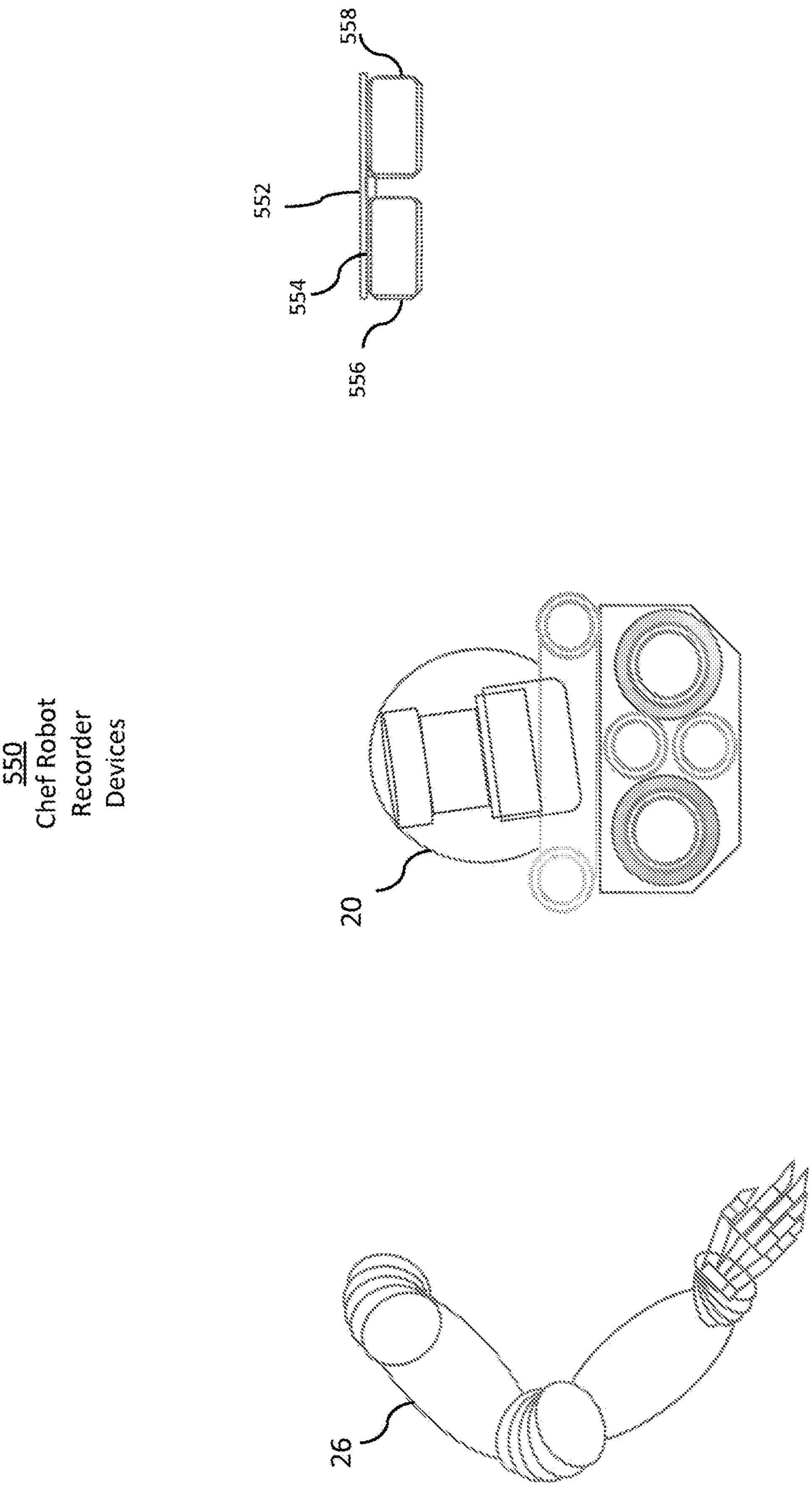
FIG. 10A is block diagram illustrating examples of chef recording devices which a chef wears in the robotic kitchen environment for recording and capturing his or her movements during the food preparation process for a specific recipe.

FIG. 10A is block diagram illustrating examples of chef recording devices 550 which the chef 49 wears in the standardized robotic kitchen environment 50 for recording and capturing the chef's movements during the food preparation process for a specific recipe. The chef recording devices 550 include, but are not limited to, one or more robot gloves (or robot garment) 26, a multimodal sensor unit 20 and a pair of robot glasses 552. In the chef studio system 44, the chef 49 wears the robot gloves 26 for cooking, recording, and capturing the chef's cooking movements. Alternatively, the chef 49 may wear a robotic costume with robotic gloves instead of just the robot gloves 26. In one embodiment, the robot glove 26, with embedded sensors, captures, records and saves the position, pressure and other parameters of the chef's arm, hand, and finger motions in an xyz-coordinate system with a time-stamp. The robot gloves 26 save the position and pressure of the arms and fingers of the chef 18 in a three-dimensional coordinate frame over a time duration from the start time to the end time in preparing a particular food dish. When the chef 49 wears the robotic gloves 26, all of the movements, the position of the hands, the grasping motions, and the amount of pressure exerted, in preparing a food dish in the chef studio system 44, are precisely recorded at a periodic time interval, such as every t seconds. The multimodal sensor unit(s) 20 include video cameras, IR cameras and rangefinders 306, stereo (or even trinocular) camera(s) 308 and multi-dimensional scanning lasers 310, and provide multi-spectral sensory data to the main software abstraction engines 312 (after being acquired and filtered in the data acquisition and filtering module 314). The multimodal sensor unit 20 generates a three-dimensional surface or texture, and processes abstraction model-data. The data is used in a scene understanding module 316 to carry out multiple steps such as (but not limited to) building high- and lower-resolution (laser: high-resolution; stereo-camera: lower-resolution) three-dimensional surface volumes of the scene, with superimposed visual and IR-spectrum color and texture video-information, allowing edge-detection and volumetric object-detection algorithms to infer what elements are in a scene, allowing the use of shape-/color-/texture- and consistency-mapping algorithms to run on the processed data to feed processed information to the Kitchen Cooking Process Equipment Handling Module 318. Optionally, in addition to the robot gloves 76, the chef 49 can wear a pair of robot glasses 552, which has one or more robot sensors 554 around the frame with a robot earpiece 556 and a microphone 558. The robot glasses 552 provide additional vision and capturing capabilities such as a camera for capturing video and recording images that the chef 49 sees while cooking a meal. The one or more robot sensors 554 capture and record temperature and smell of the meal that is being prepared. The earpiece 556 and the microphone 558 capture and record sounds that the chef 49 hears while cooking, which may include human voices, sounds charac-teristics of frying, grilling, grinding, etc. The chef 49 may also record simultaneous voice instructions and real-time cooking steps of the food preparation by using the earpiece and microphone 82. In this respect, the chef robot recorder devices 550 record the chef's movements, speed, temperature and sound parameters during the food preparation process for a particular food dish.

Figure 10B:
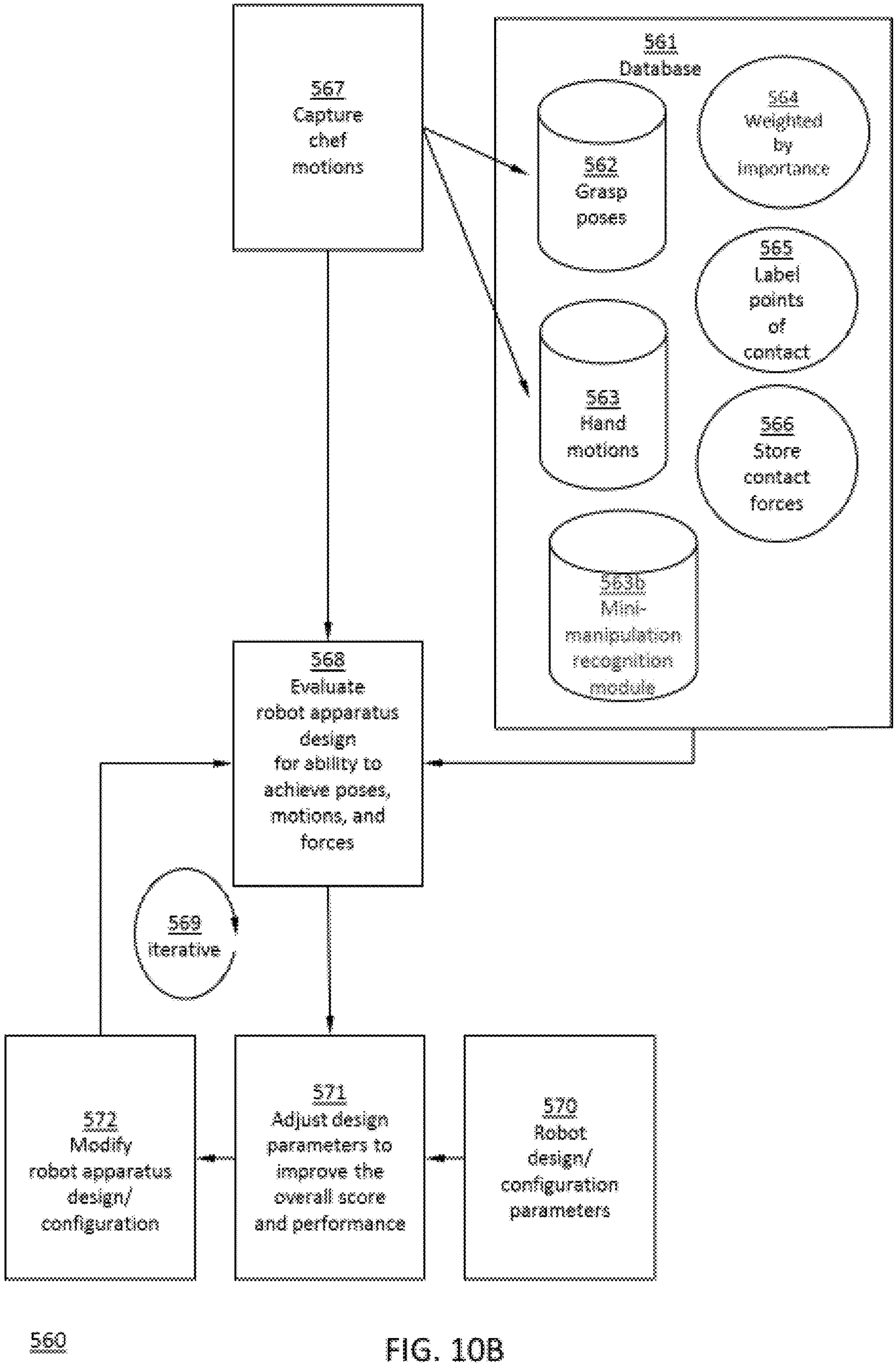
FIG. 10B is a flow diagram illustrating one embodiment of the process in evaluating the capturing of a chef's motions with robot poses, motions and forces in accordance with the present invention.

FIG. 10B is a flow diagram illustrating one embodiment of the process 560 in evaluating the captured of chef's motions with robot poses, motions and forces. A database 561 stores predefined (or predetermined) grasp poses 562 and predefined hand motions by the robotic arms 72 and the robotic hands 72, which are weighted by importance 564, labeled with points of contact 565, and stored contact forces 565. At operation 567, the chef movements recording module 98 is configured to capture the chef's motions in preparing a food dish based in part on the predefined grasp poses 562 and the predefined hand motions 563. At operation 568, the robotic food preparation engine 56 is configured to evaluate the robot apparatus configuration for its ability to achieve poses, motions and forces, and to accomplish mini-manipulations. Subsequently, the robot apparatus configuration undergoes an iterative process 569 in assessing the robot design parameters 570, adjusting design parameters to improve the score and performance 571, and modifying the robot apparatus configuration 572.

Figure 11:
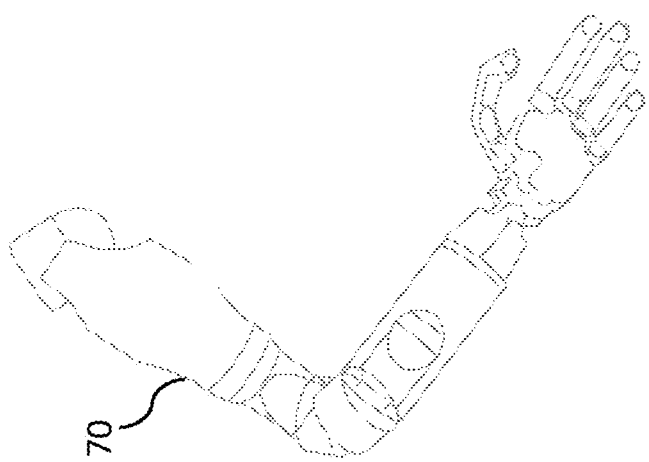
FIG. 11 is block diagram illustrating a side view of a robotic arm embodiment for use in the household robotic kitchen system in accordance with the present invention.

FIG. 11 is block diagram illustrating one embodiment of a side view of the robotic arm 70 for use with the standardized robotic kitchen system 50 in the household robotic kitchen 48. In other embodiments, one or more of the robotic arms 70, such as one arm, two arms, three arms, four arms, or more, can be designed for operation in the standardized robotic kitchen 50. The one or more software recipe files 46 from the chef studio system 44, which store a chef's arm, hand, and finger movements during food preparation, can be uploaded and converted into robotic instructions to control the one or more robotic arms 70 and the one or more robotic hands 72 to emulate the chef's movements for preparing a food dish that the chef has prepared. The robotic instructions control the robotic apparatus to replicate the precise movements of the chef in preparing the same food dish. Each of the robotic arms 70 and each of the robotic hands 72 may also include additional features and tools, such as a knife, a fork, a spoon, a spatula, other types of utensils, or food preparation instruments to accomplish the food preparation process.

Figure 12A:
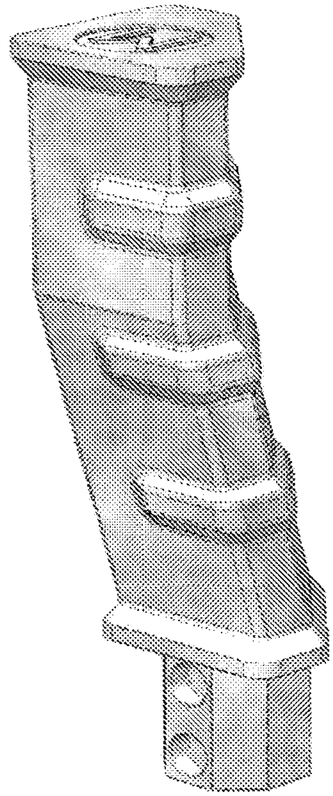
FIGS. 12A-C are block diagrams illustrating one embodiment of a kitchen handle for use with the robotic hand with the palm in accordance with the present invention.
Figure 12B:
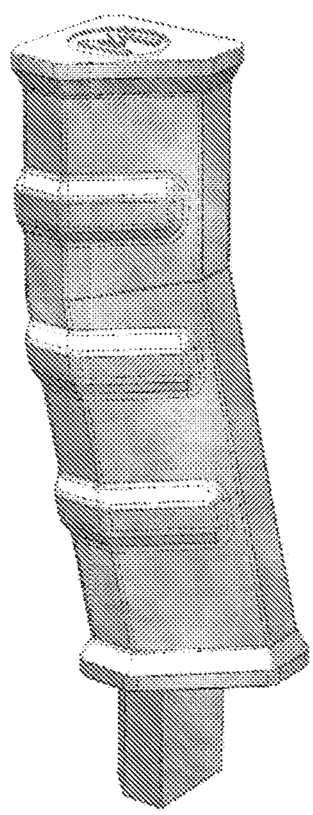
Figure 12C:
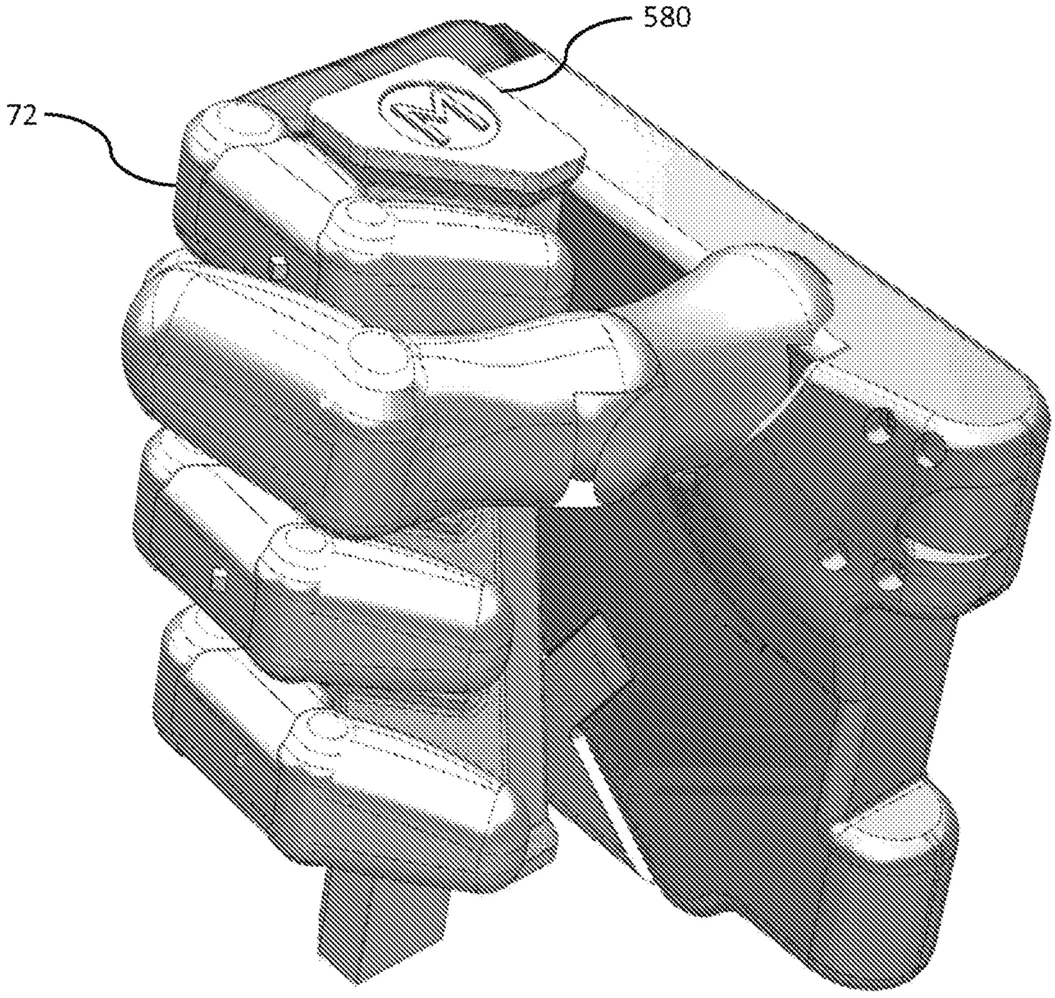

FIGS. 12A-C are block diagrams illustrating one embodiment of a kitchen handle 580 for use with the robotic hand 72 with the palm 520. The design of the kitchen handle 580 is intended to be universal (or standardized) so that the same kitchen handle 580 can attach to any type of kitchen utensils or tools, e.g. a knife, a spatula, a skimmer, a ladle, a draining spoon, a turner, etc. Different perspective views of the kitchen handle 580 are shown in FIGS. 12A-B. The robotic hand 72 grips the kitchen handle 580 as shown in FIG. 12C. Other types of standardized (or universal) kitchen handles may be designed without departing from the spirit of the present invention.

Figure 13:
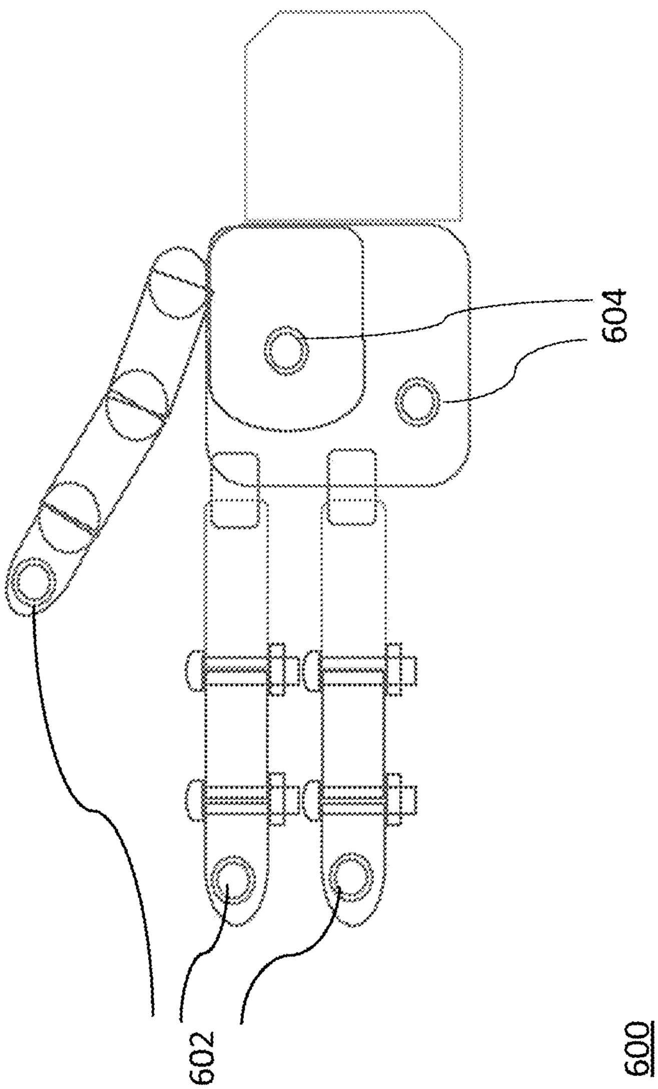
FIG. 13 is a pictorial diagram illustrating an example robotic hand with tactile sensors and distributed pressure sensors in accordance with the present invention.

FIG. 13 is a pictorial diagram illustrating an example robotic hand 600 with tactile sensors 602 and distributed pressure sensors 604. During the food preparation process, the robotic apparatus uses touch signals generated by sensors in the fingertips and the palms of a robot's hands to detect force, temperature, humidity and toxicity as the robot replicates step-by-step movements and compares the sensed values with the tactile profile of the chef's studio cooking program. Visual sensors help the robot to identify the surroundings and take appropriate cooking actions. The robotic apparatus analyzes the image of the immediate environment from the visual sensors and compares it with the saved image of the chef's studio cooking program, so that appropriate movements are made to achieve identical results. The robotic apparatus also uses different microphones to compare the chef's instructional speech to background noise from the food preparation processes to improve recognition performance during cooking. Optionally, the robot may have an electronic nose (not shown) to detect odor or flavor and surrounding temperature. For example, the robotic hand 600 is capable of differentiating a real egg by surface texture, temperature and weight signals generated by haptic sensors in the fingers and palm, and is thus able to apply the proper amount of force to hold an egg without breaking it, as well as performing a quality check by shaking and listening for sloshing, cracking the egg and observing and smelling the yolk and albumen to determine the freshness. The robotic hand 600 then may take action to dispose of a bad egg or select a fresh egg. The sensors 602 and 604 on hands, arms, and head enable the robot to move, touch, see and hear to execute the food preparation process using external feedback and obtain a result in the food dish preparation that is identical to the chef's studio cooking result.

Figure 14:
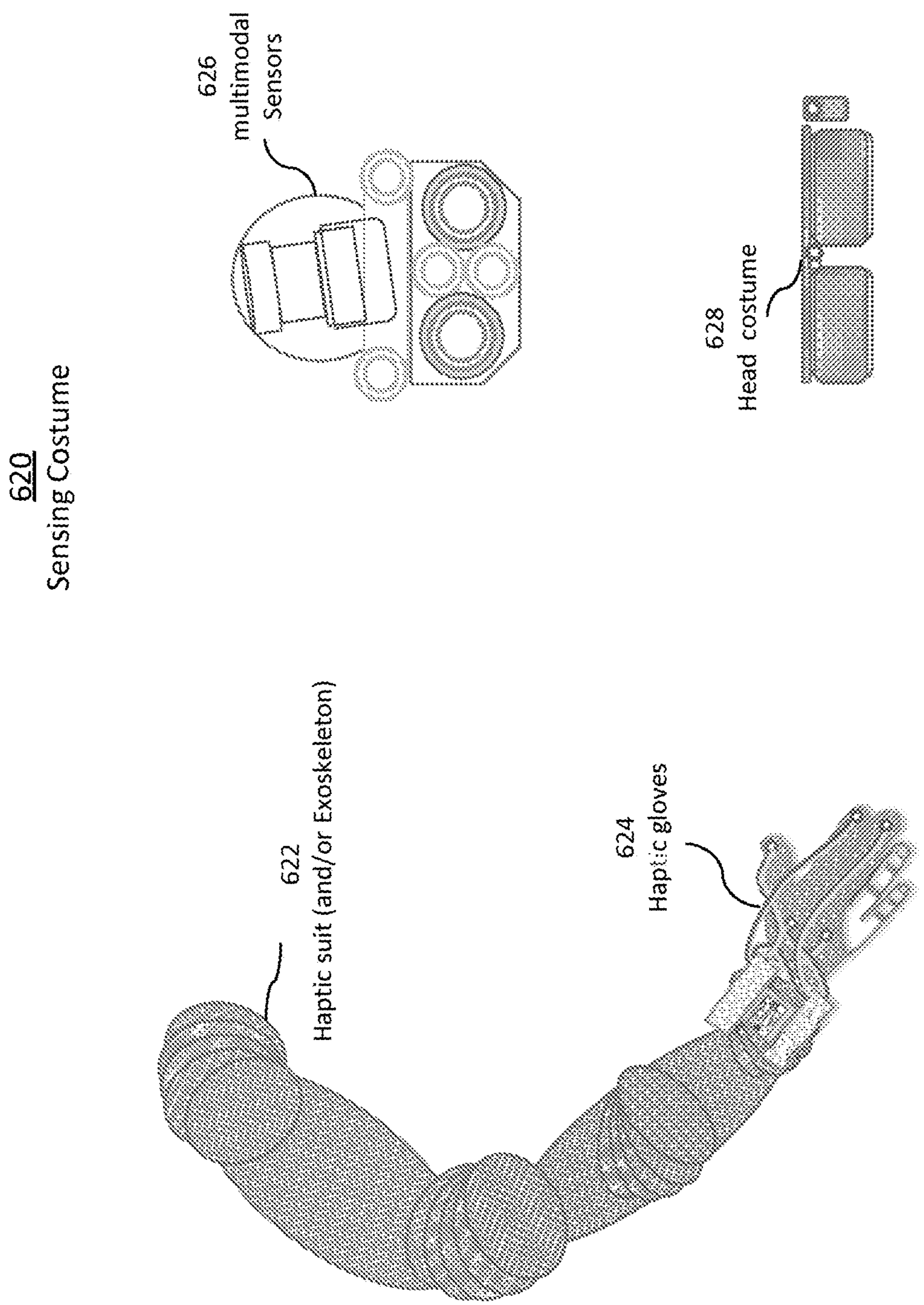
FIG. 14 is a pictorial diagram illustrating an example of a sensing costume for a chef to wear at the robotic cooking studio in accordance with the present invention.

FIG. 14 is a pictorial diagram illustrating an example of a sensing costume 620 (for the chef 49 to wear at the standardized robotic kitchen 50. During the food preparation of a food dish, as recorded by a software file 46, the chef 49 wears the sensing costume 620 for capturing the real-time chef's food preparation movements in a time sequence. The sensing costume 620 may include, but is not limited to, a haptic suit 622 (shown one full-length arm and hand costume)[again, no number like that in there], haptic gloves 624, a multimodal sensor(s) 626 [no such number], a head costume 628. The haptic suit 622 with sensors is capable of capturing data from the chef's movements and transmitting captured data to the computer 16 to record the xyz coordinate positions and pressure of human arms 70 and hands/fingers 72 in the XYZ-coordinate system with a time-stamp. The sensing costume 620 also senses and the computer 16 records the position, velocity and forces/torques and endpoint contact behavior of human arms 70 and hands/fingers 72 in a robot-coordinate frame with and associates them with a system timestamp, for correlating with the relative positions in the standardized robotic kitchen 50 with geometric sensors (laser, 3D stereo, or video sensors). The haptic glove 624 with sensors is used to capture, record and save force, temperature, humidity, and toxicity signals detected by tactile sensors in the gloves 624. The head costume 628 includes feedback devices with vision camera, sonar, laser, or radio frequency identification (RFID) and a custom pair of glasses that are used to sense, capture, and transmit the captured data to the computer 16 for recording and storing images that the chef 48 observes during the food preparation process. In addition, the head costume 628 also includes sensors for detecting the surrounding temperature and smell signatures in the standardized robotic kitchen 50. Furthermore, the head costume 628 also includes an audio sensor for capturing the audio that the chef 49 hears, such as sound characteristics of frying, grinding, chopping, etc.

Figure 15B:
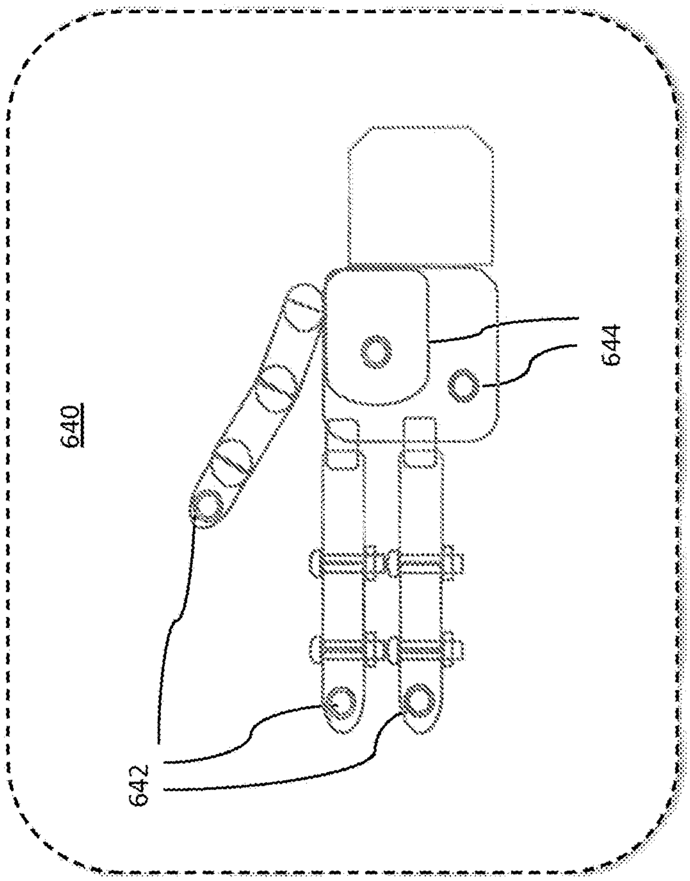
FIGS. 15A-B are pictorial diagrams illustrating one embodiment of a three-fingered haptic glove with sensors for food preparation by the chef and an example a three-fingered robotic hand with sensors in accordance with the present invention.
Figure 15A:
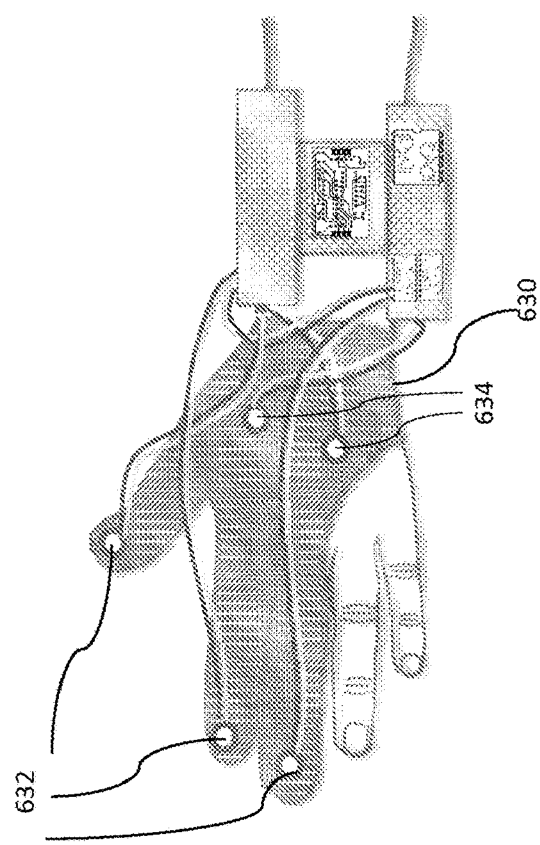

FIGS. 15A-B are pictorial diagrams illustrating one embodiment of a three-finger haptic glove 630 with sensors for food preparation by the chef 49 and an example of a three-fingered robotic hand 640 with sensors. The embodiment illustrated herein shows the simplified robotic hand 640 which has less than five fingers for food preparation. Correspondingly, the complexity in the design of the simplified robotic hand 640 would be significantly reduced, as well as the cost to manufacture the simplified robotic hand 640. Two finger grippers or four-finger robotic hands, with or without an opposing thumb, are also possible alternate implementations. In this embodiment, the chef's hand movements are limited by the functionalities of the three fingers, thumb, index finder and middle finger, where each finger has a sensor 632 for sensing data of the chef's movement with respect to force, temperature, humidity, toxicity or tactile-sensation. The three-finger haptic glove 630 also includes point sensors or distributed pressure sensors in the palm area of the three-finger haptic glove 630. The chef's movements in preparing a food dish wearing the three-finger haptic glove 630 using the thumb, the index finger, and the middle fingers are recorded in a software file. Subsequently, the three-fingered robotic hand 640 replicates the chef's movements from the converted software recipe file into robotic instructions for controlling the thumb, the index finger and the middle finger of the robotic hand 640 while monitoring sensors 642*b* on the fingers and sensors 644 on the palm of the robotic hand 640. The sensors 642 include a force, temperature, humidity, toxicity or tactile sensor, while the sensors 644 can be implemented with point sensors or distributed pressure sensors.

Figure 16:
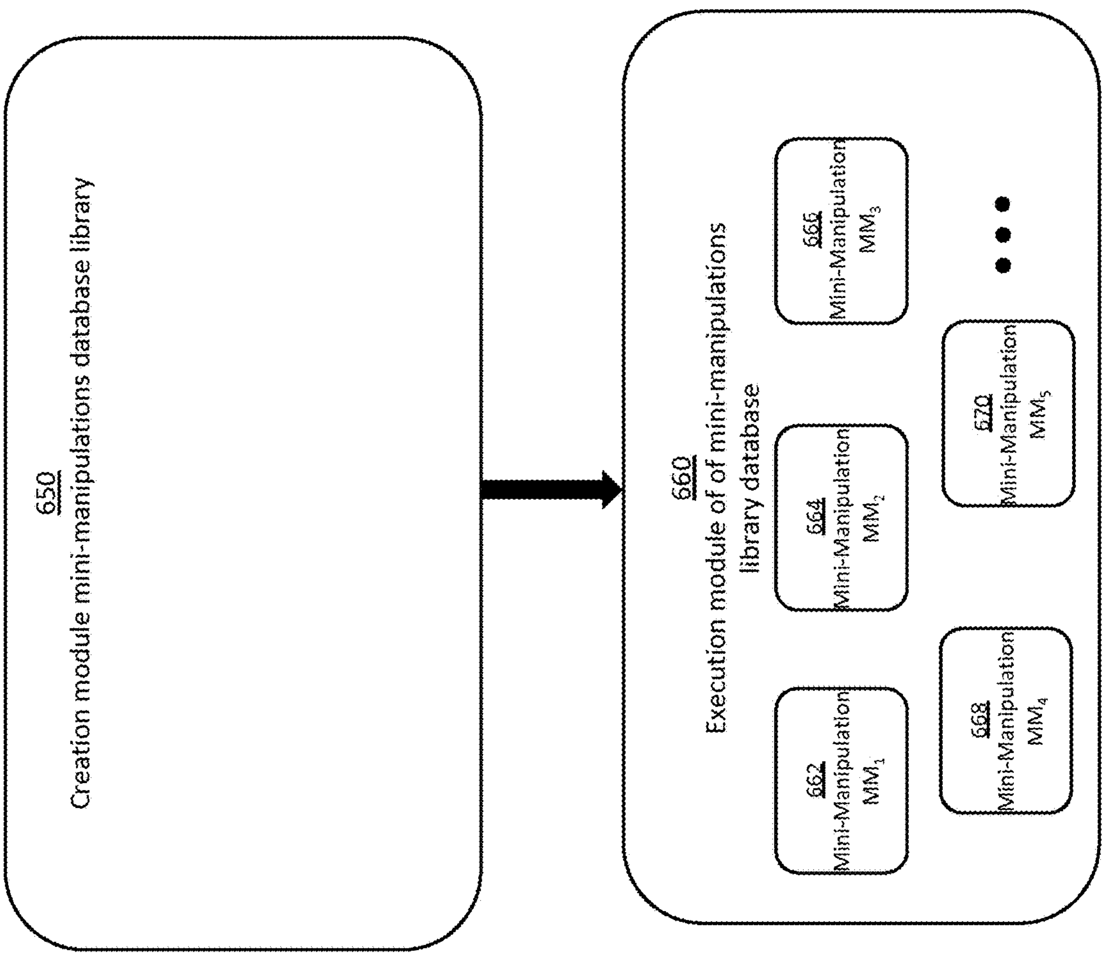
FIG. 16 is a block diagram illustrating the creation module of a mini-manipulation database library and the execution module of the mini-manipulation database library in accordance with the present invention.

FIG. 16 is a block diagram illustrating a creation module 650 of a mini-manipulation library database and an execution module 660 of the mini-manipulation library database. The creation module 60 of the mini-manipulation database library is a process of creating, testing various possible combinations, and selecting an optimal mini-manipulation to achieve a specific functional result. One objective of the creation modules 60 is to explore all different possible combinations in performing a specific mini-manipulation and predefine a library of optimal mini-manipulations for subsequent execution by the robotic arms 70 and the robotic hands 72 in preparing a food dish. The creation module 650 of the mini-manipulation library can also be used as a teaching method for the robotic arms 70 and the robotic hands 72 to learn about the different food preparation functions from the mini-manipulation library database. The execution modules 660 of the mini-manipulations library database is configured to provide a range of mini-manipulation functions which the robotic apparatus can access and execute from the mini-manipulations library database containing a first mini-manipulation $MM_1$ with a first functional outcome 662, a second mini-manipulation $MM_2$ with a second functional outcome 664, a third mini-manipulation $MM_3$ with a third functional outcome 666, a fourth mini-manipulation $MM_4$ with a fourth functional outcome 668, and a fifth mini-manipulation $MM_5$ with a fifth functional outcome 670, during the process of preparing a food dish.

Figure 17A:
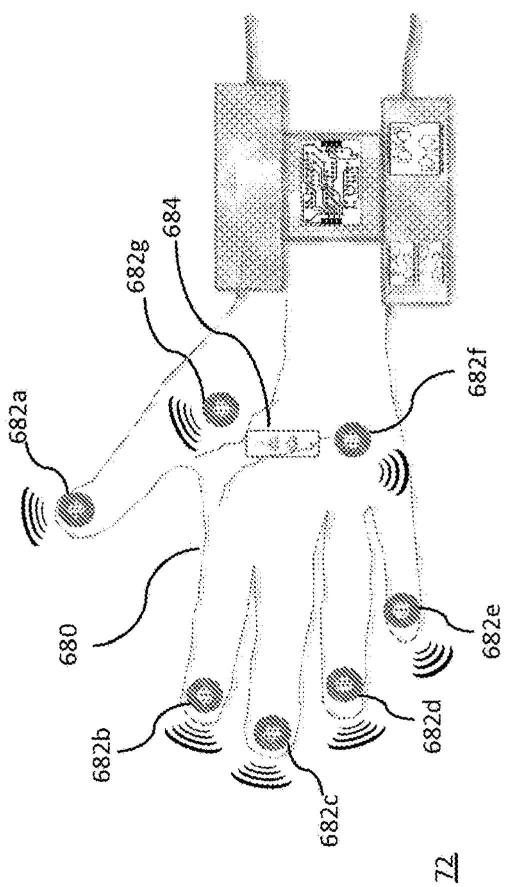
FIG. 17A is a block diagram illustrating a sensing glove used by a chef to execute standardized operating movements in accordance with the present invention.

FIG. 17A is a block diagram illustrating a sensing glove 680 used by the chef 49 to sense and capture the chef's movements while preparing a food dish. The sensing glove 680 has a plurality of sensors 682*a*, 682*b*, 682*c*, 682*d*, 682*e* on each of the fingers, and a plurality of sensors 682*f*, 682*g*, in the palm area of the sensing glove 680. In one embodiment, the at least 5 pressure sensors 682*a*, 682*b*, 682*c*, 682*d*, 682*e* inside the soft glove are used for capturing and analyzing the chef's movements during all hand manipulations. The plurality of sensors 682*a*, 682*b*, 682*c*, 682*d*, 682*e*, 682*f*, and 682*g* in this embodiment are embedded in the sensing glove 680 but transparent to the material of the sensing glove 680 for external sensing. The sensing glove 680 may have feature points associated with the plurality of sensors 682*a*, 682*b*, 682*c*, 682*d*, 682*e*, 682*f*, 682*g* that reflect the hand curvature (or relief) of various higher and lower points in the sensing glove 680. The sensing glove 680, which is placed over the robotic hand 72, is made of soft materials that emulate the compliance and shape of human skin. Additional description elaborating on the robotic hand 72 can be found in FIG. 9A.

The robotic hand 72 includes a camera sensor 684, such as an RGB-D sensor, an imaging sensor or a visual sensing device, placed in or near the middle of the palm for detecting the distance and shape of an object, as well as the distance of the object, and for handling a kitchen tool. The imaging sensor 682*f* provides guidance to the robotic hand 72 in moving the robotic hand 72 towards the direction of the object and to make necessary adjustments to grab an object. In addition, a sonar sensor, such as a tactile pressure sensor, may be placed near the palm of the robotic hand 72, for detecting the distance and shape of the object. The sonar sensor 682*f* can also guide the robotic hand 72 to move toward the object. Each of the sonar sensors 682*a*, 682*b*, 682*c*, 682*d*, 682*e*, 682*f*, 682*g* includes ultrasonic sensors, laser, radio frequency identification (RFID), and other suitable sensors. In addition, each of the sonar sensors 682*a*, 682*b*, 682*c*, 682*d*, 682*e*, 682*f*, 682*g* serves as a feedback mechanism to determine whether the robotic hand 72 continues to exert additional pressure to grab the object at such point where there is sufficient pressure to grab and lift the object. In addition, the sonar sensor 682*f* in the palm of the robotic hand 72 provides tactile sensing function to handle a kitchen tool. For example, when the robotic hand 72 grabs a knife to cut beef, the amount of pressure that the robotic hand 72 exerts on the knife and applies to the beef, allows the tactile sensor to detect when the knife finishes slicing the beef, i.e., when the knife has no resistance. The distributed pressure is not only to secure the object, but also so as not to exert too much pressure so as to, for example, not to break an egg). Furthermore, each finger on the robotic hand 72 has a sensor on the finger tip, as shown by the first sensor 682*a* on the finger tip of the thumb, the second sensor 682*b* on the finger tip of the index finger, the third sensor 682*c* on the finger tip of the middle finger, the fourth sensor 682*d* on the finger tip of the ring finger, and the fifth sensor 682*f* on the finger tip of the pinky. Each of the sensors 682*a*, 682*b*, 682*c*, 682*d*, 682*e* provide sensing capability on the distance and shape of the object, sensing capability for temperature or moisture, as well as tactile feedback capability.

Figure 17B:
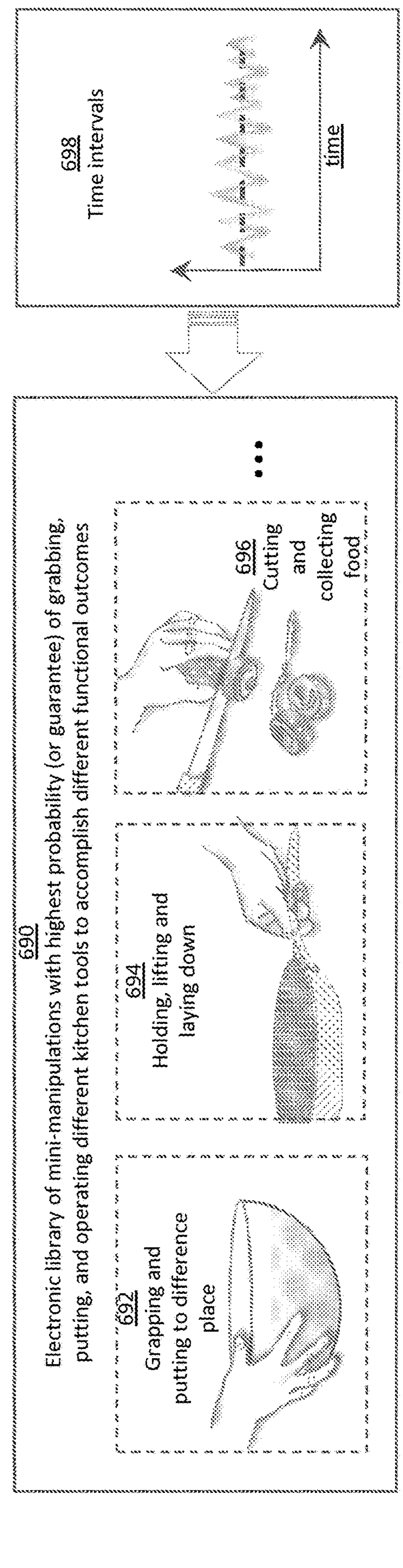
FIG. 17B is a block diagram illustrating a database of standardized operating movements in the robotic kitchen module in accordance with the present invention.

The RGB-D sensor 684 and the sonar sensor 682*f* in the palm, plus the sonar sensors 682*a*, 682*b*, 682*c*, 682*d*, 682*e* in the finger tip of each finger, provide a feedback mechanism to the robotic hand 72 as a means to grab a non-standardized object, or a non-standardized kitchen tool. The robotic hands 72 may adjust the pressure to a sufficient degree to grab ahold of the non-standardized object. A program library 690 that stores sample grabbing functions 692, 694, 696 according to a specific time interval for which the robotic hand 72 can draw from in performing a specific grabbing function, is illustrated in FIG. 17B. FIG. 17B is a block diagram illustrating a library database 690 of standardized operating movements in the standardized robotic kitchen module 50. Standardized operating movements, which are predefined and stored in the library database 690, include grabbing, placing, and operating a kitchen tool or a piece of kitchen equipment.

Figure 18A:
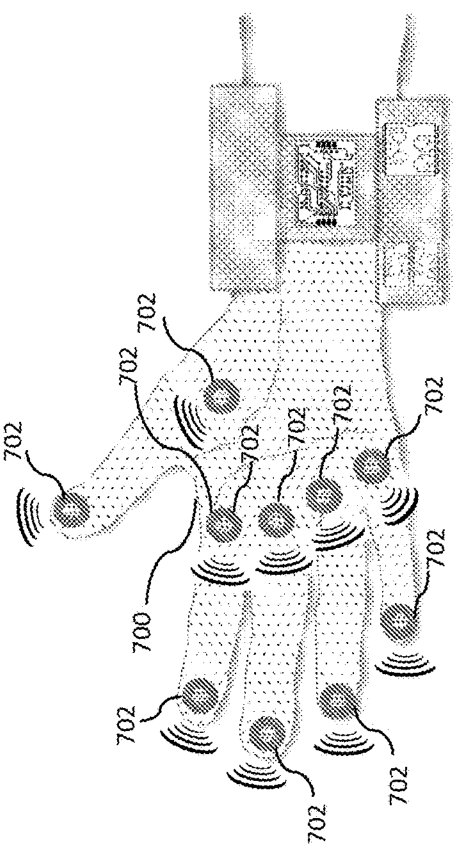
FIG. 18A is a graphical diagram illustrating that each of the robotic hand coated with a artificial human-like soft-skin glove in accordance with the present invention.

FIG. 18A is a graphical diagram illustrating that each of the robotic hands 72 is coated with a artificial human-like soft-skin glove 700. The artificial human-like soft-skin glove 700 includes a plurality of embedded sensors that are transparent and sufficient for the robot hands 72 to perform high-level mini-manipulations. In one embodiment, the soft-skin glove 700 includes ten or more sensors to replicate a chef's hand movements.

Figure 18B:
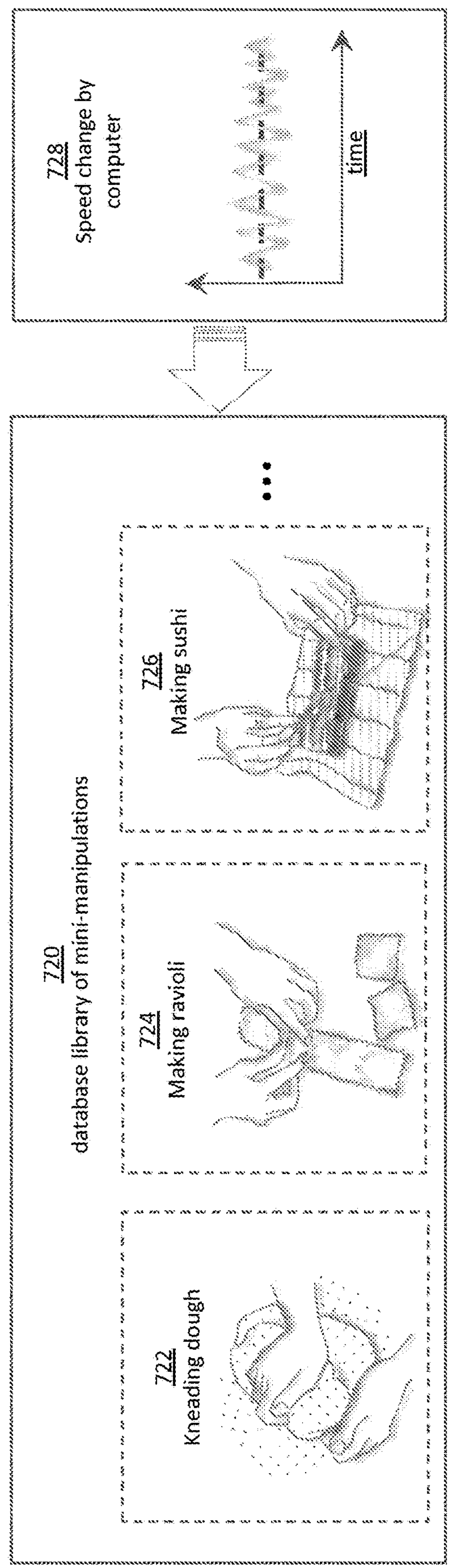
FIG. 18B is a block diagram illustrating robotic hands coated with artificial human-like skin gloves to execute high-level mini-manipulations based on a library database of mini-manipulations, which have been predefined and stored in the library database, in accordance with the present invention.

FIG. 18B is a block diagram illustrating robotic hands coated with artificial human-like skin gloves to execute high-level mini-manipulations based on a library database 720 of mini-manipulations, which have been predefined and stored in the library database 720. High-level mini-manipulations refer to a sequence of action primitives requiring a substantial amount of interaction movements and interaction forces and control over the same. Three examples of mini-manipulations are provided, which are stored in the database library 720. The first example of mini-manipulation is to use the pair of robotic hands 72 to knead the dough 722. The second example of mini-manipulation is to use the pair of robotic hands 72 to make ravioli 724. The third example of mini-manipulation is to use the pair of robotic hands 72 to make sushi. Each of the three examples of mini-manipulations have a time duration and speed curve which are tracked by the computer 16.

Figure 18C:
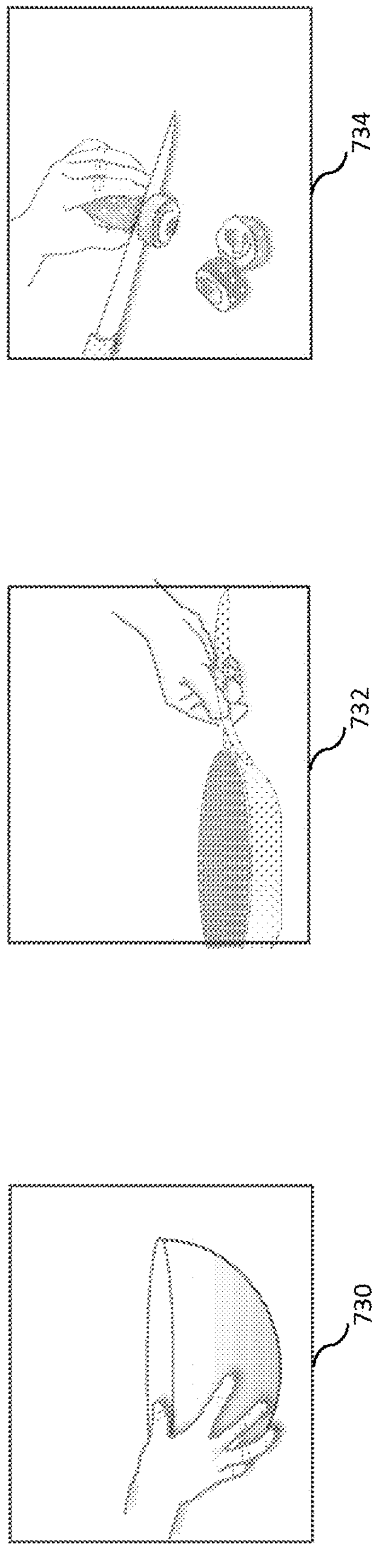
FIG. 18C is a graphical diagram illustrating three types of taxonomy of manipulation actions for food preparation in accordance with the present invention.

FIG. 18C is a graphical diagram illustrating three types of taxonomy of manipulation actions for food preparation with continuous trajectory of the robotic arm 70 and the robotic hand 72 motions and forces that result in a desired goal state. The robotic arm 70 and the robotic hand 72 execute rigid grasping and transfer 730 movements for picking up an object with an immovable grasp and transferring them to a goal location without the need for a forceful interaction. Examples of a rigid grasping and transfer include putting the pan on the stove, picking up the salt shaker, shaking salt into the dish, dropping ingredients into a bowl, pouring the contents out of a container, tossing a salad, and flipping a pancake. The robotic arm 70 and the robotic hand 72 execute a rigid grasp with forceful interaction 732 where there is a forceful contact between two surfaces or objects. Examples of a rigid grasp with forceful interaction include stirring a pot, opening a box, and turning a pan, and sweeping items from a cutting board into a pan. The robotic arm 70 and the robotic hand 72 execute a forceful interaction with deformation 734 where there is a forceful contact between two surfaces or objects that results in the deformation of one of two surfaces, such as cutting a carrot, breaking an egg, or rolling dough. For additional information on the function of the human hand, deformation of the human palm, and its function in grasping, see the material from I. A. Kapandji, "The Physiology of the Joints, Volume 1: Upper Limb, 6e," Churchill Livingstone, 6 edition, 2007, which this reference is incorporated by reference herein in its entirety.

Figure 18D:
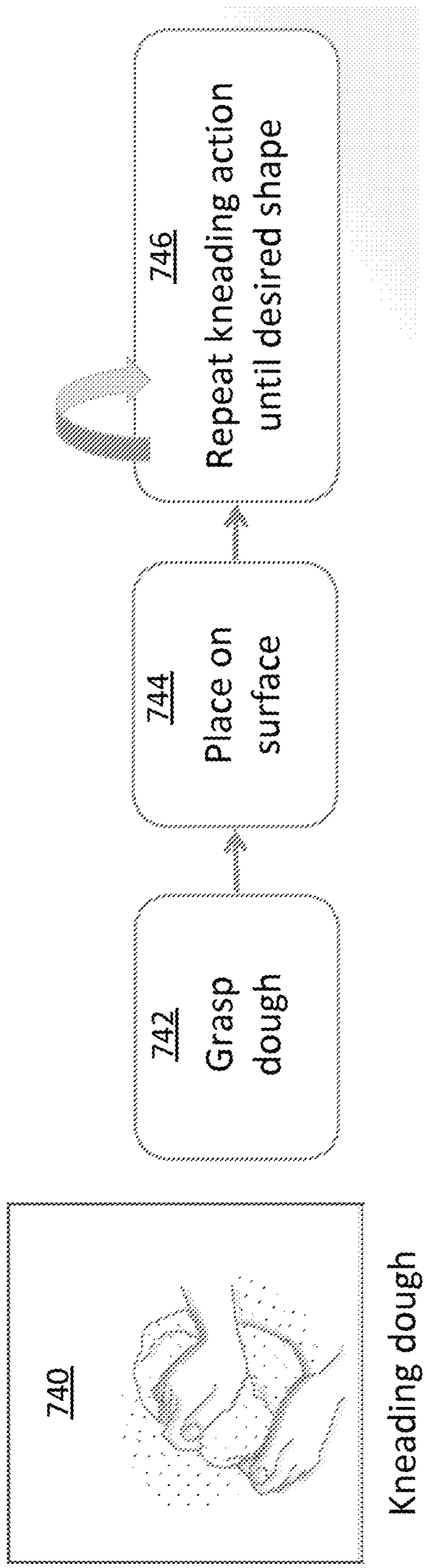
FIG. 18D is a flow diagram illustrating one embodiment on taxonomy of manipulation actions for food preparation in accordance with the present invention.

FIG. 18D is a simplified flow diagram illustrating one embodiment on taxonomy of manipulation actions for food preparation in kneading dough 740. Kneading dough 740 may be a mini-manipulation that has been previously predefined in the library database of mini-manipulations. The process of kneading dough 740 comprises a sequence of actions (or short mini-manipulations), including grasping the dough 742, placing the dough on a surface 744, and repeating the kneading action until one obtains a desired shape 746.

Figure 18E:
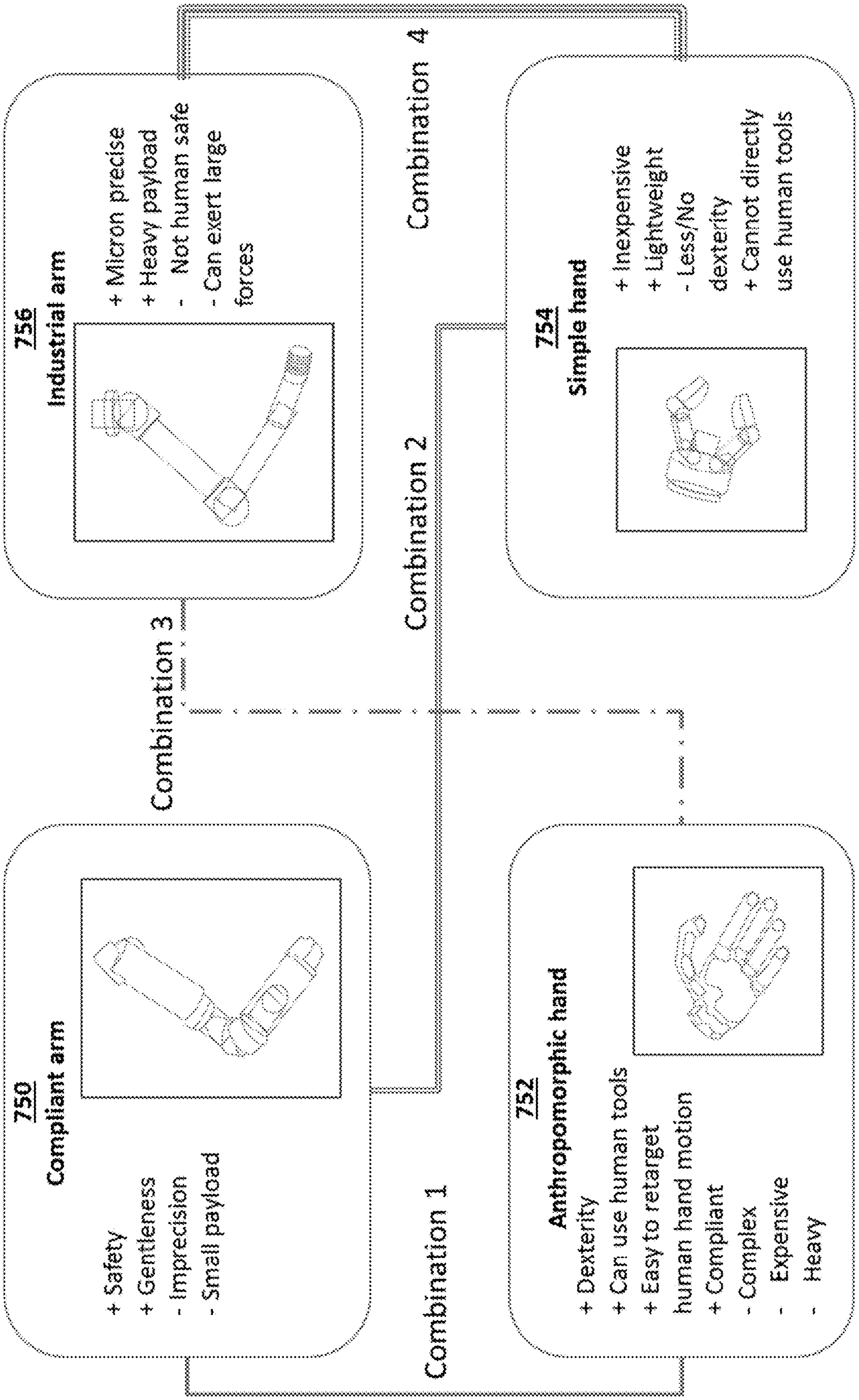
FIG. 18E is a block diagram illustrating one example of the interplay and interactions between a robotic arm and a robotic hand in accordance with the present invention.

FIG. 18E is a block diagram illustrating one example of the interplay and interactions between the robotic arm 70 and the robotic hand 72. A compliant robotic arm 750 provides a smaller payload, higher safety, more gentle actions, but less precision. An anthropomorphic robotic hand 752 provides more dexterity, capable of handling human tools, is easier to retarget for a human hand motion, more compliant, but the design requires more complexity, increase in weight, and higher product cost. A simple robotic hand 754 is lighter in weight, less expensive, with lower dexterity, and not able to directly use human tools. An industrial robotic arm 756 is more precise, with higher payload capacity but generally not considered safe around humans and can potentially exert a large amount of force and cause harm. One embodiment of the standardized robotic kitchen 50 is to utilize a first combination of the compliant arm 750 with the anthropomorphic hand 752. The other three combinations are generally less desirable for implementation of the present invention.

Figure 18F:
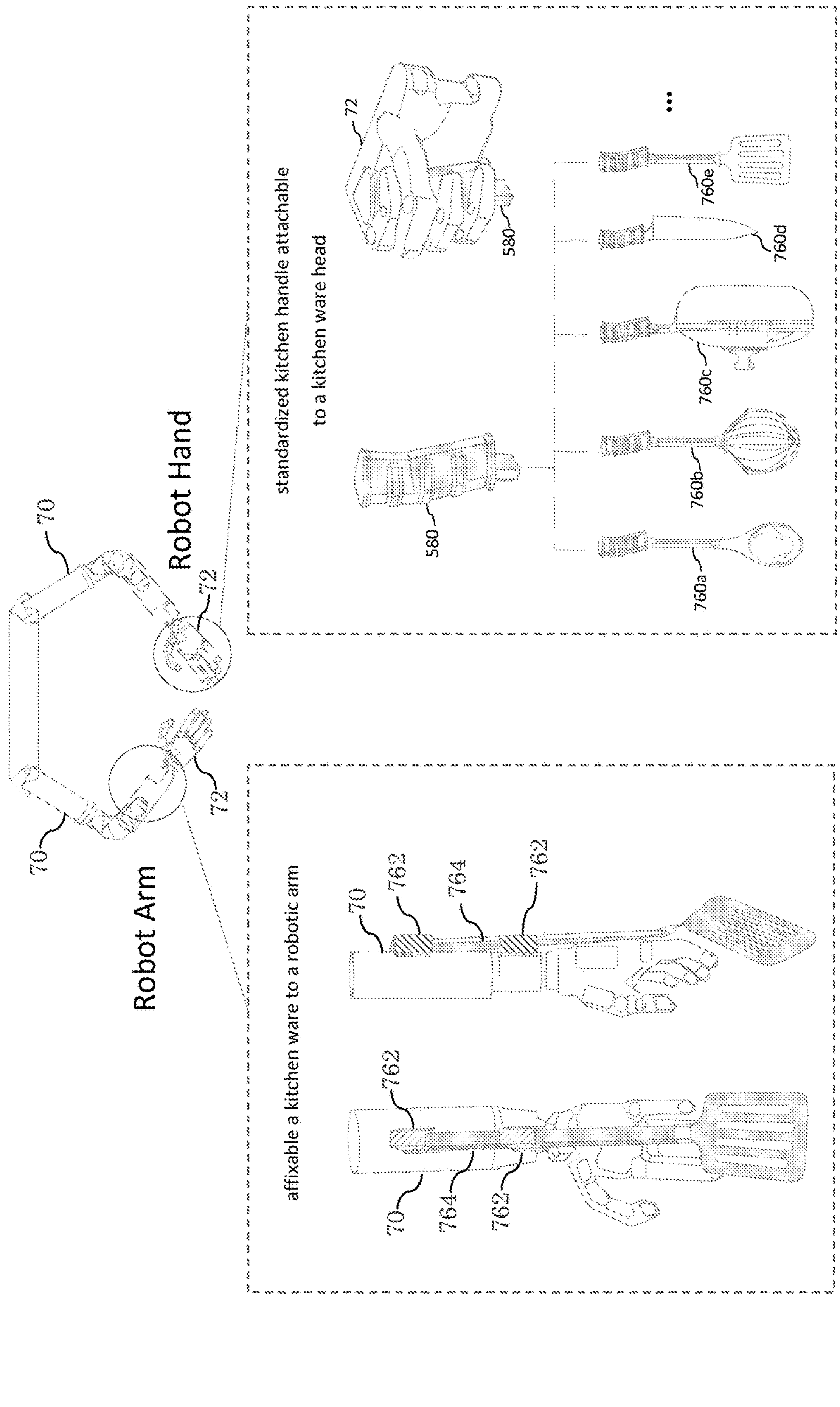
FIG. 18F is a block diagram

FIG. 18F is a block diagram illustrating the robotic hand 72 using the standardized kitchen handle 580 to attach to a custom cookware head and the robotic arm 70 affixable to kitchen ware. In one technique to grab a kitchen ware, the robotic hand 72 grabs the standardized kitchen tool 580 for attaching to any one of the custom cookware heads from the illustrated choices of 760*a*, 760*b*, 760*c*, 760*d*, 760*e*, and others. For example, the standardized kitchen handle 580 is attached to the custom spatula head 760*e* for use to stir-fry the ingredients in a pan. In one embodiment, the standardized kitchen handle 580 can be held by the robotic hand 72 in just one position, which minimizes the potential confusion in different ways to hold the standardized kitchen handle 580. In another technique to grab a kitchen ware, the robotic arm has one or more holders 762 that are affixable to a kitchen ware 762, where the robotic arm 70 is able to exert more forces if necessary in pressing the kitchen ware 762 during the robotic hand motion.

Figure 19:
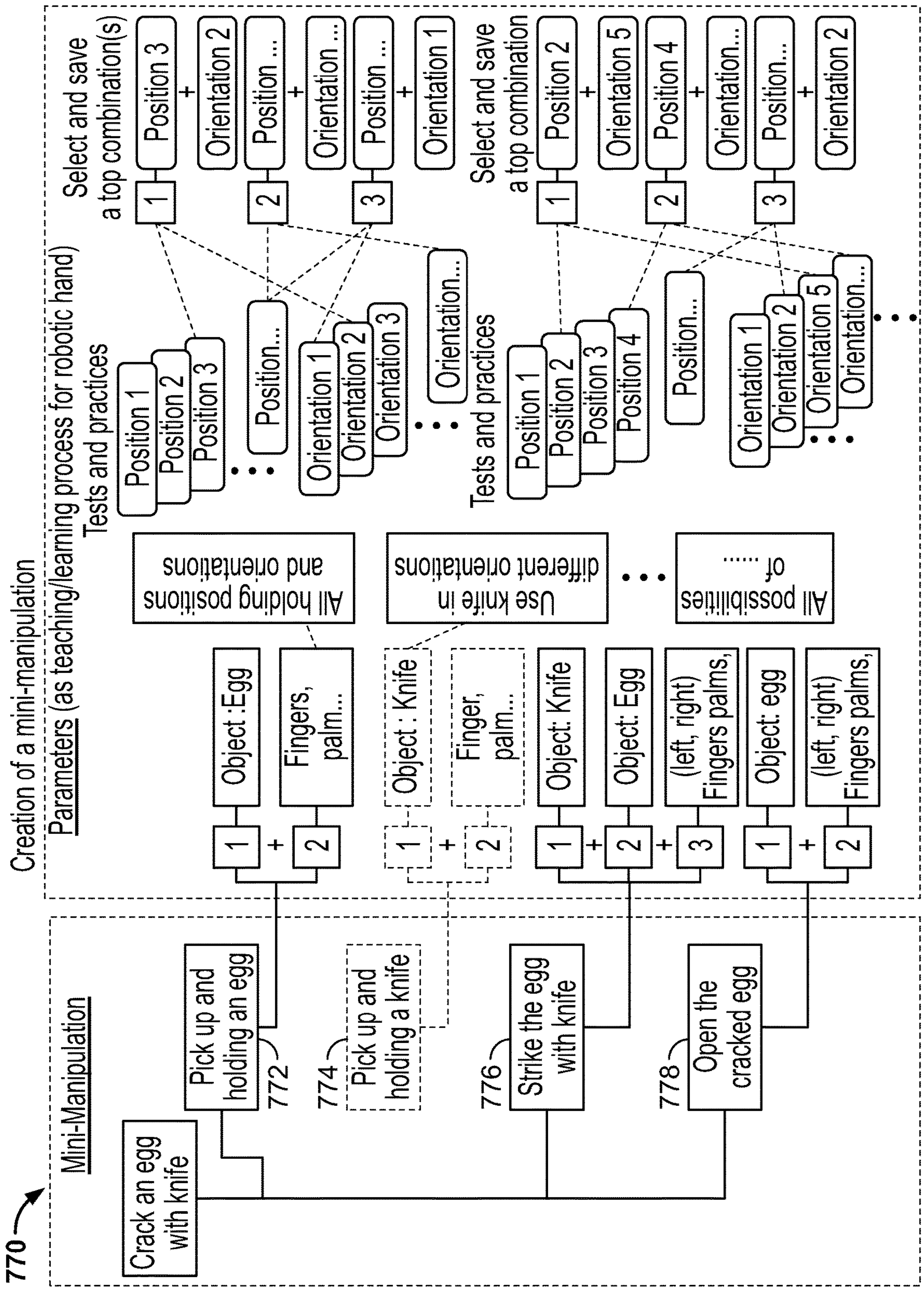
FIG. 19 is a block diagram illustrating the creation of a mini-manipulation that results in cracking an egg with knife an example in accordance with the present invention.

FIG. 19 is a block diagram illustrating an example of a database library structure 770 of a mini-manipulation that results in "cracking an egg with a knife." The mini-manipulation 770 of cracking an egg includes: how to hold an egg in the right position 772, how to hold a knife relative to the egg 774, what is the best angle to strike the egg with the knife 776, and how to open the cracked egg 778. Various possible parameters for each 772, 774, 776, and 778, are tested to find the best way to execute a specific movement. For example in holding an egg 772, the different positions, orientations, and ways to hold an egg are tested to find an optimal way to hold the egg. Second, the robotic hand 72 picks up the knife from a predetermined location. The holding the knife 774 is explored as to the different positions, orientations, and the way to hold the knife in order to find an optimal way to handle the knife. Third, the striking the egg with knife 776 is also tested for the various combinations of striking the knife on the egg to find the best way to strike the egg with the knife. Consequently, the optimal way to execute the mini-manipulation of cracking an egg with a knife 770 is stored in the library database of mini-manipulations. The saved mini-manipulation of cracking an egg with a knife 770 would comprise the best way to hold the egg 772, the best way to hold the knife 774, and the best way to strike the knife with the egg 776.

To create the mini-manipulation that results in cracking an egg with a knife, multiple parameter combinations must be tested to identify a set of parameters that ensure the desired functional result—that the egg is cracked—is achieved. In this example, parameters are identified to determine how to grasp and hold an egg in such a way so as not to crush it. An appropriate knife is selected through testing, and suitable placements are found for the fingers and palm so that it may be held for striking. A striking motion is identified that will successfully crack an egg. An opening motion and/or force are identified that allows a cracked egg to be opened successfully.

The teaching/learning process for the robotic apparatus involves multiple and repetitive tests to identify the necessary parameters to achieve the desired final functional result.

These tests may be performed over varying scenarios. For example, the size of the egg can vary. The location at which it is to be cracked can vary. The knife may be at different locations. The mini-manipulation must be successful in all of these variable circumstances.

Once the learning process has been completed, results are stored as a collection of action primitives that together are known to accomplish the desired functional result.

Figure 20:
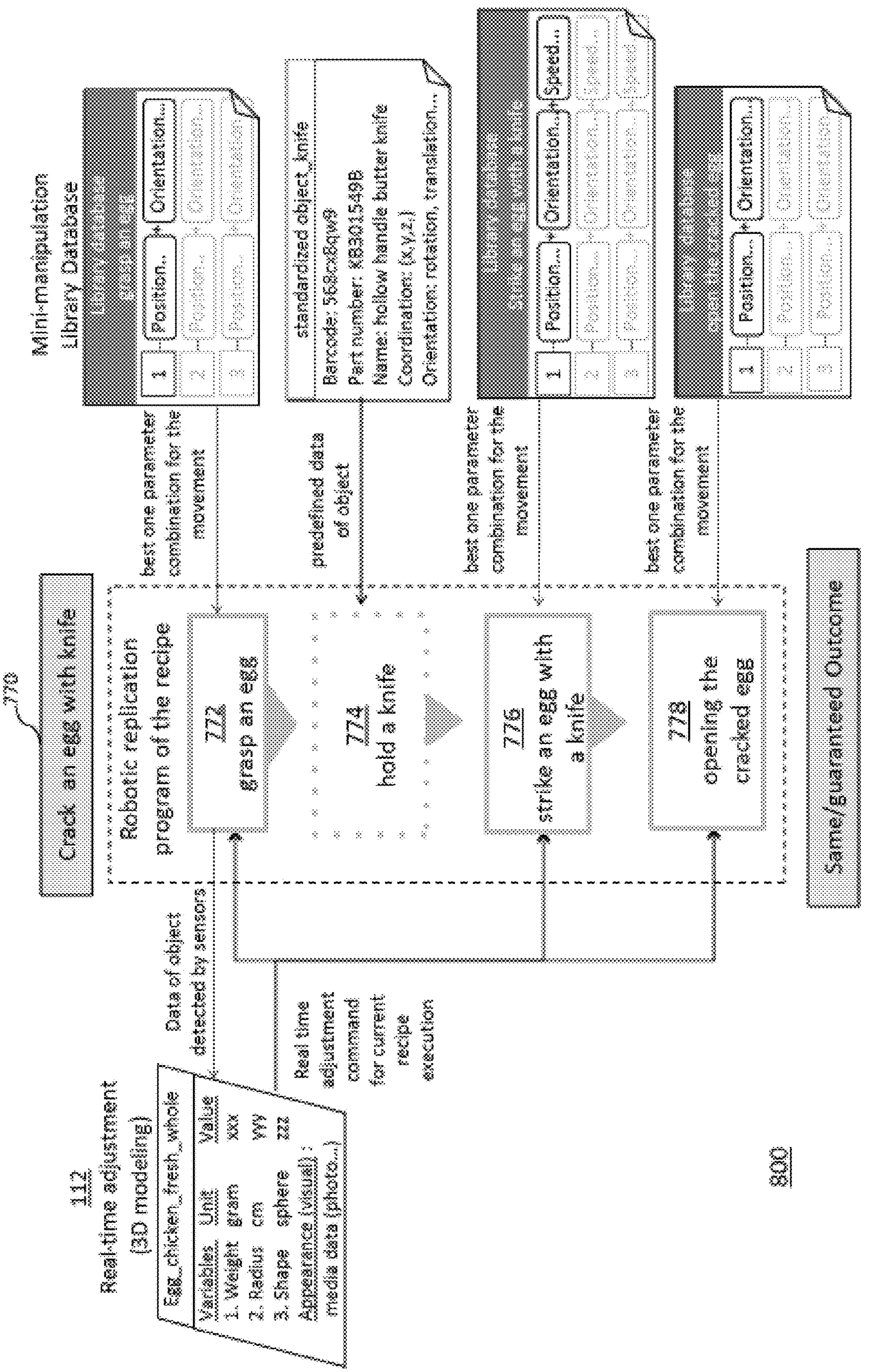
FIG. 20 is a block diagram illustrating an example of recipe execution for a mini-manipulation with real-time adjustment in accordance with the present invention.

FIG. 20 is a block diagram illustrating an example of recipe execution 800 for a mini-manipulation with real-time adjustment. In recipe execution 800, the robotic hands 72 execute the mini-manipulation 770 of cracking an egg with a knife, where the optimal way to execute each movement in the cracking an egg operation 772, the holding a knife operation 774, the striking the egg with a knife operation 776, and opening the cracked egg operation 778 is selected from the mini-manipulation library database. The process of executing the optimal way to carry out each of the movements 772, 774, 776, 778 ensures that the mini-manipulation 770 will achieve the same (or guarantee of), or substantially the same, outcome for that specific mini-manipulation. The multimodal three-dimensional sensor 20 provides real-time adjustment capabilities 112 as to the possible variations in one or more ingredients, such as the dimension and weight of an egg.

As an example of the operative relationship between the creation of a mini-manipulation in FIG. 19 and the execution of the mini-manipulation in FIG. 20, specific variables associated with the mini-manipulation of "cracking an egg with a knife," includes an initial xyz coordinates of egg, an initial orientation of the egg, the size of the egg, the shape of the egg, an initial xyz coordinate of the knife, an initial orientation of the knife, the xyz coordinates where to crack the egg, speed, and the time duration of the mini-manipulation. The identified variables of the mini-manipulation, "crack an egg with a knife," are thus defined during the creation phase, where these identifiable variables may be adjusted by the robotic food preparation engine 56 during the execution phase of the associated mini-manipulation.

Figure 21:
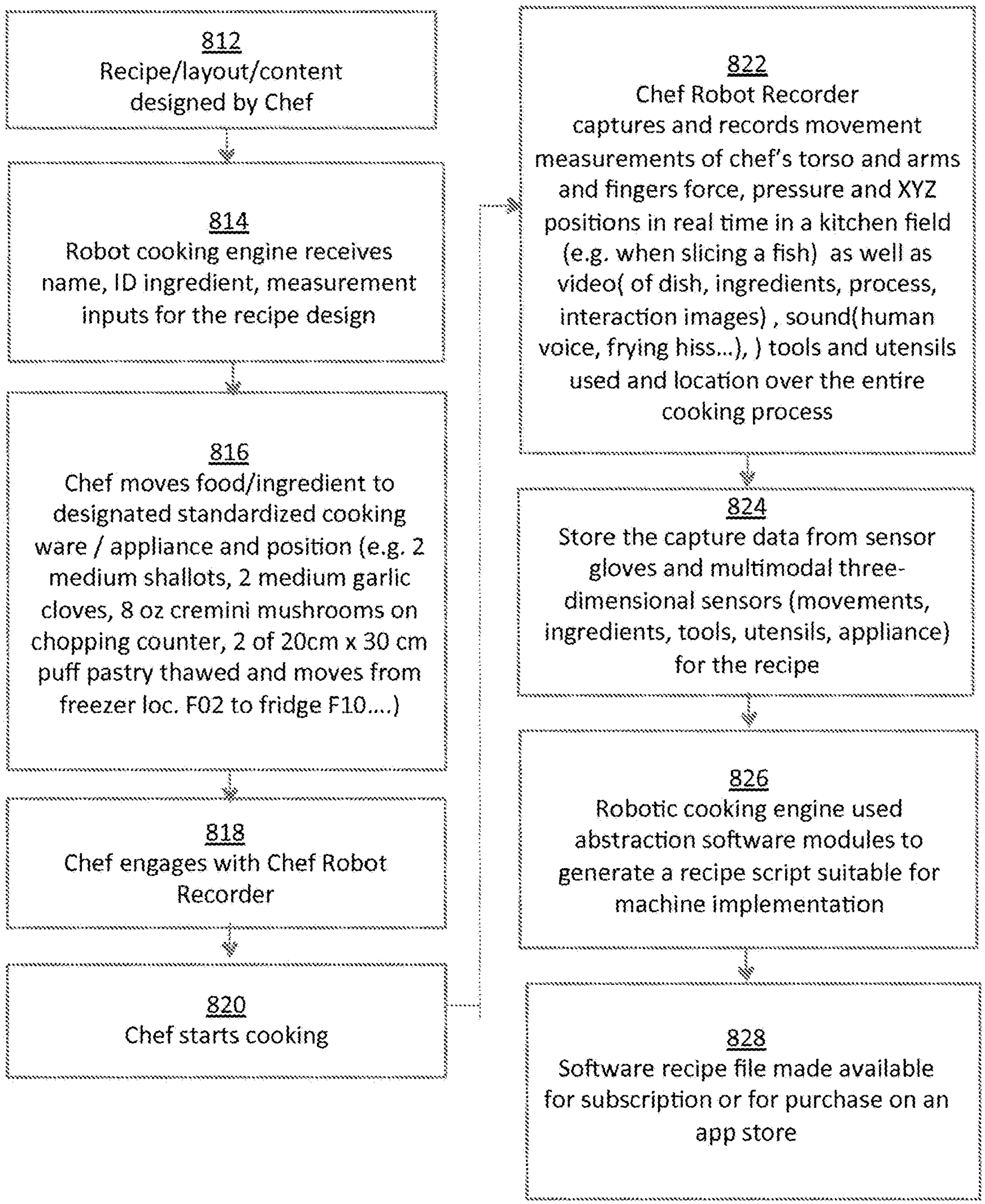
FIG. 21 is a flow diagram illustrating the software process to capture a chef's food preparation movements in a standardized kitchen module in accordance with the present invention.

FIG. 21 is a flow diagram illustrating the software process 810 to capture a chef's food preparation movements in a standardized kitchen module to produce the software recipe files 46 from the chef studio 44. In the chef studio 44, at step 812, the chef 49 designs the different components of a food recipe. At step 814, the robotic cooking engine 56 is configured to receive the name, ID ingredient, and measurement inputs for the recipe design that the chef 49 has selected. At step 816, the chef 49 moves food/ingredients into designated standardized cooking ware/appliances and into their designated positions. For example, the chef 49 may pick two medium shallots and two medium garlic cloves, place eight crimini mushrooms on the chopping counter, and move two 20 cm×30 cm puff pastry units thawed from freezer lock F02 to a refrigerator (fridge). At step 818, the chef 49 wears the capturing gloves 26 or the haptic costume 622, which has sensors that capture the chef's movement data for transmission to the computer 16. At step 820, the chef 49 starts working the recipe that he or she selects from step 122. At step 822, the chef movement recording module 98 is configured to capture and record the chef's precise movements, including measurements of the chef's arms and fingers' force, pressure, and XYZ positions and orientations in real time in the standardized robotic kitchen 50. In addition to capturing the chef's movements, pressure, and positions, the chef movement recording module 98 is configured to record video (of dish, ingredients, process, and interaction images) and sound (human voice, frying hiss, etc.) during the entire food preparation process for a particular recipe. At step 824, the robotic cooking engine 56 is configured to store the captured data from step 822, which includes the chef's movements from the sensors on the capturing gloves 26 and the multimodal three-dimensional sensors 30. At step 826, the recipe abstraction software module 104 is configured to generate a recipe script suitable for machine implementation. At step 828, after the recipe data has been generated and saved, the software recipe file 46 is made available for sale or subscription to users via an app store or marketplace to a user's computer located at home or in a restaurant, as well as integrating the robotic cooking receipt app on a mobile device.

Figure 22:
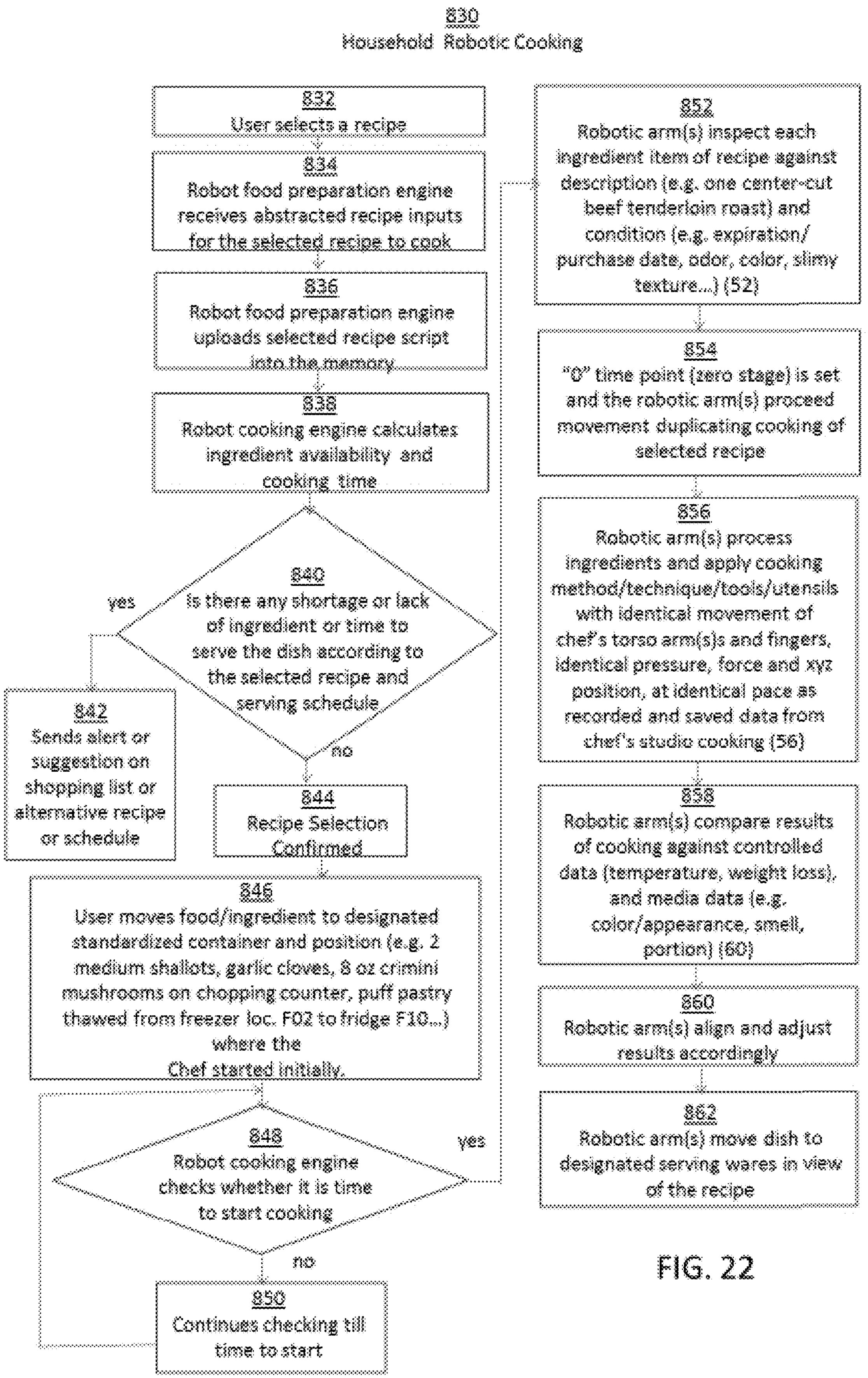
FIG. 22 is a flow diagram illustrating the software process for food preparation by robotic apparatus in the robotic standardized kitchen module in accordance with the present invention.

FIG. 22 is a flow diagram 830 illustrating the software process for food preparation by a robotic apparatus in the robotic standardized kitchen with the robotic apparatus based one or more of the software recipe files 22 received from chef studio system 44. At step 832, the user 24 through the computer 15 selects a recipe bought or subscribed to from the chef studio 44. At step 834, the robot food preparation engine 56 in the household robotic kitchen 48 is configured to receive inputs from the input module 50 for the selected recipe to be prepared. At step 836, the robot food preparation engine 56 in the household robotic kitchen 48 is configured to upload the selected recipe into the memory module 102 with software recipe files 46. At step 838, the robot food preparation engine 56 in the household robotic kitchen 48 is configured to calculate the ingredient availability to complete the selected recipe and the approximate cooking time required to finish the dish. At step 840, the robot food preparation engine 56 in the household robotic kitchen 48 is configured to analyze the prerequisites for the selected recipe and decides whether or not there is any shortage or lack of ingredients, or insufficient time to serve the dish according to the selected recipe and serving schedule. If the prerequisites are not met, at step 842, the robot food preparation engine 56 in the household robotic kitchen 48 sends an alert, indicating that the ingredients should be added to a shopping list, or offers an alternate recipe or serving schedules. However, if the prerequisites are met, the robot food preparation engine 56 is configured to confirm the recipe selection at step 844. At step 846, after the recipe selection has been confirmed, the user 60 through the computer 16 moves the food/ingredients to specific standardized containers and into the required positions. After the ingredients have been placed in the designated containers and the positions as identified, the robot food preparation engine 56 in the household robotic kitchen 48 is configured to check if the start time has been triggered at step 848. At this juncture, the household robot food preparation engine 56 offers a second process check to ensure that all the prerequisites are being met. If the robot food preparation engine 56 in the household robotic kitchen 48 is not ready to start the cooking process, the household robot food preparation engine 56 continues to check the prerequisites at step 850 until the start time has been triggered. If the robot food preparation engine 56 is ready to start the cooking process, at step 852, the quality check for raw food module 96 in the robot food preparation engine 56 is configured to process the prerequisites for the selected recipe and inspects each ingredient item against the description of the recipe (e.g. one center-cut beef tenderloin roast) and condition (e.g. expiration/purchase date, odor, color, texture, etc.). At step 854, the robot food preparation engine 56 sets the time at a "0" stage and uploads the software recipe file 46 to the one or more robotic arms 70 and the robotic hands 72 for replicating the chef's cooking movements to produce a selected dish according to the software recipe file 46. At step 856, the one or more robotic arms 72 and hands 74 process ingredients and execute the cooking method/technique with identical movements as that of the chef's 49 arms, hands and fingers, with the exact pressure, the precise force, and the same XYZ position, at the same time increments as captured and recorded from the chef's movements. During this time, the one or more robotic arms 70 and hands 72 compare the results of cooking against the controlled data (such as temperature, weight, loss, etc.) and the media data (such as color, appearance, smell, portion-size, etc.), as illustrated in step 858. After the data has been compared, the robotic apparatus (including the robotic arms 70 and the robotic hands 72) aligns and adjusts the results at step 860. At step 862, the robot food preparation engine 56 is configured to instruct the robotic apparatus to move the completed dish to the designated serving dishes and placing the same on the counter.

Figure 23:
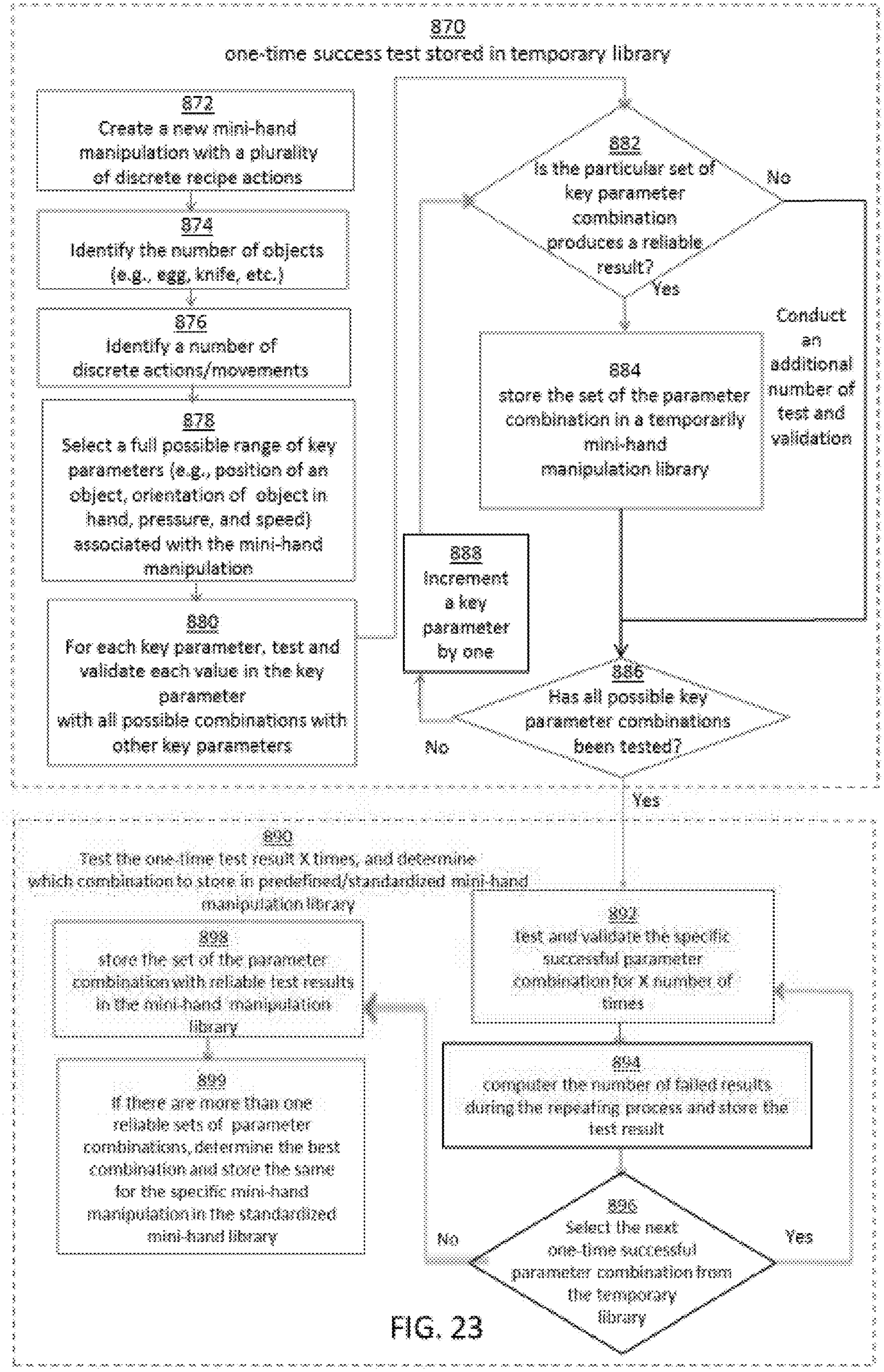
FIG. 23 is a flow diagram illustrating one embodiment of the software process for creating, testing, and validating, and storing the various parameter combinations for, a mini-manipulation system in accordance with the present invention.

FIG. 23 is a flow diagram illustrating one embodiment of the software process for creating, testing, and validating, and storing the various parameter combinations for a mini-manipulation library database 870. The mini-manipulation library database 870 involves a one-time success test process 870 (e.g., holding an egg), which is stored in a temporary library, and testing the combination of one-time test results 890 (e.g., the entire movements of cracking an egg) in the mini-manipulation database library. At step 872, the computer 16 creates a new mini-manipulation (e.g., crack an egg) with a plurality of action primitives (or a plurality of discrete recipe actions). At step 874, the number of objects (e.g., an egg and a knife) associated with the new mini-manipulation are identified. The computer 16 identifies a number of discrete actions or movements at step 876. At step 878, the computer selects a full possible range of key parameters (such as the positions of an object, the orientations of the object, pressure and speed) associated with the particular new mini-manipulation. At step 880, for each key parameter, the computer 16 tests and validates each value of the key parameters with all possible combinations with other key parameters (e.g., holding an egg in one position but testing other orientations). At step 882, the computer 16 determines if the particular set of key parameter combinations produces a reliable result. The validation of the result can be done by the computer 16 or a human. If the determination is negative, the computer 16 proceeds to step 886 to find if there are other key parameter combinations that have yet to be tested. At step 888, the computer 16 increments a key parameter by one in formulating the next parameter combination for further testing and evaluation for the next parameter combination. If the determination at step 882 is positive, the computer 16 then stores the set of successful key parameter combinations in a temporary location library. The temporary location library stores one or more sets of successful key parameter combinations (that either have the most successful test or have the least failed results).

At step 892, the computer 16 tests and validates the specific successful parameter combination for X number of times (such as one hundred times). At step 894, the computer 16 computes the number of failed results during the repeated test of the specific successful parameter combination. At step 896, the computer 16 selects the next one-time successful parameter combination from the temporary library, and returns the process back to step 892 for testing the next one-time successful parameter combination X number of times. If no further one-time successful parameter combination remains, the computer 16 stores the test results of one or more sets of parameter combinations that produce a reliable (or guaranteed) result at step 898. If there are more than one reliable sets of parameter combinations, at step 899, the computer 16 determines the best or optimal set of parameter combinations and stores the optimal set of parameter combination which is associated with the specific mini-manipulation for use in the mini-manipulation library database by the robotic apparatus in the standardized robotic kitchen 50 during the food preparation stages of a recipe.

Figure 24:
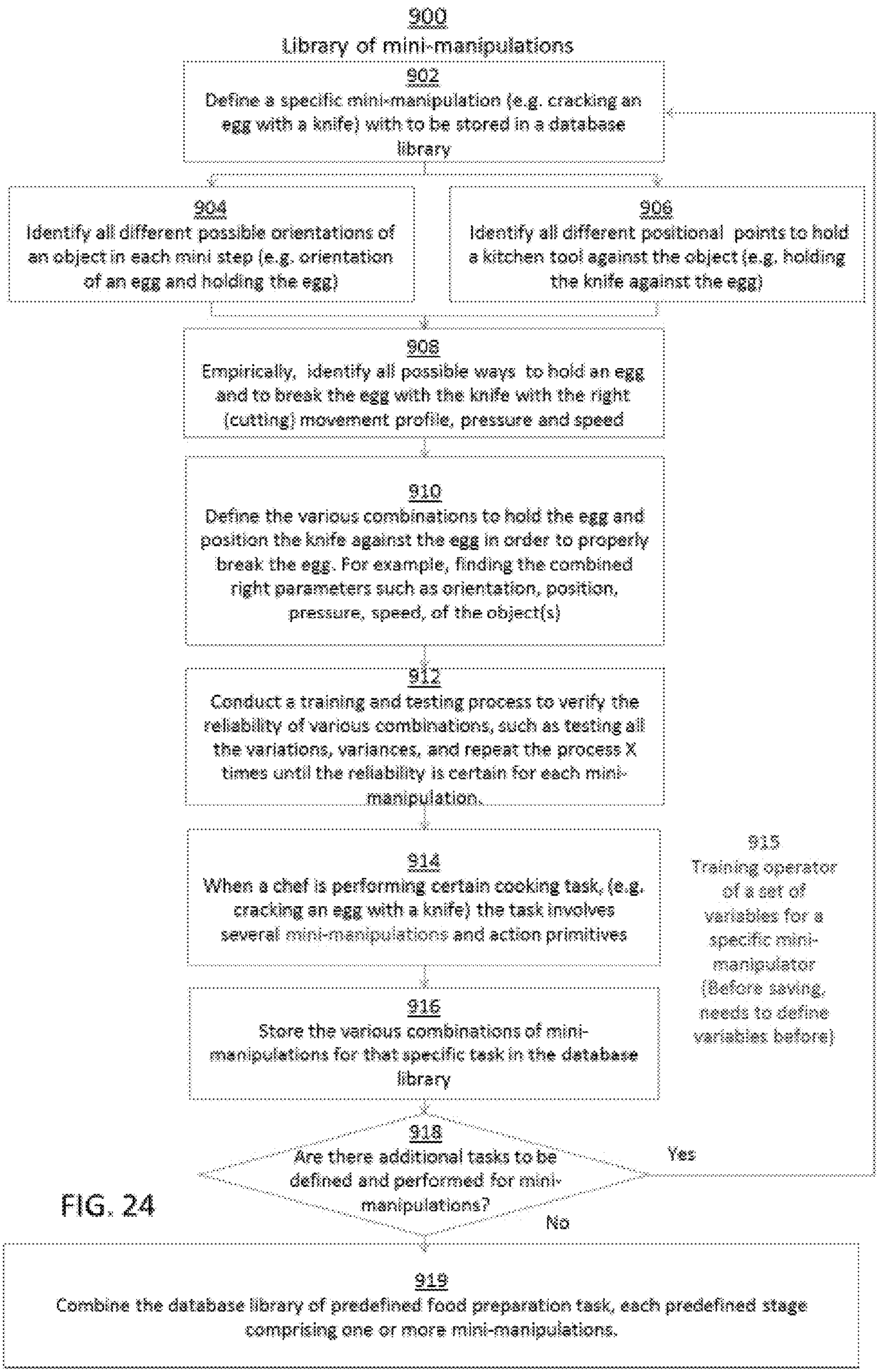
FIG. 24 is a flow diagram illustrating one embodiment of the software process for creating the tasks for a mini-manipulation system in accordance with the present invention.

FIG. 24 is a flow diagram illustrating one embodiment of the software process 900 for creating the tasks for a mini-manipulation. At step 902, the computer 16 defines a specific robotic task (e.g. cracking an egg with a knife) with a robotic mini hand manipulator to be stored in a database library. The computer at step 904 identifies all different possible orientations of an object in each mini step (e.g. orientation of an egg and holding the egg) and at step 906 identifies all different positional points to hold a kitchen tool against the object (e.g. holding the knife against the egg). At step 908 the computer empirically identifies all possible ways to hold an egg and to break the egg with the knife with the right (cutting) movement profile, pressure and speed. At step 910, the computer 16 defines the various combinations to hold the egg and positioning of the knife against the egg in order to properly break the egg. For example, finding the combination of optimal parameters such as orientation, position, pressure and speed of the object(s). At step 912, the computer 16 conducts a training and testing process to verify the reliability of various combinations, such as testing all the variations, variances, and repeats the process X times until the reliability is certain for each mini-manipulation. When the chef 49 is performing certain food preparation task, (e.g. cracking an egg with a knife) the task is translated to several steps/tasks of mini-hand manipulation to perform as part of the task at step 914. At step 916, the computer 16 stores the various combinations of mini-manipulations for that specific task in the database library. At step 918, the computer 16 determines whether there are additional tasks to be defined and performed for any mini-manipulations. The process returns to step 902 if there are any additional mini-manipulations to be defined. Different embodiments of the kitchen module are possible, including a standalone kitchen module and an integrated kitchen module. The integrated kitchen module is fitted into a conventional kitchen area of a typical house. The kitchen module operates in at least two modes, a robotic mode and a normal (manual) mode. Cracking an egg is one example of a mini-manipulation. The mini-manipulation library database would also apply to a wide a variety of tasks, such as using a fork to grab a slab of beef by applying the right pressure in the right direction and to the proper depth to the shape and depth of the meat. At step 919, the computer combines the database library of predefined kitchen tasks, where each predefined kitchen task comprises one or more mini-manipulations.

Figure 25:
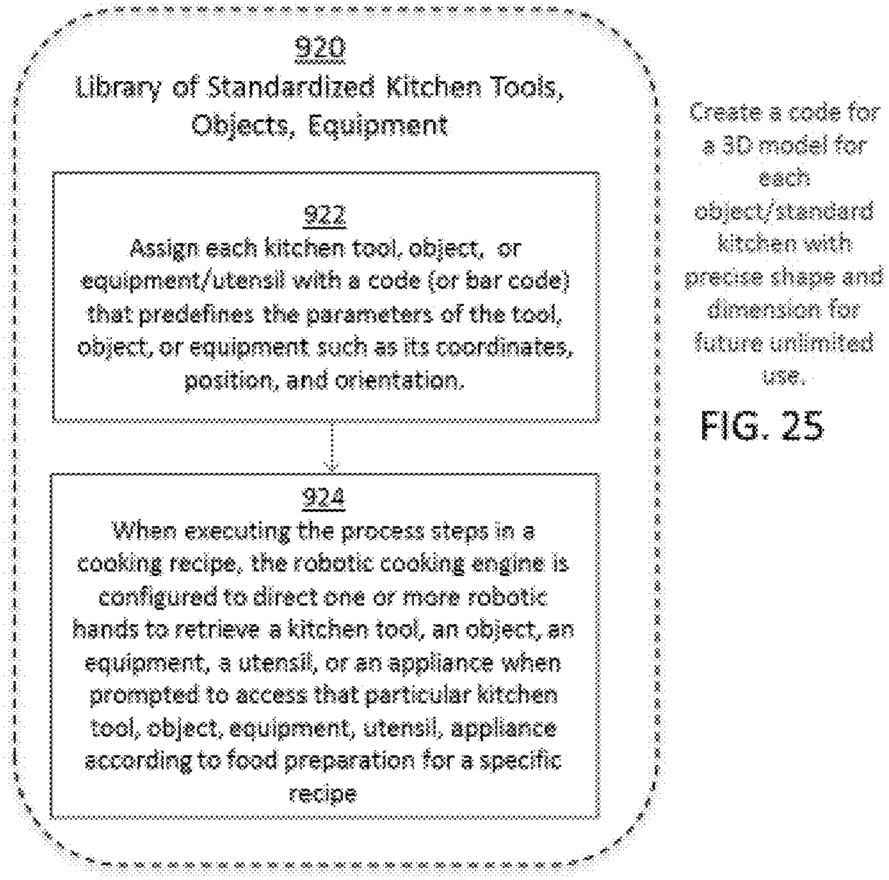
FIG. 25 is a flow diagram illustrating the process of assigning and utilizing a library of standardized kitchen tools, standardized objects, and standardized equipment in a standardized robotic kitchen in accordance with the present invention.

FIG. 25 is a flow diagram illustrating the process 920 of assigning and utilizing a library of standardized kitchen tools, standardized objects, standardized equipment in a standardized robotic kitchen. At step 922, the computer 16 assigns each kitchen tool, object, or equipment/utensil with a code (or bar code) that predefines the parameters of the tool, object, or equipment such as its three-dimensional position coordinates and orientation. This process standardizes the various elements in the standardized robotic kitchen 50, including but not limited to: standardized kitchen equipment, standardized kitchen tools, standardized knifes, standardized forks, standardized containers, standardized pans, standardized appliances, standardized working spaces, standardized attachments, and other standardized elements. When executing the process steps in a cooking recipe, at step 924, the robotic cooking engine is configured to direct one or more robotic hands to retrieve a kitchen tool, an object, a piece of equipment, a utensil, or an appliance when prompted to access that particular kitchen tool, object, equipment, utensil or appliance, according to the food preparation process for a specific recipe.

Figure 26:
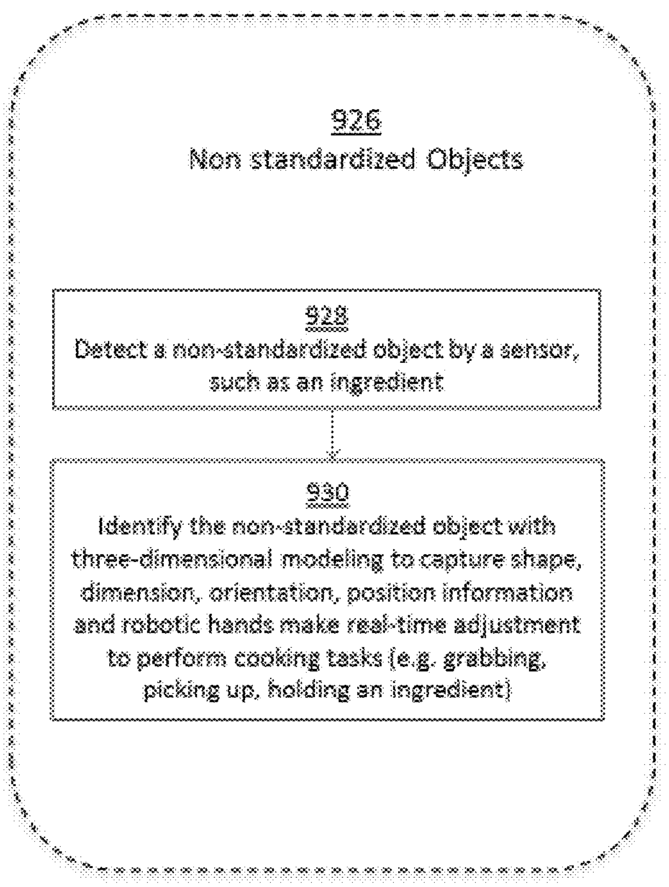
FIG. 26 is a flow diagram illustrating the process of identifying a non-standardized object with three-dimensional modeling in accordance with the present invention.

FIG. 26 is a flow diagram illustrating the process 926 of identifying a non-standard object through three-dimensional modeling and reasoning. At step 928, the computer 16 detects a non-standard object by a sensor, such as an ingredient that may have a different size, different dimensions, and/or different weight. At step 930, the computer 16 identifies the non-standard object with three-dimensional modeling sensors 66 to capture shape, dimensions, orientation and position information and robotic hands 72 make a real-time adjustment to perform the appropriate food preparation tasks (e.g. cutting or picking up a piece of steak).

Figure 27:
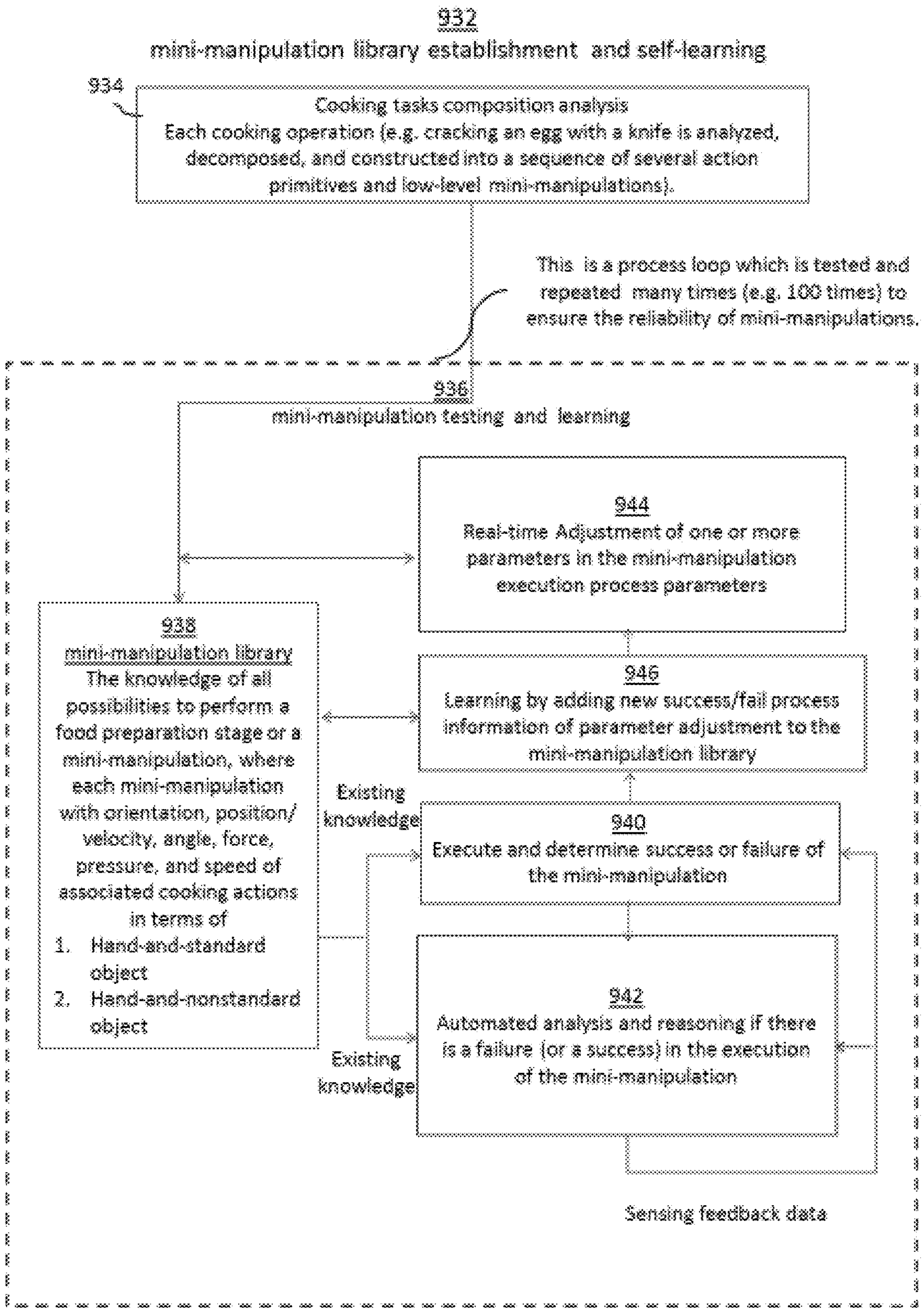
FIG. 27 is a flow diagram illustrating the process for testing and learning of mini-manipulations in accordance with the present invention.

FIG. 27 is a flow diagram illustrating the process 932 for testing and learning of mini-manipulations. At step 934, the computer performs a food preparation task composition analysis in which each cooking operation (e.g. cracking an egg with a knife) is analyzed, decomposed, and constructed into a sequence of action primitives or mini-manipulations. In one embodiment, a mini-manipulation refers to a sequence of one or more action primitives that accomplish a basic functional outcome (e.g., the egg has been cracked, or a vegetable sliced) that advances toward a specific result in preparing a food dish. In this embodiment, a mini-manipulation can be further described as a low-level mini-manipulation or a high-level mini-manipulation where a low-level mini-manipulation refers to a sequence of action primitives that requires minimal interaction forces and relies almost exclusively on the use of the robotic apparatus, and a high-level mini-manipulation refers to a sequence of action primitives requiring a substantial amount of interaction and interaction forces and control thereof. The process loop 936 focuses on mini-manipulation and learning steps and consists of tests which are repeated many times (e.g. 100 times) to ensure the reliability of mini-manipulations. At step 938, the robotic food preparation engine 56 is configured to assess the knowledge of all possibilities to perform a food preparation stage or a mini-manipulation, where each mini-manipulation is tested with respect to orientations, positions/velocities, angles, forces, pressures, and speeds with a particular mini-manipulation. A mini-manipulation or an action primitive may involve the robotic hand 72 and a standard object, or the robotic hand 72 and a nonstandard object. At step 940, the robotic food preparation engine 56 is configured to execute the mini-manipulation and determine if the outcome can be deemed successful or a failure. At step 942, the computer 16 conducts an automated analysis and reasoning about the failure of the mini-manipulation. For example, the multimodal sensors may provide sensing feedback data on the success or failure of the mini-manipulation. At step 944, the computer 16 is configured to make a real-time adjustment and adjusts the parameters of the mini-manipulation execution process. At step 946, the computer 16 adds new information about the success or failure of the parameter adjustment to the mini-manipulation library as a learning mechanism to the robotic food preparation engine 56.

Figure 28:
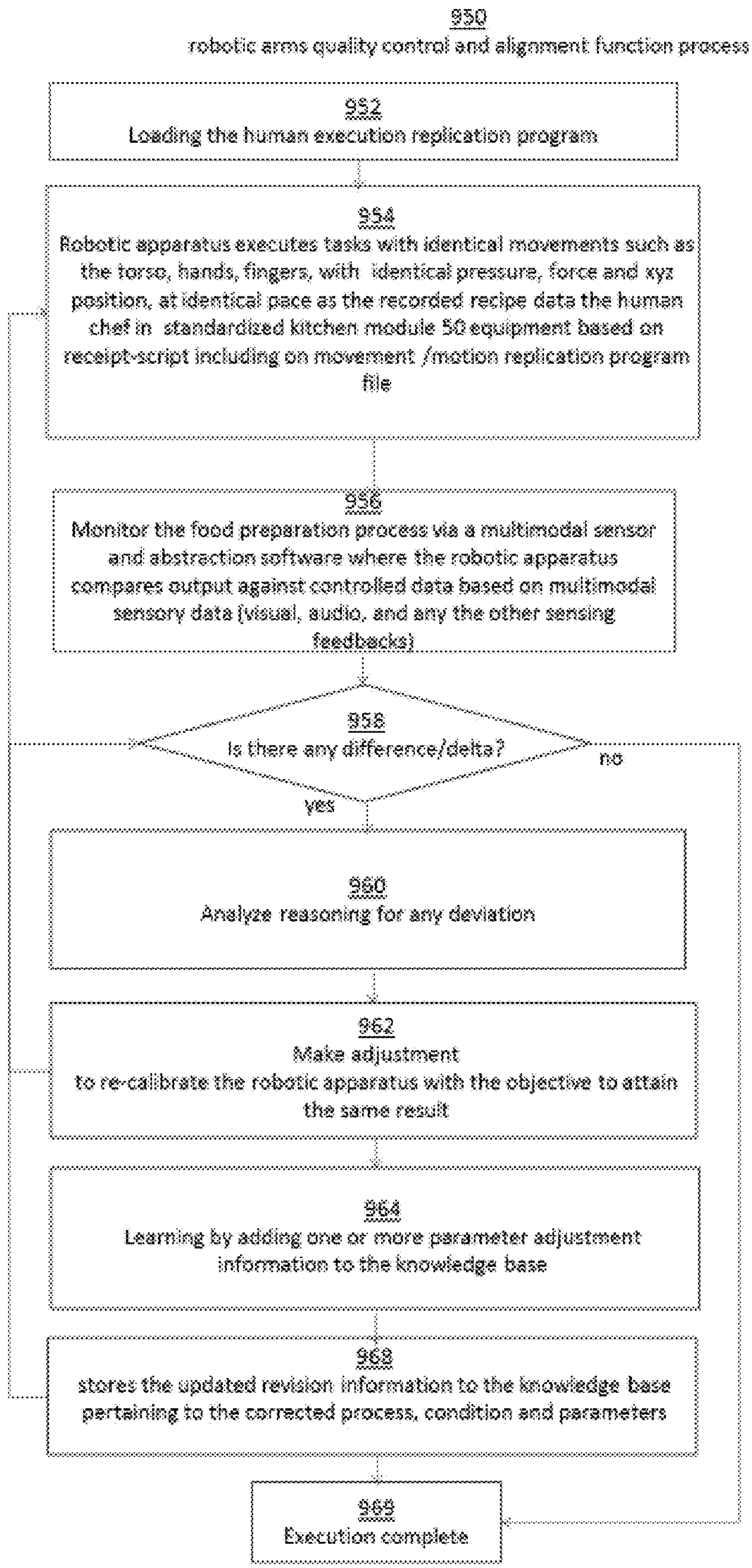
FIG. 28 is a flow diagram illustrating the process for robotic arms quality control and alignment function process in accordance with the present invention.
Figure 31:
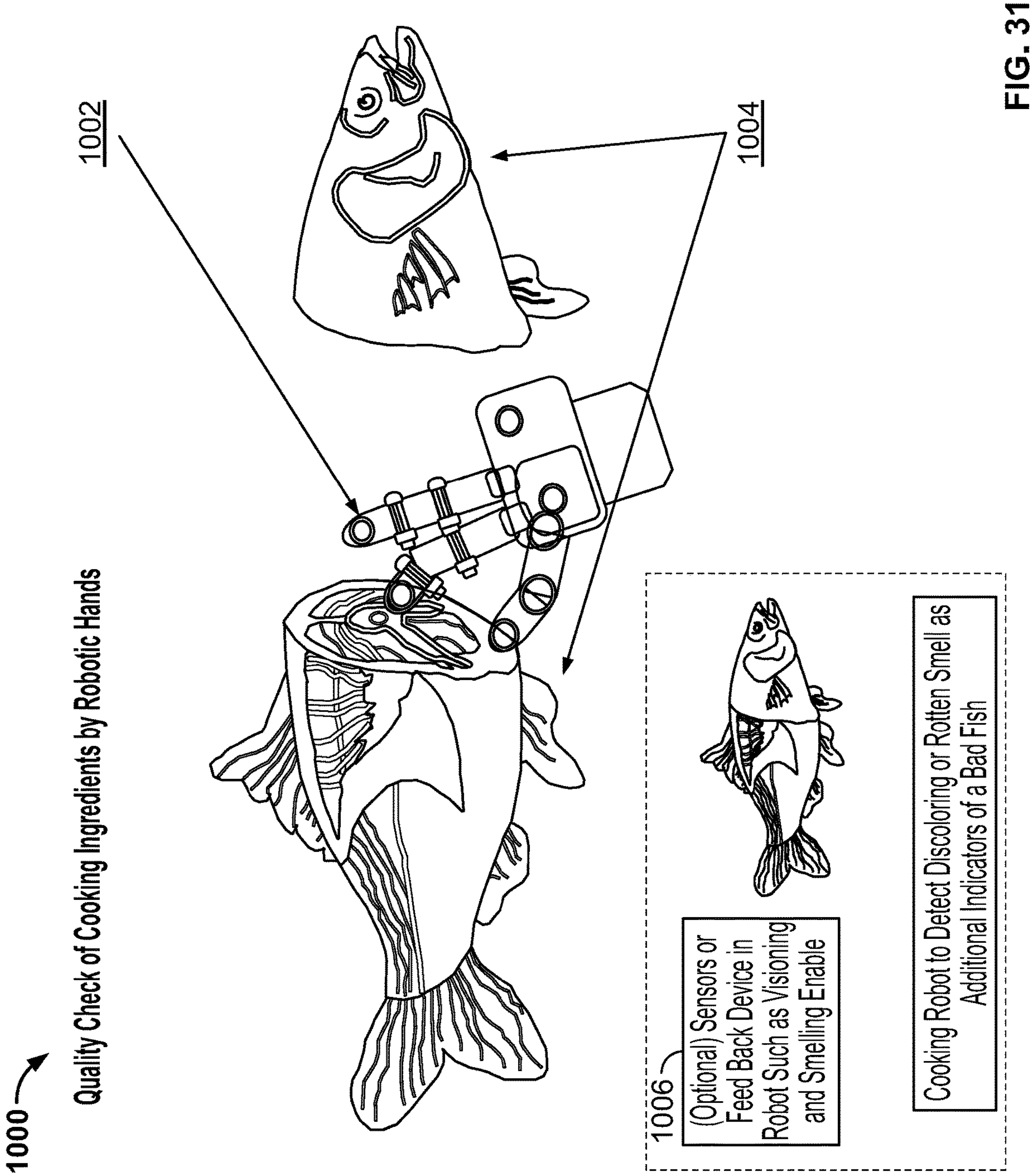
FIG. 31 is a pictorial diagram illustrating a robotic hand for conducting quality check of fish in accordance with the present invention.

FIG. 28 is a flow diagram illustrating the process 950 for quality control and alignment functions for robotic arms. At step 952, the robotic food preparation engine 56 loads a human chef replication software recipe file 46 via the input module 50. For example, the software recipe file 46 to replicate food preparation from Michelin starred chef Arnd Beuchel's "Wiener Schnitzel". At step 954, the robotic apparatus executes tasks with identical movements such as those for the torso, hands, fingers, with identical pressure, force and xyz position, at an identical pace as the recorded recipe data stored based on the actions of the human chef preparing the same recipe in a standardized kitchen module with standardized equipment based on the stored receipt-script including all movement/motion replication data. At step 956, the computer 16 monitors the food preparation process via a multimodal sensor that generates raw data supplied to abstraction software where the robotic apparatus compares real-world output against controlled data based on multimodal sensory data (visual, audio, and any other sensory feedback). At step 958, the computer 16 determines if there any differences between the controlled data and the multimodal sensory data. At step 960, the computer 16 analyzes whether the multimodal sensory data deviates from the controlled data. If there is a deviation, at step 962, the computer 16 makes an adjustment to re-calibrate the robotic arm 70, the robotic hand 72, or other elements. At step 964, the robotic food preparation engine 16 is configured to learn in process 964 by adding the adjustment made to one or more parameter values to the knowledge database. At step 968, the computer 16 stores the updated revision information to the knowledge database pertaining to the corrected process, condition and parameters. If there is no difference in deviation from step 958, the process 950 goes directly to step 969 in completing the execution.

FIG. 29 is a table illustrating one embodiment of a database library structure 970 of mini-manipulation objects for use in the standardized robotic kitchen. The database library structure 970 shows several fields for entering and storing information for a particular mini-manipulation, including (1) the name of the mini-manipulation, (2) the assigned code of the mini-manipulation, (3) the code(s) of standardized equipment and tools associated with the performance of the mini-manipulation, (4) the initial position and orientation of the manipulated (standard or non-standard) objects (ingredients and tools), (5) parameters/variables defined by the user (or extracted from the recorded recipe during execution), (6) sequence of robotic hand movements (control signals for all servos) and connecting feedback parameters (from any sensor or video monitoring system) of mini-manipulations on the timeline. The parameters for a particular mini-manipulation may differ depending on the complexity and objects that are necessary to perform the mini-manipulation. In this example, four parameters are identified: the starting XYZ position coordinates in the volume of the standardized kitchen module, the speed, the object size, and the object shape. Both the object size and the object shape may be defined or described by non-standard parameters.

FIG. 30 is a table illustrating a database library structure 972 of standardized objects for use in the standardized robotic kitchen. The standard object database library structure 972 shows several fields to store information pertaining to a standard object, including (1) the name of an object, (2) an image of the object, (3) an assigned code for the object, (4) a virtual 3D model with full dimensions of the object in an XYZ coordinate-matrix with the preferred resolution predefined, (5) a virtual vector model of the object (if available), (6) definition and marking of the working elements of the object (the elements, which may be in contact with hands and other objects for manipulation), and (7) an initial standard orientation of the object for each specific manipulation.

Figure 32:
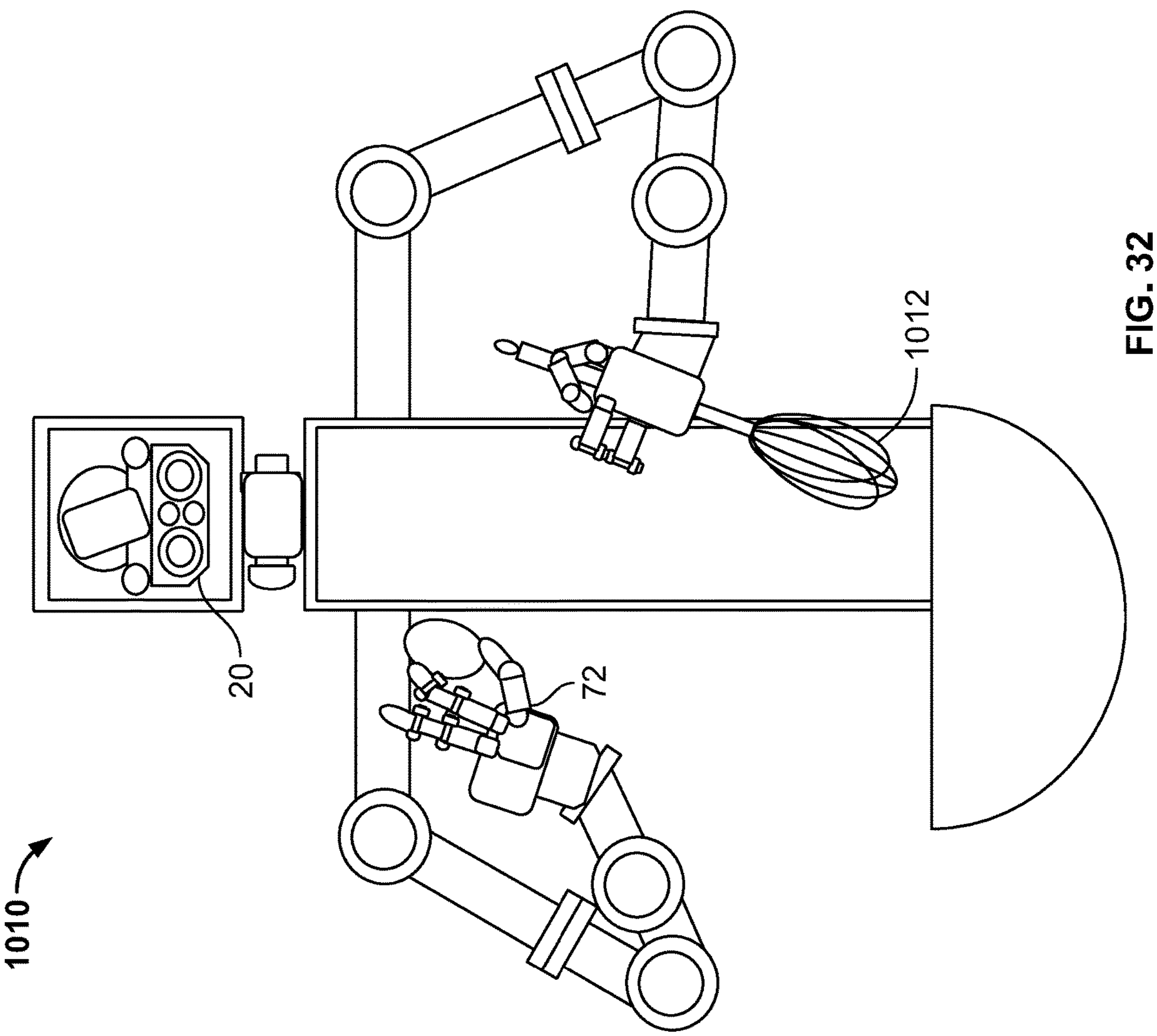
FIG. 32 is a pictorial diagram illustrating a robotic sensor head for conducting quality check in a bowl in accordance with the present invention.

FIG. 32 depicts the execution of process 1000 used to check for the quality of the ingredients to be used as part of the recipe replication process by the standardized robotic kitchen. The multi-modal sensor system video-sensing element is able to implement process 1006, which uses color-detection and spectral analysis to detect discoloration indicating possible spoilage. Similarly using an ammonia-sensitive sensor system, whether embedded in the kitchen or part of a mobile probe handled by the robotic hands, further potential for spoilage can be detected. Additional haptic sensors in the robotic hands and fingers would allow for validating the freshness of the ingredient through the touch-0sensing process 1004, where the firmness and resistance to contact forces is measured (amount and rate of deflection as a function of compression-distance). As an example, for fish the color (deep red) and moisture content of the gills is an indicator of freshness, as the eyes which should be clear (not fogged), and the proper temperature of the flesh of a properly thawed fish should not exceed 40 deg F. Additional contact-sensors on the finger-tips are able to carry out additional quality check 1002 related to the temperature, texture and overall weight of the ingredient through touching, rubbing and holding/pickup motions. All the data collected through these haptic sensors and video-imagery can be used in a processing algorithm to decide on the freshness of the ingredient and make decisions on whether to use it or dispose of it.

FIG. 32 depicts the robotic recipe-script replication process 1010, wherein a multi-modal sensor outfitted head 20, and dual arms with multi-fingered hands 72 holding ingredients and utensils, interact with cookware 1012. The robotic sensor head 20 with a multi-modal sensor unit is used to continually model and monitor the three-dimensional task-space being worked by both robotic arms while also providing data to the task-abstraction module to identify tools and utensils, appliances and their contents and variables, so as to allow them to be compared to the cooking-process sequence generated recipe-steps to ensure the execution is proceeding along the computer-stored sequence-data for the recipe. Additional sensors in the robotic sensor head 20 are used in the audible domain to listen and smell during significant parts of the cooking process. The robotic hands 72 and their haptic sensors are used to properly handle respective ingredients, such as an egg in this case; the sensors in the fingers and palm are able to for example detect a usable egg by way of surface texture and weight and its distribution and hold and orient the egg without breaking it. The multi-fingered robotic hands 72 are also capable of fetching and handling particular cookware, such as a bowl in this case, and grab and handle cooking utensils (a whisk in this case), with proper motions and force application so as to properly process food ingredients (e.g. cracking an egg, separating the yolks and beating the egg-white until a stiff composition is achieved) as specified in the recipe-script.

Figure 33:
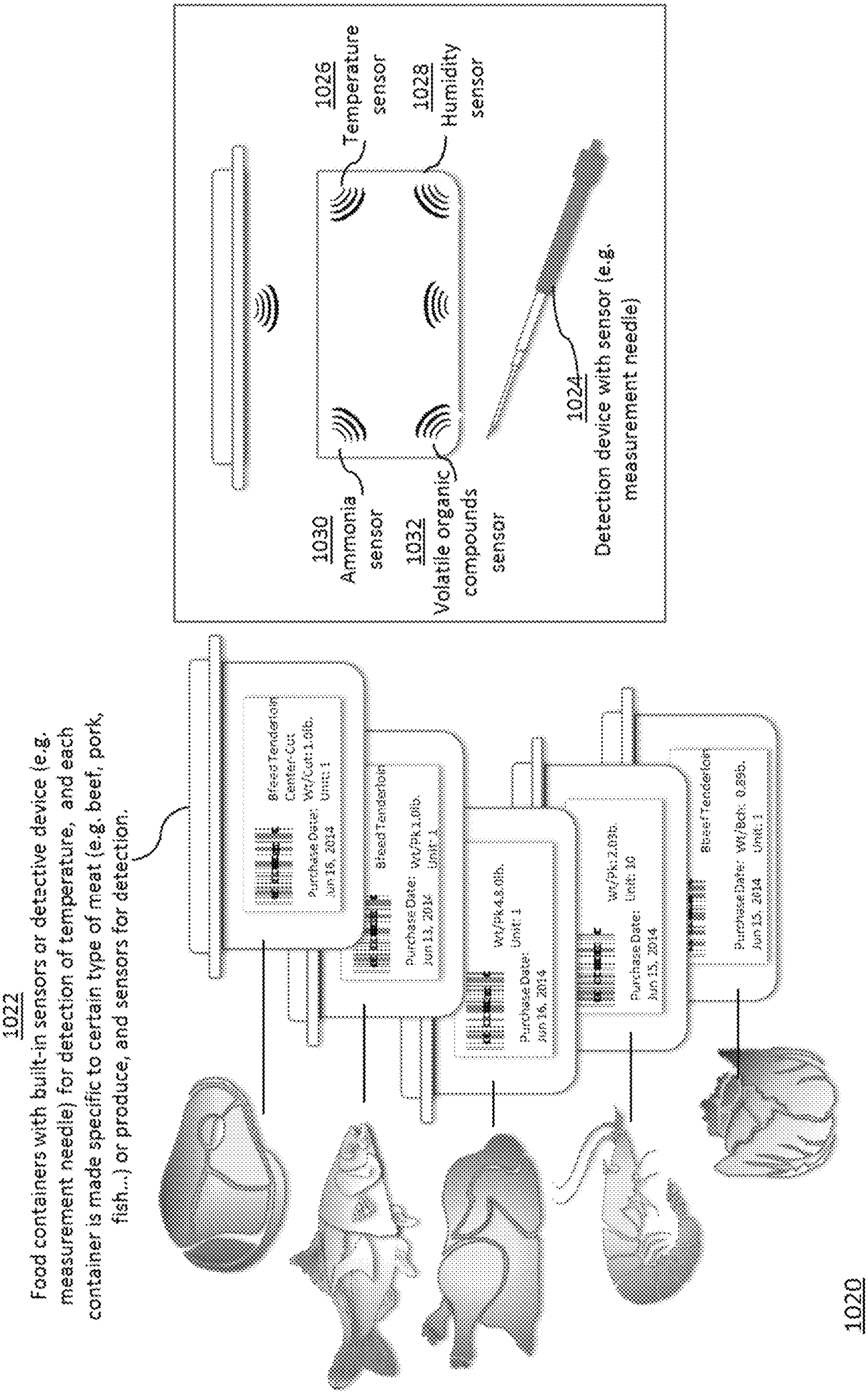
FIG. 33 is a pictorial diagram illustrating a detection device or container with a sensor for determining the freshness and quality of food in accordance with the present invention.

FIG. 33 depicts the ingredient storage system notion 1020, wherein food storage containers 1022, capable of storing any of the needed cooking ingredients (e.g. meats, fish, poultry, shellfish, vegetables, etc.), are outfitted with sensors to measure and monitor the freshness of the respective ingredient. The monitoring sensors embedded in the food storage containers 1022 include, but are not limited to, ammonia sensors 1030, volatile organic compound sensors 1032, internal container temperature sensors 1026 and humidity sensors 1028. Additionally a manual probe can be used, whether employed by the human chef or the robotic arms and hands, to allow for key measurements (such as temperature) within a volume of a larger ingredient (e.g. internal meat temperature).

Figure 34:
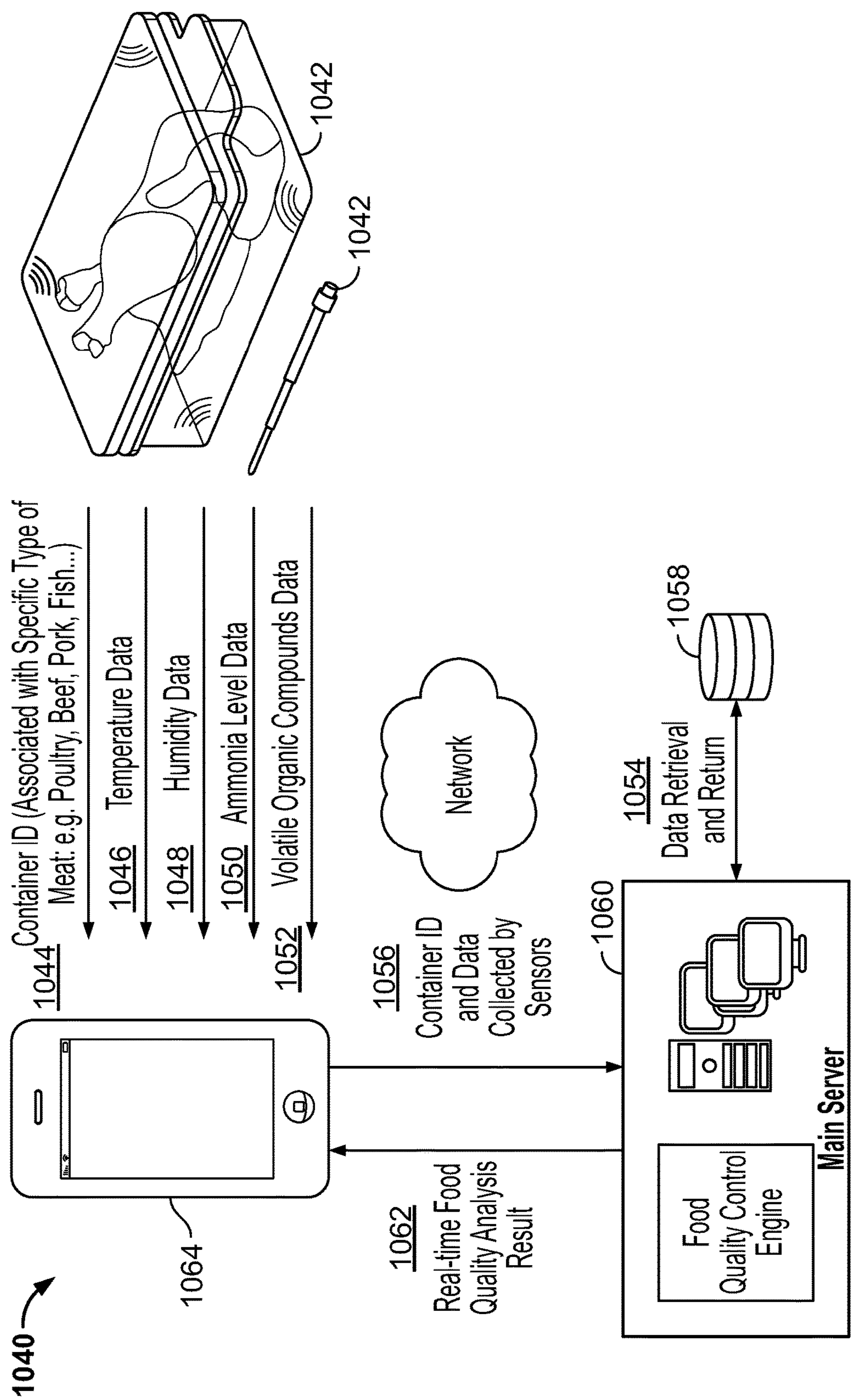
FIG. 34 is a system diagram illustrating an online analysis system for determining the freshness and quality of food in accordance with the present invention.

FIG. 34 depicts the measurement and analysis process 1040 carried out as part of the freshness and quality check for ingredients placed in food storage containers 1042 containing sensors and detection devices (e.g. a temperature probe/needle). A container is able to forward its data set by way of a metadata tag 1044, specifying its container-ID, and including the temperature data 1046, humidity data 1048, ammonia level data 1050, volatile organic compound data 1052 over a wireless data-network through a communication step 1056, to a main server where a food control quality engine processes the container data. The processing step 1060 uses the container-specific data 1044 and compares it to data-values and -ranges considered acceptable, which are stored and retrieved from media 1058 by a data retrieval and storage process 1054. A set of algorithms then make the decision as to the suitability of the ingredient, providing a real-time food quality analysis result over the data-network via a separate communication process 1062. The quality analysis results are then utilized in another process 1064, where the results are forwarded to the robotic arms for further action and may also be displayed remotely on a screen (such as a smartphone or other display) for a user to decide if the ingredient is to be used in the cooking process for later consumption or disposed of as spoiled.

Figure 35:
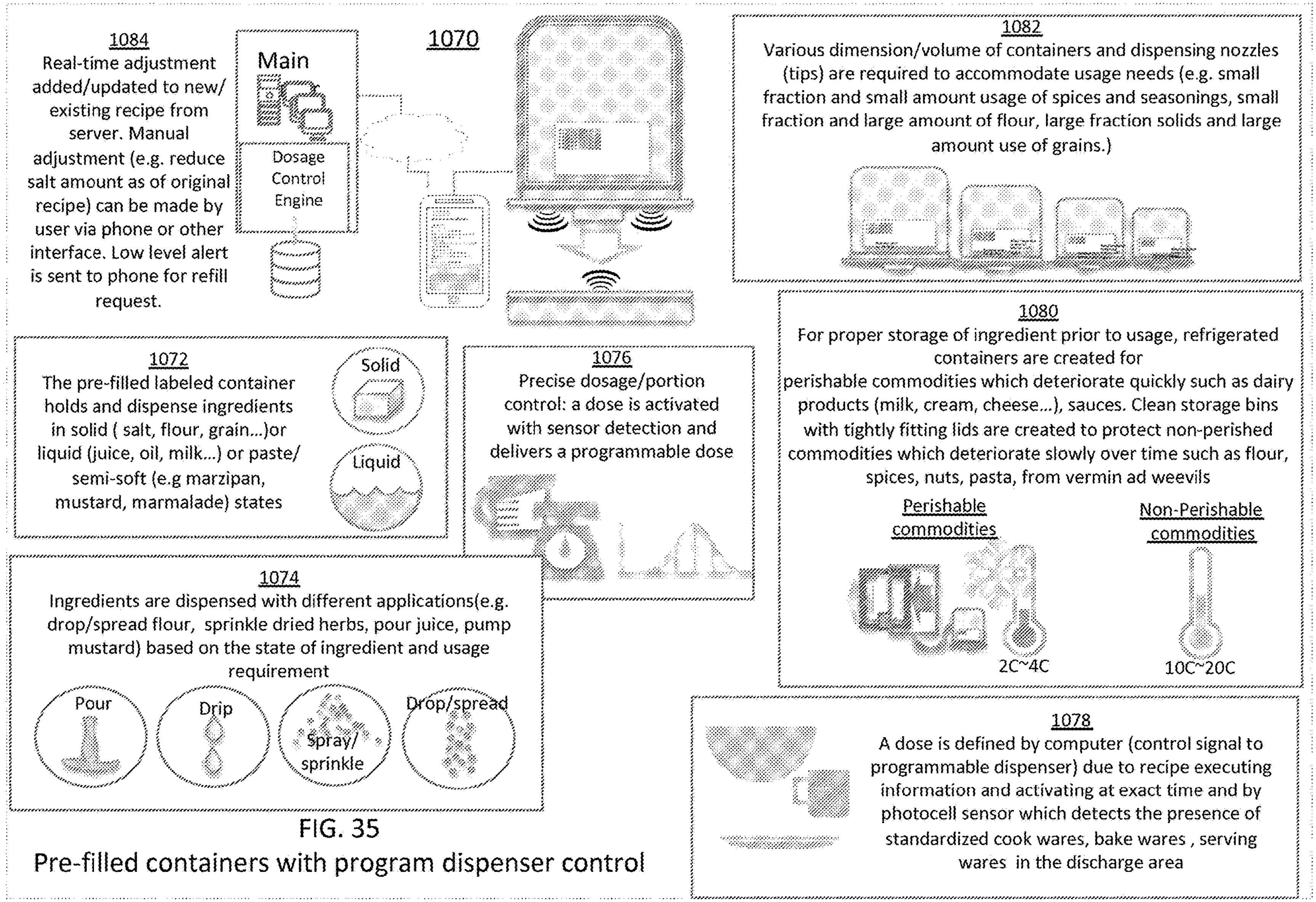
FIG. 35 is a block diagram illustrating pre-filled containers with programmable dispenser control in accordance with the present invention.

FIG. 35 depicts the functionalities and process-steps of pre-filled ingredient containers 1070 when used in the standardized kitchen, whether it be the standardized robotic kitchen or the chef studio. Ingredient containers 1070 are designed in different sizes 1082 and varied usages in mind and are suitable for proper storage environments 1080 to accommodate perishable items by way of refrigeration, freezing, chilling, etc. to achieve specific storage temperature ranges. Additionally, ingredient storage containers 1070 are also designed to suit different types of ingredients 1072, with containers already pre-labeled and pre-filled with solid (salt, flour, rice, etc.), viscous/pasty (mustard, mayonnaise, marzipan, jams, etc.) or liquid (water, oil, milk, juice, etc.) ingredients, where dispensing processes 1074 utilize a variety of different application devices (dropper, chute, peristaltic dosing pump, etc.) depending on the ingredient type, with exact computer-controllable dispensing by way of a dosage control engine 1084 running a dosage control process 1076 ensuring that the proper amount of ingredient is dispensed at the right time. It should be noted that the recipe-specified dosage is adjustable to suit personal tastes or diets (low sodium, etc.), by way of a menu-interface or even through a remote phone application. The dosage determination process 1078 is carried out by the dosage control engine 1084, based on the amount specified in the recipe, with dispensing occurring either through manual release command or remote computer control based on the detection of a particular dispensing container at the exit point of the dispenser.

Figure 36:
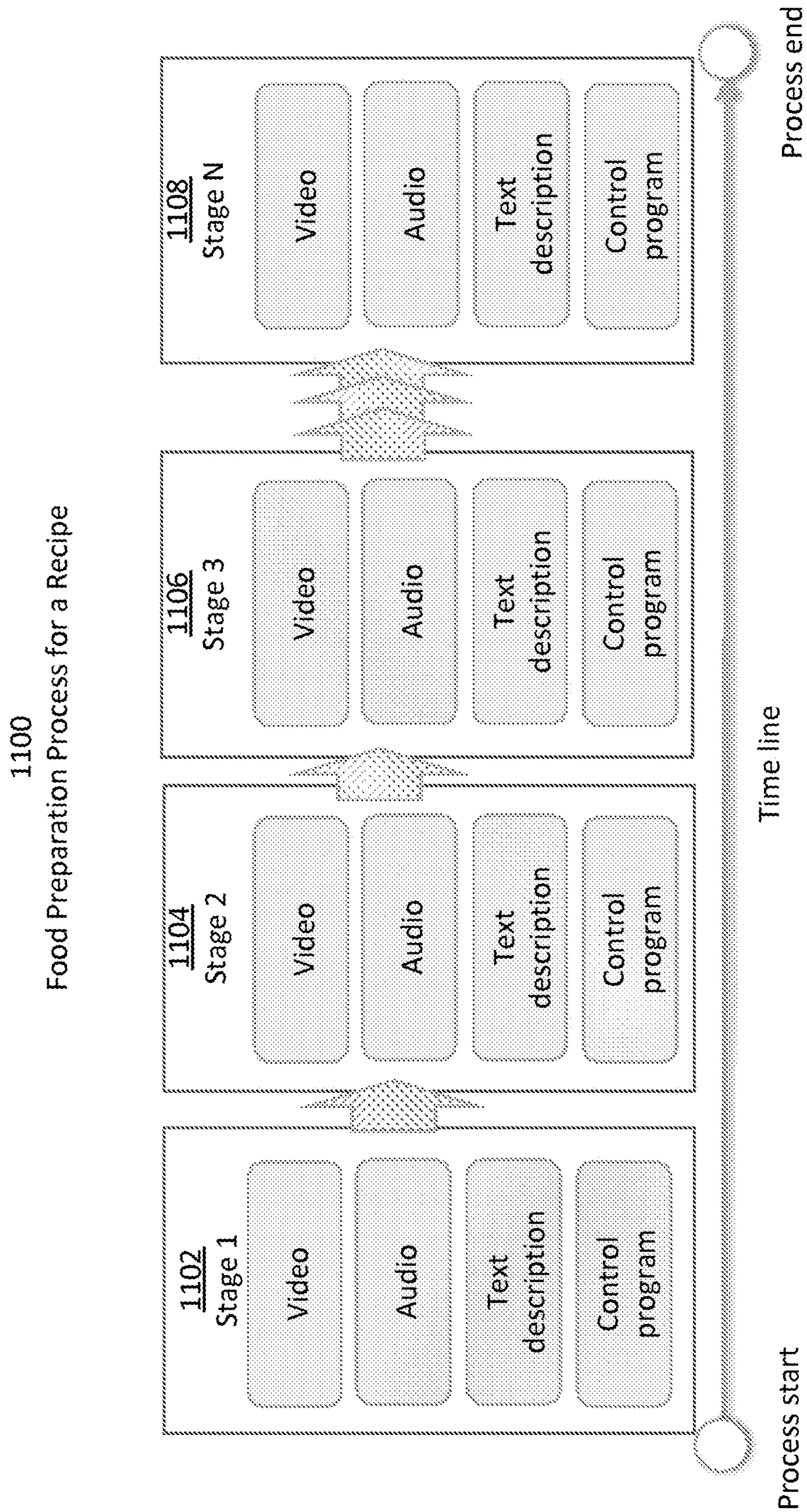
FIG. 36 is a block diagram illustrating a recipe system structure for use in the standardized robotic kitchen in accordance with the present invention.

FIG. 36 is a block diagram illustrating a recipe system structure 1000 for use in the standardized robotic kitchen 50. The food preparation process 1100 is shown as divided into multiple stages along the cooking timeline, with each stage having or more raw data blocks for each stage 1102, stage 1004, stage 1106 and stage 1108. The data blocks can contain such elements as video-imagery, audio-recordings, textual descriptions, as well as the machine-readable and -understandable set of instructions and commands that form a part of the control program. The raw data set is contained within the recipe structure and representative of each cooking stage along a timeline divided into many time-sequenced stages, with varying levels of time-intervals and -sequences, all the way from the start of the recipe replication process to the end of the cooking process, or any sub-process therein.

Figure 37A:
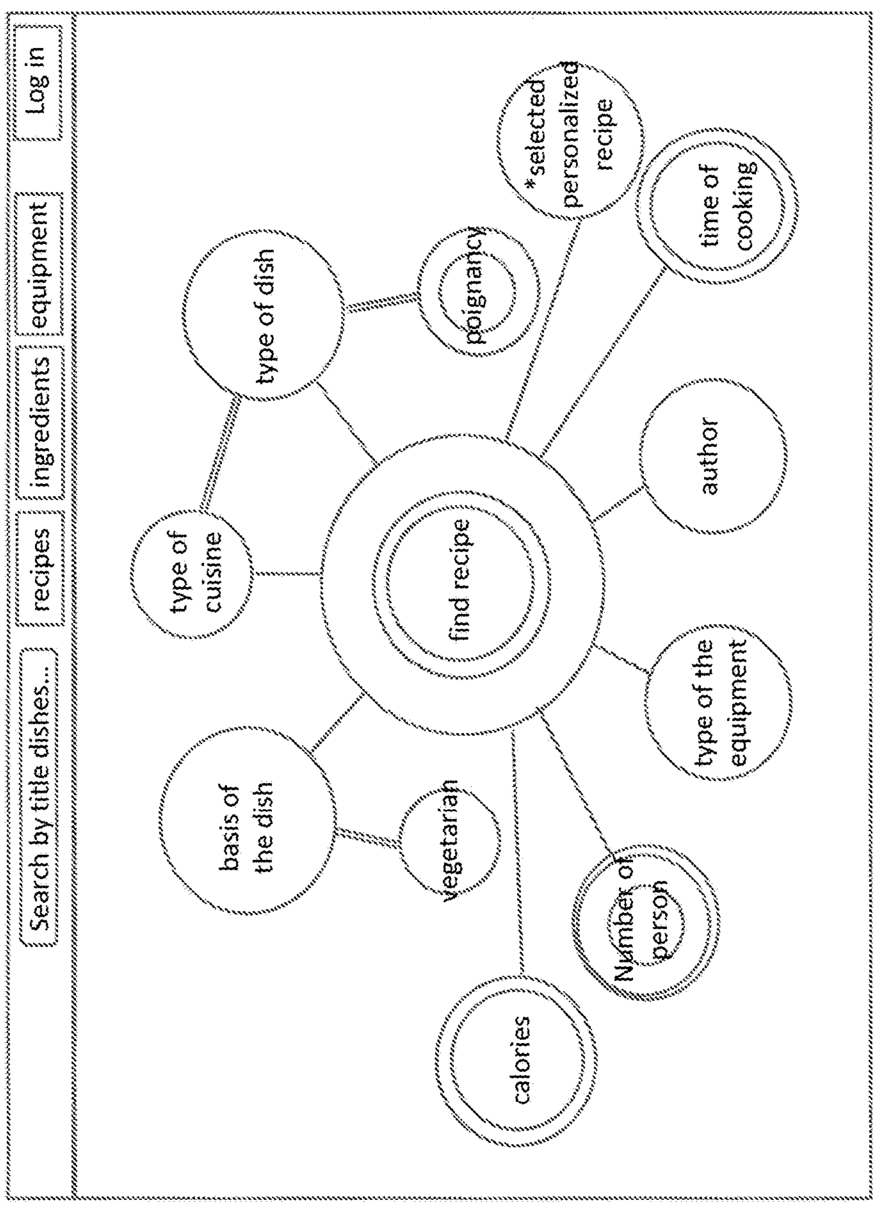
FIGS. 37A-C are block diagrams illustrating recipe search menus for use in the standardized robotic kitchen in accordance with the present invention.
Figure 37B:
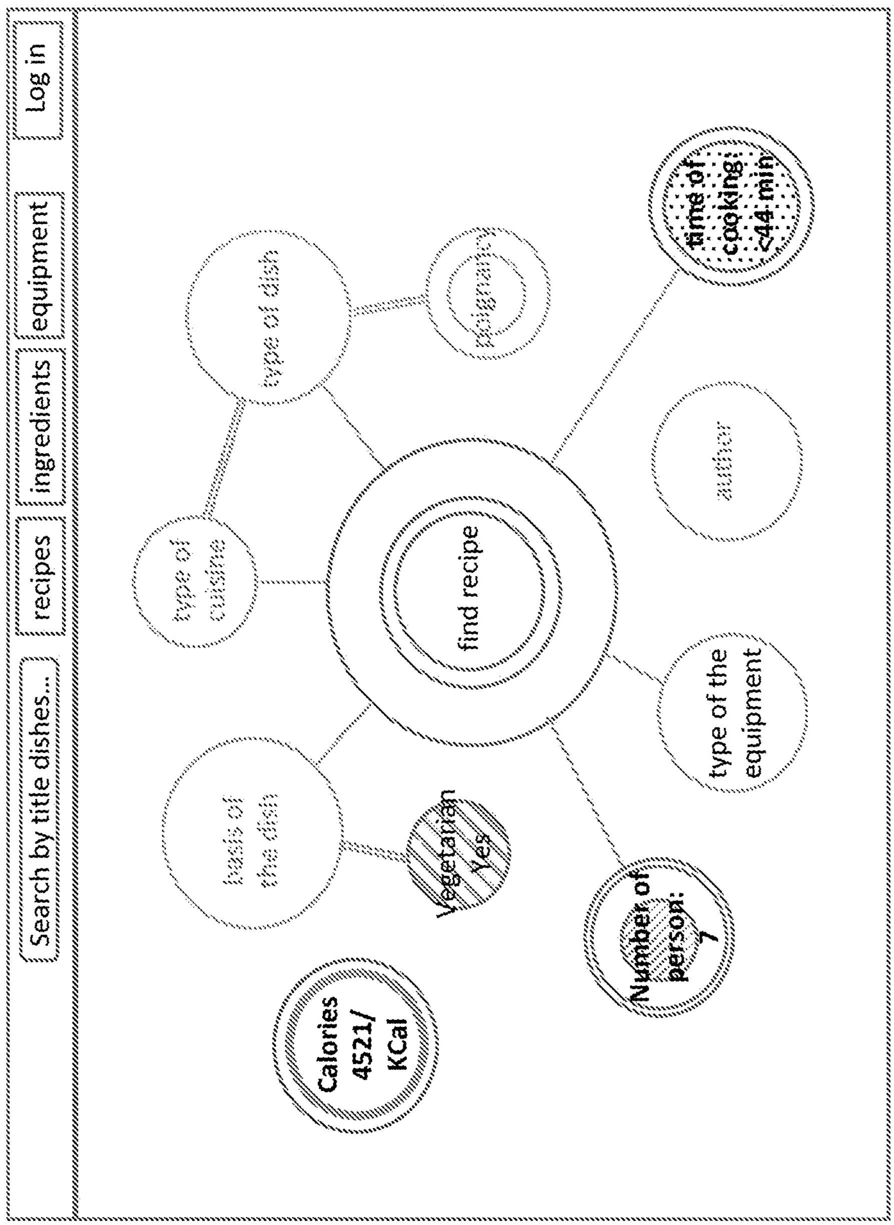
Figure 37C:
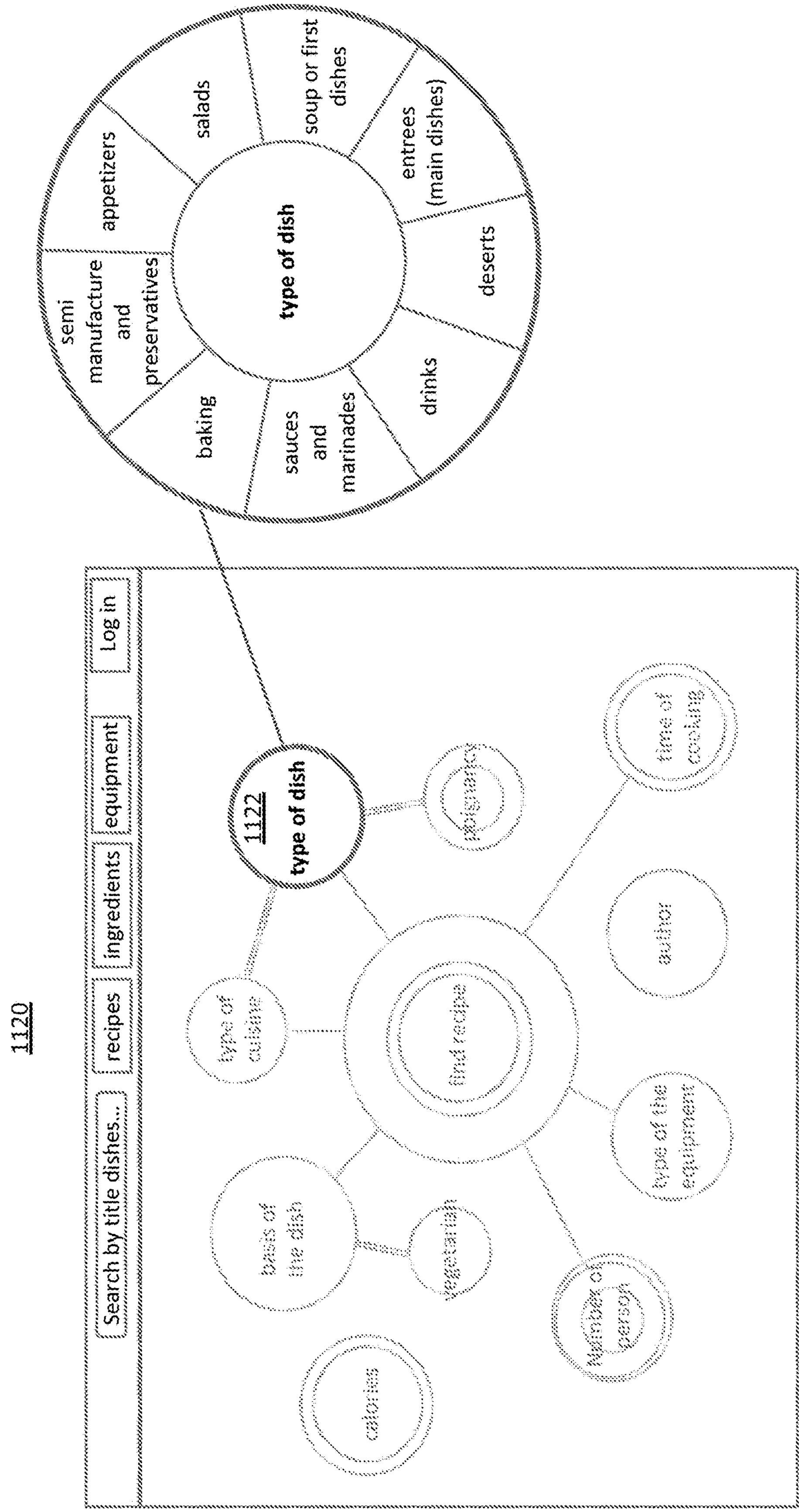
Figure 37D:
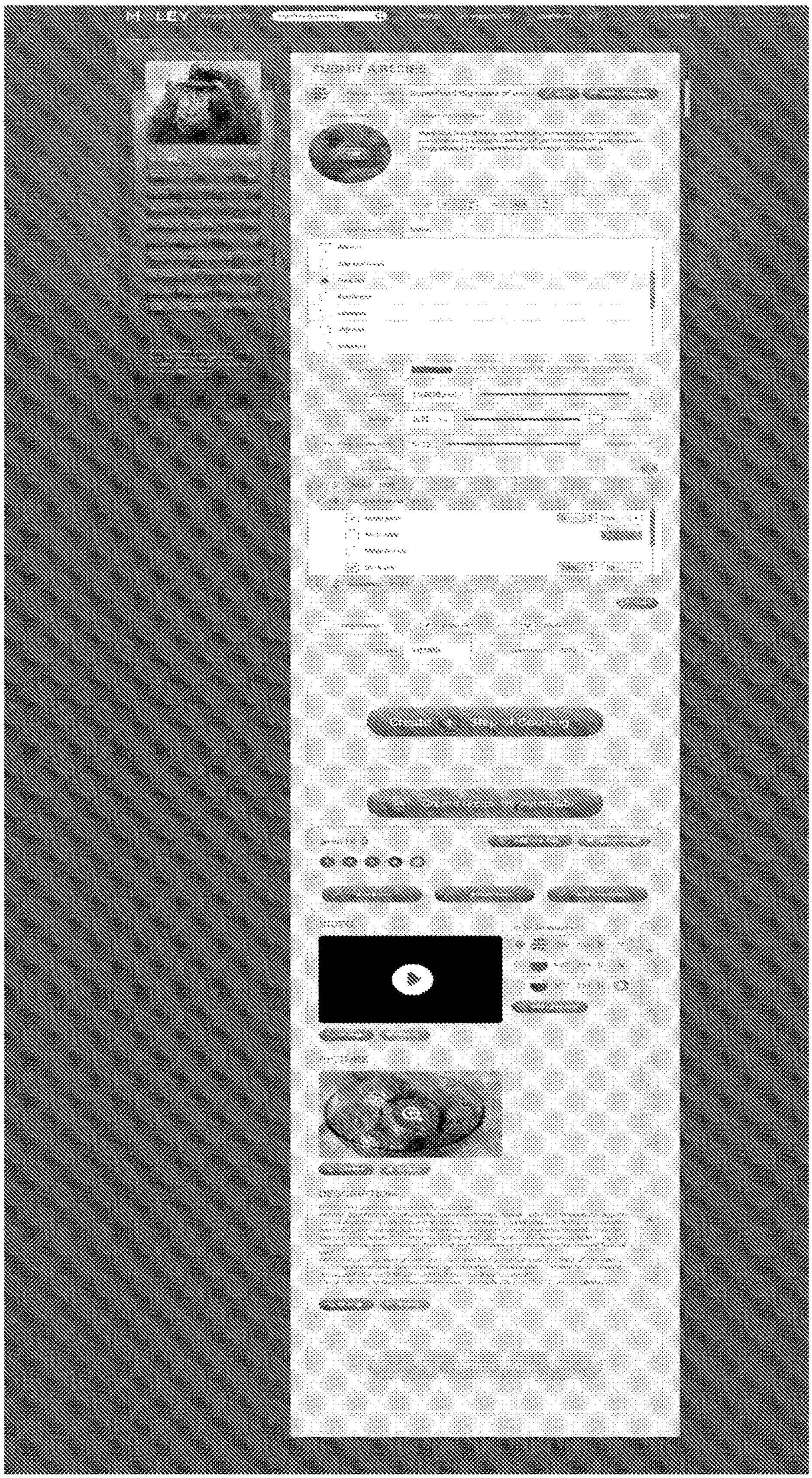
FIG. 37D is a screen shot of a menu with option to create and submit a recipe in accordance with the present invention.
Figure 37E:
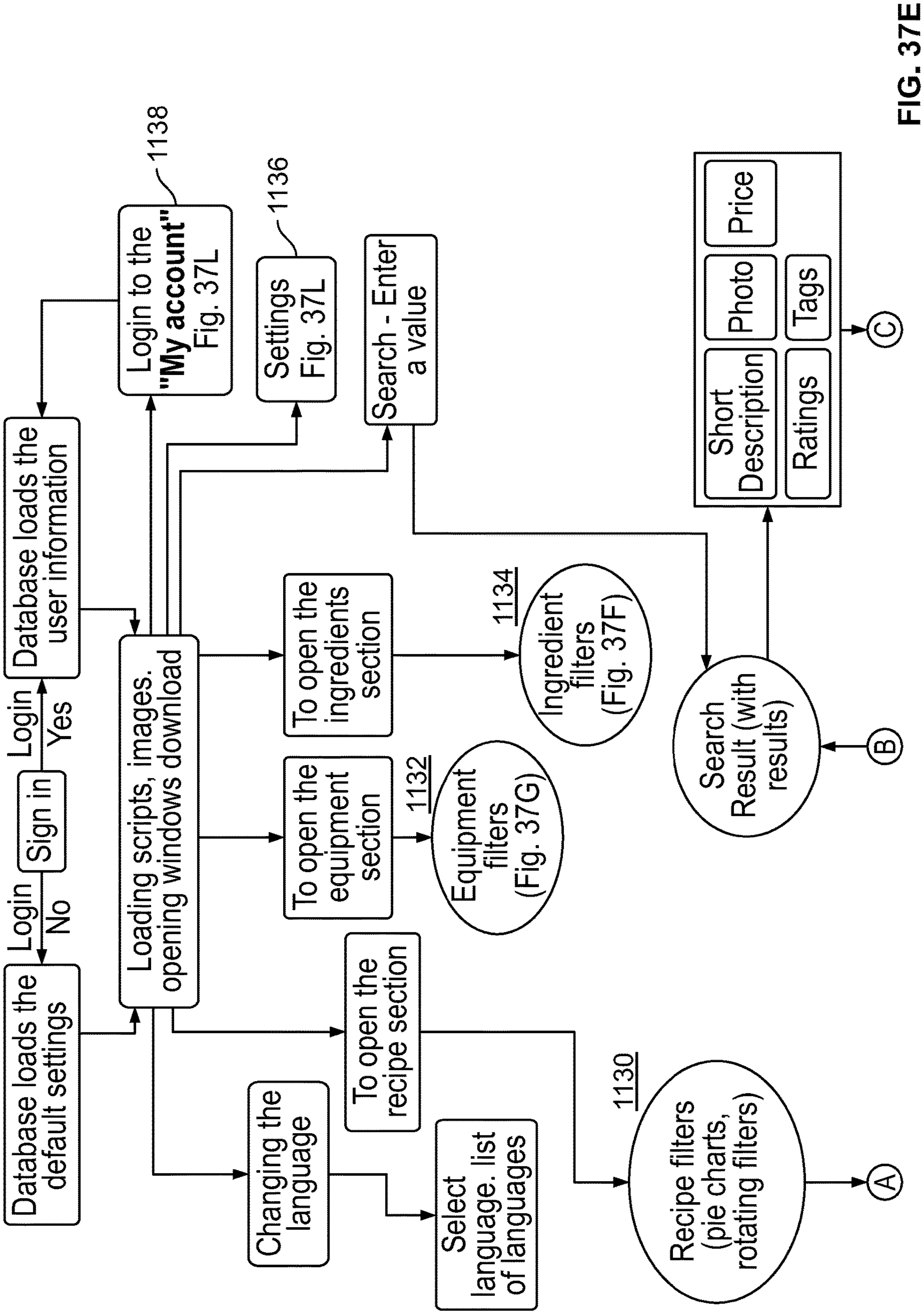
FIGS. 37E-M are flow diagrams illustrating one embodiment of the food preparation user interface with functional capabilities including a recipe filter, an ingredient filter, an equipment filter, an account and social network access, a personal partner page, a shopping cart page, and the information on the purchased recipe, registration setting, create a recipe in accordance with the present invention.
Figure 37E:
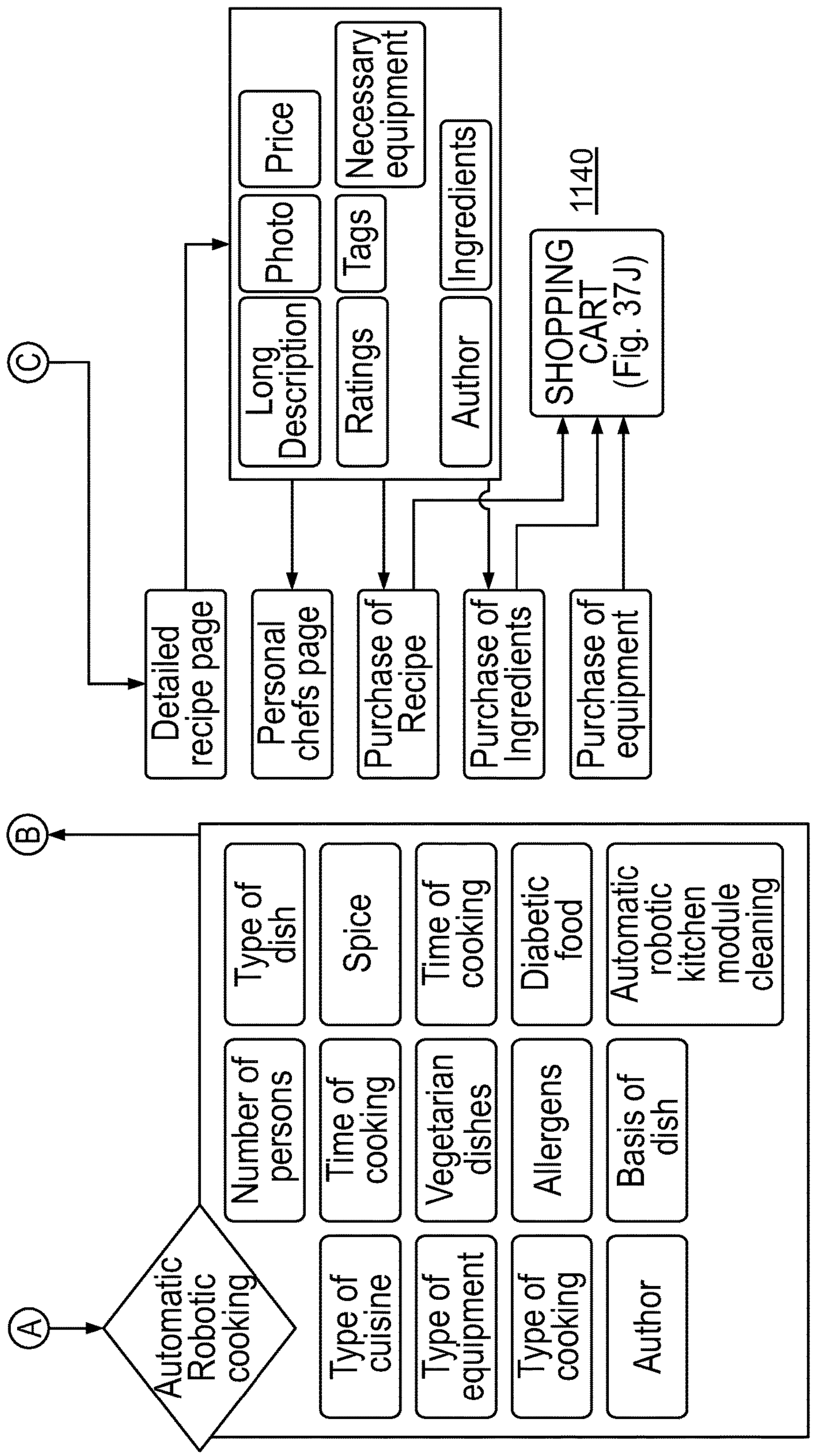

FIGS. 37A-C are block diagrams illustrating recipe search menus for use in the standardized robotic kitchen. As shown in FIG. 37A, a recipe search menu 1120 provides most popular categories such as type of cuisine (e.g. Italian, French, Chinese), the basis of ingredients of the dish (e.g. fish, pork, beef, pasta), or criteria and range such as cooking time range (e.g. less than 60 minutes, between 20 to 40 minutes) as well as conducting a keyword search (e.g. ricotta cavatelli, migliaccio cake). A selected personalized recipe may excluding a recipe with allergic ingredients in which a user can indicate allergic ingredients that the user may refrain from in a personal user profile. In FIG. 37B, the user may select a search criteria, including the requirements of a cooking time less than 44 minutes, serving sufficient portions for 7 people, providing vegetarian dish options, with a total calories of 4521 or less. The different types of dishes 1122 are shown in FIG. 37C where menu 1120 has hierarchical levels such that the user may select a category (e.g. type of dish) 1122, which then expands to the next level sub-categories (e.g. appetizers, salads, entrees . . . ) to refine the selections. A screen shot of an implemented recipe creation and submission is illustrated in FIG. 37D. Additional screen shots of various graphical user interface and menu options are illustrated in FIG. 37N-V.

Figure 37F:
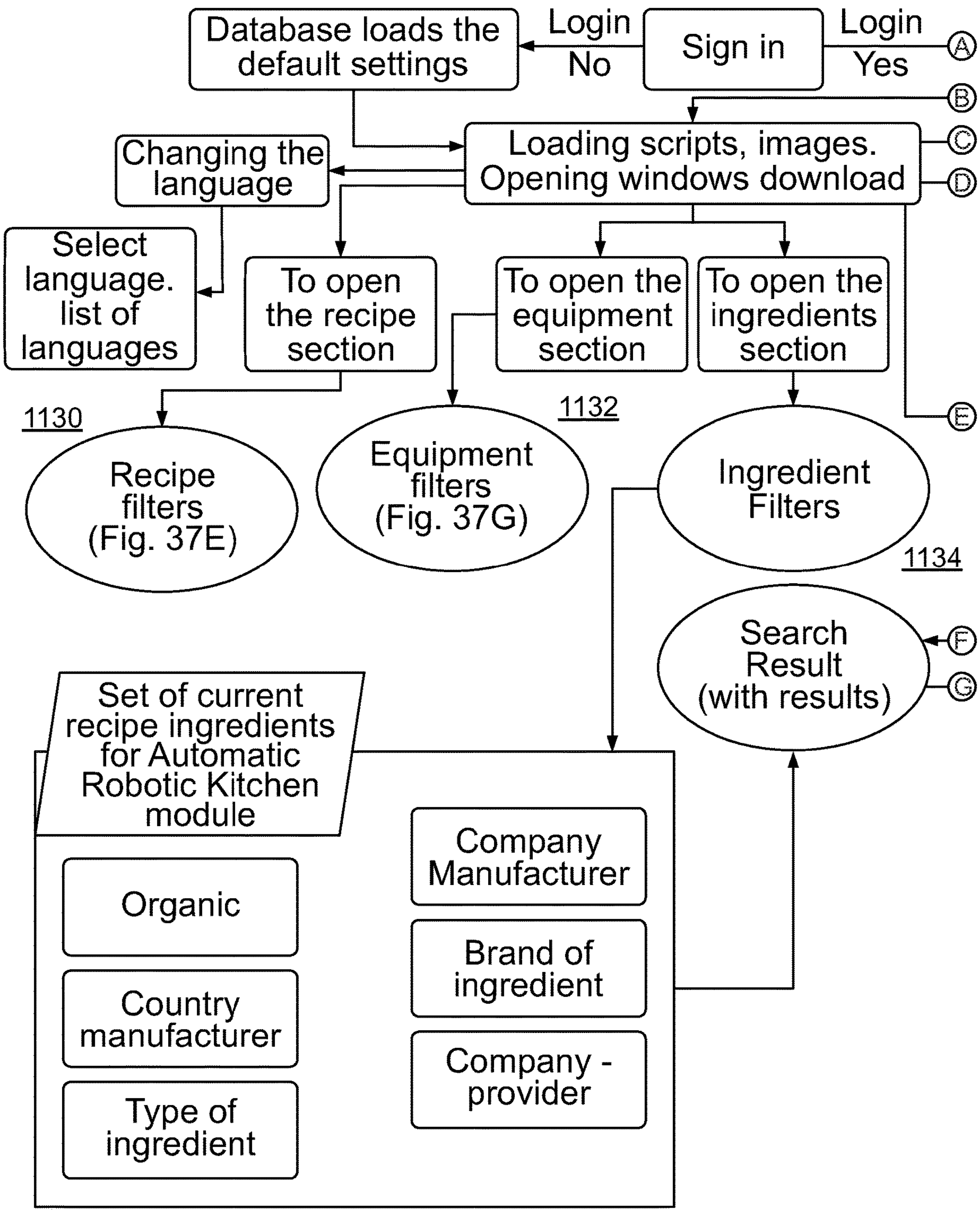
Figure 37F:
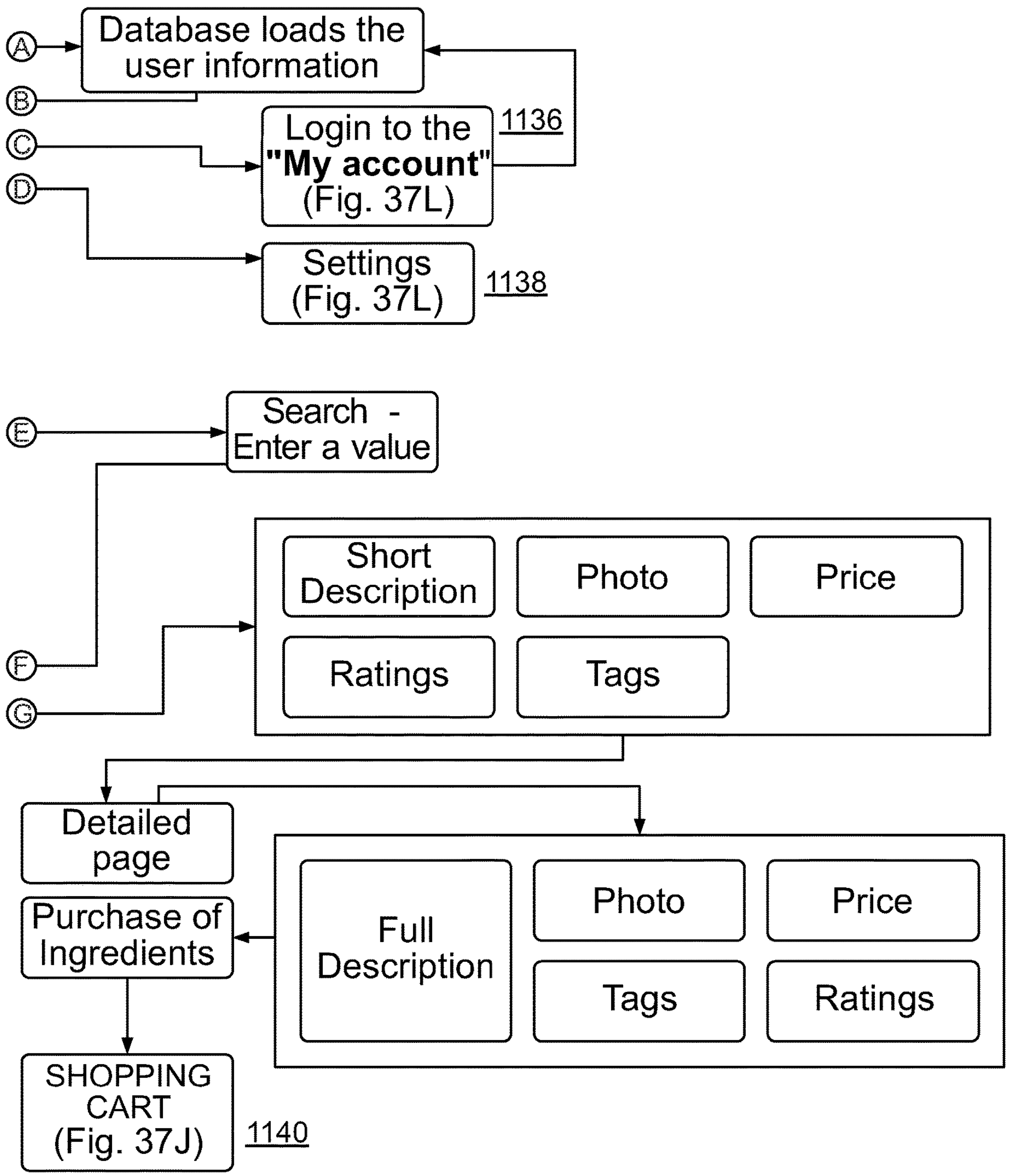
Figure 37G:
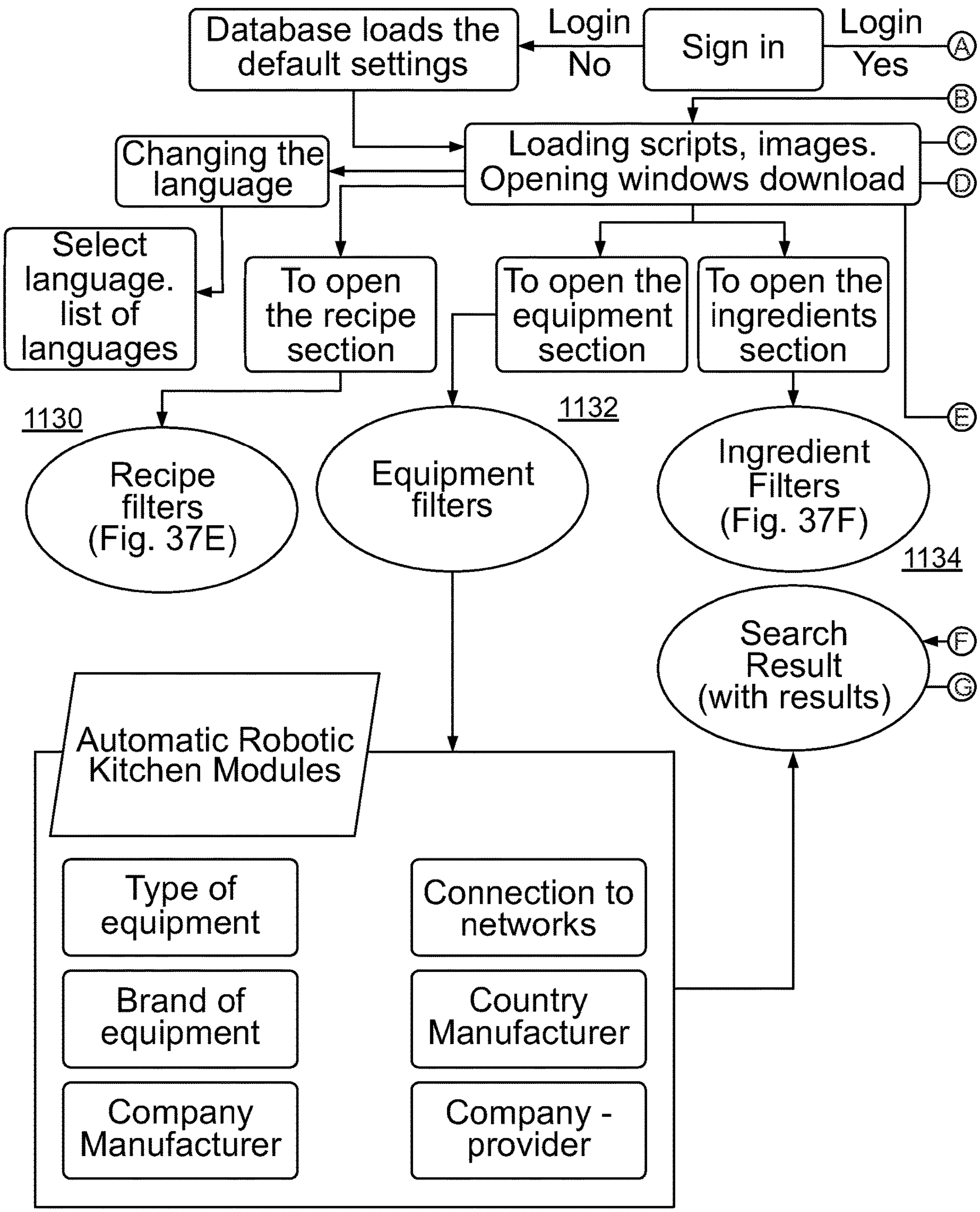
Figure 37G:
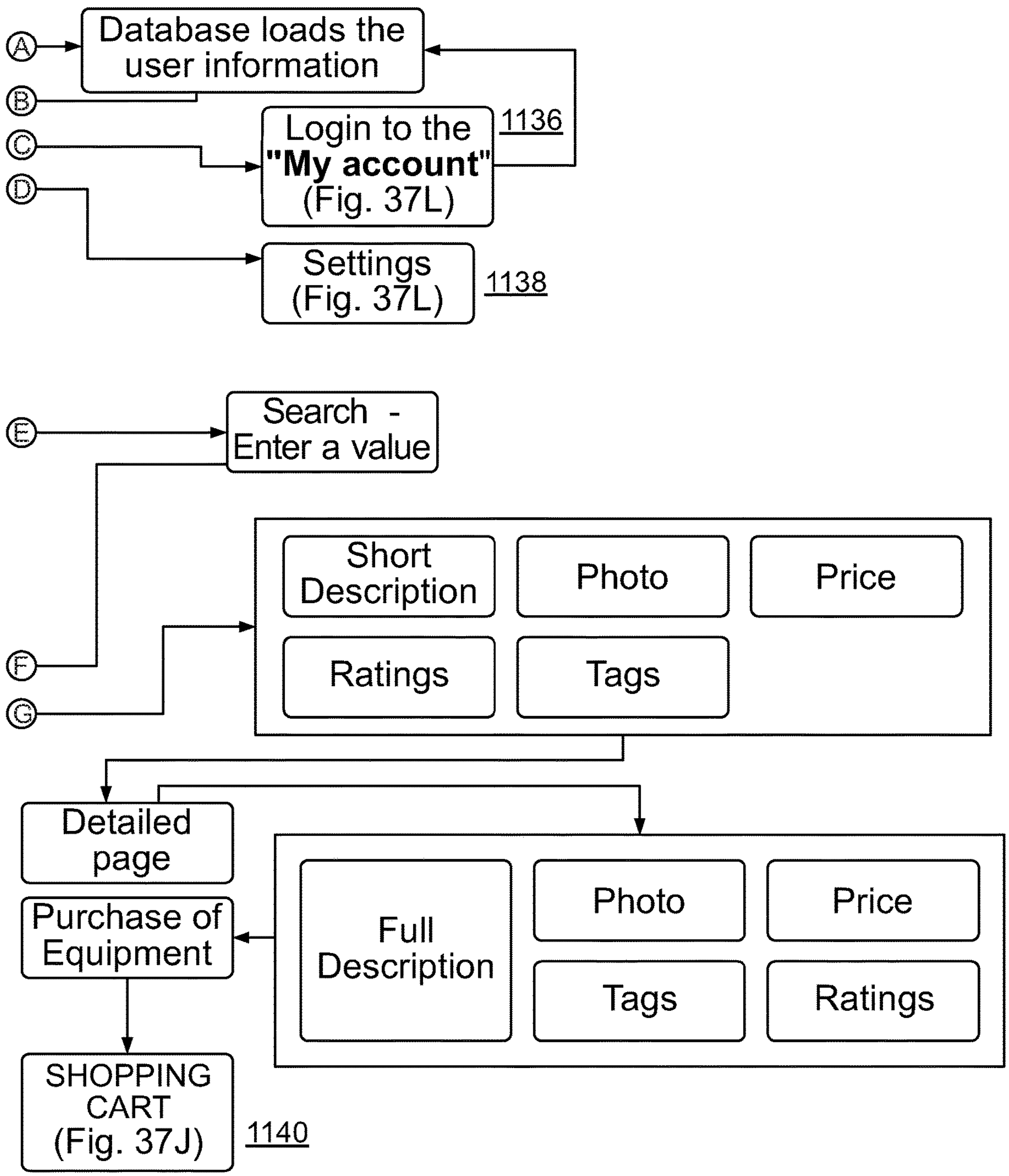

One embodiment of the flow charts in functioning as a recipe filter, an ingredient filter, an equipment filter, an account and social network access, a personal partner page, a shopping cart page, and the information on the purchased recipe, registration setting, create a recipe are illustrated in FIG. 37E through 37M, which illustrate the various functions that the robotic food preparation software 14 is capable of performing based on the filtering of databases and presenting the information to the user. As demonstrated in FIG. 37E, a platform user can access the recipe section and choose the desired recipe filters 1130 for automatic robotic cooking. The most common filter types include types of cuisine (e.g. Chinese, French, Italian), type of cooking (e.g. bake, steam, fry), vegetarian dishes, and diabetic food. The user will be able to view the recipe details, such as description, photo, ingredients, price, and ratings, from the filtered search result. In FIG. 37F, the user can choose the desired ingredient filters 1132, such as organic, type of ingredient, or brand of ingredient, for his purpose. In FIG. 37G, the user can apply the equipment filters 1134 for the automatic robotic kitchen modules, such as the type, the brand, and the manufacturer of equipment. After making the selections, the user will be able to purchase recipes, ingredients, or equipment product directly through the system portal from the associated vendors. The platform allows the users to create additional filters and parameters for his own purpose, which makes the entire system customizable and constantly renewing. The user-added filters and parameters will appear as system filters after approval by moderator.

Figure 37H:
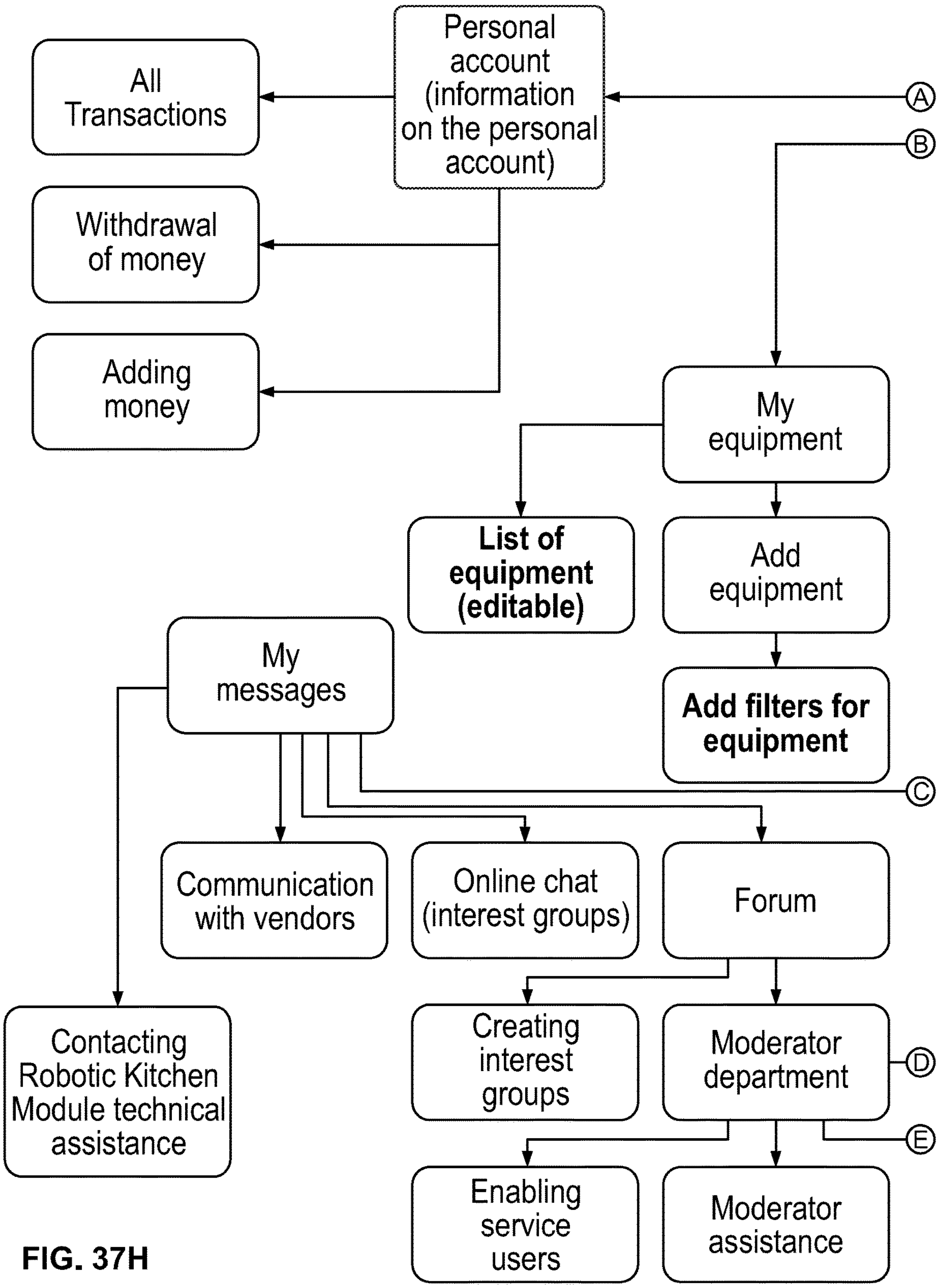
Figure 37H:
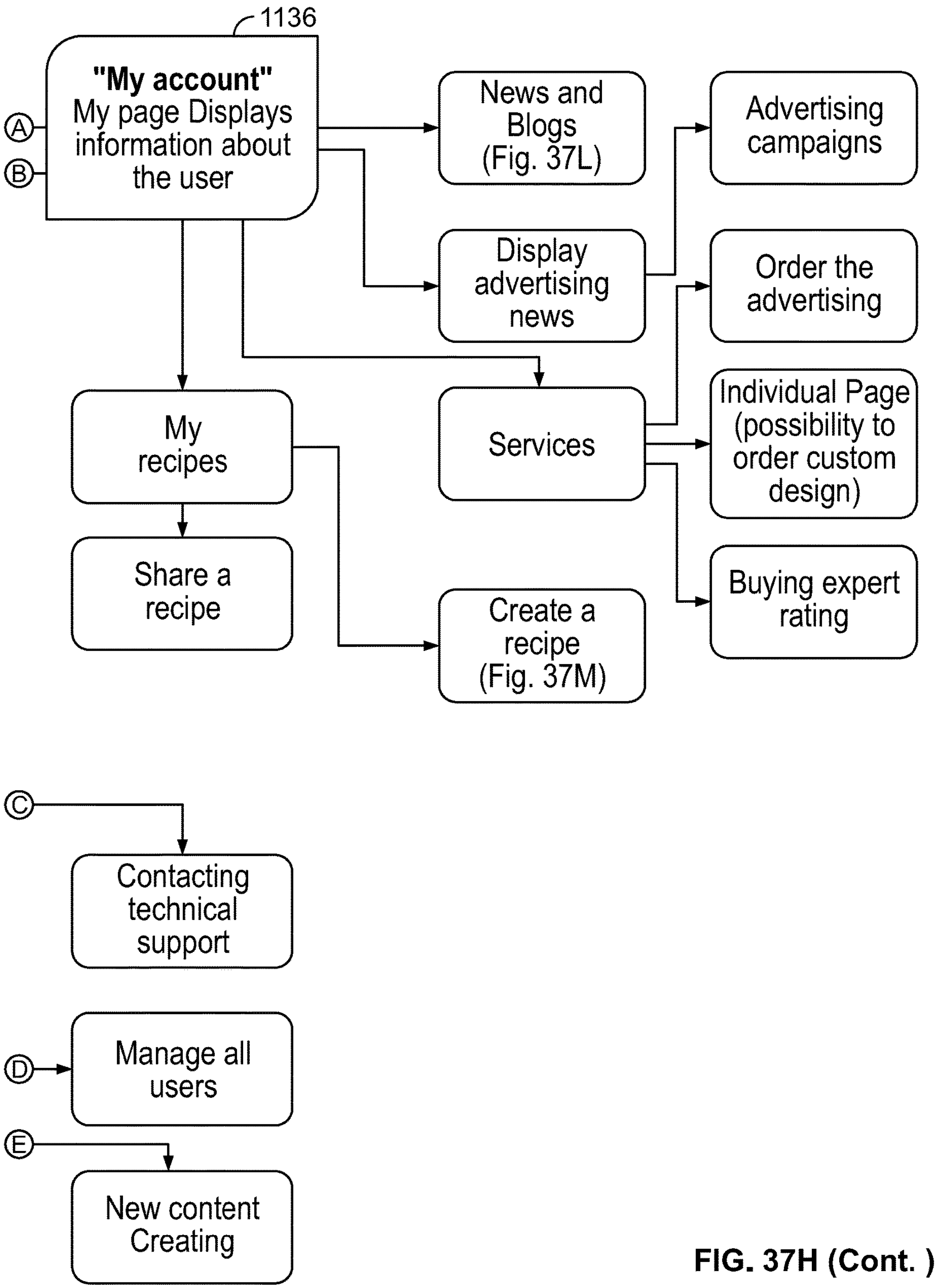
Figure 37I:
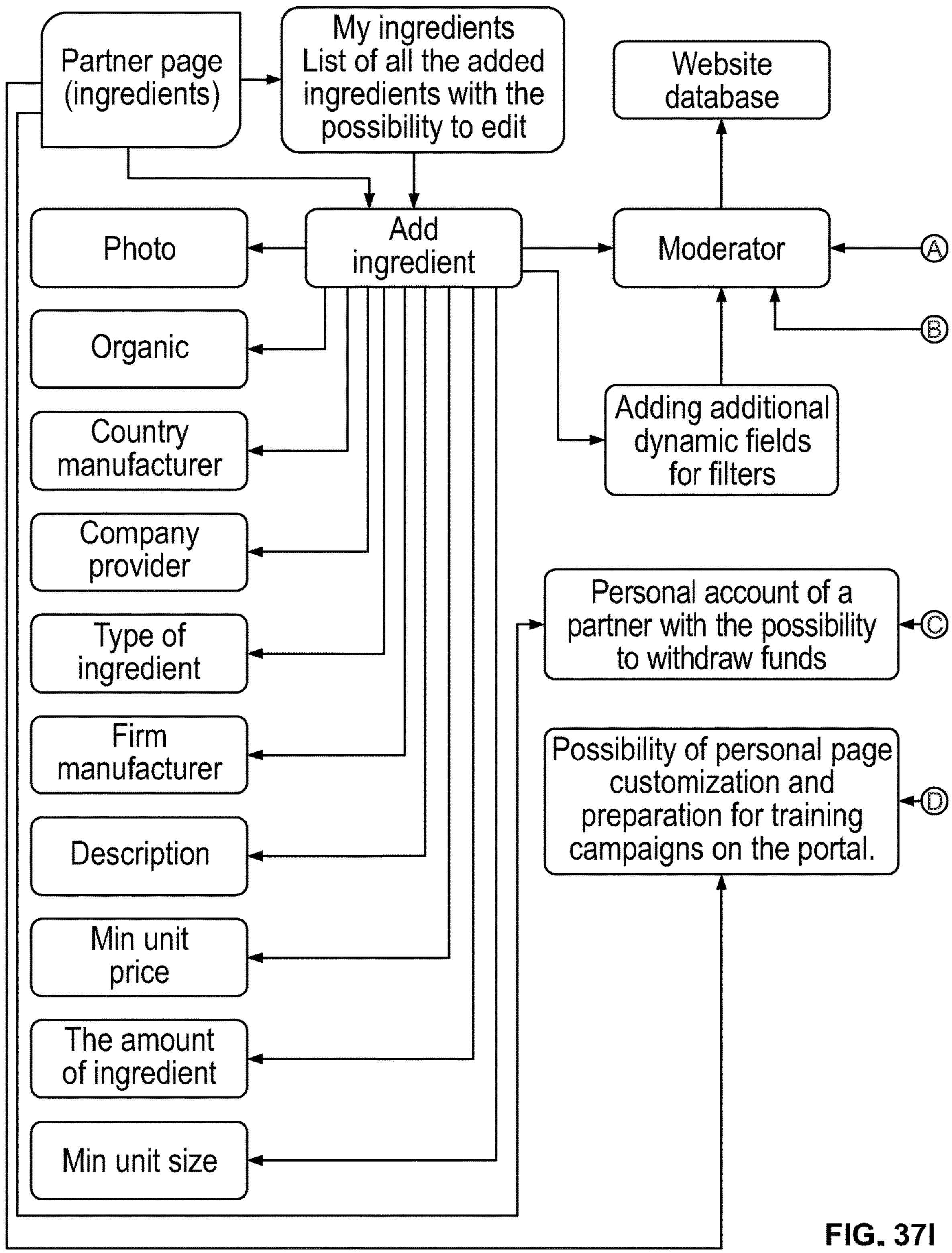
Figure 37I:
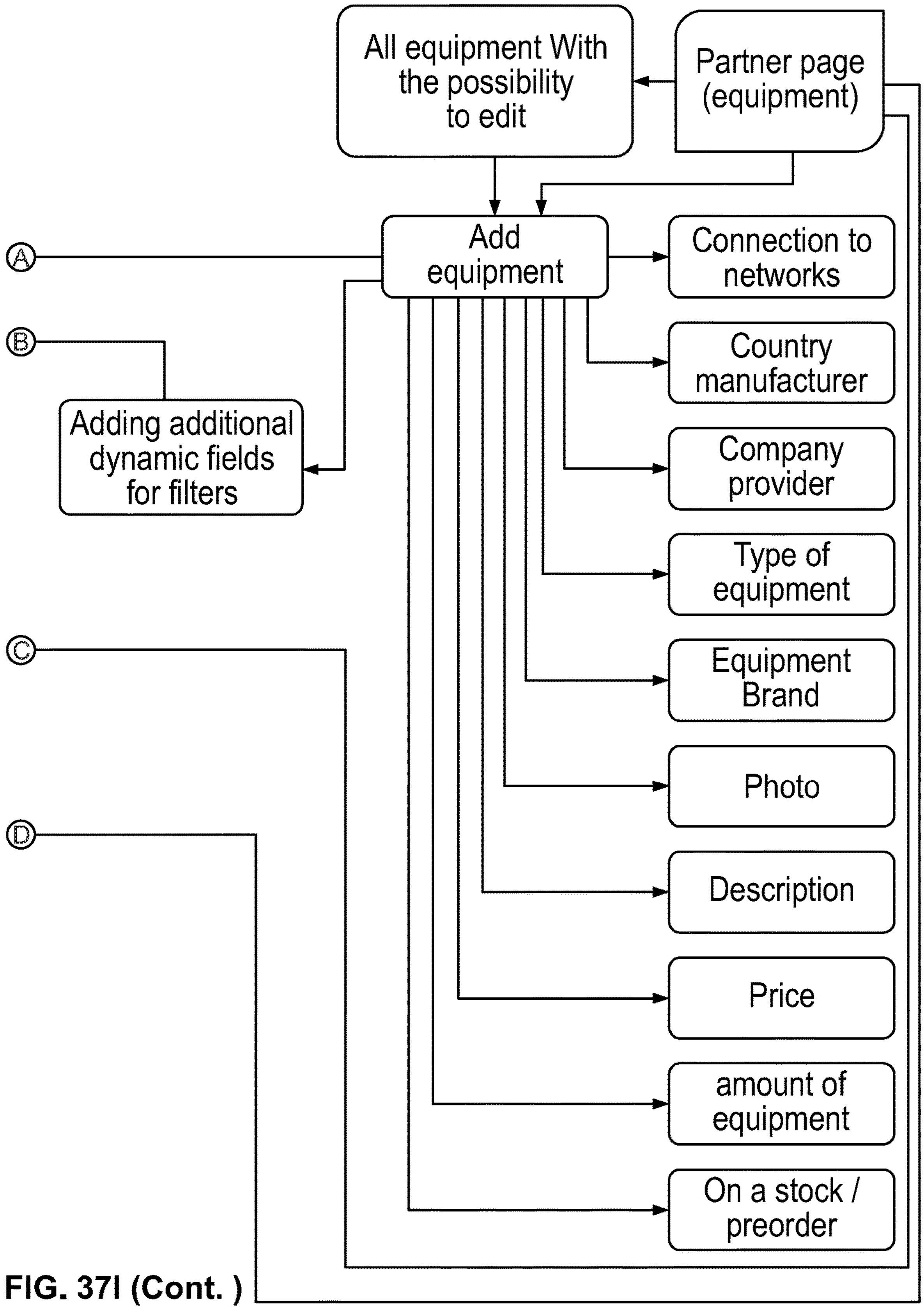

In FIG. 37H, a user is able to connect to other users and vendors through the platform's social professional network by logging into the user account 1136. The identity of the network user is verified, possibly through the credit card and the address details. The account portal also serves as a trading platform for users to share or sell their recipes, as well as advertising to other users. The user can manage his account finance and equipment through the account portal as well.

Figure 37J:
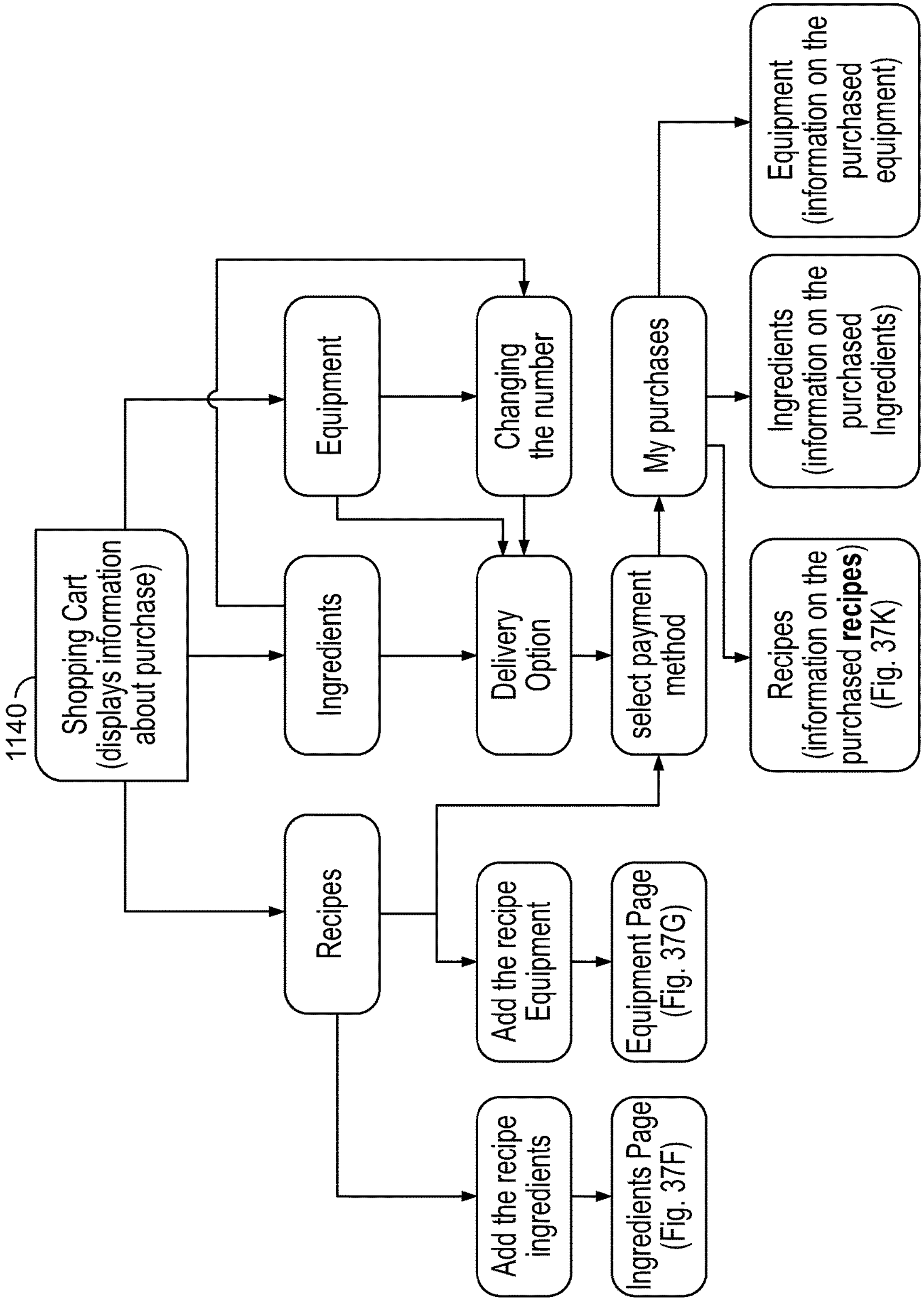

An example of partnership between users of the platform is demonstrated in FIG. 371. One user can provide all the information and details for his ingredients and another user does the same for his equipment. All information must be filtered through a moderator before adding to the platform/website database. In FIG. 37J, a user can see the information for his purchases in the shopping cart 1140. Other options, such as delivery and payment method, can also be changed. The user can also purchase more ingredients or equipment, based on the recipes in his shopping cart.

Figure 37K:
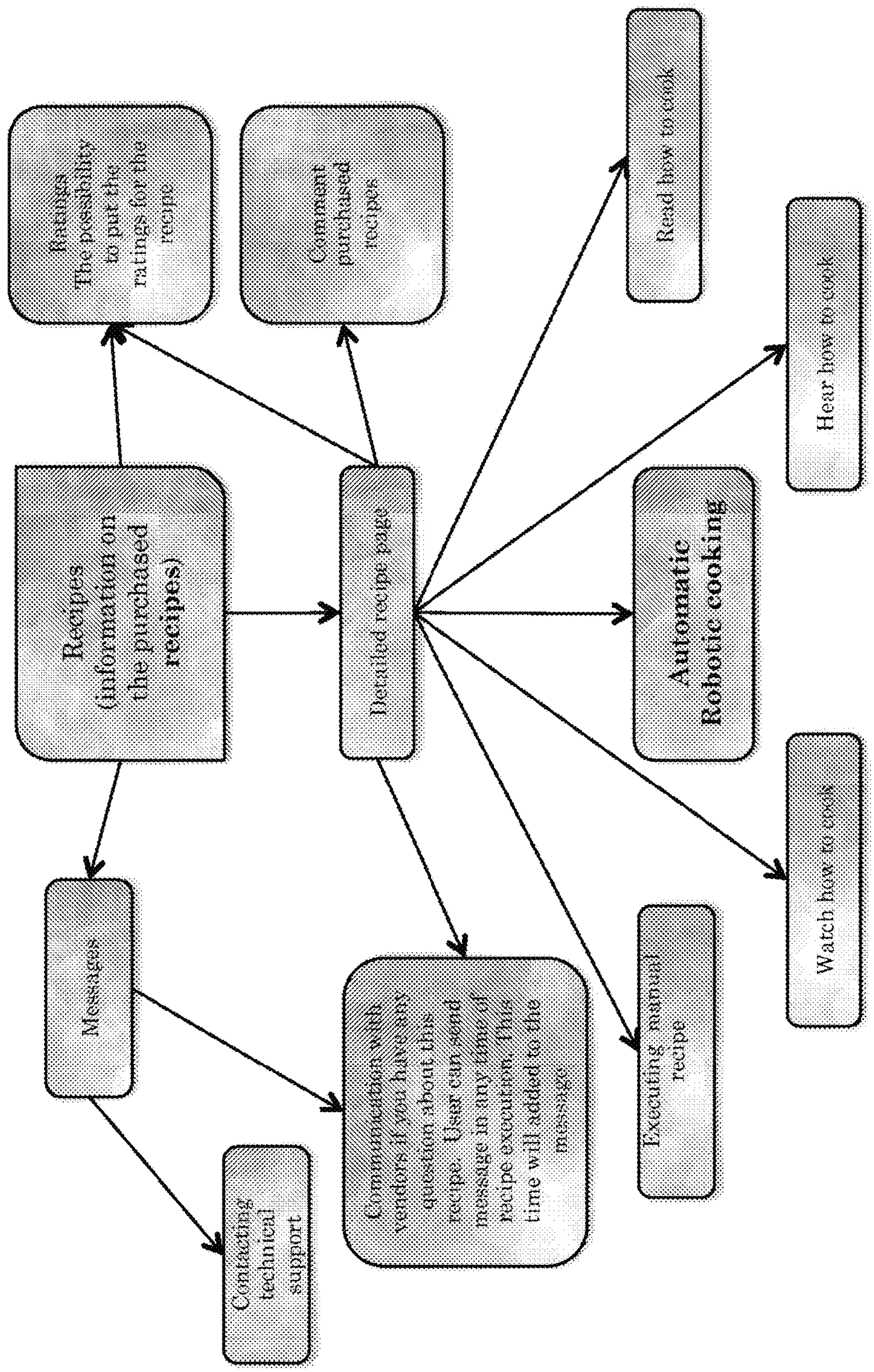

FIG. 37K shows the other information on the purchased recipes can be accessed from the recipes page 1560. The user can read, hear, and watch how to cook, as well as execute automatic robotic cooking. Communication with the vendors or technical support regarding the recipe is also possible from the recipes page.

Figure 37L:
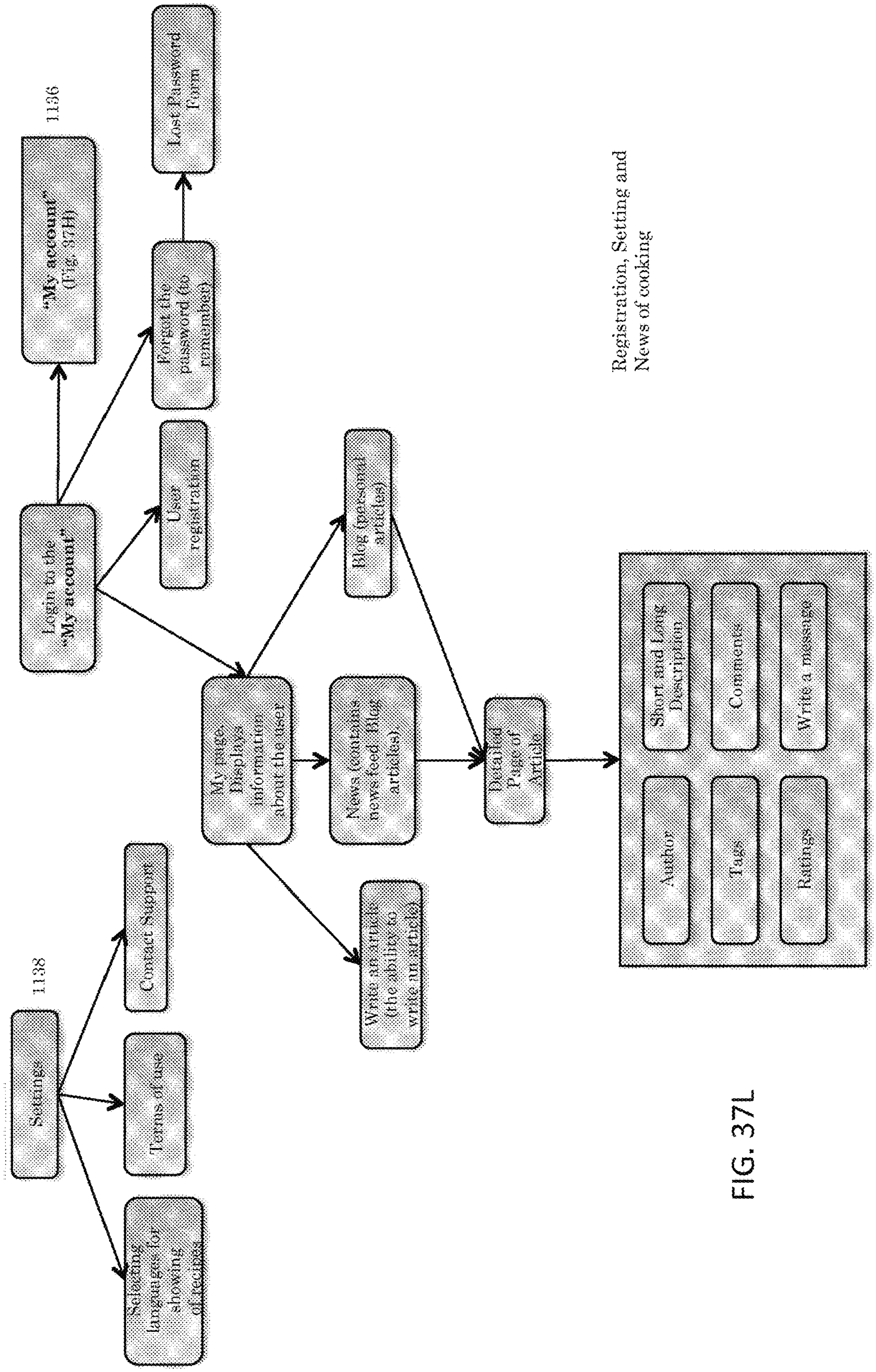
Figure 37M:
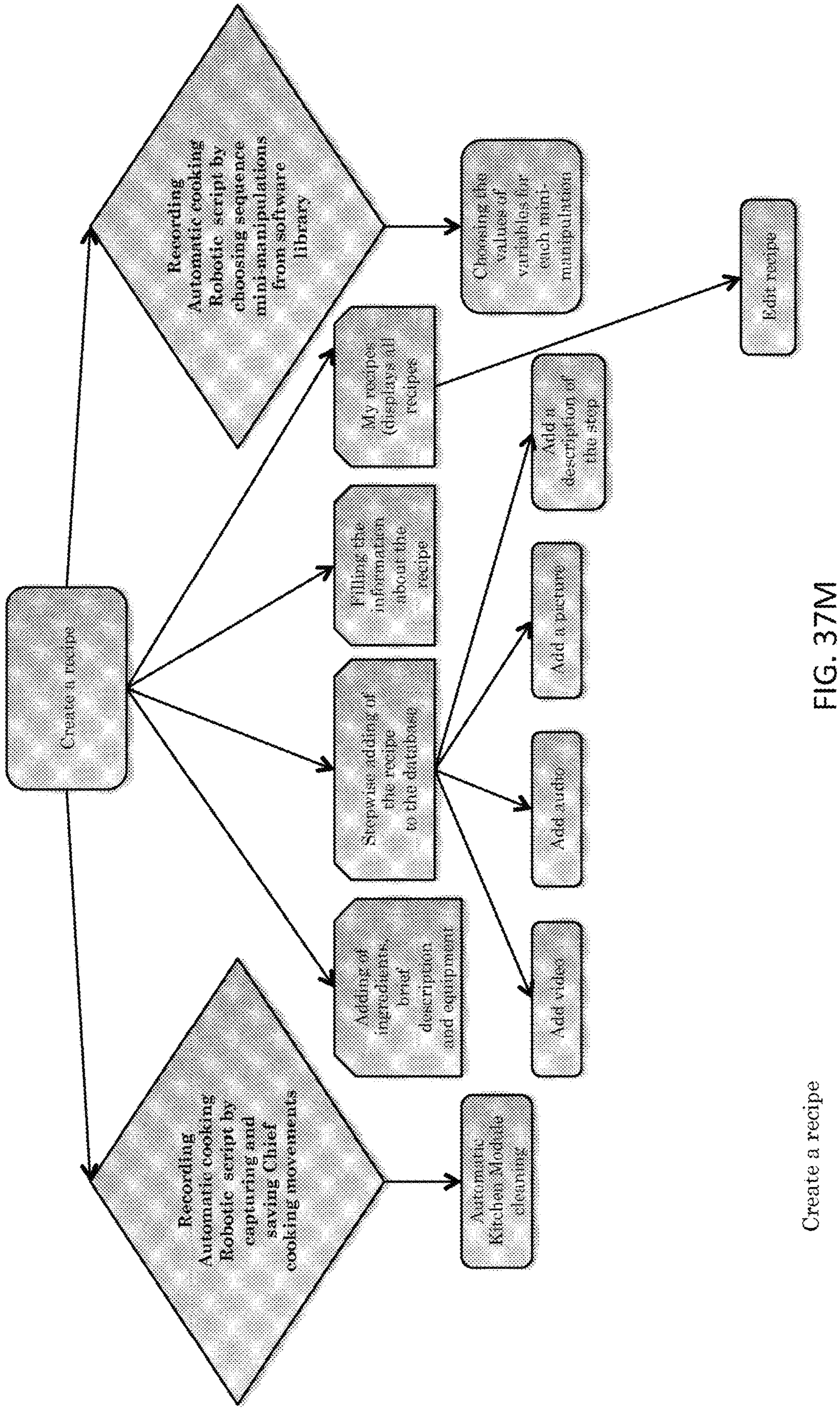
Figure 37N:
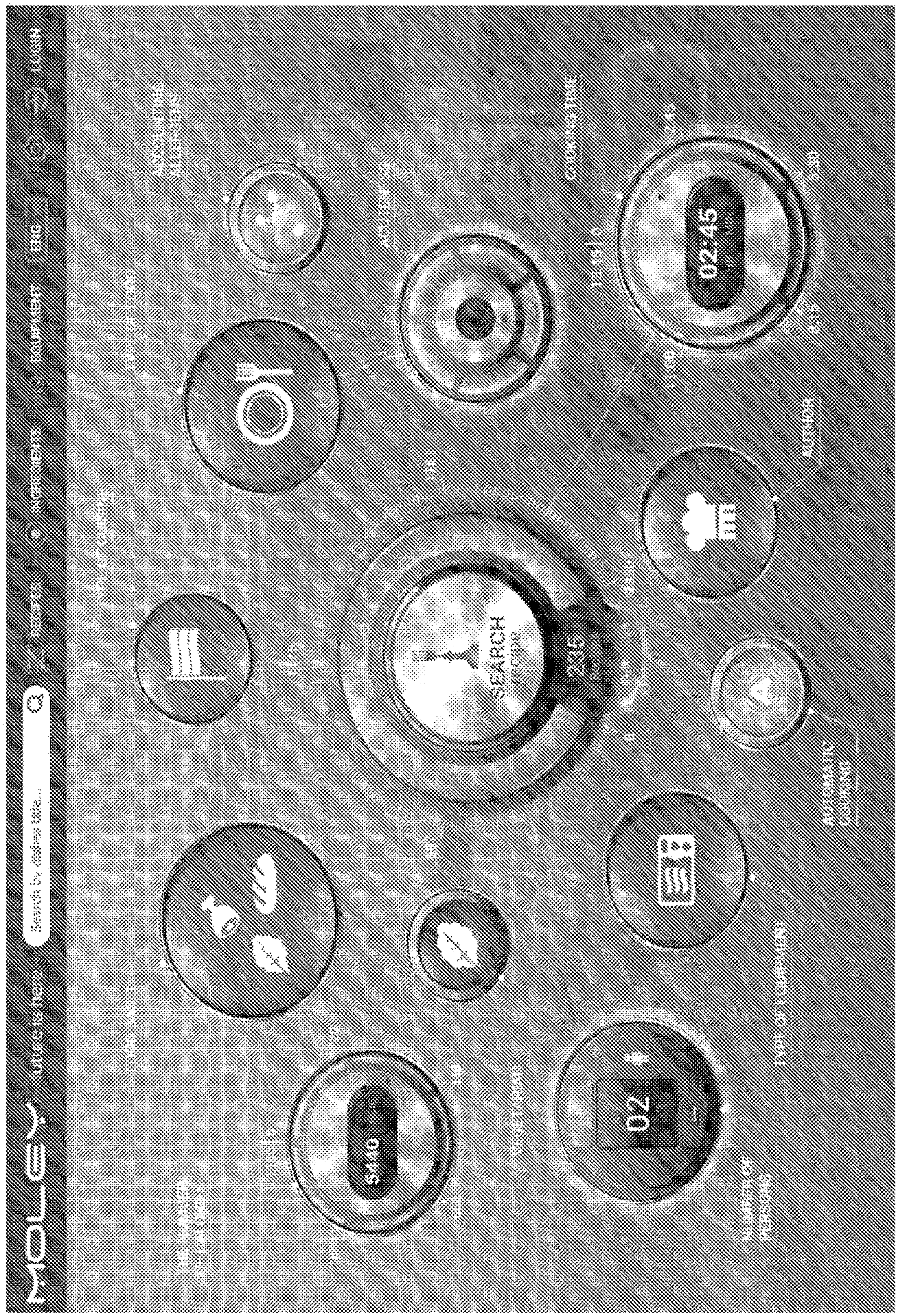
FIG. 37N-V are screen shots of various graphical user interface and menu options in accordance with the present invention.
Figure 37O:
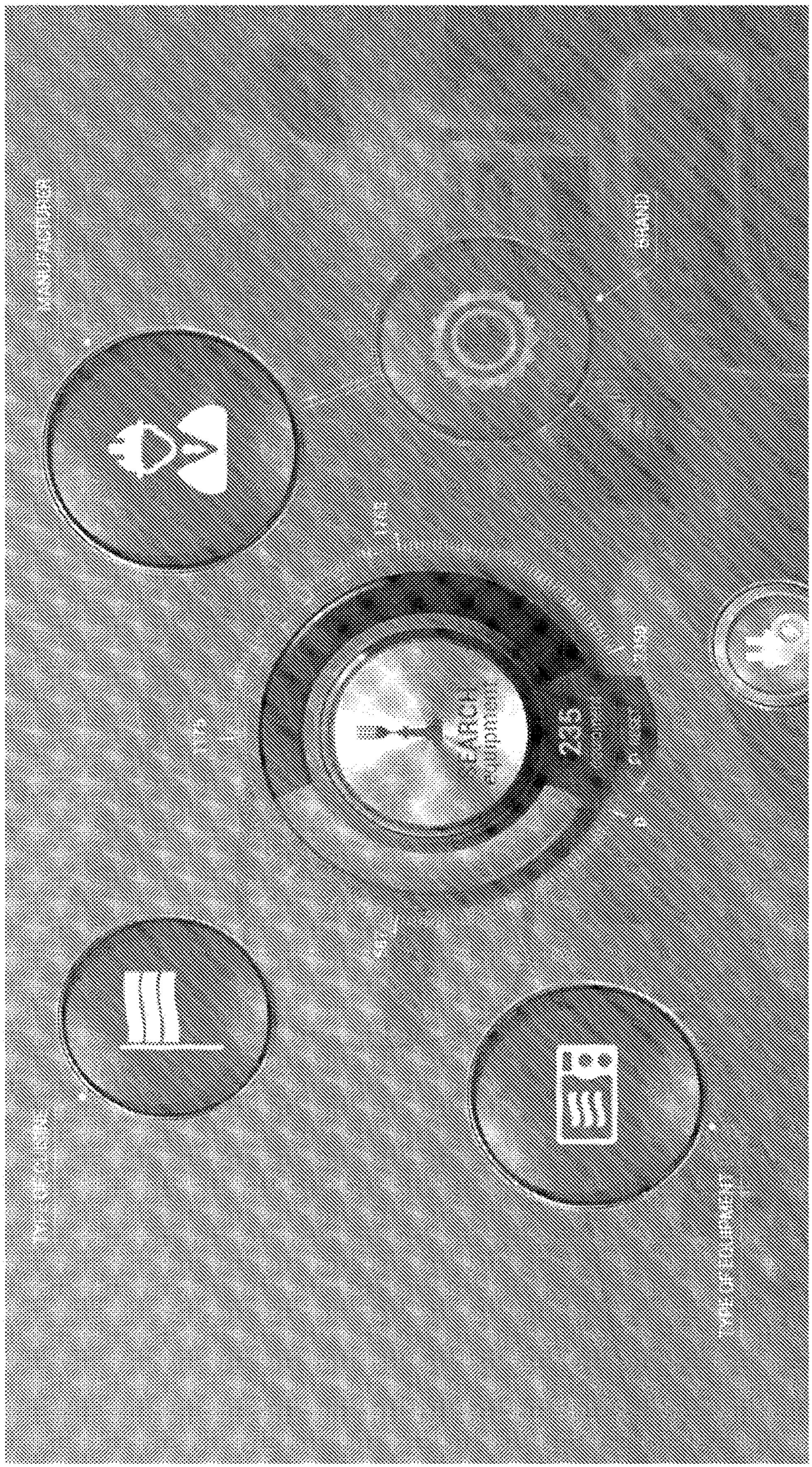
Figure 37P:
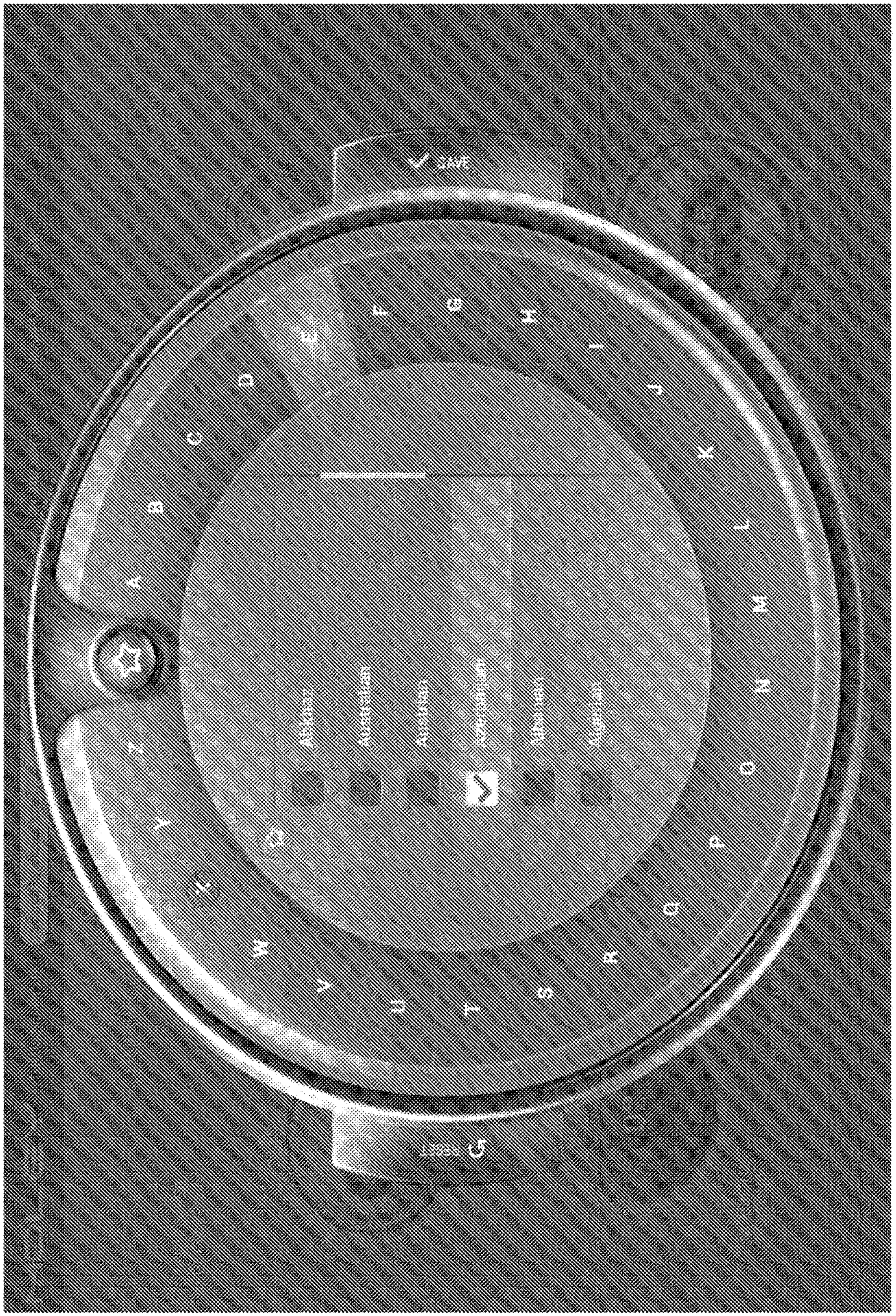
Figure 37Q:
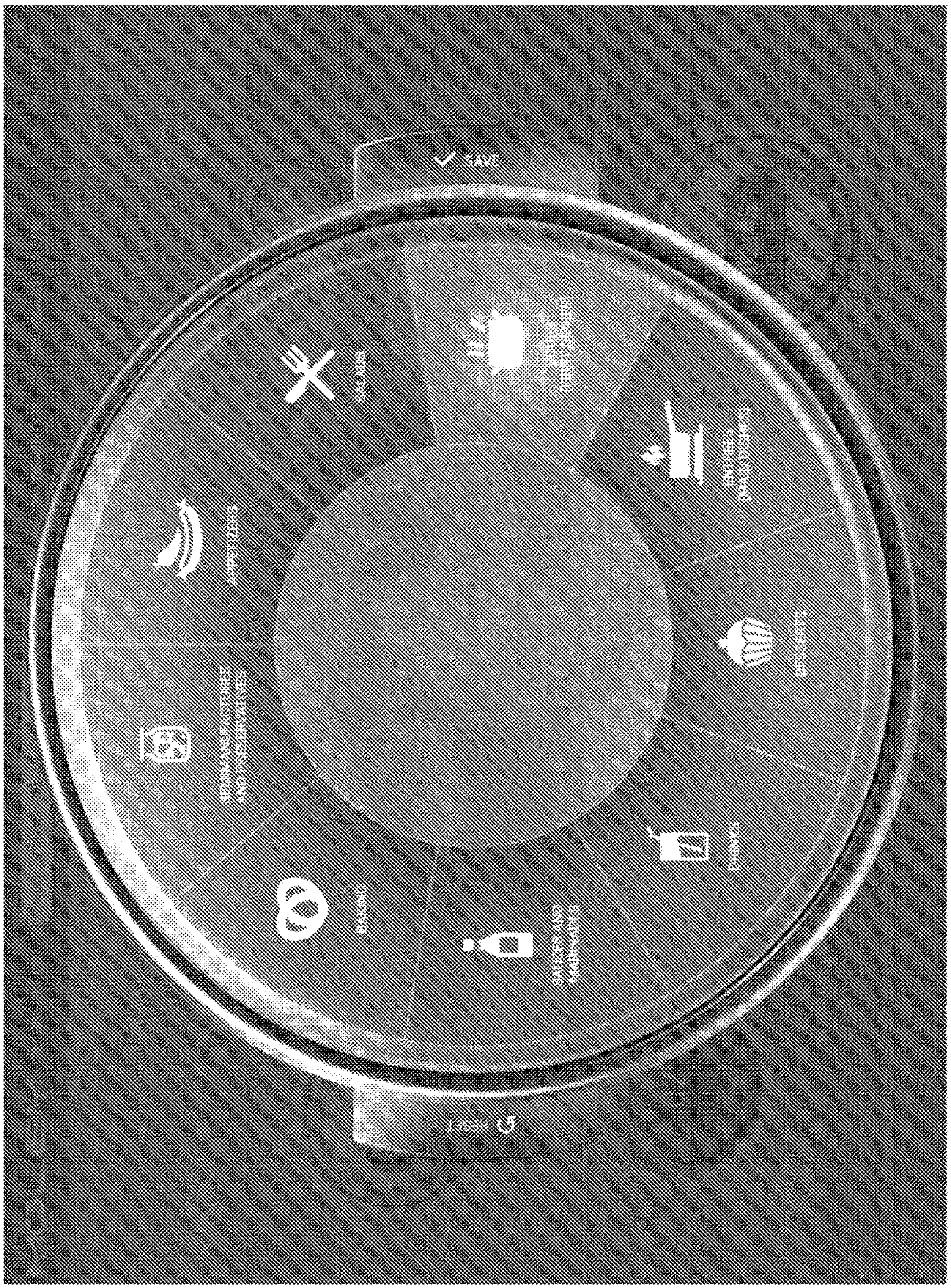
Figure 37R:
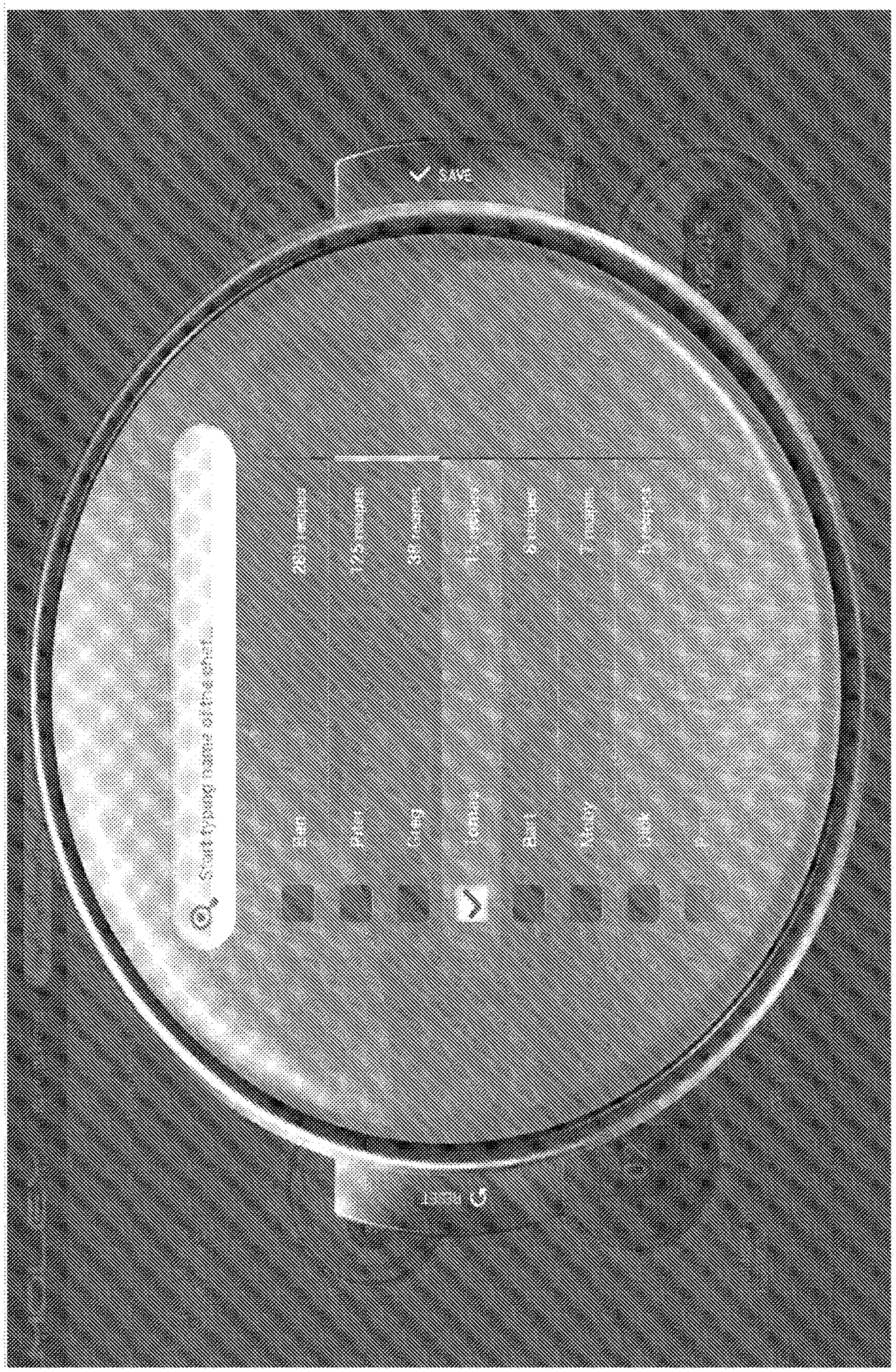
Figure 37S:
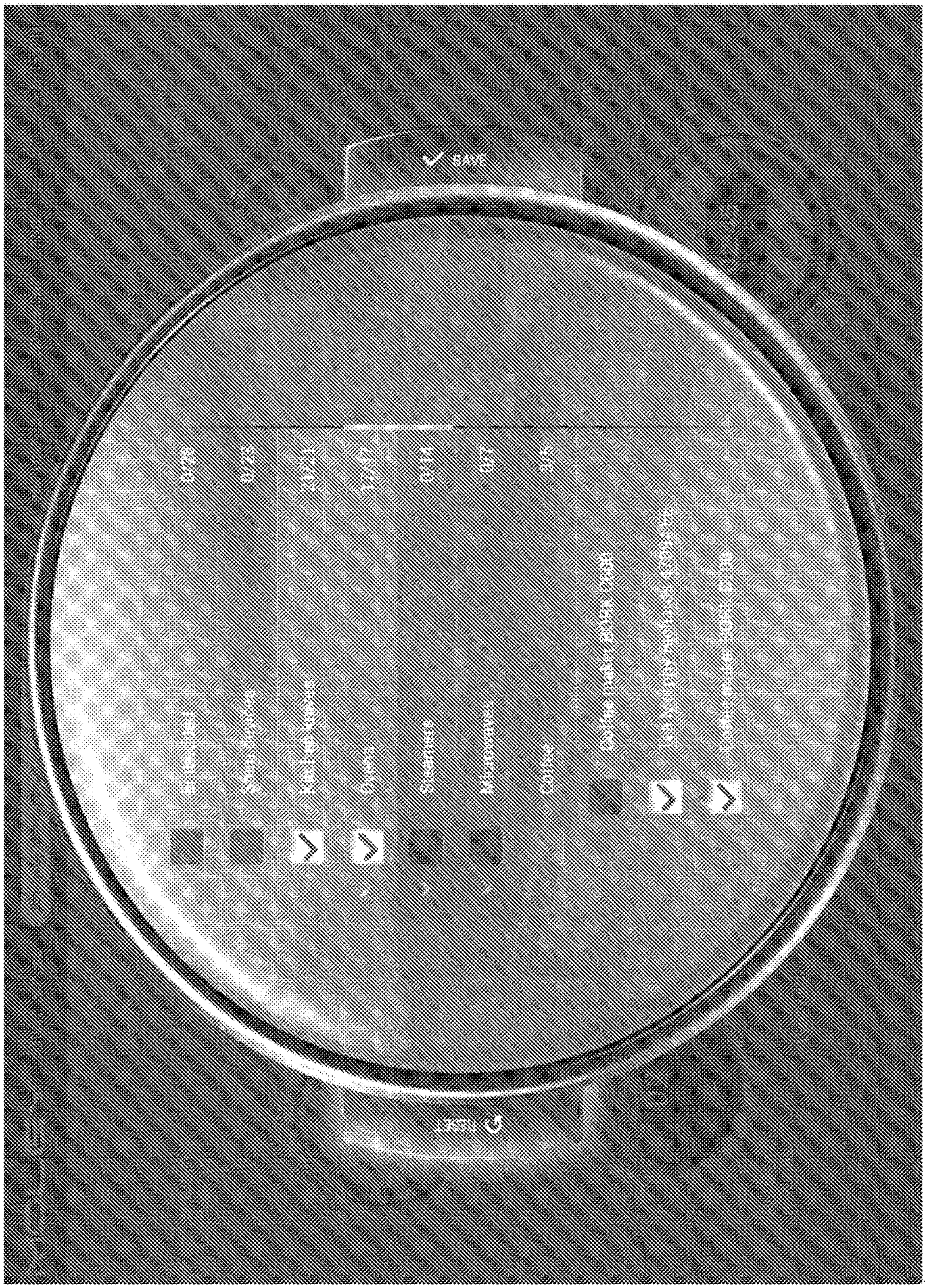
Figure 37T:
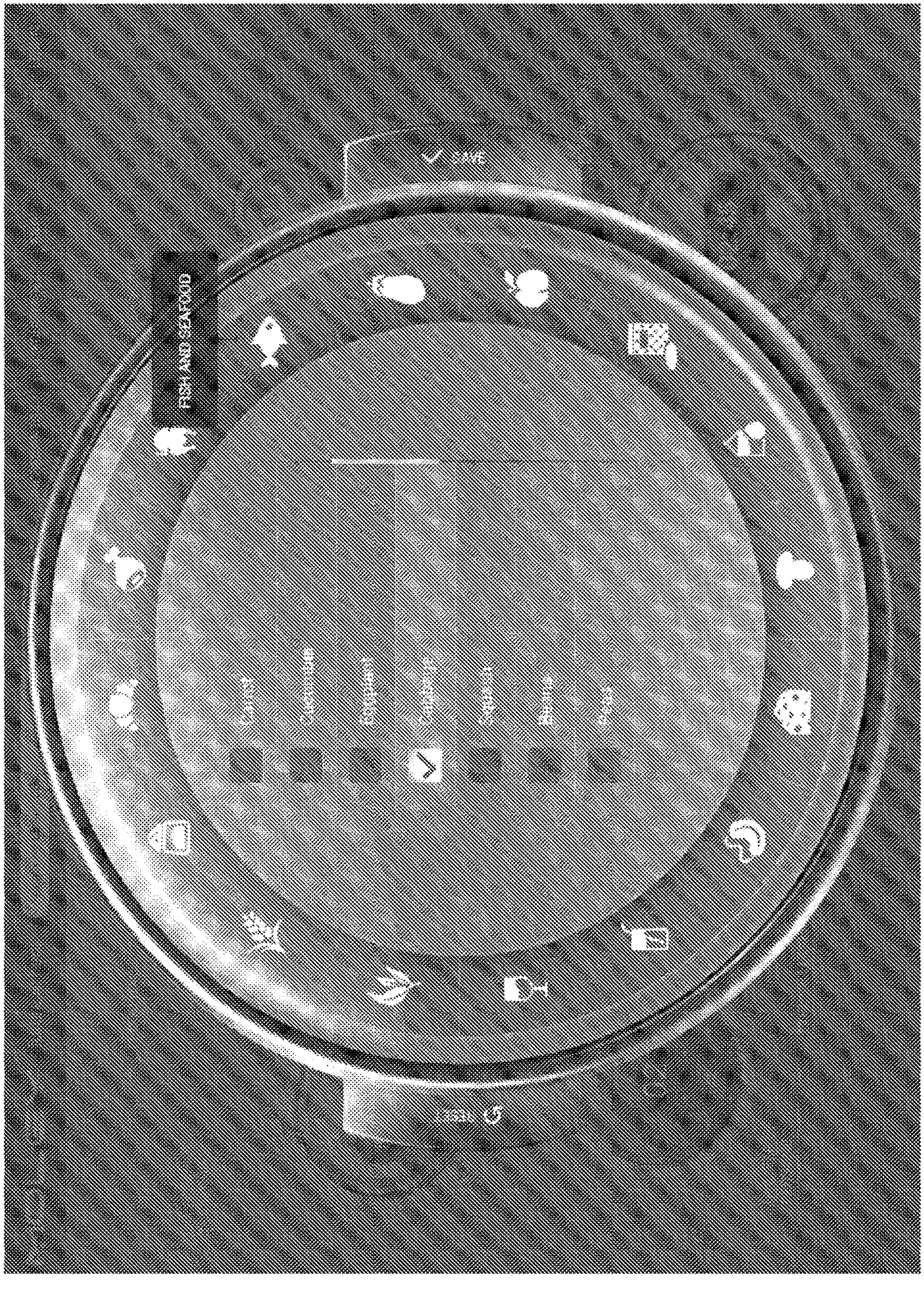
Figure 37U:
Figure 37V:
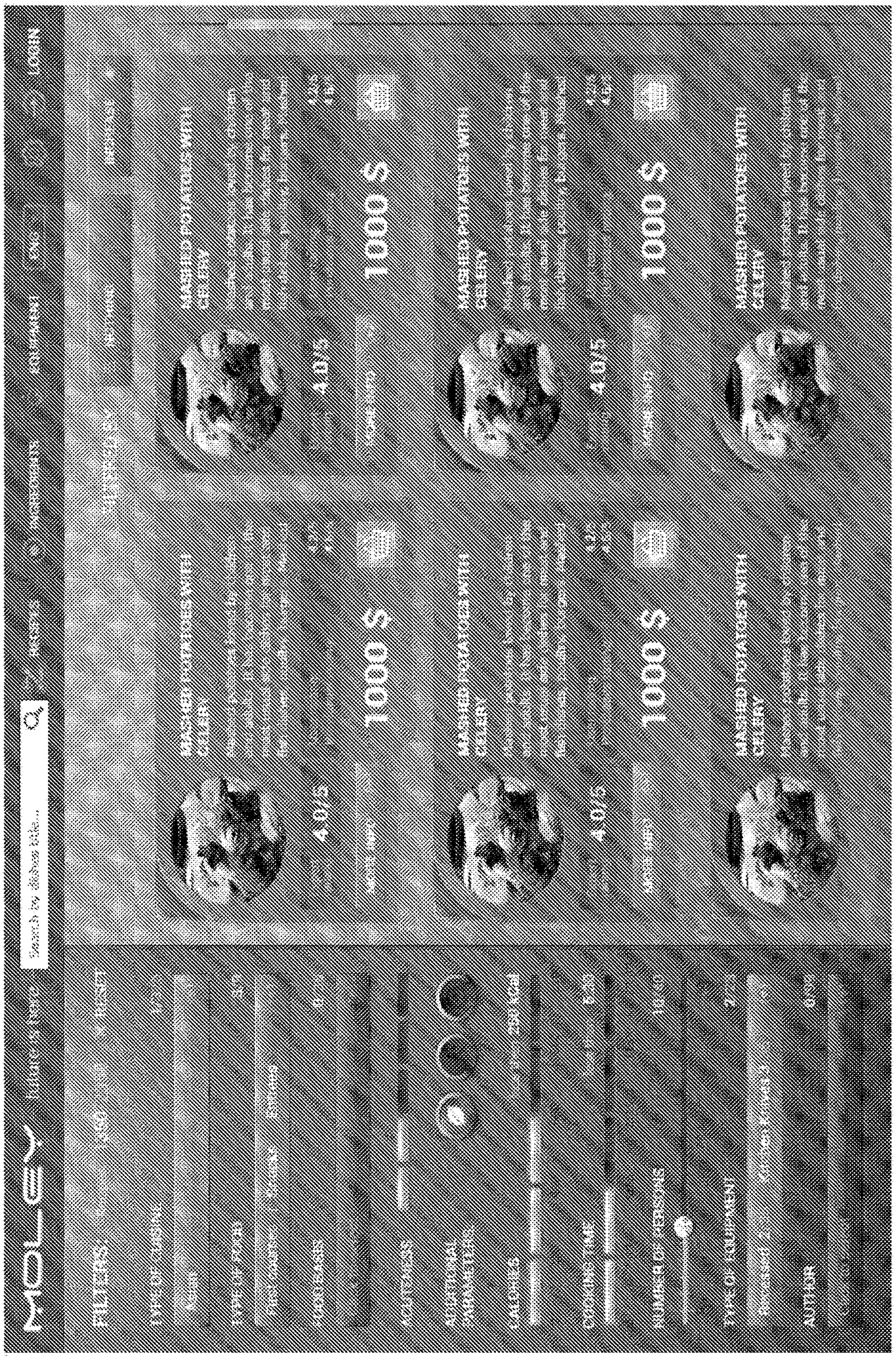

FIG. 37L is a block diagram that illustrate the different layers of the platform from the "My account" page 1136 and Settings page 1138. From the "My account" page, the user will be able to read professional cooking news or blogs, and can write an article to publish. Through the recipe page under "My account", there are multiple ways a user can create his own recipe 1570, as shown in FIG. 37M. The user can create a recipe by creating an automatic robotic cooking script either by capturing chief cooking movements or by choosing manipulation sequences from software library. The user can also create recipe by simply listing the ingredient/equipment, then add audio, video, or picture. The user can edit all recipes from the recipe page.

FIG. 38 is a block diagram illustrating a recipe search menu 1150 by selecting fields for use in the standardized robotic kitchen. By selecting a category with a search criteria or range, the user 60 receives a return page that lists the various recipes results. The user 60 is able to sort the results by criteria such as a user rating (e.g. from high to low), an expert rating (e.g. from high to low), or the duration of the food preparation (e.g. from shorter to longer). The computer display may contain a photo/media, title, description, ratings and price information of the recipe, with an optional tab of the "read more" button that brings up a complete recipe page for browsing further information about the recipe.

Figure 39:
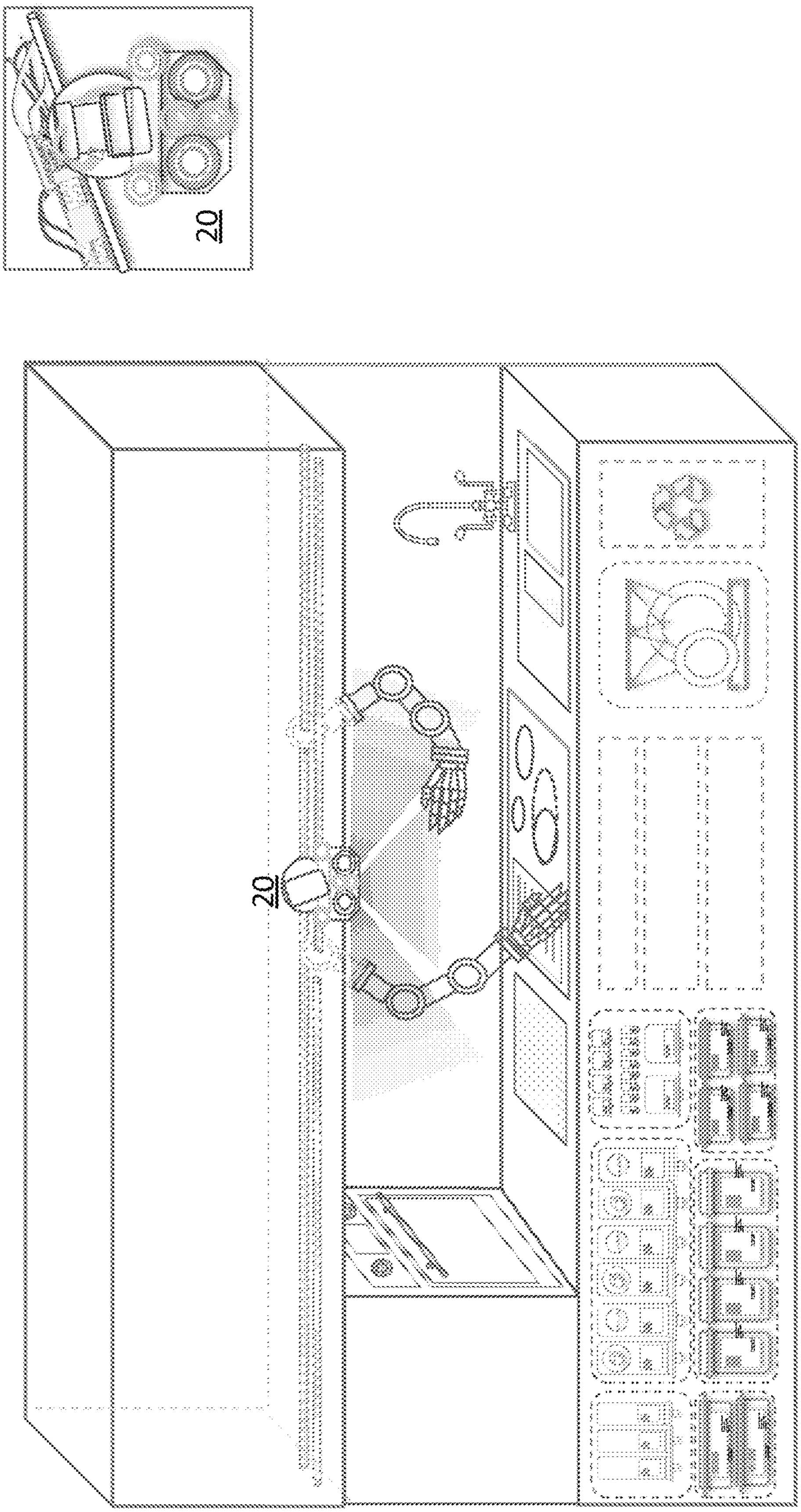
FIG. 39 is a block diagram illustrating the standardized robotic kitchen with an augmented sensor for three-dimensional tracking and reference data generation in accordance with the present invention.

The standardized robotic kitchen 50 in FIG. 39 depicts a possible configuration for the use of an augmented sensor system 1854. The augmented sensor system 1854 shows a single augmented sensor system 1854 placed on a movable computer-controllable linear rail travelling the length of the kitchen axis with the intent to effectively cover the complete visible three-dimensional workspace of the standardized kitchen.

Based on the proper placement of the augmented sensor system 1854 placed somewhere in the robotic kitchen, such as on a computer-controllable railing, or on the torso of a robot with arms and hands, allows for 3D-tracking and raw data generation, both during chef-monitoring for machine-specific recipe-script generation, and monitoring the progress and successful completion of the robotically-executed steps in the stages of the dish replication in the standardized robotic kitchen 50.

The standardized robotic kitchen 50 in FIG. 39 depicts a possible configuration for the use of an augmented sensor system 20. The standardized robotic kitchen 50 shows a single augmented sensor system 20 placed on a movable computer-controllable linear rail travelling the length of the kitchen axis with the intent to effectively cover the complete visible three-dimensional workspace of the standardized kitchen.

Figure 40:
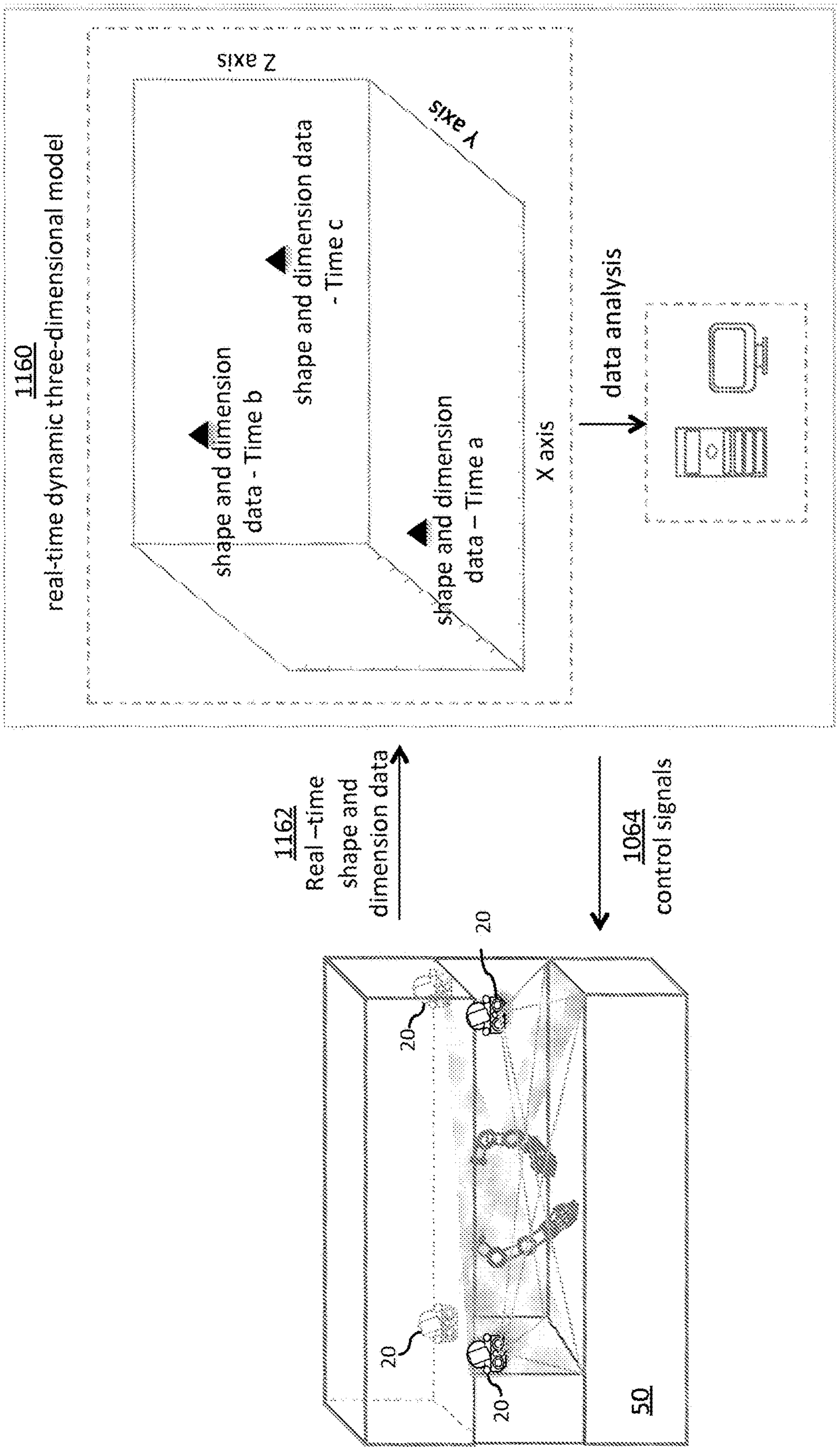
FIG. 40 is a block diagram illustrating the standardized robotic kitchen with multiple sensors for creating real-time three-dimensional modeling in accordance with the present invention.

FIG. 40. is a block diagram illustrating the standardized kitchen module 50 with multiple camera sensors and/or lasers 20 for real-time three-dimensional modeling 1160 of the food preparation environment. The robotic kitchen cooking system 48 includes a three-dimensional electronic sensor that is capable of providing real-time raw data for a computer to create a three-dimensional model of the kitchen operating environment. One possible implementation of the real-time three-dimensional modeling process involves the use of three-dimensional laser scanning. An alternative implementation of the real-time three-dimensional modeling is to use one or more video cameras. Yet a third method involves the use of a projected light-pattern observed by a camera, so-called structured-light imaging. The three-dimensional electronic sensor scans the kitchen operating environment in real-time to provide a visual representation (shape and dimensional data) 1162 of the working space in the kitchen module. For example, the three-dimensional electronic sensor captures in real-time the three-dimensional images of whether the robotic arm/hand has picked up meat or fish. The three-dimensional model of the kitchen also serves as sort of a 'human-eye' for making adjustments to grab an object, as some objects may have nonstandard dimensions. The compute processing system 16 generates a computer model of the three-dimensional geometry and objects in the workspace and provides controls signals 1164 back to the standardized robotic kitchen 50. For instance, three-dimensional modeling of the kitchen can provide a three-dimensional resolution grid with a desirable spacing, such as with 1 centimeter spacing between the grid points.

The standardized robotic kitchen 50 depicts another possible configuration for the use of one or more augmented sensor systems 20. The standardized robotic kitchen 50 shows a multitude of augmented sensor systems 20 placed in the corners above the kitchen work-surface along the length of the kitchen axis with the intent to effectively cover the complete visible three-dimensional workspace of the standardized robotic kitchen 50.

The proper placement of the augmented sensor system 20 in the standardized robotic kitchen 50, allows for three-dimensional sensing, using video-cameras, lasers, sonars and other two- and three-dimensional sensor systems to enable the collection of raw data to assist in the creation of processed data for real-time dynamic models of shape, location, orientation and activity for robotic arms, hands, tools, equipment and appliances, as they relate to the different steps in the multiple sequential stages of dish replication in the standardized robotic kitchen 50.

Raw data is collected at each point in time to allow the raw data to be processed to be able to extract the shape, dimension, location and orientation of all objects of importance to the different steps in the multiple sequential stages of dish replication in the standardized robotic kitchen 50 in a step 1162. The processed data is further analyzed by the computer system to allow the controller of the standardized robotic kitchen to adjust robotic arm and hand trajectories and mini-manipulations, by modifying the control signals defined by the robotic script. Adaptations to the recipe-script execution and thus control signals is essential in successfully completing each stage of the replication for a particular dish, given the potential for variability for many variables (ingredients, temperature, etc.). The process of recipe-script execution based on key measurable variables is an essential part of the use of the augmented (also termed multi-modal) sensor system 20 during the execution of the replicating steps for a particular dish in a standardized robotic kitchen 50.

Figure 41A:
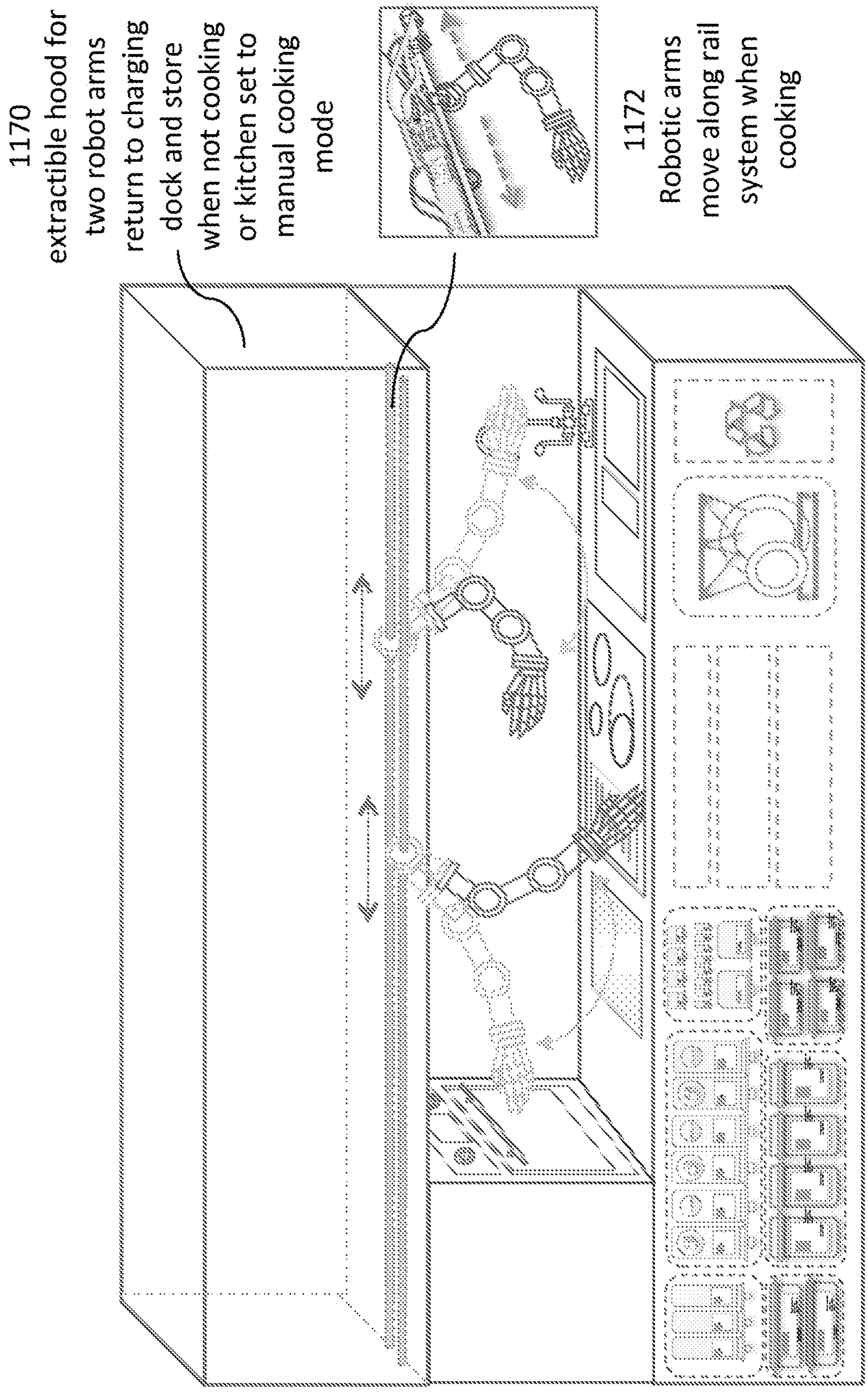
FIGS. 41A-L are block diagrams illustrating the various embodiments and features of the standardized robotic kitchen in accordance with the present invention.

FIG. 41A is a diagram illustrating a robotic kitchen prototype. The prototype kitchen consists of three levels, the top level includes a rail system for two arms to move along when cooking, an extractible hood for two robot arms to return to a charging dock and allow them to be stored when not used for cooking or when the kitchen is set to manual cooking mode. The mid level includes sinks, stove, griller, oven, and a working counter top with access to ingredients storage. The middle level has also a computer monitor to operate the equipment, choose the recipe, watching the video and text instructions, and listening to the audio instruction. The lower level includes an automatic container system to store food/ingredients at their best conditions, with the possibility to automatically deliver ingredients to the cooking volume as required by the recipe. The kitchen prototype also includes an oven, dishwasher, cooking tools, accessories, cookware organizer, drawers and recycle bin.

Figure 41B:
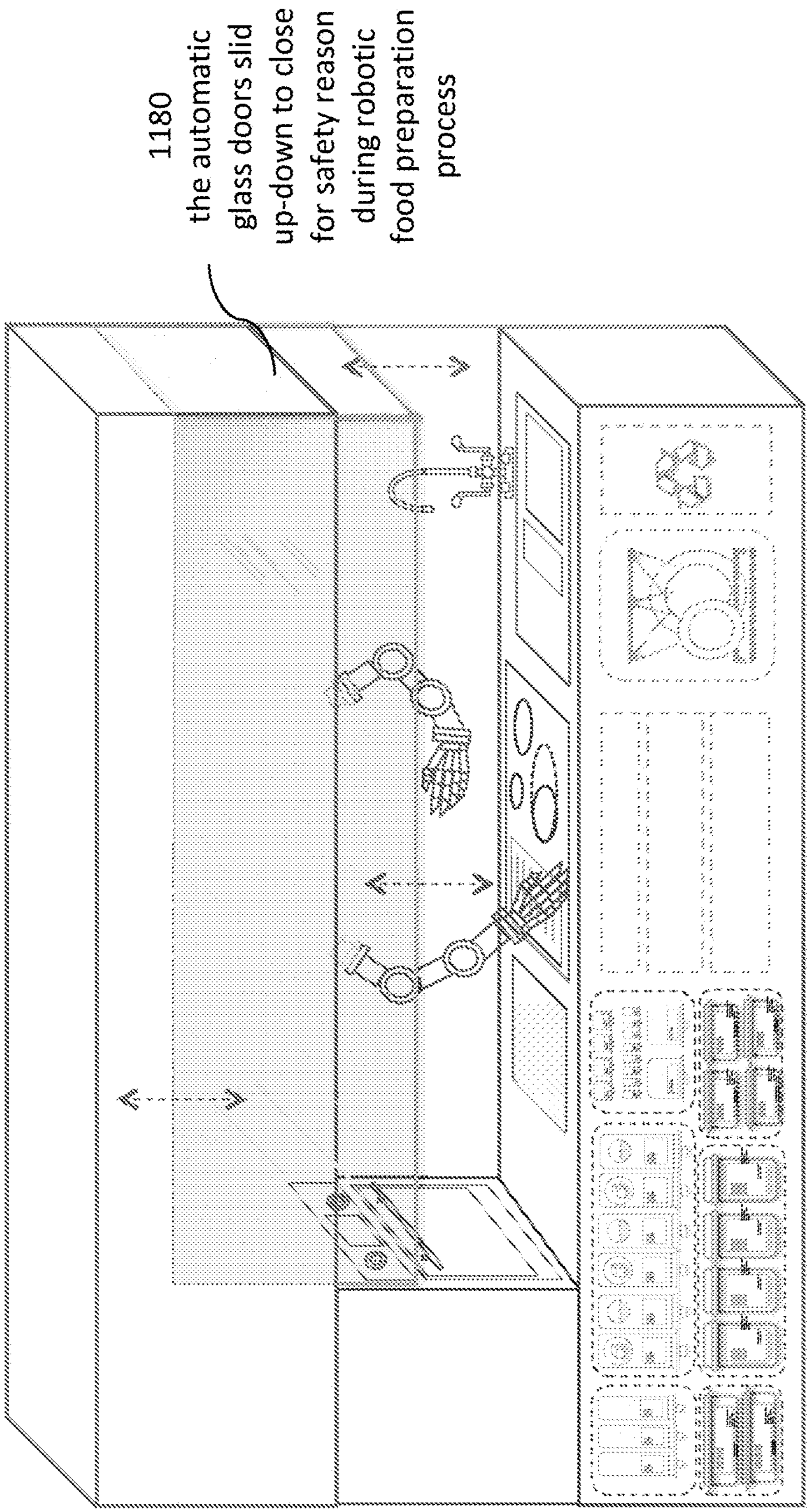

FIG. 41B is a diagram illustrating a robotic kitchen prototype with a transparent material enclosure that serves as a protection mechanism while the robotic cooking process is occurring to prevent causing potential injuries to surrounding humans. The transparent material enclosure can be made from a variety of transparent materials, such as glass, fiberglass, plastics, or any other suitable material. In one example, the transparent material enclosure comprises an automatic glass door (or doors). As shown in this embodiment, the automatic glass doors are positioned to slide up-down or down-up (from bottom section) to close for safety reasons during the cooking process involving the use of robotic arms. A variation in the design of the transparent material enclosure is possible, such as vertically sliding down, vertically sliding up, horizontally from left to right, horizontally from right to left, or any other methods that place allow for the transparent material enclosure in the kitchen to serve as a protection mechanism.

Figure 41C:
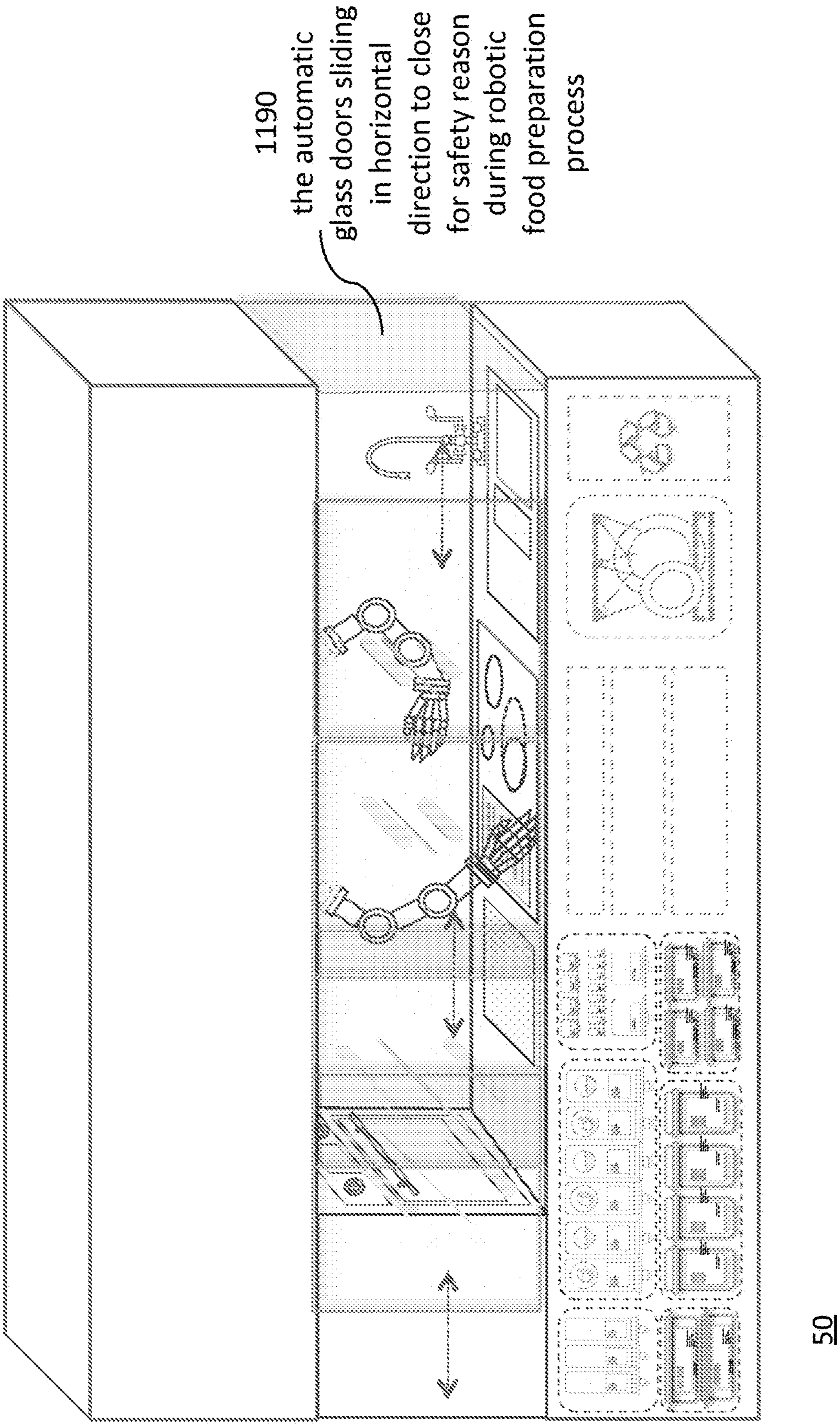

FIG. 41C depicts an embodiment of the standardized robotic kitchen, where the volume prescribed by the countertop surface and the underside of the hood, has horizontally sliding glass doors 1190, that can be manually, or under computer control, moved left or right to separate the workspace of the robotic arms/hands from its surroundings for such purposes as safeguarding any human standing near the kitchen, or limit contamination into/out-of the kitchen work-area, or even allow for better climate control within the enclosed volume. The automatic sliding glass doors slide left-right to close for safety reasons during the cooking processes involving the use of the robotic arms.

Figure 41D:
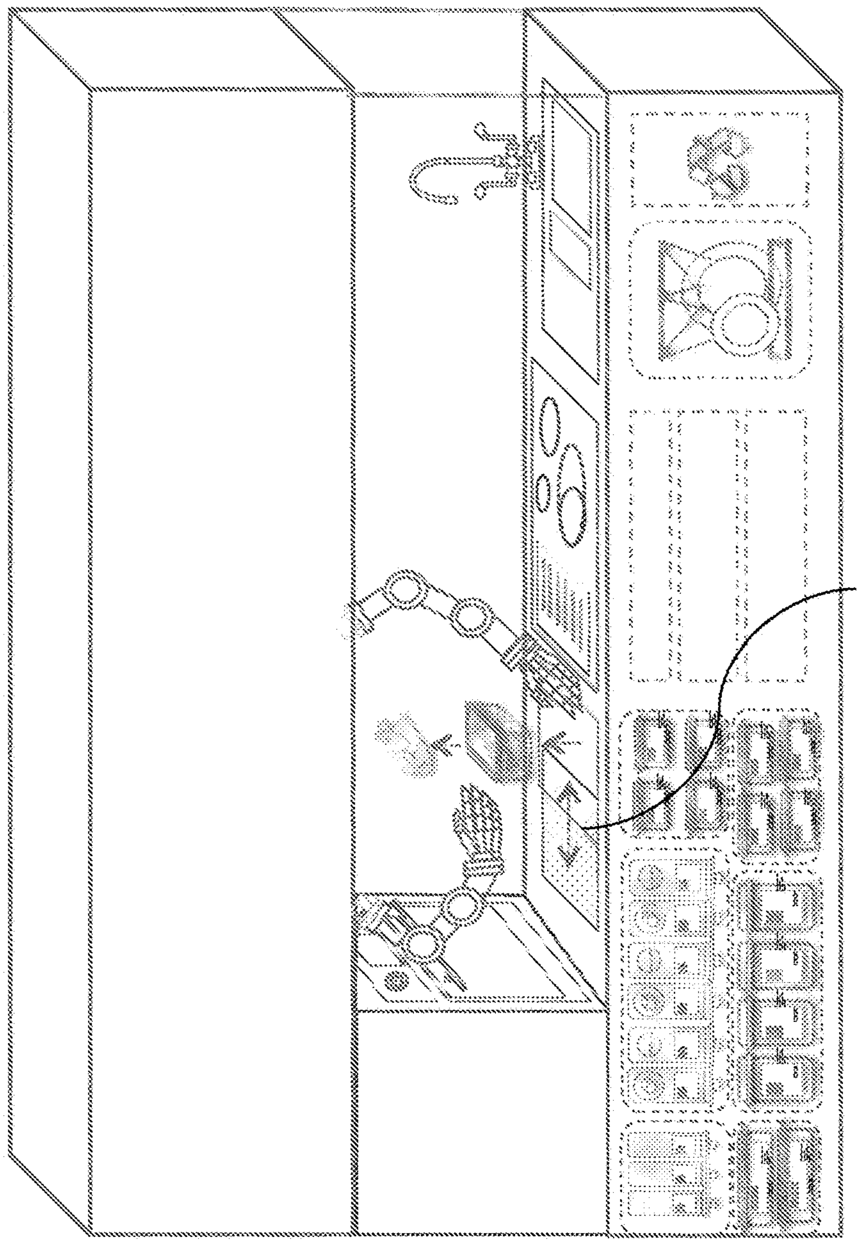

FIG. 41D depicts an embodiment of the standardized robotic kitchen, where the countertop or work-surface includes an area with a sliding-door 1200 access to the ingredient-storage volume in the bottom cabinet volume of the robotic kitchen counter. The doors can be slid open manually, or under computer control, to allow access to the ingredient containers therein. Either manually, or under computer control, one or more specific containers can be fed to countertop level by the ingredient storage-and-supply unit, allowing manual access (in this depiction by the robotic arms/hands) to the container, its lid and thus the contents of the container. The robotic arms/hands can then open the lid, retrieve the ingredient(s) as needed, and place the ingredient(s) in the appropriate place (plate, pan, pot, etc.), before re-sealing the container and placing it back on or into the ingredient storage-and-supply unit. The ingredient storage-and-supply unit then places the container back into the appropriate location within the unit for later re-use, cleaning or re-stocking. This process of supplying and re-stacking ingredient containers for access by the robotic arms/hands is an integral and repeating process that forms part of the recipe-script as certain steps within the recipe replication process call for one or more ingredients of a certain type, based on the stage of the recipe-script execution the standardized robotic kitchen 50 might be involved in.

To access the ingredients storage-and-supply unit, part of the countertop with sliding doors can be opened, where the recipe software controls the doors and moves designated containers and ingredients to the access location where the robotic arm(s) may pick up the containers, open the lid, remove the ingredients out of the containers to a designated place, reseal the lid and move the containers back into storage. The container is moved from the access location back to its default location in the storage unit, and a new/next container item is then uploaded to the access location to be picked up.

Figure 41E:
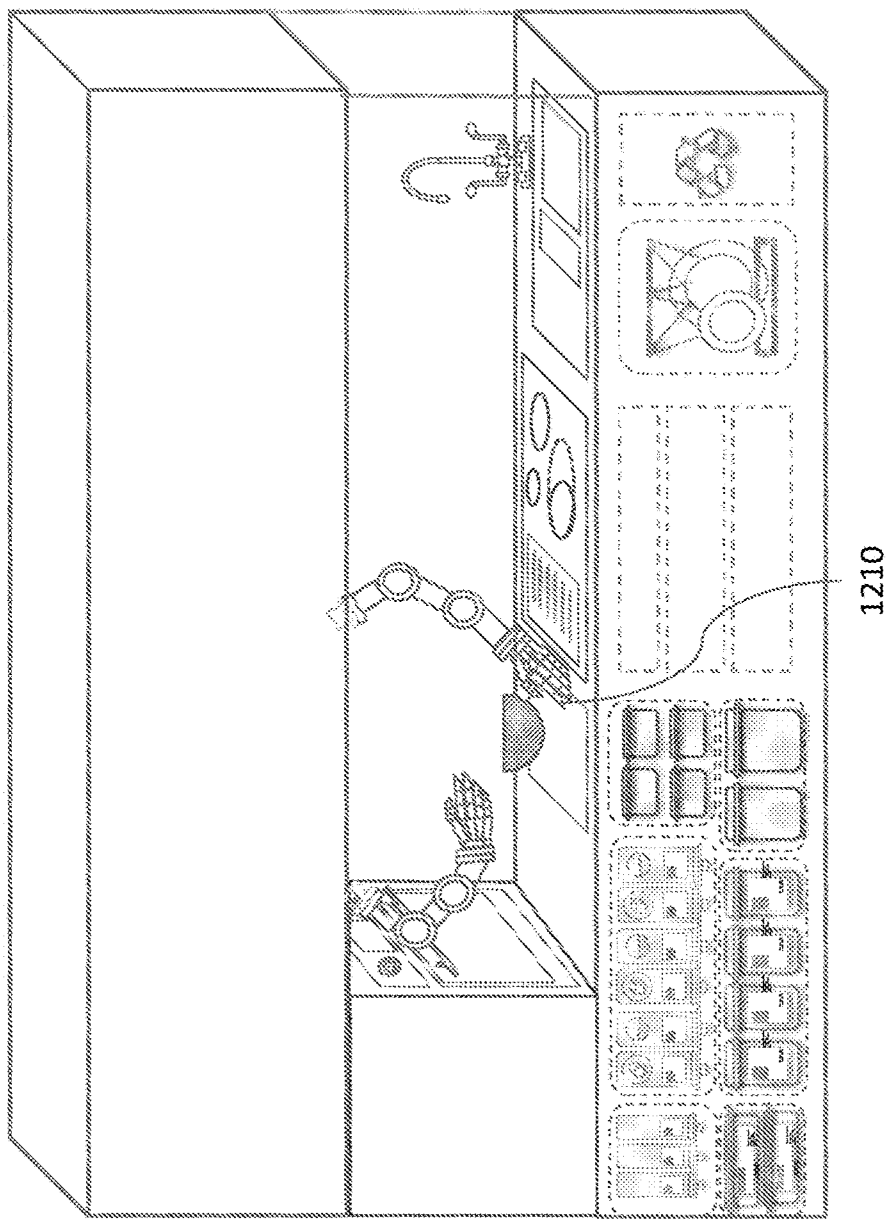

An alternative embodiment for an ingredient storage-and-supply unit 1210 is depicted in FIG. 41E. Specific or repetitively used ingredients (salt, sugar, flour, oil, etc.) can be dispensed using computer-controlled feeding mechanisms or allow for hand-triggered, whether by human or robotic hands or fingers, release of a specified amount of a specific ingredient. The amount of ingredient to be dispensed can be manually entered by the human or robotic hand on a touch-panel, or provided via computer-control. The dispensed ingredient can then be collected or fed into a piece of kitchen equipment (bowl, pan, pot, etc.) at any time during the recipe replication process. This embodiment of an ingredient supply and dispensing system can be thought of as more cost- and space-efficient approach while also reducing container-handling complexity as well as wasted motion-time by the robot arms/hands.

Figure 41F:
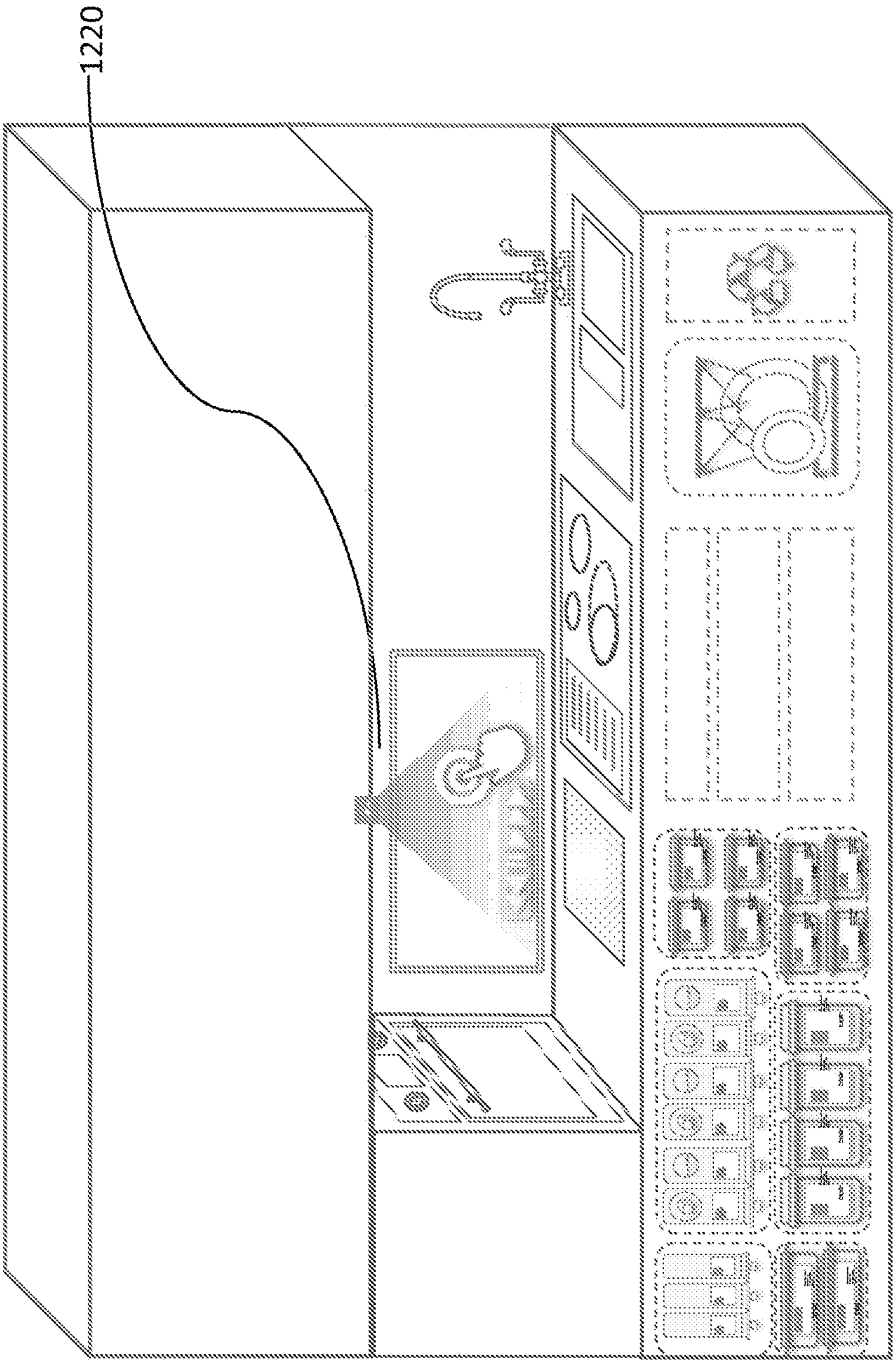

In FIG. 41F an embodiment of the standardized robotic kitchen includes a backsplash area 1220, wherein is mounted a virtual monitor/display with a touchscreen area to allow a human operating the kitchen in manual mode to interact with the robotic kitchen and its elements. A computer-projected image and a separate camera monitoring the projected area can tell where the human hand and its finger are located when making a specific choice based on a location in the projected image, upon which the system then acts accordingly. The virtual touchscreen allows for access to all control and monitoring functions for all aspects of the equipment within the standardized robotic kitchen 50, retrieval and storage of recipes, reviewing stored videos of complete or partial recipe execution steps by a human chef, as well as listening to audible playback of the human chef voicing descriptions and instructions related to a particular step or operation in a particular recipe.

Figure 41G:
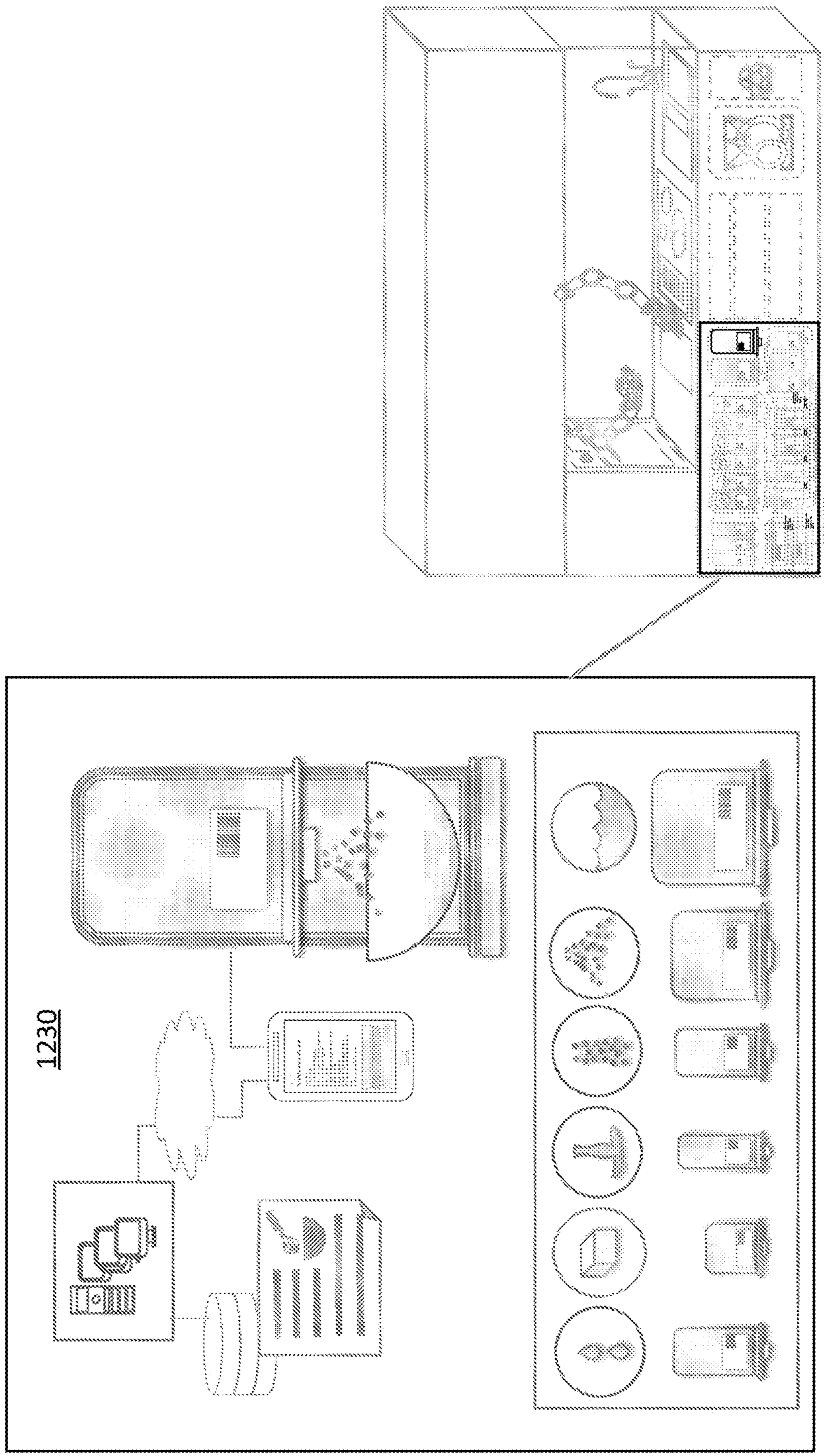

FIG. 41G depicts a single or a series of robotic hard automation device(s) 1230 which are built into the standardized robotic kitchen. The device or devices are programmable and controllable remotely by a computer and are designed to feed or provide pre-packaged or pre-measured amounts of dedicated ingredient elements needed in the recipe replication process, such as spices (salt, pepper, etc.), liquids (water, oil, etc.) or other dry ingredients (flour, sugar, baking powder, etc.). These robotic automation devices 1230 are located so as to make them readily accessible to the robotic arms/hands to allow them to be used by the robotic arms/hands or those of a human chef, to set and/or trigger the release of a determined amount of an ingredient of choice based on the needs specified in the recipe-script.

Figure 41H:
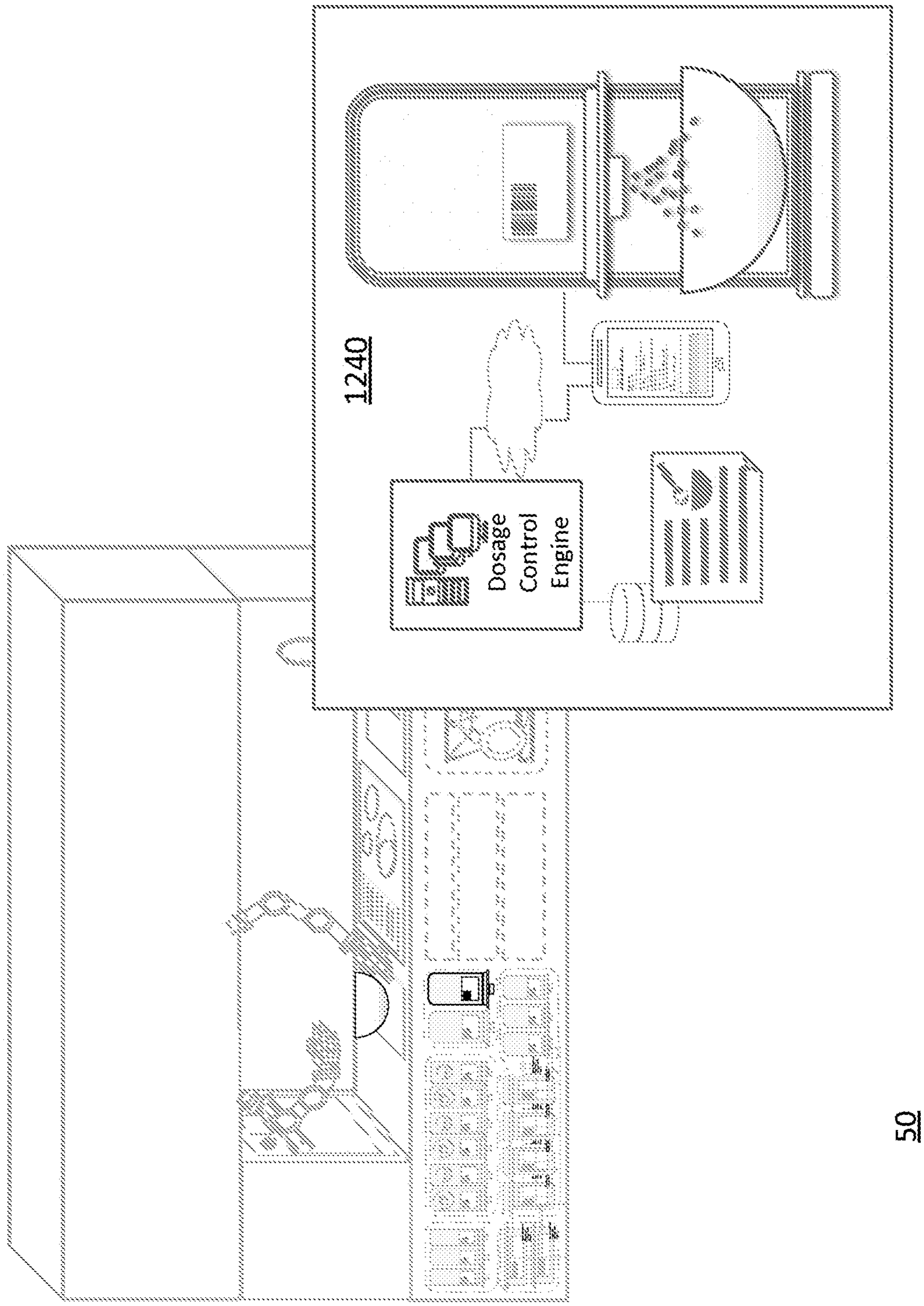

FIG. 41H depicts a single or a series of robotic hard automation device(s) 1340, which are built into the standardized robotic kitchen. The device or devices are programmable and controllable remotely by a computer and are designed to feed or provide pre-packaged or pre-measured amounts of common and repetitively used ingredient elements needed in the recipe replication process, where a dosage control engine/system, is capable of providing just the proper amount to a specific piece of equipment, such as a bowl, pot or pan. These robotic automation devices 1340 are located so as to make them readily accessible to the robotic arms/hands to allow them to be used by the robotic arms/hands or those of a human cook, to set and/or trigger the release of a dosage-engine controlled amount of an ingredient of choice based on the needs specified in the recipe-script. This embodiment of an ingredient supply and dispensing system can be thought of as more cost- and space-efficient approach while also reducing container-handling complexity as well as wasted motion-time by the robot arms/hands.

Figure 41I:
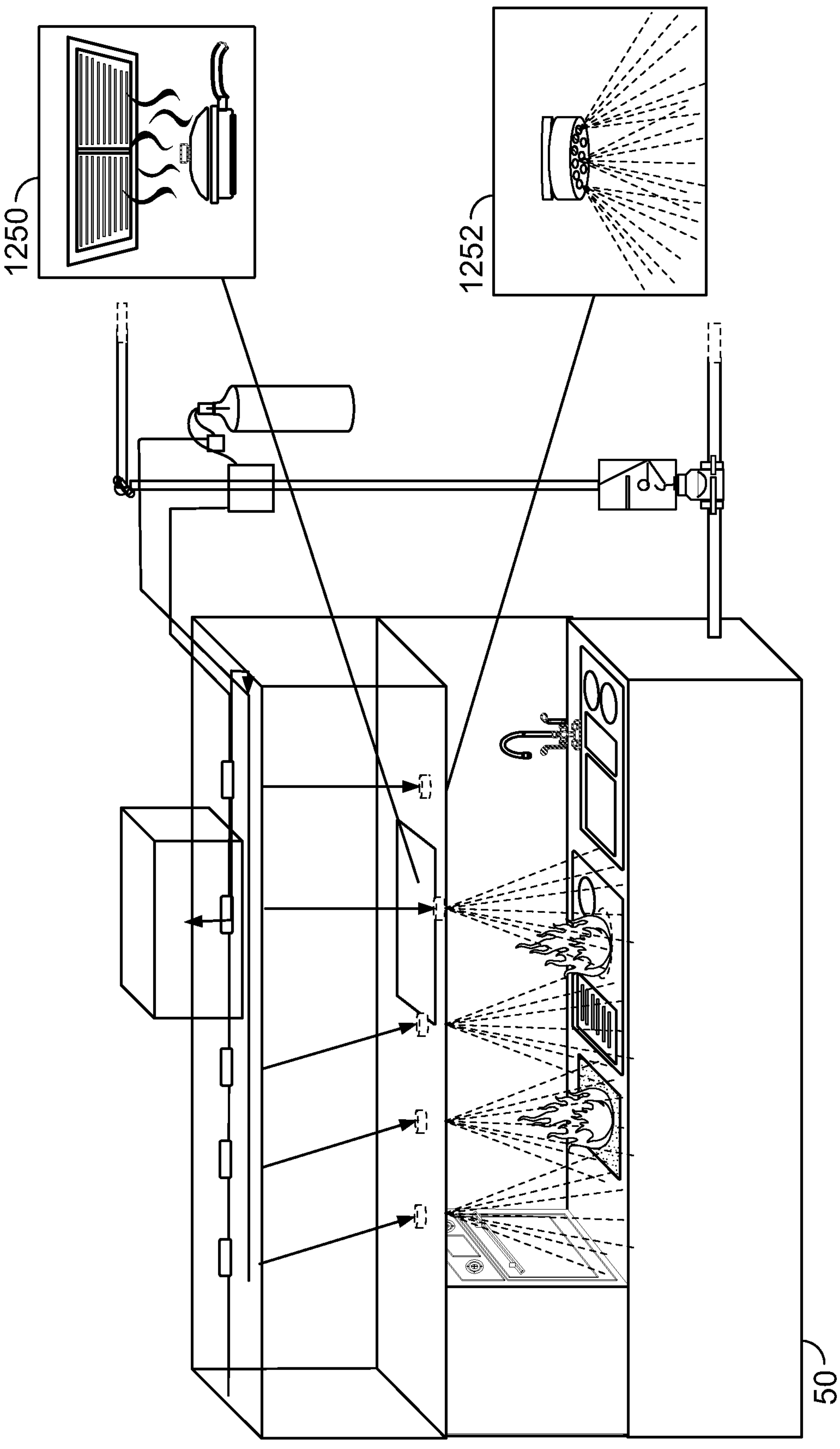

FIG. 41I depicts the standardized robotic kitchen outfitted with both a ventilation system 1250 to extract fumes and steam during the automated cooking process, as well as an automatic smoke/flame detection and suppression system 1252 to extinguish any source of noxious smoke and dangerous fire also allowing the safety glass of the sliding doors to enclose the standardized robotic kitchen 50 to contain the affected space.

Figure 41J:
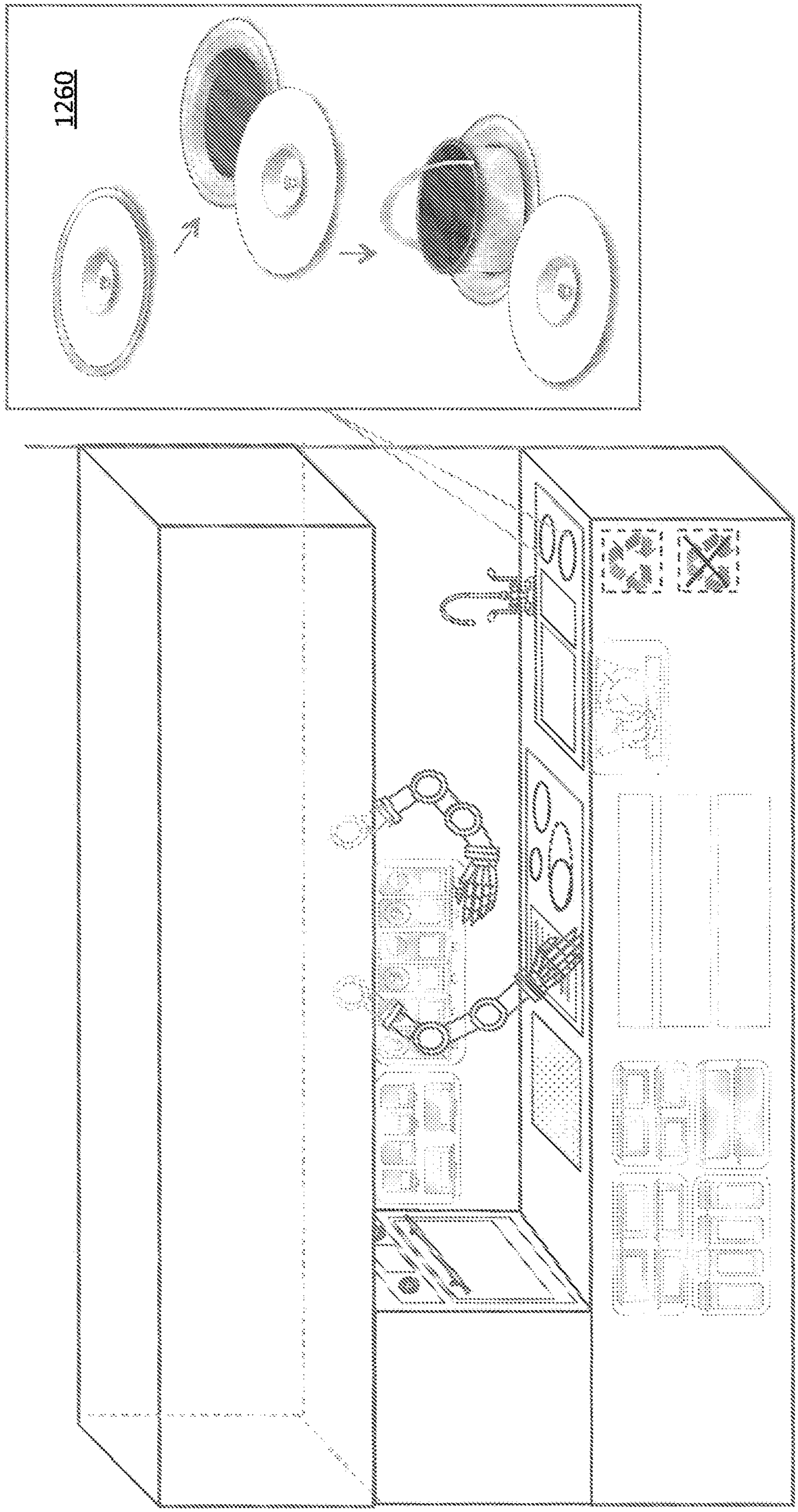

FIG. 41J depicts the standardized robotic kitchen 50 with a waste management system 1260 which is located within a location in the lower cabinet so as to allow for easy and rapid disposal of recyclable (glass, aluminum, etc.) and non-recyclable (food scraps, etc.) items by way of a set of trash containers with removable lids, which contain sealing elements (gaskets, o-rings, etc.) to provide for an airtight seal to keep odors from escaping into the standardized robotic kitchen 50.

Figure 41K:
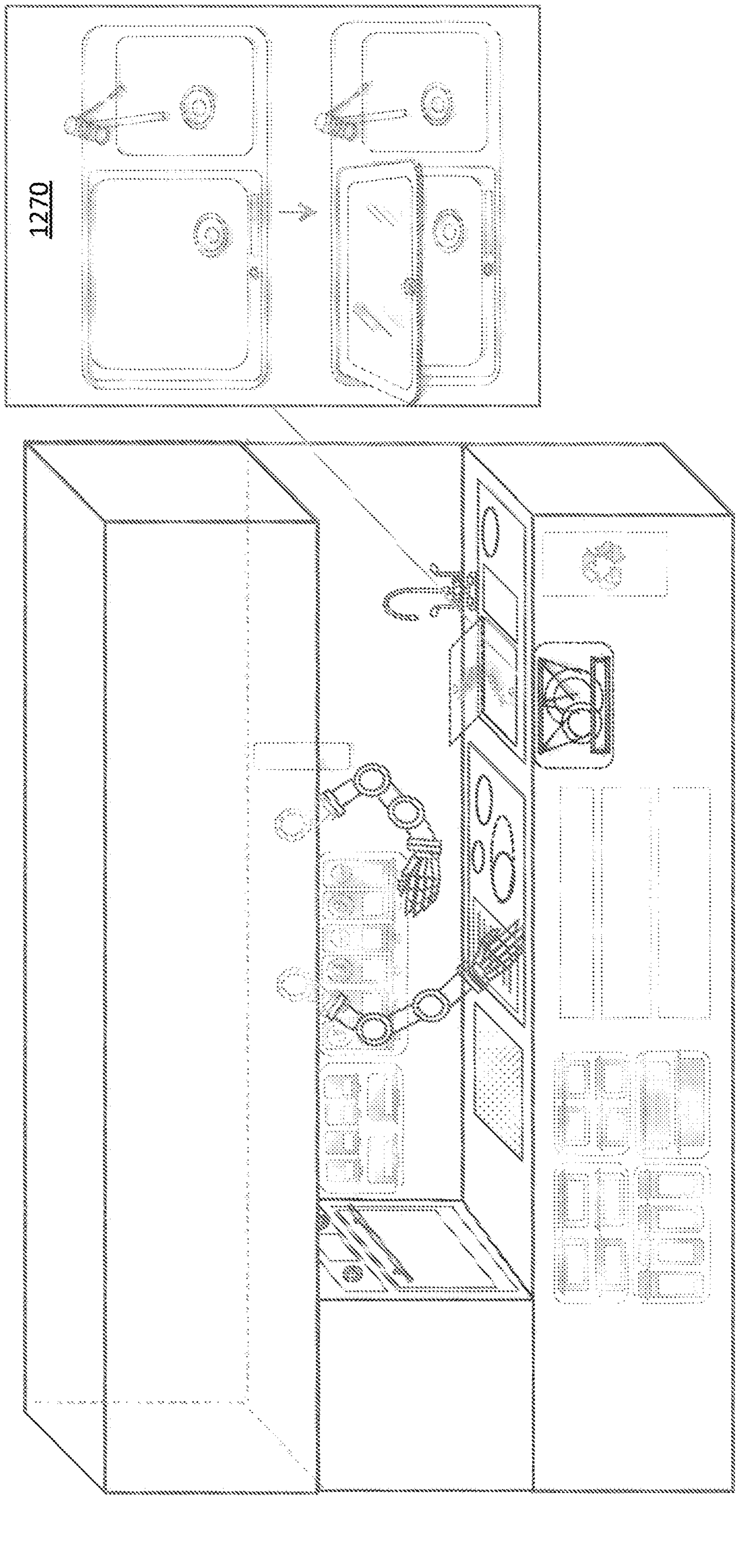

FIG. 41K depicts the standardized robotic kitchen 50 with a top-loaded dishwasher 1270 located within a certain location in the kitchen for ease of robotic loading and unloading. The dishwasher includes a sealing lid, which during automated recipe replication step execution can also be used as a cutting board or workspace with an integral drainage groove.

Figure 41L:
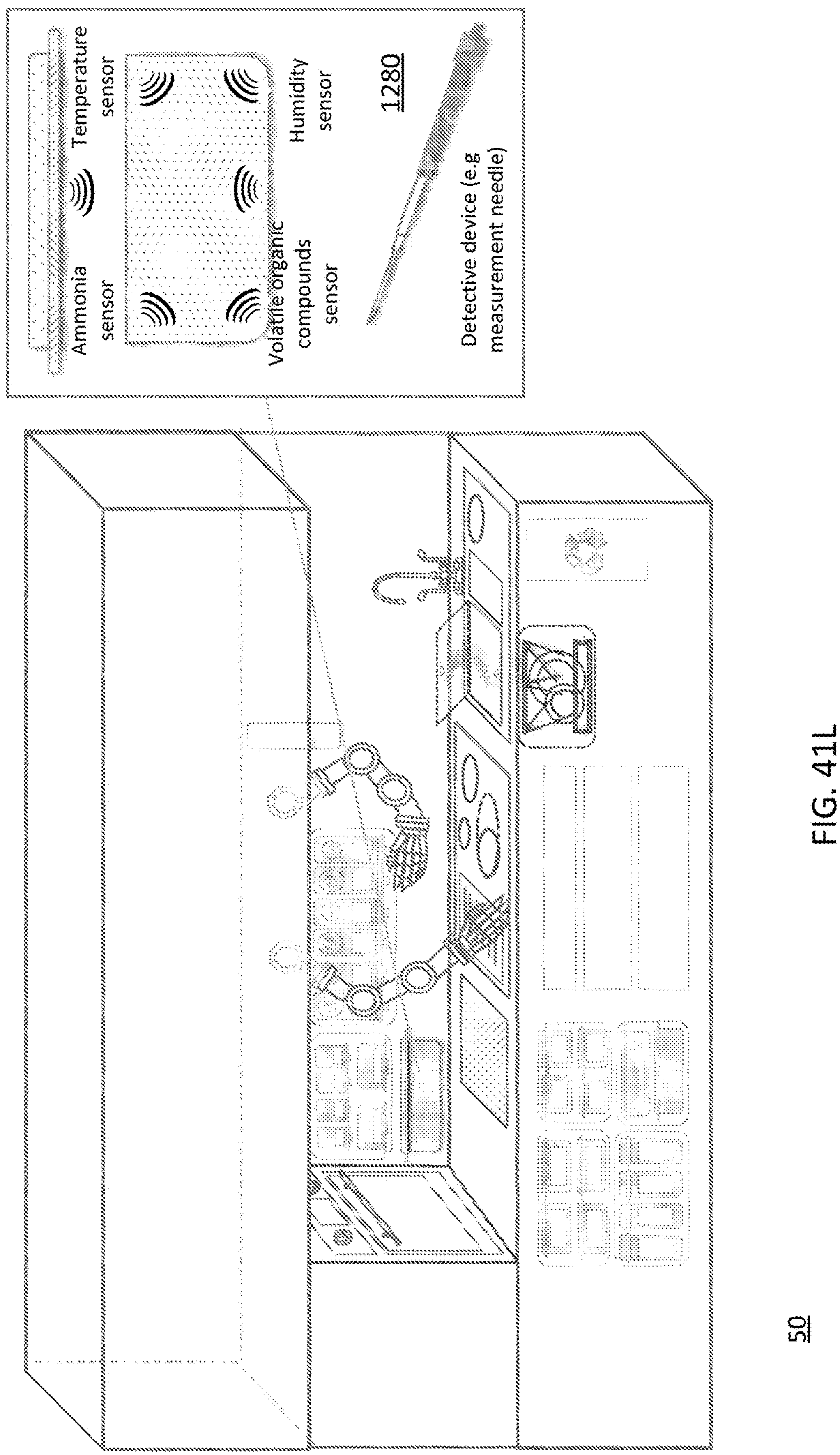

FIG. 41L depicts the standardized kitchen with an instrumented ingredient quality-check system 1280 comprised of an instrumented panel with sensors and a food-probe. The area includes sensors on the backsplash capable of detecting multiple physical and chemical characteristics of ingredients placed within the area, including but not limited to spoilage (ammonia sensor), temperature (thermocouple), volatile organic compounds (emitted upon biomass decomposition), as well as moisture/humidity (hygrometer) content. A food probe using a temperature-sensor (thermocouple) detection device can also be present to be wielded by the robotic arms/hands to probe the internal properties of a particular cooking ingredient or element (such as internal temperature of red meat, poultry, etc.).

Figure 42A:
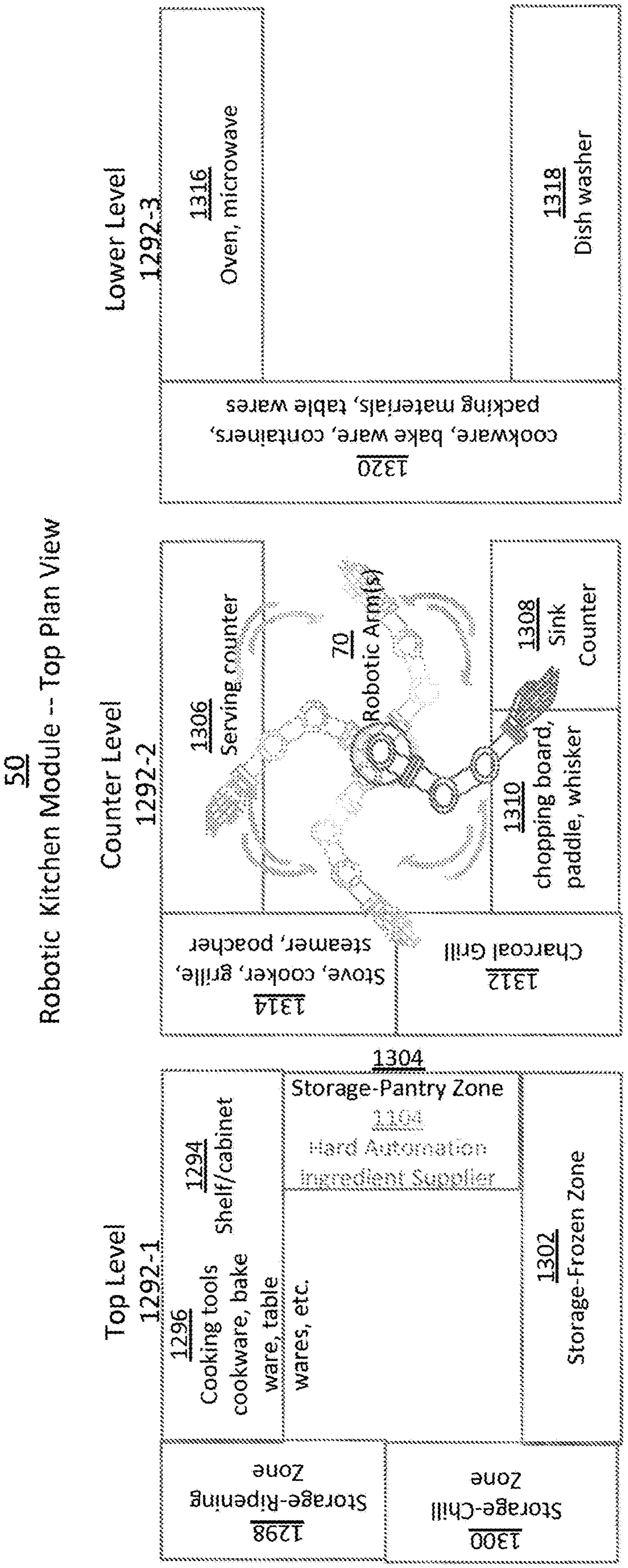
FIG. 42A is block diagram illustrating a top plan view of the standardized robotic kitchen in accordance with the present invention.

FIG. 42A depicts an embodiment of a standardized robotic kitchen in plan view 50, whereby it should be understood that the elements therein could be arranged in a different fashion. The standardized robotic kitchen is divided in to three levels, namely the top level 1292-1, the counter level 1292-2 and the lower level 1292-3.

The top level 1292-1 contains multiple cabinet-type modules with different units to perform specific kitchen functions by way of built-in appliances and equipment. At the simplest level a shelf/cabinet storage area 1294 is included, a cabinet volume 1296 used for storing and accessing cooking tools and utensils and other cooking and serving ware (cooking, baking, plating, etc.), a storage ripening cabinet volume 1298 for particular ingredients (e.g. fruit and vegetables, etc.), a chilled storage zone 1300 for such items as lettuce and onions, a frozen storage cabinet volume 1302 for deep-frozen items, and another storage pantry zone 1304 for other ingredients and rarely used spices, etc.

The counter level 1292-2 not only houses the robotic arms 70, but also includes a serving counter 1306, a counter area with a sink 1308, another counter area 1310 with removable working surfaces (cutting/chopping board, etc.), a charcoal-based slatted grill 1312 and a multi-purpose area for other cooking appliances 1314, including a stove, cooker, steamer and poacher.

The lower level 1292-3 houses the combination convection oven and microwave 1316, the dish-washer 1318 and a larger cabinet volume 1320 that holds and stores additional frequently used cooking and baking ware, as well as tableware and packing materials and cutlery.

Figure 42B:
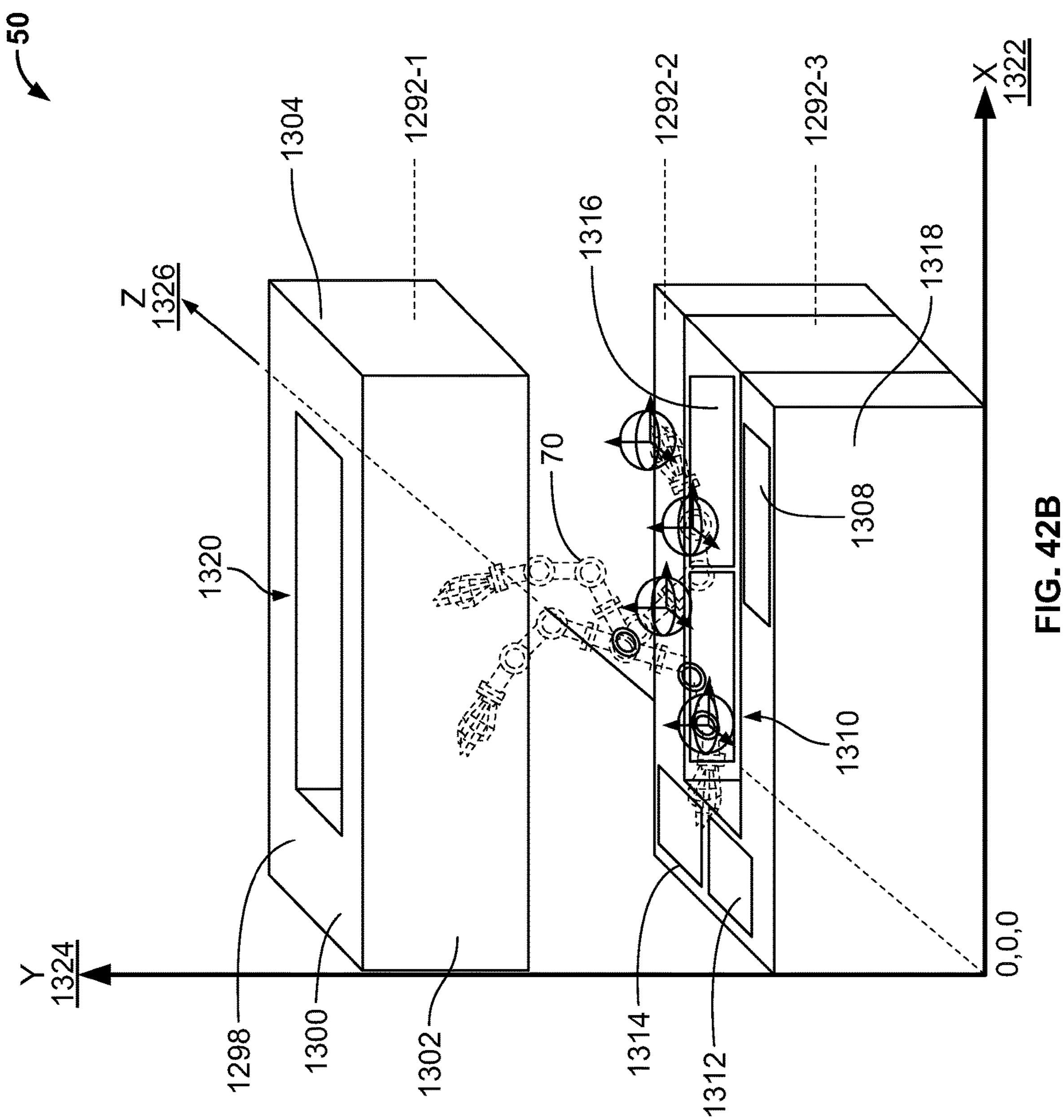
FIG. 42B is a block diagram illustrating a perspective plan view of the standardized robotic kitchen in accordance with the present invention.

FIG. 42B depicts a perspective view 50 of the standardized robotic kitchen, depicting the locations of the top level 1292-1, counter level 1292-2 and the lower level 1294-3, within an xyz coordinate frame with axes for x 1322, y 1324 and z 1326 to allow for proper geometric referencing for positioning of the robotic arms 34 within the standardized robotic kitchen.

The perspective view of the robotic kitchen 50 clearly identifies one of the many possible layouts and locations for equipment at all three levels, including the top level 1292-1 (storage pantry 1304, standardized cooking tools and ware 1320, storage ripening zone 1298, chilled storage zone 1300, and frozen storage zone 1302, the counter level 1292-2 (robotic arms 70, sink 1308, chopping/cutting area 1310, charcoal grill 1312, cooking appliances 1314 and serving counter 1306) and the lower level (dish-washer 1318 and oven and microwave 1316).

Figure 43A:
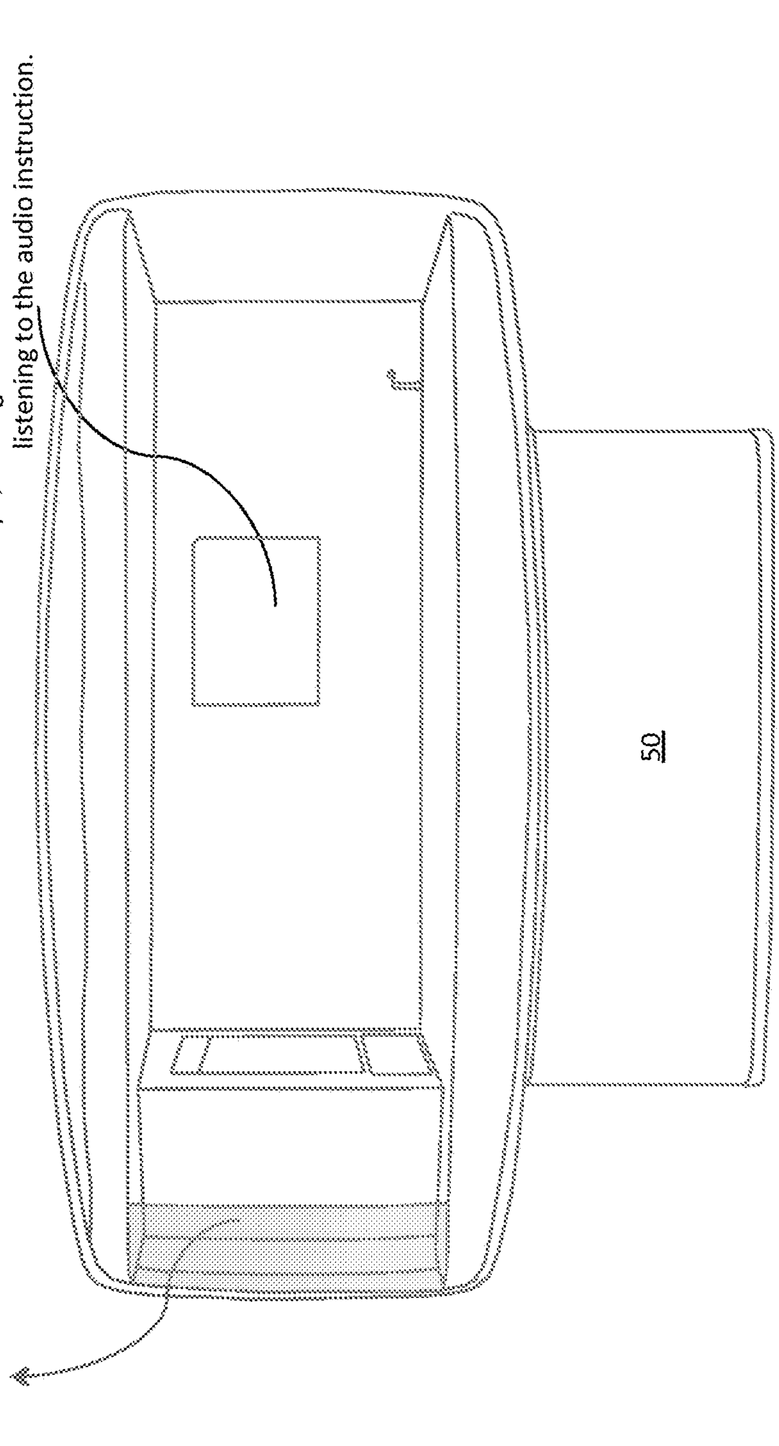
FIGS. 43A-B are block diagrams illustrating a first embodiment of the kitchen module frame with automatic transparent doors in the standardized robotic kitchen in accordance with the present invention.

FIG. 43A depicts a plan view of one possible physical embodiment of the standardized robotic kitchen layout, where the kitchen is built into a more linear substantially rectangular horizontal layout depicting a built-in monitor 1328 for a user to operate the equipment, choose a recipe, watch video and listen to the recorded chef's instructions, as well as automatically computer-controlled left/right movable transparent doors 1330 for enclosing the open faces of the standardized robotic cooking volume during operation of the robotic arms.

Figure 43B:
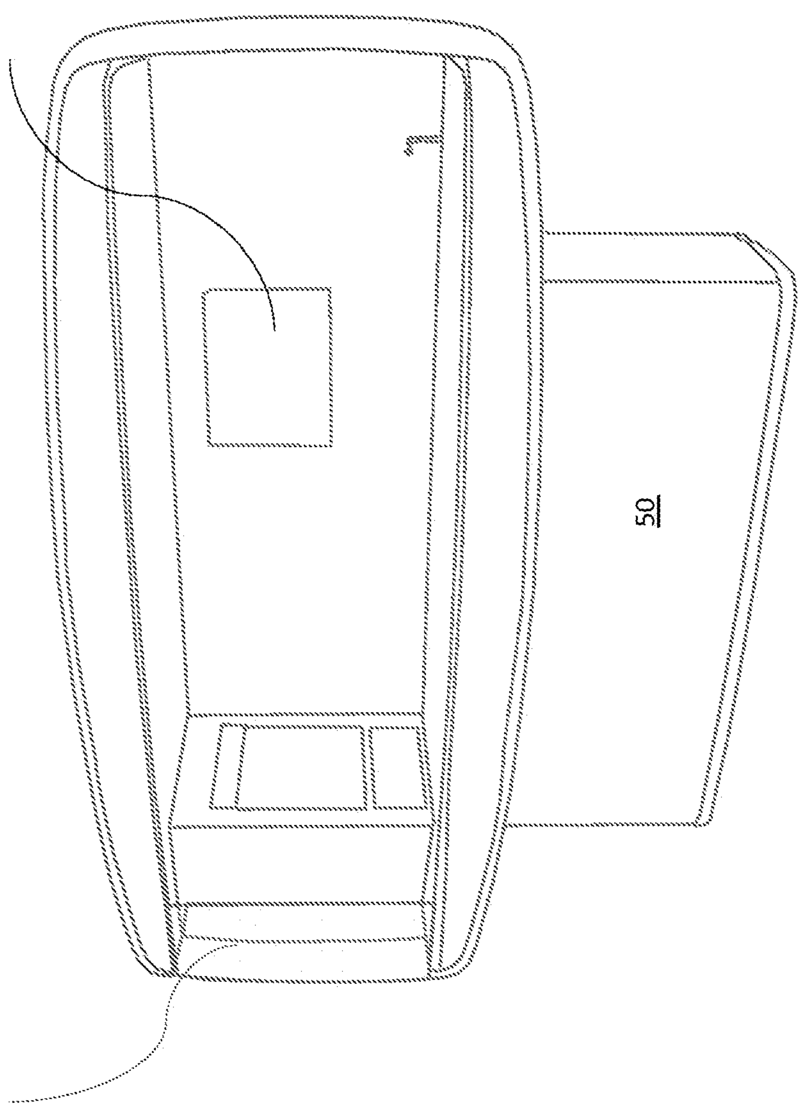
Figure 43C:
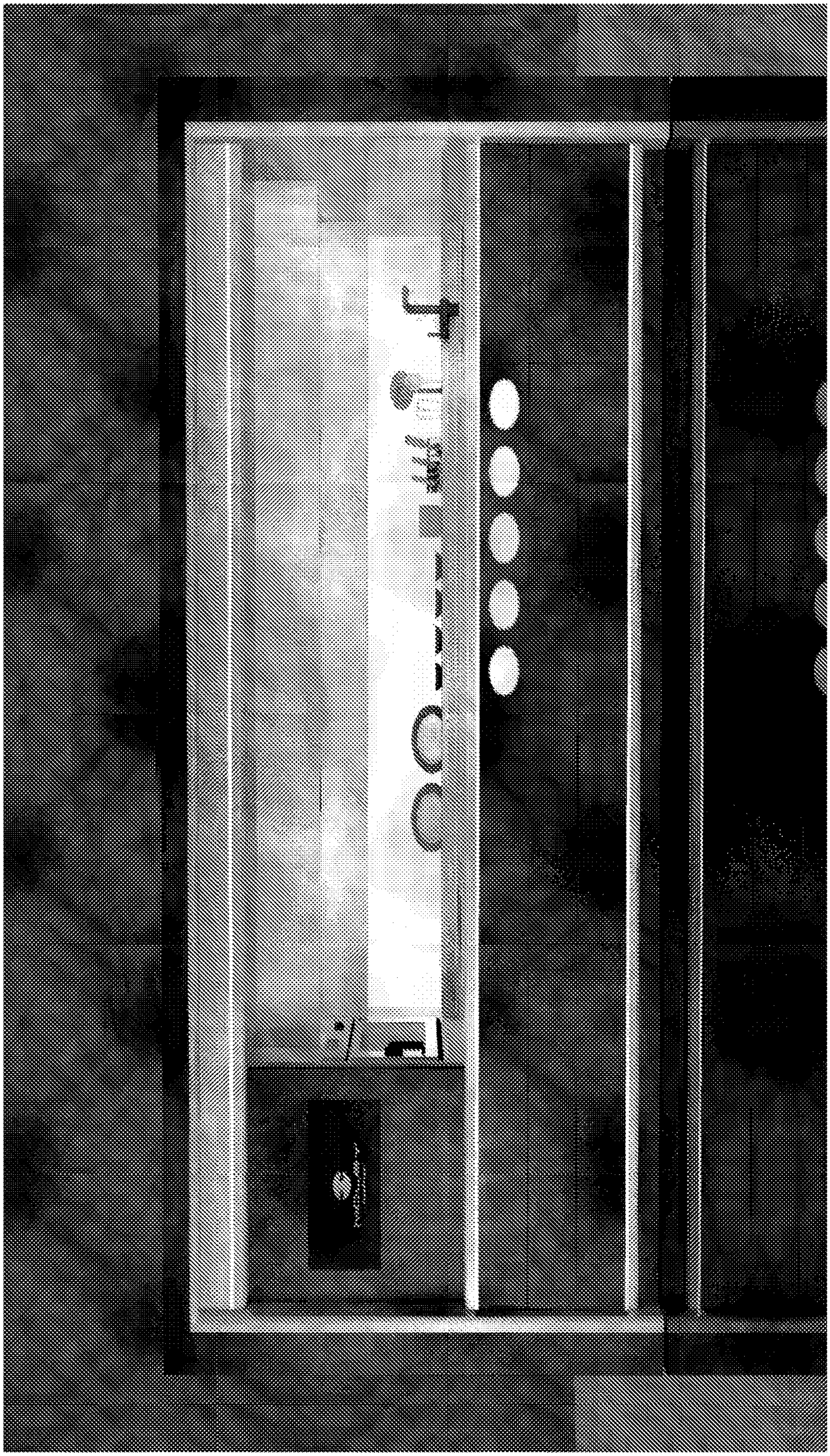
FIGS. 43C-F are block diagrams illustrating screen shots and a sample kitchen module specification in the standardized robotic kitchen in accordance with the present invention.
Figure 43D:
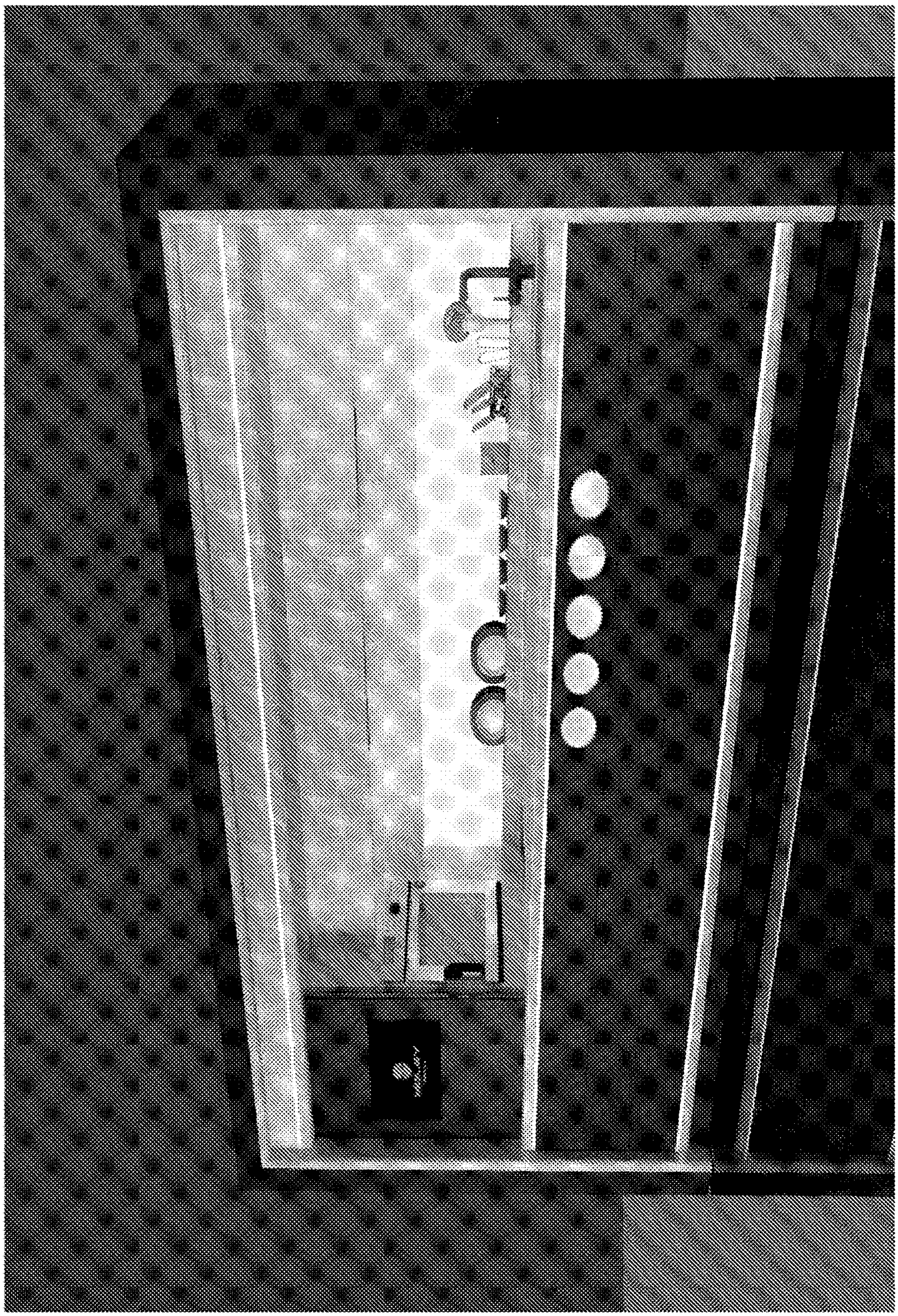
Figure 43E:
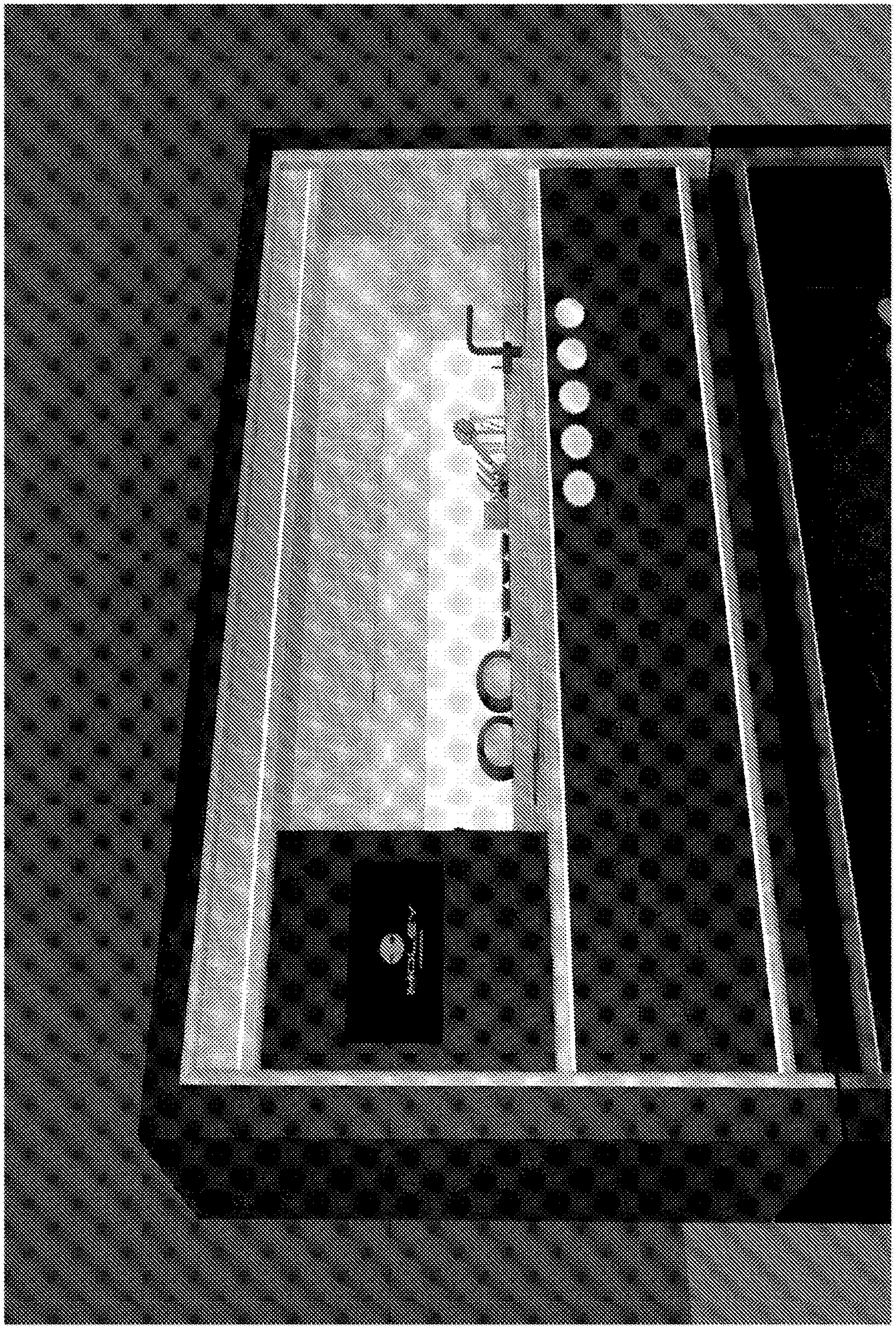
Figure 43F:
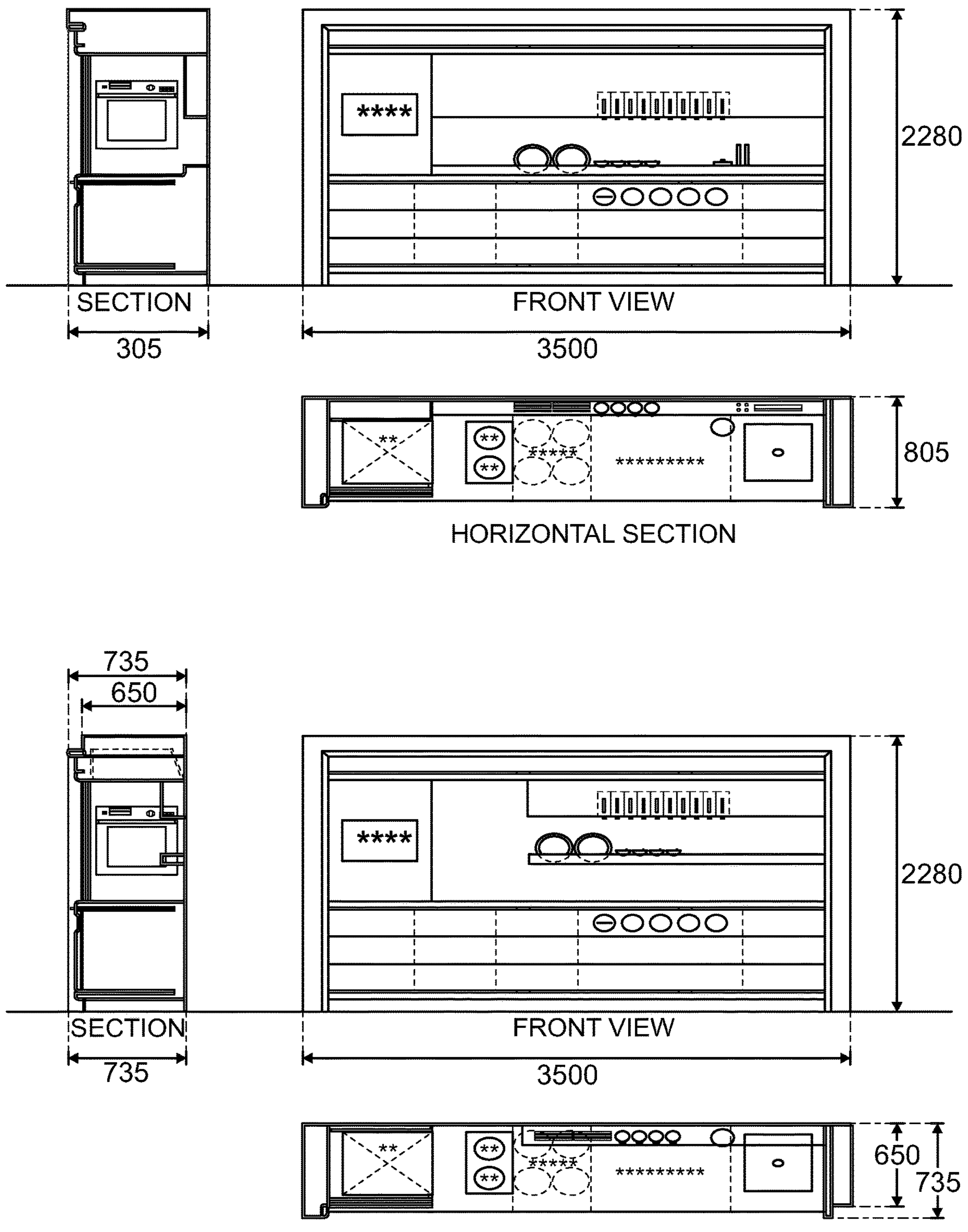

FIG. 43B depicts a perspective view of one possible physical embodiment of the standardized robotic kitchen layout, where the kitchen is built into a more linear substantially rectangular horizontal layout depicting a built-in monitor 1332 for a user to operate the equipment, choose a recipe, watch video and listen to the recorded chef's instructions, as well as automatically computer-controlled left/right movable transparent doors 1334 for enclosing the open faces of the standardized robotic cooking volume during operation of the robotic arms. Sample screen shots in the standardized robotic kitchen are illustrated in FIGS. 43C-E, while FIG. 43F depicts a sample kitchen module specification.

Figure 44A:
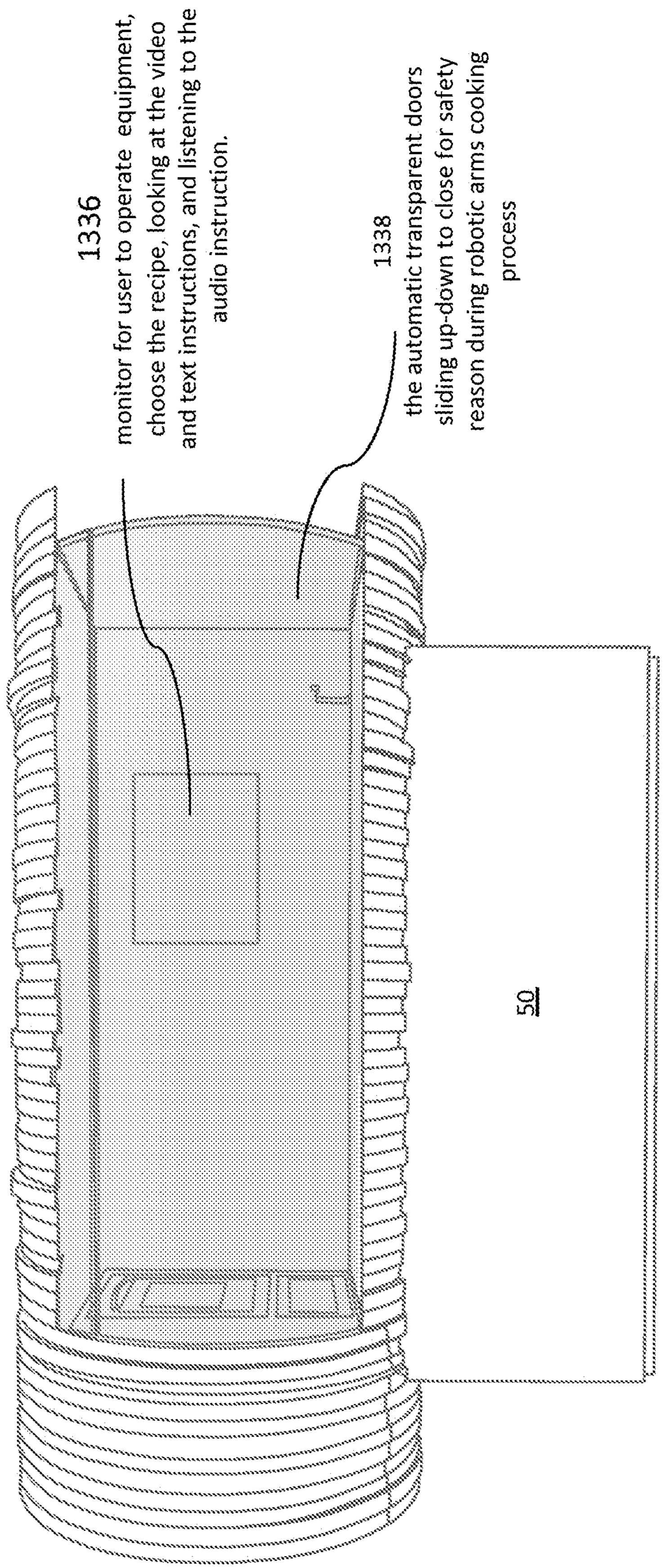
FIGS. 44A-B are block diagrams illustrating a second embodiment of the kitchen module frame with automatic transparent doors in the standardized robotic kitchen in accordance with the present invention.

FIG. 44A depicts a plan view of another possible physical embodiment of the standardized robotic kitchen layout, where the kitchen is built into a more linear substantially rectangular horizontal layout depicting a built-in monitor 1336 for a user to operate the equipment, choose a recipe, watch video and listen to the recorded chef's instructions, as well as automatically computer-controlled up/down movable transparent doors 1338 for enclosing the open faces of the standardized robotic cooking volume during operation of the robotic arms.

Figure 44B:
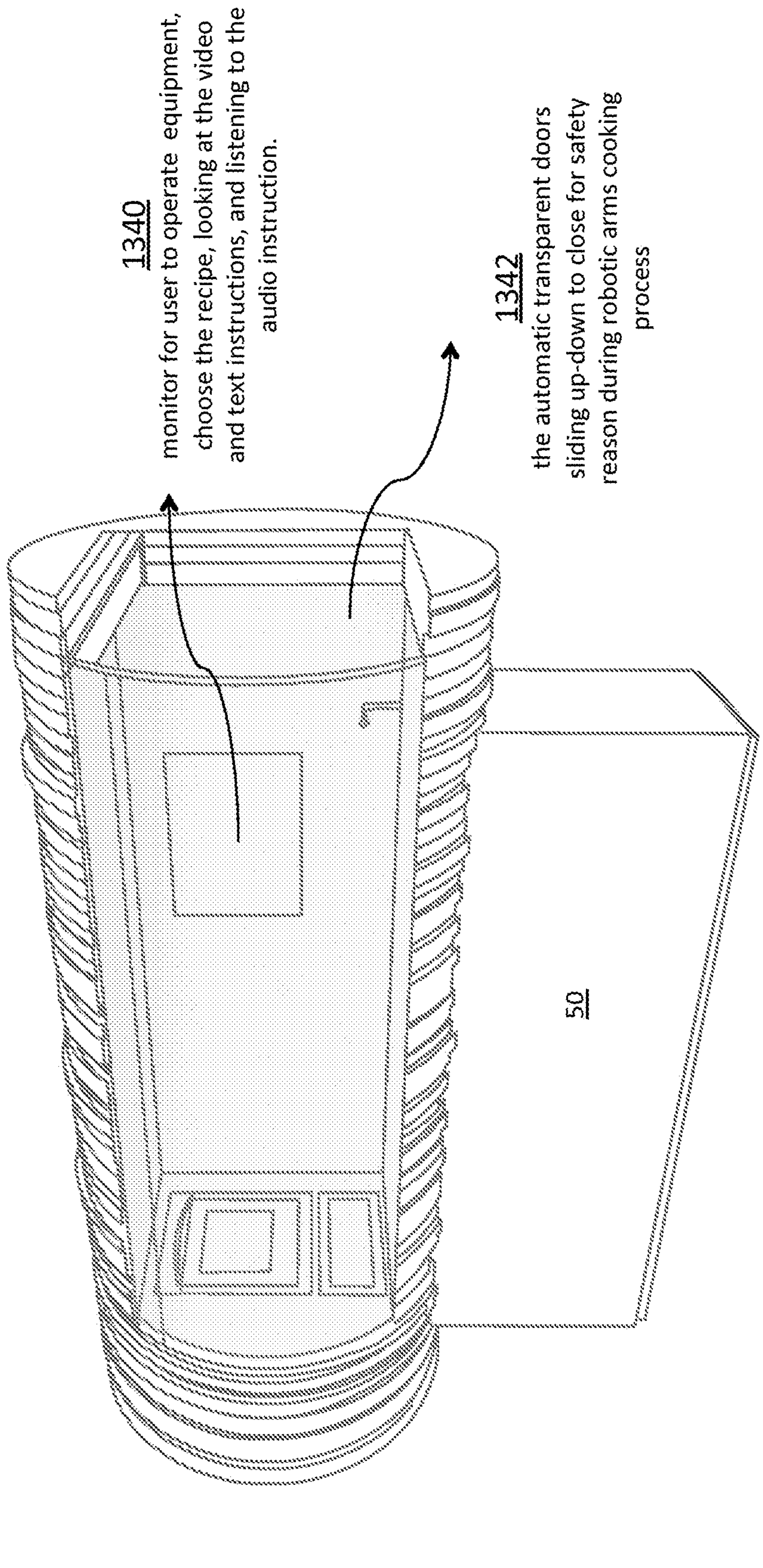

FIG. 44B depicts a perspective view of another possible physical embodiment of the standardized robotic kitchen layout, where the kitchen is built into a more linear substantially rectangular horizontal layout depicting a built-in monitor 1340 for a user to operate the equipment, choose a recipe, watch video and listen to the recorded chef's instructions, as well as automatically computer-controlled up/down movable transparent doors 1342 for enclosing the open faces of the standardized robotic cooking volume during operation of the robotic arms.

Figure 45:
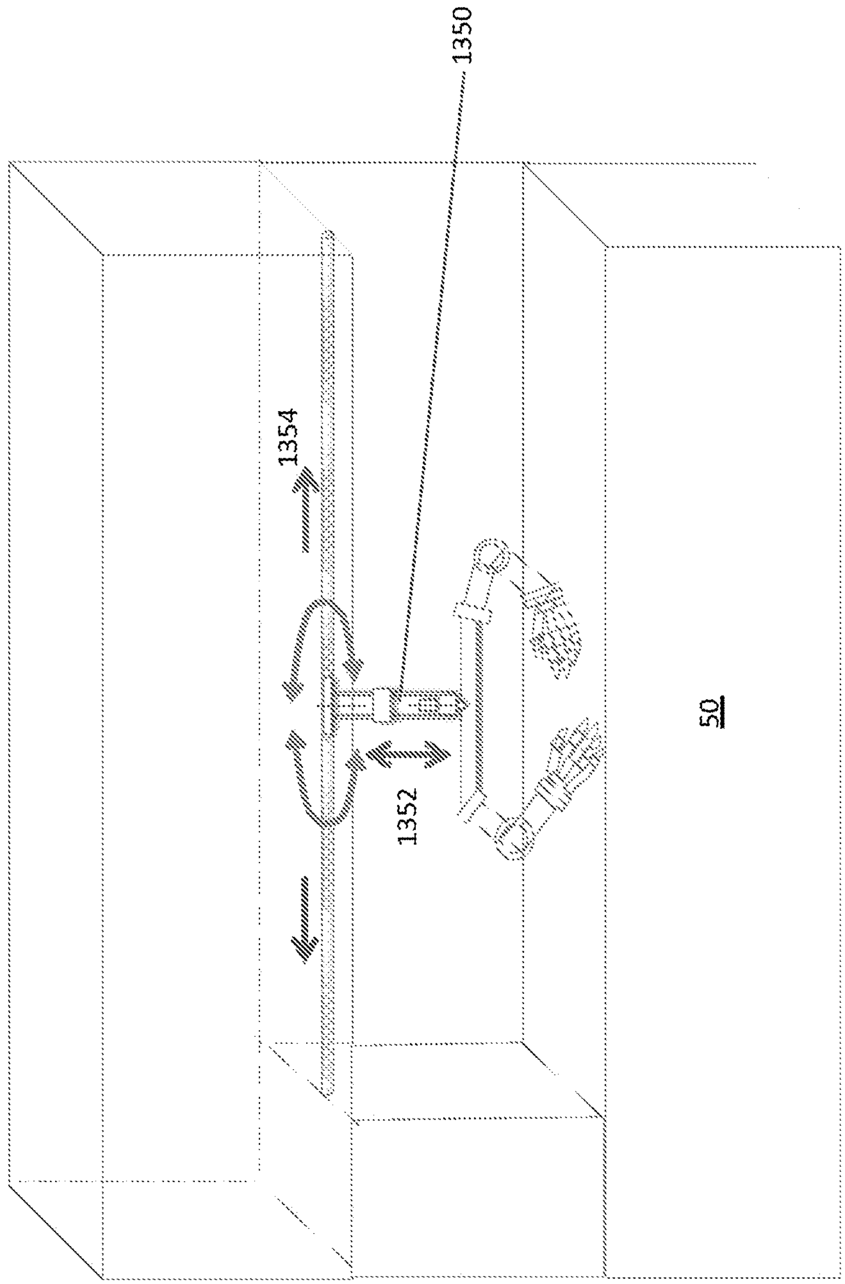
FIG. 45 is a block diagram illustrating the standardized robotic kitchen with a telescopic actuator in accordance with the present invention.

FIG. 45 depicts a perspective layout view of a telescopic lift (or "telescopic actuator" or "telescopic mast") 1350 in the standardized robotic kitchen 50 in which a pair of robotic arms, wrists and multi-fingered hands move as a unit on a prismatically (through linear staged extension) and telescopically actuated torso along the vertical y-axis 1352 and the horizontal x-axis 1354, as well as rotationally about the vertical y-axis running through the centerline of its own torso. Actuators (including for example, but not limited to, telescopic actuators or telescopic masts) are embedded in the torso and upper level to allow for these linear and rotary motions so as to allow the robotic arms to be moved to different places in the standardized robotic kitchen during all parts of the replication of the recipe spelled out in the recipe script. These multiple motions are necessary to be able to properly replicate the motions of a human chef 49 as observed in the chef studio kitchen setup during the creation of the dish when cooked by the human chef.

Figure 46A:
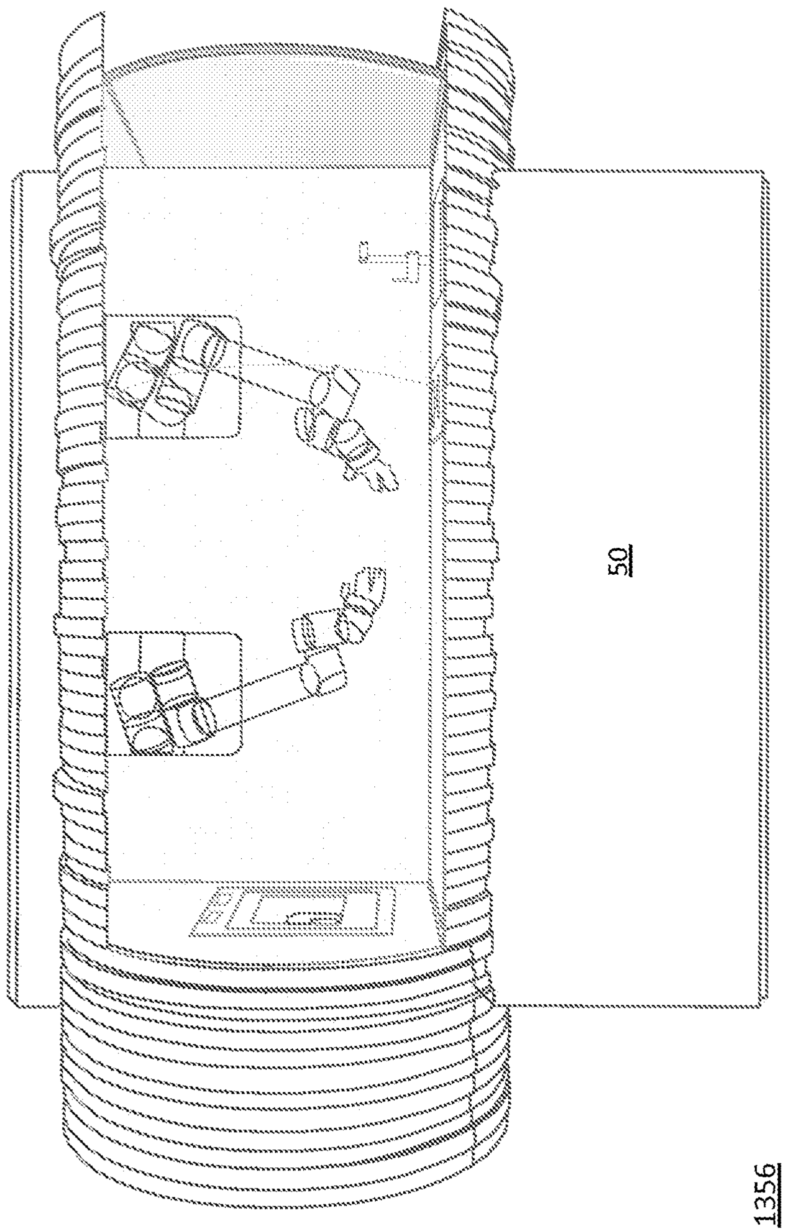
FIG. 46A is a block diagram illustrating a front view of the standardized robotic kitchen with a pair of fixed robotic arms with no moving railings in accordance with the present invention.

FIG. 46A depicts a plan view of one physical embodiment 1356 of the standardized robotic kitchen layout, where the kitchen is built into a more linear substantially rectangular horizontal layout depicting a set of dual robotic arms with wrists and multi-fingered hands, where each of the arm bases is mounted neither on a set of movable rails nor on a rotatable torso, but rather rigidly and unmovably mounted on one and the same of the robotic kitchen vertical surfaces, thereby defining and fixing the location and dimensions of the robotic torso, yet still allowing both robotic arms to work collaboratively and reach all areas of the cooking surfaces and equipment.

Figure 46B:
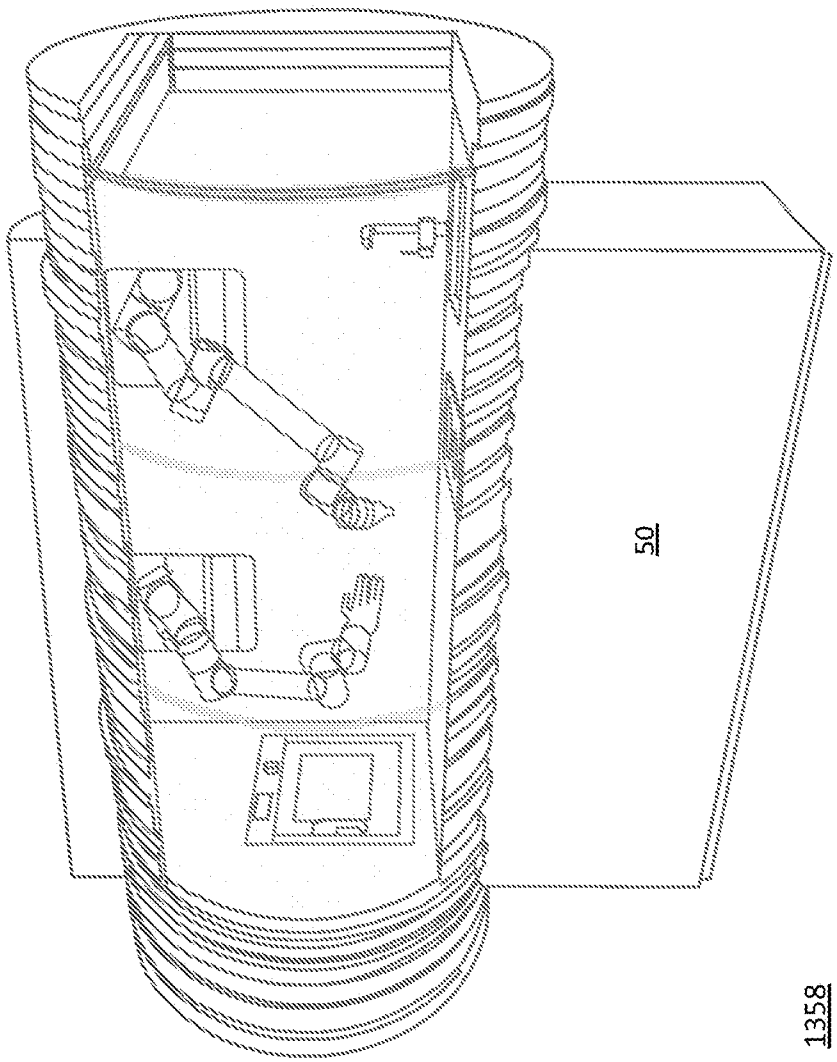
FIG. 46B is a block diagram illustrating an angular view of the standardized robotic kitchen with a pair of fixed robotic arms with no moving railings in accordance with the present invention.

FIG. 46B depicts a perspective view of one physical embodiment 1358 of the standardized robotic kitchen layout, where the kitchen is built into a more linear substantially rectangular horizontal layout depicting a set of dual robotic arms with wrists and multi-fingered hands, where each of the arm bases is not mounted neither on a set of movable rails nor on a rotatable torso, but rather rigidly and unmovably mounted on one and the same of the robotic kitchen vertical surfaces, thereby defining and fixing the location and dimensions of the robotic torso, yet still allowing both robotic arms to work collaboratively and reach all areas of the cooking surfaces and equipment (oven on back wall, cooktop beneath the robotic arms and sink to one side of the robotic arms).

Figure 46C:
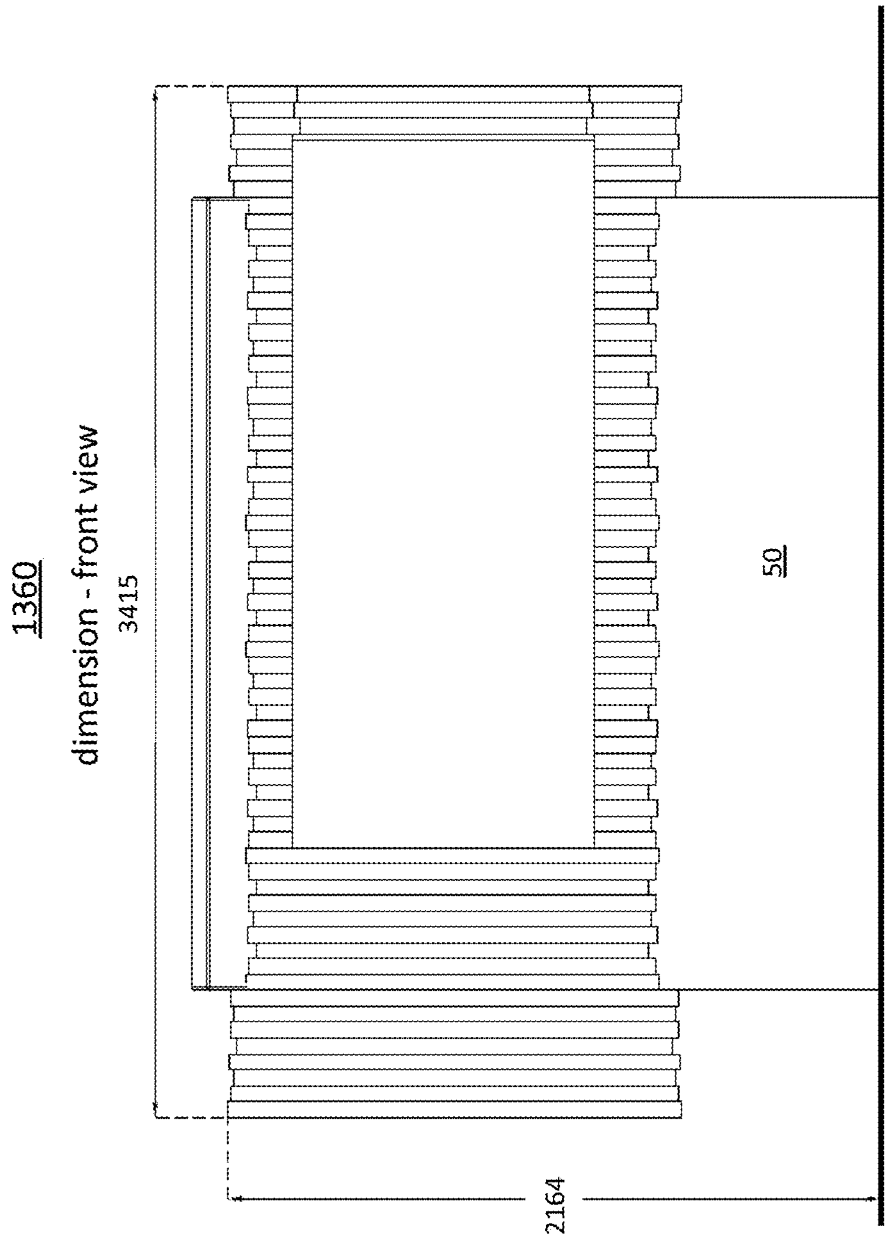
FIGS. 46C-G are block diagrams illustrating examples of various dimensions in the standardized robotic kitchen with a pair of fixed robotic arms with no moving railings in accordance with the present invention.

FIG. 46C depicts a dimensioned front view of one possible physical embodiment 1360 of the standardized robotic kitchen, denoting its height along the y-axis and width along the x-axis to be 2284 mm overall.

Figure 46D:
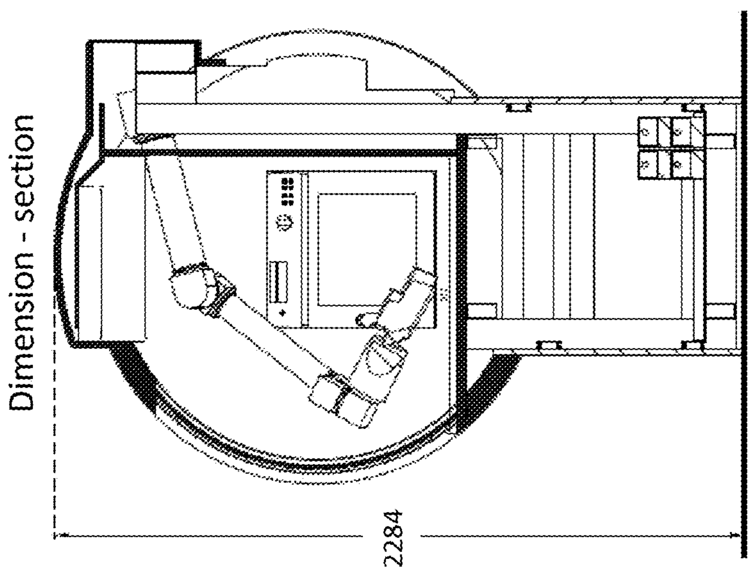

FIG. 46D depicts a dimensioned side section view of one possible physical embodiment 1362 of the standardized robotic kitchen, denoting its height along the y-axis to be 2164 mm and 3415 mm, respectively.

Figure 46E:
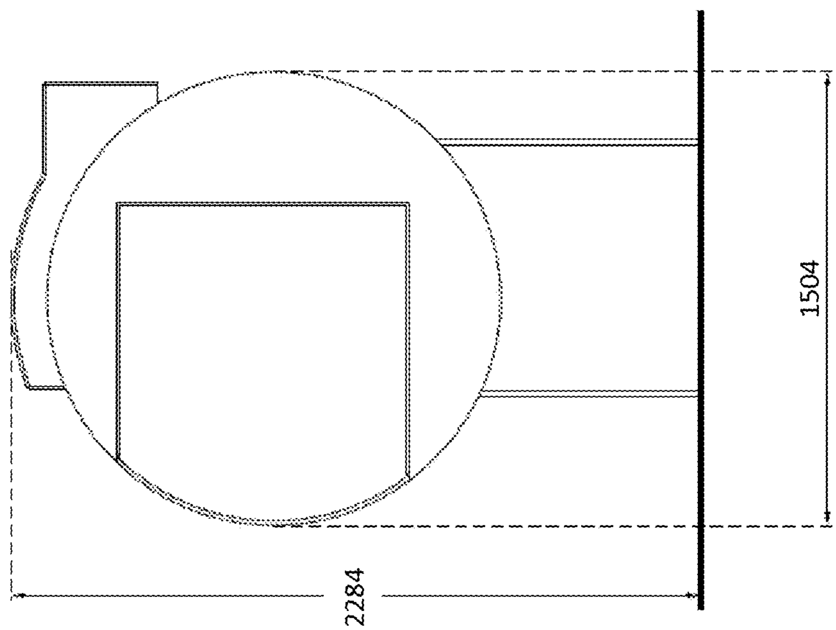

FIG. 46E depicts a dimensioned side view of one physical embodiment 1364 of the standardized robotic kitchen, denoting its height along the y-axis and depth along the z-axis to be 2284 mm and 1504 mm, respectively.

Figure 46F:
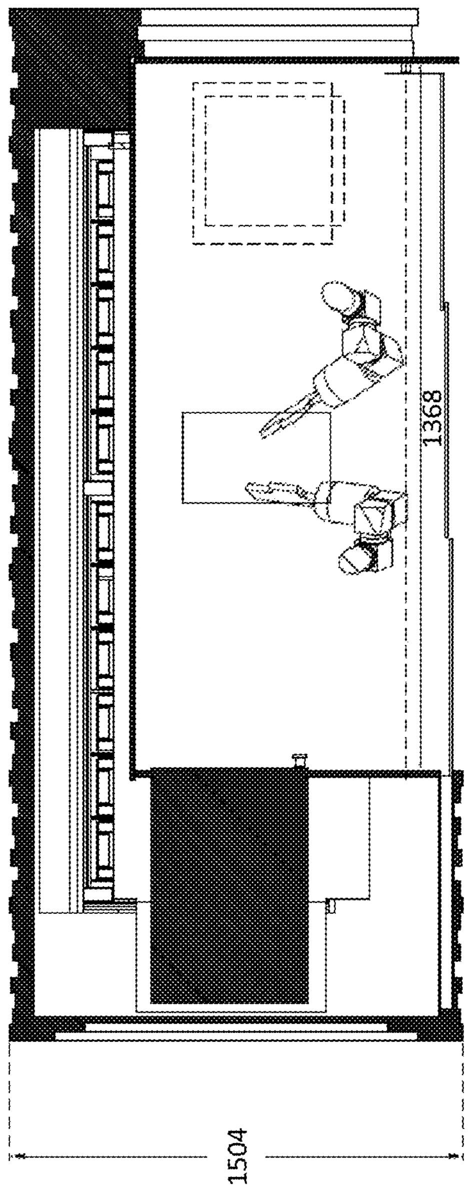

FIG. 46F depicts a dimensioned top section view of one physical embodiment 1366 of the standardized robotic kitchen, including a pair of robotic arms 1368, denoting the depth of the entire robotic kitchen module along the z-axis to be 1504 mm overall.

Figure 46G:
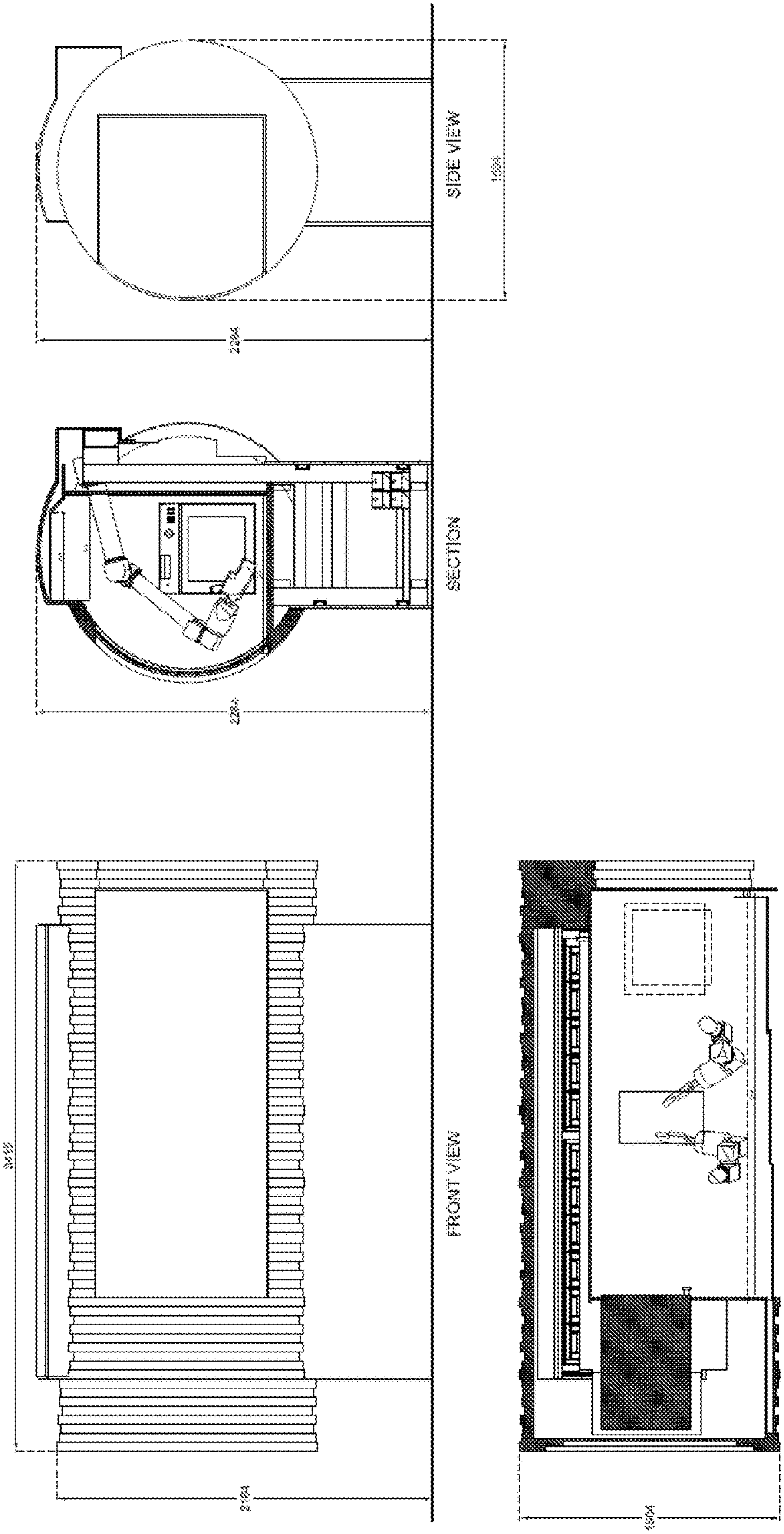

FIG. 46G depicts a three-view, augmented by a section-view, of one physical embodiment of the standardized robotic kitchen, showing the overall length along the x-axis to be 3415 mm, the overall height along the y-axis to be 2164 mm, and the overall depth along the z-axis to be 1504 mm, where the overall height in the sectional side-view indicates an overall height along the z-axis of 2284 mm.

Figure 47:
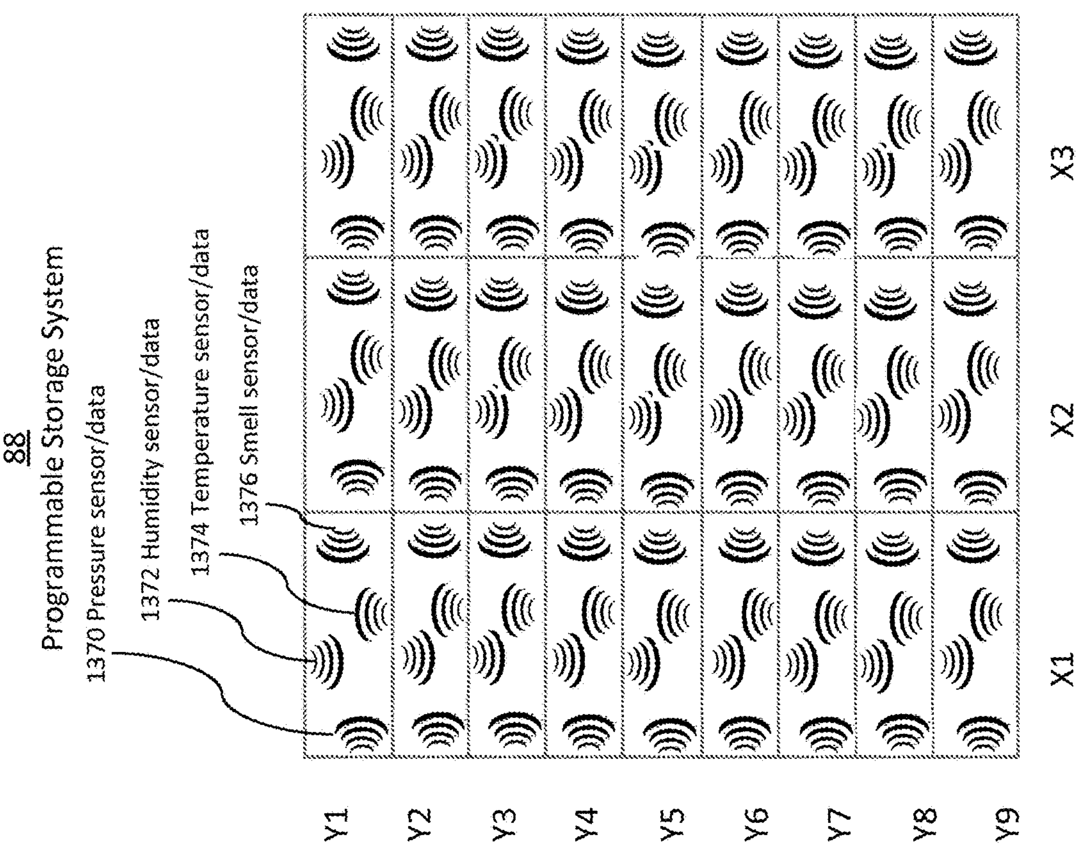
FIG. 47 is a block diagram illustrating a program storage system for use with the standardized robotic kitchen in accordance with the present invention.

FIG. 47 is a block diagram illustrating a programmable storage system 88 for use with the standardized robotic kitchen 50. The programmable storage system 88 is structured in the standardized robotic kitchen 50 based on the relative xy position coordinates within the storage system 88. In this example, the programmable storage system 88 has twenty seven (27; arranged in a 9×3 matrix) storage locations that have nine columns and three rows. The programmable storage system 88 can serve as the freezer location or the refrigeration location. In this embodiment, each of the twenty-seven programmable storage locations includes four types of sensors: a pressure sensor 1370, a humidity sensor 1372, a temperature sensor 1374, and a smell (olfactory) sensor 1376. With each storage location recognizable by its xy coordinates, the robotic apparatus is able to access a selected programmable storage location to obtain the necessary food item(s) in the location to prepare a dish. The computer 16 can also monitor each programmable storage location for the proper temperature, proper humidity, proper pressure, and proper smell profiles to ensure optimal storage conditions for particular food items or ingredients are monitored and maintained.

FIG. 48 depicts an elevation view of the container storage station 86, where temperature, humidity and relative oxygen content (and other room conditions) can be monitored and controlled by a computer. Included in this storage container unit can be, but it is not limited to, a pantry/dry storage area 1304, a ripening area 1298 with separately controllable temperature and humidity (for fruit/vegetables), of importance to wine, a chiller unit 1300 for lower temperature storage for produce/fruit/meats so as to optimize shelf life, and a freezer unit 1302 for long-term storage of other items (meats, baked goods, seafood, ice cream, etc.).

Figure 49:
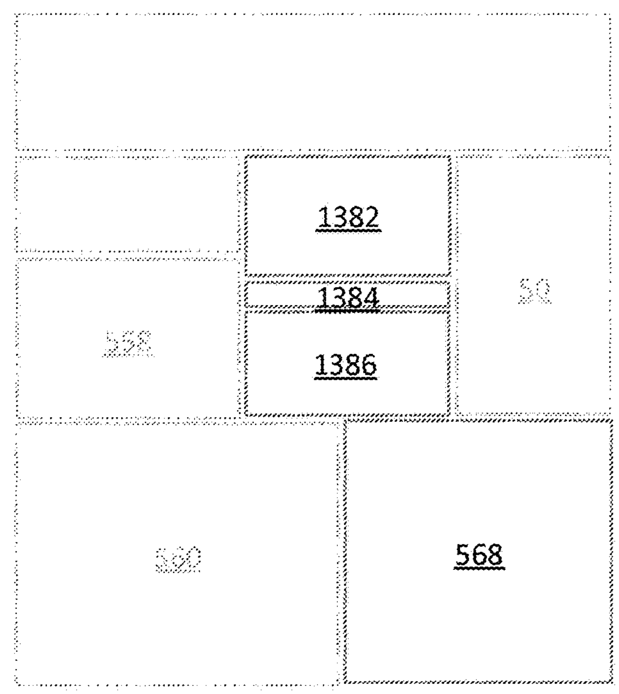
FIG. 49 is a block diagram illustrating an elevation view of ingredient access containers for use with the standardized robotic kitchen in accordance with the present invention.

FIG. 49 depicts an elevation view of ingredient containers 1380 to be accessed by a human chef and the robotic arms and multi-fingered hands. This section of the standardized robotic kitchen includes, but is not necessarily limited to, multiple units including an ingredient quality monitoring dashboard (display) 1382, a computerized measurement unit 1384, which includes a barcode scanner, camera and scale, a separate countertop 1386 with automated rack-shelving for ingredient check-in and check-out, and a recycling unit 1388 for disposal of recyclable hard (glass, aluminum, metals, etc.) and soft goods (food rests and scraps, etc.) suitable for recycling.

FIG. 50 depicts the ingredient quality-monitoring dashboard 1390, which is a computer-controlled display for use by the human chef. The display allows the user to view multiple items of importance to the ingredient-supply and ingredient-quality aspect of human and robotic cooking. These include the display of the ingredient inventory overview 1392 outlining what is available, the individual ingredient selected and its nutritional content and relative distribution 1394, the amount and dedicated storage as a function of storage category 1396 (meats, vegetables, etc.), a schedule 1398 depicting pending expiry dates and fulfillment/replenishment dates and items, an area for any kinds of alerts 1400 (sensed spoilage, abnormal temperatures or malfunctions, etc.), and the option of voice-interpreter command input 1402, to allow the human user to interact with the computerized inventory system by way of the dashboard 1390.

FIG. 51 is a table illustrating one example of a library database 1410 of recipe parameters. The library database 1410 of recipe parameters includes many categories: a meal grouping profile 1402, types of cuisine 1404, a media library 1406, recipe data 1408, robotic kitchen tools and equipment 1410, ingredient groupings 1412, ingredient data 1414, and cooking techniques 1416. Each of these categories provides a listing of the detailed choices that are available in selecting a recipe. The meal group profile includes parameters like age, gender, weight, allergy, medication and lifestyle. The types of cuisine group profile 1404 include cuisine type by region, culture, or religion, and the types of cooking equipment group profile 1410 include items such as pan, grill, or oven and the cooking duration time. The recipe data grouping profile 1408 contains such items as the recipe name, version, cooking and preparation time, tools and appliances needed, etc. The ingredient grouping profile 1412 contains ingredients grouped into items such as dairy products, fruit and vegetables, grains and other carbohydrates, fluids of various types, and protein of various kinds (meats, beans), etc. The ingredient data group profile 1414 contains ingredient descriptor data such as the name, description, nutritional information, storage and handling instructions, etc. The cooking techniques group profile 1416 contains information on specific cooking techniques grouped into such areas as mechanical techniques (basting, chopping, grating, mincing, etc.) and chemical processing techniques (marinating, pickling, fermenting, smoking, etc.).

Figure 52:
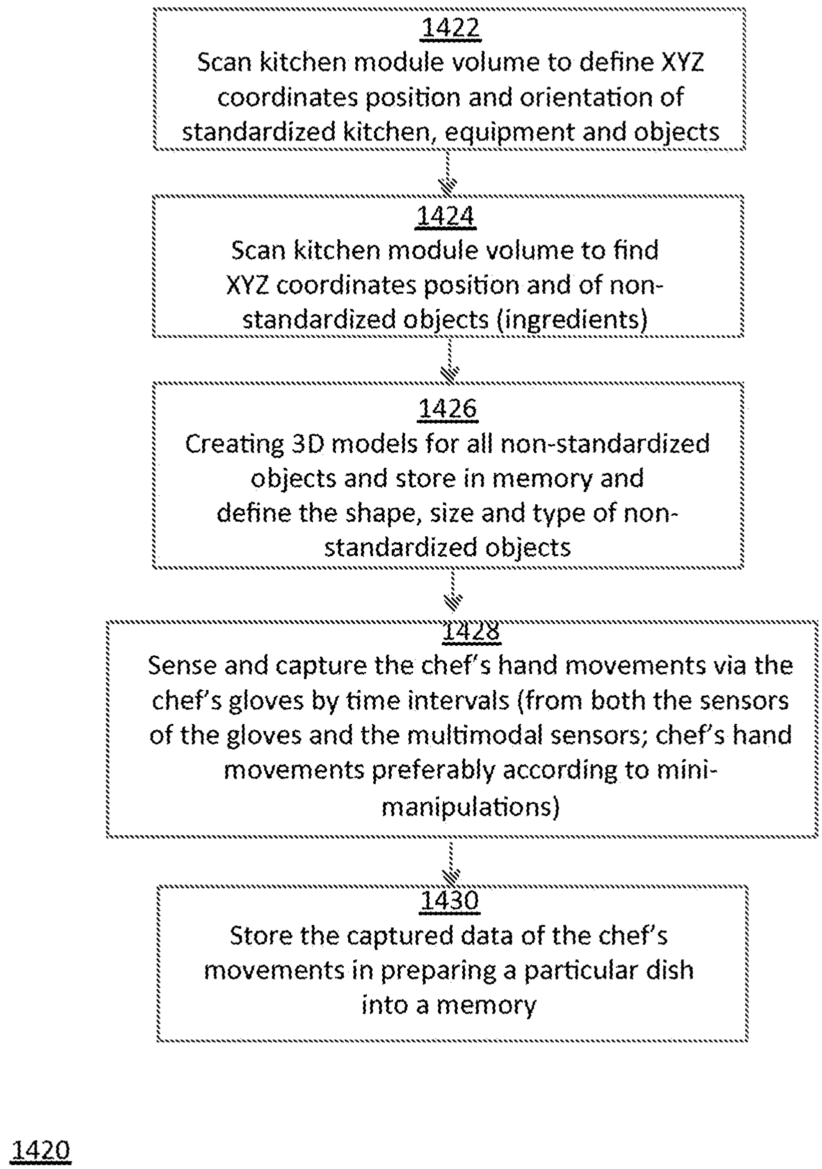
FIG. 52 is a flow diagram illustrating the process of one embodiment of recording a chef's food preparation process in accordance with the present invention.

FIG. 52 is a flow diagram illustrating one embodiment of the process 1420 of one embodiment of recording a chef's food preparation process. At step 1422 in the chef studio 44, the multimodal three-dimensional sensors 20 scan the kitchen module volume to define xyz coordinates position and orientation of the standardized kitchen equipment and all objects therein, whether static or dynamic. At step 1424, the multimodal three-dimensional sensors 20 scan the kitchen module's volume to find xyz coordinates position of non-standardized objects, such as ingredients. At step 1426, the computer 16 creates three-dimensional models for all non-standardized objects and stores their type and attributes (size, dimensions, usage, etc.) in the computer's system memory, either on a computing device or on a cloud computing environment, and defines the shape, size and type of the non-standardized objects. At step 1428, the chef movements recording module 98 is configured to sense and capture the chef's arm, wrist and hand movements via the chef's gloves in successive time intervals (chef's hand movements preferably identified and classified according to standard mini-manipulations). At step 1430, the computer 16 stores the sensed and captured data of the chef's movements in preparing a food dish into a computer's memory storage device(s).

Figure 53:
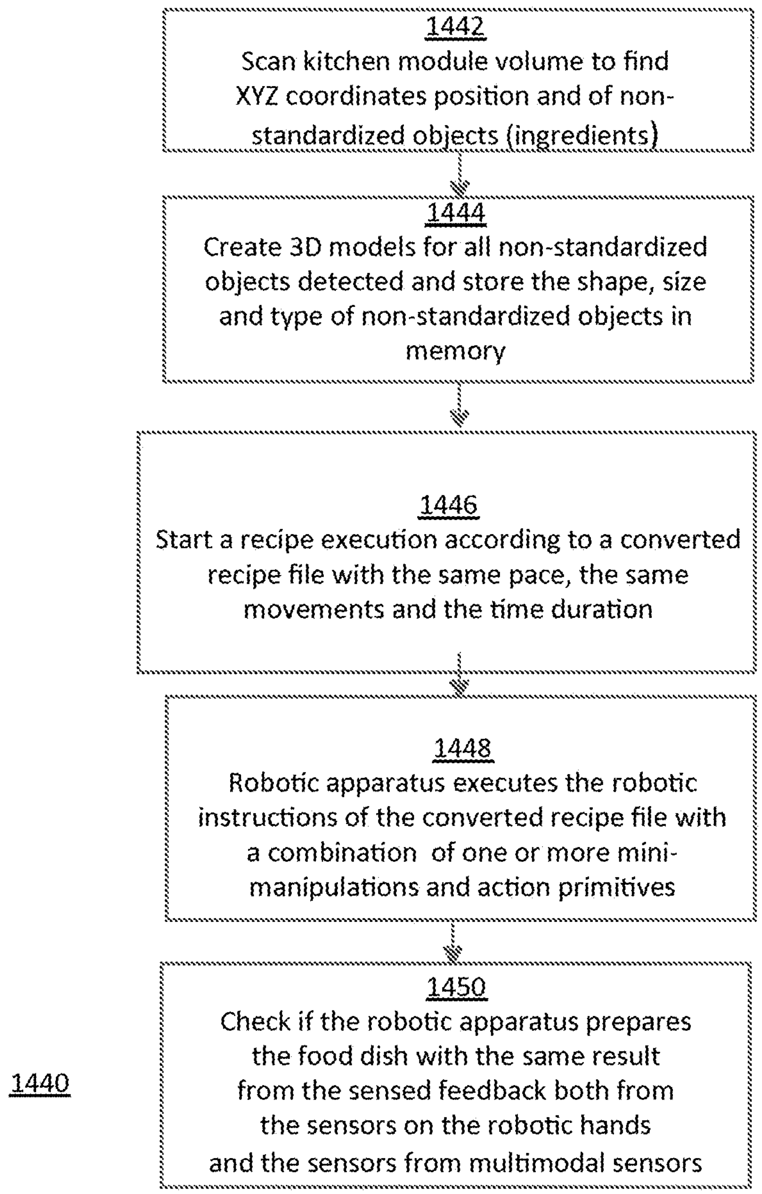
FIG. 53 is a flow diagram illustrating the process of one embodiment of a robotic apparatus preparing a food dish in accordance with the present invention.

FIG. 53 is a flow diagram illustrating one embodiment of the process 1440 of one embodiment of a robotic apparatus preparing a food dish. At step 1442, the multimodal three-dimensional sensors 20 in the robotic kitchen 48 scan the kitchen module's volume to find xyz position coordinates of non-standardized objects (ingredients, etc.). At step 1444, the multimodal three-dimensional sensors 20 in the robotic kitchen 48 create three-dimensional models for non-standardized objects detected in the standardized robotic kitchen 50 and store the shape, size and type of non-standardized objects in the computer's memory. At step 1446, the robotic cooking module 110 starts a recipe's execution according to a converted recipe file by replicating the chef's food preparation process with the same pace, with the same movements, and with similar time duration. At step 1448, the robotic apparatus executes the robotic instructions of the converted recipe file with a combination of one or more mini-manipulations and action primitives, thereby resulting in the robotic apparatus in the robotic standardized kitchen preparing the food dish with the same result or substantially the same result as if the chef 49 had prepared the food dish himself or herself.

Figure 54:
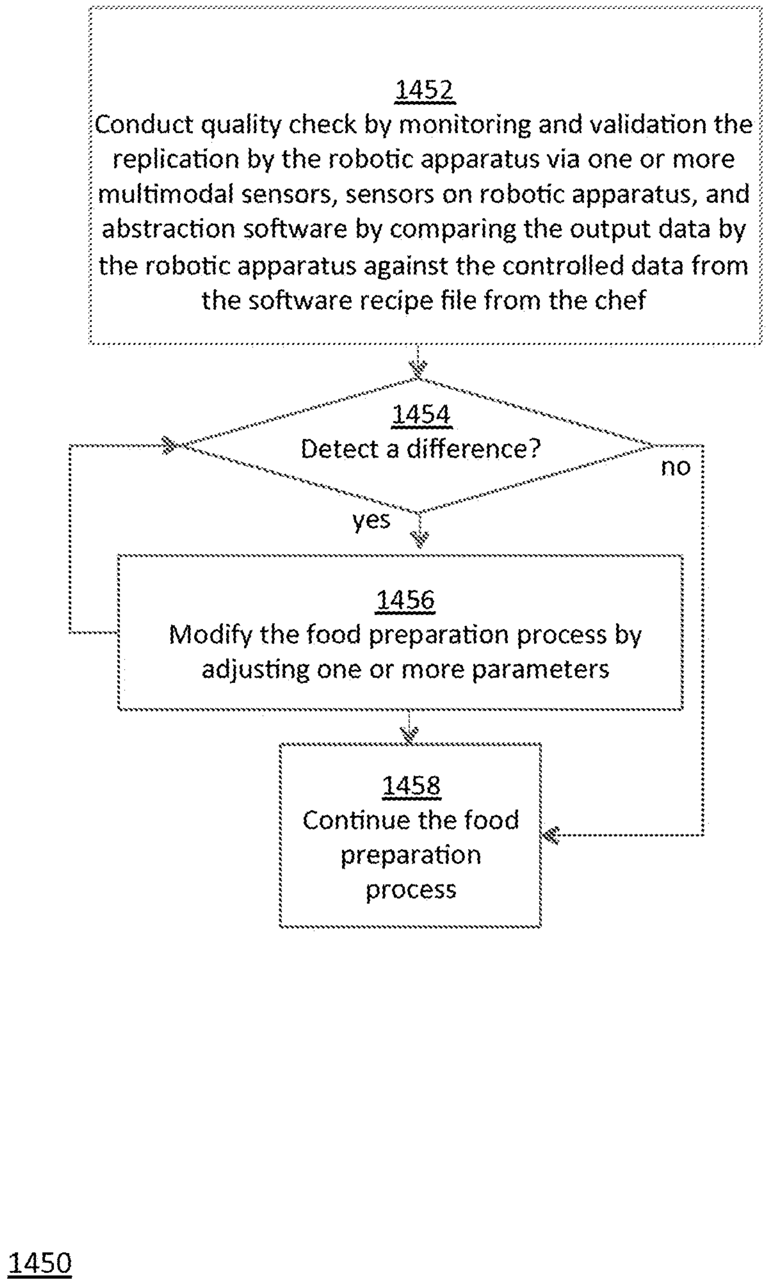
FIG. 54 is a flow diagram illustrating the process of one embodiment in the quality and function adjustment in obtaining the same or substantially the same result in a food dish preparation by a robotic relative to a chef in accordance with the present invention.

FIG. 54 is a flow diagram illustrating the process of one embodiment in the quality and function adjustment 1450 in obtaining the same or substantially the same result in a food dish preparation by a robotic relative to a chef. At step 1452, the quality check module 56 is configured to conduct a quality check by monitoring and validating the recipe replication process by the robotic apparatus via one or more multimodal sensors, sensors on the robotic apparatus, and using abstraction software to compare the output data from the robotic apparatus against the controlled data from the software recipe file created by monitoring and abstracting the cooking processes carried out by the human chef in the chef studio version of the standardized robotic kitchen while executing the same recipe. In step 1454, the robotic food preparation engine 56 is configured to detect and determine any difference(s) that would require the robotic apparatus to make an adjustment to the food preparation process, such as at least monitoring for the difference in the size, shape, or orientation of an ingredient. If there is a difference, the robotic food preparation engine 56 is configured to modify the food preparation process by adjusting one or more parameters for that particular food dish processing step based on the raw and processed sensory input data. A determination for acting on a potential difference between the sensed and abstracted process progress compared to the stored process variables in the recipe script is made in step 1454. If the process results of the cooking process in the standardized robotic kitchen are identical to those spelled out in the recipe script for the process step, the food preparation process continues as described in the recipe script. Should a modification or adaptation to the process be required based on raw and processed sensory input data, the adaptation process 1556 is carried out by adjusting any parameters needed to ensure the process variables are brought into compliance with those prescribed in the recipe script for that process step. Upon successful conclusion of the adaptation process 1456, the food preparation process 1458 resumes as specified in the recipe script sequence.

Figure 55:
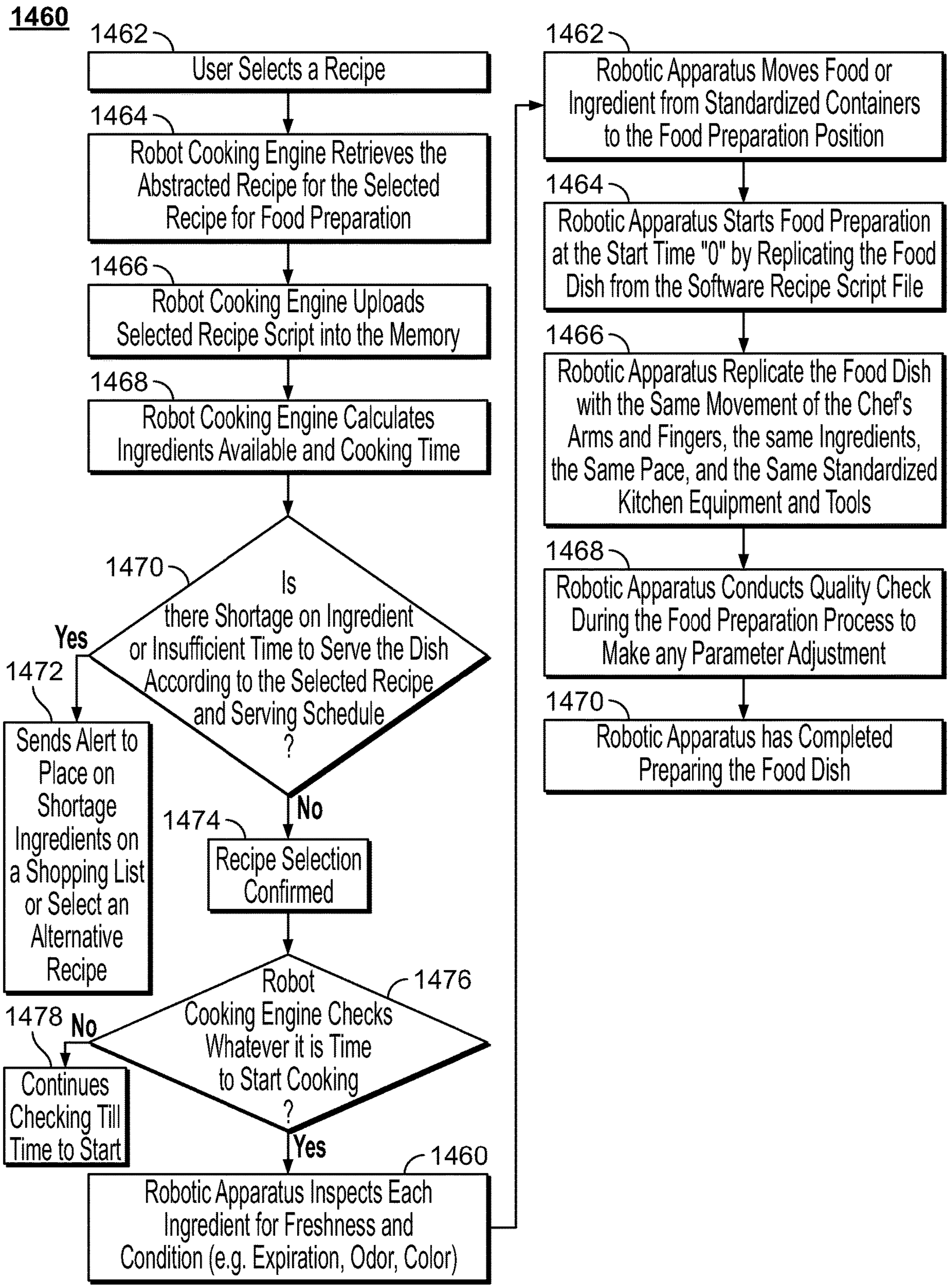
FIG. 55 is a flow diagram illustrating a first embodiment in the process of the robotic kitchen preparing a dish by replicating a chef's movements from a recorded software file in a robotic kitchen in accordance with the present invention.

FIG. 55 depicts a flow diagram illustrating a first embodiment in the process 1460 of the robotic kitchen preparing a dish by replicating a chef's movements from a recorded software file in a robotic kitchen. In step 1462, a user, through a computer, selects a particular recipe for the robotic apparatus to prepare the food dish. In step 1464, the robotic food preparation engine 56 is configured to retrieve the abstracted recipe for the selected recipe for food preparation. In step 1468, the robotic food preparation engine 56 is configured to upload the selected recipe script into the computer's memory. In step 1470, the robotic food preparation engine 56 calculates the ingredient availability and the required cooking time. In step 1472, the robotic food preparation engine 56 is configured to raise an alert or notification if there is a shortage of ingredients or insufficient time to prepare the dish according to the selected recipe and serving schedule. The robotic food preparation engine 56 sends an alert to place missing or insufficient ingredients on a shopping list or selects an alternate recipe in step 1472. The recipe selection by the user is confirmed in step 1474. In step 1476, the robotic food preparation engine 1476 is configured to check whether it is time to start preparing the recipe. The process 1460 pauses until the start time has arrived in step 1476. In step 1460, the robotic apparatus inspects each ingredient for freshness and condition (e.g. purchase date, expiration date, odor, color). In step 1462, robotic food preparation engine 56 is configured to send instructions to the robotic apparatus to move food or ingredients from standardized containers to the food preparation position. In step 1464, the robotic food preparation engine 56 is configured to instruct the robotic apparatus to start food preparation at the start time "0" by replicating the food dish from the software recipe script file. In step 1466, the robotic apparatus in the standardized kitchen 50 replicates the food dish with the same movement as the chef's arms and fingers, the same ingredients, with the same pace, and using the same standardized kitchen equipment and tools. The robotic apparatus in step 1468 conducts quality checks during the food preparation process to make any necessary parameter adjustment. In step 1470, the robotic apparatus has completed replication and preparation of the food dish, and therefore is ready to plate and serve the food dish.

Figure 56:
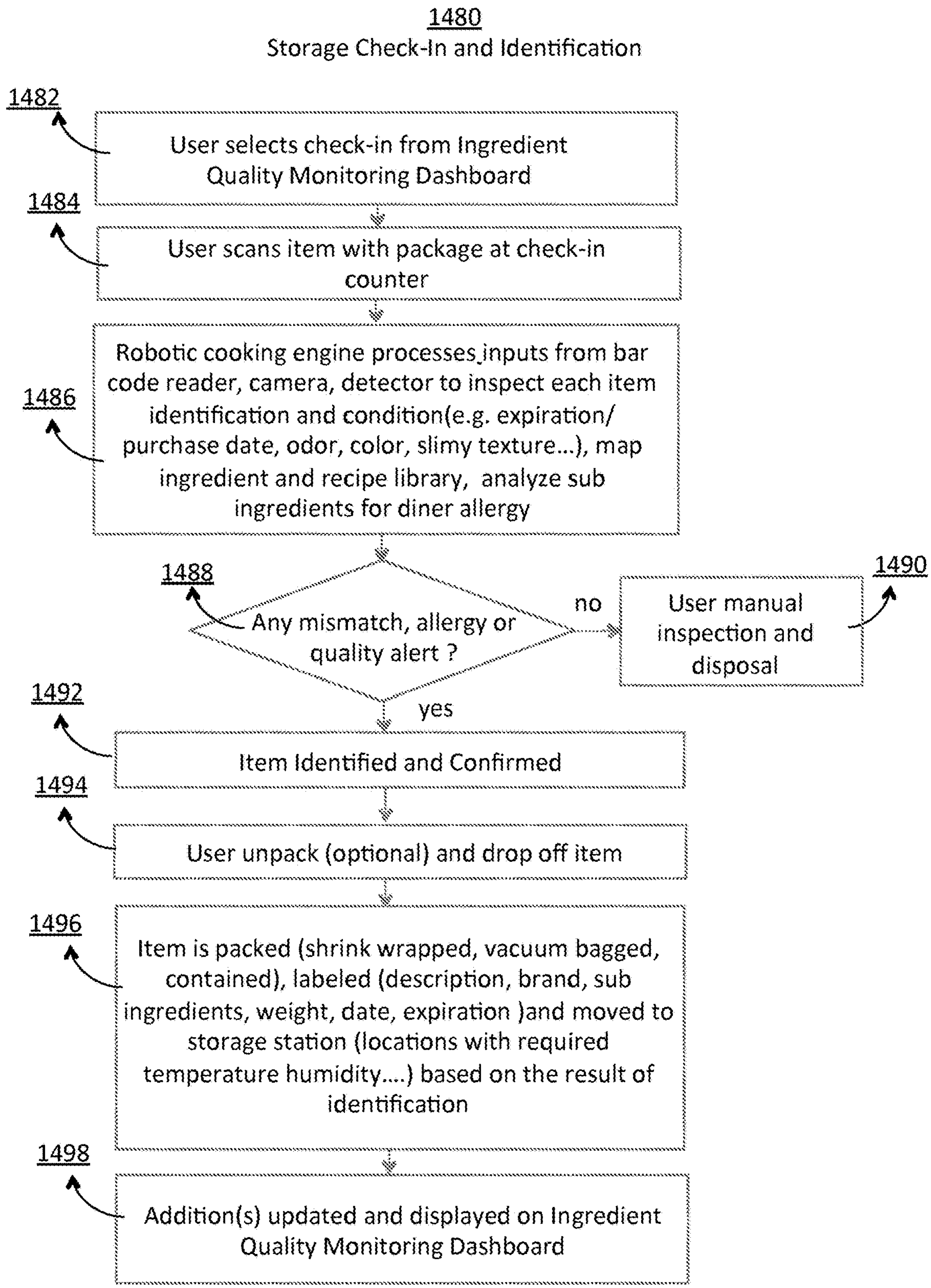
FIG. 56 is a flow diagram illustrating the process of storage check-in and identification in the robotic kitchen in accordance with the present invention.

FIG. 56 depicts the process of storage container check-in and identification 1480. Using the quality-monitoring dashboard, the user selects to check in an ingredient in step 1482. In step 1484 the user then scans the ingredient package at the check-in station or counter. Using additional data from the bar code scanner, weighing scales, camera and laser-scanners, the robotic cooking engine processes the ingredient-specific data and maps the same to its ingredient and recipe library and analyzes it for any potential allergic impact in step 1486. Should an allergic potential exist based on step 1488, the system in step 1490 decides to notify the user and dispose of the ingredient for safety reasons. Should the ingredient be deemed acceptable, it is logged and confirmed by the system in step 1492. The user may in step 1494 unpack (if not unpacked already) and drop off the item. In the succeeding step 1496, the item is packed (foil, vacuum bag, etc.), labeled with a computer-printed label with all necessary ingredient data printed thereon, and moved to a storage container and/or storage location based on the results of the identification. At step 1498, the robotic cooking engine then updates its internal database and displays the available ingredient in its quality-monitoring dashboard.

Figure 57:
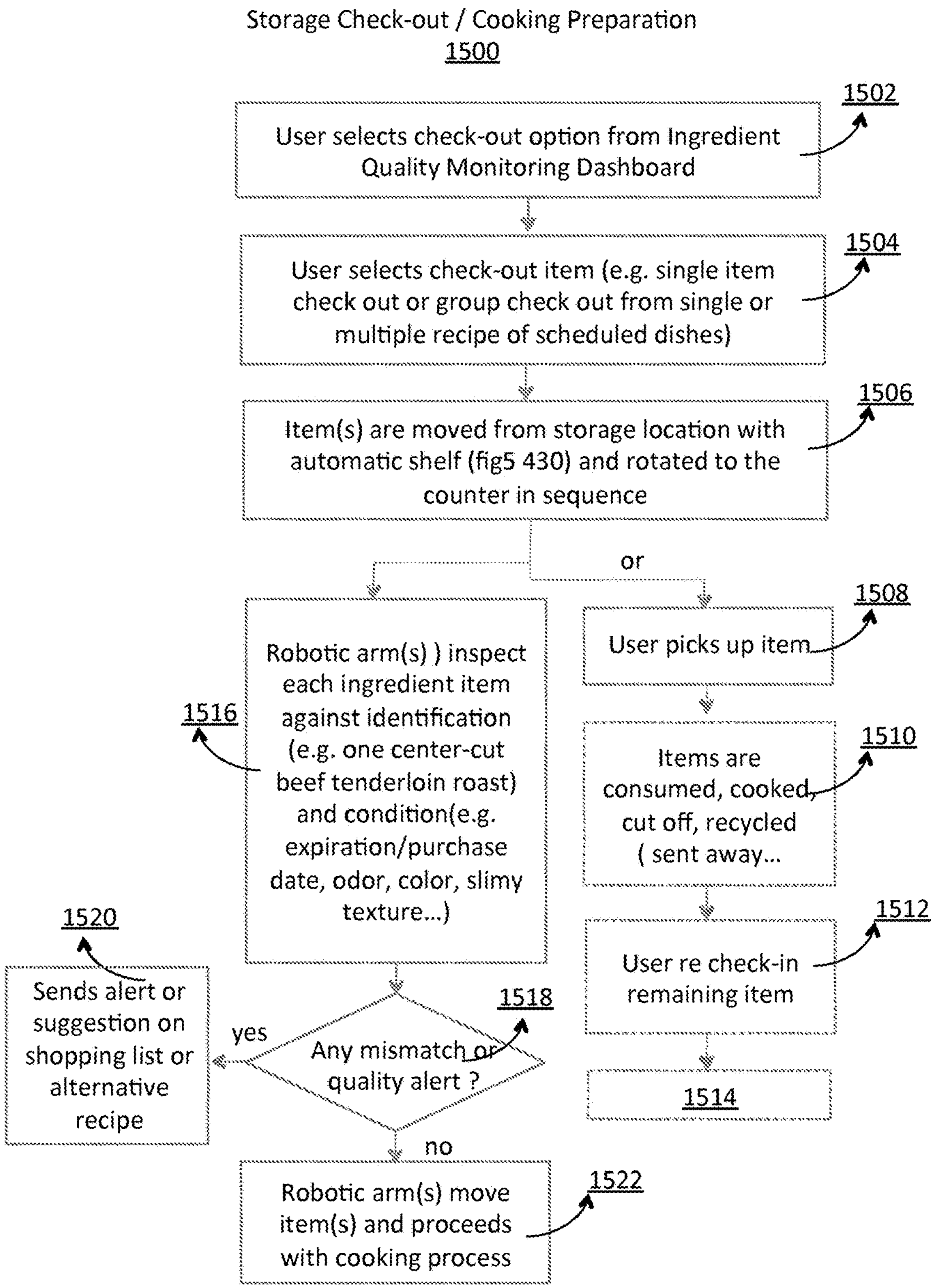
FIG. 57 is a flow diagram illustrating the process of storage check-out and cooking preparation in the robotic kitchen in accordance with the present invention.

FIG. 57 depicts an ingredient's check-out from storage and cooking preparation process 1500. In the first step 1502, the user selects to check out an ingredient using the quality-monitoring dashboard. In step 1504 the user selects an item to check out based on a single item needed for one or more recipes. The computerized kitchen then acts in step 1506 to move the specific container containing the selected item from its storage location to the counter area. In case the user picks up the item in step 1508, the user processes the item in step 1510 in one or more of many possible ways (cooking, disposal, recycling, etc.), with any remaining item(s) rechecked back into the system in step 1512, which then concludes the user's interactions with the system 1514. In the case that the robotic arms in a standardized robotic kitchen receive the retrieved ingredient item(s), step 1516 is executed in which the arms and hands inspect each ingredient item in the container against their identification data (type, etc.) and condition (expiration date, color, odor, etc.). In a quality-check step 1518, the robotic cooking engine makes a decision on a potential item mismatch or detected quality condition. In case the item is not appropriate, step 1520 causes an alert to be raised to the cooking engine to follow-up with an appropriate action. Should the ingredient be of acceptable type and quality, the robotic arms move the item(s) to be used in the next cooking process stage in step 1522.

Figure 58:
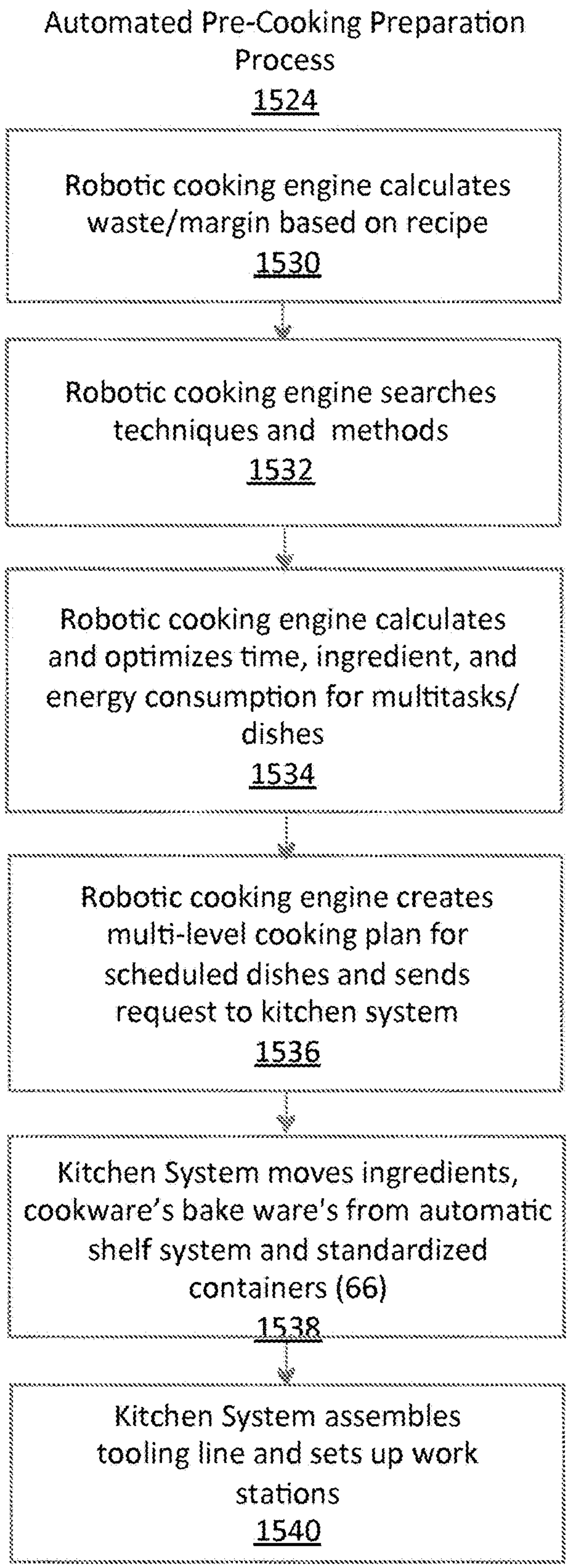
FIG. 58 is a flow diagram illustrating one embodiment of an automated pre-cooking preparation process in the robotic kitchen in accordance with the present invention.

FIG. 58 depicts the automated pre-cooking preparation process 1524. In step 1530 the robotic cooking engine calculates the margin and/or wasted ingredient materials based on a particular recipe. Subsequently in step 1532, the robotic cooking engine searches all possible techniques and methods for execution of the recipe with each ingredient. In step 1534 the robotic cooking engine calculates and optimizes the ingredient usage and methods for time and energy consumption, particularly for dish(es) requiring parallel multi-task processes. The robotic cooking engine then creates a multi-level cooking plan 1536 for the scheduled dishes and sends the request for cooking execution to the robotic kitchen system. In the next step 1538, the robotic kitchen system moves the ingredients, cooking/baking ware needed for the cooking processes from its automated shelving system and assembles the tools and equipment and sets up the various work stations in step 1540.

Figure 59:
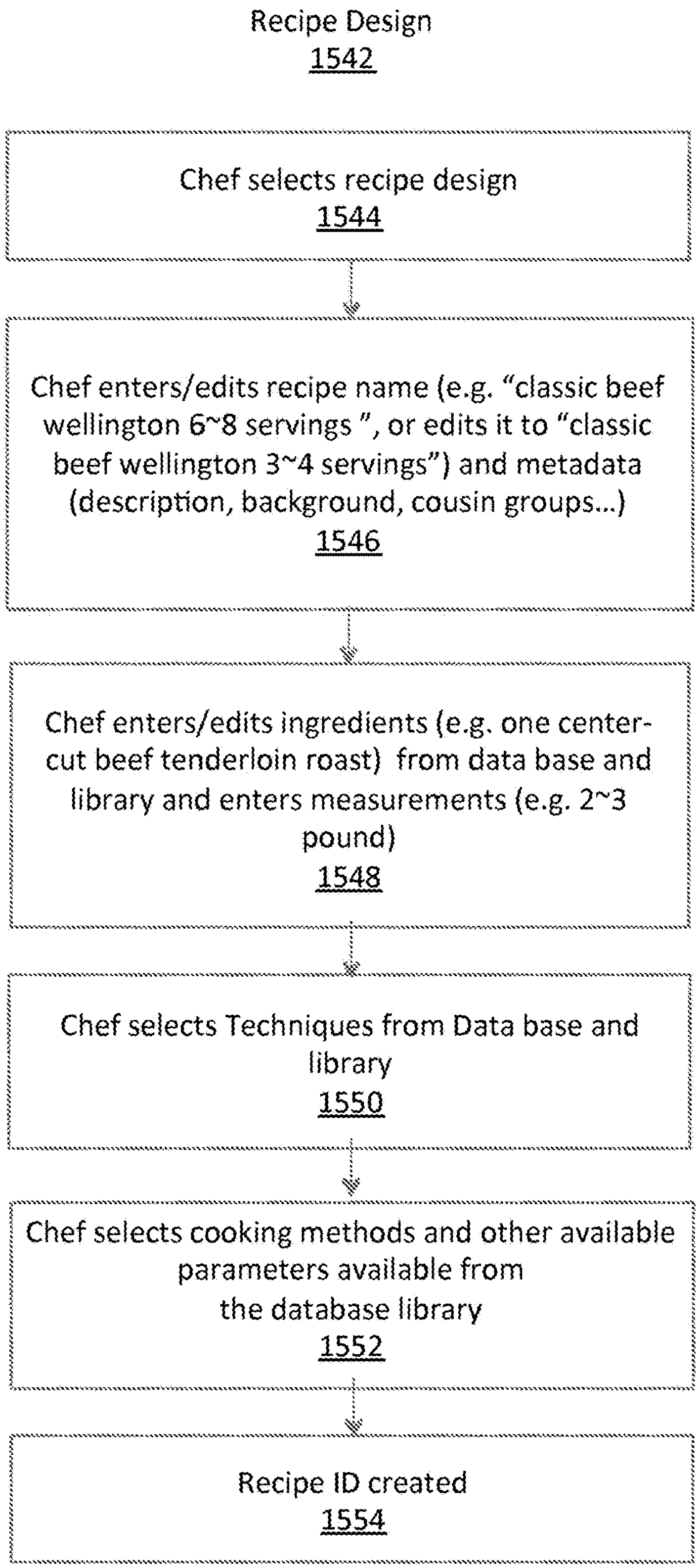
FIG. 59 is a flow diagram illustrating one embodiment of a recipe design and scripting process in the robotic kitchen in accordance with the present invention.

FIG. 59 depicts the recipe design and scripting process 1542. As a first step 1544, the chef selects a particular recipe, for which he then enters or edits the recipe data in step 1546, including, but not limited to, the name and other metadata (background, techniques, etc.). In step 1548 the chef enters or edits the necessary ingredients based on the database and associated libraries and enters the respective amounts by weight/volume/units required for the recipe. A selection of the necessary techniques utilized in the preparation of the recipe is made in step 1550 by the chef, based on those available in the database and the associated libraries. In step 1552 the chef performs a similar selection, but this time he or she is focused on the choice of cooking and preparation methods required to execute the recipe for the dish. The concluding step 1554 then allows the system to create a recipe ID which will be useful for later database storage and retrieval.

Figure 60:
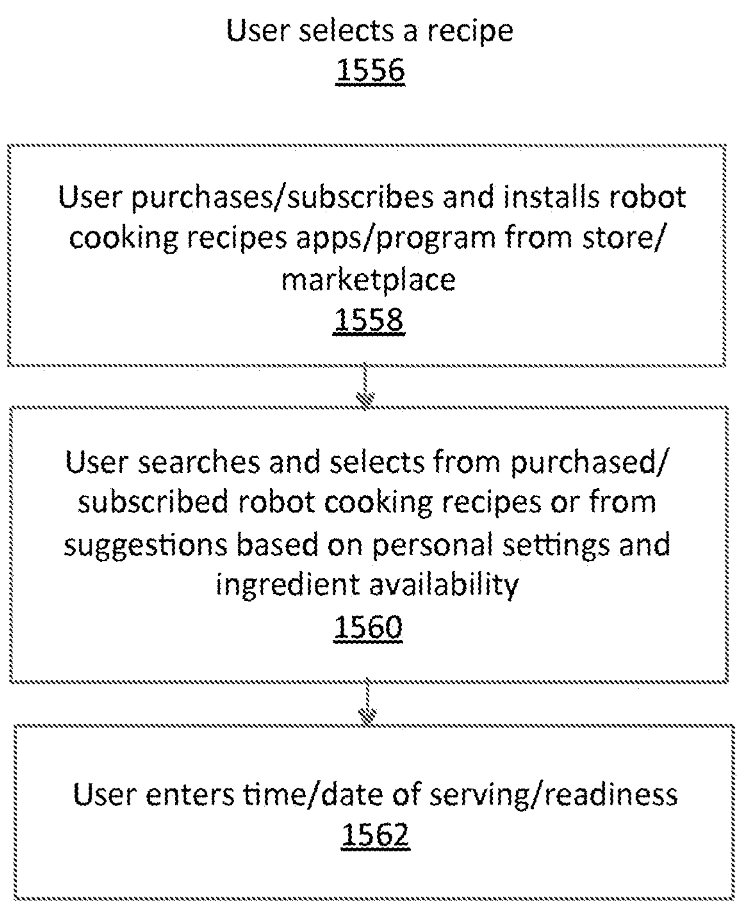
FIG. 60 is a flow diagram illustrating a subscription model for the user to purchase the robotic food preparation recipe in accordance with the present invention.

FIG. 60 depicts the process 1556 of how a user might select a recipe. The first step 1558 entails the user purchasing a recipe or subscribing to a recipe-purchase plan from an online marketplace store by way of a computer or mobile application, thereby enabling a download of a recipe script capable of being replicated. In step 1560 the user searches the online database and selects a particular recipe from those purchased or available as part of a subscription, based on personal preference settings and on-site ingredient availability. As a last step 1562, the user enters the time and date when he/she would like the dish to be ready for serving.

Figure 61A:
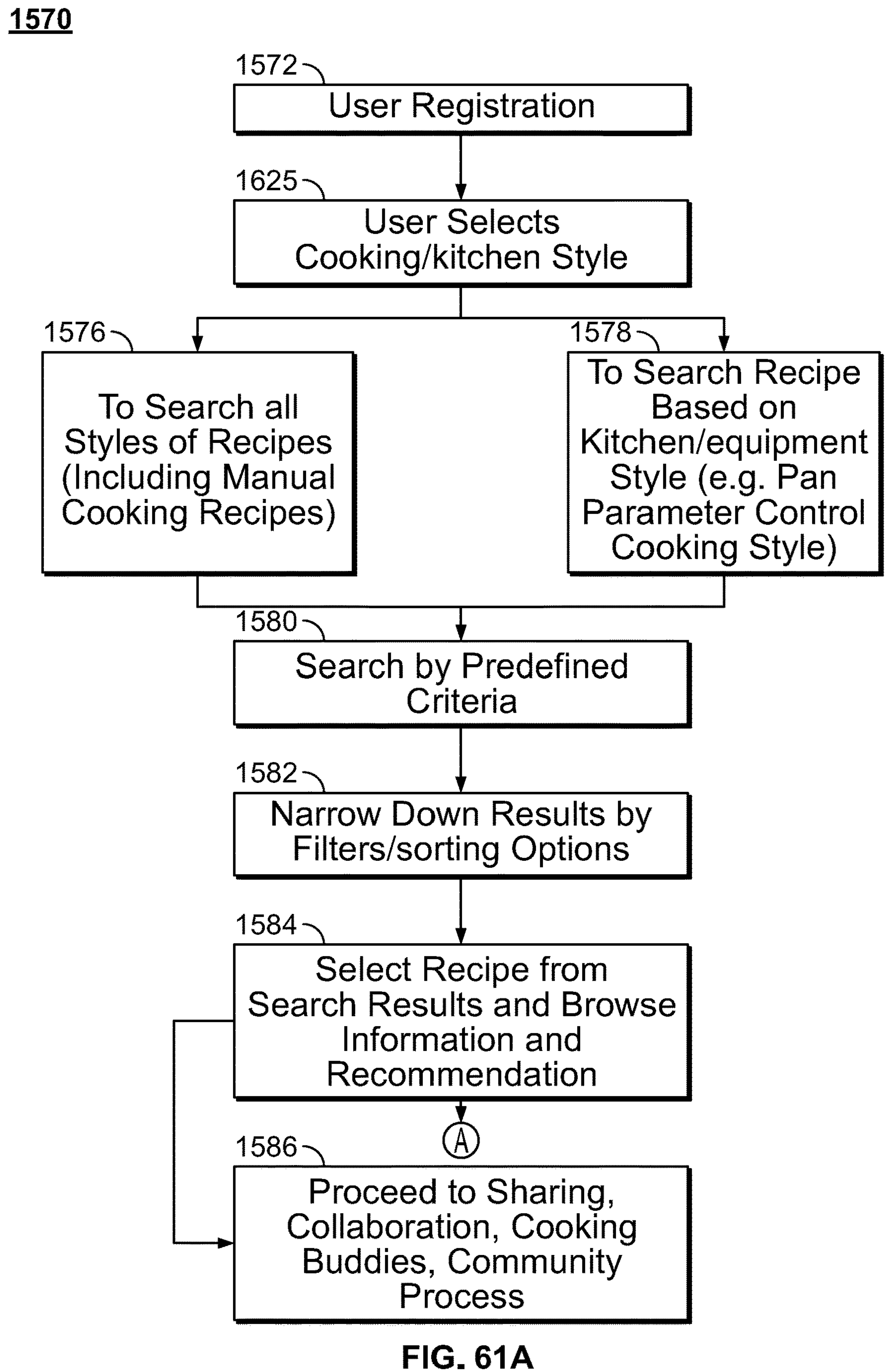
FIGS. 61A-B are flow diagrams illustrating the process of a recipe search and purchase subscription for a recipe commerce platform from a portal in accordance with the present invention.

FIG. 61A depicts the process 1570 for the recipe search and purchase and/or subscription process of an online service portal, or so termed recipe commerce platform. As a first step a new user has to register with the system in step 1572 (selecting age, gender, dining preferences, etc., followed by an overall preferred cooking or kitchen style) before a user can search and browse recipes by downloading them via an app on a handheld device or using a TV and/or robotic kitchen module. A user may choose at step 1574 to search using criteria such as style of recipes 1576 (including manually cooked recipes) or based on the particular kitchen or equipment style 1578 (wok, steamer, smoker, etc.). The user can select or set the search to use predefined criteria in step 1580, and using a filtering step 1582 to narrow down the search space and ensuing results. In step 1584 the user selects the recipe from the offered search results, information and recommendation. The user may choose to then share, collaborate or confer with cooking buddies or the community online about the choice and next steps in step 1586.

Figure 61B:
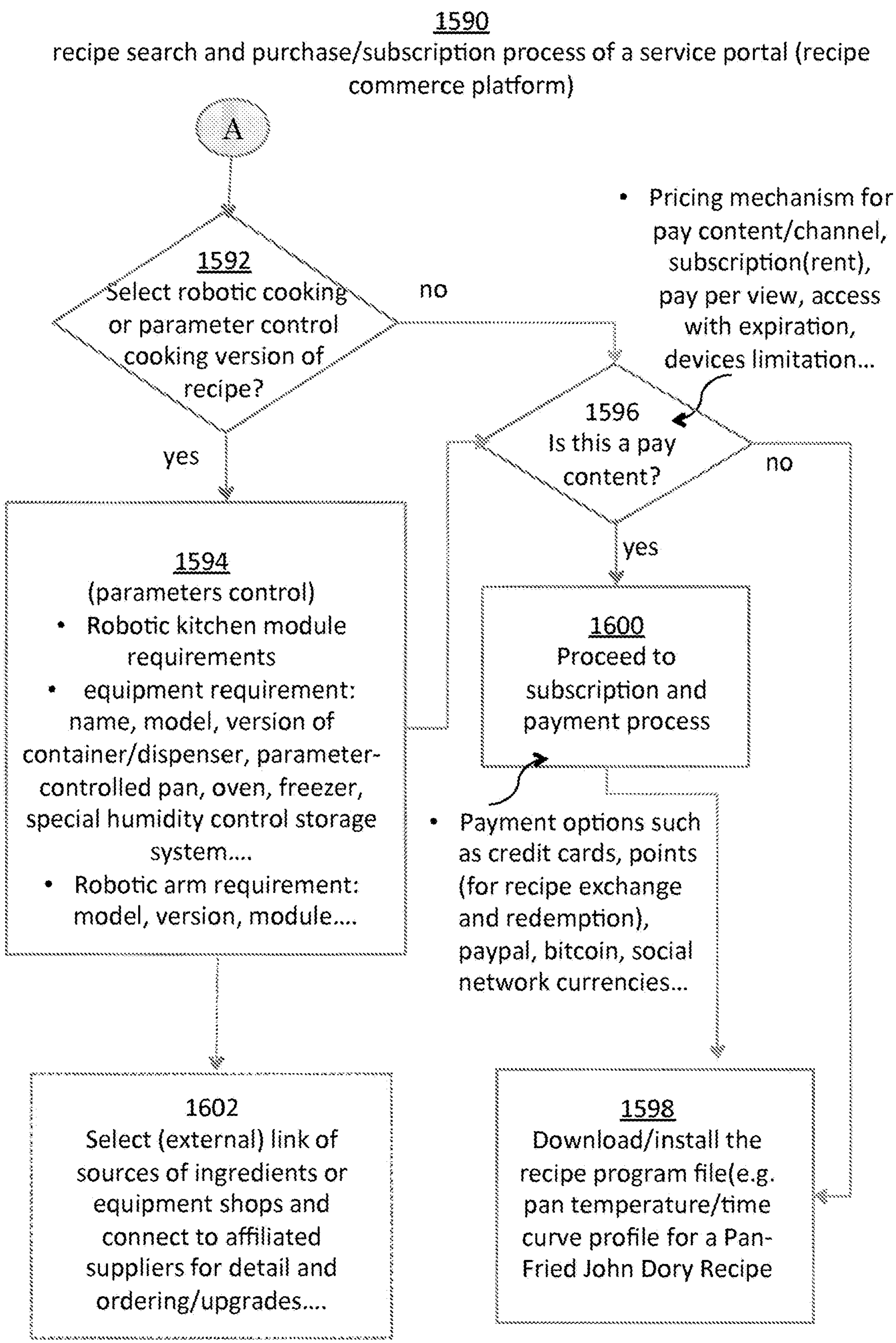

FIG. 61B depicts the continuation from FIG. 61A for the recipe search and purchase/subscription process for a service portal 1590. A user is prompted in step 1592 to select a particular recipe based on either a robotic cooking approach or a parameter-controlled version of the recipe. In the case of a parameter-controlled based recipe, the system provides the required equipment details in step 1594 for such items as all the cookware and appliances as well as the robotic arm requirements, and offers select external links at step 1602 to sources for ingredients and equipment suppliers for detailed ordering instructions. The portal system then executes a recipe-type check 1596, where it allows for a direct download and installation 1598 of the recipe program file on the remote device, or requires the user to enter payment information in step 1600 based on a one-off payment or payment on a subscription basis, using one of many possible payment forms (PayPal, BitCoin, credit card, etc.).

Figure 62:
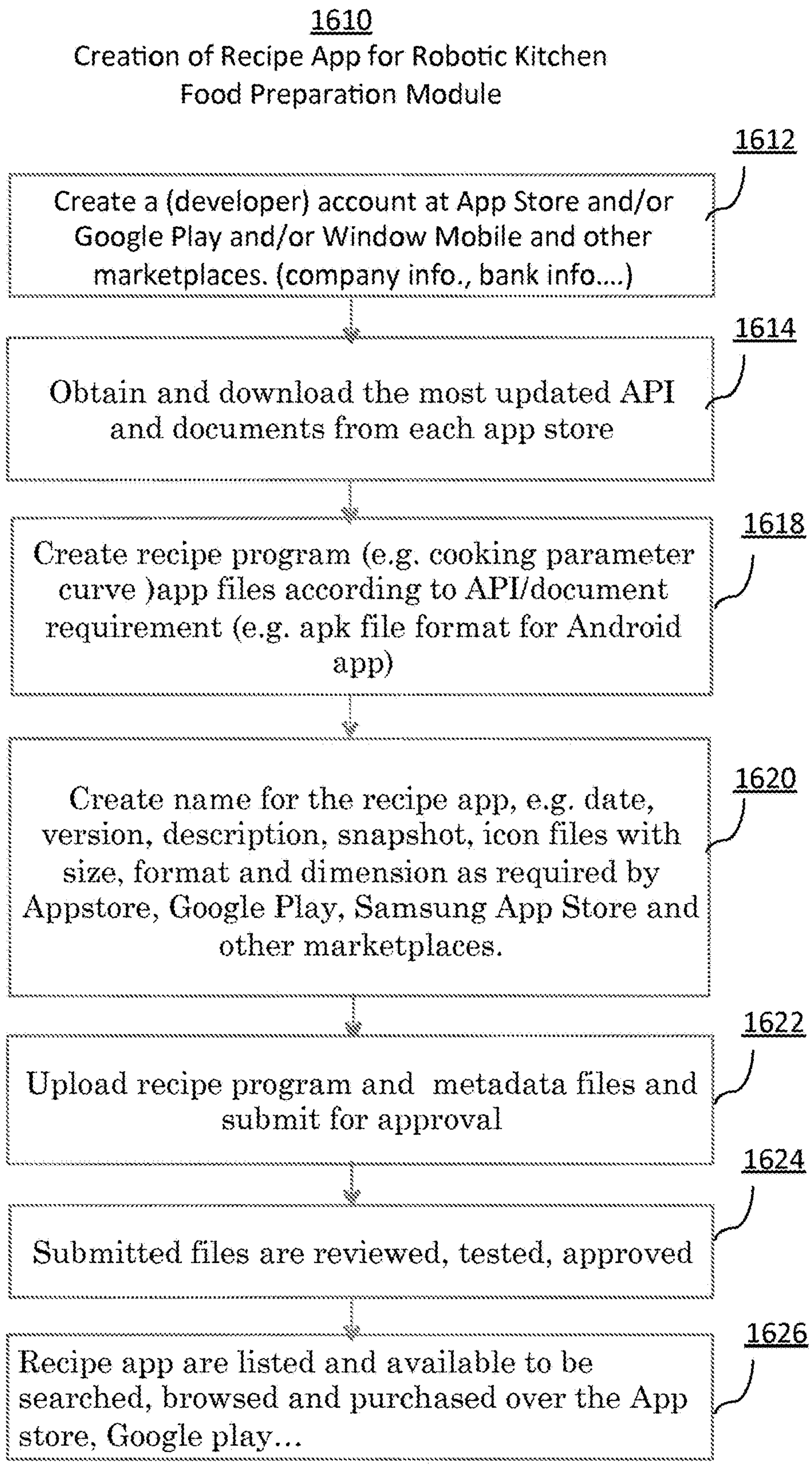
FIG. 62 is a flow diagram illustrating the creation of a robotic cooking recipe app on an app platform in accordance with the present invention.

FIG. 62 depicts the process 1610 used in the creation of a robotic recipe cooking application ("App"). As a first step 1612, a developer account needs to be created on such places as the App Store, Google Play or Windows Mobile or other such marketplaces, including the provision of banking and company information. The user is then prompted in step 1614 to obtain and download the most updated Application-Program-Interface (API) documentation specific for each app store. A developer then has to follow the API-requirements spelled out and create a recipe program in step 1618 that meets the API document requirements. In step 1620 the developer needs to provide a name and other metadata for the recipe that are suitable and prescribed by the various sites (Apple, Google, Samsung, etc.). Step 1622 requires the developer to upload the recipe program and metadata files for approval. The respective marketplace sites then review, test and approve the recipe program in step 1624, after which in step 1626 the respective site(s) list and make available the recipe program for online searching, browsing and purchase over their purchase interface.

Figure 63:
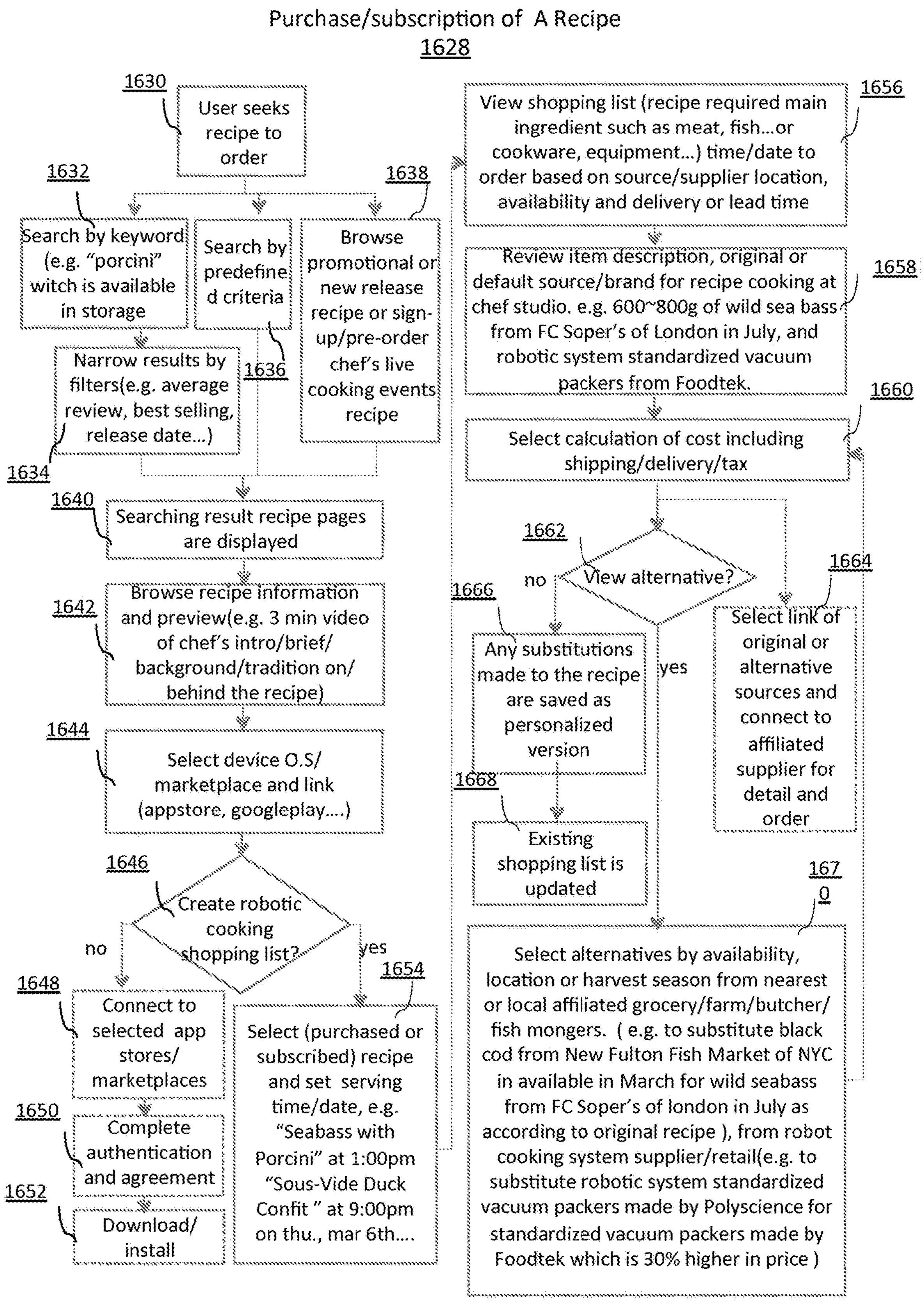
FIG. 63 is a flow diagram illustrating the process of a user search, purchase, and subscription for a cooking recipe in accordance with the present invention.

FIG. 63 depicts the process 1628 of purchasing a particular recipe or subscribing to a recipe delivery plan. As a first step 1630 the user searches for a particular recipe to order. The user may choose to browse by keyword (step 1632) with results able to be narrowed down using preference filters (step 1634), browse using other predefined criteria (step 1636) or even browse based on promotional, newly-released or pre-order basis recipes and even live chef cooking events (step 1638). The search results for recipes are displayed to the user in step 1640. The user may then browse these recipe results and preview each recipe in an audio- or short video-clip as part of step 1642. In step 1644 the user then chooses a device and operating system and receives a specific download link for a particular online marketplace application site. Should the user choose at step to connect to a new provider site in task 1648, the site will require the new user to complete an authentication and agreement step 1650, allowing the site to then download and install site-specific interface software in task 1652, to allow the recipe-delivery process to continue. The provider site will query with the user whether to create a robotic cooking shopping list in step 1646, and, if agreed to by the user in step 1654, to select a particular recipe on a single or subscription basis and pick a particular date and time for the dish to be served. In step 1656 the shopping list for the needed ingredients and equipment is provided and displayed to the user, including closest and fastest suppliers and their locations, ingredient and equipment availability and associated delivery lead times and pricing. In step 1658 the user is offered a chance to review each of the items' descriptions and their default or recommended source and brand. The user is then able to view the associated cost of all items on the ingredient and equipment list including all associated line-item costs (shipping, tax, etc.) in step 1660. Should the user or buyer want to view alternatives to the proposed shopping list items in step 1662, a step 1664 is executed to offer the user or buyer links to alternate sources to allow them to connect and view alternative buying and ordering options. If the user or buyer accepts the proposed shopping list, the system not only saves these selections as personalized choices for future purchases (step 1666) and updates the current shopping list (step 1668), but then also moves to step 1670, where it selects the alternatives from the shopping list based on additional criteria such as local/closest providers, item availability based on season and maturation-stage, or even pricing for equipment from different suppliers which has effectively the same performance but differs substantially in delivered cost to the user or buyer.

FIGS. 64A-B are block diagrams illustrating an example of a predefined recipe search criterion 1672. The predefined recipe search criteria in this example include categories like main ingredients, cooking duration, cuisine by geographic regions and types, chef's name search, signature dishes, and estimated ingredient cost to prepare a food dish. Other possible recipe search fields Include types of meals, special diet, exclusion ingredient, dish types and cooking methods, occasions and seasons, reviews and suggestions, and rankings.

Figure 66:
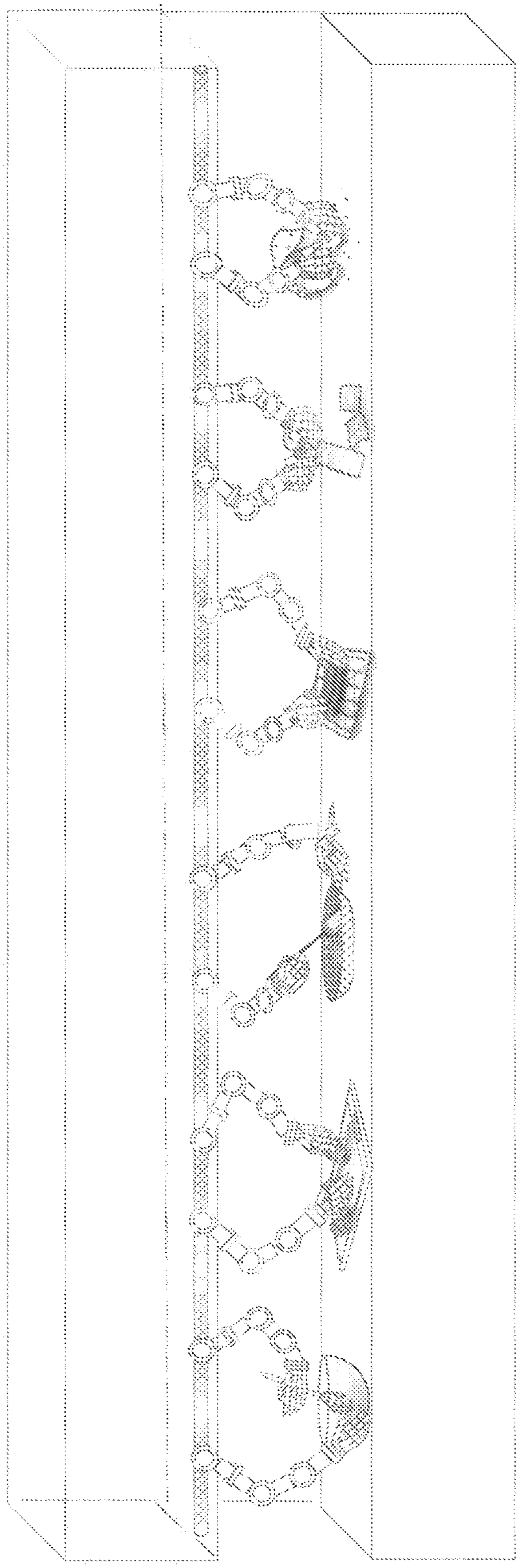
FIG. 66 is a block diagram illustrating a first embodiment of a robotic restaurant kitchen module configured in a rectangular layout with multiple pairs of robotic hands for simultaneous food preparation processing in accordance with the present invention.

FIG. 66 is a block diagram illustrating some pre-defined containers in the robotic standardized kitchen 50. Each of the containers in the standardized robotic kitchen 50 has a container number or bar code which reference the specific content that is stored in that container. For example, the first container stores large and bulky products, such as white cabbage, red cabbage, savoy cabbage, turnips and cauliflower. The sixth container stores a large fraction of solids by pieces including items like almond shavings, seeds (sunflower, pumpkin, white), dried apricots pitted, dried papaya and dried apricots. FIG. 66 is a block diagram illustrating a first embodiment of a robotic restaurant kitchen module configured in a rectangular layout with multiple pairs of robotic hands for simultaneous food preparation processing. Another embodiment of the invention revolves around a staged configuration for multiple successive or parallel robotic arm and hand stations in a professional or restaurant kitchen setup shown in FIG. 66. The embodiment depicts a more linear configuration, even though any geometric arrangement could be used, showing multiple robotic arm/hand modules, each focused on creating a particular element, dish or recipe script step (e.g. six pairs of robotic arms/hands to serve different roles in a commercial kitchen such as sous-chef, broiler-cook, fry/saute cook, pantry cook, pastry chef, soup and sauce cook, etc.). The robotic kitchen layout is such that the access/interaction with any human or between neighboring arm/hand modules is along a single forward-facing surface. The setup is capable of being computer-controlled, thereby allowing the entire multi-arm/hand robotic kitchen setup to perform replication cooking tasks respectively, regardless of whether the arm/hand robotic modules execute a single recipe sequentially (end-product from one station gets supplied to the next station for a subsequent step in the recipe script) or multiple recipes/steps in parallel (such as pre-meal food-/ingredient-preparation for later use during dish replication completion to meet the time crunch during rush times).

Figure 67:
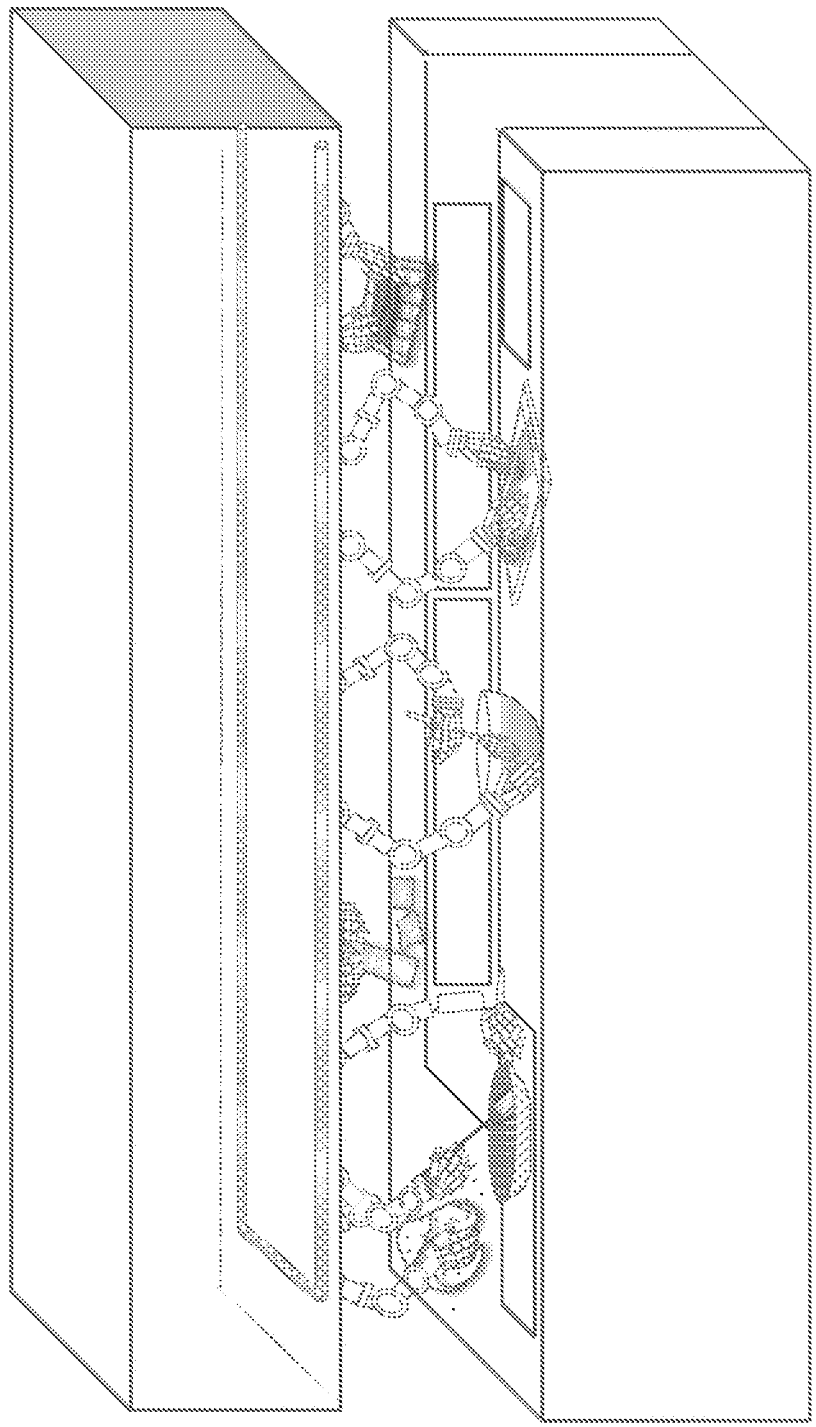
FIG. 67 is a block diagram illustrating a second embodiment of a robotic restaurant kitchen module configured in a U-shape layout with multiple pairs of robotic hands for simultaneous food preparation processing in accordance with the present invention.

FIG. 67 is a block diagram illustrating a second embodiment of a robotic restaurant kitchen module configured in a U-shape layout with multiple pairs of robotic hands for simultaneous food preparation processing. Yet another embodiment of the invention revolves around another staged configuration for multiple successive or parallel robotic arm and hand stations in a professional or restaurant kitchen setup shown in FIG. 67. The embodiment depicts a rectangular configuration, even though any geometric arrangement could be used, showing multiple robotic arm/hand modules, each focused on creating a particular element, dish or recipe script step. The robotic kitchen layout is such that the access/interaction with any human or between neighboring arm/hand modules is both along a U-shaped outward-facing set of surfaces and along the central-portion of the U-shape, allowing arm/hand modules to pass/reach over to opposing work areas and interact with their opposing arm/hand modules during the recipe replication stages. The setup is capable of being computer-controlled, thereby allowing the entire multi-arm/hand robotic kitchen setup to perform replication cooking tasks respectively, regardless of whether the arm/hand robotic modules execute a single recipe sequentially (end-product from one station gets supplied to the next station along the U-shaped path for a subsequent step in the recipe script) or multiple recipes/steps in parallel (such as pre-meal food-/ingredient-preparation for later use during dish replication completion to meet the time crunch during rush times, with prepared ingredients possibly stored in containers or appliances (fridge, etc.) contained within the base of the U-shaped kitchen).

Figure 68:
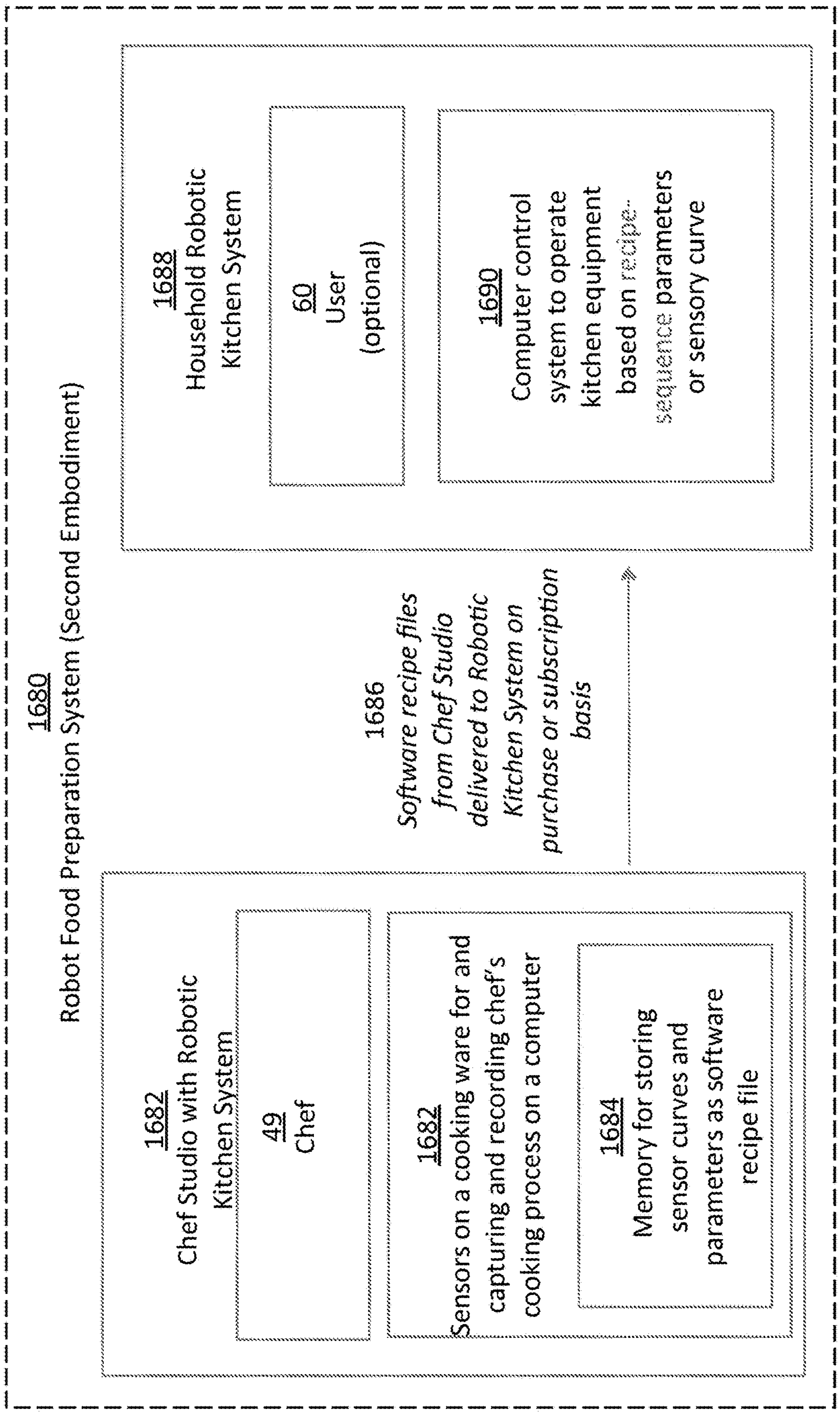
FIG. 68 is a block diagram illustrating a second embodiment of the robotic food preparation system with sensory cookware and curves in accordance with the present invention.

FIG. 68 depicts a second embodiment of a robotic food preparation system 1680. The chef studio with the standardized robotic kitchen system 1682 includes the human chef 49 preparing or executing a recipe, while sensors on the cookware 1682 record important variables (temperature, etc.) over time and store them in a computer's memory 1684 as sensor curves and parameters that form a part of a recipe script raw data file. These stored sensory curves and parameter data files from the chef studio 1682 are delivered to a standardized (remote) robotic kitchen on a purchase or subscription basis 1686. The standardized robotic kitchen 1688 installed in a household includes both the user 60 and the computer controlled system 1690 to operate the automated and/or robotic kitchen equipment based on the received raw data corresponding to the measured sensory curves and parameter data files.

Figure 69:
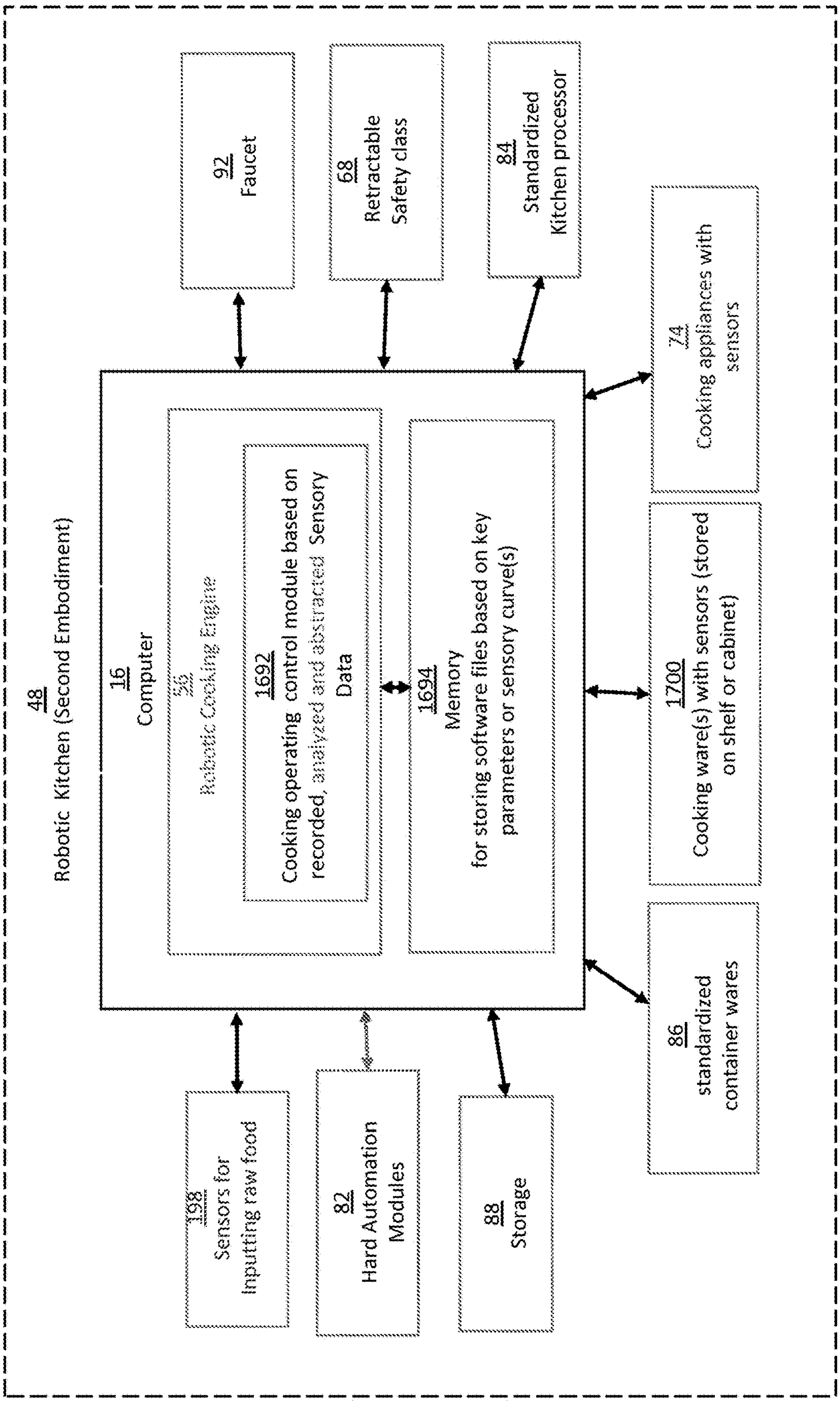
FIG. 69 is a block diagram illustrating some physical elements of a robotic food preparation system in the second embodiment in accordance with the present invention.
Figure 70:
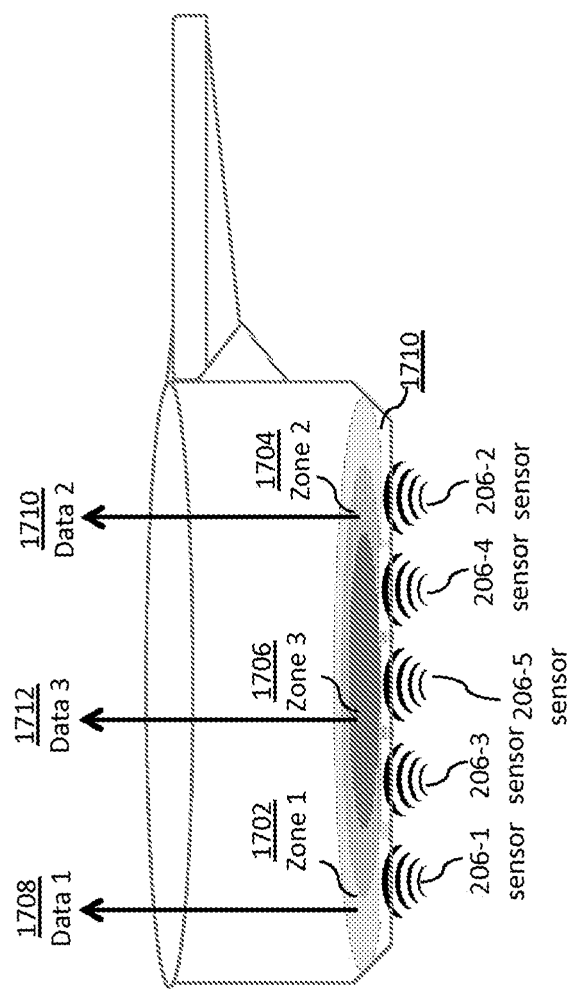
FIG. 70 is a block diagram illustrating sensory cookware for a (smart) pan with real-time temperature sensors for use in the second embodiment in accordance with the present invention.

FIG. 69 depicts another embodiment of the standardized robotic kitchen 48. The computer 16 that runs the robotic cooking (software) engine 56, which includes a cooking operations control module 1692 that processes recorded, analyzed and abstracted sensory data from the recipe script, and associated storage media and memory 1694 to store software files consisting of sensory curves and parameter data, interfaces with multiple external devices. These external devices include, but are not limited to, a retractable safety glass 68, a computer-monitored and computer-controllable storage unit 88, multiple sensors reporting on the process of raw-food quality and supply 198, hard-automation modules 82 to dispense ingredients, standardized containers 86 with ingredients, and intelligent cookware 1700 fitted with sensors.

Figure 71:
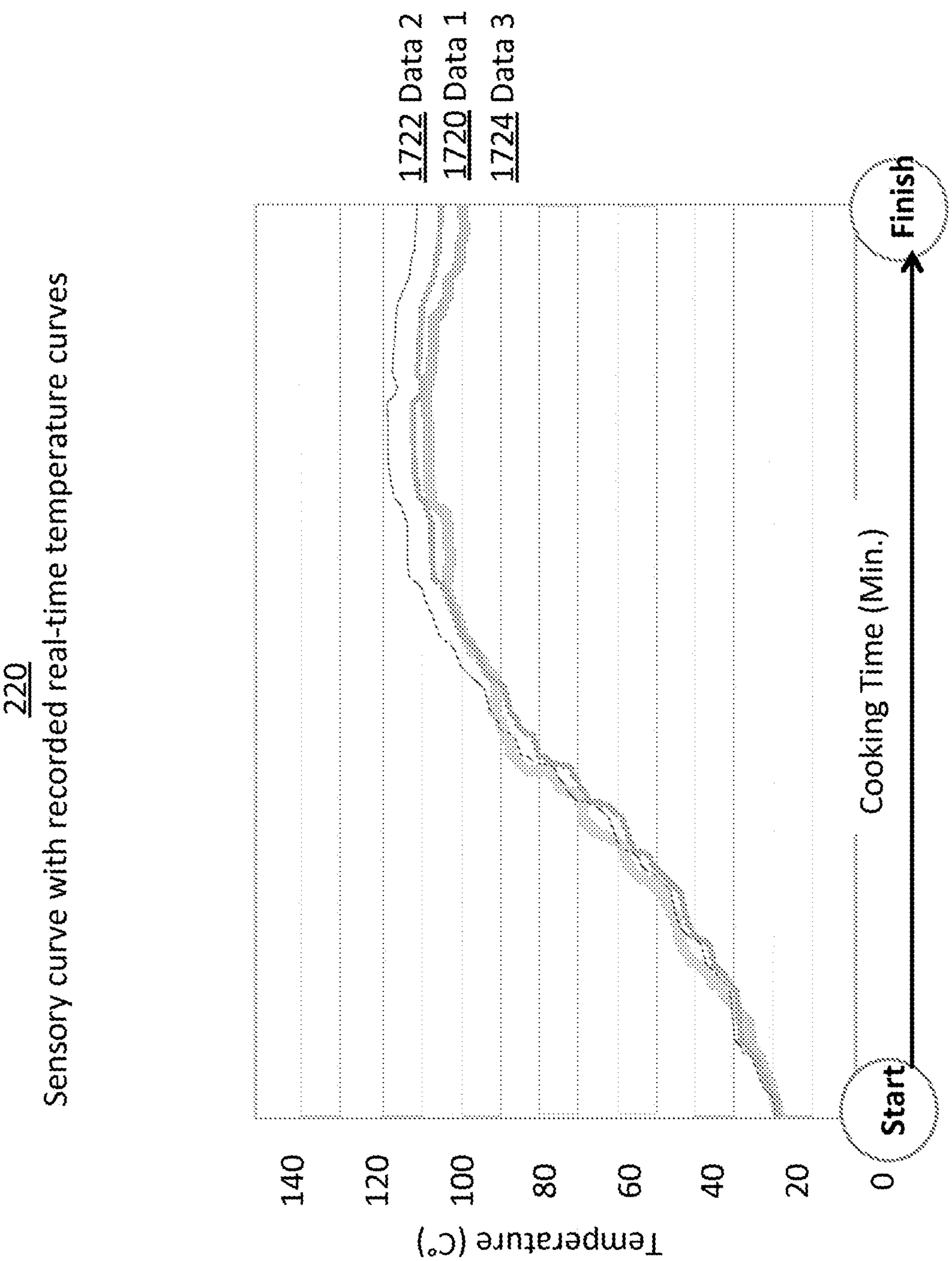
FIG. 71 is a graphical diagram illustrating the recorded temperature curve with multiple data points from the different sensors of the sensory cookware in the chef studio in accordance with the present invention.

FIG. 71 depicts an intelligent cookware item 1700 (a sauce-pot in this image) that includes built-in real-time temperature sensors, capable of generating and wirelessly transmitting a temperature profile across the bottom surface of the unit across at least, but not limited to, three planar zones, including zone-1 1702, zone-2 1704 and zone-3 1706, arranged in concentric circles across the entire bottom surface of the cookware unit. Each of these three zones is capable of wirelessly transmitting respective data-1 1708, data-2 1710 and data-3 1712 based on coupled sensors 1716-1, 1716-2, 1716-3, 1716-4 and 1716-5.

FIG. 71 depicts a typical set of sensory curves 220 with recorded temperature profiles for data-1 1720, data-2 1722 and data-3 1724, each corresponding to the temperature in each of the three zones at the bottom of a particular area of a cookware unit. The measurement units for time are reflected as cooking time in minutes from start to finish (independent variable), while the temperature is measured in degrees Celsius (dependent variable).

Figure 72:
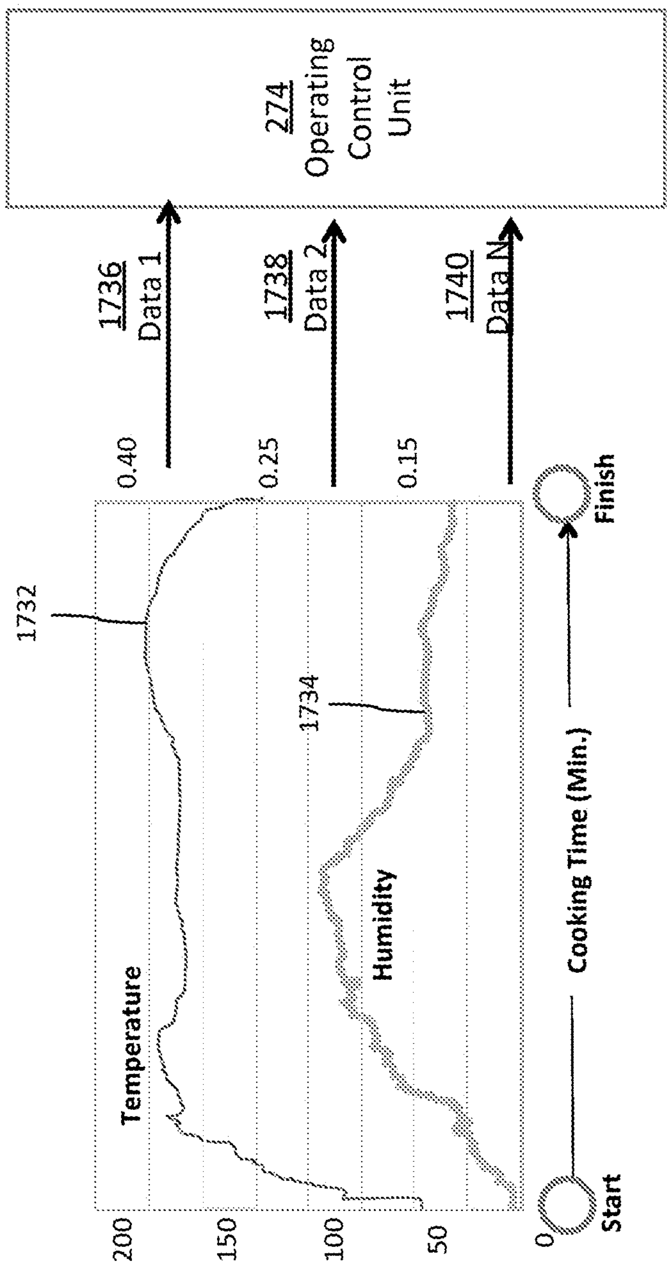
FIG. 72 is a graphical diagram illustrating the recorded temperature and humidity curves from the sensory cookware in the chef studio for transmission to an operating control unit in accordance with the present invention.

FIG. 72 depicts a multiple set of sensory curves 1730 with recorded temperature 1732 and humidity 1734 profiles, with the data from each sensor represented as data-1 1736, data-2 1738 all the way to data-N 1740. Streams of raw data are forwarded and processed to and by the operating control unit 274. The measurement units for time are reflected as cooking time in minutes from start to finish (independent variable), while the temperature and humidity values are measured in degrees Celsius and relative humidity, respectively (dependent variables).

Figure 73:
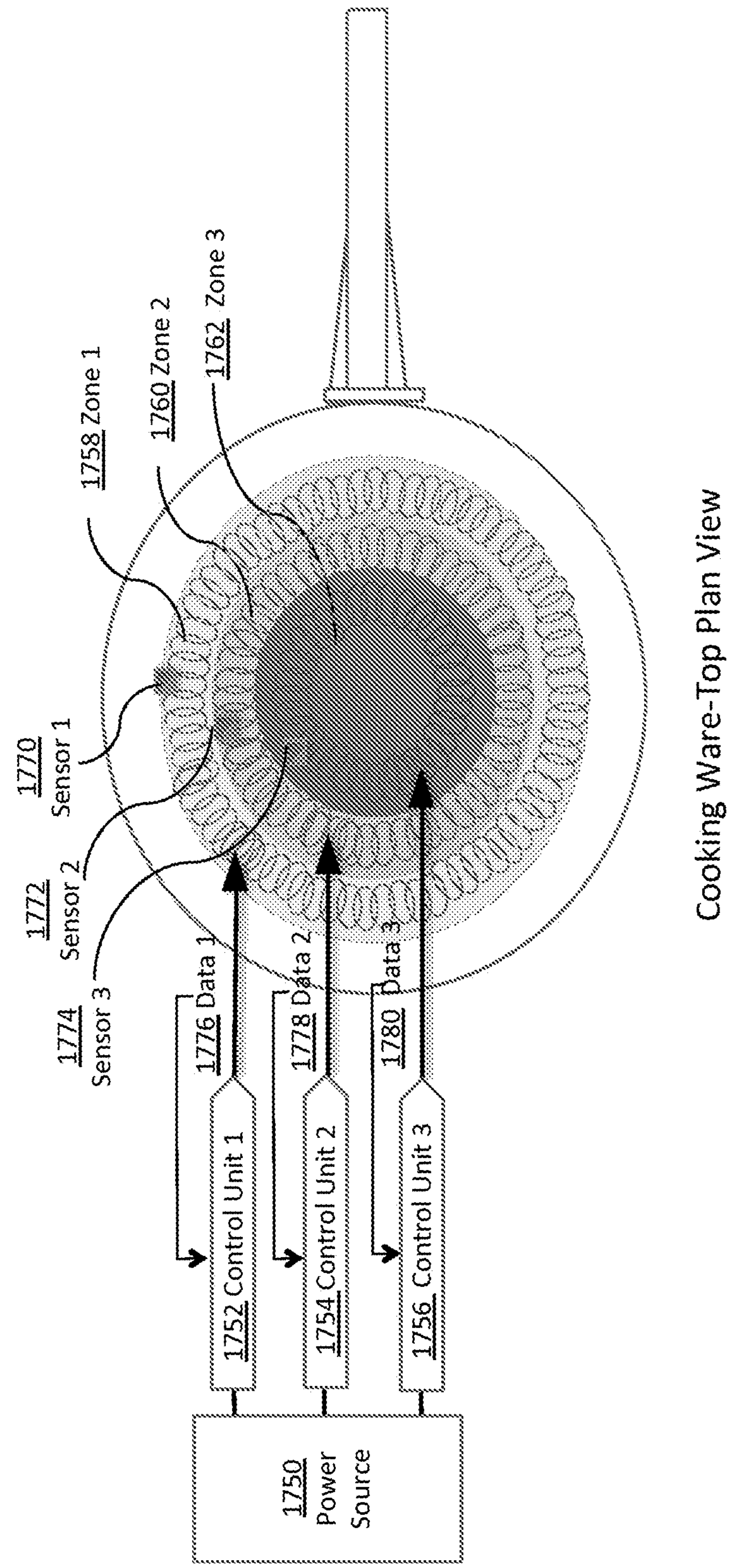
FIG. 73 is a block diagram illustrating sensory cookware for cooking based on the data from a temperature curve for different zones on a pan in accordance with the present invention.

FIG. 73 depicts a process setup for real-time temperature control 1700 with a smart (frying) pan. A power source 1750 uses three separate control units, but need not be limited to such, including control-unit-1 1752, control-unit-2 1754 and control-unit-3 1756, to actively heat a set of inductive coils. The control is in effect a function of the measured temperature values within each of the (three) zones 1758 (Zone 1), 1760 (Zone 2) and 1762 (Zone 3) of the (frying) pan, where temperature sensors 1770 (Sensor 1), 1772 (Sensor 2) and 1774 (Sensor 3) wirelessly provide temperature data via data streams 1776 (Data 1), 1778 (Data 2) and 1780 (Data 3) back to the operating control unit 274, which in turn directs the power source 1750 to independently control the separate zone-heating control units 1752, 1754 and 1756. The goal is to achieve and replicate the desired temperature curves over time as the sensory curve data logged during the human chef's certain (frying) step during the preparation of a dish.

Figure 74:
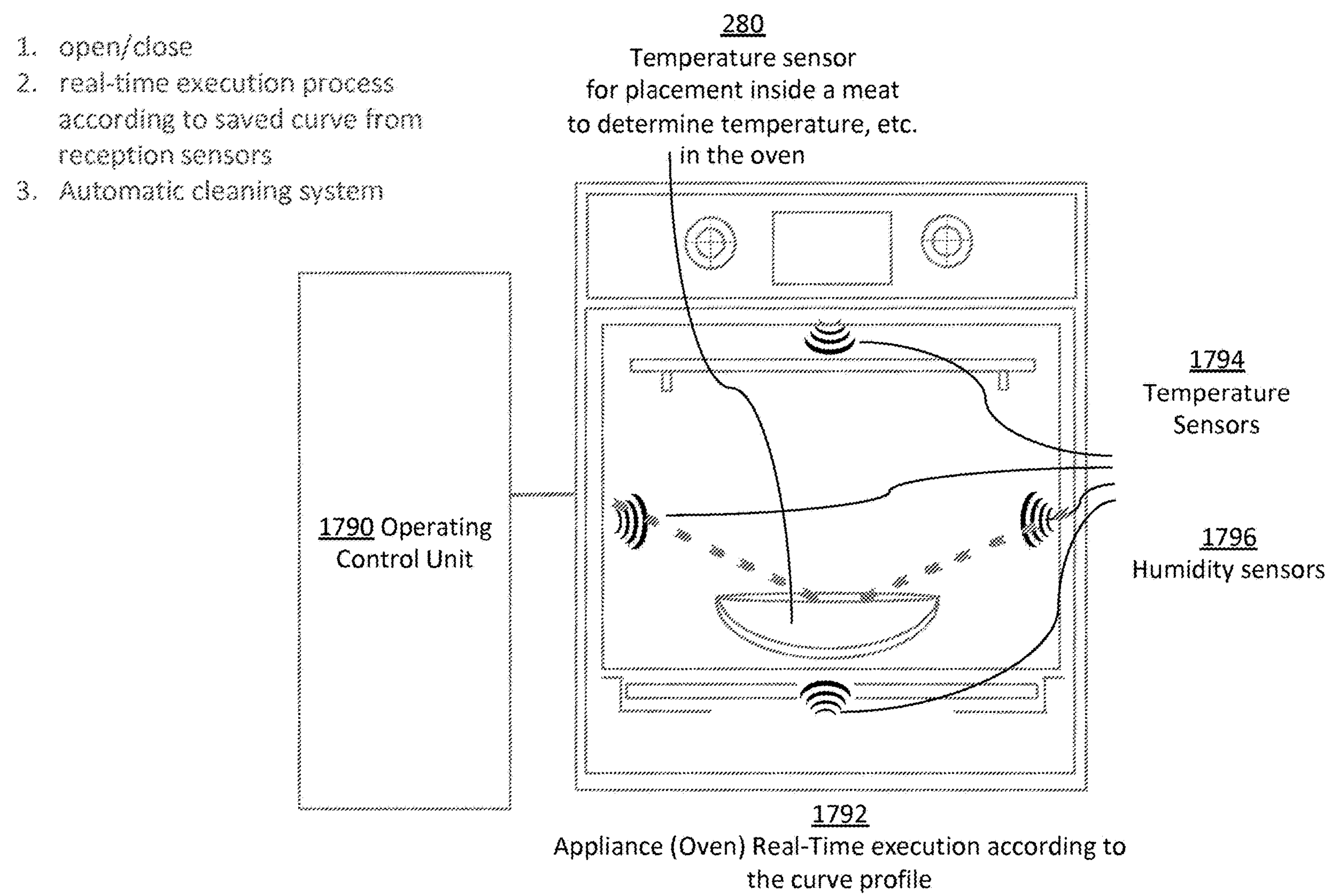
FIG. 74 is a block diagram illustrating sensory cookware of a (smart) oven with real-time temperature and humidity sensors for use in the second embodiment in accordance with the present invention.

FIG. 74 depicts a smart oven and computer control system that are coupled to the operating control unit 1790, allowing it to execute in real time a temperature profile for the oven appliance 1792, based on a previously stored sensory (temperature) curve. The operating control unit 1790 is able to control the doors (open/close) of the oven, track a temperature profile provided to it by a sensory curve, and, post-cooking, also self-clean. The temperature and humidity inside the oven are monitored through built-in temperature sensors 1794 in various locations generating a data stream 268 (Data 1), a temperature sensor in the form of a probe inserted into the ingredient to be cooked (meat, poultry, etc.) to monitor cooked temperature to infer degree of cooking completion, and additional humidity sensors 1796 creating a data stream. The operating control unit 1790 takes in all this sensory data and adjusts the oven parameters to allow it to properly track the sensory curves described in a previously stored and downloaded set of sensory curves for both (dependent) variables.

Figure 75:
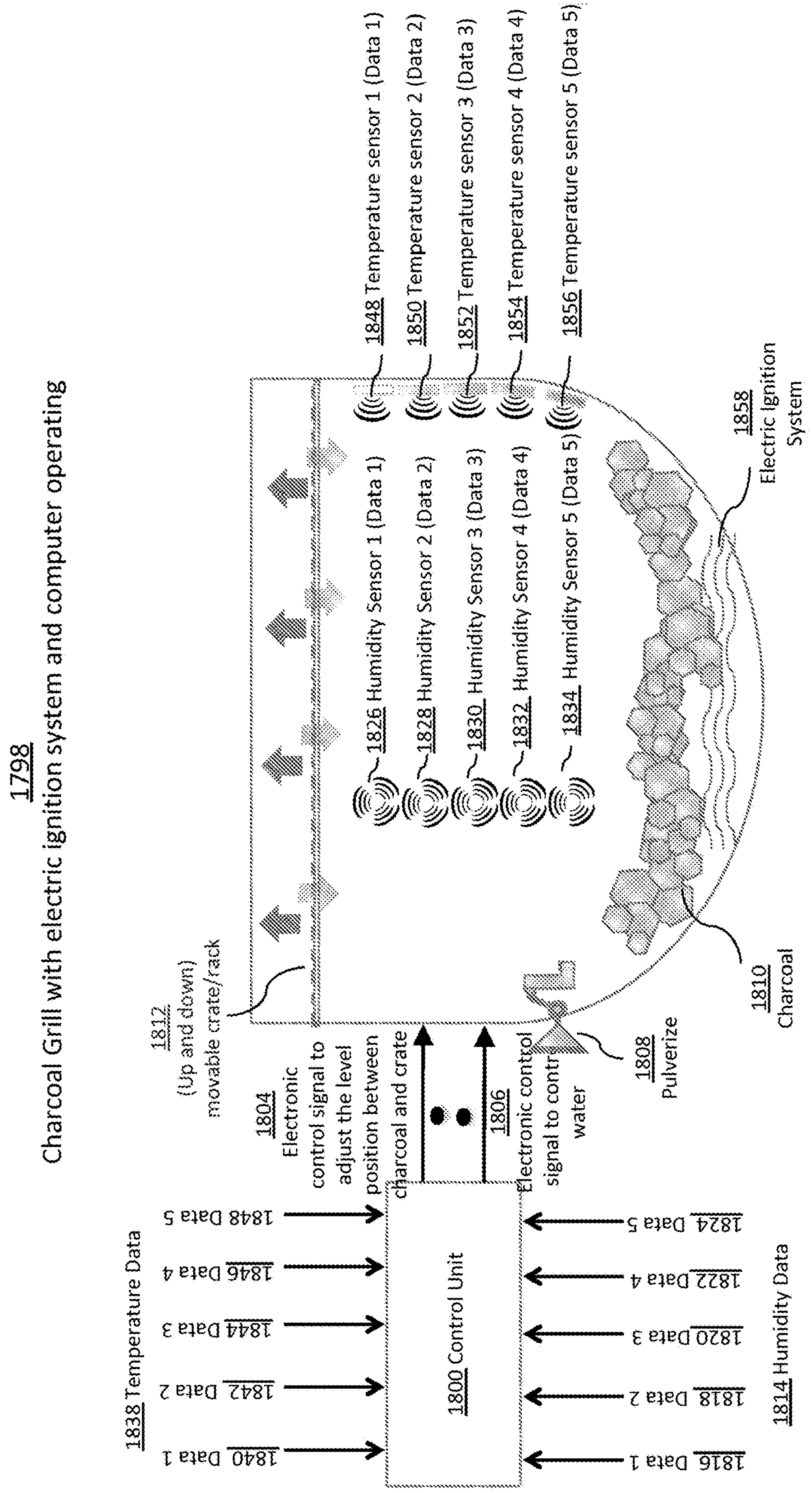
FIG. 75 is a block diagram illustrating a sensory cookware for a (smart) charcoal grill with real-time temperature sensors for use in the second embodiment in accordance with the present invention.

FIG. 75 depicts a computer-controlled ignition and control system setup 1798 for a control unit that modulates electric power 1858 to a charcoal grill to properly trace a sensory curve for one or more temperature and humidity sensors internally distributed inside the charcoal grill. The power control unit 1800 uses electronic control signals 1802 to start the grill, and signals 1804 and 1806 to adjust the grill-surface distance to the charcoal and the injection of water mist 1808 over the charcoal 1810, to adjust the temperature and humidity of the movable (up/down) rack 1812, respectively. The control unit 1800 bases its output signals 1804,1806 on a set of (five pictured here) data streams 1814 for humidity measurement 1816, 1818, 1820, 1822, 1824 from a set of distributed humidity sensors (1 through 5) 1826, 1828, 1830, 1832 and 1834 inside the charcoal grill, as well as data streams 1836 for temperature measurements 1840, 1842, 1844, 1846 and 1846 from distributed temperature sensors (1 through 5) 1848, 1850, 1852, 1854 and 1856.

Figure 76:
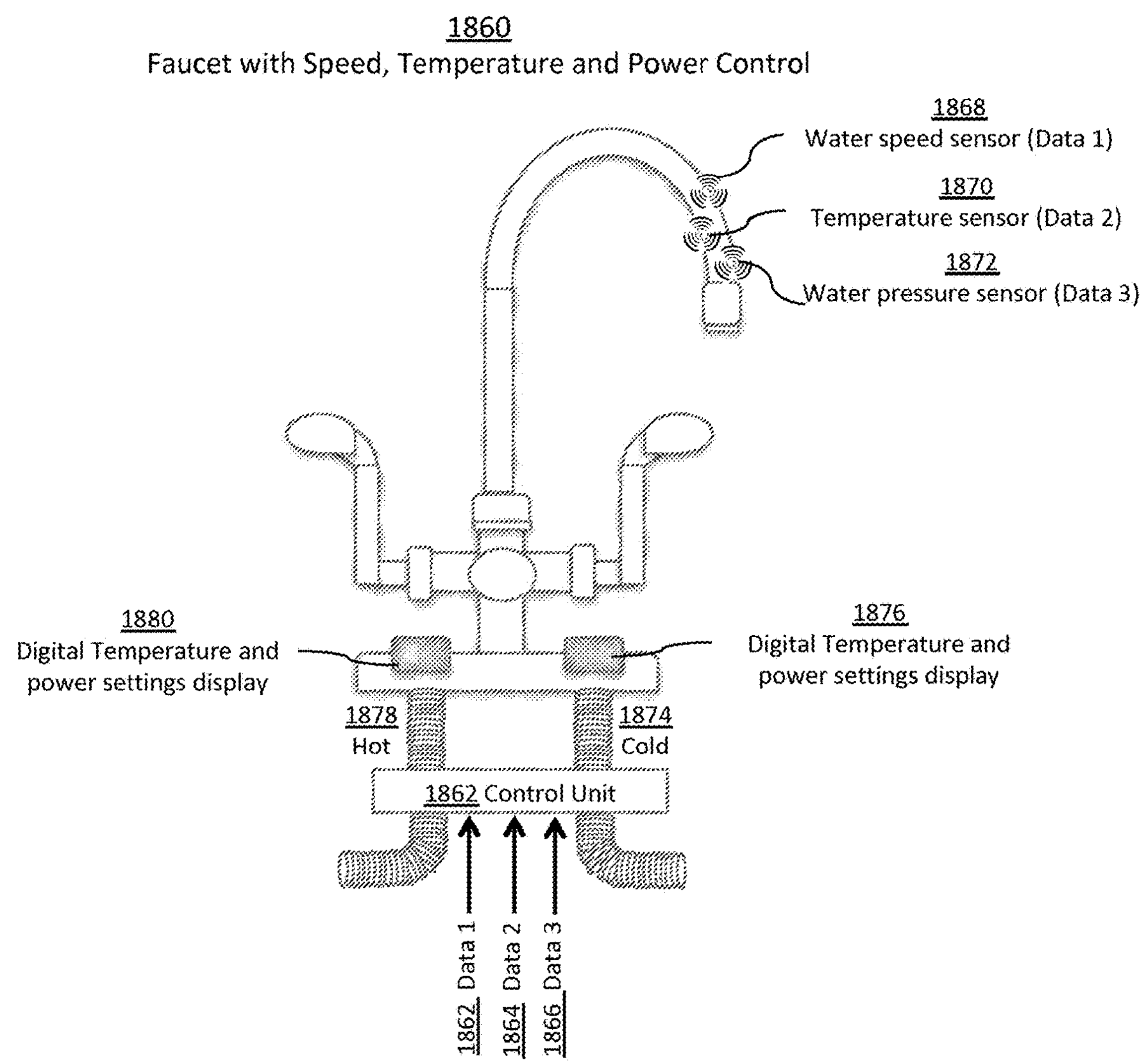
FIG. 76 is a block diagram illustrating sensory cookware for a (smart) faucet with speed, temperature and power control functions for use in the second embodiment in accordance with the present invention.

FIG. 76 depicts a computer-controlled faucet 1860 to allow the computer to control flow rate, temperature and pressure of water fed by the faucet into the sink (or cookware). The faucet is controlled by a control unit 1862 that receives separate data streams 1862 (Data 1), 1864 (Data 2) and 1866 (Data 3), which correspond to water flow rate sensor 1868 providing Data 1, temperature sensor 1870 providing Data 2, and water pressure sensor 1872 providing Data 3 sensory data. The control unit 1862 then controls the supply of cold water 1874, with appropriate cold-water temperature and pressure displayed digitally on display 1876, and hot water 1878, with appropriate hot-water temperature and pressure displayed digitally on display 1880, to achieve the desired pressure, flow rate and temperature of water exiting at the spigot.

Figure 77:
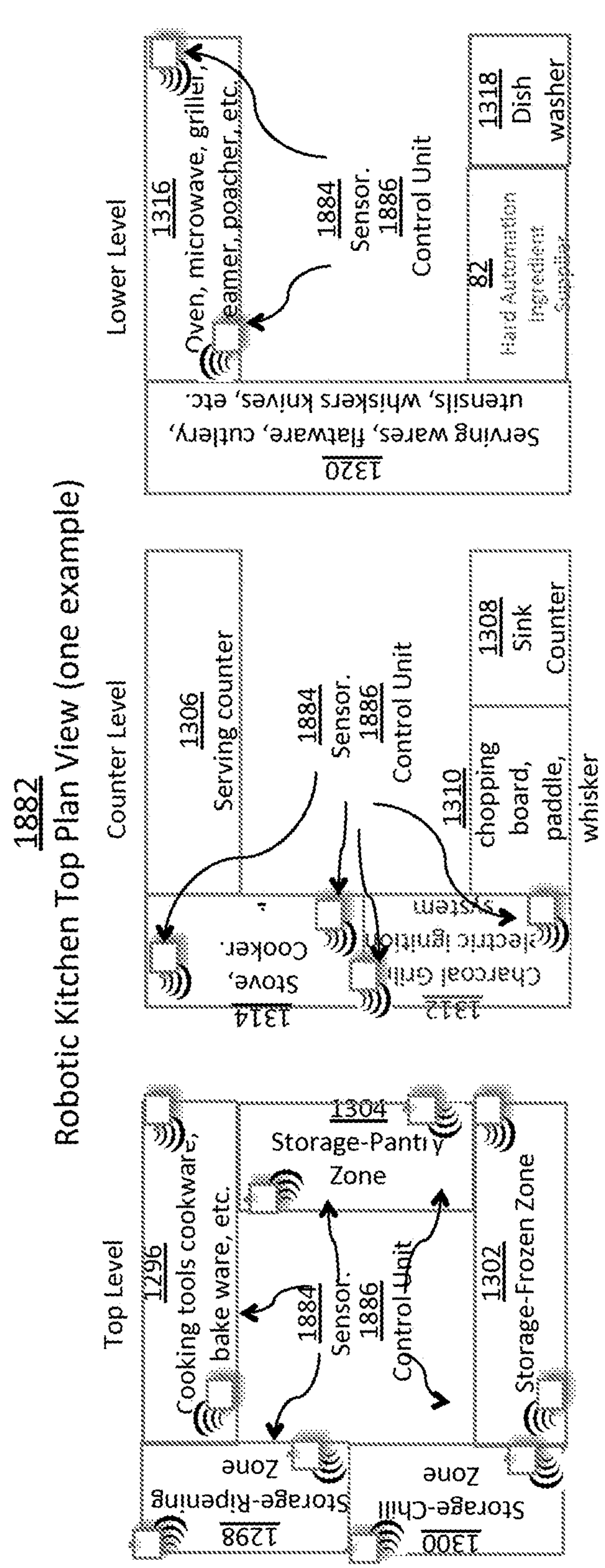
FIG. 77 is a block diagram illustrating a top plan view of a robotic kitchen with sensory cookware in the second embodiment in accordance with the present invention.

FIG. 77 depicts an embodiment of a fully instrumented robotic kitchen 1882 in top plan view. The standardized robotic kitchen is divided in to three levels, namely the top level, the counter level and the lower level, with each level containing equipment and appliances that have integrally mounted sensors 1884 and computer-control units 1886.

The top level contains multiple cabinet-type modules with different units to perform specific kitchen functions by way of built-in appliances and equipment. At the simplest level a shelf/cabinet storage area 82 is included, a cabinet volume 1320 used for storing and accessing cooking tools and utensils and other cooking and serving ware (cooking, baking, plating, etc.), a storage ripening cabinet volume 1298 for particular ingredients (e.g. fruit and vegetables, etc.), a chilled storage zone 88 for such items as lettuce and onions, a frozen storage cabinet volume 1302 for deep-frozen items, and another storage pantry zone 1304 for other ingredients and rarely used spices, etc. Each of the modules within the top level contains sensor units 1884 providing data to one or more control units 1886, either directly or by way of one or more central or distributed control computers, to allow for computer-controlled operations.

The counter level not only houses monitoring sensors 1884 and control units 1886, but also includes a serving counter 1306, a counter area with a sink 1308, another counter area 1310 with removable working surfaces (cutting/chopping board, etc.), a charcoal-based slatted grill 1312 and a multi-purpose area for other cooking appliances 1314, including a stove, cooker, steamer and poacher. Each of the modules within the counter level contains sensor units 1884 providing data to one or more control units 1886, either directly or by way of one or more central or distributed control computers, to allow for computer-controlled operations.

The lower level houses the combination convection oven and microwave as well as steamer, poacher and grill 1316, the dish-washer 1318, the hard automation controlled ingredient dispensers 82, and a larger cabinet volume 1320 that holds and stores additional frequently used cooking and baking ware, as well as tableware, flatware, utensils (whisks, knives, etc.) and cutlery. Each of the modules within the lower level contains sensor units 1884 providing data to one or more control units 1886, either directly or by way of one or more central or distributed control computers, to allow for computer-controlled operations.

Figure 78:
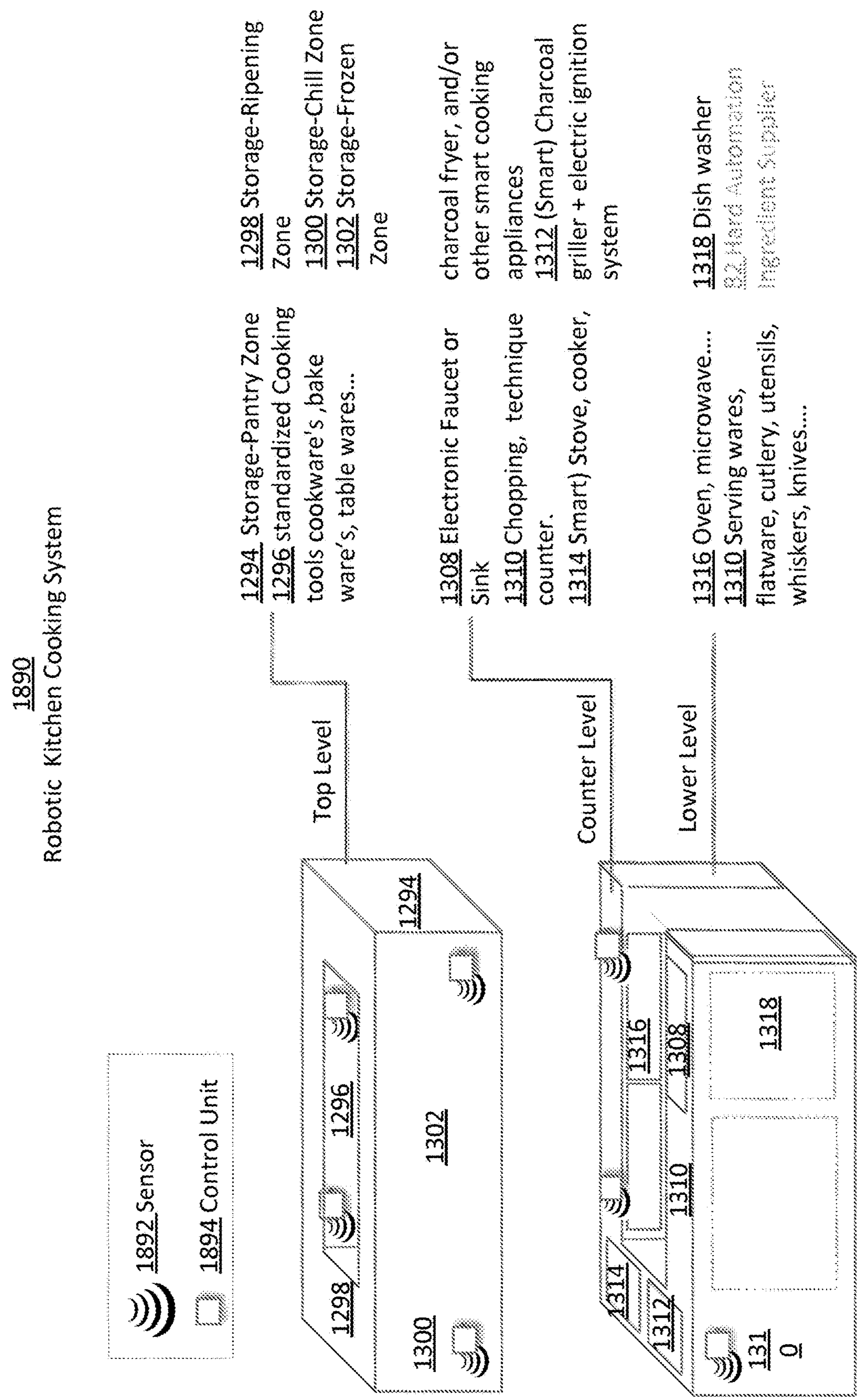
FIG. 78 is a block diagram illustrating a perspective view of a robotic kitchen with sensory cookware in the second embodiment in accordance with the present invention.

FIG. 78 depicts a perspective view of one embodiment of a robotic kitchen cooking system 1890, with three different levels arranged from top to bottom, each fitted with multiple and distributed sensor units 1892 which feed data directly to one or more control units 1894, or to one or more central computers, which in turn use and process the sensory data to then command one or more control units 376 to act on their commands.

The top level contains multiple cabinet-type modules with different units to perform specific kitchen functions by way of built-in appliances and equipment. At the simplest level a shelf/cabinet storage pantry volume 1294 is included, a cabinet volume 1296 used for storing and accessing cooking tools and utensils and other cooking and serving ware (cooking, baking, plating, etc.), a storage ripening cabinet volume 1298 for particular ingredients (e.g. fruit and vegetables, etc.), a chilled storage zone 88 for such items as lettuce and onions, a frozen storage cabinet volume 1302 for deep-frozen items, and another storage pantry zone 1294 for other ingredients and rarely used spices, etc. Each of the modules within the top level contains sensor units 1892 providing data to one or more control units 1894, either directly or by way of one or more central or distributed control computers, to allow for computer-controlled operations.

The counter level not only houses monitoring sensors 1892 and control units 1894, but also includes a counter area with a sink and electronically controllable faucet 1308, another counter area 1310 with removable working surfaces for cutting/chopping on a board, etc., a charcoal-based slatted grill 1312, and a multi-purpose area for other cooking appliances 1314, including a stove, cooker, steamer and poacher. Each of the modules within the counter level contains sensor units 1892 providing data to one or more control units 1894, either directly or by way of one or more central or distributed control computers, to allow for computer-controlled operations.

The lower level houses the combination convection oven and microwave as well as steamer, poacher and grill 1316, the dish-washer 1318, the hard automation controlled ingredient dispensers 82, and a larger cabinet volume 1310 that holds and stores additional frequently used cooking and baking ware, as well as tableware, flatware, utensils (whisks, knives, etc.) and cutlery. Each of the modules within the lower level contains sensor units 1892 providing data to one or more control units 1896, either directly or by way of one or more central or distributed control computers, to allow for computer-controlled operations.

Figure 79:
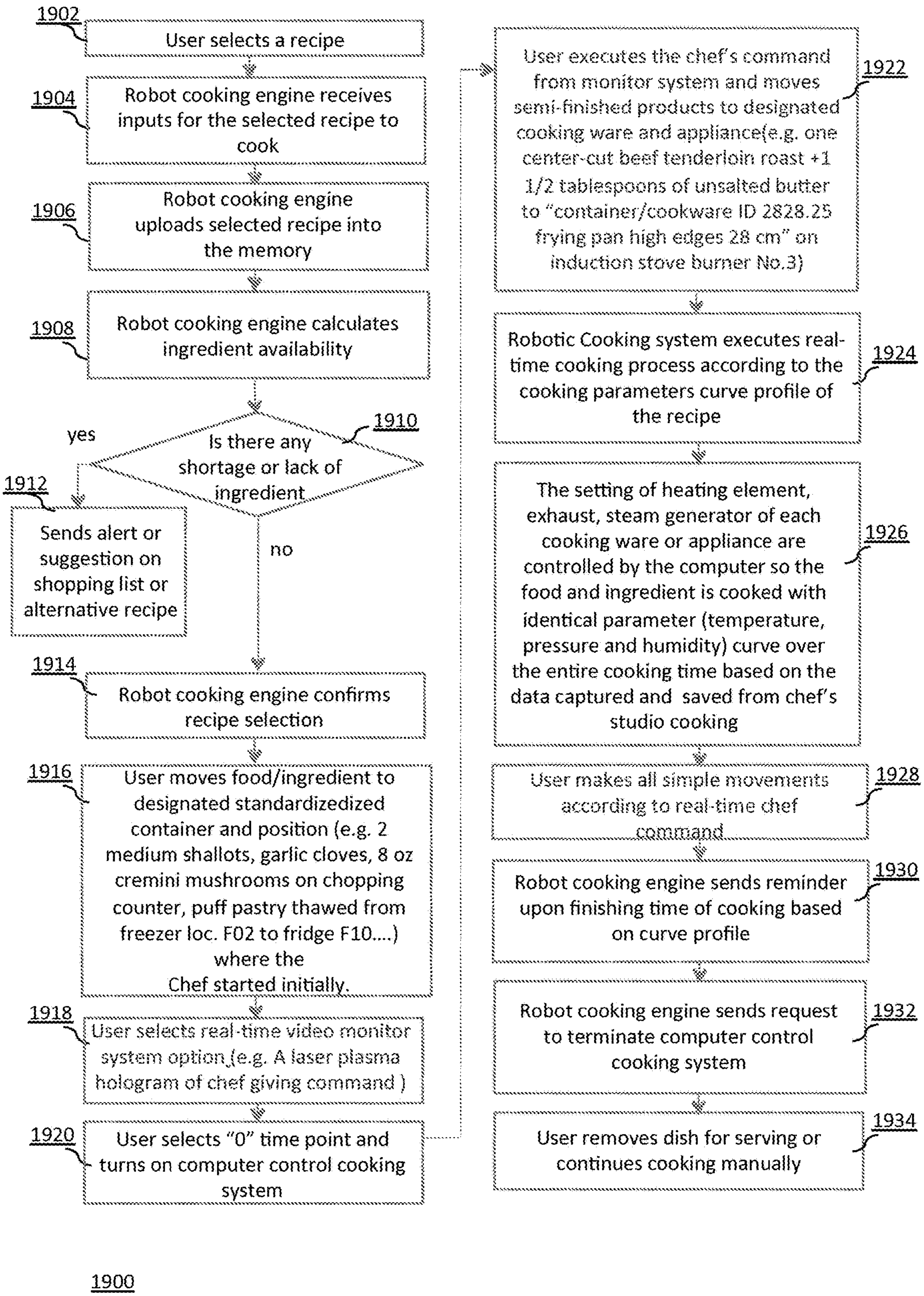
FIG. 79 is a flow diagram illustrating a second embodiment in the process of the robotic kitchen preparing a dish from one or more previous recorded parameter curves in a robotic kitchen in accordance with the present invention.

FIG. 79 is a flow diagram illustrating a second embodiment 1900 in the process of the robotic kitchen preparing a dish from one or more previously recorded parameter curves in a standardized robotic kitchen. In step 1902, a user, through a computer, selects a particular recipe for the robotic apparatus to prepare the food dish. In step 1904, the robotic food preparation engine is configured to retrieve the abstracted recipe for the selected recipe for food preparation. In step 1906, the robotic food preparation engine is configured to upload the selected recipe script into the computer's memory. In step 1908, the robotic food preparation engine calculates the ingredient availability. In step 1910, the robotic food preparation engine is configured to evaluate whether there is a shortage or a absence of ingredients to prepare the dish according to the selected recipe and serving schedule. The robotic food preparation engine sends an alert to place missing or insufficient ingredients on a shopping list or selects an alternate recipe in step 1912. The recipe selection by the user is confirmed in step 1914. In step 1916, the robotic food preparation engine is configured to send robotic instructions to the user to place food or ingredients into standardized containers and move them to the proper food preparation position. In step 1918, the user is given the option to select a real-time video-monitor projection, whether on a dedicated monitor or a holographic laser-based projection, to visually see each and every step of the recipe replication process based on all movements and processes executed by the chef while being recorded for playback in this instance. In step 1920, the robotic food preparation engine is configured to allow the user to start food preparation at start time "0" of their choosing and powering on the computerized control system for the standardized robotic kitchen. In step 1922 the user executes a replication of all the chef's actions based on the playback of the entire recipe creation process by the human chef on the monitor/projection screen, whereby semi-finished products are moved to designated cookware and appliances or intermediate storage containers for later use. In step 1924, the robotic apparatus in the standardized kitchen executes the individual processing steps according to sensory data curves or based on cooking parameters recorded when the chef executed the same step in the recipe preparation process in the chef studio's standardized robotic kitchen. In step 1926 the robotic food preparation's computer controls all the cookware and appliance settings in terms of temperature, pressure and humidity so as to replicate the required data curves over the entire cooking time based on the data captured and saved while the chef was preparing the recipe in the chef's studio standardized robotic kitchen. In step 1928 the user makes all simple movements so as to replicate the chef's steps and process movements as evidenced through the audio and video instructions relayed to the user over the monitor or projection screen. In step 1930 the robotic kitchen's cooking engine alerts the user when a particular cooking step based on a sensory curve or parameter set has been completed. Once the user and computer controller interactions result in the completion of all cooking steps in the recipe, the robotic cooking engine sends a request to terminate the computer-controlled portion of the replication process in step 1932. In step 1934, the user removes the completed recipe dish, plates and serves it, or continues any remaining cooking steps or processes manually.

Figure 80:
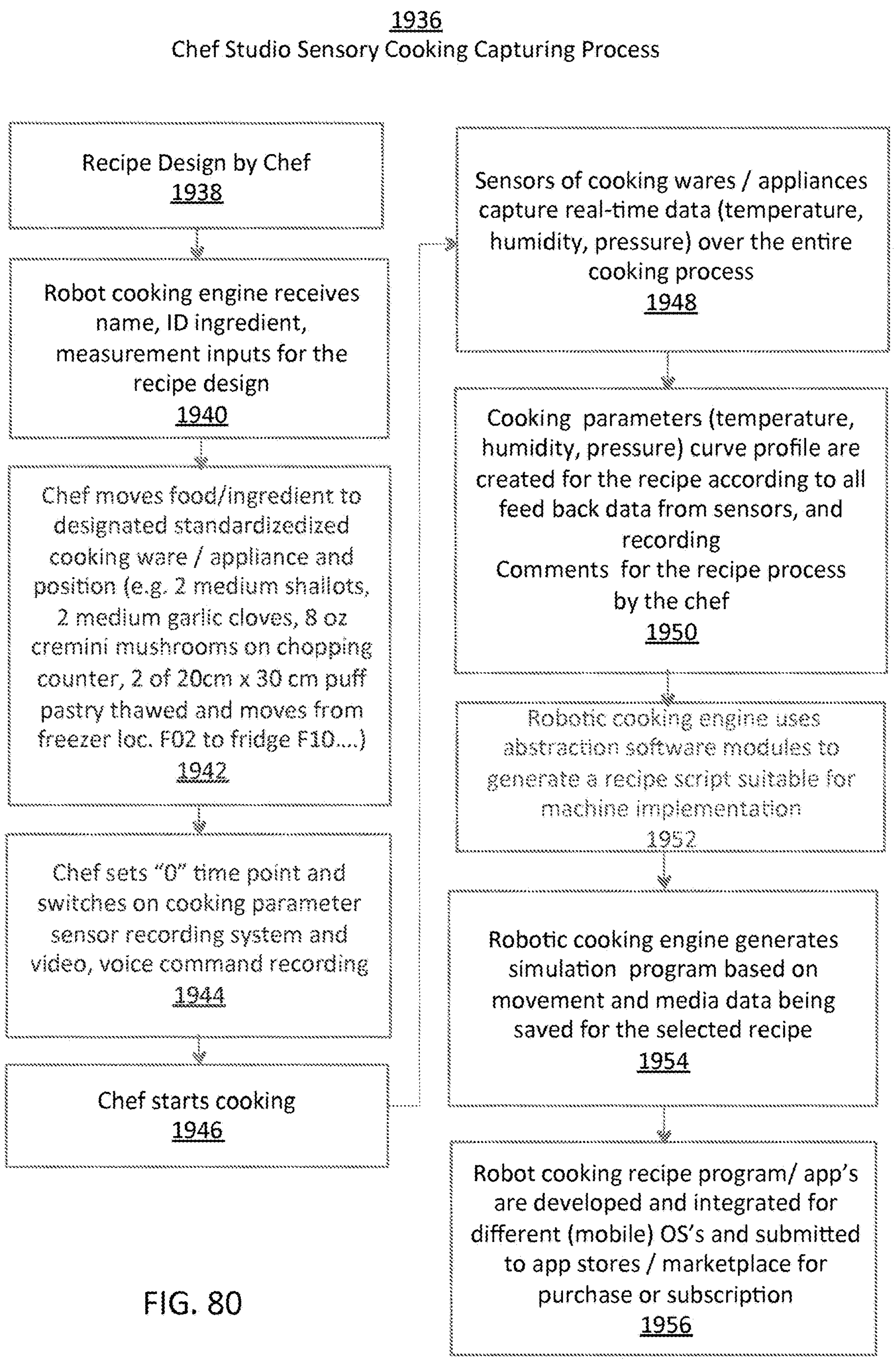
FIG. 80 is a flow diagram illustrating the second embodiment of the robotic food preparation system by capturing a chef's cooking process with sensory cookware in accordance with the present invention.

FIG. 80 depicts the sensory data capturing process 1936 in the chef studio. The first step 1938 is for the chef to create or design the recipe. A next step 1940 requires that the chef input the name, ingredients, measurement and process descriptions for the recipe into the robotic cooking engine. The chef begins by loading all the required ingredients into designated standardized storage containers, appliances and select appropriate cookware in step 1942. The next step 1944 involves the chef setting the start time and switching on the sensory and processing systems to record all sensed raw data and allow for processing of the same. Once the chef starts cooking in step 1946, all embedded and monitoring sensor units and appliances report and send raw data to the central computer system to allow it to record in real time all relevant data during the entire cooking process 1948. Additional cooking parameters and audible chef comments are further recorded and stored as raw data in step 1950. A robotic cooking module abstraction (software) engine processes all raw data, including two- and three-dimensional geometric motion and object recognition data, to generate a machine-readable and machine-executable recipe script as part of step 1952. Upon completion of the chef studio recipe creation and cooking process by the chef, the robotic cooking engine generates a simulation visualization program 1954 replicating the movement and media data used for later recipe replication by a remote standardized robotic kitchen system. Based on the raw and processed data, and a confirmation of the simulated recipe execution visualization by the chef, hardware-specific applications are developed and integrated for different (mobile) operating systems and submitted to online software-application stores and/or marketplaces in step 1956, for direct single-recipe user purchase or multi-recipe purchase via subscription models.

Figure 81:
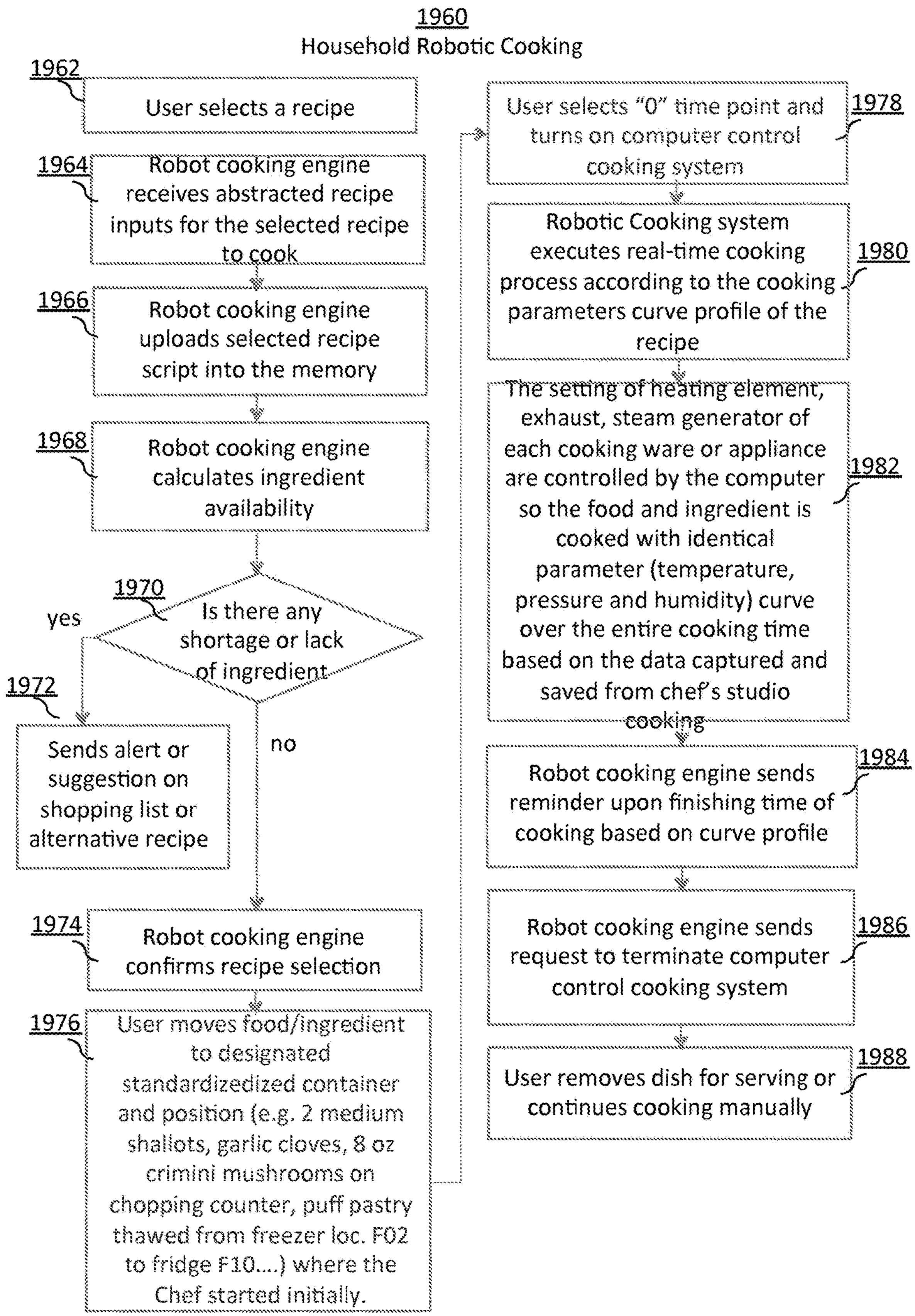
FIG. 81 is a flow diagram illustrating the second embodiment of the robotic food preparation system by replicating a chef's cooking process with sensory cookware in accordance with the present invention.

FIG. 81 depicts the process and flow of a household robotic cooking process 1960. The first step 1962 involves the user selecting a recipe and acquiring the digital form of the recipe. In step 1964 the robotic cooking engine receives the recipe script containing machine-readable commands to cook the selected recipe. The recipe is uploaded in step 1966 to the robotic cooking engine with the script being placed in memory. Once stored, step 1968 calculates the necessary ingredients and determines their availability. In a logic check 1970 the system determines whether to alert the user or send a suggestion in step 1972 urging adding missing items to the shopping list or suggesting an alternative recipe to suit the available ingredients, or to proceed should sufficient ingredients be available. Once ingredient availability is verified in step 1974, the system confirms the recipe and the user is queried in step 1976 to place the required ingredients into designated standardized containers in a position where the chef started the recipe creation process originally (in the chef studio). The user is prompted to set the start time of the cooking process and to set the cooking system to proceed in step 1978. Upon start-up the robotic cooking system begins the execution of the cooking process 1980 in real time according to sensory curves and cooking parameter data provided in the recipe script data files. During the cooking process 1982, the computer, so as to replicate the sensory curves and parameter data files originally captured and saved during the chef studio recipe creation process, controls all appliances and equipment. Upon completion of the cooking process, the robotic cooking engine sends a reminder based on having decided the cooking process is finished in step 1984. Subsequently the robotic cooking engine sends a termination request 1986 to the computer-control system to terminate the entire cooking process, and in step 1988 the user removes the dish from the counter for serving or continues any remaining cooking steps manually.

Figure 82:
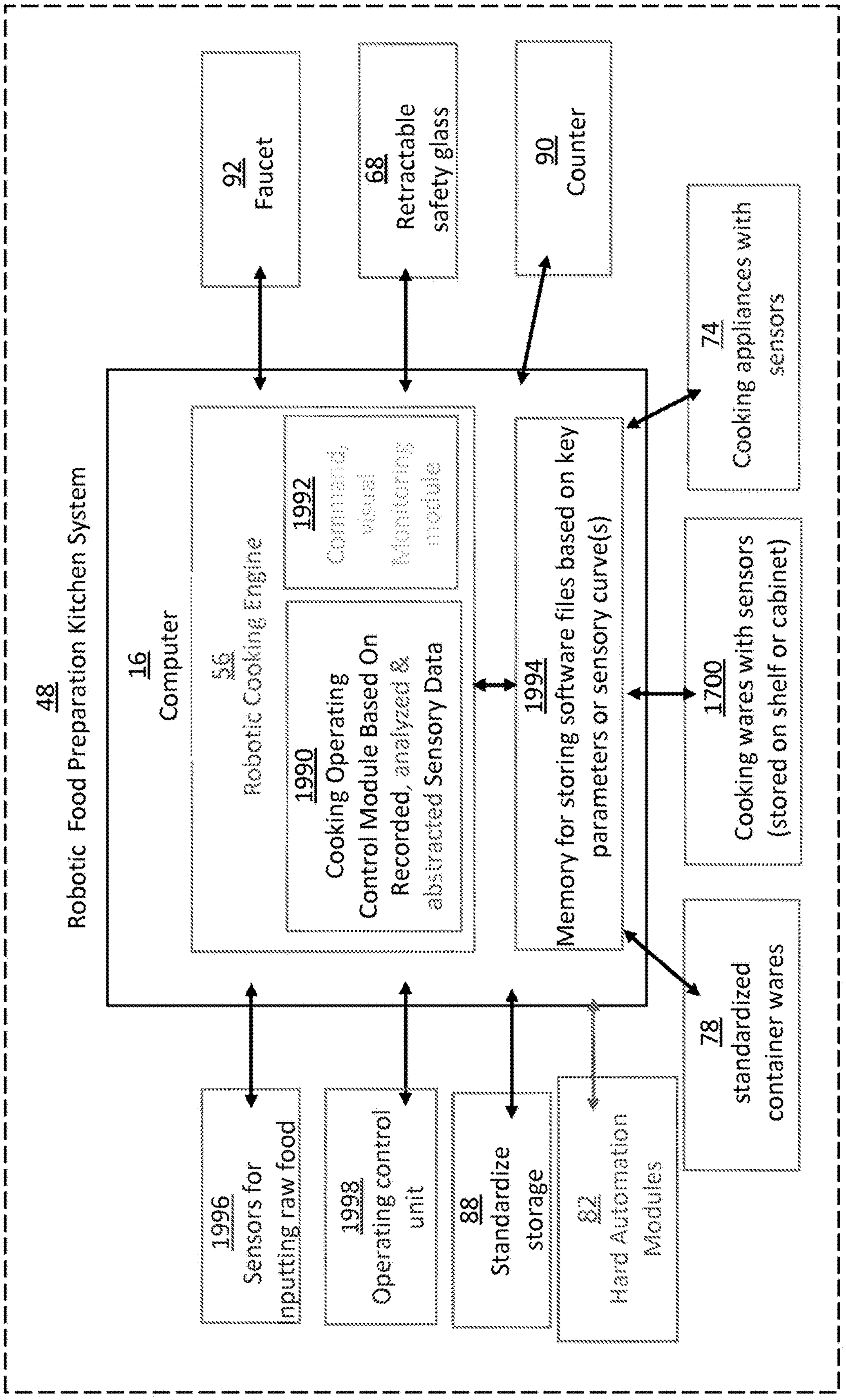
FIG. 82 is a block diagram illustrating a third embodiment of the robotic food preparation kitchen with a cooking operating control module, and a command and visual monitoring module in accordance with the present invention.

FIG. 82 depicts another embodiment of a standardized robotic food preparation kitchen system 48. The computer 16 that runs the robotic cooking (software) engine 56, which includes a cooking operations control module 1990 that processes recorded, analyzed and abstracted sensory data from the recipe script, a visual command monitoring module 1992, and associated storage media and memory 1994 to store software files consisting of sensory curves and parameter data, interfaces with multiple external devices. These external devices include, but are not limited to, an instrumented kitchen working counter 90, the retractable safety glass 68, the instrumented faucet 92, cooking appliances with embedded sensors 74, cookware 1700 with embedded sensors (stored on a shelf or in a cabinet), standardized containers and ingredient storage units 78, a computer-monitored and computer-controllable storage unit 88, multiple sensors reporting on the process of raw food quality and supply 1996, hard automation modules 82 to dispense ingredients, and an operations control unit 1998.

Figure 83:
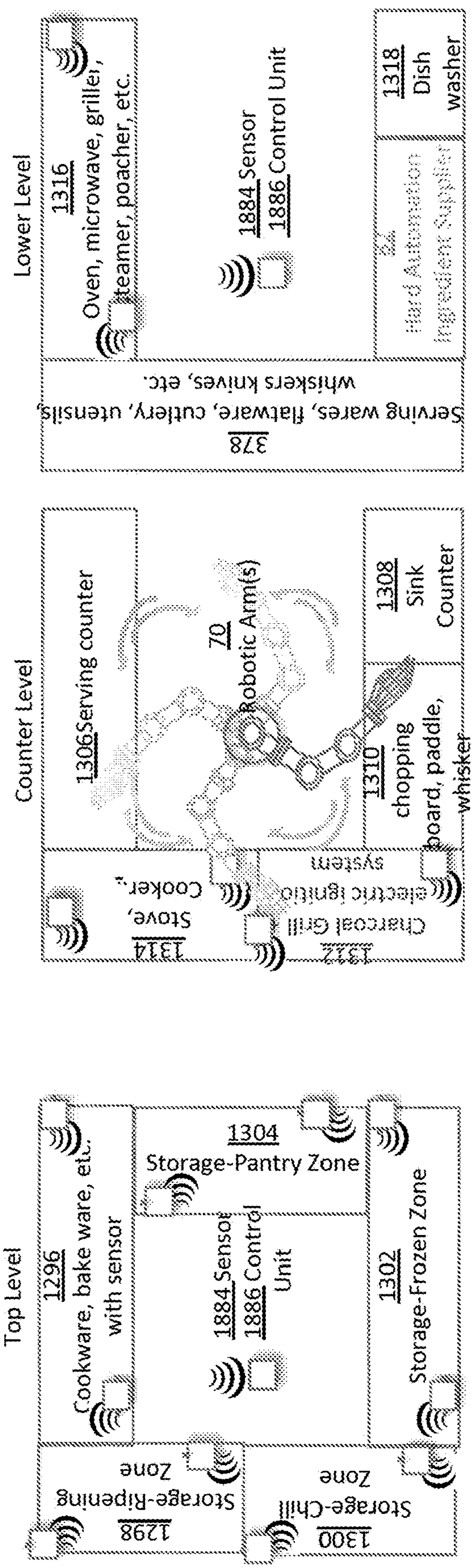
FIG. 83 is a block diagram illustrating a top plan view in the third embodiment of the robotic food preparation kitchen with robotic arm and hand motions in accordance with the present invention.

FIG. 83 depicts an embodiment of a fully instrumented robotic kitchen 2000 in top plan view. The standardized robotic kitchen is divided into three levels, namely the top level, the counter level and the lower level, with each level containing equipment and appliances that have integrally mounted sensors 1884 and computer-control units 1886.

The top level contains multiple cabinet-type modules with different units to perform specific kitchen functions by way of built-in appliances and equipment. At the simplest level this includes a cabinet volume 1296 used for storing and accessing cooking tools and utensils and other cooking and serving ware (cooking, baking, plating, etc.), a storage ripening cabinet volume 1298 for particular ingredients (e.g. fruit and vegetables, etc.), a chilled storage zone 1300 for such items as lettuce and onions, a frozen storage cabinet volume 1302 for deep-frozen items, and another storage pantry zone 1304 for other ingredients and rarely used spices, etc. Each of the modules within the top level contains sensor units 1884 providing data to one or more control units 1886, either directly or by way of one or more central or distributed control computers, to allow for computer-controlled operations.

The counter level not only houses monitoring sensors 1884 and control units 1886, but also includes the one or more robotic arms, wrists and multi-fingered hands 72, a serving counter 1306, a counter area with a sink 1308, another counter area 1310 with removable working surfaces (cutting/chopping board, etc.), a charcoal-based slatted grill 1312 and a multi-purpose area for other cooking appliances 1314, including a stove, cooker, steamer and poacher. Each of the modules within the counter level contains sensor units 1884 providing data to one or more control units 1886, either directly or by way of one or more central or distributed control computers, to allow for computer-controlled operations.

The lower level houses the combination convection oven and microwave as well as steamer, poacher and grill 1316, the dish-washer 1318, the hard automation controlled ingredient dispensers 82, and a larger cabinet volume 3=378 that holds and stores additional frequently used cooking and baking ware, as well as tableware, flatware, utensils (whisks, knives, etc.) and cutlery. Each of the modules within the lower level contains sensor units 1884 providing data to one or more control units 1886, either directly or by way of one or more central or distributed control computers, to allow for computer-controlled operations.

Figure 84:
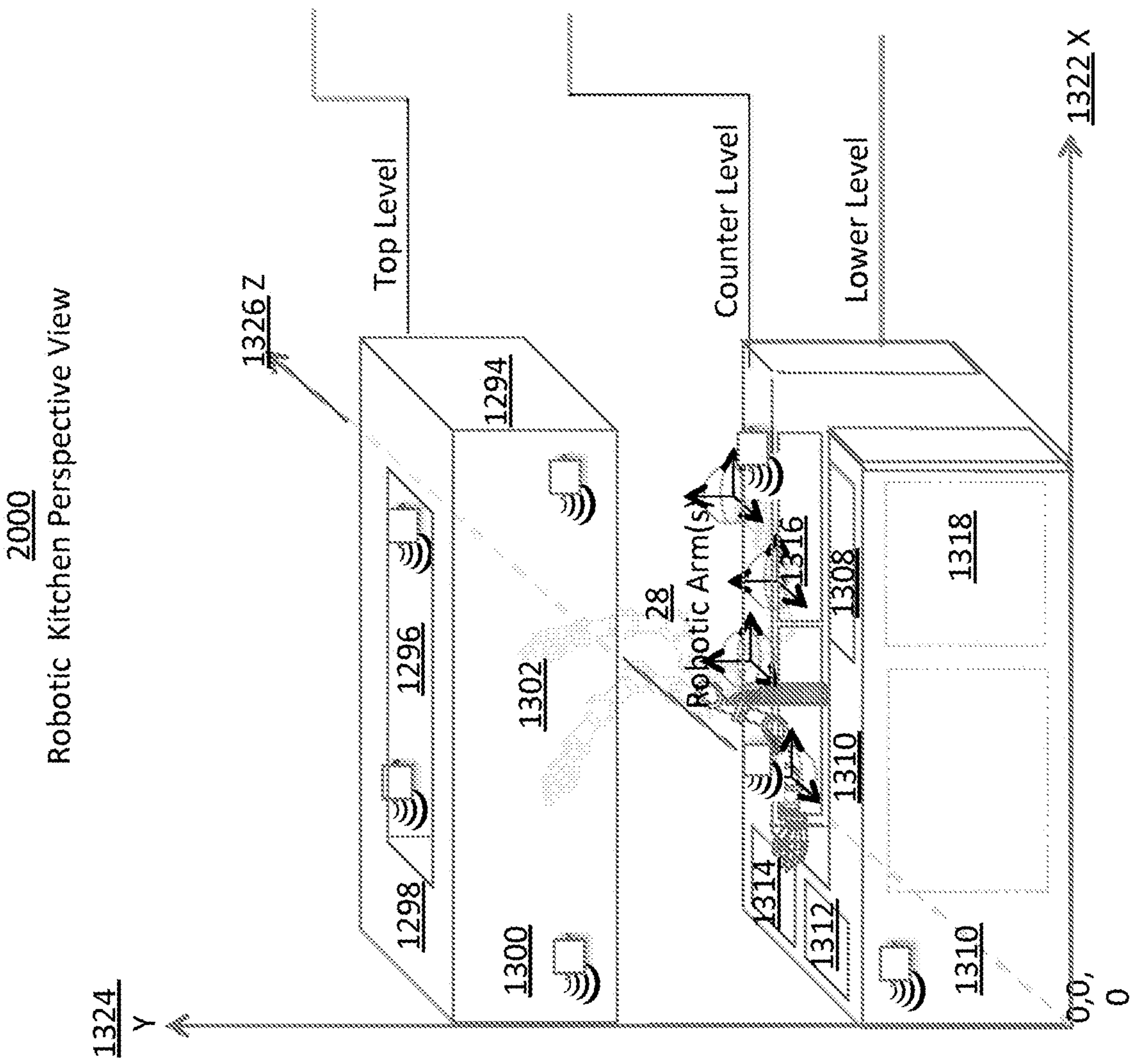
FIG. 84 is a block diagram illustrating a perspective view in the third embodiment of the robotic food preparation kitchen with robotic arm and hand motions in accordance with the present invention.

FIG. 84 depicts an embodiment of a fully instrumented robotic kitchen 2000 in perspective view, with an overlaid coordinate frame designating the x-axis 1322, the y-axis 1324 and the z-axis 1326, within which all movements and locations will be defined and referenced to the origin (0,0,0). The standardized robotic kitchen is divided in to three levels, namely the top level, the counter level and the lower level, with each level containing equipment and appliances that have integrally mounted sensors 1884 and computer-control units 1886.

The top level contains multiple cabinet-type modules with different units to perform specific kitchen functions by way of built-in appliances and equipment.

At the simplest level this includes a cabinet volume 1294 used for storing and accessing standardized cooking tools and utensils and other cooking and serving ware (cooking, baking, plating, etc.), a storage ripening cabinet volume 1298 for particular ingredients (e.g. fruit and vegetables, etc.), a chilled storage zone 1300 for such items as lettuce and onions, a frozen storage cabinet volume 86 for deep-frozen items, and another storage pantry zone 1294 for other ingredients and rarely used spices, etc. Each of the modules within the top level contains sensor units 1884 providing data to one or more control units 1886, either directly or by way of one or more central or distributed control computers, to allow for computer-controlled operations.

The counter level not only houses monitoring sensors 1884 and control units 1886, but also includes the one or more robotic arms, wrists and multi-fingered hands 72, a counter area with a sink and electronic faucet 1308, another counter area 1310 with removable working surfaces (cutting/chopping board, etc.), a charcoal-based slatted grill 1312 and a multi-purpose area for other cooking appliances 1314, including a stove, cooker, steamer and poacher. Each of the modules within the counter level contains sensor units 1884 providing data to one or more control units 1886, either directly or by way of one or more central or distributed control computers, to allow for computer-controlled operations.

The lower level houses the combination convection oven and microwave as well as steamer, poacher and grill 1315, the dish-washer 1318, the hard automation controlled ingredient dispensers 82 (not shown), and a larger cabinet volume 1310 that holds and stores additional frequently used cooking and baking ware, as well as tableware, flatware, utensils (whisks, knives, etc.) and cutlery. Each of the modules within the lower level contains sensor units 1884 providing data to one or more control units 1886, either directly or by way of one or more central or distributed control computers, to allow for computer-controlled operations.

Figure 85:
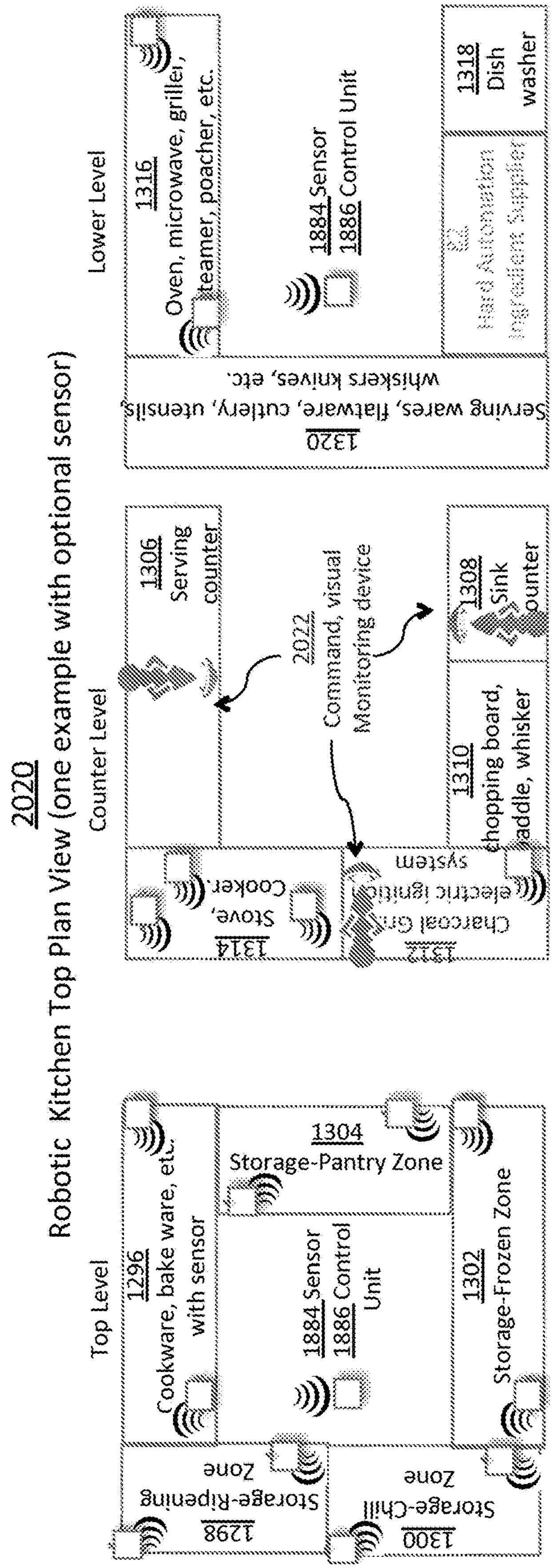
FIG. 85 is a block diagram illustrating a top plan view in the third embodiment of the robotic food preparation kitchen with a command and visual monitoring device in accordance with the present invention.

FIG. 85 depicts an embodiment of a fully instrumented robotic kitchen 2020 in top plan view. The standardized robotic kitchen is divided into three levels, namely the top level, the counter level and the lower level, with the top and lower levels containing equipment and appliances that have integrally mounted sensors 1884 and computer-control units 1886, and the counter level being fitted with one or more command and visual monitoring devices 2022.

The top level contains multiple cabinet-type modules with different units to perform specific kitchen functions by way of built-in appliances and equipment. At the simplest level this includes a cabinet volume 1296 used for storing and accessing standardized cooking tools and utensils and other cooking and serving ware (cooking, baking, plating, etc.), a storage ripening cabinet volume 1298 for particular ingredients (e.g. fruit and vegetables, etc.), a chilled storage zone 1300 for such items as lettuce and onions, a frozen storage cabinet volume 1302 for deep-frozen items, and another storage pantry zone 1304 for other ingredients and rarely used spices, etc. Each of the modules within the top level contains sensor units 1884 providing data to one or more control units 1886, either directly or by way of one or more central or distributed control computers, to allow for computer-controlled operations.

The counter level houses not only monitoring sensors 1884 and control units 1886, but also visual command monitoring devices 2020 while also including a serving counter 1306, a counter area with a sink 1308, another counter area 1310 with removable working surfaces (cutting/chopping board, etc.), a charcoal-based slatted grill 1312 and a multi-purpose area for other cooking appliances 1314, including a stove, cooker, steamer and poacher. Each of the modules within the counter level contains sensor units 1884 providing data to one or more control units 1886, either directly or by way of one or more central or distributed control computers, to allow for computer-controlled operations. Additionally, one or more visual command monitoring devices 2022 are also provided within the counter level for the purposes of monitoring the visual operations of the human chef in the studio kitchen as well as the robotic arms or human user in the standardized robotic kitchen, where data is fed to one or more central or distributed computers for processing and subsequent corrective or supportive feedback and commands sent back to the robotic kitchen for display or script-following execution.

The lower level houses the combination convection oven and microwave as well as steamer, poacher and grill 1316, the dish-washer 1318, the hard automation controlled ingredient dispensers 86 (not shown), and a larger cabinet volume 1320 that holds and stores additional frequently used cooking and baking ware, as well as tableware, flatware, utensils (whisks, knives, etc.) and cutlery. Each of the modules within the lower level contains sensor units 1884 providing data to one or more control units 1886, either directly or by way of one or more central or distributed control computers, to allow for computer-controlled operations.

Figure 86:
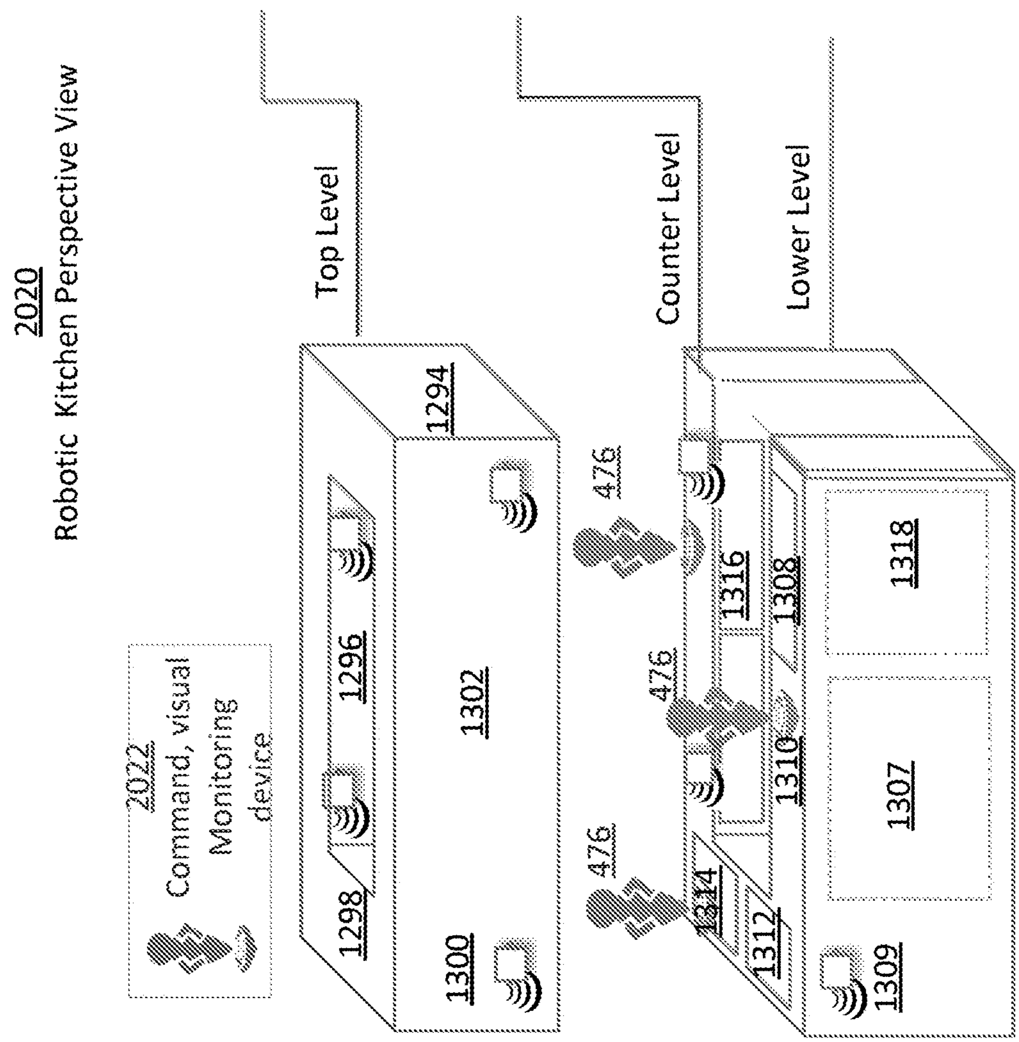
FIG. 86 is a block diagram illustrating a perspective view in the third embodiment of the robotic food preparation kitchen with a command and visual monitoring device in accordance with the present invention.

FIG. 86 depicts an embodiment of a fully instrumented robotic kitchen 2020 in perspective view. The standardized robotic kitchen is divided into three levels, namely the top level, the counter level and the lower level, with the top and lower levels containing equipment and appliances that have integrally mounted sensors 1884 and computer-control units 1886, and the counter level being fitted with one or more command and visual monitoring devices 2022.

The top level contains multiple cabinet-type modules with different units to perform specific kitchen functions by way of built-in appliances and equipment. At the simplest level this includes a cabinet volume 1296 used for storing and accessing standardized cooking tools and utensils and other cooking and serving ware (cooking, baking, plating, etc.), a storage ripening cabinet volume 1298 for particular ingredients (e.g. fruit and vegetables, etc.), a chilled storage zone 1300 for such items as lettuce and onions, a frozen storage cabinet volume 86 for deep-frozen items, and another storage pantry zone 1294 for other ingredients and rarely used spices, etc. Each of the modules within the top level contains sensor units 1884 providing data to one or more control units 1886, either directly or by way of one or more central or distributed control computers, to allow for computer-controlled operations.

The counter level houses not only monitoring sensors 1884 and control units 1886, but also visual command monitoring devices 1316 while also including a counter area with a sink and electronic faucet 1308, another counter area 1310 with removable working surfaces (cutting/chopping board, etc.), a (smart) charcoal-based slatted grill 1312 and a multi-purpose area for other cooking appliances 1314, including a stove, cooker, steamer and poacher. Each of the modules within the counter level contains sensor units 1184 providing data to one or more control units 1186, either directly or by way of one or more central or distributed control computers, to allow for computer-controlled operations. Additionally, one or more visual command monitoring devices (not shown) are also provided within the counter level for the purposes of monitoring the visual operations of the human chef in the studio kitchen as well as the robotic arms or human user in the standardized robotic kitchen, where data is fed to one or more central or distributed computers for processing and subsequent corrective or supportive feedback and commands sent back to the robotic kitchen for display or script-following execution.

The lower level houses the combination convection oven and microwave as well as steamer, poacher and grill 1316, the dish-washer 1318, the hard automation controlled ingredient dispensers 86 (not showed)s, and a larger cabinet volume 1309 that holds and stores additional frequently used cooking and baking ware, as well as tableware, flatware, utensils (whisks, knives, etc.) and cutlery. Each of the modules within the lower level contains sensor units 1307 providing data to one or more control units 376, either directly or by way of one or more central or distributed control computers, to allow for computer-controlled operations.

Figure 87A:
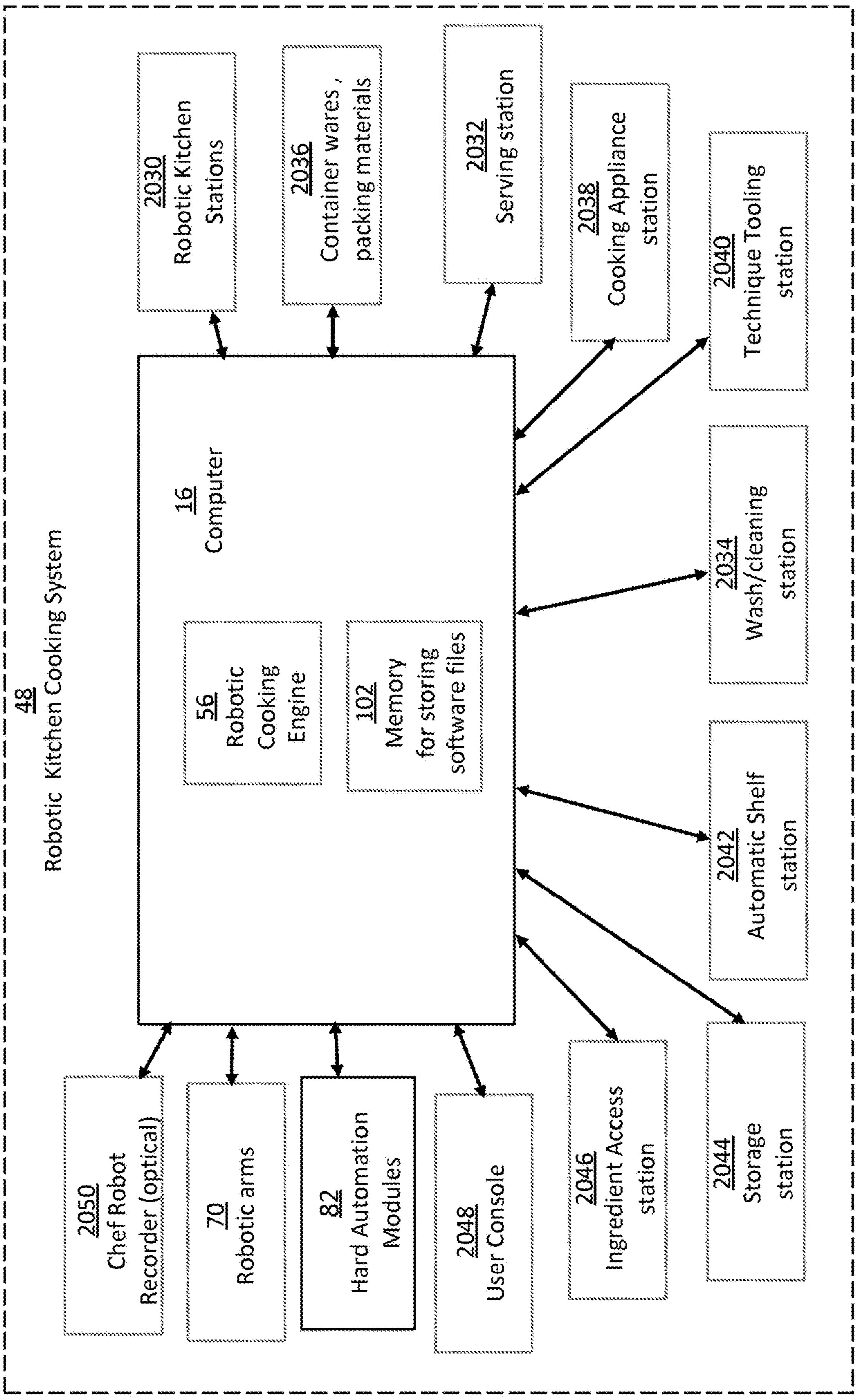
FIG. 87A is a block diagram illustrating a fourth embodiment of the robotic food preparation kitchen with a robot in accordance with the present invention.

FIG. 87A depicts another embodiment of a standardized robotic kitchen system 48. The computer 16 that runs the robotic cooking (software) engine 56 and a memory module 102 for storing recipe script data and sensory curves and parameter data files, interfaces with multiple external devices. These external devices include, but are not limited to, instrumented robotic kitchen stations 2030, instrumented serving stations 2032, an instrumented washing and cleaning station 2034, instrumented cookware 2036, computer-monitored and computer-controllable cooking appliances 2038, special-purpose tools and utensils 2040, an automated shelf station 2042, an instrumented storage station 2044, an ingredient retrieval station 2046, a user console interface 2048, dual robotic arms 70, hard automation modules 82 to dispense ingredients, and a chef-recording device 2050.

Figure 87B:
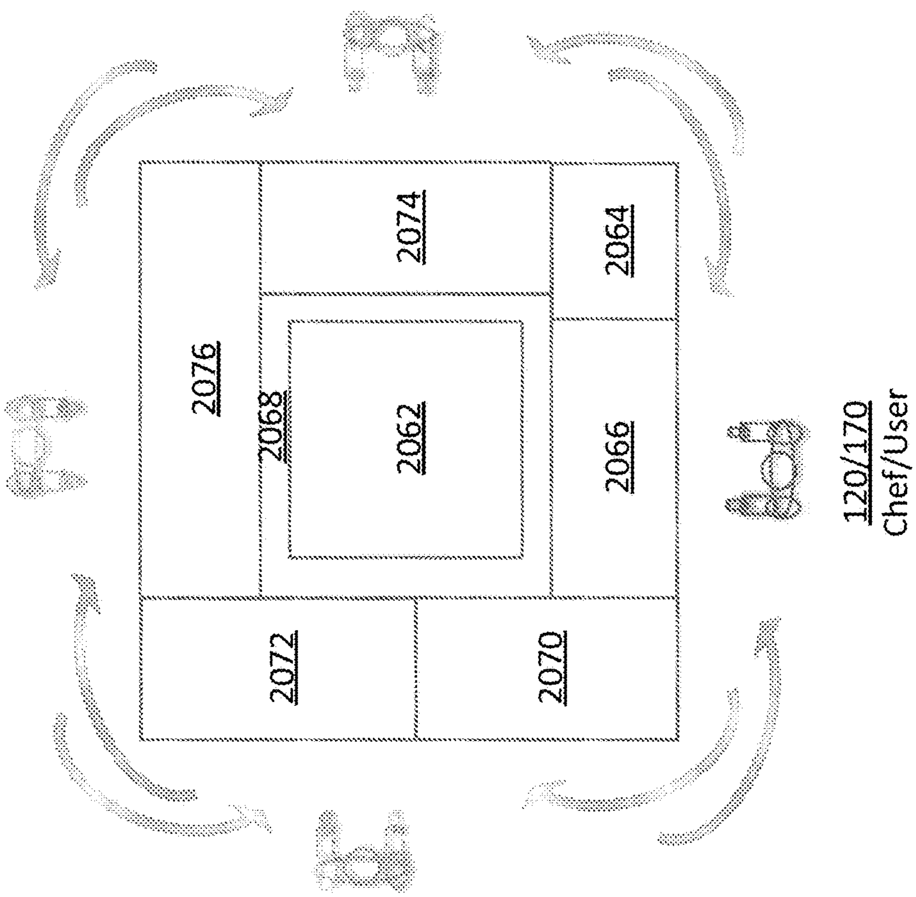
FIG. 87B is a block diagram illustrating a top plan view in the fourth embodiment of the robotic food preparation kitchen with the humanoid robot in accordance with the present invention.

FIG. 87B depicts one embodiment of a robotic kitchen cooking system 2060 in plan view, where the chef 49 or home-cook user 60 can access various cooking stations from multiple (four shown here) sides. A central storage station 2062 provides for different storage areas for various food items held at different temperatures (chilled/frozen) for optimum freshness, allowing access from all sides. Along the perimeter of the square arrangement of the current embodiment, the chef 49 or user 60 can access various cooking areas with modules that include, but are not limited to, a user/chef console 2064 for laying out the recipe and overseeing the processes, an ingredient access station 2066 including a scanner, camera and other ingredient characterization systems, an automatic shelf station 2068 for cookware/baking ware/tableware, a washing and cleaning station 2070 consisting of at least a sink and dish-washer unit, a specialized tool and utensil station 2072 for specialized tools required for particular techniques used in food or ingredient preparation, a warming station 2074 for warming or chilling served dishes and a cooking appliance station 2076 consisting of multiple appliances including, but not limited to, an oven, stove, grill, steamer, fryer, microwave, blender, dehydrator, etc.

Figure 87C:
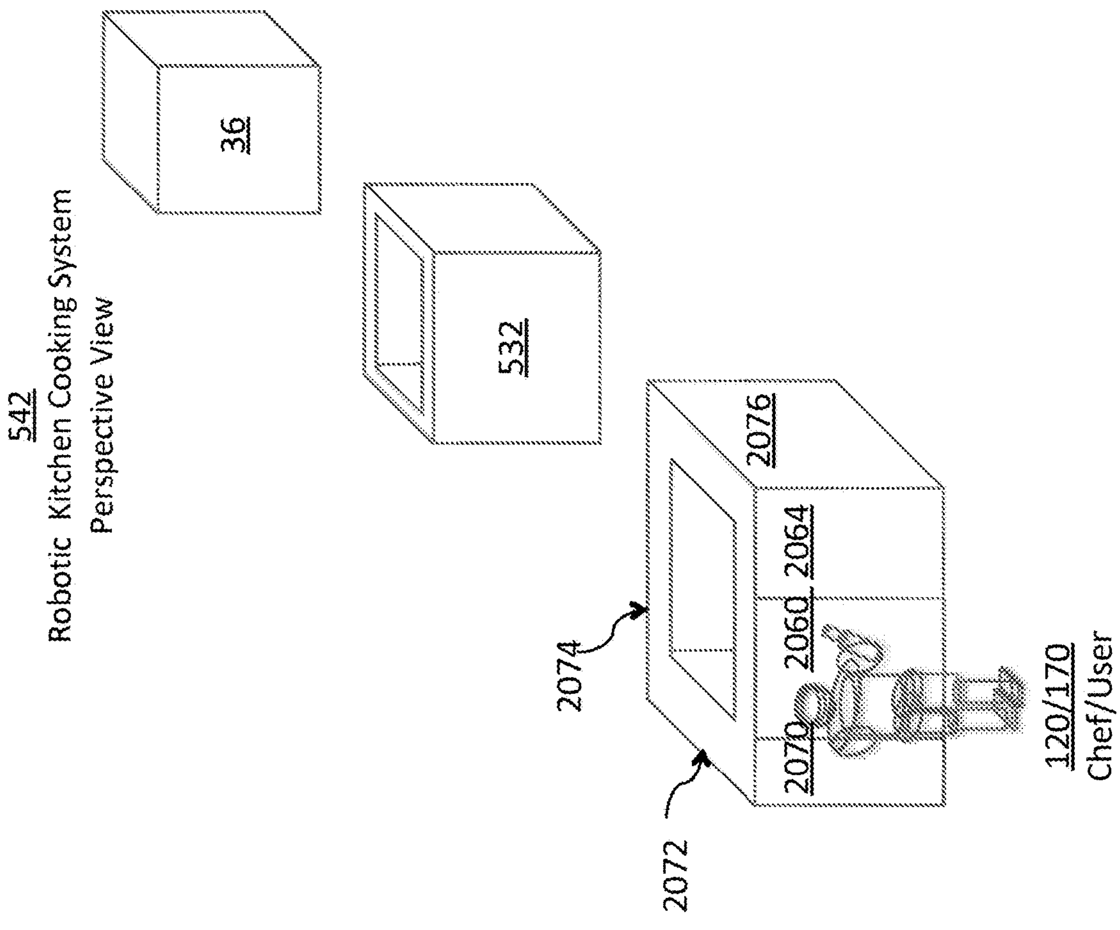
FIG. 87C is a block diagram illustrating a perspective plan view in the fourth embodiment of the robotic food preparation kitchen with the humanoid robot in accordance with the present invention.

FIG. 87C depicts a perspective view of the same embodiment of a robotic kitchen 48, allowing a chef 49 or a user 60 to gain access to multiple cooking stations and equipment from at least four different sides. A central storage station 2062 provides for different storage areas for various food items held at different temperatures (chilled/frozen) for optimum freshness, allowing access from all sides, and is located at an elevated level. An automatic shelf station 2068 for cookware/baking ware/tableware is located at a middle level beneath the central storage station 2062. At a lower level an arrangement of cooking stations and equipment is located that includes, but is not limited to, a user/chef console 2064 for laying out the recipe and overseeing the processes, an ingredient access station 2060 including a scanner, camera and other ingredient characterization systems, an automatic shelf station 2068 for cookware/baking ware/tableware, a washing and cleaning station 2070 consisting of at least a sink and dish-washer unit, a specialized tool and utensil station 2072 for specialized tools required for particular techniques used in food or ingredient preparation, a warming station 2076 for warming or chilling served dishes and a cooking appliance station 2076 consisting of multiple appliances including, but not limited to, an oven, stove, grill, steamer, fryer, microwave, blender, dehydrator, etc.

Figure 88:
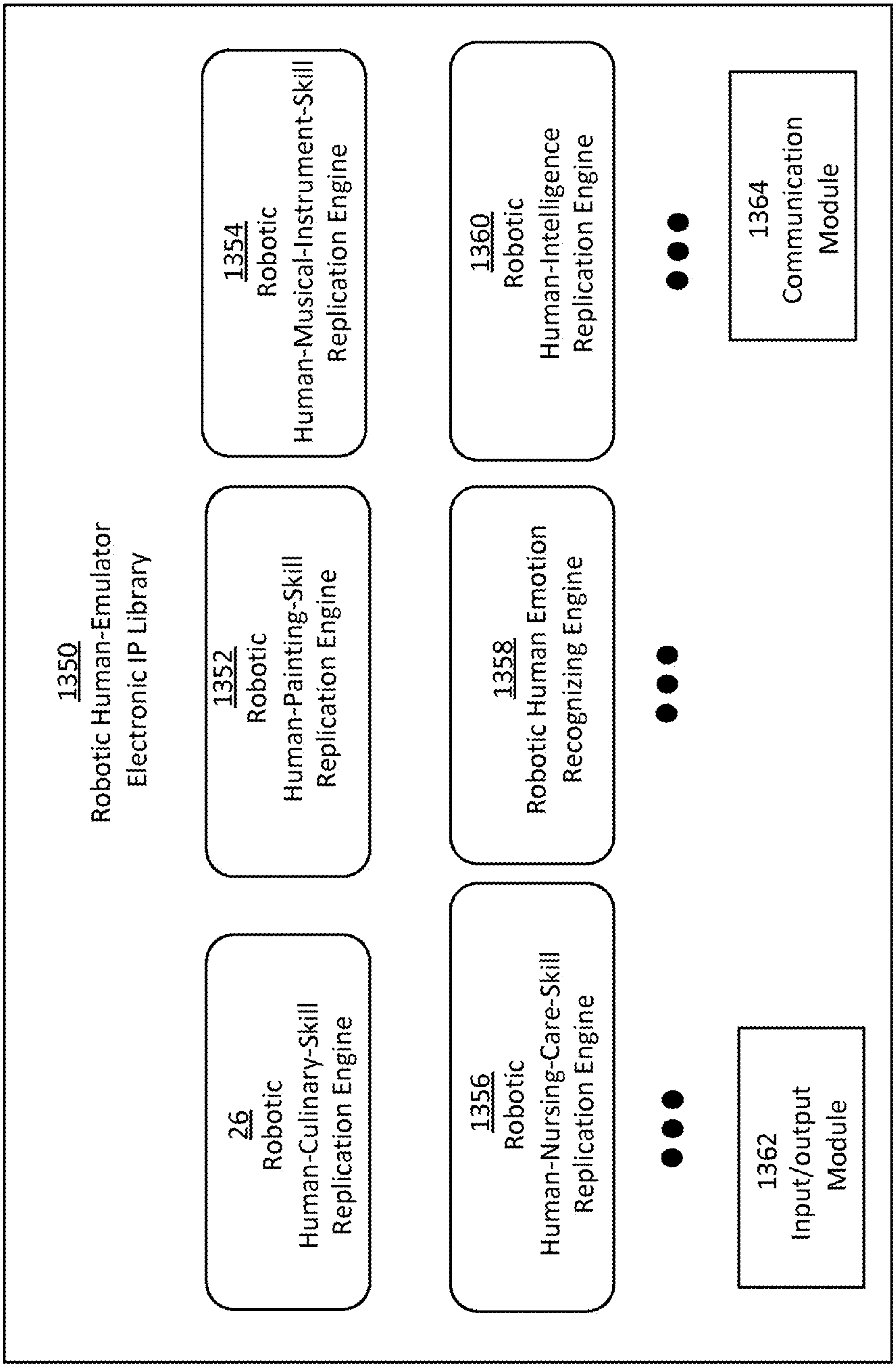
FIG. 88 is a block diagram illustrating a robotic human-emulator electronic intellectual property (IP) library in accordance with the present invention.

FIG. 88 is a block diagram Illustrating a robotic human-emulator electronic intellectual property (IP) library 2100. The robotic human-emulator electronic IP library 2100 covers the various concepts in which the robotic apparatus is used as a means to replicate a human's particular skill set. More specifically, the robotic apparatus, which includes the pair of robotic hands 70 and the robotic arms 72, serves to replicate a set of specific human skills. In some way, the transfer to intelligence from a human can be captured through the use of the human's hands; the robotic apparatus then replicates the precise movements of the recorded movements in obtaining the same result. The robotic human-emulator electronic IP library 2100 includes a robotic human-culinary-skill replication engine 56, a robotic human-painting-skill replication engine 2102, a robotic human-musical-instrument-skill replication engine 2102, a robotic human-nursing-care-skill replication engine 2104, a robotic human-emotion recognizing engine 2106, a robotic human-intelligence replication engine 2108, an input/output module 2110, and a communication module 2112. The robotic human emotion recognizing engine 1358 is further described with respect to FIGS. 90, 91, 92 and 92.

Figure 89:
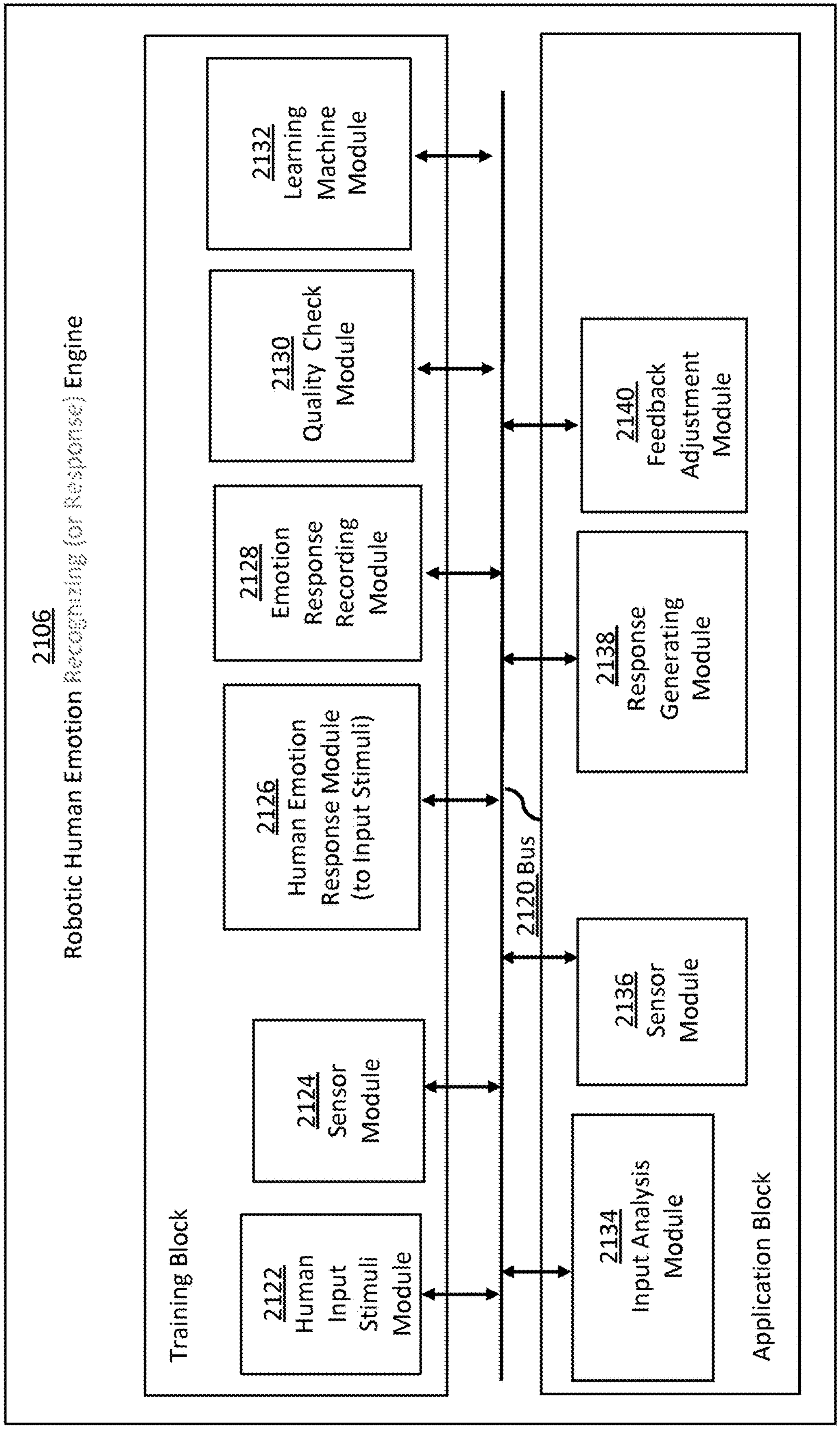
FIG. 89 is a block diagram illustrating a robotic human emotion recognition engine in accordance with the present invention.

FIG. 89 is a robotic human-emotion recognizing (or response) engine 2106, which includes a training block coupled to an application block via the bus 2120. The training block contains a human input stimuli module 2122, a sensor module 2124, a human emotion response module (to input stimuli) 2126, an emotion response recording module 2128, a quality check module 2130, and a learning machine module 2132. The application block contains an input analysis module 2134, a sensor module 2136, a response generating module 2138, and a feedback adjustment module 2140.

Figure 90:
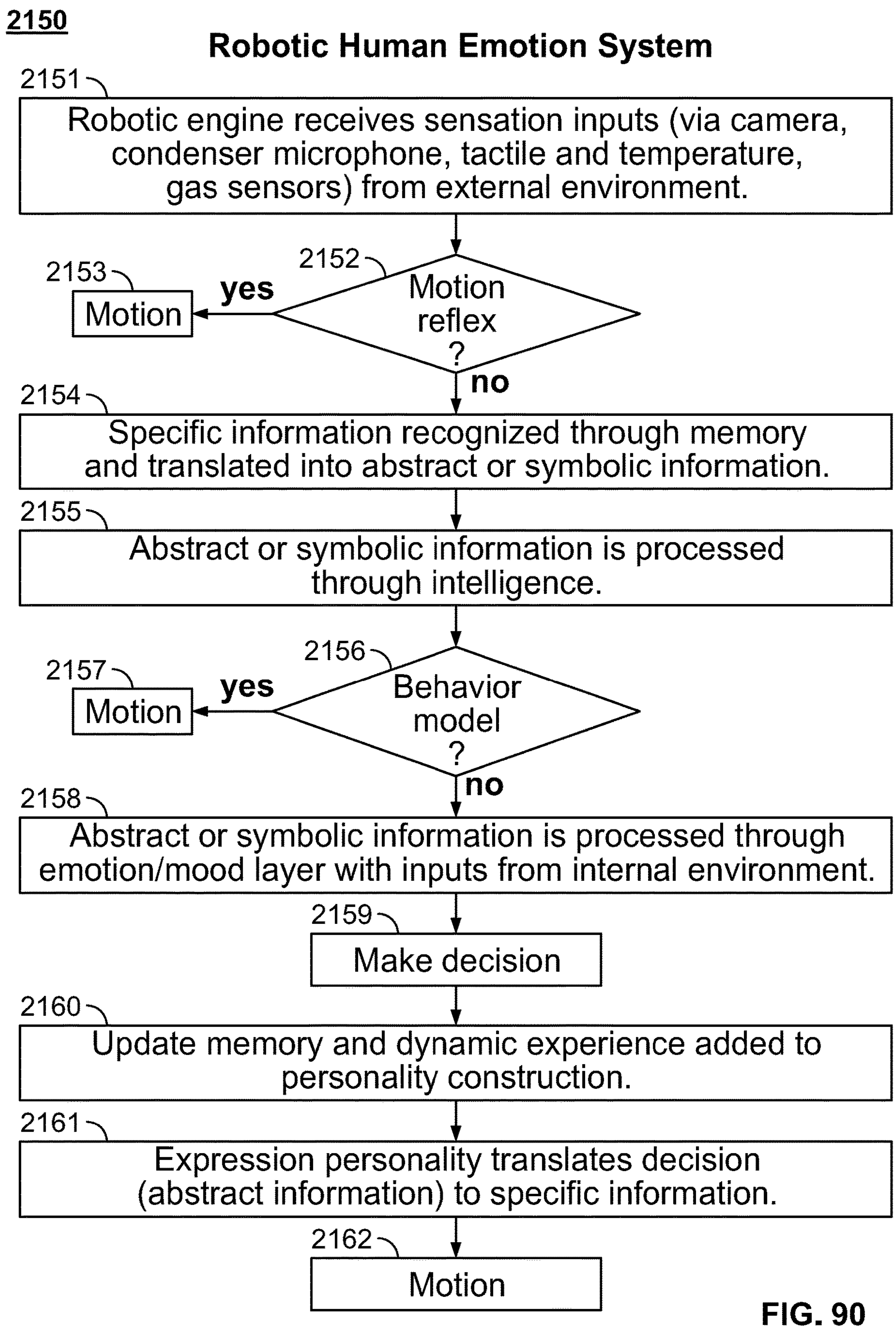
FIG. 90 is a flow diagram illustrating the process of a robotic human emotion engine in accordance with the present invention.

FIG. 90 is a flow diagram illustrating the process and logic flow of a robotic human emotion system 2150. In its first step 2151, the (software) engine receives sensory input from a variety of sources akin to the senses of a human, including vision, audible feedback, tactile and olfactory sensor data from the surrounding environment. In the decision step 2152, the decision is made whether to create a motion reflex, either resulting in a reflex motion 2153 or, if no reflex motion is required, step 2154 is executed, where specific input information or patterns or combinations thereof are recognized based on information or patterns stored in memory, which are subsequently translated into abstract or symbolic representations. The abstract and/or symbolic information is processed through a sequence of intelligence loops, which can be experience-based. Another decision step 2156 decides on whether a motion-reaction 2157 should be engaged based on a known and pre-defined behavior model and, if not, step 12158 is undertaken. In step 2158 the abstract and/or symbolic information is then processed through another layer of emotion- and mood-reaction behavior loops with inputs provided from internal memories, which can be formed through learning. Emotion is broken down into a mathematical formalism and programmed into robot, with mechanisms that can be described, and quantities that can be measured and analyzed (e.g. by capturing facial expressions of how quickly a smile forms and how long it lasts to differentiate between a genuine and a polite smile, or by detecting emotion based on the vocal qualities of a speaker, where the computer measures the pitch, energy and volume of the voice, as well as the fluctuations in volume and pitch from one moment to the next). There will thus be certain identifiable and measurable metrics to an emotional expression, where these metrics in the behavior of an animal or the sound of a human speaking or singing will have identifiable and measurable associated emotion attributes. Based on these identifiable and measurable metrics, the emotion engine can make a decision 2159 as to which behavior to engage, whether pre-learned or newly learned. The engaged or executed behavior and its effective result are updated in memory and added to the experience personality and natural behavior database 2160. In a follow-on step 2161, the experience personality data is translated into more human-specific information, which then allows him or her to execute the prescribed or resultant motion 2162.

Figure 91A:
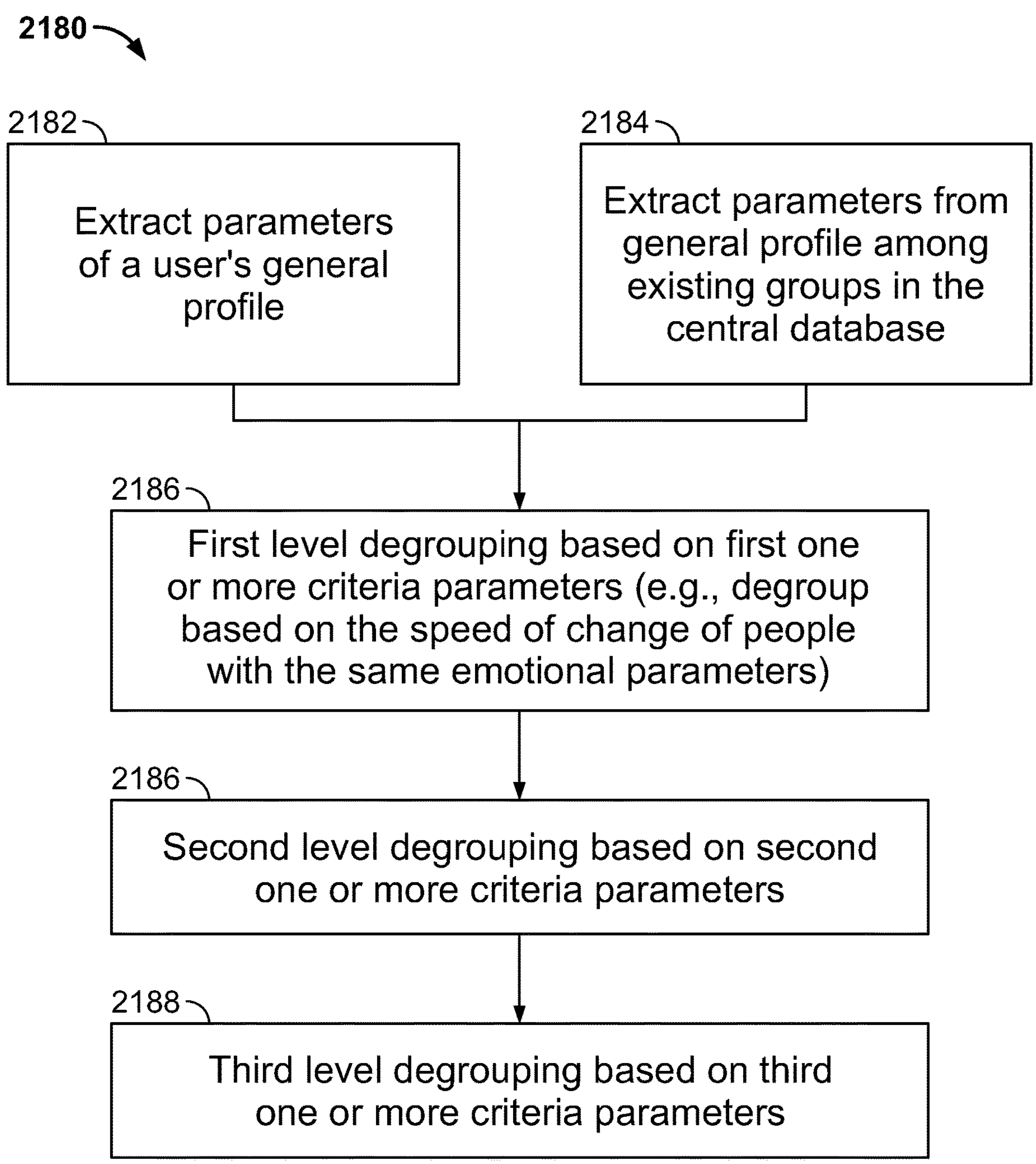
FIGS. 91A-91C are flow diagrams illustrating the process of comparing a person's emotional profile against a population of emotional profiles with hormones, pheromones and other parameters in accordance with the present invention.
Figure 91B:
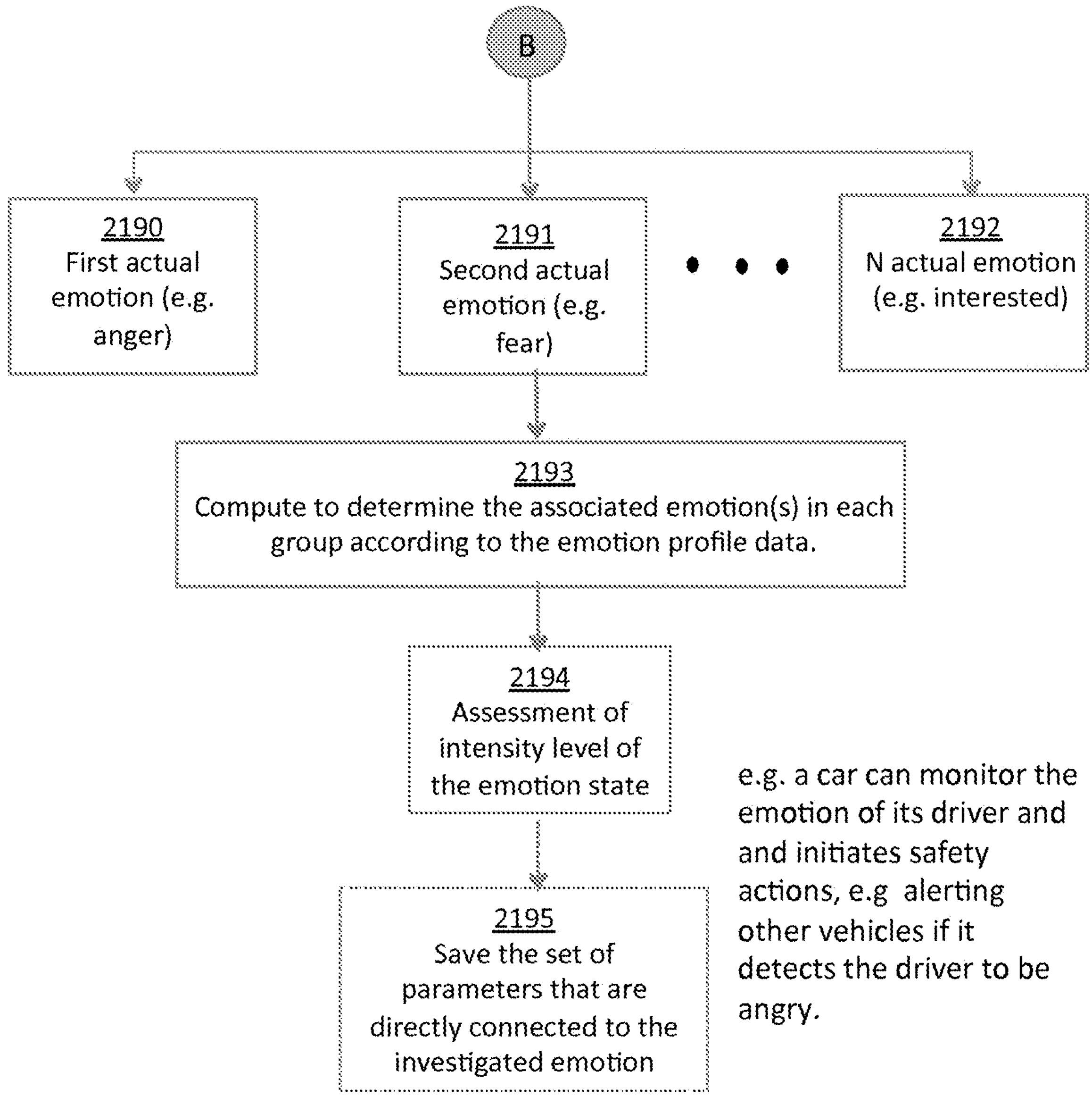
Figure 91C:
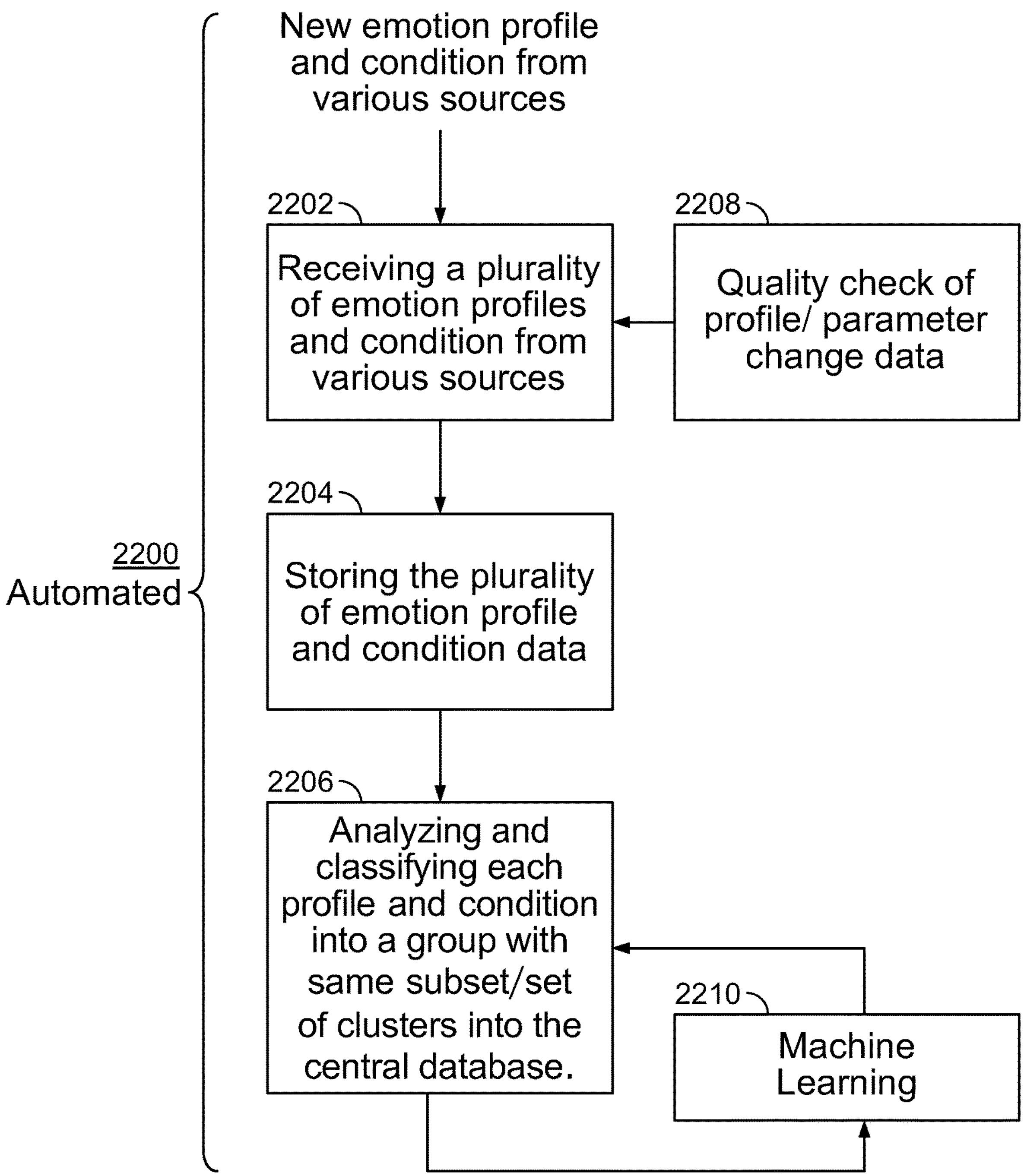

FIGS. 91A-C are flow diagrams illustrating the process of comparing a person's emotional profile against a population of emotional profiles with hormones, pheromones and other. FIG. 91A describes the process of the emotional profile application, where a person's emotion parameters are monitored and extracted in 2182 from a user's general profile 2184, and based on a stimulus input, parameter value changes from a baseline value derived from a segmented timeline, taken and compared to those for an existing larger group under similar conditions. Ate step 1804, First level degrouping based on one or more criteria parameters (e.g., degroup based on the speed of change of people with the same emotional parameters). The process continues the emotion parameter degrouping and segregation into further steps of emotional parameter comparisons, which can include continued levels represented by a set of pheromones 1808, a set of micro-expressions 1809, the person's heart rate and perspiration 1810, pupil dilation 1811, observed reflexive movements 1812, awareness of overall body temperature 1813, and perceived situational pressure 1814. The degrouped emotion parameters are then used to determine a similar grouping of parameters 1815 for comparison purposes.

FIG. 91B depicts all the individual emotion groupings such as immediate emotions 1820 such as anger, secondary emotions 1821 such as fear, all the way through to N actual emotions. The next step 1823 then computes the associated emotion(s) in each group according to the associated emotional profile data, leading to the assessment 1824 of the intensity level of the emotional state, which allows the engine to then decide on the appropriate action 1825.

FIG. 91C depicts the automated process 1830 of mass group emotional profile development and learning. The process involves receiving new multi-source emotional profile and condition inputs from various sources 1831, with an associated quality-check of profile/parameter data change 1832. The plurality of the emotional profile data is stored in step 1833 and, using multiple machine learning techniques 1835, an iterative loop 1834 of analyzing and classifying each profile and data set into various groupings with matching (sub-)sets in the central database is carried out.

FIG. 92A is a block diagram illustrating the emotional detection and analysis 2220 of a person's emotional state by monitoring a set of hormones, a set of pheromones, and other key parameters. A person's emotional state can be detected by monitoring and analyzing the person's physiological signs, under a defined condition with internal and/or external stimulus, and assessing how these physiological signs change over a certain timeline. One embodiment of the degrouping process is based on one or more criteria parameters (e.g., degroup based on the speed of change of people with the same emotional parameters).

In one embodiment the emotional profile can be detected via machine learning methods based on statistical classifiers where the inputs are any measured levels of pheromones, hormones, or other features such as visual or auditory cues. If the set of features is $\{x_1, x_2, x_3, \ldots, x_n\}$ represented as a vector and y represents the emotional state, then the general form of an emotion-detection statistical classifier is:

$$y = \underset{j,l}{\operatorname{argmin}}\left[\left(\sum_i \left\|y_i - f_{j,p_l}(\vec{x}_i)\right\|\right) + \beta(f_j, p_l)\right]$$

Where the function f is a decision tree, a neural network, a logistic regressor, or other statistical classifier described in the machine learning literature. The first term minimizes the empirical error (the error detected while training the classifier) and the second term minimizes the complexity—e.g. Occam's razor, finding the simplest function and set of parameters p for that function that yield the desired result.

Additionally, in order to determine which pheromones or other features make the most difference (add the most value) to predicting emotional state, an active-learning criterion can be added, generally expressed as:

$$\underset{\vec{x}_i \in \{\vec{x}_{k+1}, \ldots, \vec{x}_n\}}{\operatorname{argmin}} \left(L\left(\hat{f}(\vec{x}_{test}, \hat{y}_{test})\right) \mid \vec{x}_i \cup \{\vec{x}_1, \ldots, \vec{x}_k\}\right)$$

Where L is a "loss function", f is the same statistical classifier as in the previous equation, and y-hat is the known outcome. We measure whether the statistical classifier performs better (smaller loss function) by addition new features, and if so keep them, otherwise not.

Parameters, values and quantities that evolve over time can be assessed to create a human emotional profile by detecting the change or transformation from one moment to the next. There are identifiable qualities to an emotional expression. A robot with emotions in response to its environment could make quicker and more effective decisions, e.g. when a robot is motivated by fear or joy or desire it might make better decisions and attain the goals more effectively and efficiently.

The robotic emotion engine replicates the human hormone emotions and pheromone emotions, either individually or in combination. Hormone emotions refer to how hormones change inside of a person's body and how that affects a person's emotions. Pheromone emotions refer to pheromones that are outside a person's body, such as smell, that affect a person's emotions. A person's emotional profile can be constructed by understanding and analyzing the hormone and pheromone emotions. The robotic emotion engine attempts to understand a person's emotions such as anger and fear by using sensors to detect a person's hormone and pheromone profile.

There are nine key physiological sign parameters to be measured in order to build a person's emotional profile: (1) sets of hormones 2221, which are secreted internally and trigger various biochemical pathways that cause certain effects, e.g. adrenalin and insulin are hormones, (2) sets of pheromones 2222, which are secreted externally, and have an effect on another person in a similar way, e.g. androstenol, androstenone and androstadienone, (3) micro expression 2223, which is a brief, involuntary facial expression shown by humans according to emotions experienced, (4) the heart rate 2224 or heart beat, e.g., when a person's heart rate increases, (5) sweat 2225 (e.g., goose bumps) e.g. face blushes and palms get sweaty and in the state of being excited or nervous, (6) pupil dilation 2226 (and iris sphincter, biliary muscle), e.g. pupil dilation for a short time in response to feelings of fear, (7) reflex movement v7, which is the movement/action primarily controlled by the spinal arc, as a response to an external stimulus, e.g. jaw jerk reflex, (8) body temperature 2228 (9) pressure 2229. The analysis 2230 on how these parameters change over a certain time 2231 may reveal a person's emotional state and profile.

Figure 92B:
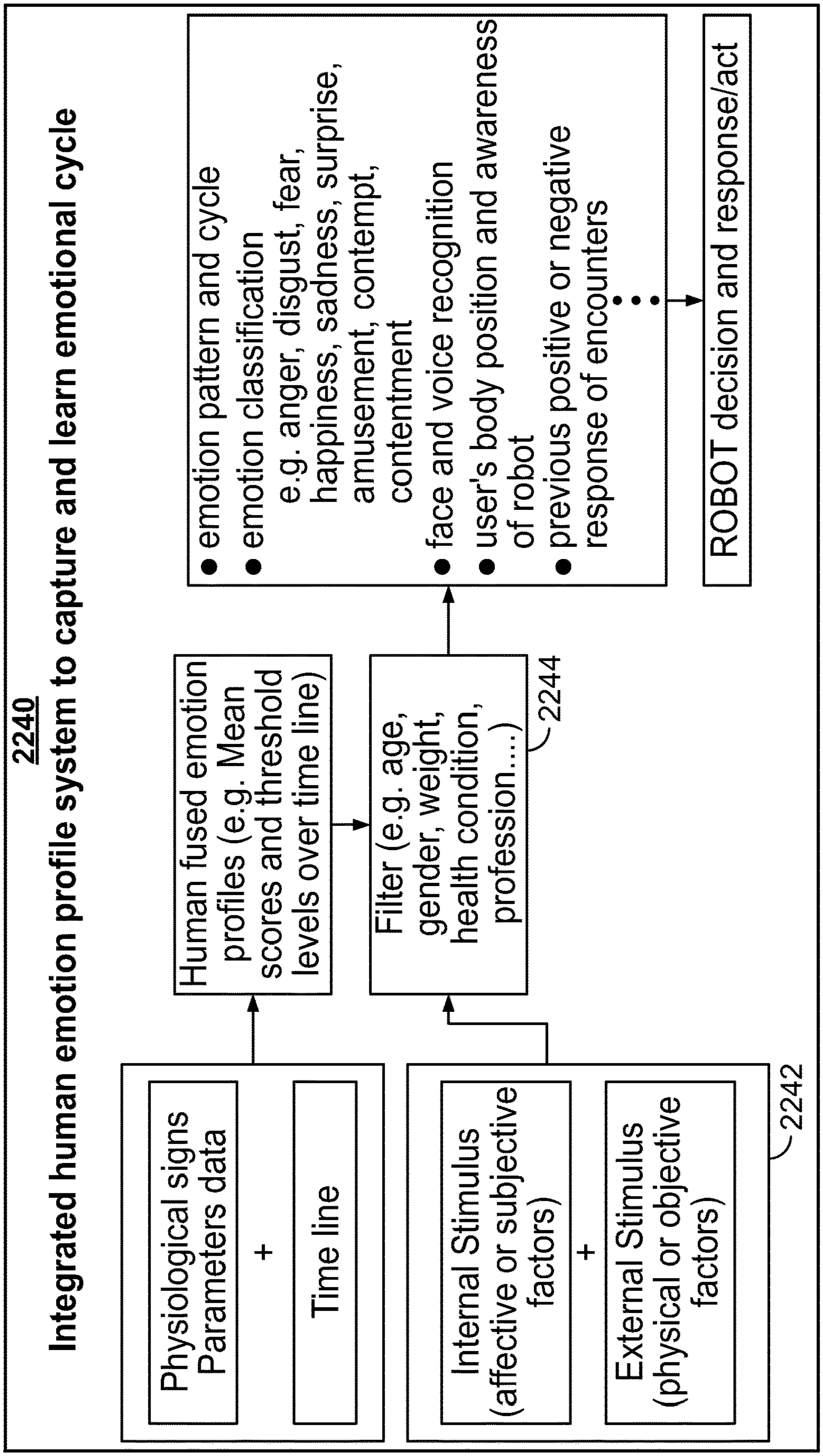
FIG. 92B is a block diagram illustrating a robot assessing and learning about a person's emotional behavior in accordance with the present invention.

FIG. 92B is a block diagram illustrating a robot 1590 assessing and learning about a person's emotional behavior. The parameter readings are analyzed 2240 and divided into emotion and/or non-emotional responses, with internal stimulus 2242 and/or external stimulus 2244, e.g. pupillary light reflex is only at the level of the spinal cord, pupil size can change when a person is angry, in pain, or in love, whereas involuntary responses generally involve the brain as well. Use of central nervous system stimulant drugs and some hallucinogenic drugs can cause dilation of the pupils.

Figure 93:
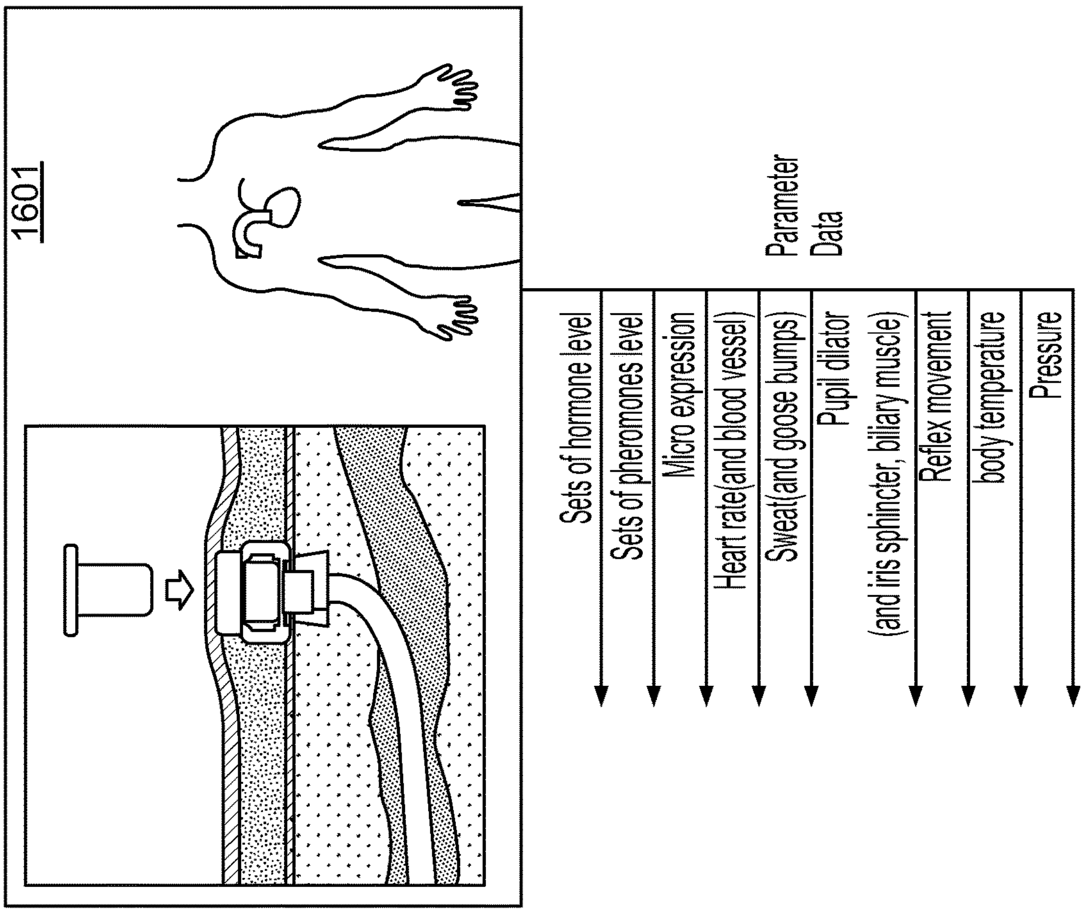
FIG. 93 is a block diagram illustrating a port device implanted in a person to detect and record the person's emotional profile in accordance with the present invention.

FIG. 93 is a block diagram illustrating a port device 2230 implanted in a person to detect and record the person's emotional profile. When measuring the physiological signs change, a person can monitor and record the emotional profile for a time period by pressing a button with a first tag on the time at which the change of emotion has started and touch the button again with a second tag when the emotion change has concluded. This process enables a computer to assess and learn about a person's emotional profile based on the change in emotion parameters. With data/information collected from mass amount of users the computer classifies all changes associated with each emotion and mathematically finds the significant and specific parameter changes that are attributable to particular emotion characteristics.

When a user experiences an emotion or mood swing, physiological parameters such as hormone, heart rate, sweat, pheromones can be detected and recorded with a port connecting to a person's body, above the skin and directly to the vein. The start time and end time of the mood change can be determined by the person himself or herself as the person's emotional state changes. For example, a person initiates four manual emotion cycles and creates four timelines within a week, and as determined by the person, the first one lasts 2.8 hour from the time he tags the start till the time he tags the end. The second cycle last for 2 hours, the third one last for 0.8 hours, and the fourth one last for 1.6 hours.

Figure 94A:
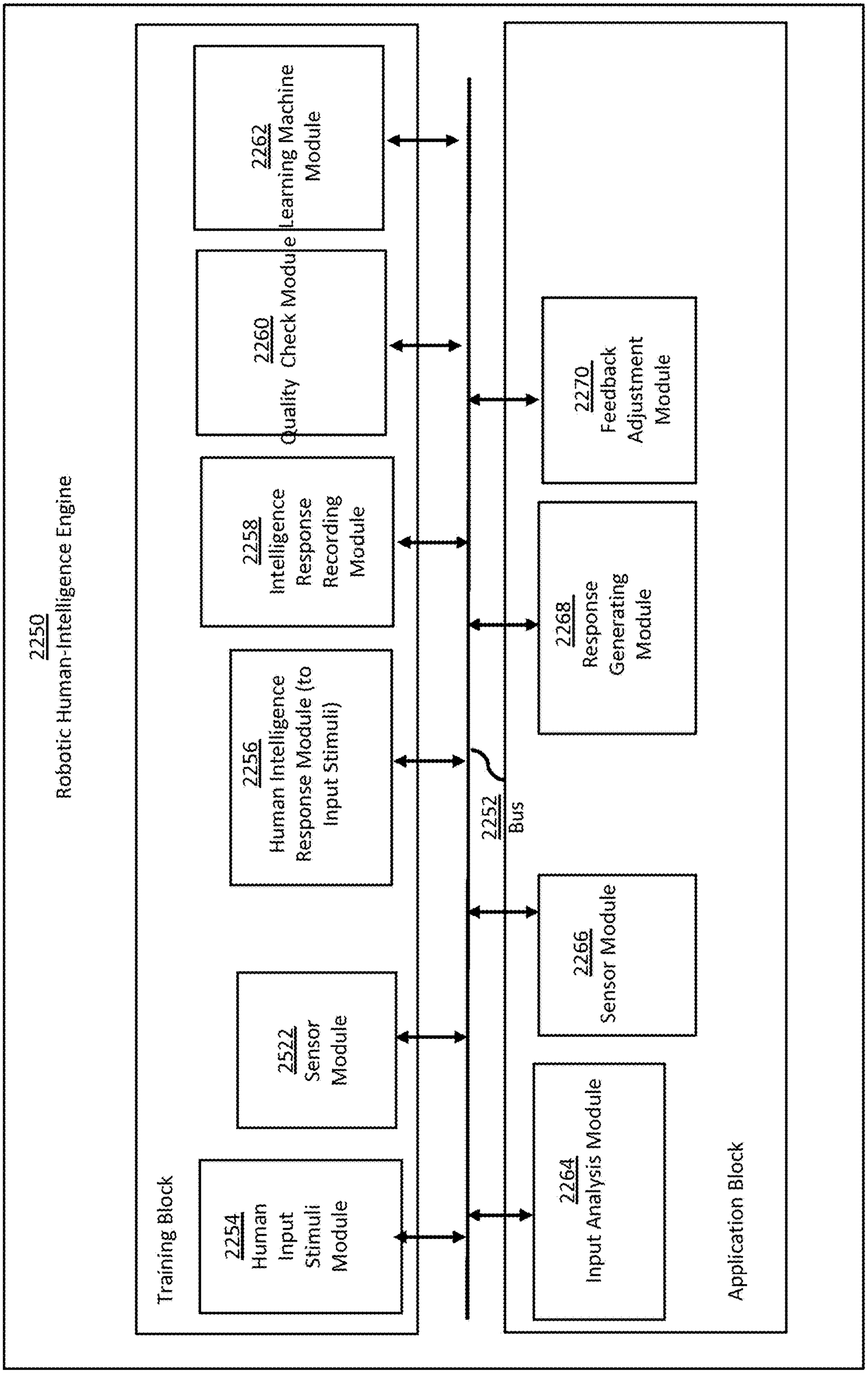
FIG. 94A is a block diagram illustrating a robotic human intelligence engine in accordance with the present invention.

FIG. 94A depicts a robotic human-intelligence engine 2250. In the replication engine 1360, there are two main blocks, including a training block and an application block, both containing multiple additional modules all interconnected to each other over a common inter-module communication bus 72. The training block of the human-intelligence engine contains further modules, including, but not limited to, a sensor input module 1404, a human input stimuli module 1402, a human intelligence response module 1420 that reacts to input stimuli, an intelligence response recording module 1422, a quality check module 1410 and a learning machine module 1412. The application block of the human-intelligence engine contains further modules, including, but not limited to, an input analysis module 1414, a sensor input module 1404, a response generating module 1416, and a feedback adjustment module 1418.

Figure 94B:
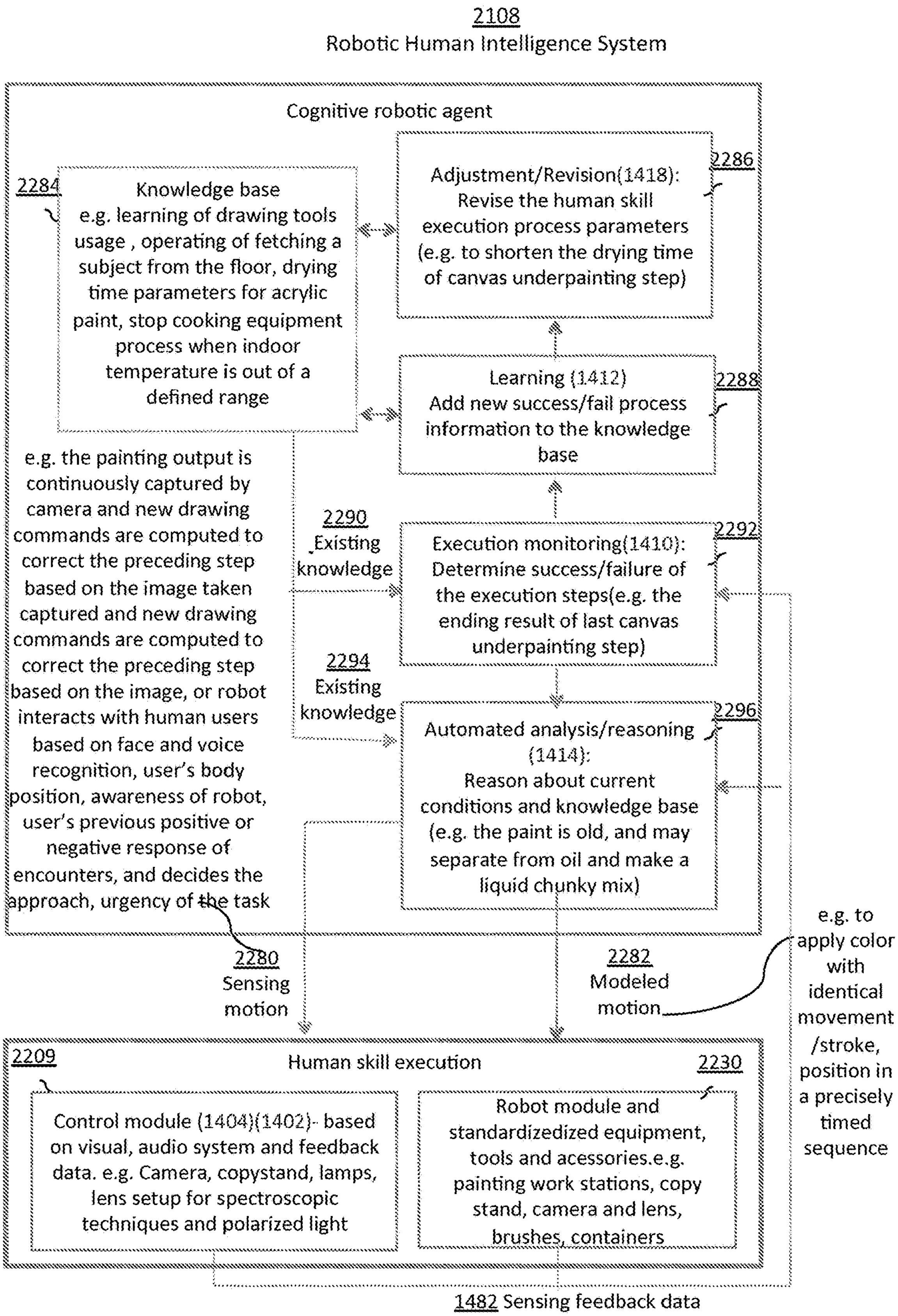
FIG. 94B is a flow diagram illustrating the process of a robotic human intelligence engine in accordance with the present invention.

FIG. 94B depicts the architecture of the robotic human intelligence system 1136. The system is split into both the cognitive robotic agent and the human skill execution module. Both modules share sensing feedback data 1482, as well as sensed motion data 1538 and modeled motion data 1539. The cognitive robotic agent module includes, but is not necessarily limited to, modules that represent a knowledge database 1531, interconnected to an adjustment and revision module 1534, with both being updated through a learning module 1535. Existing knowledge 1532 is fed into the execution monitoring module 1536 as well as existing knowledge 1533 being fed into the automated analysis and reasoning module 1537, where both receive sensing feedback data 1482 from the human skill execution module, with both also providing information to the learning module 1535. The human skill execution module consists of both a control module 1138 that bases its control signals on collecting and processing multiple sources of feedback (visual and auditory), as well as a module 1541 with a robot utilizing standardized equipment, tools and accessories.

Figure 95A:
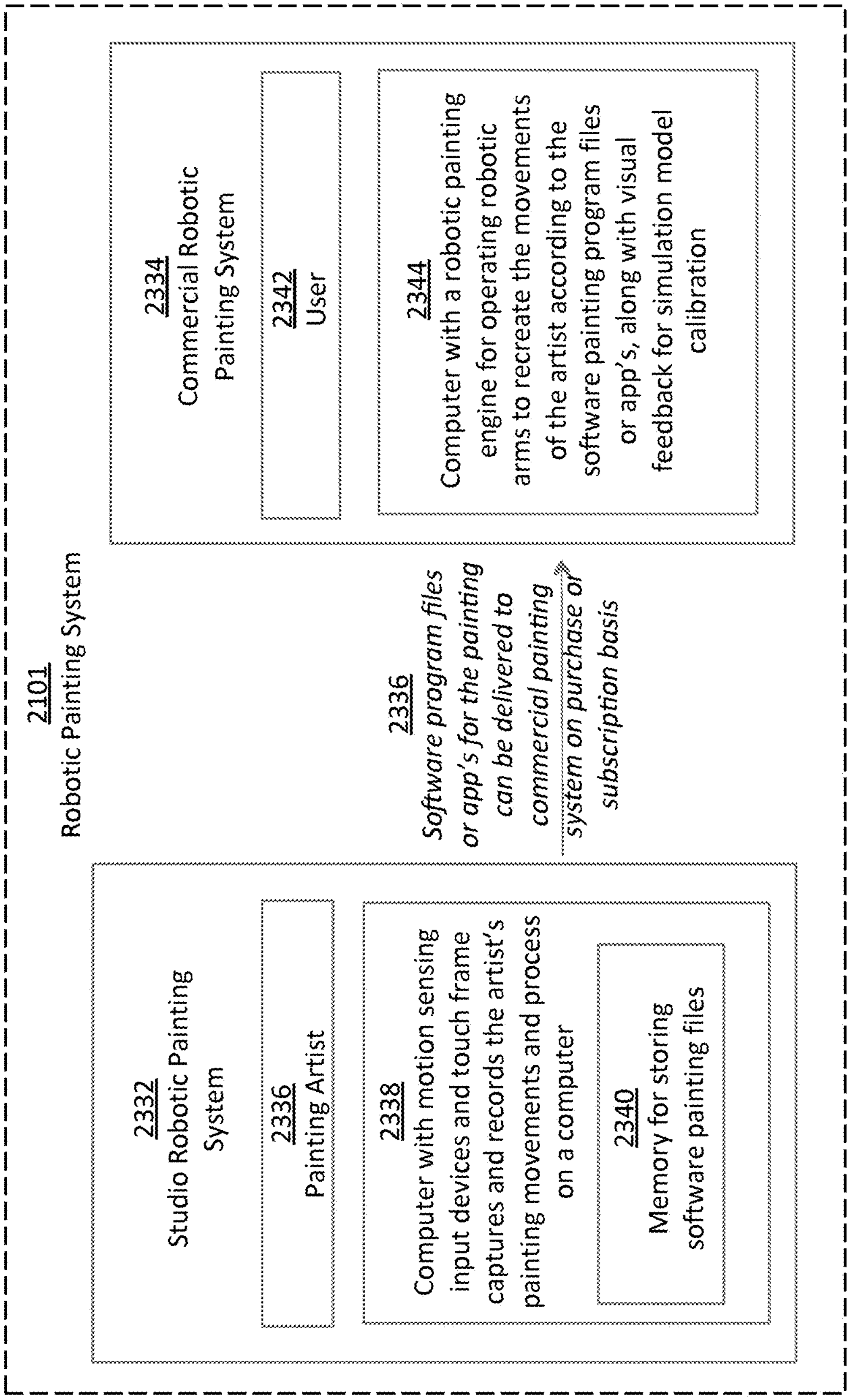
FIG. 95A is a block diagram illustrating a robotic painting system in accordance with the present invention.

FIG. 95A depicts the architecture for a robotic painting system 1440. Included in this system are both a studio robotic painting system 1441 and a commercial robotic painting system 1445, communicatively connected 1444 to allow software program files or applications for robotic painting to be delivered from the studio robotic painting system 1441 to the commercial robotic painting system 1445 based on a single-unit purchase or subscription-based payment basis. The studio robotic painting system 1441 consists of a (human) painting artist 1442 and a computer 1443 that is interfaced to motion and action sensing devices and painting-frame capture sensors to capture and record the artist's movements and processes, and store in memory 1380 the associated software painting files. The commercial robotic painting system 1445 is comprised of a user 1446 and a computer 1447 with a robotic painting engine capable of interfacing and controlling robotic arms to recreate the movements of the painting artist 1442 according to the software painting files or applications along with visual feedback for the purpose of calibrating a simulation model.

Figure 95B:
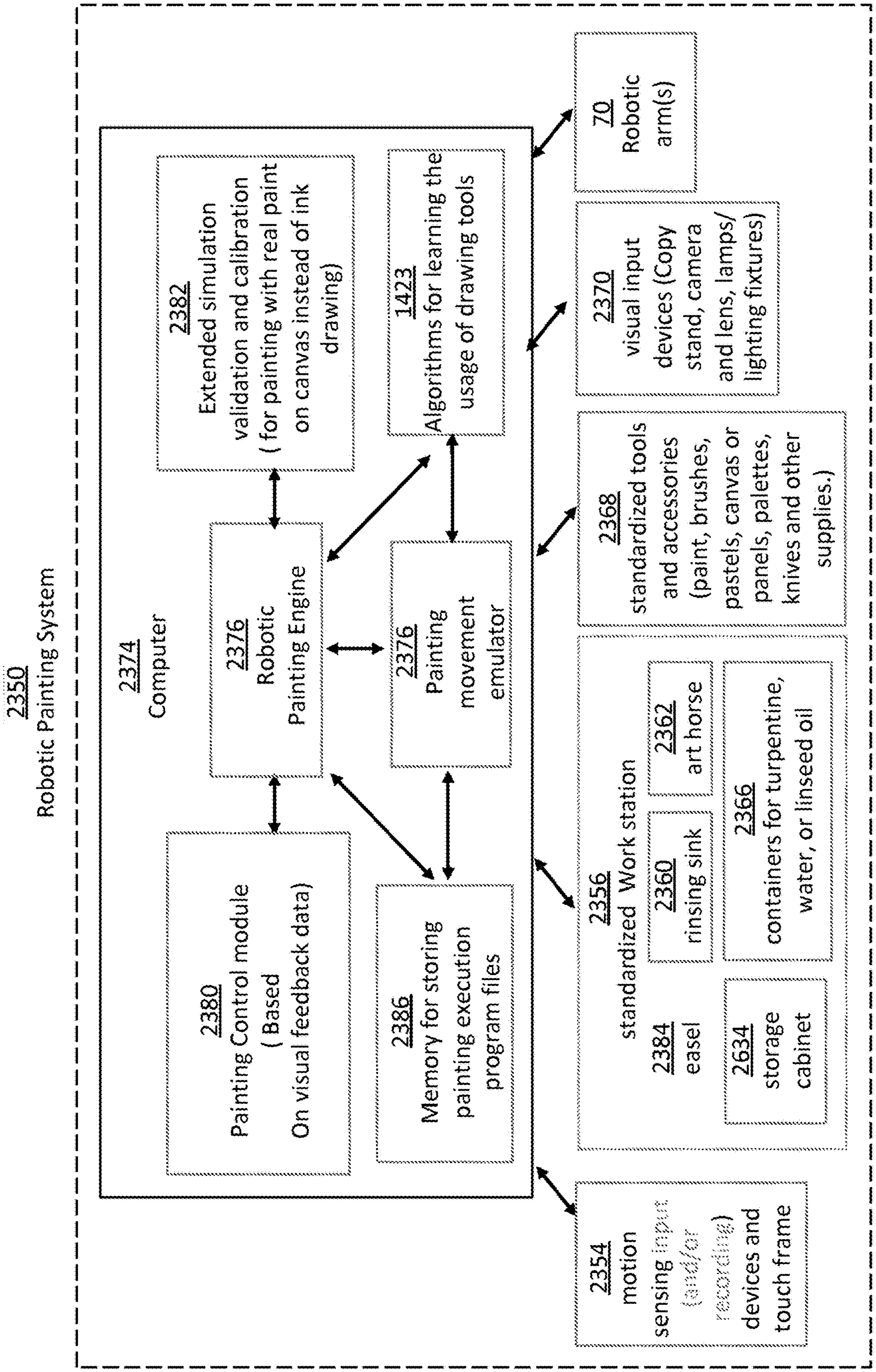
FIG. 95B is a block diagram illustrating the various components of a robotic painting system in accordance with the present invention.

FIG. 95B depicts the robotic painting system architecture 1430. The architecture includes a computer 1420, which is interfaced to/with multiple external devices, including, but not limited to, motion sensing input devices and touch-frame 1424, a standardized workstation 1425, including an easel 1426, a rinsing sink 1427, an art horse 1428, a storage cabinet 1429 and material containers 1430 (paint, solvents, etc.), as well as standardized tools and accessories (brushes, paints, etc.) 1431, visual input devices (camera, etc.) 1432, and one or more robotic arms 1433.

The computer module 1420 includes modules that include, but are not limited to, a robotic painting engine 1352 interfaced to a painting movement emulator 1422, a painting control module 1421 that acts based on visual feedback of the painting execution processes, a memory module 1380 to store painting execution program files, algorithms 1423 for learning the selection and usage of the appropriate drawing tools, as well as an extended simulation validation and calibration module 1378.

Figure 95C:
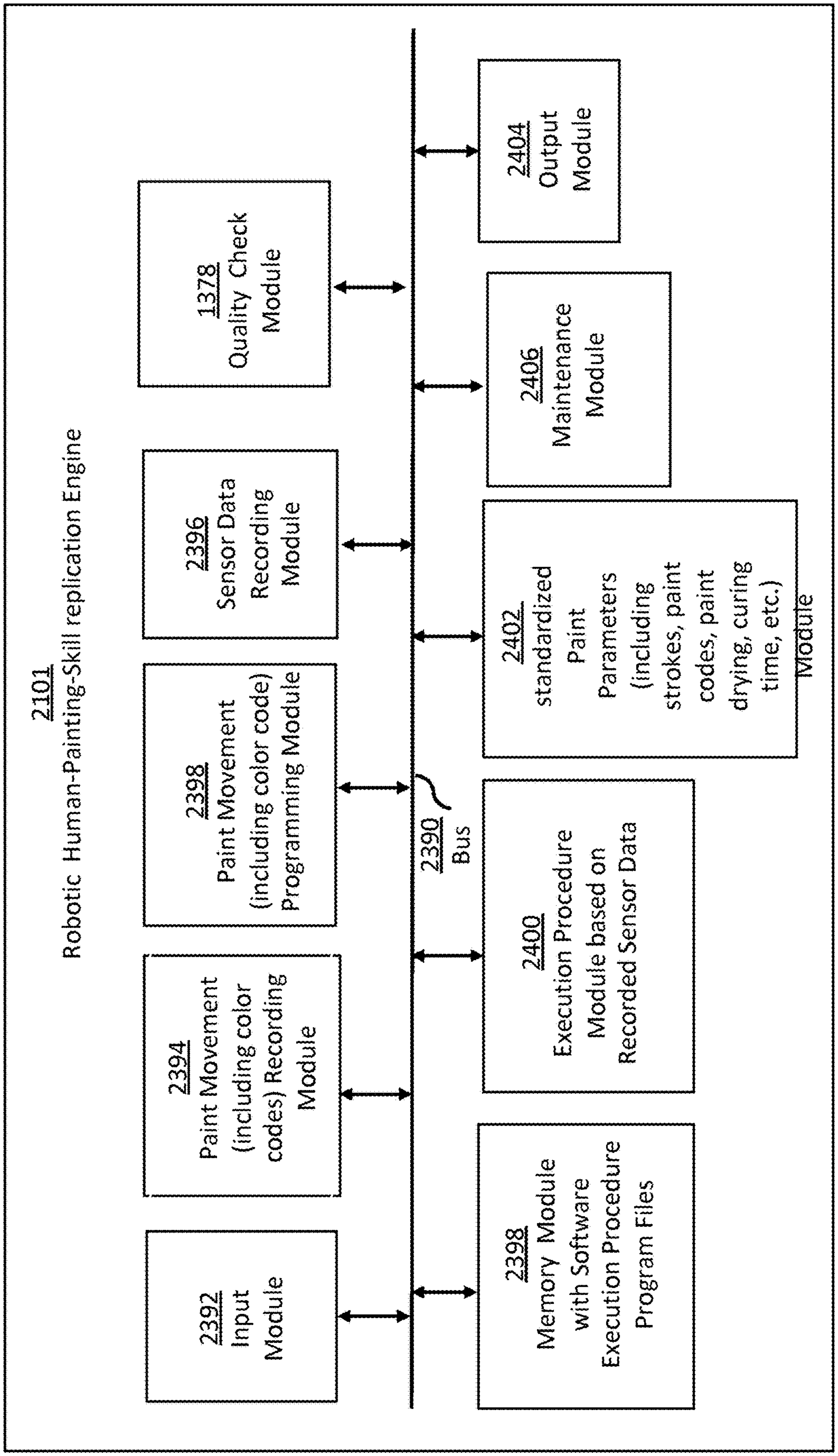
FIG. 95C is a block diagram illustrating the robotic human-painting-skill replication engine in accordance with the present invention.

FIG. 95C depicts a robotic human-painting skill-replication engine 1352. In the replication engine 1352, there are multiple additional modules all interconnected to each other over a common inter-module communication bus 72. The replication engine contains further modules, including, but not limited to, an input module 1370, a paint movement recording module 1372, an ancillary/additional sensory data recording module 1376, a painting movement programming module 1374, a memory module 1380 containing software execution procedure program files, an execution procedure module 1382 that generates execution commands based on recorded sensor data, a module 1400 containing standardized painting parameters, an output module 1388, and an (output) quality checking module 1378, all overseen by a software maintenance module 1386.

One embodiment of the art platform standardization is defined as follows. First, standardized position and orientation (xyz) of any kind of art tools (brushes, paints, canvas, etc.) in the art platform. Second, standardized operation volume dimensions and architecture in each art platform. Third, standardized art tools set in each art platform. Fourth, standardized robotic arms and hands with a library of manipulations in each art platform. Fifth, standardized three-dimensional vision devices for creating dynamic three-dimensional vision data for painting recording and execution tracking and quality check function in each art platform. Sixth, standardized type/producer/mark/of all using paints during particular painting execution. Seventh, standardized type/producer/mark/size of canvas during particular painting execution.

One main purpose to have Standardized Art Platform is to achieve the same result of the painting process (i.e., the same painting) executing by the original painter and afterward duplicated by robotic Art Platform. Several main points to emphasize in using the standardized Art Platform: (1) have the same timeline (same sequence of manipulations, same initial and ending time of each manipulation, same speed of moving object between manipulations) of Painter and automatic robotic execution; and (2) there are quality checks (3D vision, sensors) to avoid any fail result after each manipulation during the painting process. Therefore the risk of not having the same result is reduced if the painting was done at the standardized art platform. If a non-standardized art platform is used, this will increase the risk of not having the same result (i.e. not the same painting) because adjustment algorithms may be required when the painting is not executed at not the same volume, with the same art tools, with the same paint or with the same canvas in the painter studio as in the robotic art platform.

Figure 96A:
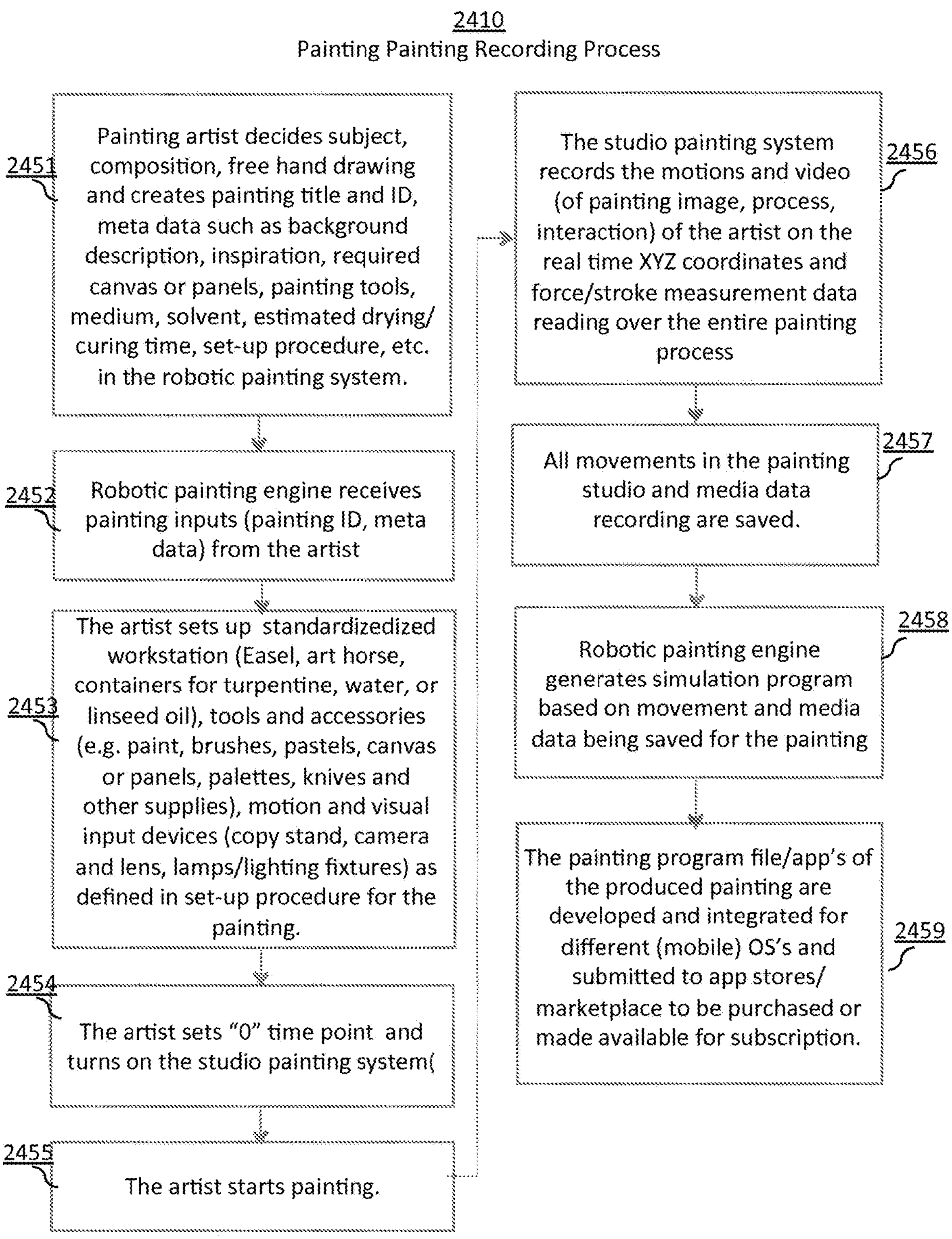
FIG. 96A is a flow diagram illustrating the recording process of an artist at a painting studio in accordance with the present invention.

FIG. 96A depicts the studio painting system and program commercialization process 1450. A first step 1451 is for the human painting artist to make decisions pertaining to the artwork to be created in the studio robotic painting system, which includes deciding on such topics as the subject, composition, media, tools and equipment, etc. The artist inputs all this data to the robotic painting engine in step 1452, after which in step 1453 the artist sets up the standardized workstation, tools and equipment and accessories and materials, as well as the motion and visual input devices as required and spelled out in the set-up procedure. The artist sets the starting point of the process and turns on the studio painting system in step 1454, after which the artist then begins step 1455 of actually painting. In step 1456 the studio painting system records the motions and video of the artist's movements in real time and in a known xyz coordinate frame during the entire painting process. The data collected in the painting studio is then stored in step 1457, allowing the robotic painting engine to generate a simulation program 1458 based on the stored movement and media data. The robotic painting program execution files or applications for the produced painting are developed and integrated for use by different operating systems and mobile systems and submitted to App-stores or other marketplace locations for sale as a single-use purchase or on a subscription basis.

Figure 96B:
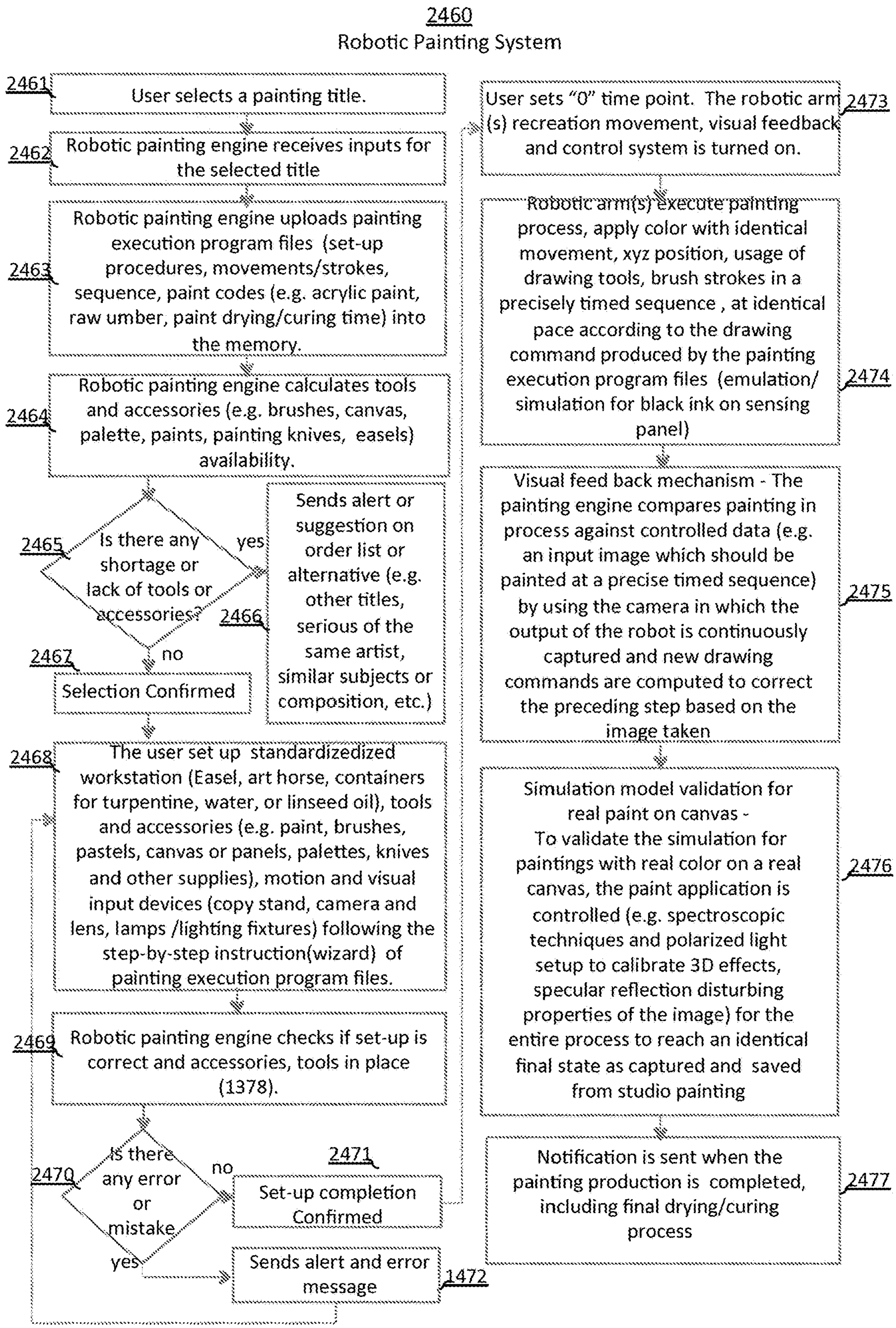
FIG. 96B is a flow diagram illustrating the replication process by a robotic painting system in accordance with the present invention.

FIG. 96B depicts the logical execution flow 1460 for the robotic painting engine. As a first step the user selects a painting title in step 1461, with the input being received by the robotic painting engine in step 1462. The robotic painting engine uploads the painting execution program files in step 1463 into the onboard memory, and then proceeds to step 1464, where it calculates the necessary tools and accessories. A checking step 1465 provides the answers as to whether there is a shortage of tools or accessories and materials; should there be a shortage, the system sends an alert 1466 or a suggestion to the user for an ordering list or an alternate painting. In the case of no shortage, the engine confirms the selection in step 1467, allowing the user to proceed to step 1468, comprised of setting up the standardized workstation, motion and visual input devices using the step-by-step instruction contained within the painting execution program files. Once completed, the robotic painting engine performs a check-up step 1469 to verify the proper setup; should it detect an error through step 1470, the system engine will send an error alert 1472 to the user and prompt the user to re-check the setup and correct any detected deficiencies. If the check passes with no errors detected, the setup will be confirmed by the engine in step 1471, allowing it to prompt the user in step 1473 to set the starting point and power on the replication and visual feedback and control systems. In step 1474 the robotic arm(s) will execute the steps specified in the painting execution program file, including movements, usage of tools and equipment at an identical pace as specified by the painting program execution files. A visual feedback step 1475 monitors the execution of the painting replication process against the controlled parameter data that define a successful execution of the painting process and its outcomes. The robotic painting engine further takes the step 1476 of simulation model verification to increase the fidelity of the replication process, with the goal of the entire replication process to reach an identical final state as captured and saved by the studio painting system. Once the painting is completed, a notification 1477 is sent to the user, including drying and curing time for the applied materials (paint, paste, etc.)

Figure 97A:
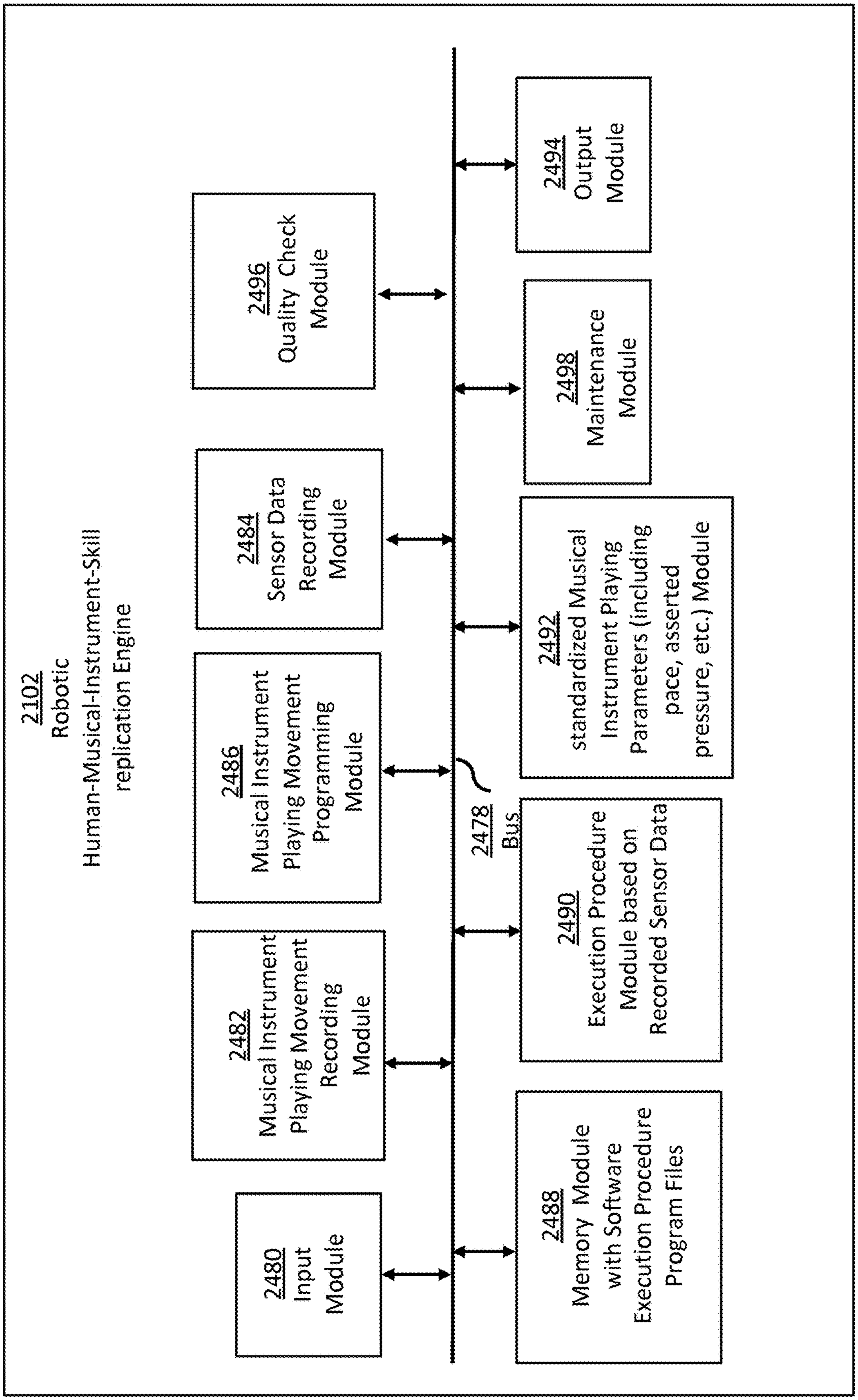
FIG. 97A is block diagram illustrating an embodiment of a musician replication engine in accordance with the present invention.
Figure 97B:
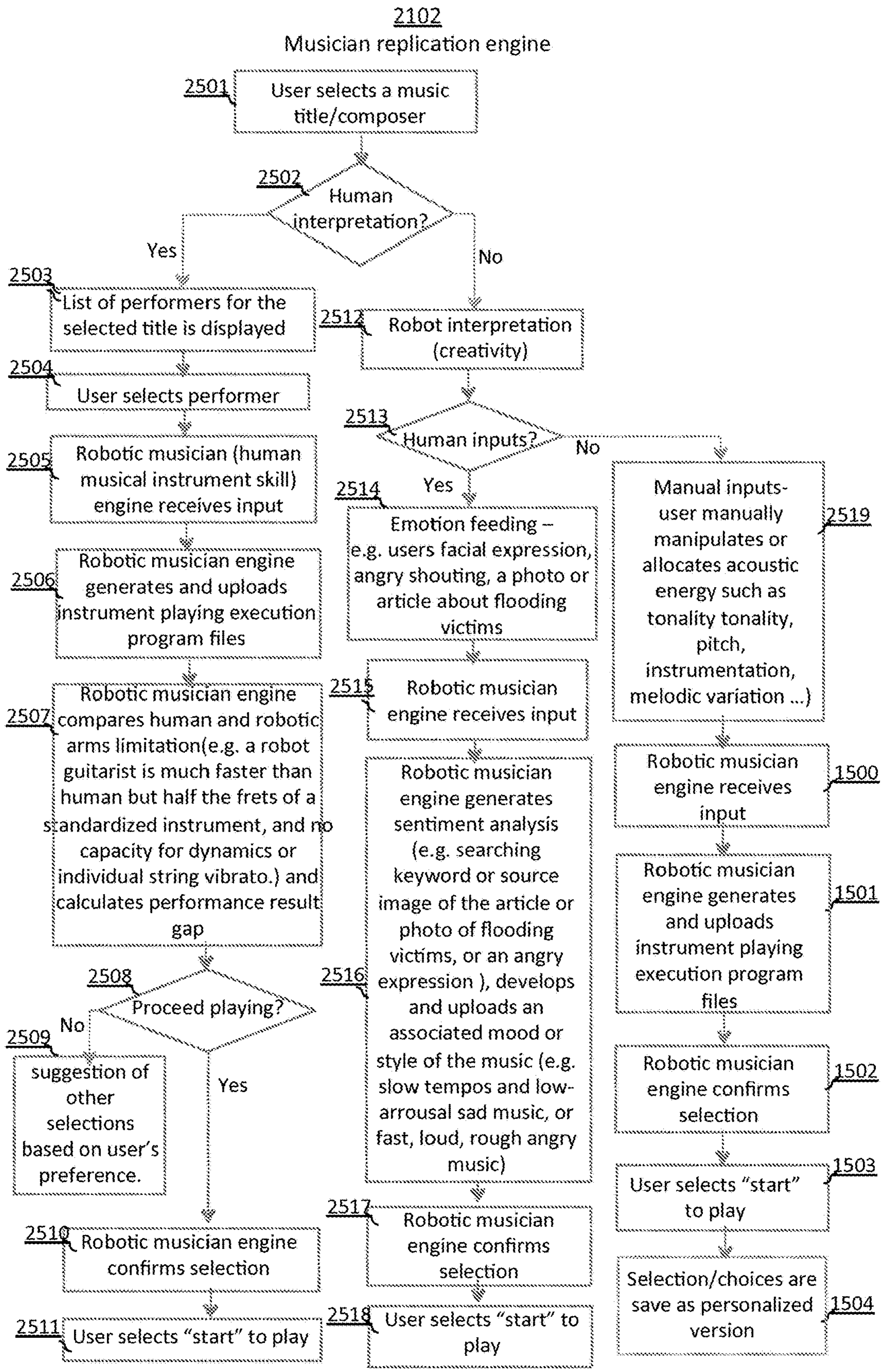
FIG. 97B is block diagram illustrating the process of the musician replication engine in accordance with the present invention.

FIG. 97A depicts a human musical-instrument skill-replication engine 1354. In the replication engine 1354, there are multiple additional modules all interconnected to each other over a common inter-module communication bus 72. The replication engine contains further modules, including, but not limited to, an audible (digital) audio input module 1370, a human's musical instrument playing movement recording module 1390, an ancillary/additional sensory data recording module 1376, a musical instrument playing movement programming module 1392, a memory module 1380 containing software execution procedure program files, an execution procedure module 1382 that generates execution commands based on recorded sensor data, a module 1394 containing standardized musical instrument playing parameters (e.g. pace, pressure, angles, etc.), an output module 1388, and an (output) quality checking module 1378, all overseen by a software maintenance module 1386.

FIG. 96B depicts the process carried out and the logical flow for a musician replication engine 1480. To start, in step 1481 a user selects a music title and/or composer, and is then queried in step 1482 whether the selection should be made by the robotic engine or through interaction with the human.

In the case the user selects the robot engine to select the title/composer in step 1482, the engine uses its own interpretation of creativity in step 1492, to offer the human user to provide input to the selection process in step 1493. Should the human decline providing input, the robotic musician engine uses settings such as manual inputs to tonality, pitch and instrumentation as well as melodic variation in step 1499, to gather the necessary input in step 1130 to generate and upload selected instrument playing execution program files in step 1501, allowing the user to select the preferred one in step 1503, after the robotic musician engine has confirmed the selection in step 1502. The choice made by the human is then stored as a personal choice in the personal profile database in step 1504. Should the human decide to provide input to the query in step 1493, the user will be able in step 1493 to provide additional emotional input to the selection process (facial expressions, photo, news article, etc.). The input from step 194 is received by the robotic musician engine in step 1495, allowing it to proceed to step 1496, where the engine carries out a sentiment analysis related to all available input data and uploads a music selection based on the mood and style appropriate to the emotional input data from the human. Upon confirmation of selection for the uploaded music selection in step 1497 by the robotic musician engine, the user may select the 'start' button to play the program file for the selection in step 1498.

In the case where the human wants to be intimately involved in the selection of the title/composer, the system provides a list of performers for the selected title to the human on a display in step 1483. In step 1484 the user selects the desired performer, a choice input that the system receives in step 1485. In step 1486 the robotic musician engine generates and uploads the instrument playing execution program files, and proceeds in step 1487 to compare potential limitations between a human and a robotic musician's playing performance on a particular instrument, thereby allowing it to calculate a potential performance gap. A checking step 1488 decides whether there exists a gap. Should there be a gap, the system will suggest other selections based on the user's preference profile in step 1489. Should there be no performance gap, the robotic musician engine will confirm the selection in step 1490 and allow the user to proceed to step 1491, where the user may select the 'start' button to play the program file for the selection.

Figure 98:
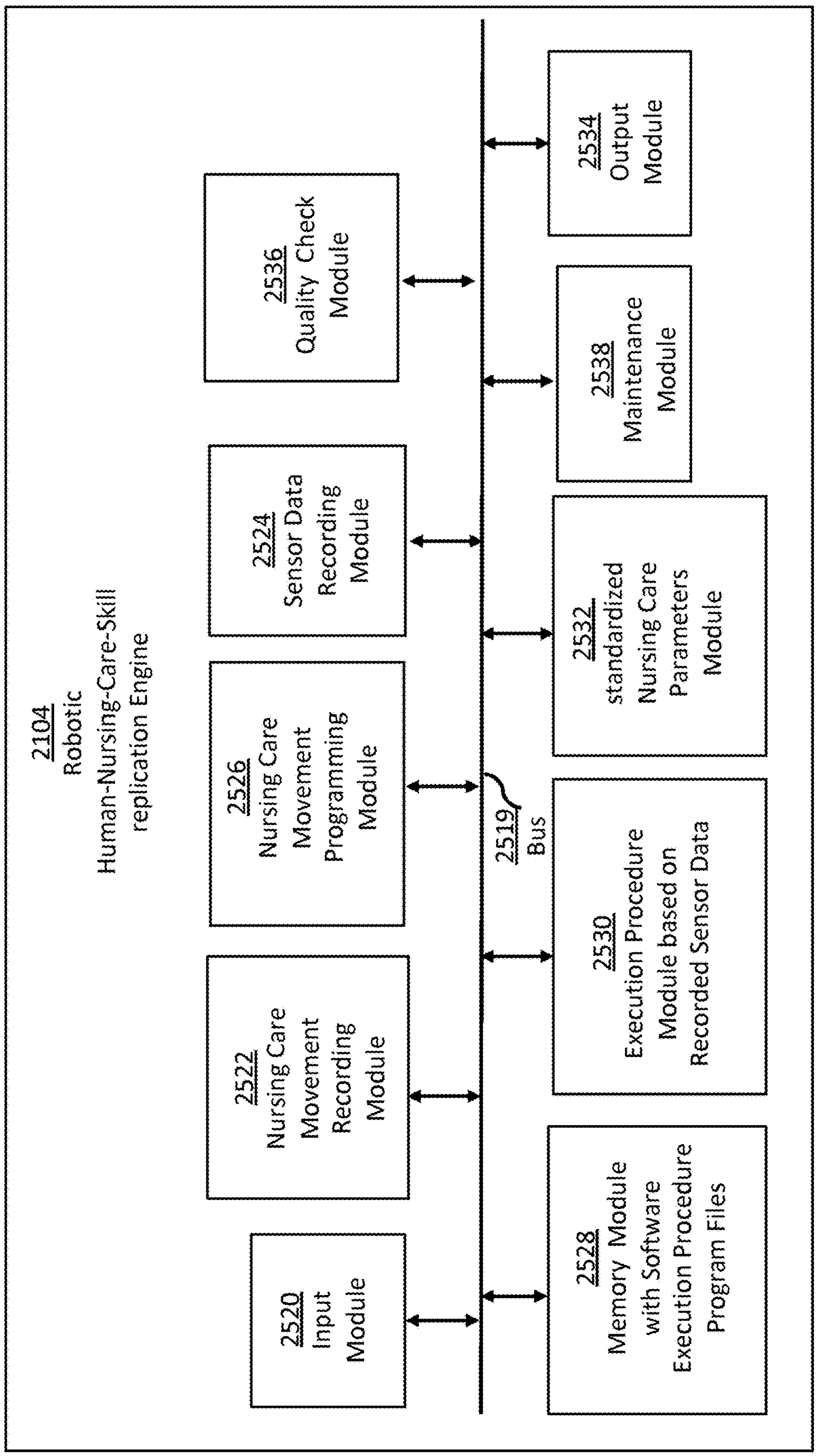
FIG. 98 is block diagram illustrating an embodiment of a nursing replication engine in accordance with the present invention.

FIG. 98 depicts a human nursing-care skill-replication engine 1356. In the replication engine 1356, there are multiple additional modules all interconnected to each other over a common inter-module communication bus 72. The replication engine contains further modules, including, but not limited to, an input module 1370, a nursing care movement recording module 1396, an ancillary/additional sensory data recording module 1376, a nursing care movement programming module 1398, a memory module 1380 containing software execution procedure program files, an execution procedure module 1382 that generates execution commands based on recorded sensor data, a module 1400 containing standardized nursing care parameters, an output module 1388, and an (output) quality checking module 1378, all overseen by a software maintenance module 1386.

Figure 99A:
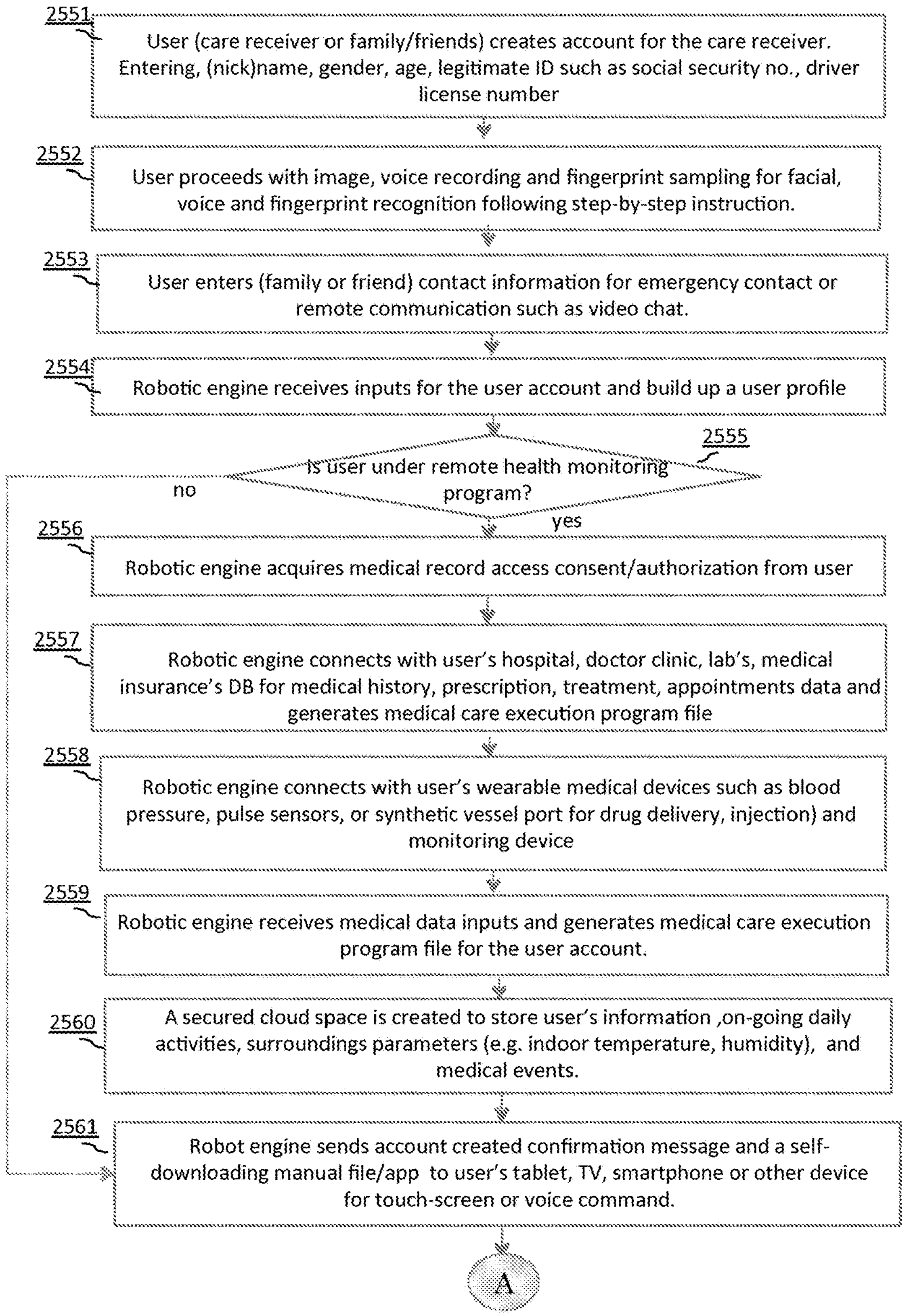
FIGS. 99A-B are flow diagrams illustrating the process of the nursing replication engine in accordance with the present invention.

FIG. 99A depicts a robotic human nursing care system process 1132. A first step 1511 involves a user (care receiver or family/friends) creating an account for the care receiver, providing personal data (name, age, ID, etc.). A biometric data collection step 1512 involves the collection of personal data, including facial images, fingerprints, voice samples, etc. The user then enters contact information for emergency contact in step 1513. The robotic engine receives all this input data to build up a user account and profile in step 1514. Should the user not be under a remote health monitoring program as determined in step 1515, the robot engine sends an account creation confirmation message and a self-downloading manual file/app to the user's tablet, TV, smartphone or other device for future touch-screen or voice-based command interface purposes, as part of step 1521. Should the user be part of a remote health-monitoring program, the robot engine will request in step 1516 permission to access medical records. As part of step 1517 the robotic engine connects with the user's hospital and physician's offices, laboratories and medical insurance databases to receive the medical history, prescription, treatment, and appointments data for the user and generates a medical care execution program for storage in a file particular to that user. As a next step 1518, the robotic engine connects with any and all of the user's wearable medical devices (such as blood pressure monitors, pulse and blood-oxygen sensors), or even electronically controllable drug dispensing system (whether oral or by injection) to allow for continuous monitoring. As a follow-on step the robotic engine receives medical data file and sensory inputs allowing it to generate one or more medical care execution program files for the user's account in step 1519. The next step 1134 involves the creation of a secure cloud storage data space for the user's information, daily activities, associated parameters and any past or future medical events or appointments. As before in step 1521, the robot engine sends an account creation confirmation message and a self-downloading manual file/app to the user's tablet, TV, smartphone or other device for future touch-screen or voice-based command interface purposes.

Figure 99B:
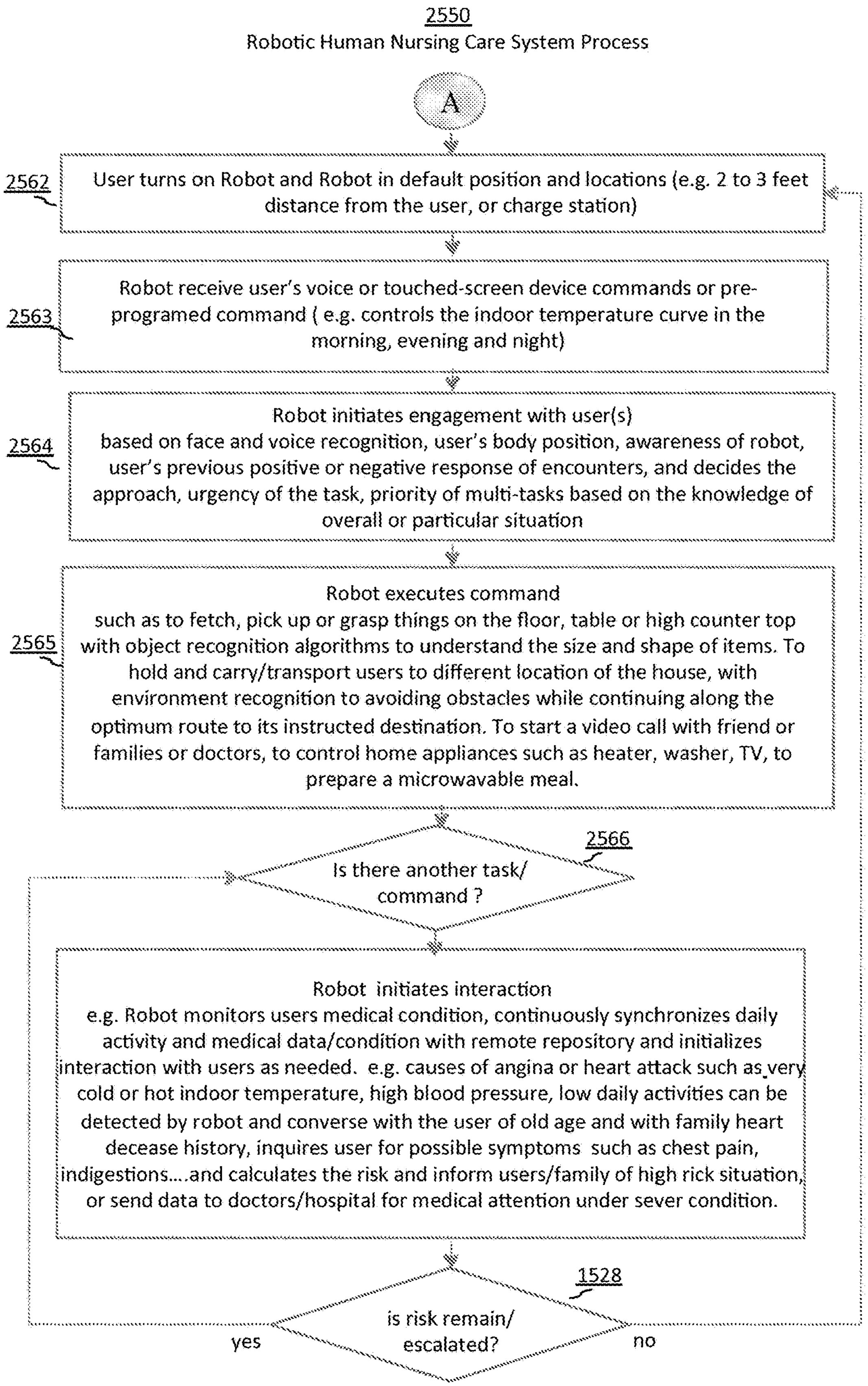

FIG. 99B depicts a continuation of the robotic human nursing care system process 1132 first started with FIG. 99A, but which is now related to a physically present robot in the user's environment. As a first step 1522, the user turns on the robot in a default configuration and location (e.g. charging station). In task 1523 the robot receives a user's voice or touch-screen-based command to execute one specific or groups of commands or actions. In step 1524, the robot carries out particular tasks and activities based on engagement with the user using voice and facial recognition commands and cues, responses or behaviors of the user, basing its decisions on such factors as task-urgency and task-priority based on a knowledge of the particular or overall situation. In task 1525 the robot carries out typical fetching, grasping and transportation of one or more items, completing the tasks using object recognition and environmental sensing, localization and mapping algorithms to optimize movements along obstacle-free paths, possibly even to serve as an avatar to provide audio/video teleconferencing ability for the user or interface with any controllable home appliance. The robot is continually monitoring the user's medical condition based on sensory input and the user's profile data, and monitors for possible symptoms of potential medically dangerous conditions, with the ability to inform first responders or family members about any potential situations requiring their immediate attention. The robot continually checks in step 1526 for any open or remaining task and always remains ready to react to any user input from step 1522.

FIG. 100 is a block diagram illustrating an example of a computer device, as shown in 224, on which computer-executable instructions to perform the methodologies discussed herein may be installed and run. As alluded to above, the various computer-based devices discussed in connection with the present invention may share similar attributes. Each of the computer devices in 24 is capable of executing a set of instructions to cause the computer device to perform any one or more of the methodologies discussed herein. The computer devices 12 may represent any or all of the 24, server 10, or any network intermediary devices. Further, while only a single machine is illustrated, the term "machine" shall also be taken to include any collection of machines that individually or jointly execute a set (or multiple sets) of instructions to perform any one or more of the methodologies discussed herein. The example computer system 224 includes a processor 226 (e.g., a central processing unit (CPU), a graphics processing unit (GPU), or both), a main memory 228 and a static memory 230, which communicate with each other via a bus 232. The computer system 224 may further include a video display unit 234 (e.g., a liquid crystal display (LCD)). The computer system 224 also includes an alphanumeric input device 236 (e.g., a keyboard), a cursor control device 238 (e.g., a mouse), a disk drive unit 240, a signal generation device 242 (e.g., a speaker), and a network interface device 248.

The disk drive unit 2240 includes a machine-readable medium 244 on which is stored one or more sets of instructions (e.g., software 246) embodying any one or more of the methodologies or functions described herein. The software 246 may also reside, completely or at least partially, within the main memory 244 and/or within the processor 226 during execution thereof the computer system 224, the main memory 228, and the instruction-storing portions of processor 226 constituting machine-readable media. The software 246 may further be transmitted or received over a network 18 via the network interface device 248.

While the machine-readable medium 244 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any tangible medium that is capable of storing a set of instructions for execution by the machine and that cause the machine to perform any one or more of the methodologies of the present invention. The term "machine-readable medium" shall accordingly be taken to include, but not be limited to, solid-state memories, and optical and magnetic media.

In general terms, there may be considered a method of motion capture and analysis for a robotics system, comprising sensing a sequence of observations of a person's movements by a plurality of robotic sensors as the person prepares a product using working equipment; detecting in the sequence of observations mini-manipulations corresponding to a sequence of movements carried out in each stage of preparing the product; transforming the sensed sequence of observations into computer readable instructions for controlling a robotic apparatus capable of performing the sequences of mini-manipulations; storing at least the sequence of instructions for mini-manipulations to electronic media for the product. This may be repeated for multiple products. The sequence of mini-manipulations for the product is preferably stored as an electronic record. The mini-manipulations may be abstracted parts of a multi-stage process, such as cutting an object, heating an object (in an oven or on a stove with oil or water), or similar. Then, the method may further comprise: transmitting the electronic record for the product to a robotic apparatus capable of replicating the sequence of stored mini-manipulations, corresponding to the original actions of the person. Moreover, the method may further comprise executing the sequence of instructions for mini-manipulations for the product by the robotic apparatus, thereby obtaining substantially the same result as the original product prepared by the person.

In another general aspect, there may be considered a method of operating a robotics apparatus, comprising providing a sequence of pre-programmed instructions for standard mini-manipulations, wherein each mini-manipulation produces at least one identifiable result in a stage of preparing a product; sensing a sequence of observations corresponding to a person's movements by a plurality of robotic sensors as the person prepares the product using equipment; detecting standard mini-manipulations in the sequence of observations, wherein a mini-manipulation corresponds to one or more observations, and the sequence of mini-manipulations corresponds to the preparation of the product; transforming the sequence of observations into robotic instructions based on software implemented methods for recognizing sequences of pre-programmed standard mini-manipulations based on the sensed sequence of person motions, the mini-manipulations each comprising a sequence of robotic instructions and the robotic instructions including dynamic sensing operations and robotic action operations; storing the sequence of mini-manipulations and their corresponding robotic instructions in electronic media. Preferably, the sequence of instructions and corresponding mini-manipulations for the product are stored as an electronic record for preparing the product. This may be repeated for multiple products. The method may further include transmitting the sequence of instructions (preferably in the form of the electronic record) to a robotics apparatus capable of replicating and executing the sequence of robotic instructions. The method may further comprise executing the robotic instructions for the product by the robotics apparatus, thereby obtaining substantially the same result as the original product prepared by the human. Where the method is repeated for multiple products, the method may additionally comprise providing a library of electronic descriptions of one or more products, including the name of the product, ingredients of the product and the method (such as a recipe) for making the product from ingredients.

Another generalized aspect provides a method of operating a robotics apparatus comprising receiving an instruction set for a making a product comprising of a series of indications of mini-manipulations corresponding to original actions of a person, each indication comprising a sequence of robotic instructions and the robotic instructions including dynamic sensing operations and robotic action operations; providing the instruction set to a robotic apparatus capable of replicating the sequence of mini-manipulations; executing the sequence of instructions for mini-manipulations for the product by the robotic apparatus, thereby obtaining substantially the same result as the original product prepared by the person.

A further generalized method of operating a robotic apparatus may be considered in a different aspect, comprising executing a robotic instructions script for duplicating a recipe having a plurality of product preparation movements; determining if each preparation movement is identified as a standard grabbing action of a standard tool or a standard object, a standard hand-manipulation action or object, or a non-standard object; and for each preparation movement, one or more of: instructing the robotic cooking device to access a first database library if the preparation movement involves a standard grabbing action of a standard object; instructing the robotic cooking device to access a second database library if the food preparation movement involves a standard hand-manipulation action or object; and instructing the robotic cooking device to create a three-dimensional model of the non-standard object if the food preparation movement involves a non-standard object. The determining and/or instructing steps may be particularly implemented at or by a computer system. The computing system may have a processor and memory.

Another aspect may be found in a method for product preparation by robotic apparatus, comprising replicating a recipe by preparing a product (such as a food dish) via the robotic apparatus, the recipe decomposed into one or more preparation stages, each preparation stage decomposed into a sequence of mini-manipulations and active primitives, each mini-manipulation decomposed into a sequence of action primitives. Preferably, each mini manipulation has been (successfully) tested to produce an optimal result for that mini manipulation in view of any variations in positions, orientations, shapes of an applicable object, and one or more applicable ingredients.

A further method aspect may be considered in a method for recipe script generation, comprising receiving filtered raw data from sensors in the surroundings of a standardized working environment module, such as a kitchen environment; generating a sequence of script data from the filtered raw data; and transforming the sequence of script data into machine-readable and machine-executable commands for preparing a product, the machine-readable and machine-executable commands including commands for controlling a pair of robotic arms and hands to perform a function. The function may be from the group consisting of one or more cooking stages, one or more mini-manipulations, and one or more action primitives. A recipe script generation system comprising hardware and/or software features configured to operate in accordance with this method may also be considered.

In any of these aspects, the following may be considered. The preparation of the product normally uses ingredients. Executing the instructions typically includes sensing properties of the ingredients used in preparing the product. The product may be a food dish in accordance with a (food) recipe (which may be held in an electronic description) and the person may be a chef. The working equipment may comprise kitchen equipment. These methods may be used in combination with any one or more of the other features described herein. One, more than one or all of the features of the aspects may be combined, so a feature from one aspect may be combined with another aspect for example. Each aspect may be computer-implemented and there may be provided a computer program configured to perform each method when operated by a computer or processor. Each computer program may be stored on a computer-readable medium. Additionally or alternatively, the programs may be partially or fully hardware-implemented. The aspects may be combined. There may also be provided a robotics system configured to operate in accordance with the method described in respect of any of these aspects.

In another aspect, there may be provided a robotics system, comprising: a multi-modal sensing system capable of observing human motions and generating human motions data in a first instrumented environment; and a processor (which may be a computer), communicatively coupled to the multi-modal sensing system, for recording the human motions data received from the multi-modal sensing system and processing the human motions data to extract motion primitives, preferably such that the motion primitives define operations of a robotics system. The motion primitives may be mini-manipulations, as described herein (for example in the immediately preceding paragraphs) and may have a standard format. The motion primitive may define specific types of action and parameters of the type of action, for example a pulling action with a defined starting point, end point, force and grip type. Optionally, there may be further provided a robotics apparatus, communicatively coupled to the processor and/or multi-modal sensing system. The robotics apparatus may be capable of using the motion primitives and/or the human motions data to replicate the observed human motions in a second instrumented environment.

In a further aspect, there may provided a robotics system, comprising: a processor (which may be a computer), for receiving motion primitives defining operations of a robotics system, the motion primitives being based on human motions data captured from human motions; and a robotics system, communicatively coupled to the processor, capable of using the motion primitives to replicate human motions in an instrumented environment. It will be understood that these aspects may be further combined.

A further aspect may be found in a robotics system comprising: first and second robotic arms; first and second robotic hands, each hand having a wrist coupled to a respective arm, each hand having a palm and multiple articulated fingers, each articulated finger on the respective hand having at least one sensor; and first and second gloves, each glove covering the respective hand having a plurality of embedded sensors. Preferably the robotics system is a robotic kitchen system.

There may further be provided, in a different but related aspect, a motion capture system, comprising: a standardized working environment module, preferably a kitchen; plurality of multi-modal sensors having a first type of sensors configured to be physically coupled to a human and a second type of sensors configured to be spaced away from the human. One or more of the following may be the case: the first type of sensors may be for measuring the posture of human appendages and sensing motion data of the human appendages; the second type of sensors may be for determining a spatial registration of the three-dimensional configurations of one or more of the environment, objects, movements, and locations of human appendages; the second type of sensors may be configured to sense activity data; the standardized working environment may have connectors to interface with the second type of sensors; the first type of sensors and the second type of sensors measure motion data and activity data, and send both the motion data and the activity data to a computer for storage and processing for product (such as food) preparation.

An aspect may additionally or alternatively be considered in a robotic hand coated with a sensing gloves, comprising: five fingers; and a palm connected to the five fingers, the palm having internal joints and a deformable surface material in three regions; a first deformable region disposed on a radial side of the palm and near the base of the thumb; a second deformable region disposed on a ulnar side of the palm, and spaced apart from the radial side; and a third deformable region disposed on the palm and extend across the base of the fingers. Preferably, the combination of the first deformable region, the second deformable region, the third deformable region, and the internal joints collectively operate to perform a mini manipulation, particularly for food preparation.

In respect of any of the above system, device or apparatus aspects, there may further be provided method aspects comprising steps to carry out the functionality of the system. Additionally or alternatively, optional features may be found based on any one or more of the features described herein with respect to other aspects

TABLE A

| Types of Equipment | |
|---|---|
| | Types of Equipment |
| | KITCHEN ACCESSORIES |
| 1 | Funnels |
| 1.1. | stainless steel funnel |
| 1.2. | plastic funnel |
| 1.3 | silicone funnel |
| 1.4 | convertible funnel |
| 2 | Colanders |
| 2.1 | quadratic colanders |
| 2.2 | oval ladle-vases |
| 2.3 | colanders with folding handles |
| 2.4 | flat colander |
| 2.5 | plastic colanders |
| 2.6 | small round colanders |
| 2.7 | suspended colanders |
| 2.8 | cover-colander |
| 2.9 | stainless steel and aluminum colanders |
| 2.1 | cone colanders |
| 3 | Kitchen Appliances |
| 3.1. | Whisk |
| 3.2. | scoop, spatula |
| 3.2.1 | cook spatula |
| 3.2.2. | spatula with slots |
| 3.2.3. | confectionery spatula |
| 3.5 | Spoons |
| 3.5.1 | serving spoon |
| 3.5.2 | spoon-tongs |
| 3.5.3 | spoon with slots |
| 3.5.4 | spoon for rice |
| 3.5.5 | ladle spoon |
| 3.5.6 | ice cream spoon |
| 3.5.7 | honey spoon |
| 3.5.8 | spaghetti spoon |
| 3.5.9 | serving spoon |
| 3.6 | confectionery syringe for cookies and cream |
| 3.7 | soup ladle |
| 3.8 | Potato Masher |
| 3.9 | skimmer |
| 3.10 | Meat fork |
| 3.11 | Brush |
| 3.12 | coffee filter |
| 3.5.7 | honey spoon |
| 3.5.8 | spaghetti spoon |
| 3.5.9 | serving spoon |
| 3.6 | confectionery syringe for cookies and cream |
| 3.7 | soup ladle |
| 3.8 | Potato Masher |
| 3.9 | skimmer |
| 3.10 | Meat fork |
| 3.11 | Brush |
| 3.23 | ties for rolls |
| 3.2 | dough mini-scraper |
| 3.25 | grill tongs |
| 3.26 | spaghetti tongs |
| 3.27 | ice tongs |
| 3.28 | sugar tongs |
| 3.29 | package clip |
| 3.30 | package clip |
| 3.31 | citrus spray |
| 3.32 | Dough press |
| 3.33 | scoop for bulk |
| 3.34 | salad serving tongs (tweezers) |
| 3.35 | accessories for tubes |
| 3.36 | Pestle |
| 3.37 | Mortar |
| 3.38 | roller for cutting of the rings |
| 3.39 | opener for caps |
| 3.40 | meat tenderizer; meat softener |
| 3.41 | egg yolk separator |
| 3.42 | Apron |
| 3.33 | scoop for bulk |
| 3.43 | tools for decoration |
| 3.44 | jar for oil and vinegar |
| 3.45 | mug for milk boiling |
| 3.46 | napkins |
| 3.47 | tablecloth |

TABLE A-continued

| Types of Equipment | |
|---|---|
| | Types of Equipment |
| 3.48 | marker for glasses |
| 3.49 | potato masher |
| 3.50 | Basket |
| 3.51 | meat tenderizer |
| 3.52 | cocotte |
| 3.53 | brush for washing of the vegetables |
| 3.54 | lids for cups |
| 3.55 | rope for baking |
| 3.56 | jar for herbs storage |
| 3.57 | Mortar |
| 3.58 | scraper for glass ceramic plates |
| 3.59 | Teapot for tea |
| 3.60 | clothespin for notes on the fridge |
| 3.61 | railing systems |
| 3.62 | hanger for kitchen tools |
| 3.63 | plunger with not adhering surface |
| 3.64 | silicone plunger |
| 3.65 | rolling pin with adjustable thickness |
| 3.66 | vacuum bags with pump |
| 3.67 | gas lighter |
| 3.68 | bone forceps |
| 4 | kitchen timers, thermometers |
| 4.1 | timer for meat roasting |
| 4.2 | digital thermometer |
| 4.3 | holder for thermometer |
| 4.4 | meat thermometer |
| 4.5 | digital timer |
| 4.6 | elector. digital timer |
| 4.7 | __aramel thermometer |
| 5 | Mills for spices |
| 5.1 | mill for black pepper |
| 5.2 | electric mill |
| 5.3 | combined mill for pepper and salt (2 in 1) |
| 5.4 | mill for spices |
| 5.5 | mill for greens |
| 6 | Measuring utensils |
| 6.1. | Measuring container (plastic bottle) |
| 6.2. | measuring jar |
| 6.3. | measuring jug |
| 6.4. | measuring bowl |
| 6.5. | mechanical dispenser for ice cream |
| 7 | mechanical mixers |
| 8 | Bowl |
| 8.1. | metal bowl |
| 8.2. | stainless steel bowl |
| 8.3. | plastic bowl |
| 8.4. | plastic bowl |
| 8.5. | bowls for food |
| 9 | Sets |
| 9.2 | wine set |
| 9.3 | sets for spices |
| 9.6. | cupcakes baking set |
| 9.7 | accessory kit for baking |
| 9.8 | set of bar tools |
| 9.9 | set of kitchen tools |
| 9.10 | Set for eggs and pancakes baking |
| 11 | Slicing and cutting of products |
| 11.1 | Cutter |
| 11.2 | holder for onions cutting |
| 11.2 | cutting boards |
| 11.3 | universal professional knives |
| 11.4 | kitchen shears |
| 11.5 | hatchet |
| 11.6 | meat hatchet |
| 11.7 | Hammer for meat with hatchet |
| 11.8 | Hoe |
| 11.9 | Hammer for meat |
| 11.10 | Knives |
| 11.11 | knife for greens |
| 11.12 | knife for oranges |
| 11.13 | knife for kiwi |
| 11.14 | knife for pineapple |
| 11.15 | Spiral knife for carrots |
| 11.16 | multifunctional knife |
| 11.17 | vegetable knife |
| 11.18 | Pizza Cutter |

TABLE A-continued

Types of Equipment

| | Types of Equipment |
|---|---|
| 11.19 | universal knife |
| 11.20 | knife for slicing |
| 11.21 | cook knife |
| 11.22 | gastronomic knife |
| 11.23 | opener |
| 11.24 | Cheese knife |
| 11.25 | boning knife |
| 11.26 | lettuce knife |
| 11.27 | knife for steaks |
| 11.28 | butcher knife |
| 11.29 | shredding knife |
| 11.30 | bread knife |
| 11.31 | fish knife |
| 11.32 | knife for sandwiches |
| 11.33 | Santoku knife |
| 11.34 | knife for fruit coring |
| 11.35 | Butter knife |
| 12 | openers |
| 12.1 | tin-opener |
| 12.2 | corkscrew |
| 12.3 | corkscrew on a stand |
| 12.4 | lever corkscrew |
| 12.5 | folding corkscrew |
| 12.6 | opener for waiter |
| 12.7 | openers |
| 13 | stand and holders |
| 13.1 | stands for hot |
| 13.2 | stand for kitchen utensils storing |
| 13.3 | toothpick holder |
| 13.4 | Bottle holder |
| 13.5 | Holder for capsules |
| 13.6 | stand for spoon |
| 13.7 | stand for coffee capsules |
| 13.8 | Coasters |
| 13.9 | Napkin holder |
| 13.10 | stand for eggs |
| 13.11 | stand for openers |
| 13.12 | stand for scoops |
| 13.13 | stand for cooking and serving of eggs |
| 13.14 | stand for ladle |
| 13.15 | Holder for paper towels |
| 13.16 | Transforming stand for kitchen appliances |
| 13.17 | stand for mug |
| 13.18 | stand mugs and saucers |
| 13.19 | stand for kitchen knives |
| 13.20 | stand for chicken |
| 13.21 | napkin-stand |
| 13.22 | heated stand |
| 13.23 | stands for cake |
| 14 | Appliances for peeling and cutting |
| 14.1 | grater for vegetables |
| 14.2 | grater |
| 14.3 | garlic masher |
| 14.4 | egg cutter |
| 14.5 | Manual vegetable cutter |
| 14.6 | Peeler for vegetables |
| 14.7 | Nutcracker |
| 14.8 | The device for separating the yolks from the whites |
| 14.9 | grasping for carrots cleaning |
| 14.10 | scraper fish scales |
| 14.11 | cutter for fruits |
| 14.12 | roller for holes |
| 14.13 | tongs for fish bones |
| 14.14 | spiral vegetable cutter |
| 15 | Bottle Caps |
| 15.1 | champagne cork (stopper) |
| 15.2 | stoppers for wine |
| 15.3 | The opener to remove the crown corks from bottles |
| 16 | sieves |
| 16.1 | sieve for tea |
| 16.2 | sieve-tongs for tea |
| 16.3 | Strainer for spices |
| 16.4 | Strainer for tea |
| 16.5 | Universal sieve |
| 16.6 | flour sieve |
| 16.7 | sieve to form the “Bird’s Nest” |

TABLE A-continued

Types of Equipment

| | Types of Equipment |
|---|---|
| 16.8 | The Chinese sieve with a mesh insert |
| 16.9 | sieve with support |
| 16.10 | Mug-sieve for flour |
| 16.11 | sieve on the handle |
| 17 | Salt and pepper shakers |
| 17.1 | container for seasoning |
| 17.2 | salt cellar |
| 17.3 | containers for oil and vinegar |
| 18 | Dish dryers |
| 18.1 | salad dryer |
| | dryer-placemat |
| | dryer for crockery and cutlery |
| 19 | Cutlery Accessories |
| 19.1 | cutlery tray |
| 19.2 | cutlery holder |
| 19.3 | cutlery container |
| 19.4 | strainer for cutlery |
| 19.5 | wall hanger for kitchen tools |
| 19.6 | cutlery organizer |
| 19.7 | mat for cutlery |
| 19.8 | sliding tray for cutlery |
| 19.9 | dryer for cutlery |
| 19.10 | glass for cutlery |
| 19.11 | napkin for the cutlery |
| 19.12 | case for cutlery |
| 19.13 | tray for cutlery |
| 19.14 | mitten-potholder |
| 19.15 | box for cutlery |
| 19.16 | full-size rack (cassette) for cutlery |
| 19.17 | Stand without containers for cutlery |
| 19.18 | cassette for cutlery |
| 19.19 | container for cutlery |
| 19.20 | station for cutlery |
| 19.21 | Shelf for cutlery |
| 20 | Decorations for cocktails |
| 21.1 | Ducts |
| 22.2. | Sticks |
| 23 | Mold |
| 23.1 | molds for ice |
| 23.2 | molds for children |
| 23.3 | Molds for shaping products |
| 23.4 | Molds for dumplings |
| 24 | Measuring container |
| 24.1 | Measuring container |
| 24.2 | A mixing container with the dispenser |
| 24.3 | Measuring container with the funnel |
| 24.4 | Beaker |
| 24.5 | Scoop |
| 26 | kitchen scissors |
| 26.1 | Scissors for BBQ |
| 26.2 | Kitchen scissors with bottle opener |
| 26.3 | Scissors for greens |
| 26.4 | Kitchen multipurpose scissors |
| 26.5 | Kitchen scissors for poultry |
| 27 | utensil for storage |
| 27.1 | container for storage |
| 27.2 | Bottles for liquid spices, oils |
| 27.3 | jars for storage |
| 27.4 | lunchbox |
| 27.5 | foldable lunchbox |
| 27.6 | jar for hermetic storage of bulk products |
| 27.7 | Sprayer for oil/vinegar |
| 27.8 | jar for bulk products |
| 27.9 | containers for spices |
| 27.10 | container for seasoning |
| 27.11 | Container for tea |
| 28 | potholders |
| 28.1 | oven-glove |
| 28.2 | silicone potholders |
| 28.3 | dishcloth |
| | railing with hooks |
| 29 | silicone mats |
| 29.1 | baking mat |
| 29.2 | mat for baking cakes |
| 29.3 | mat for drying of the glasses |
| 29.4 | cooking mat |

TABLE A-continued

| Types of Equipment | |
|---|---|
| | Types of Equipment |
| 29.5 | Mat for drying of the dishes |
| 30 | graters, presses, rubbing machines |
| 30.1 | grater with a handle |
| 30.2 | grater |
| 30.3 | multifunction grater |
| 30.4 | grater shredder |
| 30.5 | grind for the green |
| 30.6 | grind for the garlic |
| 30.7 | Slicer for tomatoes |
| 30.8 | grater with rotating drums |
| 30.9 | universal device for grinding |
| 30.10 | mechanical grater |
| 30.11 | garlic peeling tube |
| 30.12 | rubbing machine |
| 30.13 | press for vegetables |
| 30.14 | press for garlic |
| 30.2 | press for hamburgers |
| 31 | knife sharpener |
| 31.1 | electric sharpener |
| 31.2 | sharpening stone |
| 31.3 | ceramic sharpener |
| 32 | breadbox |
| 33 | lattice with legs |
| | Kitchen dishes |
| 1 | for alcohol |
| 1.2 | Brandy set with dispenser |
| 1.3 | souvenir cups |
| 1.4 | stemware |
| 1.5 | pail of ice |
| 1.6 | stemware |
| 1.7 | champagne bucket |
| 1.8 | stemware |
| 1.9 | carafe |
| 1.10 | server |
| 1.11 | bottle holder |
| 2 | tableware |
| 2.1 | first course dish |
| 2.2 | dish for bouillon |
| 2.3 | bouillon bowl |
| 2.4 | oiler |
| 2.5 | round dish |
| 2.6 | duck pan |
| 2.7 | Set for making chocolate fondue |
| 2.8 | Set for making cheese fondue |
| 2.9 | salad bowl |
| 2.10 | dish for cake |
| 2.11 | compartmental dish |
| 2.12 | set of cutlery |
| 2.13 | serving spoon and fork |
| 2.14 | dish with lid |
| 2.15 | steam table |
| 2.16 | ice-cream bowl |
| 2.17 | Flatware |
| 2.18 | saucer |
| 2.19 | saucer for jam |
| 2.20 | mustard-pot |
| 2.21 | pepper-pot |
| 2.22 | ash-pot |
| 2.23 | deep table plate |
| 2.24 | dinner plate |
| 2.25 | snack plate |
| 2.26 | deep dessert plate |
| 2.27 | dessert plate |
| 2.28 | plate for pies |
| 2.29 | horseradish-pot |
| 3 | Utensils for table |
| 3.1 | Pad for tableware |
| 3.2 | serving mat |
| 3.3. | serving tray |
| 3.4 | glass burner |
| 4 | Dishes for tea, coffee, dessert |
| 4.1 | sugar-bowl |
| 4.2 | mug |
| 4.3 | mug with teapot |
| 4.4 | mug with stand |

TABLE A-continued

| Types of Equipment | |
|---|---|
| | Types of Equipment |
| 4.5 | mug with lid |
| 4.6 | tea set |
| 4.7 | dish |
| 4.8 | french-press |
| 4.9 | teapot |
| 4.10 | teapot with strainer |
| 4.11 | glass teapot |
| 4.12 | ice-cream bowl |
| 4.13 | multifunctional vase |
| 4.14 | glasses |
| 4.15 | soup bowl |
| 4.16 | wicker basket |
| 4.17 | vase 3-tier |
| 4.18 | tea set |
| 4.19 | napkin rings |
| 4.20 | pannier for fruits |
| 4.21 | table trash basket |
| 4.22 | biscuit dish |
| 4.23 | candy dish |
| 4.24 | coffee sets |
| 5 | CUTLERY |
| 5.1 | Table fork |
| 5.2 | fork for sprat |
| 5.3 | fork for crayfish |
| 5.4 | fork for oysters |
| 5.6 | fork for lemons |
| 5.7 | big spoon |
| 5.8 | dessert spoon |
| 5.9 | tea spoon |
| 5.10 | coffee spoon |
| 5.11 | lemonade spoon |
| 5.12 | ladle-spoon |
| 5.13 | spoon for hot snacks |
| 5.14 | ice cream spoon |
| 5.15 | mustard spoon |
| 5.16 | salt spoon |
| 5.17 | spatula for cakes |
| 5.18 | spatula for caviar |
| 5.19 | spatula for fish |
| 5.20 | table knife |
| 5.21 | knife and fork for the fish |
| 5.22 | knife and fork snack |
| 5.23 | knife and fork dessert |
| 5.24 | Butterknife |
| 5.25 | tool kits for lobster, crayfish |
| 5.26 | devices for spices |
| 5.27 | grille and asparagus tongs |
| 5.28 | salad unit (salad fork and spoon) |
| 5.29 | sugar-tongs |
| 5.30 | tongs for cakes and sugar |
| 5.31 | ice tongs |
| 5.32 | can-opener |
| 5.33 | fork oyster |
| 5.34 | plug for crayfish |
| 5.36 | cocotte fork |
| 5.37 | fork for canned fish in oil (sprat, sardines) |
| 5.38 | spinner for champagne |
| 5.39 | spoon to mix whiskey with soda water |
| | Kitchen appliances |
| 1 | aerogrill |
| 2 | blenders, grinder |
| 3 | coffee Maker |
| 4 | coffee grinder (coffee mill) |
| 5 | Food Processor |
| 6 | mixer |
| 7 | mini oven |
| 8 | multicooker |
| 9 | meat grinders |
| 10 | steamers |
| 11 | Raclette grill |
| 12 | Juicers |
| 13 | toasters |
| 14 | egg cooker |
| 15 | electric range |
| 15.1 | electric induction stove |

TABLE A-continued

| Types of Equipment | |
|---|---|
| | Types of Equipment |
| 16 | electric kettle |
| 16.1 | thermopots |
| 17 | bread makers |
| 18 | microwaves |
| 19 | weights for kitchen |
| 20 | electric driers |
| 21 | weights for kitchen |
| | Children's dishes |
| 1 | Children Sets for baking |
| 2 | Children cutlery |
| 3 | Children thermoses |
| 4 | Children Sets of dishes |
| | List of ingredient data |
| 1 | Ingredient name |
| 2 | Ingredient Photo |
| 3 | Manufacturer |
| 4 | Country |
| 5 | Type of Ingredient |
| 6 | Type of cuisine |
| 7 | Relation to Vegetarianism |
| 8 | Spice |
| 9 | Energy value |
| 10 | Description of the Ingredient |
| 11 | Status |
| 12 | Price |
| | List of equipment data |
| 1 | Equipment name |
| 2 | Equipment photo |
| 3 | Manufacturer |
| 4 | Brand name |
| 5 | Dimensions |
| 6 | Weight |
| 7 | Connectivity |
| 8 | Type of cuisine |
| 9 | Type of equipment |
| 10 | Description of equipment |
| 11 | Year |
| 12 | Status |
| 13 | Price |
| | List of recipe data |
| 1 | Name of the recipe |
| 2 | Recipe author |
| 3 | Recipe Photo |
| 4 | Preparation time |
| 5 | Basis of the dish |
| 6 | Type of cuisine |
| 7 | Type of the dish |
| 8 | Relation to Vegetarianism |
| 9 | Spice |
| 10 | Energy value |
| 11 | Number of persons |
| 12 | Description of the recipe |
| 13 | Description of the stages of cooking |
| 14 | Ingredients |
| 15 | Type of equipment |
| 16 | Video of recipe cooking |
| 17 | User Rating |
| 18 | Expert Rating |
| 19 | Amount of sales |
| 21 | Automatic cooking |
| 22 | Price |

TABLE B

| Types of Ingredients | |
|---|---|
| 1 | MEAT and MEAT PRODUCTS |
| 1 | Basturma |
| 2 | Fat |

TABLE B-continued

| Types of Ingredients | |
|---|---|
| 3 | brisket cooked and smoked |
| 4 | Hare |
| 5 | leather duck |
| 6 | Sausage |
| 7 | Sausages |
| 8 | Sausages "Hunting party" |
| 9 | Horsemeat |
| 10 | Bones with bone marrow |
| 11 | Roe |
| 12 | Rabbit |
| 13 | Meat |
| 14 | Moosemeat |
| 15 | Venison |
| 16 | Liver |
| 17 | Kidney |
| 18 | Smoked ribs |
| 19 | Salami |
| 20 | Sausages |
| 21 | Cervelat |
| 22 | Sausages |
| 23 | Hungarian smoked bacon |
| 24 | bacon fat-tailed |
| 25 | Steak |
| 26 | ribeye steak |
| 27 | Farce |
| 28 | crocodile fillet |
| 29 | Jamon |
| 30 | Choriso (spanish sausage) |
| 31 | Skewers |
| 32 | Sowbelly |
| 33 | Deer tongue |
| 34 | Frog legs |
| | LAMB, VEAL |
| 1 | breast of lamb |
| 2 | loin of lamb |
| 3 | blade lamb |
| 4 | veal brains |
| 5 | mutton ham |
| 6 | veal ham |
| 7 | leg of lamb |
| 8 | Heel muscle mutton |
| 9 | lamb offal |
| 10 | veal kidneys |
| 11 | lamb chops |
| 12 | gras cow |
| 13 | veal heart |
| 14 | lamb testicles |
| 15 | veal fillet |
| 16 | veal cheeks |
| 17 | minced lamb |
| 18 | minced veal |
| 19 | veal tail |
| 20 | veal tongue |
| 21 | eggs bullish |
| | BEEF |
| 1 | beef brisket |
| 2 | beef fillet |
| 3 | beef (sirloin) |
| 4 | beef on the bone |
| 5 | beef eye muscle |
| 6 | legs of beef |
| 7 | ham beef |
| 8 | gras beef |
| 9 | beef ribs |
| 10 | beef heart |
| 11 | minced beef |
| 12 | tail beef |
| 13 | beef tongue |
| | PORK |
| 1 | bacon |
| 2 | smoked bacon |
| 3 | Pork |
| 4 | Ham |
| 5 | pork brisket |
| 6 | smoked pork belly |

TABLE B-continued

| Types of Ingredients | |
|---|---|
| 7 | Pork Intestine |
| 8 | legs of pork |
| 9 | boar ham |
| 10 | pork ham |
| 11 | pork ribs |
| 12 | knuckle of pork |
| 13 | Fat |
| 14 | pork (pork neck or loin) |
| 15 | pork ears |
| 16 | minced pork |
| 17 | pig tail |
| 18 | pork tongue |
| 2 | BIRDS |
| 1 | garshnep |
| 2 | turkey breast |
| 3 | chicken breast |
| 4 | chicken breast, smoked |
| 5 | duck breast |
| 6 | Goose |
| 7 | chicken ventricles |
| 8 | turkey |
| 9 | turkey wings |
| 10 | chicken wings |
| 11 | chicken |
| 12 | smoked chicken |
| 13 | grouse |
| 14 | Coot |
| 15 | duck leg |
| 16 | crow's feet |
| 17 | chicken legs |
| 18 | chicken ham |
| 19 | Quail |
| 20 | gras chicken |
| 21 | chicken giblets |
| 22 | grouse |
| 23 | chicken hearts |
| 24 | Duck |
| 25 | smoked duck |
| 26 | Pheasant |
| 27 | minced chicken |
| 28 | chicken fillet |
| 29 | foie gras |
| 30 | chicken |
| 31 | chicken gutted |
| 32 | neck duck |
| 3 | FISH and SEAFOOD |
| 1 | anchovies |
| 2 | arctic char |
| 3 | mullet |
| 4 | Black Sea goby |
| 5 | shrimp head |
| 6 | Butterfish |
| 7 | scallops |
| 8 | dorado |
| 9 | Ruff |
| 10 | caviar |
| 11 | red caviar |
| 12 | Tobiko caviar |
| 13 | Squid |
| 14 | flounder |
| 15 | cuttlefish |
| 16 | Carp |
| 17 | Sprat |
| 18 | Smelt |
| 19 | crab sticks |
| 20 | Shrimps |
| 21 | King shrimps |
| 22 | Salad shrimps |
| 23 | Tiger prawn |
| 24 | Bream |
| 25 | salmon |
| 26 | Smoked salmon |
| 27 | Mussels |
| 28 | Mussels with shells |
| 29 | Pollock |
| 30 | Molluscs |
| 31 | Sea food |
| 32 | Sea fish |

TABLE B-continued

| Types of Ingredients | |
|---|---|
| 33 | sole (fish) |
| 34 | Crab meat |
| 35 | Krill meat |
| 36 | Burbot |
| 37 | Perch |
| 38 | Lobster |
| 39 | Cisco |
| 40 | sturgeon |
| 41 | octopus |
| 42 | baby octopus |
| 43 | shrimp broth |
| 44 | halibut |
| 45 | Pangasius |
| 46 | cod liver oil |
| 47 | Haddock |
| 48 | Crayfish |
| 49 | dried crustaceans |
| 50 | Hot smoked fish |
| 51 | red fish salted |
| 52 | Swordfish |
| 53 | Saury |
| 54 | Sardines |
| 55 | Herring |
| 56 | Salmon |
| 57 | smoked salmon |
| 58 | salted salmon |
| 59 | Seabass |
| 60 | Whitefish |
| 61 | Ramp |
| 62 | Mackerel |
| 63 | smoked mackerel |
| 64 | Sheatfish |
| 65 | Starlet |
| 66 | Walleye |
| 67 | Dried seaweed |
| 68 | Tilapia |
| 69 | Carp |
| 70 | Cod |
| 71 | Hot smoked cod |
| 72 | black cod |
| 73 | Tuna |
| 74 | Turbot |
| 75 | Eel |
| 76 | smoked eel |
| 77 | Snails |
| 78 | Oysters |
| 79 | white fish fillets |
| 80 | catfish fillets |
| 81 | fillet of carp |
| 82 | fish fillet |
| 83 | salmon fillet |
| 84 | salted herring fillets |
| 85 | perch fillet |
| 86 | Trout |
| 87 | smoked trout |
| 88 | Squid Ink |
| 89 | cervical shrimp |
| 90 | cervical cancers |
| 91 | Sprats |
| 92 | Pike |
| 4 | VEGETABLES |
| 2 | Artichokes |
| 3 | Eggplant |
| 4 | Yam |
| 5 | broccoli tops |
| 6 | beet tops |
| 7 | Broccoli |
| 8 | Rutabaga |
| 9 | Galangal |
| 10 | Peas |
| 11 | pea sprouts |
| 12 | pea pods |
| 13 | green peas |
| 14 | Daikon |
| 15 | Melon |
| 16 | Ginseng |
| 17 | Ginger |
| 18 | Zucchini |

TABLE B-continued

| Types of Ingredients | |
|---|---|
| 19 | Feces |
| 20 | Cabbage |
| 21 | Brussels sprouts |
| 22 | Sauerkraut |
| 23 | Chinese cabbage |
| 24 | Cabbage |
| 25 | Romanesco cabbage |
| 26 | savoy cabbage |
| 27 | Cauliflower |
| 28 | Potatoes |
| 29 | young potatoes |
| 30 | Kohlrabi |
| 31 | root anise |
| 32 | salsify root |
| 33 | parsley root |
| 34 | celery root |
| 35 | fresh corn |
| 36 | white onion |
| 37 | pearl bow |
| 38 | onion |
| 39 | red onion |
| 40 | dry onion |
| 41 | small onion |
| 42 | Shallots |
| 43 | cassava |
| 44 | mini corn |
| 45 | mini peppers |
| 46 | mini-tomatoes |
| 47 | carrots |
| 48 | cucumber |
| 49 | parsnips |
| 50 | squash |
| 51 | bell peppers |
| 52 | cayenne pepper |
| 53 | fresh chili pepper |
| 54 | jalapeno peppers |
| 55 | tomato |
| 56 | pickled tomatoes |
| 57 | cherry tomatoes |
| 58 | sunflower sprouts |
| 59 | wheat germ |
| 60 | soybean seedlings |
| 61 | germinated soybeans |
| 62 | rhubarb |
| 63 | Radish |
| 64 | wild radish |
| 65 | Turnip |
| 66 | beansprouts |
| 67 | Beet |
| 68 | Asparagus |
| 69 | chopped tomatoes |
| 70 | Sweet |
| 71 | Pumpkin |
| 72 | green beans |
| 73 | Fennel |
| 74 | *physalis* |
| 75 | horseradish |
| 76 | zucchini |
| 77 | Garlic |
| 78 | endive |
| 5 | FRUITS |
| 1 | Apricot |
| 2 | Avocado |
| 3 | quince |
| 4 | fresh pineapple |
| 5 | Orange |
| 6 | banana |
| 7 | Hawthorn |
| 8 | cranberries |
| 9 | grapes |
| 10 | Cherry |
| 11 | Dried cherries |
| 12 | blueberries |
| 13 | Garnet |
| 14 | Grapefruit |
| 15 | Pear |
| 16 | Blackberry |
| 17 | strawberries |

TABLE B-continued

| Types of Ingredients | |
|---|---|
| 18 | pomegranate seeds |
| 19 | carambola |
| 20 | Kiwi |
| 21 | Strawberry |
| 22 | Cranberry |
| 23 | coconut |
| 24 | gooseberry |
| 25 | kumquat |
| 26 | Lime |
| 27 | lemon |
| 28 | Litchi |
| 29 | raspberries |
| 30 | mango |
| 31 | Mandarin |
| 32 | Passionfruit |
| 33 | mini pineapple |
| 34 | Nectarine |
| 35 | buckthorn |
| 36 | papaya |
| 37 | Peach |
| 38 | Pomelo |
| 39 | Rowan |
| 40 | Drain |
| 41 | red currants |
| 42 | black currant |
| 43 | tamarind |
| 44 | Feijoa |
| 45 | fruit to taste |
| 46 | persimmon |
| 47 | cherries |
| 48 | Cherry |
| 49 | blueberries |
| 50 | Apple |
| 51 | frozen berries |
| 52 | juniper berries |
| 53 | fresh berries |
| 6 | GROCERY |
| 1 | Agar |
| 2 | Adjika |
| 3 | rice paper |
| 4 | vanilla extract |
| 5 | vermicelli rice |
| 6 | egg noodles |
| 7 | Algae |
| 8 | Glucose |
| 9 | Jam |
| 10 | raspberry jam |
| 11 | fresh yeast |
| 12 | Gelatin |
| 13 | liquid Smokehouse |
| 14 | Sweetener |
| 15 | corn muffins |
| 16 | Ketchup |
| 17 | citric acid |
| 18 | Candy |
| 19 | Confiture |
| 20 | strawberry jam |
| 21 | food dye |
| 22 | Starch |
| 23 | potato starch |
| 24 | corn starch |
| 25 | bread crumbs |
| 26 | Noodles |
| 27 | buckwheat noodles |
| 28 | Pad Thai noodles |
| 29 | rice noodles |
| 30 | glass noodles |
| 31 | noodles harusame |
| 32 | egg noodles |
| 33 | Mayonnaise |
| 34 | poppy sweet |
| 35 | Pasta |
| 36 | cannelloni pasta |
| 37 | pasta lumakoni |
| 38 | pasta feathers |
| 39 | fusilli pasta |
| 40 | pumpkin marmalade |
| 41 | jujube fruit |

TABLE B-continued

| Types of Ingredients | |
|---|---|
| 42 | Marzipan |
| 43 | Mirin |
| 44 | coconut milk |
| 45 | almond milk |
| 46 | soy milk |
| 47 | Muesli |
| 48 | Pasta |
| 49 | peanut paste |
| 50 | red curry paste |
| 51 | tamarind paste |
| 52 | Tom Yam Paste |
| 53 | chili paste |
| 54 | Molasses |
| 55 | Pectin |
| 56 | Penne |
| 57 | Jam |
| 58 | elderberry syrup |
| 59 | vanilla syrup |
| 60 | syrup vishnevny |
| 61 | ginger syrup |
| 62 | caramel syrup |
| 63 | maple syrup |
| 64 | strawberry syrup |
| 65 | coffee syrup |
| 66 | corn syrup |
| 67 | raspberry syrup |
| 68 | mango syrup |
| 69 | honey syrup |
| 70 | almond syrup |
| 71 | walnut syrup |
| 72 | blackcurrant syrup |
| 73 | chocolate syrup |
| 74 | cranberry sauce |
| 75 | worcestershire sauce |
| 76 | pomegranate sauce |
| 77 | kimchi sauce |
| 78 | Pesto |
| 79 | fish sauce |
| 80 | fish sauce nampla |
| 81 | Tabasco sauce |
| 82 | teriyaki sauce |
| 83 | sauce tkemali |
| 84 | oyster sauce |
| 85 | sweet chili sauce |
| 86 | Japanese walnut sauce |
| 87 | spaghetti |
| 88 | crumbs of white bread |
| 89 | breadcrumbs |
| 90 | pastry decorations |
| 91 | candied |
| 7 | MILK PRODUCTS and EGGS |
| 1 | yogurt |
| 2 | natural yoghurt |
| 3 | Kefir |
| 4 | margarine |
| 5 | butter |
| 6 | melted butter |
| 7 | Milk |
| 8 | baked milk |
| 9 | buttermilk |
| 10 | curdled |
| 11 | cream |
| 12 | sour cream |
| 13 | Whey |
| 14 | Thane |
| 15 | Curd |
| 16 | curd beaded |
| 17 | quail eggs |
| 18 | Egg |
| 8 | MUSHROOMS |
| 2 | mushrooms |
| 3 | Ceps |
| 4 | Enoki mushrooms |
| 5 | Chinese dried mushrooms |
| 6 | portobello mushrooms |
| 7 | dried mushrooms |
| 8 | shiitake mushrooms |
| 9 | milkmushrooms |

TABLE B-continued

| Types of Ingredients | |
|---|---|
| 10 | chanterelles |
| 11 | *boletus* |
| 12 | honey fungus |
| 13 | saffron milk cap |
| 14 | morels |
| 15 | truffles |
| 16 | meadow mushrooms |
| 9 | CHEESE |
| 1 | cheese |
| 2 | cheese Adyghe |
| 3 | brie cheese |
| 4 | feta cheese |
| 5 | Burrata cheese |
| 6 | Gouda cheese |
| 7 | Dutch cheese |
| 8 | blue cheese |
| 9 | Gorgonzola |
| 10 | grana padano cheese |
| 11 | Gruyere cheese |
| 12 | Dor Blue cheese |
| 13 | Camembert |
| 14 | goat cheese |
| 15 | cheese sausage |
| 16 | mascarpone cheese |
| 17 | Monterey Jack cheese |
| 18 | mozzarella cheese |
| 19 | soft cheese |
| 20 | goat cheese |
| 21 | parmesan cheese |
| 22 | pecorino cheese |
| 23 | processed cheese |
| 24 | cheese Poshehonsky |
| 25 | ricotta cheese |
| 26 | Roquefort cheese |
| 27 | blue cheese |
| 28 | cream cheese |
| 29 | suluguni |
| 30 | cheese curd |
| 31 | feta cheese |
| 32 | philadelphia cheese |
| 33 | cheddar cheese |
| 34 | edam cheese |
| 35 | Emmentaler cheese |
| 10 | NUTS and DRIED FRUITS |
| 1 | peanuts |
| 2 | barberry |
| 3 | walnuts (peeled) |
| 4 | raisins |
| 5 | Figs |
| 6 | Chestnut |
| 7 | Dried cranberries |
| 8 | coconut |
| 9 | dried apricots |
| 10 | Filbert (hazelnut) |
| 11 | almonds |
| 12 | Nuts |
| 13 | pine nuts |
| 14 | cashew nuts |
| 15 | Dried peaches |
| 16 | sunflower seeds |
| 17 | pumpkin seeds |
| 18 | Dried Fruits |
| 19 | Dates |
| 20 | Pistachios |
| 21 | Hazelnuts |
| 22 | Prunes |
| 11 | BEVERAGES |
| 1 | Water |
| 2 | water orange |
| 3 | mineral water |
| 4 | water pink |
| 5 | GABA-tea |
| 6 | *Hibiscus* |
| 7 | Kvass |
| 8 | bread kvass |
| 9 | Coke |
| 10 | Kuding |
| 11 | Lemonade |

TABLE B-continued

| Types of Ingredients | |
|---|---|
| 12 | Mate |
| 13 | Juice |
| 14 | carbonated drink |
| 15 | Bitter Brandy |
| 16 | Rooibos |
| 17 | pineapple juice |
| 18 | orange juice |
| 19 | birch juice |
| 20 | grape juice |
| 21 | cherry juice |
| 22 | pomegranate juice |
| 23 | strawberry juice |
| 24 | cranberry juice |
| 25 | gooseberry juice |
| 26 | lime juice |
| 27 | mango juice |
| 28 | tangerine juice |
| 29 | peach juice |
| 30 | currant juice |
| 31 | tomato juice |
| 32 | apple juice |
| 33 | Sprite |
| 34 | Tonic |
| 35 | tea white |
| 36 | tea yellow |
| 37 | green tea |
| 38 | red tea |
| 39 | Puer tea |
| 40 | Puer tea in Mandarin |
| 41 | oolong tea |
| 42 | black tea |
| 43 | Espresso |
| 12 | ALCOHOL |
| 1 | Balm |
| 2 | Bitter |
| 3 | Brandy |
| 4 | Bourbon |
| 5 | Vermouth |
| 6 | Wine |
| 7 | white wine |
| 8 | sparkling wine |
| 9 | red wine |
| 10 | dry red wine |
| 11 | wine sangria |
| 12 | Whiskey |
| 13 | Vodka |
| 14 | anise vodka |
| 15 | Grappa |
| 16 | Gin |
| 17 | Irish cream liqueur |
| 18 | Calvados |
| 19 | Cachaca |
| 20 | Brandy |
| 21 | Liqueur |
| 22 | orange liqueur |
| 23 | coffee liqueur |
| 24 | chocolate liqueur |
| 25 | Madeira |
| 26 | Marsala |
| 27 | Martini |
| 28 | Beer |
| 29 | cherry beer |
| 30 | Port |
| 31 | Rum |
| 32 | white rum |
| 33 | black rum |
| 34 | Sake |
| 35 | sambuca |
| 36 | Cider |
| 37 | tequila |
| 38 | sherry |
| 39 | Champagne (Brut) |
| 40 | schnapps |
| 13 | GREENS AND HERBS |
| 1 | Basil |
| 2 | basil red |
| 3 | bouquet garni |
| 4 | oregano |

TABLE B-continued

| Types of Ingredients | |
|---|---|
| 5 | greens |
| 6 | dried herbs |
| 7 | cabbage pak choi |
| 8 | chervil |
| 9 | cilantro |
| 10 | *oxalis* |
| 11 | oat root |
| 12 | fresh coriander |
| 13 | nettle |
| 14 | Watercress |
| 15 | watercress |
| 16 | rose petals |
| 17 | lemongrass |
| 18 | bamboo leaves |
| 19 | banana leaves |
| 20 | grape leaves |
| 21 | Grape leaves (salty) |
| 22 | kaffir lime leaves |
| 23 | lime leaves |
| 24 | dandelion leaves |
| 25 | green onion |
| 26 | Leek |
| 27 | marjoram |
| 28 | Chard |
| 29 | melissa |
| 30 | lemon balm |
| 31 | Mint |
| 32 | oregano |
| 33 | parsley |
| 34 | dried parsley |
| 35 | plantain |
| 36 | wormwood |
| 37 | chopped camomile |
| 38 | arugula |
| 39 | iceberg lettuce |
| 40 | green salad |
| 41 | corn salad |
| 42 | lettuce |
| 43 | leaf lettuce |
| 44 | salad Mizuno |
| 45 | Oakleaf lettuce |
| 46 | radicchio salad |
| 47 | romaine lettuce |
| 48 | salad Friess |
| 49 | salad mix |
| 50 | celery |
| 51 | Lemon grass (lemon grass) |
| 52 | Italian herbs |
| 53 | spicy herbs |
| 54 | Dill |
| 55 | dandelion flowers |
| 56 | flowers |
| 57 | lavender flowers |
| 58 | chicory |
| 59 | thyme |
| 60 | Ramson |
| 61 | saffron |
| 62 | rosehips |
| 63 | chives |
| 64 | spinach |
| 65 | sorrel |
| 66 | tarragon |
| 14 | Cereals, legumes and flours |
| 1 | beans |
| 2 | mung beans |
| 3 | bulgur |
| 4 | puffed rice |
| 5 | buckwheat green |
| 6 | Quinoa |
| 7 | buckwheat |
| 8 | corn grits |
| 9 | semolina |
| 10 | Oats |
| 11 | pearl barley |
| 12 | cereal wheat |
| 13 | couscous |
| 14 | Flour |
| 15 | buckwheat flour |

TABLE B-continued

| Types of Ingredients | |
|---|---|
| 16 | chestnut flour |
| 17 | corn flour |
| 18 | almond flour |
| 19 | Chickpea flour |
| 20 | oat flour |
| 21 | wheat flour |
| 22 | rye flour |
| 23 | rice flour |
| 24 | Chickpeas |
| 25 | Bran |
| 26 | Millet |
| 27 | Figure |
| 28 | Figure baya |
| 29 | basmati rice |
| 30 | brown rice |
| 31 | wild rice |
| 32 | Round grain rice |
| 33 | semola (flour made from durum wheat) |
| 34 | Beans |
| 35 | white beans |
| 36 | red beans |
| 37 | buckwheat flakes |
| 38 | cereal grains |
| 39 | oat flakes |
| 40 | Lentils |
| 41 | Barley |
| 15 | Spices and Seasonings |
| 1 | star anise |
| 2 | white pepper |
| 3 | Vanillin |
| 4 | Vanilla |
| 5 | vanilla essence |
| 6 | vanilla powder |
| 7 | Wasabi |
| 8 | Caltrop |
| 9 | garam masala |
| 10 | Carnation |
| 11 | cloves minced |
| 12 | Mustard |
| 13 | sweet mustard |
| 14 | allspice peas |
| 15 | grain mustard |
| 16 | Cumin |
| 17 | ground ginger |
| 18 | Capers |
| 19 | Cardamom |
| 20 | Curry |
| 21 | Coriander |
| 22 | ground coriander |
| 23 | Cinnamon |
| 24 | coffee essence |
| 25 | balsamic cream |
| 26 | Sesame |
| 27 | Turmeric |
| 28 | bay leaf |
| 29 | lemon pepper |
| 30 | poppy seed |
| 31 | Olives |
| 32 | olives dry |
| 33 | avocado oil |
| 34 | anchovy butter |
| 35 | peanut oil |
| 36 | mustard oil |
| 37 | oil for frying |
| 38 | scented oil |
| 39 | grapeseed oil |
| 40 | canola oil |
| 41 | corn oil |
| 42 | sesame oil |
| 43 | linseed oil |
| 44 | olive oil |
| 45 | Peanut butter |
| 46 | sunflower oil |
| 47 | lean oil |
| 48 | vegetable oil |
| 49 | oil, refined |
| 50 | oil seed-bearing |
| 51 | soybean oil |

TABLE B-continued

| Types of Ingredients | |
|---|---|
| 52 | truffle oil |
| 53 | oil pumpkin |
| 54 | almonds hammers |
| 55 | miso paste |
| 56 | sea salt |
| 57 | Nutmeg |
| 58 | Olives |
| 59 | Ligurian olives |
| 60 | hot red pepper |
| 61 | hot peppers |
| 62 | Fenugreek |
| 63 | Paprika |
| 64 | lemongrass paste |
| 65 | peperoncini |
| 66 | pepper pink polka dots |
| 67 | Chili |
| 68 | Dried chili peppers |
| 69 | mustard powder |
| 70 | seasoning fish |
| 71 | baking powder |
| 72 | rosemary |
| 73 | pink ground pepper |
| 74 | Sugar |
| 75 | vanilla sugar |
| 76 | brown sugar |
| 77 | sugar muskovado |
| 78 | sugar cane |
| 79 | powdered sugar |
| 80 | *nasturtium* seeds |
| 81 | *Nigella* seeds |
| 82 | fennel seeds |
| 83 | spice mix “taco” |
| 84 | Soda |
| 85 | ginger juice squeezed |
| 86 | lemon juice |
| 87 | Salt |
| 88 | citrate |
| 89 | grape sauce |
| 90 | sauce narsharab |
| 91 | ponzu sauce |
| 92 | soy sauce |
| 93 | tomato sauce |
| 94 | chili sauce |
| 95 | Spices |
| 96 | sumac |
| 97 | thyme |
| 98 | cumin |
| 99 | Mediterranean herbs |
| 100 | French herbs |
| 101 | vinegar |
| 102 | balsamic vinegar |
| 103 | wine vinegar |
| 104 | white wine vinegar |
| 105 | red wine vinegar |
| 106 | cherry vinegar |
| 107 | raspberry vinegar |
| 108 | rice vinegar |
| 109 | apple cider vinegar |
| 110 | hops suneli |
| 111 | Savory |
| 112 | chutney |
| 113 | black pepper |
| 114 | black pepper peas |
| 115 | dry garlic |
| 116 | Sage |
| 16 | PREPARED PRODUCTS |
| 1 | canned pineapple |
| 2 | canned artichokes |
| 3 | Marinated artichokes |
| 4 | baguette |
| 5 | Loaf |
| 6 | Bars of chocolate |
| 7 | meringue |
| 8 | biscuit |
| 9 | beans, canned |
| 10 | Bun |
| 11 | buns for hamburgers |
| 12 | Broth |

TABLE B-continued

| Types of Ingredients | |
|---|---|
| 13 | beef broth |
| 14 | chicken broth |
| 15 | fish broth |
| 16 | Jam |
| 17 | Apricot jam |
| 18 | lingonberry jam |
| 19 | cherry jam |
| 20 | black currant jam |
| 21 | raspberry jam |
| 22 | blueberry jam |
| 23 | Wafer |
| 24 | canned cherry |
| 25 | Glaze |
| 26 | Dijon mustard |
| 27 | croutons |
| 28 | marinated mushrooms |
| 29 | Demiglas apple |
| 30 | Yeast |
| 31 | Jelly |
| 32 | leaven |
| 33 | marshmallows |
| 34 | crushed tomatoes in juice |
| 35 | pickled ginger |
| 36 | Cocoa |
| 37 | marinated cactus |
| 38 | Pickled capers |
| 39 | sour cabbage |
| 40 | sea kale |
| 41 | Kimchi |
| 42 | wafer cakes |
| 43 | gherkins |
| 44 | natural coffee |
| 45 | instant coffee |
| 46 | Crackers |
| 47 | Chocolate Crumb |
| 48 | Croissant |
| 49 | bouillon cubes |
| 50 | canned corn |
| 51 | marinated corn |
| 52 | Pita |
| 53 | Lanspik |
| 54 | Ice |
| 55 | Letcho |
| 56 | lasagna sheets |
| 57 | canned salmon |
| 58 | pickled onions |
| 59 | canned mandarins |
| 60 | marshmallow |
| 61 | hazelnut oil |
| 62 | sweet curd |
| 63 | Yoghurt |
| 64 | Honey |
| 65 | honey in the comb |
| 66 | Mix ginger |
| 67 | condensed milk |
| 68 | condensed milk boiled |
| 69 | milk powder |
| 70 | pickled carrots |
| 71 | ice cream |
| 72 | vanilla ice cream |
| 73 | chocolate ice cream |
| 74 | salted cucumber |
| 75 | pickled cucumbers |
| 76 | pickled cucumbers |
| 77 | Pecans |
| 78 | beet broth |
| 79 | corn sticks |
| 80 | bread sticks |
| 81 | tomato paste |
| 82 | Pasta Chocolate |
| 83 | Pate |
| 84 | frozen dumplings |
| 85 | hot pepper pickled |
| 86 | canned peaches |
| 87 | Cookies |
| 88 | Biscuit |
| 89 | Cookies Savoiardi |
| 90 | chocolate cookies |

TABLE B-continued

| Types of Ingredients | |
|---|---|
| 91 | Pita |
| 92 | Supplements |
| 93 | tomatoes in juice |
| 94 | canned tomatoes |
| 95 | Popcorn |
| 96 | Prosciutto |
| 97 | Gingerbread |
| 98 | mango puree |
| 99 | mashed potatoes |
| 100 | tomato puree |
| 101 | apple puree |
| 102 | pickle cucumber |
| 103 | Roll |
| 104 | Pickled beets |
| 105 | pork jerky |
| 106 | sugar syrup |
| 107 | whipped cream |
| 108 | cream of coconut |
| 109 | Malt |
| 110 | Sorbet |
| 111 | barbecue sauce |
| 112 | sauce bearnez |
| 113 | Béchamel |
| 114 | Worcestershire sauce |
| 115 | sauce Demiglas |
| 116 | sauce for soups “Bright udon” |
| 117 | sweet and sour sauce |
| 118 | Salsa |
| 119 | sweet sauce |
| 120 | chocolate sauce |
| 121 | berry sauce |
| 122 | asparagus, soya |
| 123 | caramel chips |
| 124 | crushed crackers |
| 125 | Tartlets |
| 126 | Tahini |
| 127 | pasta for lasagna |
| 128 | dough for ravioli |
| 129 | pizza dough |
| 130 | yeast dough |
| 131 | dough kataifi |
| 132 | shortbread dough |
| 133 | pastry dough |
| 134 | puff pastry |
| 135 | dough dry |
| 136 | filo pastry |
| 137 | dried tomatoes |
| 138 | Tortilla |
| 139 | Toast |
| 140 | Tofu |
| 141 | tuna fish oil |
| 142 | tuna canned in its own juice |
| 143 | Tahini |
| 144 | Rice Stuffing |
| 145 | Canned beans |
| 146 | white bread |
| 147 | toast bread |
| 148 | rye bread |
| 149 | sweet bread |
| 150 | black bread |
| 151 | rye bread |
| 152 | corn flakes |
| 153 | ciabatta |
| 154 | tea Away |
| 155 | potato chips |
| 156 | corn chips |
| 157 | Marinated mushrooms |
| 158 | chocolate corn balls |
| 159 | Chocolate |
| 160 | white chocolate |
| 161 | bitter chocolate |
| 162 | milk chocolate |
| 163 | dark chocolate |

TABLE C

| Lists of Food Preparation Methods and Equipment, Cuisine and Bases |
|---|
| A list of food preparation methods |
| 1; “0”; “The fried” |
| 2; “0”; The boiled” |
| 3; “0”; The stewed” |
| 4; “0”; “The baked” |
| 5; “0”; “The cut” |
| A list of Equipment |
| 1; “0”; “ KITCHEN ACCESSORIES” |
| 2; “1”; “funnels” |
| 3; “2”; “stainless steel funnel” |
| 4; “2”; “plastic funnel” |
| 5; “2”; “silicone funnel” |
| 6; “2”; “convertible funnel” |
| 7; “1”; “colanders” |
| 8; “7”; “quadratic colanders” |
| 9; “7”; “oval ladle-vases” |
| 10; “7”; “colanders with folding handles” |
| 11; “7”; “flat colander” |
| 12; “7”; “plastic colanders” |
| 13; “7”; “small round colanders” |
| 14; “7”; “suspended colanders” |
| 15; “7”; “cover-colander” |
| 16; “7”; “stainless steel and aluminum colanders” |
| 17; “7”; “cone colanders” |
| 18; “1”; “Kitchen Appliances” |
| 19; “18”; “whisk” |
| 20; “18”; “scoop spatula” |
| 21; “20”; “cook spatula” |
| 22; “20”; “spatula with slots” |
| 23; “20”; “confectionery spatula” |
| 24; “18”; “spoons” |
| 25; “24”serving spoon” |
| 26; “24”; “spoon-tongs” |
| 27; “24”; “spoon with slots” |
| 28; “24”; “spoon for rice” |
| 29; “24”; “ladle spoon” |
| 30; “24”; “ice cream spoon” |
| 31; “24”; “honey spoon” |
| 32; “24”; “spaghetti spoon” |
| 33; “24”; “serving spoon” |
| 34; “18”; “confectionery syringe for cookies and cream” |
| 35; “18”; “soup ladle” |
| 36; “18”; “potato masher” |
| 37; “18”; “skimmer” |
| 38; “18”; “Meat fork” |
| 39; “18”; “brush” |
| 40; “18”; “coffee filter” |
| 41; “18”; “whisk” |
| 42; “18”; “silicone brush” |
| 43; “18”; “silicone juicer” |
| 44; “18”; “earthen saucer” |
| 45; “18”; “tea filter” |
| 46; “18”; “pump dispenser for oil and vinegar” |
| 47; “18”; “clip for silicone spoon for the edge of the pan” |
| 48; “18”; “transformed spoons for salad” |
| 49; “18”; “device for cherry seeds removing” |
| 50; “18”; “sink mat” |
| 51; “18”; “ties for rolls” |
| 52; “18”; “dough mini-scraper” |
| 53; “18”; “grill tongs” |
| 54; “18”; “spaghetti tongs” |
| 55; “18”; “ice tongs” |
| 56; “18”; “sugar tongs” |
| 57; “18”; “package clip” |
| 58; “18”; “package clip” |
| 59; “18”; “citrus spray” |
| 60; “18”; “Dough press” |
| 61; “18”; “scoop for bulk” |
| 62; “18”; “salad serving tongs (tweezers)” |
| 63; “18”; “accessories for tubes” |
| 64; “18”; “pestle” |
| 65; “18”; “mortar” |
| 66; “18”; “roller for cutting of the rings” |
| 67; “18”; “opener for caps” |
| 68; “18”; “meat tenderizer; meat softener” |

TABLE C-continued

| Lists of Food Preparation Methods and Equipment, Cuisine and Bases |
|---|
| 69; “18”; “egg yolk separator” |
| 70; “18”; “apron” |
| 71; “18”; “tools for decoration” |
| 72; “18”; “jar for oil and vinegar” |
| 73; “18”; “mug for milk boiling” |
| 74; “18”; “napkins” |
| 75; “18”; “tablecloth” |
| 76; “18”; “marker for glasses” |
| 78; “18”; “basket” |
| 79; “18”; “meat tenderizer” |
| 80; “18”; “cocotte” |
| 81; “18”; “brush for washing of the vegetables” |
| 82; “18”; “lids for cups” |
| 83; “18”; “rope for baking” |
| 84; “18”; “jar for herbs storage” |
| 86; “18”; “scraper for glass ceramic plates” |
| 87; “18”; “Teapot for tea” |
| 88; “18”; “clothespin for notes on the fridge” |
| 89; “18”; “railing systems” |
| 90; “18”; “hanger for kitchen tools” |
| 91; “18”; plunger with not adhering surface” |
| 92; “18”; “silicone plunger” |
| 93; “18”; “rolling pin with adjustable thickness” |
| 94; “18”; “vacuum bags with pump” |
| 95; “18”; “gas lighter” |
| 96; “18”; “bone forceps” |
| 97; “1”; “kitchen timers thermometers” |
| 98; “97”; “timer for meat roasting” |
| 99; “97”; “digital thermometer” |
| 100; “97”; “holder for thermometer” |
| 101; “97”; “meat thermometer” |
| 102; “97”; “digital timer” |
| 103; “97”; “electr. digital timer” |
| 104; “97”; “aramel thermometer” |
| 105; “1”; “Mills for spices” |
| 106; “105”; “mill for black pepper” |
| 107; “105”; “electric mill” |
| 108; “105”; “combined mill for pepper and salt (2 in 1)” |
| 109; “105”; “mill for spices” |
| 110; “105”; “mill for greens” |
| 111; “1”; “Measuring utensils” |
| 112; “111”; “Measuring container (plastic bottle)” |
| 113; “111”; “measuring jar” |
| 114; “111”; “measuring jug” |
| 115; “111”; “measuring bowl” |
| 116; “111”; “mechanical dispenser for ice cream” |
| 117; “1”; “mechanical mixers” |
| 118; “1”; “bowl” |
| 119; “118”; “metal bowl” |
| 120; “118”; “stainless steel bowl” |
| 121; “118”; “plastic bowl” |
| 122; “118”; “plastic bowl” |
| 123; “118”; “bowls for food” |
| 124; “1”; “sets” |
| 125; “124”; “wine set” |
| 126; “124”; “sets for spices” |
| 127; “124”; “cupcakes baking set” |
| 128; “124”; “accessory kit for baking” |
| 129; “124”; “set of bar tools” |
| 130; “124”; “set of kitchen tools” |
| 131; “124”; “Set for eggs and pancakes baking” |
| 132; “1”; “Slicing and cutting of products” |
| 133; “132”; “cutter” |
| 134; “132”; “holder for onions cutting” |
| 135; “132”; “cutting boards” |
| 136; “132”; “universal professional knives” |
| 137; “132”; “kitchen shears” |
| 138; “132”; “hatchet” |
| 139; “132”; “meat hatchet” |
| 140; “132”; “Hammer for meat with hatchet” |
| 141; “132”; “hoe” |
| 142; “132”; “Hammer for meat” |
| 143; “132”; “knives” |
| 144; “143”; “knife for greens” |
| 145; “143”; “knife for oranges” |
| 146; “143”; “knife for kiwi” |
| 147; “143”; “knife for pineapple” |

TABLE C-continued

| Lists of Food Preparation Methods and Equipment, Cuisine and Bases |
|---|
| 148; “143”; “Spiral knife for carrots” |
| 149; “143”; “multifunctional knife” |
| 150; “143”; “vegetable knife” |
| 151; “143”; “Pizza Cutter” |
| 152; “143”; “universal knife” |
| 153; “143”; “knife for slicing” |
| 154; “143”; “cook knife” |
| 155; “143”; “gastronomic knife” |
| 156; “143”; “opener” |
| 157; “143”; “Cheese knife” |
| 158; “143”; “boning knife” |
| 159; “143”; “lettuce knife” |
| 160; “143”; “knife for steaks” |
| 161; “143”; “butcher knife” |
| 162; “143”; “shredding knife” |
| 163; “143”; “bread knife” |
| 164; “143”; “fish knife” |
| 165; “143”; “knife for sandwiches” |
| 166; “143”; “Santoku knife” |
| 167; “143”; “knife for fruit coring” |
| 168; “143”; “Butter knife” |
| 169; “169”; “openers” |
| 170; “169”; “tin-opener” |
| 171; “169”; “corkscrew” |
| 172; “169”; “corkscrew on a stand” |
| 173; “169”; “lever corkscrew” |
| 174; “169”; “folding corkscrew” |
| 175; “169”; “opener for waiter” |
| 178; “494”; “stands for hot” |
| 179; “494”; “stand for kitchen utensils storing” |
| 180; “494”; “toothpick holder” |
| 181; “494”; “Bottle holder” |
| 182; “494”; “Holder for capsules” |
| 183; “494”; “stand for spoon” |
| 184; “494”; “stand for coffee capsules” |
| 185; “494”; “Coasters” |
| 186; “494”; “Napkin holder” |
| 187; “494”; “stand for eggs” |
| 188; “494”; “stand for openers” |
| 189; “494”; “stand for scoops” |
| 190; “494”; “stand for cooking and serving of eggs” |
| 191; “494”; “stand for ladle” |
| 192; “494”; “Holder for paper towels” |
| 193; “494”; “Transforming stand for kitchen appliances” |
| 194; “494”; “stand for mug” |
| 195; “494”; “stand mugs and saucers” |
| 196; “494”; “stand for kitchen knives” |
| 197; “494”; “stand for chicken” |
| 198; “494”; “napkin-stand” |
| 199; “494”; “heated stand” |
| 200; “494”; “stands for cake” |
| 201; “1”; “Appliances for peeling and cutting” |
| 202; “201”; “grater for vegetables” |
| 203; “305”; “grater” |
| 204; “201”; “garlic masher” |
| 205; “201”; “egg cutter” |
| 206; “201”; “Manual vegetable cutter” |
| 207; “201”; “Peeler for vegetables” |
| 208; “201”; “Nutcracker” |
| 209; “201”; “The device for separating the yolks from the whites” |
| 210; “201”; “grasping for carrots cleaning” |
| 211; “201”; “scraper fish scales” |
| 212; “201”; “cutter for fruits” |
| 213; “201”; “oller for holes” |
| 214; “201”; “tongs for fish bones” |
| 215; “201”; “spiral vegetable cutter” |
| 216; “1”; “Bottle Caps” |
| 217; “216”; “champagne cork (stopper)” |
| 218; “216”; “stoppers for wine” |
| 219; “216”; “The opener to remove the crown corks from bottles” |
| 220; “1”; “sieves” |
| 221; “220”; “sieve for tea” |
| 222; “220”; “sieve-tongs for tea” |
| 223; “220”; “Strainer for spices” |
| 224; “220”; “Strainer for tea” |
| 225; “220”; “Universal sieve” |
| 226; “220”; “flour sieve” |

TABLE C-continued

| Lists of Food Preparation Methods and Equipment, Cuisine and Bases |
|---|
| 228; “220”; “The Chinese sieve with a mesh insert” |
| 229; “220”; “sieve with support” |
| 230; “220”; “Mug-sieve for flour” |
| 231; “220”; “sieve on the handle” |
| 232; “1”; “Salt and pepper shakers” |
| 233; “282”; “container for seasoning” |
| 234; “232”; “salt cellar” |
| 235; “232”; “containers for oil and vinegar” |
| 236; “1”; “Dish dryers” |
| 237; “236”; “salad dryer” |
| 238; “236”; “dryer-placemat” |
| 239; “236”; “dryer for crockery and cutlery” |
| 240; “1”; “Cutlery Accessories” |
| 241; “240”; “cutlery tray” |
| 242; “240”; “cutlery holder” |
| 243; “240”; “cutlery container” |
| 244; “240”; “strainer for cutlery” |
| 245; “240”; “wall hanger for kitchen tools” |
| 246; “240”; “cutlery organizer” |
| 247; “240”; “mat for cutlery” |
| 248; “240”; “sliding tray for cutlery” |
| 249; “240”; “dryer for cutlery” |
| 250; “240”; “glass for cutlery” |
| 251; “240”; “napkin for the cutlery” |
| 252; “240”; “case for cutlery” |
| 253; “240”; “tray for cutlery” |
| 254; “240”; “mitten-potholder” |
| 255; “240”; “box for cutlery” |
| 256; “240”; “full-size rack (cassette) for cutlery” |
| 257; “240”; “Stand without containers for cutlery” |
| 258; “240”; “cassette for cutlery” |
| 259; “240”; “container for cutlery” |
| 260; “240”; “station for cutlery” |
| 261; “240”; “Shelf for cutlery” |
| 262; “1”; “Decorations for cocktails” |
| 263; “262”; “ducts” |
| 264; “262”; “sticks” |
| 266; “496”; “molds for ice” |
| 267; “496”; “molds for children” |
| 268; “496”; “Molds for shaping products” |
| 269; “496”; “Molds for dumplings” |
| 271; “497”; “Measuring container” |
| 272; “497”; “A mixing container with the dispenser” |
| 273; “497”; “Measuring container with the funnel” |
| 274; “497”; “beaker” |
| 275; “497”; “scoop” |
| 276; “1”; “kitchen scissors” |
| 277; “276”; “Scissors for BBQ” |
| 278; “276”; “Kitchen scissors with bottle opener” |
| 279; “276”; “Scissors for greens” |
| 280; “276”; “Kitchen multipurpose scissors” |
| 281; “276”; “Kitchen scissors for poultry” |
| 282; “1”; “utensil for storage” |
| 283; “282”; “container for storage” |
| 284; “282”; “ Bottles for liquid spices oils” |
| 285; “282”; “jars for storage” |
| 286; “282”; “lunchbox” |
| 287; “282”; “foldable lunchbox” |
| 288; “282”; “jar for hermetic storage of bulk products’ |
| 289; “282”; “Sprayer for oil/vinegar” |
| 290; “282”; “jar for bulk products” |
| 291; “282”; “containers for spices” |
| 293; “282”; “Container for tea” |
| 294; “1”; “potholders” |
| 295; “294”; “oven-glove” |
| 296; “294”; “silicone potholders” |
| 297; “294”; “dishcloth” |
| 298; “1”; “railing with hooks” |
| 299; “1”; “silicone mats” |
| 300; “299”; “baking mat” |
| 301; “299”; “mat for baking cakes” |
| 302; “299”; “mat for drying of the glasses” |
| 303; “299”; “cooking mat” |
| 304; “299”; “Mat for drying of the dishes” |
| 305; “1”; “graters presses rubbing machines” |
| 306; “305”; “grater with a handle” |
| 308; “305”; “multifunction grater” |

TABLE C-continued

| Lists of Food Preparation Methods and Equipment, Cuisine and Bases |
|---|
| 309; “305”; “grater shredder” |
| 310; “305”; “grind for the green” |
| 311; “305”; “grind for the garlic” |
| 312; “305”; “Slicer for tomatoes” |
| 313; “305”; “grater with rotating drums” |
| 314; “305”; “universal device for grinding” |
| 315; “305”; “mechanical grater” |
| 316; “305”; “garlic peeling tube” |
| 317; “305”; “rubbing machine” |
| 318; “305”; “press for vegetables” |
| 319; “305”; “press for garlic” |
| 320; “305”; “press for hamburgers” |
| 321; “1”; “knife sharpener” |
| 322; “321”; “electric sharpener” |
| 323; “321”; “sharpening stone” |
| 324; “321”; “ceramic sharpener” |
| 325; “1”; “breadbox” |
| 326; “1”; “lattice with legs” |
| 327; “339”; “Flatware” |
| 328; “327”; “for alcohol” |
| 329; “540”; “Cognac set with the batcher” |
| 330; “540”; “Glasses souvenir” |
| 331; “540”; “Glasses” |
| 332; “540”; “Bucket for ice” |
| 333; “540”; “Shot glasses” |
| 334; “540”; “Bucket for champagne” |
| 335; “540”; “Wine glasses” |
| 336; “540”; “decanter” |
| 337; “540”; “tray” |
| 338; “540”; “Support under a bottle” |
| 339; “327”; “tableware” |
| 340; “339”; “first course dish” |
| 341; “339”; “dish for bouillon” |
| 342; “339”; “bouillon bowl” |
| 343; “339”; “oiler” |
| 344; “339”; “round dish” |
| 345; “339”; “duck pan” |
| 346; “339”; “Set for making chocolate fondue |
| 347; “339”; “Set for making cheese fondue” |
| 348; “339”; “salad bowl” |
| 349; “339”; “dish for cake” |
| 350; “339”; “compartmental dish” |
| 351; “339”; “set of cutlery” |
| 352; “339”; “serving spoon and fork” |
| 353; “339”; “dish with lid” |
| 354; “339”; “steam table” |
| 355; “374”; “ice-cream bowl” |
| 357; “339”; “saucer” |
| 358; “339”; “saucer for jam” |
| 359; “339”; “mustard-pot” |
| 360; “339”; “pepper-pot” |
| 361; “339”; “ash-pot” |
| 362; “339”; “deep table plate” |
| 363; “339”; “dinner plate” |
| 364; “339”; “snack plate” |
| 365; “339”; “deep dessert plate” |
| 366; “339”; “dessert plate” |
| 367; “339”; “plate for pies” |
| 368; “339”; “horseradish-pot” |
| 369; “327”; “Utensils for table” |
| 370; “369”; “Pad for tableware” |
| 371; “369”; “serving mat” |
| 372; “369”; “serving tray” |
| 373; “369”; “glass burner” |
| 374; “327”; “Dishes for tea coffee desert” |
| 375; “374”; “sugar-bowl” |
| 376; “374”; “mug” |
| 377; “374”; “mug with teapot” |
| 378; “374”; “mug with stand” |
| 379; “374”; “mug with lid” |
| 380; “374”; “tea set” |
| 381; “374”; “dish” |
| 382; “374”; “french-press” |
| 383; “374”; “teapot” |
| 384; “374”; “teapot with strainer” |
| 385; “374”; “glass teapot” |
| 387; “374”; “multifunctional vase” |

TABLE C-continued

| Lists of Food Preparation Methods and Equipment, Cuisine and Bases |
|---|
| 388; “540”; “Glasses” |
| 389; “374”; “soup bowl” |
| 390; “374”; “wicker basket” |
| 391; “374”; “vase 3-tier” |
| 393; “374”; “napkin rings” |
| 394; “374”; “pannier for fruits” |
| 395; “374”; “table trash basket” |
| 396; “374”; “biscuit dish” |
| 397; “374”; “candy dish” |
| 398; “374”; “coffee sets” |
| 399; “327”; “CUTLERY” |
| 437; “0”; “Kitchen appliances” |
| 438; “437”; “aerogrill” |
| 439; “437”; “blenders grinder” |
| 440; “437”; “coffee Maker” |
| 441; “437”; “coffee grinder (coffee mill)” |
| 442; “437”; “Food Processor” |
| 443; “437”; “mixer” |
| 444; “437”; “mini oven” |
| 445; “437”; “multicooker” |
| 446; “437”; “meat grinders” |
| 447; “437”; “steamers” |
| 448; “437”; “Raclette grill” |
| 449; “437”; “Juicers” |
| 450; “437”; “toasters” |
| 451; “437”; “egg cooker” |
| 452; “437”; “electric range” |
| 453; “437”; “electric induction stove” |
| 454; “437”; “electric kettle” |
| 455; “437”; “thermopots” |
| 456; “437”; “bread makers” |
| 457; “437”; “microwaves” |
| 458; “437”; “weights for kitchen” |
| 459; “437”; “electric driers” |
| 461; “0”; “Children’s dishes” |
| 462; “461”; “Children Sets for baking” |
| 463; “461”; “Children cutlery” |
| 464; “461”; “Children thermoses” |
| 465; “461”; “Children Sets of dishes” |
| 488; “437”; “deep fryer” |
| 491; “339”; “baking sheet” |
| 494; “1”; “stand and holders” |
| 495; “220”; “sieve to form the “Bird’s Nest”” |
| 496; “1”; “mold” |
| 497; “1”; “Measuring container” |
| 498; “339”; “pan” |
| 499; “339”; “frying pan” |
| 500; “437”; “Cookware for induction cookers” |
| 501; “437”; “Juice cookers” |
| 502; “437”; “Milk cooker” |
| 503; “437”; “Covers/splash screens” |
| 504; “437”; “Microwave cookware” |
| 505; “437”; “Braziers roasters” |
| 506; “437”; “Turk” |
| 507; “437”; “Dumpling (manti) cookers” |
| 508; “437”; “Sets” |
| 509; “437”; “Samovars” |
| 510; “437”; “Kasans” |
| 511; “437”; “Electric stove” |
| 512; “437”; “Casseroles (pans)” |
| 513; “512”; “casseroles (pans) with non-stick coating” |
| 514; “512”; “aluminum casseroles (pans)” |
| 515; “512”; “Stainless steel casseroles (pans)” |
| 516; “512”; “Enameled casseroles (pans)” |
| 517; “512”; “Teflon coated casseroles (pans)” |
| 518; “512”; “Heat-proof glass casseroles (pans)” |
| 519; “512”; “Ladles” |
| 520; “512”; “Ceramic casseroles (pans)” |
| 521; “512”; “Set of casseroles (pans)” |
| 522; “512”; “Pressure cooker” |
| 523; “512”; “Pan-steamer” |
| 524; “512”; “casseroles for induction cookers” |
| 525; “512”; “Pan-fryer” |
| 526; “512”; “Cast iron casserole (pot)” |
| 527; “512”; “Titanium casserole” |
| 528; “437”; “Frying pans skillet” |
| 529; “528”; “Frying pan with ceramic coating” |

TABLE C-continued

| Lists of Food Preparation Methods and Equipment, Cuisine and Bases |
|---|
| 530; “528”; “Frying pans with non-stick coating” |
| 531; “528”; “Frying pan with removable handle” |
| 532; “528”; “Stewpots” |
| 533; “528”; “Frying pans for grill” |
| 534; “528”; “Wok” |
| 535; “528”; “Pancake pans” |
| 536; “528”; “Electric frying pans” |
| 537; “528”; “Cast iron skillet” |
| 538; “528”; “Multifunctional frying pan” |
| 539; “528”; “Titanium frying pan” |
| 540; “437”; “Drinkware” |
| 541; “540”; “Wine glasses” |
| 542; “540”; “Water glasses” |
| 543; “540”; “Beer glasses” |
| 544; “540”; “Kegs” |
| 545; “540”; “Carafes” |
| 546; “540”; “Decanters” |
| 547; “540”; “Jugs” |
| 548; “540”; “Shots” |
| 549; “540”; “Wine glasses for champagne” |
| 550; “540”; “Glasses for brandy/cognac” |
| 551; “540”; “Wine glasses for a cocktail/martini” |
| A list of Cuisine |
| 1; “0”; “Abkhaz” |
| 2; “0”; “Australian” |
| 3; “0”; “Austrian” |
| 4; “0”; “Azerbaijan” |
| 5; “0”; “Albanian” |
| 6; “0”; “Algerian” |
| 7; “0”; “American” |
| 8; “0”; “English” |
| 9; “0”; “Arabic” |
| 10; “0”; “Argentine” |
| 11; “0”; “Armenian” |
| 12; “0”; “Bashkir” |
| 13; “0”; “Belarusian” |
| 14; “0”; “Belgian” |
| 15; “0”; “Bulgarian” |
| 16; “0”; “Bosnian” |
| 17; “0”; “Brazilian” |
| 18; “0”; “Hungarian” |
| 19; “0”; “Venezuelan” |
| 20; “0”; “Vietnamese” |
| 21; “0”; “Greek” |
| 22; “0”; “Georgian” |
| 23; “0”; “Danish” |
| 24; “0”; “Jewish” |
| 25; “0”; “Israeli” |
| 26; “0”; “Indian” |
| 27; “0”; “Indonesian” |
| 28; “0”; “Jordanian” |
| 29; “0”; “Iraqi” |
| 30; “0”; “Iranian” |
| 31; “0”; “Irish” |
| 32; “0”; “Icelandic” |
| 33; “0”; “Spanish” |
| 34; “0”; “Italian” |
| 35; “0”; “Cambodian” |
| 36; “0”; “Canadian” |
| 37; “0”; “Cypriot” |
| 38; “0”; “Chinese” |
| 39; “0”; “Colombian” |
| 40; “0”; “Korean” |
| 41; “0”; “Creole” |
| 42; “0”; “Costa Rica” |
| 43; “0”; “Latvian” |
| 44; “0”; “Lebanese” |
| 45; “0”; “Libyan” |
| 46; “0”; “Lithuanian” |
| 47; “0”; “Macedonian” |
| 48; “0”; “Malaysian” |
| 49; “0”; “Moroccan” |
| 50; “0”; “Mexican” |
| 51; “0”; “Moldavian” |
| 52; “0”; “Mongolian” |
| 53; “0”; “German” |
| 54; “0”; “Dutch” |
| 55; “0”; “New Zealand” |
| 56; “0”; “Norwegian” |
| 57; “0”; “Ossetian” |
| 58; “0”; “Pakistani” |
| 59; “0”; “Palestinian” |
| 60; “0”; “Panamanian” |
| 61; “0”; “Peruvian” |
| 62; “0”; “Polish” |
| 63; “0”; “Portuguese” |
| 64; “0”; “Romanian” |
| 65; “0”; “Russian” |
| 66; “0”; “Serbian” |
| 67; “0”; “Singaporean” |
| 68; “0”; “Syrian” |
| 69; “0”; “Slovak” |
| 70; “0”; “Slovenian” |
| 71; “0”; “Thai” |
| 72; “0”; “Tatar” |
| 73; “0”; “Tibetan” |
| 74; “0”; “Tunisian” |
| 75; “0”; “Turkish” |
| 76; “0”; “Turkmen” |
| 77; “0”; “Ukrainian” |
| 78; “0”; “Philippine” |
| 79; “0”; “Finnish” |
| 80; “0”; “French” |
| 81; “0”; “Croatian” |
| 82; “0”; “Montenegrin” |
| 83; “0”; “Czech” |
| 84; “0”; “Chilean” |
| 85; “0”; “Chuvash” |
| 86; “0”; “Chukotka” |
| 87; “0”; “Swedish” |
| 88; “0”; “Swiss” |
| 89; “0”; “Scottish” |
| 90; “0”; “Ecuadorian” |
| 91; “0”; “Estonian” |
| 92; “0”; “Japanese” |
| 93; “0”; “Raw food diet” |
| 94; “0”; “European” |
| 95; “0”; “International” |
| 96; “0”; “Multinational” |
| 97; “0”; “Lean” |
| 98; “0”; “Caucasian” |
| 99; “0”; “Children” |
| A list of bases: |
| 1; “0”; “Meat and meat products” |
| 2; “1”; “Basturma” |
| 3; “1”; “Fat” |
| 4; “1”; “brisket cooked and smoked” |
| 5; “1”; “Hare” |
| 6; “1”; “leather duck” |
| 7; “1”; “Sausage” |
| 8; “1”; “Sausages” |
| 9; “1”; “Sausages “Hunting party”” |
| 10; “1”; “Horsemeat” |
| 11; “1”; “Bones with bone marrow” |
| 12; “1”; “Roe” |
| 13; “1”; “Rabbit” |
| 14; “1”; “Meat” |
| 15; “1”; “Moosemeat” |
| 16; “1”; “Venison” |
| 17; “1”; “Liver” |
| 18; “1”; “Kidney” |
| 19; “1”; “Smoked ribs” |
| 20; “1”; “Salami” |
| 21; “1”; “Sausages” |
| 22; “1”; “Cervelat” |
| 23; “1”; “Sausages” |
| 24; “1”; “Hungarian smoked bacon” |
| 25; “l”; “bacon fat-tailed” |
| 26; “1”; “Steak” |
| 27; “1”; “ribeye steak” |
| 28; “1”; “Farce” |
| 29; “1”; “crocodile fillet” |

TABLE C-continued

| Lists of Food Preparation Methods and Equipment, Cuisine and Bases |
|---|
| 30; "1"; "Jamon" |
| 31; "1"; "Choriso (spanish sausage)" |
| 32; "1"; "Skewers" |
| 33; "1"; "Sowbelly" |
| 34; "1"; "Deer tongue" |
| 35; "1"; "LAMB" |
| 36; "35"; "breast of lamb" |
| 37; "35"; "loin of lamb" |
| 38; "35"; "blade lamb" |
| 39; "35"; "veal brains" |
| 40; "35"; "mutton ham" |
| 41; "35"; "veal ham" |
| 42; "35"; "leg of lamb" |
| 43; "35"; "Heel muscle mutton" |
| 44; "35"; "lamb offal" |
| 45; "35"; "veal kidneys" |
| 46; "35"; "lamb chops" |
| 47; "35"; "gras cow" |
| 48; "35"; "veal heart" |
| 49; "35"; "lamb testicles" |
| 50; "35"; "VEAL" |
| 51; "35"; "veal cheeks" |
| 52; "35"; "minced lamb" |
| 53; "35"; "minced veal" |
| 54; "35"; "veal tail" |
| 55; "35"; "veal tongue" |
| 56; "35"; "eggs bullish" |
| 57; "1"; "BEEF" |
| 58; "57"; "beef brisket" |
| 59; "57"; "" |
| 60; "57"; "beef (sirloin)" |
| 61; "57"; "beef on the bone" |
| 62; "57"; "beef eye muscle" |
| 63; "57"; "legs of beef" |
| 64; "57"; "ham beef" |
| 65; "57"; "gras beef" |
| 66; "57"; "beef ribs" |
| 67; "57"; "beef heart" |
| 68; "57"; "minced beef" |
| 69; "57"; "tail beef" |
| 70; "57"; "beef tongue" |
| 71; "1"; "PORK" |
| 72; "71"; "bacon" |
| 73; "71"; "smoked bacon" |
| 74; "71"; "pork" |
| 75; "71"; "ham" |
| 76; "71"; "pork brisket" |
| 77; "71"; "smoked pork belly" |
| 78; "71"; "Pork Intestine" |
| 79; "71"; "legs of pork" |
| 80; "71"; "boar ham" |
| 81; "71"; "pork ham" |
| 82; "71"; "pork ribs" |
| 83; "71"; "knuckle of pork" |
| 84; "71"; "fat" |
| 85; "71"; "pork (pork neck or loin)" |
| 86; "71"; "pork ears" |
| 87; "71"; "minced pork" |
| 88; "71"; "pig tail" |
| 89; "71"; "pork tongue" |
| 90; "0"; "Birds" |
| 91; "90"; "garshnep" |
| 92; "90"; "turkey breast" |
| 93; "90"; "chicken breast" |
| 94; "90"; "chicken breast smoked" |
| 95; "90"; "duck breast" |
| 96; "90"; "Goose" |
| 97; "90"; "chicken ventricles" |
| 98; "90"; "turkey" |
| 99; "90"; "turkey wings" |
| 100; "90"; "chicken wings" |
| 101; "90"; "chicken" |
| 102; "90"; "smoked chicken" |
| 103; "90"; "grouse" |
| 104; "90"; "coot" |
| 105; "90"; "duck leg" |
| 106; "90"; "crow's feet" |

TABLE C-continued

| Lists of Food Preparation Methods and Equipment, Cuisine and Bases |
|---|
| 107; "90"; "chicken legs" |
| 108; "90"; "chicken ham" |
| 109; "90"; "quail" |
| 110; "90"; "gras chicken" |
| 111; "90"; "chicken giblets" |
| 112; "90"; "grouse" |
| 113; "90"; "chicken hearts" |
| 114; "90"; "duck" |
| 115; "90"; "smoked duck" |
| 116; "90"; "Pheasant" |
| 117; "90"; "minced chicken" |
| 118; "90"; "chicken fillet" |
| 119; "90"; "foie gras" |
| 120; "90"; "chicken" |
| 121; "90"; "chicken gutted" |
| 122; "90"; "neck duck" |
| 123; "0"; "FISH and SEAFOOD" |
| 124; "123"; "anchovies" |
| 125; "123"; "arctic char" |
| 126; "123"; "mullet" |
| 127; "123"; "Black Sea goby" |
| 128; "123"; "shrimp head" |
| 129; "123"; "Butterfish" |
| 130; "123"; "scallops" |
| 131; "123"; "dorado" |
| 132; "123"; "ruff" |
| 133; "123"; "caviar" |
| 134; "123"; "red caviar" |
| 135; "123"; "Tobiko caviar" |
| 136; "123"; "squid" |
| 137; "123"; "flounder" |
| 138; "123"; "cuttlefish" |
| 139; "123"; "carp" |
| 140; "123"; "sprat" |
| 141; "123"; "smelt" |
| 142; "123"; "crab sticks" |
| 143; "123"; "Shrimps" |
| 144; "123"; "King shrimps" |
| 145; "123"; "Salad shrimps" |
| 146; "123"; "Tiger prawn" |
| 147; "123"; "Bream" |
| 148; "123"; "salmon" |
| 149; "123"; "Smoked salmon" |
| 150; "123"; "Mussels" |
| 151; "123"; "Mussels with shells' |
| 152; "123"; "Pollock" |
| 153; "123"; "Molluscs" |
| 154; "123"; "Sea food" |
| 155; "123"; "Sea fish" |
| 156; "123"; "sole (fish)" |
| 157; "123"; "Crab meat" |
| 158; "123"; "Krill meat" |
| 159; "123"; "Burbot" |
| 160; "123"; "Frog legs" |
| 161; "123"; "Perch" |
| 162; "123"; "Lobster" |
| 163; "123"; "cisco" |
| 164; "123"; "sturgeon" |
| 165; "123"; "octopus" |
| 166; "123"; "baby octopus" |
| 167; "123"; "shrimp broth" |
| 168; "123"; "halibut" |
| 169; "123"; "Pangasius" |
| 170; "123"; "cod liver oil" |
| 171; "123"; "haddock" |
| 172; "123"; "crayfish" |
| 173; "123"; "dried crustaceans" |
| 174; "123"; "Hot smoked fish" |
| 175; "123"; "red fish salted" |
| 176; "123"; "swordfish" |
| 177; "123"; "saury" |
| 178; "123"; "sardines" |
| 179; "123"; "herring" |
| 180; "123"; "salmon" |
| 181; "123"; "smoked salmon" |
| 182; "123"; "salted salmon" |
| 183; "123"; "seabass" |

TABLE C-continued

| Lists of Food Preparation Methods and Equipment, Cuisine and Bases |
|---|
| 184; “123”; “whitefish” |
| 185; “123”; “ramp” |
| 186; “123”; “mackerel” |
| 187; “123”; “smoked mackerel” |
| 188; “123”; “sheatfish” |
| 189; “123”; “starlet” |
| 190; “123”; “walleye” |
| 191; “123”; “Dried seaweed” |
| 192; “123”; “tilapia” |
| 193; “123”; “carp” |
| 194; “123”; “cod” |
| 195; “123”; “Hot smoked cod” |
| 196; “123”; “black cod” |
| 197; “123”; “tuna” |
| 198; “123”; “turbot” |
| 199; “123”; “eel” |
| 200; “123”; “smoked eel” |
| 201; “123”; “snails” |
| 202; “123”; “oysters” |
| 203; “123”; “white fish fillets” |
| 204; “123”; “catfish fillets” |
| 205; “123”; “fillet of carp” |
| 206; “123”; “fish fillet” |
| 207; “123”; “salmon fillet” |
| 208; “123”; “salted herring fillets” |
| 209; “123”; “perch fillet” |
| 210; “123”; “trout” |
| 211; “123”; “smoked trout” |
| 212; “123”; “Squid Ink” |
| 213; “123”; “cervical shrimp” |
| 214; “123”; “cervical cancers” |
| 215; “123”; “sprats” |
| 216; “123”; “pike” |
| 217; “0”; “VEGETABLES” |
| 218; “217”; “watermelon” |
| 219; “217”; “Artichokes” |
| 220; “217”; “eggplant” |
| 221; “217”; “yam” |
| 222; “217”; “broccoli tops” |
| 223; “217”; “beet tops” |
| 224; “217”; “broccoli” |
| 225; “217”; “rutabaga” |
| 226; “217”; “galangal” |
| 227; “217”; “peas” |
| 228; “217”; “pea sprouts” |
| 229; “217”; “pea pods” |
| 230; “217”; “green peas” |
| 231; “217”; “daikon” |
| 232; “217”; “melon” |
| 233; “217”; “Ginseng” |
| 234; “217”; “Ginger” |
| 235; “217”; “zucchini” |
| 236; “217”; “feces” |
| 237; “217”; “cabbage” |
| 238; “217”; “Brussels sprouts” |
| 239; “217”; “sauerkraut” |
| 240; “217”; “Chinese cabbage” |
| 241; “217”; “Cabbage” |
| 242; “217”; “Romanesco cabbage” |
| 243; “217”; “savoy cabbage” |
| 244; “217”; “cauliflower” |
| 245; “217”; “potatoes” |
| 246; “217”; “young potatoes’ |
| 247; “217”; “kohlrabi” |
| 248; “217”; “root anise” |
| 249; “217”; “salsify root” |
| 250; “217”; “parsley root” |
| 251; “217”; “celery root” |
| 252; “217”; “fresh corn” |
| 253; “217”; “white onion” |
| 254; “217”; “pearl bow” |
| 255; “217”; “onion” |
| 256; “217”; “red onion” |
| 257; “217”; “dry onion” |
| 258; “217”; “small onion” |
| 259; “217”; “Shallots” |
| 260; “217”; “cassava” |

TABLE C-continued

| Lists of Food Preparation Methods and Equipment, Cuisine and Bases |
|---|
| 261; “217”; “mini corn” |
| 262; “217”; “mini peppers” |
| 263; “217”; “mini-tomatoes” |
| 264; “217”; “carrots” |
| 265; “217”; “cucumber” |
| 266; “217”; “parsnips” |
| 267; “217”; “squash” |
| 268; “217”; “bell peppers” |
| 269; “217”; “cayenne pepper” |
| 270; “217”; “fresh chili pepper” |
| 271; “217”; “jalapeno peppers” |
| 272; “217”; “tomato” |
| 273; “217”; “pickled tomatoes” |
| 274; “217”; “cherry tomatoes” |
| 275; “217”; “sunflower sprouts” |
| 276; “217”; “wheat germ” |
| 277; “217”; “soybean seedlings” |
| 278; “217”; “germinated soybeans” |
| 279; “217”; “rhubarb” |
| 280; “217”; “Radish” |
| 281; “217”; “wild radish” |
| 282; “217”; “Turnip” |
| 283; “217”; “beansprouts” |
| 284; “217”; “beet” |
| 285; “217”; “Asparagus” |
| 286; “217”; “chopped tomatoes” |
| 287; “217”; “Sweet” |
| 288; “217”; “Pumpkin” |
| 289; “217”; “green beans” |
| 290; “217”; “Fennel” |
| 291; “217”; “*physalis*” |
| 292; “217”; “horseradish” |
| 293; “217”; “zucchini” |
| 294; “217”; “garlic” |
| 295; “217”; “endive” |
| 296; “0”; “FRUITS” |
| 297; “296”; “Apricot” |
| 298; “296”; “Avocado” |
| 299; “296”; “quince” |
| 300; “296”; “fresh pineapple” |
| 301; “296”; “Orange” |
| 302; “296”; “banana” |
| 303; “296”; “Hawthorn” |
| 304; “296”; “cranberries” |
| 305; “296”; “grapes” |
| 306; “296”; “Cherry” |
| 307; “296”; “Dried cherries” |
| 308; “296”; “blueberries” |
| 309; “296”; “Garnet” |
| 310; “296”; “Grapefruit” |
| 311; “296”; “pear” |
| 312; “296”; “Blackberry” |
| 313; “296”; “strawberries” |
| 314; “296”; “pomegranate seeds” |
| 315; “296”; “carambola” |
| 316; “296”; “kiwi” |
| 317; “296”; “Strawberry” |
| 318; “296”; “Cranberry” |
| 319; “296”; “coconut” |
| 320; “296”; “gooseberry” |
| 321; “296”; “kumquat” |
| 322; “296”; “Lime” |
| 323; “296”; “lemon” |
| 324; “296”; “Litchi” |
| 325; “296”; “raspberries” |
| 326; “296”; “mango” |
| 327; “296”; “Mandarin” |
| 328; “296”; “Passionfruit” |
| 329; “296”; “mini pineapple |
| 330; “296”; “Nectarine” |
| 331; “296”; “buckthorn” |
| 332; “296”; “papaya” |
| 333; “296”; “Peach” |
| 334; “296”; “Pomelo” |
| 335; “296”; “Rowan” |
| 336; “296”; “drain” |
| 337; “296”; “red currants” |

TABLE C-continued

| Lists of Food Preparation Methods and Equipment, Cuisine and Bases |
| --- |
| 338; "296"; "black currant" |
| 339; "296"; "tamarind" |
| 340; "296"; "Feijoa" |
| 341; "296"; "fruit to taste" |
| 342; "296"; "persimmon" |
| 343; "296"; "cherries" |
| 344; "296"; "Cherry" |
| 345; "296"; "blueberries" |
| 346; "296"; "apple" |
| 347; "296"; "frozen berries" |
| 348; "296"; "juniper berries" |
| 349; "296"; "fresh berries" |
| 350; "0"; "GROCERY" |
| 351; "350"; "agar" |
| 352; "350"; "adjika" |
| 353; "350"; "rice paper" |
| 354; "350"; "vanilla extract" |
| 355; "350"; "vermicelli rice" |
| 356; "350"; "egg noodles" |
| 357; "350"; "algae" |
| 358; "350"; "glucose" |
| 359; "350"; "jam" |
| 360; "350"; "raspberry jam" |
| 361; "350"; "fresh yeast" |
| 362; "350"; "gelatin" |
| 363; "350"; "liquid Smokehouse" |
| 364; "350"; "sweetener" |
| 365; "350"; "corn muffins" |
| 366; "350"; "ketchup" |
| 367; "350"; "citric acid" |
| 368; "350"; "candy" |
| 369; "350"; "confiture" |
| 370; "350"; "strawberry jam" |
| 371; "350"; "food dye" |
| 372; "350"; "starch" |
| 373; "350"; "potato starch" |
| 374; "350"; "corn starch" |
| 375; "350"; "bread crumbs" |
| 376; "350"; "Noodles" |
| 377; "350"; "buckwheat noodles" |
| 378; "350"; "Pad Thai noodles" |
| 379; "350"; "rice noodles" |
| 380; "350"; "glass noodles" |
| 381; "350"; "noodles harusame" |
| 382; "350"; "egg noodles" |
| 383; "350"; "mayonnaise" |
| 384; "350"; "poppy sweet" |
| 385; "350"; "pasta" |
| 386; "350"; "cannelloni pasta" |
| 387; "350"; "pasta lumakoni" |
| 388; "350"; "pasta feathers" |
| 389; "350"; "fusilli pasta" |
| 390; "350"; "pumpkin marmalade" |
| 391; "350"; "jujube fruit" |
| 392; "350"; "marzipan" |
| 393; "350"; "mirin" |
| 394; "350"; "coconut milk" |
| 395; "350"; "almond milk" |
| 396; "350"; "soy milk" |
| 397; "350"; "muesli" |
| 398; "350"; "Pasta" |
| 399; "350"; "peanut paste" |
| 400; "350"; "red curry paste" |
| 401; "350"; "tamarind paste" |
| 402; "350"; "Tom Yam Paste" |
| 403; "350"; "chili paste" |
| 404; "350"; "molasses" |
| 405; "350"; "pectin" |
| 406; "350"; "Penne" |
| 407; "350"; "jam" |
| 408; "350"; "elderberry syrup" |
| 409; "350"; "vanilla syrup" |
| 410; "350"; "syrup vishnevny" |
| 411; "350"; "ginger syrup" |
| 412; "350"; "caramel syrup" |
| 413; "350"; "maple syrup" |
| 414; "350"; "strawberry syrup" |

TABLE C-continued

| Lists of Food Preparation Methods and Equipment, Cuisine and Bases |
| --- |
| 415; "350"; "coffee syrup" |
| 416; "350"; "corn syrup" |
| 417; "350"; "raspberry syrup" |
| 418; "350"; "mango syrup" |
| 419; "350"; "honey syrup" |
| 420; "350"; "almond syrup" |
| 421; "350"; "walnut syrup" |
| 422; "350"; "blackcurrant syrup" |
| 423; "350"; "chocolate syrup" |
| 424; "350"; "cranberry sauce" |
| 425; "350"; "worcestershire sauce" |
| 426; "350"; "pomegranate sauce" |
| 427; "350"; "kimchi sauce" |
| 428; "350"; "pesto" |
| 429; "350"; "fish sauce" |
| 430; "350"; "fish sauce nam pla" |
| 431; "350"; "Tabasco sauce" |
| 432; "350"; "teriyaki sauce" |
| 433; "350"; "sauce tkemali" |
| 434; "350"; "oyster sauce" |
| 435; "350"; "sweet chili sauce" |
| 436; "350"; "Japanese walnut sauce" |
| 437; "350"; "spaghetti" |
| 438; "350"; "; "crumbs of white bread" |
| 439; "350"; "breadcrumbs" |
| 440; "350"; "pastry decorations" |
| 441; "350"; "candied" |
| 442; "0"; "MILK PRODUCTS and EGGS" |
| 443; "442"; "yogurt" |
| 444; "442"; "natural yoghurt" |
| 445; "442"; "kefir" |
| 446; "442"; "margarine" |
| 447; "442"; "butter" |
| 448; "442"; "melted butter" |
| 449; "442"; "milk" |
| 450; "442"; "baked milk" |
| 451; "442"; "buttermilk" |
| 452; "442"; "curdled" |
| 453; "442"; "cream" |
| 454; "442"; "sour cream" |
| 455; "442"; "whey" |
| 456; "442"; "Thane" |
| 457; "442"; "curd" |
| 458; "442"; "curd beaded" |
| 459; "442"; "quail eggs" |
| 460; "442"; "egg" |
| 461; "0"; "mushrooms" |
| 462; "461"; "oyster mushrooms" |
| 463; "461"; "" |
| 464; "461"; "ceps" |
| 465; "461"; "Enoki mushrooms" |
| 466; "461"; "Chinese dried mushrooms" |
| 467; "461"; "portobello mushrooms" |
| 468; "461"; "dried mushrooms" |
| 469; "461"; "shiitake mushrooms" |
| 470; "461"; "milkmushrooms" |
| 471; "461"; "chanterelles" |
| 472; "461"; "*boletus*" |
| 473; "461"; "honey fungus" |
| 474; "461"; "saffron milk cap" |
| 475; "461"; "morels" |
| 476; "461"; "truffles" |
| 477; "461"; "meadow mushrooms" |
| 478; "0"; "CHEESE" |
| 479; "478"; "cheese" |
| 480; "478"; "cheese Adyghe" |
| 481; "478"; "brie cheese" |
| 482; "478"; "feta cheese" |
| 483; "478"; "Burrata cheese" |
| 484; "478"; "Gouda cheese" |
| 485; "478"; "Dutch cheese" |
| 486; "478"; "blue cheese" |
| 487; "478"; "Gorgonzola" |
| 488; "478";" ; "grana padano cheese" |
| 489; "478"; "Gruyere cheese" |
| 490; "478"; "-"; "Dor Blue cheese" |
| 491; "478"; "Camembert" |

TABLE C-continued

| Lists of Food Preparation Methods and Equipment, Cuisine and Bases |
|---|
| 492; “478”; “goat cheese” |
| 493; “478”; “cheese sausage” |
| 494; “478”; “mascarpone cheese” |
| 495; “478”; “Monterey Jack cheese” |
| 496; “478”; “mozzarella cheese” |
| 497; “478”; “soft cheese” |
| 498; “478”; “goat cheese” |
| 499; “478”; “parmesan cheese” |
| 500; “478”; “pecorino cheese” |
| 501; “478”; “processed cheese” |
| 502; “478”; “cheese Poshehonsky” |
| 503; “478”; “ricotta cheese” |
| 504; “478”; “Roquefort cheese” |
| 505; “478”; “blue cheese” |
| 506; “478”; “cream cheese” |
| 507; “478”; “suluguni” |
| 508; “478”; “cheese curd” |
| 509; “478”; “feta cheese” |
| 510; “478”; “philadelphia cheese” |
| 511; “478”; “cheddar cheese” |
| 512; “478”; “edam cheese” |
| 513; “478”; “Emmentaler cheese” |
| 514; “0”; “NUTS and DRIED FRUITS” |
| 515; “514”; “peanuts” |
| 516; “514”; “barberry” |
| 517; “514”; “walnuts (peeled)” |
| 518; “514”; “raisins” |
| 519; “514”; “figs” |
| 520; “514”; “Chestnut” |
| 521; “514”; “Dried cranberries” |
| 522; “514”; “coconut” |
| 523; “514”; “dried apricots” |
| 524; “514”; “Filbert (hazelnut)” |
| 525; “514”; “almonds” |
| 526; “514”; “nuts” |
| 527; “514”; “pine nuts” |
| 528; “514”; “cashew nuts” |
| 529; “514”; “Dried peaches” |
| 530; “514”; “sunflower seeds” |
| 531; “514”; “pumpkin seeds” |
| 532; “514”; “Dried Fruits” |
| 533; “514”; “Dates” |
| 534; “514”; “pistachios” |
| 535; “514”; “hazelnuts” |
| 536; “514”; “prunes” |
| 537; “0”; “BEVERAGES” |
| 538; “537”; “water” |
| 539; “537”; “water orange” |
| 540; “537”; “mineral water” |
| 541; “537”; “water pink” |
| 542; “537”; “GABA-tea” |
| 543; “537”; “*Hibiscus*” |
| 544; “537”; “kvass” |
| 545; “537”; “bread kvass” |
| 546; “537”; “-; “Coke” |
| 547; “537”; “Kuding” |
| 548; “537”; “lemonade” |
| 549; “537”; “mate” |
| 550; “537”; “juice” |
| 551; “537”; “carbonated drink” |
| 552; “537”; “Bitter Brandy” |
| 553; “537”; “Rooibos” |
| 554; “537”; “pineapple juice” |
| 555; “537”; “orange juice” |
| 556; “537”; “birch juice” |
| 557; “537”; “grape juice” |
| 558; “537”; “cherry juice” |
| 559; “537”; “pomegranate juice” |
| 560; “537”; “strawberry juice” |
| 561; “537”; “cranberry juice” |
| 562; “537”; “gooseberry juice” |
| 563; “537”; “lime juice” |
| 564; “537”; “mango juice” |
| 565; “537”; “tangerine juice” |
| 566; “537”; “peach juice” |
| 567; “537”; “currant juice” |
| 568; “537”; “tomato juice” |

TABLE C-continued

| Lists of Food Preparation Methods and Equipment, Cuisine and Bases |
|---|
| 569; “537”; “apple juice” |
| 570; “537”; “sprite” |
| 571; “537”; “tonic” |
| 572; “537”; “tea white” |
| 573; “537”; “tea yellow” |
| 574; “537”; “green tea” |
| 575; “537”; “red tea” |
| 576; “537”; “Puer tea” |
| 577; “537”; “Puer tea in Mandarin” |
| 578; “537”; “oolong tea” |
| 579; “537”; “black tea” |
| 580; “537”; “Espresso” |
| 581; “0”; “ALCOHOL” |
| 582; “581”; “Balm” |
| 583; “581”; “Bitter” |
| 584; “581”; “brandy” |
| 585; “581”; “bourbon” |
| 586; “581”; “vermouth” |
| 587; “581”; “wine” |
| 588; “581”; “white wine” |
| 589; “581”; “sparkling wine” |
| 590; “581”; “red wine” |
| 591; “581”; “dry red wine” |
| 592; “581”; “wine sangria” |
| 593; “581”; “whiskey” |
| 594; “581”; “Vodka” |
| 595; “581”; “anise vodka” |
| 596; “581”; “grappa” |
| 597; “581”; “gin” |
| 598; “581”; “-”; “Irish cream liqueur” |
| 599; “581”; “Calvados” |
| 600; “581”; “Cachaca” |
| 601; “581”; “brandy” |
| 602; “581”; “liqueur” |
| 603; “581”; “orange liqueur” |
| 604; “581”; “coffee liqueur” |
| 605; “581”; “chocolate liqueur” |
| 606; “581”; “Madeira” |
| 607; “581”; “Marsala” |
| 608; “581”; “Martini” |
| 609; “581”; “beer” |
| 610; “581”; “cherry beer” |
| 611; “581”; “port” |
| 612; “581”; “rum” |
| 613; “581”; “white rum” |
| 614; “581”; “black rum” |
| 615; “581”; “Sake” |
| 616; “581”; “sambuca” |
| 617; “581”; “cider” |
| 618; “581”; “tequila” |
| 619; “581”; “sherry” |
| 620; “581”; “( )”; “Champagne (Brut)” |
| 621; “581”; “schnapps” |
| 622; “0”; “GREENS AND HERBS” |
| 623; “622”; “basil” |
| 624; “622”; “basil red” |
| 625; “622”; “bouquet garni” |
| 626; “622”; “oregano” |
| 627; “622”; “greens” |
| 628; “622”; “dried herbs” |
| 629; “622”; “-; “cabbage pak choi” |
| 630; “622”; “chervil” |
| 631; “622”; “cilantro” |
| 632; “622”; “*oxalis*” |
| 633; “622”; “oat root” |
| 634; “622”; “fresh coriander” |
| 635; “622”; “nettle” |
| 636; “622”; “Watercress” |
| 637; “622”; “watercress” |
| 638; “622”; “rose petals” |
| 639; “622”; “lemongrass” |
| 640; “622”; “bamboo leaves” |
| 641; “622”; “banana leaves” |
| 642; “622”; “grape leaves” |
| 643; “622”; “Grape leaves (salty)” |
| 644; “622”; “kaffir lime leaves” |
| 645; “622”; “lime leaves” |

TABLE C-continued

| Lists of Food Preparation Methods and Equipment, Cuisine and Bases |
| --- |
| 646; “622”; “dandelion leaves” |
| 647; “622”; “green onion” |
| 648; “622”; “-; “Leek” |
| 649; “622”; “marjoram” |
| 650; “622”; “chard” |
| 651; “622”; “melissa” |
| 652; “622”; “lemon balm” |
| 653; “622”; “Mint” |
| 654; “622”; “oregano” |
| 655; “622”; “parsley” |
| 656; “622”; “dried parsley” |
| 657; “622”; “plantain” |
| 658; “622”; “wormwood” |
| 659; “622”; “chopped camomile” |
| 660; “622”; “arugula” |
| 661; “622”; “iceberg lettuce” |
| 662; “622”; “green salad” |
| 663; “622”; “corn salad” |
| 664; “622”; “lettuce” |
| 665; “622”; “leaf lettuce” |
| 666; “622”; “salad Mizuno” |
| 667; “622”; “: “Oakleaf lettuce” |
| 668; “622”; “radicchio salad” |
| 669; “622”; “romaine lettuce” |
| 670; “622”; “salad Friess” |
| 671; “622”; “salad mix” |
| 672; “622”; “celery” |
| 673; “622”; “Lemon grass (lemon grass)” |
| 674; “622”; “Italian herbs” |
| 675; “622”; “spicy herbs” |
| 676; “622”; “dill” |
| 677; “622”; “dandelion flowers” |
| 678; “622”; “flowers” |
| 679; “622”; “lavender flowers” |
| 680; “622”; “chicory” |
| 681; “622”; “thyme” |
| 682; “622”; “Ramson” |
| 683; “622”; “saffron” |
| 684; “622”; “rosehips” |
| 685; “622”; “chives” |
| 686; “622”; “spinach” |
| 687; “622”; “sorrel” |
| 688; “622”; “tarragon” |
| 689; “0”; “Cereals legumes and flours” |
| 690; “689”; “beans” |
| 691; “689”; “mung beans” |
| 692; “689”; “bulgur” |
| 693; “689”; “puffed rice” |
| 694; “689”; “buckwheat green” |
| 695; “689”; “Quinoa” |
| 696; “689”; “buckwheat” |
| 697; “689”; “corn grits” |
| 698; “689”; “semolina” |
| 699; “689”; “oats” |
| 700; “689”; “pearl barley” |
| 701; “689”; “cereal wheat” |
| 702; “689”; “couscous” |
| 703; “689”; “flour” |
| 704; “689”; “buckwheat flour” |
| 705; “689”; “chestnut flour” |
| 706; “689”; “corn flour” |
| 707; “689”; “almond flour” |
| 708; “689”; “Chickpea flour” |
| 709; “689”; “oat flour” |
| 710; “689”; “wheat flour” |
| 711; “689”; “rye flour” |
| 712; “689”; “rice flour” |
| 713; “689”; “chickpeas” |
| 714; “689”; “bran” |
| 715; “689”; “millet” |
| 716; “689”; “Figure” |
| 717; “689”; “Figure baya” |
| 718; “689”; “basmati rice” |
| 719; “689”; “brown rice” |
| 720; “689”; “wild rice” |
| 721; “689”; “Round grain rice” |
| 722; “689”; “semola (flour made from durum wheat)” |

TABLE C-continued

| Lists of Food Preparation Methods and Equipment, Cuisine and Bases |
| --- |
| 723; “689”; “Beans” |
| 724; “689”; “white beans” |
| 725; “689”; “red beans” |
| 726; “689”; “buckwheat flakes” |
| 727; “689”; “cereal grains” |
| 728; “689”; “oat flakes” |
| 729; “689”; “lentils” |
| 730; “689”; “barley” |
| 731; “0”; “Spices and Seasonings” |
| 732; “731”; “star anise” |
| 733; “731”; “white pepper” |
| 734; “731”; “vanillin” |
| 735; “731”; “vanilla” |
| 736; “731”; “vanilla essence” |
| 737; “731”; “vanilla powder” |
| 738; “731”; “wasabi” |
| 739; “731”; “caltrop” |
| 740; “731”; “garam masala” |
| 741; “731”; “Carnation” |
| 742; “731”; “cloves minced” |
| 743; “731”; “mustard” |
| 744; “731”; “sweet mustard” |
| 745; “731”; “allspice peas” |
| 746; “731”; “grain mustard” |
| 747; “731”; “Cumin” |
| 748; “731”; “ground ginger” |
| 749; “731”; “capers” |
| 750; “731”; “cardamom” |
| 751; “731”; “curry” |
| 752; “731”; “coriander” |
| 753; “731”; “ground coriander” |
| 754; “731”; “cinnamon” |
| 755; “731”; “coffee essence” |
| 756; “731”; “balsamic cream” |
| 757; “731”; “sesame” |
| 758; “731”; “turmeric” |
| 759; “731”; “bay leaf” |
| 760; “731”; “lemon pepper” |
| 761; “731”; “poppy seed” |
| 762; “731”; “olives” |
| 763; “731”; “olives dry” |
| 764; “731”; “avocado oil” |
| 765; “731”; “anchovy butter” |
| 766; “731”; “peanut oil” |
| 767; “731”; “mustard oil” |
| 768; “731”; “oil for frying” |
| 769; “731”; “scented oil” |
| 770; “731”; “grapeseed oil” |
| 771; “731”; “canola oil” |
| 772; “731”; “corn oil” |
| 773; “731”; “sesame oil” |
| 774; “731”; “linseed oil” |
| 775; “731”; “olive oil” |
| 776; “731”; “Peanut butter” |
| 777; “731”; “sunflower oil” |
| 778; “731”; “lean oil” |
| 779; “731”; “vegetable oil” |
| 780; “731”; “oil refined” |
| 781; “731”; “oil seed-bearing” |
| 782; “731”; “soybean oil” |
| 783; “731”; “truffle oil” |
| 784; “731”; “oil pumpkin” |
| 785; “731”; “almonds hammers” |
| 786; “731”; “miso paste” |
| 787; “731”; “sea ??salt” |
| 788; “731”; “nutmeg” |
| 789; “731”; “olives” |
| 790; “731”; “Ligurian olives” |
| 791; “731”; “hot red pepper” |
| 792; “731”; “hot peppers” |
| 793; “731”; “fenugreek” |
| 794; “731”; “paprika” |
| 795; “731”; “lemongrass paste” |
| 796; “731”; “peperoncini” |
| 797; “731”; “pepper pink polka dots” |
| 798; “731”; “chili” |
| 799; “731”; “Dried chili peppers” |

TABLE C-continued

| Lists of Food Preparation Methods and Equipment, Cuisine and Bases |
| --- |
| 800; "731"; "mustard powder" |
| 801; "731"; "seasoning fish" |
| 802; "731"; "baking powder" |
| 803; "731"; "rosemary" |
| 804; "731"; "pink ground pepper" |
| 805; "731"; "sugar" |
| 806; "731"; "vanilla sugar" |
| 807; "731"; "brown sugar" |
| 808; "731"; "sugar muskovado" |
| 809; "731"; "sugar cane" |
| 810; "731"; "powdered sugar" |
| 811; "731"; "*nasturtium* seeds" |
| 812; "731"; "*Nigella* seeds" |
| 813; "731"; "fennel seeds" |
| 814; "731"; ""; "spice mix "taco"" |
| 815; "731"; "Soda" |
| 816; "731"; "ginger juice squeezed" |
| 817; "731"; "lemon juice" |
| 818; "731"; "salt" |
| 819; "731"; "citrate" |
| 820; "731"; "grape sauce" |
| 821; "731"; "sauce narsharab" |
| 822; "731"; "ponzu sauce" |
| 823; "731"; "soy sauce" |
| 824; "731"; "tomato sauce" |
| 825; "731"; "chili sauce" |
| 826; "731"; "Spices" |
| 827; "731"; "sumac" |
| 828; "731"; "thyme" |
| 829; "731"; "cumin" |
| 830; "731"; "Mediterranean herbs" |
| 831; "731"; "French herbs" |
| 832; "731"; "vinegar" |
| 833; "731"; "balsamic vinegar" |
| 834; "731"; "wine vinegar" |
| 835; "731"; "white wine vinegar" |
| 836; "731"; "red wine vinegar" |
| 837; "731"; "cherry vinegar" |
| 838; "731"; "raspberry vinegar" |
| 839; "731"; "rice vinegar" |
| 840; "731"; "apple cider vinegar" |
| 841; "731"; -"; "hops suneli" |
| 842; "731"; "Savory" |
| 843; "731"; "chutney" |
| 844; "731"; "black pepper" |
| 845; "731"; "black pepper peas" |
| 846; "731"; "dry garlic" |
| 847; "731"; "sage" |
| 848; "0"; "PREPARED PRODUCTS" |
| 849; "848"; "canned pineapple" |
| 850; "848"; "canned artichokes" |
| 851; "848"; "Marinated artichokes" |
| 852; "848"; "baguette" |
| 853; "848"; "loaf" |
| 854; "848"; "Bars of chocolate" |
| 855; "848"; "meringue" |
| 856; "848"; "biscuit" |
| 857; "848"; "beans canned" |
| 858; "848"; "bun" |
| 859; "848"; "buns for hamburgers" |
| 860; "848"; "broth" |
| 861; "848"; "beef broth" |
| 862; "848"; "chicken broth" |
| 863; "848"; "fish broth" |
| 864; "848"; "Jam" |
| 865; "848"; "Apricot jam" |
| 866; "848"; "lingonberry jam" |
| 867; "848"; "cherry jam" |
| 868; "848"; "black currant jam" |
| 869; "848"; "raspberry jam" |
| 870; "848"; "blueberry jam" |
| 871; "848"; "Wafer" |
| 872; "848"; "canned cherry" |
| 873; "848"; "Glaze" |
| 874; "848"; "Dijon mustard" |
| 875; "848"; "croutons" |
| 876; "848"; "marinated mushrooms" |

TABLE C-continued

| Lists of Food Preparation Methods and Equipment, Cuisine and Bases |
| --- |
| 877; "848"; "Demiglas apple" |
| 878; "848"; "yeast" |
| 879; "848"; "Jelly" |
| 880; "848"; "leaven" |
| 881; "848"; "marshmallows" |
| 882; "848"; "crushed tomatoes in juice" |
| 883; "848"; "pickled ginger" |
| 884; "848"; "Cocoa" |
| 885; "848"; "marinated cactus" |
| 886; "848"; "Pickled capers" |
| 887; "848"; "sour cabbage" |
| 888; "848"; "sea ??kale" |
| 889; "848"; "Kimchi" |
| 890; "848"; "wafer cakes" |
| 891; "848"; "gherkins" |
| 892; "848"; "natural coffee" |
| 893; "848"; "instant coffee" |
| 894; "848"; "crackers" |
| 895; "848"; "Chocolate Crumb" |
| 896; "848"; "croissant" |
| 897; "848"; "bouillon cubes" |
| 898; "848"; "canned corn" |
| 899; "848"; "marinated corn" |
| 900; "848"; "pita" |
| 901; "848"; "lanspik" |
| 902; "848"; "ice" |
| 903; "848"; "letcho" |
| 904; "848"; "lasagna sheets" |
| 905; "848"; "canned salmon" |
| 906; "848"; "pickled onions" |
| 907; "848"; "canned mandarins" |
| 908; "848"; "marshmallow" |
| 909; "848"; "hazelnut oil" |
| 910; "848"; "sweet curd" |
| 911; "848"; "yoghurt" |
| 912; "848"; "honey" |
| 913; "848"; "honey in the comb" |
| 914; "848"; "Mix ginger" |
| 915; "848"; "condensed milk" |
| 916; "848"; "condensed milk boiled" |
| 917; "848"; "milk powder" |
| 918; "848"; "pickled carrots" |
| 919; "848"; "ice cream" |
| 920; "848"; "vanilla ice cream" |
| 921; "848"; "chocolate ice cream" |
| 922; "848"; "salted cucumber" |
| 923; "848"; "pickled cucumbers" |
| 924; "848"; "pickled cucumbers" |
| 925; "848"; "pecans" |
| 926; "848"; "beet broth" |
| 927; "848"; "corn sticks" |
| 928; "848"; "bread sticks" |
| 929; "848"; "tomato paste" |
| 930; "848"; "Pasta Chocolate" |
| 931; "848"; "pate" |
| 932; "848"; "frozen dumplings" |
| 933; "848"; "hot pepper pickled" |
| 934; "848"; "canned peaches" |
| 935; "848"; "Cookies" |
| 936; "848"; "Biscuit" |
| 937; "848"; "Cookies Savoiardi" |
| 938; "848"; "chocolate cookies" |
| 939; "848"; "pita" |
| 940; "848"; "supplements" |
| 941; "848"; "tomatoes in juice" |
| 942; "848"; "canned tomatoes" |
| 943; "848"; "popcorn" |
| 944; "848"; "prosciutto" |
| 945; "848"; "gingerbread" |
| 946; "848"; "mango puree" |
| 947; "848"; "mashed potatoes" |
| 948; "848"; "tomato puree" |
| 949; "848"; "apple puree" |
| 950; "848"; "pickle cucumber" |
| 951; "848"; "roll" |
| 952; "848"; "Pickled beets" |
| 953; "848"; "pork jerky" |

TABLE C-continued

| Lists of Food Preparation Methods and Equipment, Cuisine and Bases |
|---|
| 954; "848"; "sugar syrup" |
| 955; "848"; "whipped cream" |
| 956; "848"; "cream of coconut" |
| 957; "848"; "malt" |
| 958; "848"; "sorbet" |
| 959; "848"; "barbecue sauce" |
| 960; "848"; "sauce bearnez" |
| 961; "848"; "bechamel" |
| 962; "848"; "Worcestershire sauce" |
| 963; "848"; "sauce Demiglas" |
| 964; "848"; "" |
| 965; "848"; "sweet and sour sauce" |
| 966; "848"; "salsa" |
| 967; "848"; "sweet sauce" |
| 968; "848"; "chocolate sauce" |
| 969; "848"; "berry sauce" |
| 970; "848"; "asparagus soya" |
| 971; "848"; "caramel chips" |
| 972; "848"; "crushed crackers" |
| 973; "848"; "tartlets" |
| 974; "848"; "tahini" |
| 975; "848"; "pasta for lasagna" |
| 976; "848"; "dough for ravioli" |
| 977; "848"; "pizza dough" |
| 978; "848"; "yeast dough" |
| 979; "848"; "dough kataifi" |
| 980; "848"; "shortbread dough" |
| 981; "848"; "pastry dough" |
| 982; "848"; "puff pastry" |
| 983; "848"; "dough dry" |
| 984; "848"; "filo pastry" |
| 985; "848"; "dried tomatoes" |
| 986; "848"; "Tortilla" |
| 987; "848"; "toast" |
| 988; "848"; "tofu" |
| 989; "848"; "tuna fish oil" |
| 990; "848"; "tuna canned in its own juice" |
| 991; "848"; "Tahini" |
| 992; "848"; " Rice Stuffing" |
| 993; "848"; "Canned beans" |
| 994; "848"; "white bread" |
| 995; "848"; "toast bread" |
| 996; "848"; "rye bread" |
| 997; "848"; "sweet bread" |
| 998; "848"; "black bread" |
| 999; "848"; "rye bread" |
| 1000; "848"; "corn flakes" |
| 1001; "848"; "ciabatta" |
| 1002; "848"; "tea Away" |
| 1003; "848"; "potato chips" |
| 1004; "848"; "corn chips" |
| 1005; "848"; "Marinated mushrooms" |
| 1006; "848"; "chocolate corn balls" |
| 1007; "848"; "Chocolate" |
| 1008; "848"; "white chocolate" |
| 1009; "848"; "bitter chocolate" |
| 1010; "848"; "milk chocolate" |
| 1011; "848"; "dark chocolate" |
| 1012; "50"; "veal fillet" |
| 1013; "57"; "beef fillet" |
| 1014; "848"; "sauce for soups "Bright udon"" |
| 1015; "296"; "Lemon" |
| 1016; "217"; "Carrots" |
| 1017; "217"; "Tomato" |

TABLE D

| Types of Cuisine and Dishes | |
|---|---|
| Types of Cuisine | |
| 1 | Abkhaz cuisine |
| 2 | Australian cuisine |
| 3 | Austrian cuisine |
| 4 | Azerbaijan cuisine |
| 5 | Albanian cuisine |
| 6 | Algerian cuisine |
| 7 | American cuisine |
| 8 | English cuisine |
| 9 | Arabic cuisine |
| 10 | Argentine cuisine |
| 11 | Armenian cuisine |
| 12 | Bashkir cuisine |
| 13 | Belarusian cuisine |
| 14 | Belgian cuisine |
| 15 | Bulgarian cuisine |
| 16 | Bosnian cuisine |
| 17 | Brazilian cuisine |
| 18 | Hungarian cuisine |
| 19 | Venezuelan cuisine |
| 20 | Vietnamese cuisine |
| 21 | Greek cuisine |
| 22 | Georgian cuisine |
| 23 | Danish cuisine |
| 24 | Jewish cuisine |
| 25 | Israeli cuisine |
| 26 | Indian cuisine |
| 27 | Indonesian cuisine |
| 28 | Jordanian cuisine |
| 29 | Iraqi cuisine |
| 30 | Iranian cuisine |
| 31 | Irish cuisine |
| 32 | Icelandic cuisine |
| 33 | Spanish cuisine |
| 34 | Italian cuisine |
| 35 | Cambodian cuisine |
| 36 | Canadian cuisine |
| 37 | Cypriot cuisine |
| 38 | Chinese cuisine |
| 39 | Colombian cuisine |
| 40 | Korean cuisine |
| 41 | Creole cuisine |
| 42 | Costa Rica cuisine |
| 43 | Latvian cuisine |
| 44 | Lebanese cuisine |
| 45 | Libyan cuisine |
| 46 | Lithuanian cuisine |
| 47 | Macedonian cuisine |
| 48 | Malaysian cuisine |
| 49 | Moroccan cuisine |
| 50 | Mexican cuisine |
| 51 | Moldavian cuisine |
| 52 | Mongolian cuisine |
| 53 | German cuisine |
| 54 | Dutch cuisine |
| 55 | Zealand cuisine |
| 56 | Norwegian cuisine |
| 57 | Ossetian cuisine |
| 58 | Pakistani cuisine |
| 59 | Palestinian cuisine |
| 60 | Panamanian cuisine |
| 61 | Peruvian cuisine |
| 62 | Polish cuisine |
| 63 | Portuguese cuisine |
| 64 | Romanian cuisine |
| 65 | Russian cuisine |
| 66 | Serbian cuisine |
| 67 | Singaporean cuisine |
| 68 | Syrian cuisine |
| 69 | Slovak cuisine |
| 70 | Slovenian cuisine |
| 71 | Thai cuisine |
| 72 | Tatar cuisine |
| 73 | Tibetan cuisine |
| 74 | Tunisian cuisine |
| 75 | Turkish cuisine |
| 76 | Turkmen cuisine |
| 77 | Ukrainian cuisine |
| 78 | Philippine cuisine |
| 79 | Finnish cuisine |
| 80 | French cuisine |
| 81 | Croatian cuisine |

TABLE D-continued

| Types of Cuisine and Dishes | |
|---|---|
| 82 | Montenegrin cuisine |
| 83 | Czech cuisine |
| 84 | Chilean cuisine |
| 85 | Chuvash cuisine |
| 86 | Chukotka cuisine |
| 87 | Swedish cuisine |
| 88 | Swiss cuisine |
| 89 | Scottish cuisine |
| 90 | Ecuadorian cuisine |
| 91 | Estonian cuisine |
| 92 | Japanese cuisine |
| 93 | Raw food diet |
| 94 | Estonian cuisine |
| 95 | Japanese cuisine |
| 96 | Raw food diet |
| 1 | Types of Dishes |
| 1 | Snacks |
| 2 | Salads |
| 3 | Entrees |
| 4 | Main Dishes |
| 5 | Desserts |
| 6 | Drinks |
| 7 | Sauces and marinades |
| 8 | Baking |
| 9 | Semimanufactures and preservatives |

TABLE E

List of Robotic Food Preparation System (One Embodiment)

| No | Category | Sys Category | System | Responsible Party(s) | Major Challenges | Level of Completion | Notes |
|---|---|---|---|---|---|---|---|
| 01 | Hardware | Robot | Hands | | Productionization, Robustness, Cost, Weight | | |
| 02 | Hardware | Robot | Arms | | | | |
| 03 | Hardware | Robot | Armature Rails | | | | |
| 04 | Hardware | Capture/ Training | Dynamic 3D Vision System | | | | |
| 05 | Hardware | Capture/ Training | Data Input | | | | |
| 06 | Hardware | Capture/ Training | Editing System | | | | |
| 07 | Hardware | Kitchen Module | Cabinets | | | | |
| 08 | Hardware | Kitchen Module | Fixtures | | | | |
| 09 | Hardware | Kitchen Module | Lighting with ability to computer-operating mode | | | | |
| 10 | Hardware | Kitchen Module | Protection/Safety Screen with ability to computer-operating mode | | | | |
| 11 | Hardware | Kitchen Module | Appliances | | | | |
| 12 | Hardware | Kitchen Module | Automatic Storage device with ability to computer-operating mode | | | | |
| 13 | Hardware | Kitchen Module | Automatic modular dispenser for flowing, liquid ingredients and water with ability to computer-operating mode | | | | |
| | Hardware | Kitchen Module | Freshness ingredients analytical device | | | | |
| | Hardware | Kitchen Module | Built-in electronic scales (in the tabletop) with ability to computer-operating mode | | | | |
| 14 | Hardware | Kitchen Module | Cleaning | | | | |
| 15 | Hardware | Kitchen Module | Waste Disposal | | | | |
| | Hardware | Kitchen Module | Multi-functional professional steam-oven with ability to computer-operating mode | | | | |

TABLE E-continued

List of Robotic Food Preparation System (One Embodiment)

| No | Category | Sys Category | System | Responsible Party(s) | Major Challenges | Level of Completion | Notes |
|---|---|---|---|---|---|---|---|
| | Hardware | Kitchen Module | Multi-functional professional kitchen processor with ability to computer-operating mode | | | | |
| | Hardware | Kitchen Module | Top-loaded dishwasher with ability to computer-operating mode | | | | |
| | Hardware | Kitchen Module | Professional Stove with turning control regulators/buttons operated with ability to computer-operating mode | | | | |
| | Hardware | Kitchen Module | Standard dimension layout | | | | |
| | Hardware | Kitchen Module | Anti-wieting, smoke, steam ventilation system autonomous or be connected to the duct with ability to computer-operating mode | | | | |
| | Hardware | Kitchen Module | Kitchen sink with tap with ability to computer-operating mode | | | | |
| 16 | Hardware | Control/ Power Modules | CPU | | | | |
| 17 | Hardware | Control/ Power Modules | I/O Touchscreen | | | | |
| 18 | Hardware | Control/ Power Modules | Power Supply | | | | |
| 19 | Hardware | Accessories | Utensils | | | | |
| 20 | Hardware | Accessories | Food Containers/Cartridges | | | | |
| 21 | Software | Robot Module | OS | | | | |
| | Hardware | Kitchen Module | Professional Stove with turning control regulators/buttons operated with ability to computer-operating mode | | | | |
| 21 | Software | Robot Module | OS | | | | |
| 22 | Software | Robot Module | Apps | | | | |
| 23 | Software | Robot Module | hand firmware | | | | |
| 24 | Software | Robot Module | Arm firmware | | | | |
| 25 | Software | Robot Module | Rail Control | | | | |
| 26 | Software | Capture/ Training | OS | | | | |
| 27 | Software | Capture/ Training | apps | | | | |
| 28 | Software | Capture/ Training | Vision | | | | |
| 29 | Software | Capture/ Training | Data Input | | | | |
| 30 | Software | Capture/ Training | Editing System | | | | |
| 31 | Software | Kitchen Module | OS | | | | |
| 32 | Software | Kitchen Module | App | | | | |
| 33 | Software | Kitchen Module | Controller Protection/Safety | | | | |

TABLE E-continued

List of Robotic Food Preparation System (One Embodiment)

| No | Category | Sys Category | System | Responsible Party(s) | Major Challenges | Level of Completion | Notes |
|---|---|---|---|---|---|---|---|
| 34 | Software | Kitchen Module | Controller, Appliances | | | | |
| 35 | Software | Kitchen Module | Controller, Storage | | | | |
| 36 | Software | Kitchen Module | Controller, Cleaning | | | | |
| 36 | Software | Kitchen Module | Controller, Steam-oven | | | | |
| 36 | Software | Kitchen Module | Controller, Kitchen Processor | | | | |
| 36 | Software | Kitchen Module | Controller, Dishwasher | | | | |
| 36 | Software | Kitchen Module | Controller, Stove | | | | |
| 36 | Software | Kitchen Module | Controller, Ventilation system | | | | |
| 36 | Software | Kitchen Module | Controller, Lighting | | | | |
| 37 | Software | Kitchen Module | Controller, Waste | | | | |
| 37 | Software | Kitchen Module | Controller, Tap | | | | |
| 37 | Software | Kitchen Module | Controller, Dispensing device | | | | |
| 37 | Software | Kitchen Module | Controller, Scales | | | | |
| 37 | Software | Kitchen Module | Controller, Freshness Indicator | | | | |
| 38 | Software | Control/ Power Modules | OS | | | | |
| 39 | Software | Control/ Power Modules | I/O Touchscreen | | | | |
| 40 | Software | Control/ Power Modules | Control Apps | | | | |
| 41 | Other | Food | Food Recipe Development | | | | |
| 42 | Other | Food | Food Container Prep | | | | |
| 43 | Other | Food | Food Order/Delivery | | | | |
| 44 | Other | Logistics | Safety/Regulatory | | | | |
| 45 | Other | Logistics | Sales/Distribution | | | | |
| 46 | Other | Logistics | Installation/Maintenance | | | | |
| 47 | Other | Logistics | Packaging/Shipping Container | | | | |
| 48 | Other | Logistics | Return Management | | | | |
| 49 | Other | Logistics | Technical Training | | | | |
| 50 | Other | Logistics | Manuals | | | | |
| 51 | Other | Logistics | Warranty | | | | |
| 52 | Production | Robot | | | | | |
| 53 | Production | Kitchen Module | | | | | |
| 54 | Production | Integration/ Shipping | | | | | |
| 55 | Production | | | | | | |
| 56 | Production | | | | | | |
| 57 | Production | | | | | | |
| 58 | Production | | | | | | |
| 59 | Production | | | | | | |
| 60 | Production | | | | | | |

The present invention has been described in particular detail with respect to possible embodiments. Those skilled in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. The system may be implemented via a combination of hardware and software, as described, or entirely in hardware elements, or entirely in software elements. The particular division of functionality between the various systems components described herein is merely example and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. The combination of any specific features described herein is also provided, even if that combination is not explicitly described. In another embodiment, the present invention can be implemented as a computer program product comprising a computer-readable storage medium and computer program code, encoded on the medium, for causing a processor in a computing device or other electronic device to perform the above-described techniques.

As used herein, any reference to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is generally perceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared, transformed, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing" or "computing" or "calculating" or "displaying" or "determining" or the like refer to the action and processes of a computer system, or similar electronic computing module and/or device, that manipulates and transforms data represented as physical (electronic) quantities within the computer system memories or registers or other such information storage, transmission, or display devices.

Certain aspects of the present invention include process steps and instructions described herein in the form of an algorithm. It should be noted that the process steps and instructions of the present invention could be embodied in software, firmware, and/or hardware, and, when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and/or other electronic devices referred to in the specification may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

In various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the invention include a mobile phone, personal digital assistant, smartphone, kiosk, desktop computer, laptop computer, consumer electronic device, television, set-top box, or the like. An electronic device for implementing the present invention may use an operating system such as, for example, iOS available from Apple Inc. of Cupertino, Calif., Android available from Google Inc. of Mountain View, Calif., Microsoft Windows 7 available from Microsoft Corporation of Redmond, Wash., webOS available from Palm, Inc. of Sunnyvale, Calif., or any other operating system that is adapted for use on the device. In some embodiments, the electronic device for implementing the present invention includes functionality for communication over one or more networks, including for example a cellular telephone network, wireless network, and/or computer network such as the Internet.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The terms "a" or "an," as used herein, are defined as one or more than one. The term "plurality," as used herein, is defined as two or more than two. The term "another," as used herein, is defined as at least a second or more.

An ordinary artisan should require no additional explanation in developing the methods and systems described herein but may find some possibly helpful guidance in the preparation of these methods and systems by examining standardized reference works in the relevant art.

While the invention has been described with respect to a limited number of embodiments, those skilled in the art, having benefit of the above description, will appreciate that other embodiments may be devised which do not depart from the scope of the present invention as described herein. It should be noted that the language used in the specification has been principally selected for readability and instructional purposes, and may not have been selected to delineate or circumscribe the inventive subject matter. The terms used should not be construed to limit the invention to the specific embodiments disclosed in the specification and the claims but should be construed to include all methods and systems that operate under the claims set forth herein below. Accordingly, the invention is not limited by the disclosure, but instead its scope is to be determined entirely by the following claims.

What is claimed and desired to be secured by Letters Patent of the United States is:

1. A smart kitchen, comprising:
- a kitchen module, comprising:
  - a kitchen furniture, and one or more smart appliances;
  - one or more sensors;
  - a display for displaying one or more controlling functions in the kitchen module; and
  - one or more processors for controlling the one or more smart appliances;
  - wherein during a first mode, the one or more sensors for recording a first set of data in a recipe file for controlling one or more smart appliances, and during a second mode, the one or more sensors for receiving a second set of data for subsequent corrective or feedback during execution of the recipe file by the one or more smart appliances; and
  - wherein the one or more processors executes the recipe file for controlling the one or more smart appliances, each smart appliance executing one or more food preparation operations based on one or more graphical curves from the recipe file, the one or more processors generating a command for controlling the one or more smart appliances from the recipe file or from the user, the one or more graphical curves comprising one or more data over a time period.

2. The smart kitchen of claim 1, wherein the one or more sensors is integrated in the kitchen module.

3. The smart kitchen of claim 1, wherein the one or more sensors is located outside of the kitchen module.

4. The smart kitchen of claim 1, wherein the one or more sensors is integrated in the one or more smart appliances.

5. The smart kitchen of claim 1, wherein the information comprises data and instructions.

6. The smart kitchen of claim 1, further comprising one or more smart containers for storing ingredients.

7. The smart kitchen of claim 1, further comprising one or more dispensing devices for dosing ingredients.

8. The smart kitchen of claim 1, further comprising a recipe Library database for storing a plurality of recipe files for execution by the one or more smart appliances within the kitchen module, each of the recipe files includes one or more cooking operations with a start time and an end time.

9. The smart kitchen of claim 1, wherein the one or more processors receives data from a chef and record the data in a recipe file.

10. The smart kitchen of claim 1, where the one or more processors in the kitchen module coupled to a network for controlling the one or more smart appliances and for communicating information between the kitchen module and the graphical or voice user interface, the interface receiving a voice activation command from a user, the interface generates generating a voice-based information to the user.

11. The smart kitchen of claim 1, where the kitchen module comprises one or more robotic arms and one or more robotic end effectors, the processor executing the recipe file in which the one or more robotic arms and the one or more robotic end effectors operating the one or more smart appliances.

12. The smart kitchen of claim 1, wherein the processor generates a visual graphical representation of the smart kitchen.

13. A method for operating a kitchen module in a smart kitchen, comprising:
- providing a kitchen module, the kitchen module including a kitchen furniture, one or more smart appliances, and one or more sensors;
- during a first mode, recording by one or more sensors a first set of data in a recipe file for controlling the one or more smart appliances, and during a second mode, the one or more sensors receiving a second set of data for subsequent corrective or supportive feedback during the recipe execution, or to define position and/or orientation of a standard object in the kitchen module, or to define a shape, a size, a type, a position, or an orientation of a non-standard object in the kitchen module, the one or more sensors sensing the non-standard object with respect to a shape, a dimension, an orientation or a position information for making a real-time adjustment;
- displaying one or more real-time smart appliances statuses upon receiving a chef or user command via a graphical or voice user interface for selecting the recipe file for recording or execution, displaying recipe execution feedback, visualizing object position and orientation in the kitchen, or visualize controlling functions of the one or more smart appliances, or any combinations thereof, in the kitchen module during recipe recording and execution;
- detecting by one or more processors operational states of the one or more smart appliances and operating the one or smart appliances; and
- controlling the one or more smart appliances by e one or more processors in the kitchen module coupled to a network, the one or more processors communicating information between the kitchen module and the graphical or voice user interface;

wherein the one or more processors executes the recipe file for controlling the one or more smart appliances, each smart appliance executing one or more food preparation operations based on one or more graphical curves from the recipe file, the one or more processors generating a command for controlling the one or more smart appliances from the recipe file or from the user, the one or more graphical curves comprising one or more data over a time period.

14. The method of claim 13, during an execution mode, further comprising executing the recipe file for controlling the one or more smart appliances and checking on the real-time status of the one or more smart appliances.

15. The method of claim 14, wherein the one or more processors informs a user via a visual interface or a voice interface on the real-time status of the one or more smart appliances.

16. The method of claim 14, wherein the one more processors assists a user with food preparation via a visual interface or a voice interface based on the real-time status data collected from the one or more smart appliances.

17. The method of claim 14, during the recording mode, further comprising recording the recipe file from real-time sensor data, the real-time sensor data including sensor data and timing data.

18. The method of claim 17, wherein the real-time sensor data comprises one or more video sensors, one or more microphone sensors, one or more temperature sensors, and/or sensor data from the one or more smart appliances.

19. The method of claim 13, further comprising retrieving the file from a cloud database.

20. The method of claim 13, wherein the displaying step comprises displaying a real-time virtual kitchen model via a visual interface.

21. The smart kitchen of claim 1, wherein during the second mode, the one or more sensors receiving the second set of data to define a position and an orientation of a standard object in the kitchen module, or the one or more sensors receiving the second set of data to define a shape, a size, a type, a position, or an orientation of a non-standard object in the kitchen module, the one or more sensors sensing the non-standard object with respect to its shape, dimension, orientation or position information for making a real-time adjustment.

22. The smart kitchen of claim 1, wherein the step of the graphical or voice user interface for operating the kitchen module or obtaining real-time information from the one or more objects in the kitchen module comprises (1) receiving a chef or user command to select the recipe for recording or execution (2) displaying one or more real-time smart appliances statuses, (3) displaying recipe execution feedback, (4) visualizing one or more objects, a respective objection position and/or a respective object orientation in the kitchen, or (5) controlling the one or more smart appliances, or any combinations thereof.

23. The smart kitchen of claim 1, wherein the kitchen module comprises one or more actuators to reallocate one or more objects in the kitchen module, including one or more shelfs, one or more cookwares, or one or more small appliances.

24. The smart kitchen of claim 1, wherein the one or more smart appliances comprises a pan having a plurality of cooking zones, each cooking zone associated with a respective control and a respective sensor, the respective control measuring an adjusting the temperature of a respective cooking with the respective sensor, the pan replicating the chef creating recipe process by controlling and adjusting one or more desired temperature curves over time in the plurality of cooking zones.

25. The smart kitchen of claim 1, further comprising one or more ingredient storages having one or more with sensors for receiving real-time sensor data to determine ingredient properties in the one or more ingredient storages.

26. A smart kitchen, comprising:

a kitchen module, comprising:

a kitchen furniture, a worktop area, one or more smart appliances, and one or more sensors;

one or more sensors;

a display for displaying one or more controlling functions in the kitchen module; and one or more processors in the kitchen module coupled to a network for controlling the one or more smart appliances and for communicating information between the kitchen module and the graphical or voice user interface;

wherein during a first mode, the one or more sensors for recording a first set of data in a recipe file for controlling one or more smart appliances, and during a second mode, the one or more sensors for receiving a second set of data for subsequent corrective or supportive feedback during execution of the recipe file by the one or more smart appliances; and wherein the one or more smart appliances comprises a smart oven communicatively coupled to an operating control unit, the smart having one or more temperature sensors and/or one or more humidity sensors, the smart oven replicating the chef creating recipe process with the sensor curves of a particular food recipe in which the operating control unit adjusts the temperature and humidity of the smart oven by real-time data received from the one more temperature sensors and/or one or more humidity sensors.

27. A smart kitchen, comprising:

a kitchen module, comprising:

a kitchen furniture, a worktop area, one or more smart appliances, and one or more sensors;

one or more sensors;

a display for displaying one or more controlling functions in the kitchen module; and one or more processors in the kitchen module coupled to a network for controlling the one or more smart appliances and for communicating information between the kitchen module and the graphical or voice user interface;

wherein during a first mode, the one or more sensors for recording a first set of data in a recipe file for controlling one or more smart appliances, and during a second mode, the one or more sensors for receiving a second set of data for subsequent corrective or supportive feedback during execution of the recipe file by the one or more smart appliances; and wherein the one or more smart appliances comprises a charcoal grill communicatively coupled to a control unit and an electric ignition system, the charcoal grill including one or more temperature sensors and one or more humidity sensors, charcoal grill replicating the chef creating recipe process with the sensor curves of a particular food recipe in which the electric ignition system modulates electric power to the charcoal grill with real-time data received from the one more temperature sensors and/or one or more humidity sensors.

28. The method of claim 13, wherein the non-standard object comprises an ingredient that may have a different size, a different dimension, a different shape, a different color, a different texture, a different weight, and/or any combination thereof.

29. The method of claim 13, wherein the standard object including the name of the standard object, a predetermined size, a predetermined dimension, a predetermined color, a predetermined shape, a predetermined texture, a predetermined weight, a standard position, a standard orientation, a virtual three-dimensional model of the standard object, and/or any combination.

30. The method of claim 13, wherein the kitchen modules comprises a non-standard kitchen module, the standard object placed in a different position and/or in a different orientation.

31. The smart kitchen of claim 1, wherein the one or more processors are located in the one or more smart appliances.

32. The smart kitchen of claim 1, wherein the one or more processors are located in the kitchen module.

* * * * *